(12) United States Patent
Scapel et al.

(10) Patent No.: US 12,737,049 B2
(45) Date of Patent: Sep. 15, 2026

(54) VIDEO APPLICATION GRAPHICAL EFFECTS

(71) Applicant: Apple Inc., Cupertino, CA (US)

(72) Inventors: Nicolas V. Scapel, London (GB); Johnnie B. Manzari, San Francisco, CA (US); Giancarlo Yerkes, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 4 days.

(21) Appl. No.: 18/416,784

(22) Filed: Jan. 18, 2024

(65) Prior Publication Data

US 2024/0291944 A1 Aug. 29, 2024

Related U.S. Application Data

(60) Provisional application No. 63/470,885, filed on Jun. 3, 2023, provisional application No. 63/465,093, filed (Continued)

(51) Int. Cl.
*H04N 7/15* (2006.01)
*G06F 3/01* (2006.01)

(Continued)

(52) U.S. Cl.
CPC ............ *H04N 7/152* (2013.01); *G06F 3/017* (2013.01); *G06T 13/80* (2013.01); *G06V 40/28* (2022.01); *H04N 5/2621* (2013.01)

(58) Field of Classification Search
CPC ...... H04N 7/152; H04N 5/2621; H04N 7/147; G06F 3/017; G06F 3/04842;

(Continued)

(56) References Cited

U.S. PATENT DOCUMENTS 102,663 A 5/1870 Dillen
5,617,526 A 4/1997 Oran et al.

(Continued)

FOREIGN PATENT DOCUMENTS

AU 2015100713 A4 6/2015
CA 2845537 A1 9/2014

(Continued)

OTHER PUBLICATIONS

Advisory Action received for U.S. Appl. No. 14/263,889, mailed on May 26, 2016, 4 pages.

(Continued)

*Primary Examiner* — Phung-Hoang J Nguyen
(74) *Attorney, Agent, or Firm* — YHE Law LLP

(57) ABSTRACT

The present disclosure generally relates to methods and user interfaces for displaying graphical effects in a video application. In some embodiments, methods and user interfaces for displaying graphical effects during a real-time communication session are described. In some embodiments, methods and user interfaces for sharing content during a real-time communication session are described. In some embodiments, methods and user interfaces for displaying graphical effects in multiple video applications are described. In some embodiments, methods and user interfaces for framing a subject in a representation of the field of view of one or more camera sensors is described.

42 Claims, 113 Drawing Sheets

Related U.S. Application Data on May 9, 2023, provisional application No. 63/448,237, filed on Feb. 24, 2023.

(51) Int. Cl.

| | |
|---|---|
| ***G06T 13/80*** | (2011.01) |
| ***G06V 40/20*** | (2022.01) |
| ***H04N 5/262*** | (2006.01) |

(58) Field of Classification Search

CPC .. G06F 3/04845; G06F 3/0304; G06F 3/0481; G06T 13/80; G06V 40/28; H04L 65/403; G06Q 50/01

See application file for complete search history.

(56) References Cited

U.S. PATENT DOCUMENTS

| | | | |
|---|---|---|---|
| 5,745,116 | A | 4/1998 | Pisutha-Amond |
| 5,958,006 | A | 9/1999 | Eggleston et al. |
| 6,025,871 | A | 2/2000 | Kantor et al. |
| 6,088,040 | A | 7/2000 | Oda et al. |
| 6,219,047 | B1 | 4/2001 | Bell |
| 6,333,973 | B1 | 12/2001 | Smith et al. |
| 6,346,962 | B1 | 2/2002 | Goodridge |
| 6,726,094 | B1 | 4/2004 | Rantze et al. |
| 6,728,784 | B1 | 4/2004 | Mattaway |
| 6,731,308 | B1 | 5/2004 | Tang et al. |
| 6,806,898 | B1 | 10/2004 | Toyama et al. |
| 7,102,663 | B2 | 9/2006 | Crook |
| 7,148,911 | B1 | 12/2006 | Mitsui et al. |
| 7,185,054 | B1 | 2/2007 | Ludwig et al. |
| 7,343,561 | B1 | 3/2008 | Stochosky et al. |
| 7,571,014 | B1 | 8/2009 | Lambourne et al. |
| 7,801,971 | B1 | 9/2010 | Amidon et al. |
| 7,876,996 | B1 | 1/2011 | Herz |
| 7,903,171 | B2 | 3/2011 | Takabatake et al. |
| 7,982,762 | B2 | 7/2011 | Chatting et al. |
| 8,169,463 | B2 | 5/2012 | Enstad et al. |
| RE43,462 | E | 6/2012 | Washino et al. |
| 8,274,544 | B2 | 9/2012 | Kurtz et al. |
| 8,370,448 | B2 | 2/2013 | Galchev |
| 8,462,961 | B1 | 6/2013 | Bywaters et al. |
| 8,502,856 | B2 | 8/2013 | Jeong et al. |
| 8,542,265 | B1 | 9/2013 | Dodd et al. |
| 8,601,379 | B2 | 12/2013 | Marks et al. |
| 8,624,952 | B2 | 1/2014 | Currivan et al. |
| 8,725,880 | B2 | 5/2014 | Santamaria et al. |
| 8,738,090 | B2 | 5/2014 | Kanda et al. |
| 8,799,406 | B1 | 8/2014 | Slonh |
| 8,856,105 | B2 | 10/2014 | Gargi |
| 8,914,752 | B1 | 12/2014 | Spiegel |
| 9,080,736 | B1 | 7/2015 | Satzinger et al. |
| 9,083,844 | B2 | 7/2015 | Tamiya et al. |
| 9,104,908 | B1 | 8/2015 | Rogers et al. |
| 9,185,062 | B1 | 11/2015 | Yang et al. |
| 9,253,531 | B2 | 2/2016 | Relyea et al. |
| 9,380,264 | B1 | 6/2016 | Vakalapudi |
| 9,406,103 | B1 | 8/2016 | Gray et al. |
| 9,445,048 | B1 | 9/2016 | Nariyawala et al. |
| 9,462,017 | B1 | 10/2016 | Siracusano, Jr. |
| 9,635,314 | B2 | 4/2017 | Barkley et al. |
| 9,639,974 | B2 | 5/2017 | Smith et al. |
| 9,747,716 | B1 | 8/2017 | Mallet et al. |
| 9,787,938 | B2 | 10/2017 | Cranfill et al. |
| 9,800,951 | B1 | 10/2017 | Carlson et al. |
| 9,819,877 | B1 | 11/2017 | Faulkner et al. |
| 9,942,519 | B1 | 4/2018 | Pan et al. |
| 9,992,450 | B1 | 6/2018 | Yuan et al. |
| 10,157,040 | B2 | 12/2018 | Ballinger et al. |
| 10,194,189 | B1 | 1/2019 | Goetz et al. |
| 10,270,983 | B1 | 4/2019 | Van Os et al. |
| 10,284,812 | B1 | 5/2019 | Van Os et al. |
| 10,300,394 | B1 | 5/2019 | Evans et al. |
| 10,339,769 | B2 | 7/2019 | Mixter et al. |
| 10,353,532 | B1 | 7/2019 | Holz et al. |
| 10,362,272 | B1 | 7/2019 | Van Os et al. |
| 10,386,994 | B2 | 8/2019 | Singal et al. |
| 10,389,977 | B1 | 8/2019 | Van Os et al. |
| 10,410,426 | B2 | 9/2019 | Kamini et al. |
| 10,523,625 | B1 | 12/2019 | Allen et al. |
| 10,523,976 | B2 | 12/2019 | Hemmati et al. |
| 10,645,294 | B1 | 5/2020 | Manzari et al. |
| 10,757,366 | B1 | 8/2020 | Kwatra et al. |
| 10,771,740 | B1 | 9/2020 | Reynolds et al. |
| 10,771,741 | B1 | 9/2020 | Reynolds et al. |
| 10,783,883 | B2 | 9/2020 | Mixter et al. |
| 10,909,586 | B2 | 2/2021 | Avedissian et al. |
| 10,924,446 | B1 | 2/2021 | Paul |
| 10,929,099 | B2 | 2/2021 | Querze et al. |
| 10,963,145 | B1 | 3/2021 | Voss et al. |
| 10,972,655 | B1 | 4/2021 | Ostap et al. |
| 11,012,575 | B1 | 5/2021 | Leblang et al. |
| 11,024,303 | B1 | 6/2021 | Devaraj et al. |
| 11,064,256 | B1 | 7/2021 | Voss et al. |
| 11,079,913 | B1 | 8/2021 | Kim et al. |
| 11,144,885 | B2 | 10/2021 | Rosenberg |
| 11,164,113 | B2 | 11/2021 | Howard |
| 11,164,580 | B2 | 11/2021 | Kraker |
| 11,176,940 | B1 | 11/2021 | Zhong et al. |
| 11,212,449 | B1 | 12/2021 | Manzari et al. |
| 11,258,619 | B2 | 2/2022 | Libin |
| 11,283,916 | B2 | 3/2022 | Coffman et al. |
| 11,290,687 | B1 | 3/2022 | Becchetti |
| 11,316,709 | B2 | 4/2022 | Brown et al. |
| 11,343,613 | B2 | 5/2022 | Gordon et al. |
| 11,360,634 | B1 | 6/2022 | Chang et al. |
| 11,449,188 | B1 | 9/2022 | Chang et al. |
| 11,523,166 | B1 | 12/2022 | Tu et al. |
| 11,621,979 | B1 | 4/2023 | Slotznick |
| 11,671,697 | B2 | 6/2023 | O'Leary et al. |
| 11,726,647 | B2 | 8/2023 | Kim |
| 11,770,600 | B2 | 9/2023 | O'Leary et al. |
| 11,955,025 | B2 | 4/2024 | Aoki et al. |
| 12,014,118 | B2 | 6/2024 | Gruber et al. |
| 12,085,421 | B2 | 9/2024 | Yedid et al. |
| 12,218,944 | B1 | 2/2025 | Hadley et al. |
| 2001/0021649 | A1 | 9/2001 | Kinnunen et al. |
| 2001/0030597 | A1 | 10/2001 | Inoue et al. |
| 2001/0033675 | A1 | 10/2001 | Maurer et al. |
| 2001/0041007 | A1 | 11/2001 | Aoki |
| 2002/0093531 | A1 | 7/2002 | Barile |
| 2002/0101446 | A1 | 8/2002 | Tang et al. |
| 2003/0112938 | A1 | 6/2003 | Kanakubo et al. |
| 2003/0158886 | A1 | 8/2003 | Walls et al. |
| 2003/0160861 | A1 | 8/2003 | Barlow et al. |
| 2003/0217096 | A1 | 11/2003 | Mckelvie et al. |
| 2003/0225836 | A1 | 12/2003 | Lee et al. |
| 2004/0003040 | A1 | 1/2004 | Beavers et al. |
| 2004/0048601 | A1 | 3/2004 | Lee et al. |
| 2004/0048612 | A1 | 3/2004 | Virtanen et al. |
| 2004/0102225 | A1 | 5/2004 | Furuta et al. |
| 2004/0162877 | A1 | 8/2004 | Van et al. |
| 2004/0218035 | A1 | 11/2004 | Crook |
| 2004/0239763 | A1 | 12/2004 | Notea et al. |
| 2005/0015286 | A1 | 1/2005 | Rudnik et al. |
| 2005/0099492 | A1 | 5/2005 | Orr |
| 2005/0120306 | A1 | 6/2005 | Klassen et al. |
| 2005/0124365 | A1 | 6/2005 | Balasuriya et al. |
| 2005/0138122 | A1 | 6/2005 | Boehringer et al. |
| 2005/0144247 | A1 | 6/2005 | Christensen et al. |
| 2005/0233780 | A1 | 10/2005 | Jani et al. |
| 2005/0248582 | A1 | 11/2005 | Scheepers et al. |
| 2006/0002315 | A1 | 1/2006 | Theurer et al. |
| 2006/0002523 | A1 | 1/2006 | Bettis et al. |
| 2006/0056837 | A1 | 3/2006 | Vapaakoski |
| 2006/0098085 | A1 | 5/2006 | Nichols et al. |
| 2006/0098634 | A1 | 5/2006 | Umemoto et al. |
| 2006/0129947 | A1 | 6/2006 | Hamzy et al. |
| 2006/0149399 | A1 | 7/2006 | Norhammar et al. |
| 2006/0158730 | A1 | 7/2006 | Kira |
| 2006/0256188 | A1 | 11/2006 | Mock et al. |
| 2007/0004389 | A1 | 1/2007 | Wallace et al. |
| 2007/0040898 | A1 | 2/2007 | Lee et al. |
| 2007/0064112 | A1 | 3/2007 | Chatting et al. |

(56) References Cited

U.S. PATENT DOCUMENTS

2007/0115349 A1 5/2007 Currivan et al.
2007/0124783 A1 5/2007 Ahiska et al.
2007/0127844 A1 6/2007 Watanabe
2007/0150842 A1 6/2007 Chaudhri et al.
2007/0156910 A1 7/2007 Alfke et al.
2007/0177025 A1 8/2007 Kopet et al.
2007/0211141 A1 9/2007 Christiansen
2007/0264977 A1 11/2007 Zinn et al.
2007/0279482 A1 12/2007 Oswald et al.
2007/0291736 A1 12/2007 Furlong et al.
2008/0032704 A1 2/2008 Oneil et al.
2008/0036849 A1 2/2008 Oh et al.
2008/0063389 A1 3/2008 Fang et al.
2008/0068447 A1 3/2008 Mattila et al.
2008/0074049 A1 3/2008 Kitai et al.
2008/0074550 A1 3/2008 Park
2008/0084482 A1 4/2008 Hansson et al.
2008/0114716 A1 5/2008 Mock
2008/0117876 A1 5/2008 Hidaka et al.
2008/0122796 A1 5/2008 Jobs et al.
2008/0129816 A1 6/2008 Mattila et al.
2008/0129844 A1 6/2008 Cusack et al.
2008/0134088 A1 6/2008 Tse et al.
2008/0140488 A1 6/2008 Oral et al.
2008/0165388 A1 7/2008 Serlet
2008/0220752 A1 9/2008 Forstall et al.
2008/0246778 A1 10/2008 Ham et al.
2008/0267459 A1 10/2008 Nakada et al.
2008/0306997 A1 12/2008 Keohane et al.
2008/0307323 A1 12/2008 Coffman et al.
2008/0313278 A1 12/2008 Hochberg
2008/0316183 A1 12/2008 Westerman et al.
2008/0316295 A1 12/2008 King et al.
2009/0005011 A1 1/2009 Christie et al.
2009/0007017 A1 1/2009 Anzures et al.
2009/0015658 A1 1/2009 Enstad et al.
2009/0033737 A1* 2/2009 Goose .................... H04N 7/15
348/E7.083
2009/0046075 A1 2/2009 Kim et al.
2009/0049446 A1 2/2009 Merten et al.
2009/0109276 A1 4/2009 Kim
2009/0117936 A1 5/2009 Maeng
2009/0132371 A1 5/2009 Strietzel et al.
2009/0164322 A1 6/2009 Khan et al.
2009/0164587 A1 6/2009 Gavita et al.
2009/0174680 A1 7/2009 Anzures et al.
2009/0174763 A1 7/2009 Bengtsson et al.
2009/0177981 A1 7/2009 Christie et al.
2009/0183125 A1 7/2009 Magal et al.
2009/0195545 A1 8/2009 Debevec et al.
2009/0202114 A1 8/2009 Morin et al.
2009/0228322 A1 9/2009 Van et al.
2009/0228820 A1 9/2009 Kim et al.
2009/0228825 A1 9/2009 Van Os et al.
2009/0228938 A1 9/2009 White et al.
2009/0232129 A1 9/2009 Wong et al.
2009/0249244 A1 10/2009 Robinson et al.
2009/0256780 A1 10/2009 Small et al.
2009/0262200 A1 10/2009 Takabatake et al.
2009/0262206 A1 10/2009 Park
2009/0287790 A1 11/2009 Upton et al.
2009/0305679 A1 12/2009 Kim
2009/0305732 A1 12/2009 Marcellino et al.
2009/0309897 A1 12/2009 Morita et al.
2010/0009719 A1 1/2010 Oh et al.
2010/0011065 A1 1/2010 Scherpa et al.
2010/0039498 A1 2/2010 Liu et al.
2010/0040292 A1 2/2010 Clarkson
2010/0053212 A1 3/2010 Kang et al.
2010/0058231 A1 3/2010 Duarte et al.
2010/0073454 A1 3/2010 Lovhaugen et al.
2010/0073455 A1 3/2010 Iwabuchi et al.
2010/0085416 A1 4/2010 Hegde et al.
2010/0087230 A1 4/2010 Peh et al.
2010/0097438 A1 4/2010 Ujii
2010/0121636 A1 5/2010 Burke et al.
2010/0123724 A1 5/2010 Moore et al.
2010/0125785 A1 5/2010 Moore et al.
2010/0125811 A1 5/2010 Moore et al.
2010/0146384 A1 6/2010 Peev et al.
2010/0153847 A1 6/2010 Fama
2010/0159994 A1 6/2010 Stallings et al.
2010/0159995 A1 6/2010 Stallings et al.
2010/0162171 A1 6/2010 Felt et al.
2010/0169435 A1 7/2010 Osullivan et al.
2010/0177156 A1 7/2010 Kim et al.
2010/0189096 A1 7/2010 Flynn et al.
2010/0238262 A1 9/2010 Kurtz et al.
2010/0246571 A1 9/2010 Geppert et al.
2010/0247077 A1 9/2010 Yamamoto et al.
2010/0251119 A1 9/2010 Geppert et al.
2010/0251158 A1 9/2010 Geppert et al.
2010/0257490 A1 10/2010 Lyon et al.
2010/0262714 A1 10/2010 Hiie
2010/0309284 A1 12/2010 Samadani et al.
2010/0318928 A1 12/2010 Neuman et al.
2010/0318939 A1 12/2010 Moon
2010/0322111 A1 12/2010 Li
2011/0030324 A1 2/2011 Higgins
2011/0032324 A1 2/2011 George et al.
2011/0080356 A1 4/2011 Kang et al.
2011/0081889 A1 4/2011 Gao et al.
2011/0085017 A1 4/2011 Robinson et al.
2011/0087970 A1 4/2011 Swink et al.
2011/0105096 A1 5/2011 Dods et al.
2011/0107216 A1 5/2011 Bi
2011/0115875 A1 5/2011 Sadwick et al.
2011/0115876 A1 5/2011 Khot et al.
2011/0115945 A1 5/2011 Takano et al.
2011/0117898 A1 5/2011 Pereira et al.
2011/0126148 A1 5/2011 Krishnaraj et al.
2011/0161836 A1 6/2011 Mu et al.
2011/0164032 A1* 7/2011 Shadmi .................. G06F 3/017
345/419
2011/0167357 A1 7/2011 Benjamin et al.
2011/0184768 A1 7/2011 Norton et al.
2011/0193995 A1 8/2011 Goh et al.
2011/0205333 A1 8/2011 Wu et al.
2011/0209201 A1 8/2011 Chollat
2011/0234746 A1 9/2011 Saleh et al.
2011/0235549 A1 9/2011 Ahlers et al.
2011/0242356 A1 10/2011 Aleksic et al.
2011/0249073 A1 10/2011 Cranfill et al.
2011/0249074 A1 10/2011 Cranfill et al.
2011/0249086 A1 10/2011 Guo et al.
2011/0252146 A1 10/2011 Santamaria et al.
2011/0273526 A1 11/2011 Mehin et al.
2011/0296163 A1 12/2011 Abernethy et al.
2012/0002001 A1 1/2012 Prentice
2012/0019610 A1 1/2012 Hornyak et al.
2012/0033028 A1 2/2012 Murphy et al.
2012/0054278 A1 3/2012 Taleb et al.
2012/0062784 A1 3/2012 Van et al.
2012/0069028 A1 3/2012 Bouguerra
2012/0079377 A1 3/2012 Goossens
2012/0079378 A1 3/2012 Goossens
2012/0081375 A1 4/2012 Robert et al.
2012/0084691 A1 4/2012 Yun
2012/0092436 A1 4/2012 Pahud et al.
2012/0114108 A1 5/2012 Katis et al.
2012/0139830 A1 6/2012 Hwang et al.
2012/0173383 A1 7/2012 Badawiyeh et al.
2012/0182381 A1 7/2012 Abate et al.
2012/0185355 A1 7/2012 Kilroy
2012/0185542 A1 7/2012 Vyrros et al.
2012/0188394 A1 7/2012 Park et al.
2012/0198098 A1 8/2012 Kim et al.
2012/0201479 A1 8/2012 Zhang et al.
2012/0229591 A1 9/2012 Lee
2012/0233239 A1 9/2012 Urim et al.
2012/0257095 A1 10/2012 Velazquez
2012/0284297 A1 11/2012 Aguera-arcas et al.
2012/0289290 A1 11/2012 Chae et al.
2012/0290950 A1 11/2012 Rapaport et al.

(56) References Cited

U.S. PATENT DOCUMENTS

2012/0293605 A1 11/2012 Seferian et al.
2012/0296972 A1 11/2012 Backer
2012/0304079 A1 11/2012 Rideout et al.
2012/0320141 A1 12/2012 Bowen et al.
2013/0007665 A1 1/2013 Chaudhri et al.
2013/0055113 A1 2/2013 Chazin et al.
2013/0061155 A1 3/2013 Hon
2013/0070046 A1 3/2013 Wolf et al.
2013/0073989 A1 3/2013 Harris et al.
2013/0080923 A1 3/2013 Anzures et al.
2013/0088413 A1 4/2013 Raffle et al.
2013/0091214 A1 4/2013 Kellerman et al.
2013/0102281 A1 4/2013 Kanda et al.
2013/0111603 A1 5/2013 Sakai et al.
2013/0124207 A1 5/2013 Sarin et al.
2013/0132865 A1 5/2013 Li
2013/0145295 A1 6/2013 Bocking et al.
2013/0147933 A1 6/2013 Kulas et al.
2013/0151623 A1 6/2013 Weiser et al.
2013/0162781 A1 6/2013 Hubner et al.
2013/0166580 A1 6/2013 Maharajh et al.
2013/0169742 A1 7/2013 Wu et al.
2013/0185650 A1 7/2013 Gutowitz
2013/0216206 A1 8/2013 Dubin et al.
2013/0219276 A1 8/2013 Shan
2013/0219332 A1 8/2013 Woley et al.
2013/0225140 A1 8/2013 Greisson
2013/0230293 A1 9/2013 Boyle et al.
2013/0282180 A1 10/2013 Layton
2013/0290058 A1 10/2013 Gray et al.
2013/0293777 A1 11/2013 Huber et al.
2013/0325949 A1 12/2013 Virani et al.
2013/0328770 A1 12/2013 Parham
2013/0328997 A1 12/2013 Desai
2013/0332826 A1 12/2013 Karunamuni et al.
2013/0332856 A1 12/2013 Sanders et al.
2013/0342672 A1 12/2013 Gray et al.
2013/0346882 A1 12/2013 Shiplacoff et al.
2013/0346892 A1 12/2013 Wren et al.
2013/0346922 A1 12/2013 Shiplacoff et al.
2014/0018053 A1 1/2014 Cho et al.
2014/0024340 A1 1/2014 Raleigh
2014/0026074 A1 1/2014 Cortes et al.
2014/0028781 A1 1/2014 MacDonald
2014/0043424 A1 2/2014 Gava et al.
2014/0055426 A1 2/2014 Park et al.
2014/0063176 A1 3/2014 Modai et al.
2014/0085293 A1 3/2014 Konoplev et al.
2014/0085487 A1 3/2014 Park et al.
2014/0089857 A1 3/2014 Wang et al.
2014/0092130 A1 4/2014 Anderson et al.
2014/0099004 A1 4/2014 Dibona et al.
2014/0101768 A1 4/2014 Miller et al.
2014/0105372 A1 4/2014 Nowack et al.
2014/0108084 A1 4/2014 Bargetzi et al.
2014/0108568 A1 4/2014 Lee
2014/0118272 A1 5/2014 Gunn
2014/0119531 A1 5/2014 Tuchman et al.
2014/0152758 A1 6/2014 Tong et al.
2014/0189524 A1 7/2014 Murarka et al.
2014/0198121 A1 7/2014 Tong et al.
2014/0201126 A1 7/2014 Zadeh et al.
2014/0201527 A1 7/2014 Krivorot
2014/0201632 A1 7/2014 Kunigita et al.
2014/0213318 A1 7/2014 Leem et al.
2014/0215356 A1 7/2014 Brander et al.
2014/0215404 A1 7/2014 Kong et al.
2014/0218371 A1 8/2014 Du et al.
2014/0218459 A1 8/2014 Wenlong et al.
2014/0218461 A1 8/2014 Deland
2014/0229835 A1 8/2014 Ravine
2014/0247368 A1 9/2014 Chinn
2014/0280812 A1 9/2014 Bealkowski et al.
2014/0282084 A1 9/2014 Murarka et al.
2014/0282233 A1 9/2014 Sandler et al.
2014/0310643 A1 10/2014 Karmanenko et al.
2014/0317532 A1 10/2014 Ma et al.
2014/0324600 A1 10/2014 Soffin
2014/0331149 A1 11/2014 Labey
2014/0335827 A1 11/2014 Tsuda
2014/0349754 A1 11/2014 Kaneoka et al.
2014/0354759 A1 12/2014 Cranfill et al.
2014/0361974 A1 12/2014 Li et al.
2014/0362091 A1 12/2014 Bouaziz et al.
2014/0366158 A1 12/2014 Han et al.
2014/0368547 A1 12/2014 Elings
2014/0368600 A1 12/2014 Do et al.
2014/0368719 A1 12/2014 Kaneko et al.
2014/0373081 A1 12/2014 Dodson et al.
2014/0375747 A1 12/2014 Martinez et al.
2014/0378099 A1 12/2014 Huang et al.
2015/0004945 A1 1/2015 Steeves et al.
2015/0019966 A1 1/2015 Jeon et al.
2015/0033149 A1 1/2015 Kuchoor
2015/0040012 A1 2/2015 Faaborg et al.
2015/0058413 A1 2/2015 Ge
2015/0062158 A1 3/2015 Hildreth et al.
2015/0067541 A1 3/2015 Owens et al.
2015/0070272 A1 3/2015 Kim et al.
2015/0078680 A1 3/2015 Shakib et al.
2015/0082255 A1 3/2015 Devries et al.
2015/0082446 A1 3/2015 Flowers et al.
2015/0084950 A1 3/2015 Li et al.
2015/0085057 A1 3/2015 Ouyang et al.
2015/0094120 A1 4/2015 Suh et al.
2015/0095804 A1 4/2015 Grossman et al.
2015/0106720 A1 4/2015 Backer
2015/0109966 A1 4/2015 Hong et al.
2015/0116353 A1 4/2015 Miura et al.
2015/0116363 A1 4/2015 Monte et al.
2015/0116464 A1 4/2015 Tanaka
2015/0121267 A1 4/2015 Wu et al.
2015/0121312 A1 4/2015 Li
2015/0130892 A1 5/2015 Whynot et al.
2015/0135098 A1 5/2015 Geppert et al.
2015/0160832 A1 6/2015 Walkin et al.
2015/0172238 A1 6/2015 Ahmed et al.
2015/0172552 A1 6/2015 Kim
2015/0172584 A1 6/2015 Park et al.
2015/0177914 A1 6/2015 Coyner et al.
2015/0193196 A1 7/2015 Lin et al.
2015/0206529 A1 7/2015 Kwon et al.
2015/0213307 A1 7/2015 Beeler et al.
2015/0235432 A1* 8/2015 Bronder .................. G06F 3/012 345/633
2015/0248167 A1* 9/2015 Turbell ................. G06F 3/0481 715/754
2015/0256796 A1 9/2015 Ma
2015/0264304 A1 9/2015 Chastney et al.
2015/0288868 A1 10/2015 Slavin et al.
2015/0296077 A1 10/2015 Wakeyama et al.
2015/0301338 A1 10/2015 Van Heugten
2015/0304366 A1 10/2015 Bader-Natal et al.
2015/0304413 A1 10/2015 Park
2015/0312185 A1 10/2015 Langholz et al.
2015/0319006 A1 11/2015 Plummer et al.
2015/0319144 A1 11/2015 Barton et al.
2015/0325029 A1 11/2015 Li et al.
2015/0334140 A1 11/2015 Singh et al.
2015/0334313 A1 11/2015 Chougle et al.
2015/0346912 A1 12/2015 Yang et al.
2015/0350125 A1 12/2015 Henderson
2015/0350143 A1 12/2015 Lemay et al.
2015/0350533 A1 12/2015 Harris et al.
2015/0358484 A1 12/2015 Permude
2015/0358584 A1 12/2015 Mattson
2015/0365306 A1 12/2015 Chaudhri et al.
2015/0370426 A1 12/2015 Carrigan et al.
2015/0373065 A1 12/2015 Holmquist et al.
2015/0373178 A1 12/2015 Felt et al.
2016/0005206 A1 1/2016 Li et al.
2016/0006987 A1 1/2016 Li et al.
2016/0014059 A1 1/2016 Rathod
2016/0014477 A1 1/2016 Siders

(56) References Cited

U.S. PATENT DOCUMENTS

2016/0021155 A1 1/2016 Sawato
2016/0028875 A1 1/2016 Brown et al.
2016/0029004 A1 1/2016 Campbell et al.
2016/0042548 A1 2/2016 Du et al.
2016/0048316 A1 2/2016 Bae et al.
2016/0050169 A1 2/2016 Ben Atar et al.
2016/0057173 A1 2/2016 Singman et al.
2016/0065832 A1 3/2016 Kim et al.
2016/0072861 A1 3/2016 Woolsey et al.
2016/0073185 A1 3/2016 Kannappan et al.
2016/0099901 A1 4/2016 Allen et al.
2016/0099987 A1 4/2016 Shamma
2016/0105388 A1 4/2016 Bin Mahfooz et al.
2016/0110059 A1 4/2016 Li et al.
2016/0110922 A1 4/2016 Haring
2016/0124614 A1 5/2016 Bromberg et al.
2016/0127636 A1 5/2016 Ito et al.
2016/0134840 A1 5/2016 Mcculloch
2016/0139785 A1 5/2016 Griffin et al.
2016/0142450 A1 5/2016 Paul et al.
2016/0163084 A1 6/2016 Corazza et al.
2016/0180259 A1 6/2016 Marianko et al.
2016/0191958 A1 6/2016 Nauseef et al.
2016/0210602 A1 7/2016 Siddique et al.
2016/0212374 A1 7/2016 Usbergo et al.
2016/0227095 A1 8/2016 Yoshizawa et al.
2016/0227115 A1 8/2016 Bin Mahfooz et al.
2016/0231902 A1 8/2016 Sirpal et al.
2016/0247308 A1 8/2016 Jiao et al.
2016/0259528 A1 9/2016 Foss et al.
2016/0261653 A1 9/2016 Kim
2016/0266769 A1 9/2016 Oursbourn et al.
2016/0267699 A1 9/2016 Borke et al.
2016/0277708 A1 9/2016 Rintel et al.
2016/0277903 A1 9/2016 Poosala et al.
2016/0291822 A1 10/2016 Ahuja et al.
2016/0291824 A1 10/2016 Grossman et al.
2016/0292901 A1 10/2016 Li et al.
2016/0292903 A1 10/2016 Li et al.
2016/0306422 A1 10/2016 Parham et al.
2016/0306504 A1 10/2016 Brunsch et al.
2016/0308920 A1 10/2016 Brunsch et al.
2016/0316038 A1 10/2016 Jolfaei
2016/0320849 A1 11/2016 Koo
2016/0328874 A1 11/2016 Tong et al.
2016/0328875 A1 11/2016 Fang et al.
2016/0328876 A1 11/2016 Tong et al.
2016/0335041 A1 11/2016 Wachter et al.
2016/0344972 A1 11/2016 Missig et al.
2016/0350957 A1 12/2016 Woods et al.
2016/0352661 A1 12/2016 Yang et al.
2016/0364106 A1 12/2016 Koum et al.
2016/0380780 A1 12/2016 Stephenson et al.
2017/0006162 A1 1/2017 Bargetzi et al.
2017/0018289 A1 1/2017 Morgenstern
2017/0024100 A1 1/2017 Pieper et al.
2017/0031557 A1 2/2017 Xiangli et al.
2017/0034583 A1 2/2017 Long et al.
2017/0046045 A1 2/2017 Tung et al.
2017/0046065 A1 2/2017 Zeng et al.
2017/0048817 A1 2/2017 Yang et al.
2017/0064184 A1 3/2017 Tsai
2017/0069124 A1 3/2017 Tong et al.
2017/0080346 A1 3/2017 Abbas
2017/0083189 A1 3/2017 Yang et al.
2017/0083524 A1 3/2017 Huang et al.
2017/0083586 A1 3/2017 Huang et al.
2017/0093769 A1 3/2017 Lind et al.
2017/0094019 A1 3/2017 Ahmed et al.
2017/0097621 A1 4/2017 Ackmann et al.
2017/0097715 A1 4/2017 Kim et al.
2017/0098122 A1 4/2017 El Kaliouby et al.
2017/0111587 A1 4/2017 Herbst et al.
2017/0111595 A1 4/2017 Soni et al.
2017/0126592 A1 5/2017 El
2017/0132828 A1 5/2017 Zelenin et al.
2017/0140214 A1 5/2017 Matas et al.
2017/0150099 A1 5/2017 Duckworth et al.
2017/0150904 A1 6/2017 Park et al.
2017/0206779 A1 7/2017 Lee et al.
2017/0220212 A1 8/2017 Yang et al.
2017/0230585 A1 8/2017 Nash et al.
2017/0230705 A1 8/2017 Pardue et al.
2017/0244932 A1 8/2017 Pistilli et al.
2017/0280098 A1 9/2017 Sethuraman et al.
2017/0280494 A1 9/2017 Jung et al.
2017/0285764 A1 10/2017 Kim et al.
2017/0309174 A1 10/2017 Gonzales et al.
2017/0324784 A1 11/2017 Taine et al.
2017/0336960 A1 11/2017 Chaudhri et al.
2017/0344253 A1 11/2017 Zhang
2017/0353508 A1 12/2017 Yoakum
2017/0357382 A1 12/2017 Miura et al.
2017/0357425 A1 12/2017 Smith et al.
2017/0357434 A1 12/2017 Coffman et al.
2017/0357917 A1 12/2017 Holmes et al.
2017/0359191 A1 12/2017 Smith et al.
2017/0359285 A1 12/2017 Weinig et al.
2017/0367484 A1 12/2017 Salvoni et al.
2017/0371496 A1 12/2017 Denoue et al.
2017/0373868 A1 12/2017 Deets, Jr.
2018/0007449 A1 1/2018 Carlson et al.
2018/0013799 A1 1/2018 Davies
2018/0020530 A1 1/2018 Scordato et al.
2018/0047200 A1 2/2018 O'hara et al.
2018/0048820 A1 2/2018 Hinkel et al.
2018/0061158 A1 3/2018 Greene
2018/0063603 A1 3/2018 Tang et al.
2018/0070144 A1 3/2018 Tang et al.
2018/0081522 A1 3/2018 Greenberg et al.
2018/0091732 A1 3/2018 Wilson et al.
2018/0095616 A1 4/2018 Valdivia et al.
2018/0095634 A1 4/2018 Alexander
2018/0095636 A1 4/2018 Valdivia et al.
2018/0101297 A1 4/2018 Yang et al.
2018/0103074 A1 4/2018 Rosenberg
2018/0121074 A1 5/2018 Peron et al.
2018/0122378 A1 5/2018 Mixter et al.
2018/0123986 A1 5/2018 Faulkner et al.
2018/0124128 A1 5/2018 Faulkner et al.
2018/0124359 A1 5/2018 Faulkner
2018/0131732 A1 5/2018 Aronoff et al.
2018/0131907 A1 5/2018 Schmirler et al.
2018/0139374 A1 5/2018 Yu
2018/0144590 A1 5/2018 Mixter et al.
2018/0150433 A1 5/2018 Sowden et al.
2018/0157333 A1 6/2018 Ross et al.
2018/0157455 A1 6/2018 Troy et al.
2018/0157901 A1 6/2018 Arbatman et al.
2018/0160072 A1 6/2018 Cranfill et al.
2018/0165002 A1 6/2018 Yang et al.
2018/0165862 A1 6/2018 Sawaki
2018/0183849 A1 6/2018 Shin et al.
2018/0189549 A1 7/2018 Inomata
2018/0191965 A1 7/2018 Faulkner et al.
2018/0199164 A1 7/2018 Bargetzi et al.
2018/0203577 A1 7/2018 Astavans et al.
2018/0204111 A1 7/2018 Zadeh et al.
2018/0205797 A1 7/2018 Faulkner
2018/0213144 A1 7/2018 Kim et al.
2018/0213396 A1 7/2018 Segal et al.
2018/0225263 A1 8/2018 Zhong et al.
2018/0227341 A1 8/2018 Rizzi
2018/0228003 A1 8/2018 O'Driscoll et al.
2018/0228006 A1 8/2018 Baker et al.
2018/0249047 A1 8/2018 Marlatt
2018/0253152 A1 9/2018 Forsblom et al.
2018/0267774 A1 9/2018 Williams et al.
2018/0286395 A1 10/2018 Li et al.
2018/0288104 A1 10/2018 Padilla et al.
2018/0293959 A1 10/2018 Monga et al.
2018/0295079 A1 10/2018 Longo
2018/0308480 A1 10/2018 Jang et al.
2018/0309801 A1 10/2018 Rathod

(56) References Cited

U.S. PATENT DOCUMENTS

2018/0332559 A1 11/2018 Gudivada et al.
2018/0335927 A1 11/2018 Anzures et al.
2018/0335929 A1 11/2018 Scapel et al.
2018/0335930 A1 11/2018 Scapel et al.
2018/0336715 A1 11/2018 Rickwald et al.
2018/0338038 A1 11/2018 Ly et al.
2018/0341448 A1 11/2018 Behzadi et al.
2018/0348764 A1 12/2018 Zhang et al.
2018/0359293 A1 12/2018 Faulkner et al.
2018/0364665 A1 12/2018 Clymer et al.
2018/0367483 A1 12/2018 Rodriguez et al.
2018/0367484 A1 12/2018 Rodriguez et al.
2018/0375676 A1 12/2018 Bader-Natal et al.
2019/0005419 A1 1/2019 Howard
2019/0018586 A1 1/2019 Yang et al.
2019/0025943 A1 1/2019 Jobs et al.
2019/0028419 A1 1/2019 Sullivan
2019/0034849 A1 1/2019 Romaine et al.
2019/0037173 A1 1/2019 Lee et al.
2019/0065027 A1 2/2019 Hauenstein et al.
2019/0068670 A1 2/2019 Adam et al.
2019/0102049 A1 4/2019 Anzures et al.
2019/0102145 A1 4/2019 Wilberding et al.
2019/0110087 A1 4/2019 Parasseeri et al.
2019/0124021 A1 4/2019 Demattei
2019/0138951 A1 5/2019 Brownhill et al.
2019/0149768 A1 5/2019 Mcardle
2019/0149887 A1 5/2019 Williams et al.
2019/0173939 A1 6/2019 Lewis et al.
2019/0199963 A1 6/2019 Ahn et al.
2019/0199993 A1 6/2019 Babu J D et al.
2019/0205861 A1 7/2019 Bace
2019/0215503 A1 7/2019 Monson et al.
2019/0222775 A1 7/2019 Ahn
2019/0228495 A1 7/2019 Tremblay et al.
2019/0236142 A1 8/2019 Balakrishnan et al.
2019/0246238 A1 8/2019 Crutchfield et al.
2019/0279634 A1 9/2019 Tak et al.
2019/0297039 A1 9/2019 Rodriguez et al.
2019/0303861 A1 10/2019 Mathias et al.
2019/0332400 A1 10/2019 Spoor et al.
2019/0339769 A1 11/2019 Cox et al.
2019/0339825 A1 11/2019 Anzures et al.
2019/0342449 A1 11/2019 Rauenbuehler et al.
2019/0342507 A1 11/2019 Dye et al.
2019/0342519 A1 11/2019 Van Os et al.
2019/0342621 A1 11/2019 Carrigan et al.
2019/0347181 A1 11/2019 Cranfill et al.
2019/0354252 A1 11/2019 Badr
2019/0361575 A1 11/2019 Ni et al.
2019/0361694 A1 11/2019 Gordon et al.
2019/0362555 A1 11/2019 Chen et al.
2019/0369862 A1 12/2019 De Vries
2019/0370805 A1 12/2019 Van Os et al.
2020/0004401 A1 1/2020 Hwang et al.
2020/0005539 A1 1/2020 Hwang et al.
2020/0034033 A1 1/2020 Chaudhri et al.
2020/0045245 A1* 2/2020 Van Os ................ H04N 23/611
2020/0050502 A1 2/2020 Ghafourifar et al.
2020/0055515 A1 2/2020 Herman et al.
2020/0059628 A1 2/2020 Cranfill et al.
2020/0074711 A1 3/2020 Barlier et al.
2020/0106952 A1 4/2020 Missig et al.
2020/0106965 A1 4/2020 Malia et al.
2020/0112690 A1 4/2020 Harrison et al.
2020/0127988 A1 4/2020 Bradley et al.
2020/0135191 A1 4/2020 Nourbakhsh
2020/0142667 A1 5/2020 Querze et al.
2020/0143593 A1 5/2020 Rudman et al.
2020/0152186 A1 5/2020 Koh et al.
2020/0183548 A1 6/2020 Anzures et al.
2020/0186375 A1 6/2020 Faulkner
2020/0186378 A1 6/2020 Six et al.
2020/0186576 A1 6/2020 Gopal et al.
2020/0195887 A1 6/2020 Van Os et al.
2020/0213530 A1 7/2020 Ahn
2020/0226896 A1 7/2020 Robertson et al.
2020/0242788 A1 7/2020 Jacobs et al.
2020/0274726 A1 8/2020 Setteboun et al.
2020/0279279 A1 9/2020 Chaudhuri
2020/0296329 A1 9/2020 Tang et al.
2020/0302669 A1 9/2020 Barlier et al.
2020/0302913 A1 9/2020 Marcinkiewicz
2020/0312318 A1 10/2020 Olson et al.
2020/0335187 A1 10/2020 Lefkofsky et al.
2020/0371673 A1 11/2020 Faulkner
2020/0383157 A1 12/2020 Lee et al.
2020/0385116 A1 12/2020 Sabripour et al.
2020/0395012 A1 12/2020 Kim et al.
2020/0400957 A1 12/2020 Van Heugten
2021/0043189 A1 2/2021 Pyun
2021/0064317 A1 3/2021 Juenger et al.
2021/0065134 A1 3/2021 Chhabra et al.
2021/0096703 A1 4/2021 Anzures et al.
2021/0097768 A1 4/2021 Malia et al.
2021/0099829 A1 4/2021 Soto et al.
2021/0136129 A1 5/2021 Ponnusamy et al.
2021/0144336 A1 5/2021 Van Os et al.
2021/0152503 A1 5/2021 Rodriguez et al.
2021/0158622 A1 5/2021 Leelaphattarakij et al.
2021/0158830 A1 5/2021 Boehlke
2021/0176204 A1 6/2021 Geppert et al.
2021/0182169 A1 6/2021 Mardente et al.
2021/0195084 A1 6/2021 Olajos et al.
2021/0203878 A1 7/2021 Lee et al.
2021/0217106 A1 7/2021 Hauser et al.
2021/0233325 A1 7/2021 Kawakami et al.
2021/0255826 A1 8/2021 Devine et al.
2021/0264656 A1 8/2021 Barlier et al.
2021/0265032 A1 8/2021 Burgess et al.
2021/0266274 A1 8/2021 Liu et al.
2021/0306288 A1 9/2021 Boyd et al.
2021/0321197 A1 10/2021 Annamraju
2021/0323406 A1 10/2021 So et al.
2021/0333864 A1 10/2021 Harvey et al.
2021/0349680 A1 11/2021 Kim et al.
2021/0352172 A1 11/2021 Kim et al.
2021/0360192 A1 11/2021 Cranfill et al.
2021/0360199 A1 11/2021 Oz et al.
2021/0373672 A1* 12/2021 Schwarz ................. G06F 3/017
2021/0409359 A1 12/2021 Eirinberg et al.
2022/0004356 A1 1/2022 Kim et al.
2022/0006946 A1 1/2022 Missig et al.
2022/0014715 A1 1/2022 Tamura et al.
2022/0021680 A1 1/2022 Roedel et al.
2022/0046186 A1 2/2022 Fayad et al.
2022/0046222 A1 2/2022 Meier
2022/0050578 A1 2/2022 Waldman et al.
2022/0053142 A1 2/2022 Manzari et al.
2022/0086203 A1 3/2022 Morris et al.
2022/0100362 A1 3/2022 Kim
2022/0103784 A1 3/2022 Pollefeys
2022/0122089 A1 4/2022 Bonilla Kuhlmann et al.
2022/0141259 A1 5/2022 Copley et al.
2022/0166918 A1 5/2022 Burger
2022/0180862 A1 6/2022 Sharifi et al.
2022/0199267 A1 6/2022 Subramanian et al.
2022/0201052 A1 6/2022 Fitzpatrick et al.
2022/0244836 A1 8/2022 O'leary et al.
2022/0247587 A1 8/2022 Rolin et al.
2022/0247918 A1 8/2022 O'leary et al.
2022/0247919 A1 8/2022 O'leary et al.
2022/0253136 A1 8/2022 Holder et al.
2022/0253195 A1 8/2022 Stevens et al.
2022/0254074 A1 8/2022 Berliner et al.
2022/0269882 A1 8/2022 Proschowsky et al.
2022/0278992 A1 9/2022 Baker et al.
2022/0286314 A1 9/2022 Meyer et al.
2022/0303150 A1 9/2022 Jensen et al.
2022/0343569 A1* 10/2022 Karri ..................... G06F 40/129
2022/0365643 A1 11/2022 Triverio et al.
2022/0365739 A1 11/2022 Chang et al.
2022/0365740 A1 11/2022 Chang et al.
2022/0368548 A1 11/2022 Chang et al.

(56) References Cited

U.S. PATENT DOCUMENTS

2022/0368659 A1 11/2022 Chang et al.
2022/0368742 A1 11/2022 Chang et al.
2022/0374136 A1 11/2022 Chang et al.
2022/0375358 A1 11/2022 Shimomura et al.
2023/0004264 A1 1/2023 Anzures et al.
2023/0041125 A1 2/2023 Kim et al.
2023/0086248 A1 3/2023 Puyol et al.
2023/0090342 A1 3/2023 Barlier et al.
2023/0092103 A1 3/2023 Puyol et al.
2023/0094453 A1 3/2023 O'leary et al.
2023/0098395 A1 3/2023 O'leary et al.
2023/0109787 A1 4/2023 O'leary et al.
2023/0143275 A1 5/2023 Opara et al.
2023/0188674 A1 6/2023 Van Os et al.
2023/0213764 A1 7/2023 Arngren et al.
2023/0236723 A1 7/2023 Yang et al.
2023/0246857 A1 8/2023 Boucheron et al.
2023/0262196 A1 8/2023 Cranfill et al.
2023/0262317 A1 8/2023 O'leary et al.
2023/0319413 A1 10/2023 Manzari et al.
2023/0333803 A1 10/2023 Su
2023/0370507 A1 11/2023 Chang et al.
2023/0386145 A1 11/2023 Faulkner
2023/0388357 A1 11/2023 Faulkner et al.
2024/0036804 A1 2/2024 Chang et al.
2024/0048600 A1 2/2024 Yerli
2024/0064270 A1 2/2024 Van Os et al.
2024/0064395 A1 2/2024 O'leary et al.
2024/0103677 A1 3/2024 Mckenzie et al.
2024/0104819 A1 3/2024 Chand et al.
2024/0118793 A1 4/2024 Triverio et al.
2024/0259669 A1 8/2024 Missig et al.
2024/0377922 A1 11/2024 Rajam et al.
2025/0039011 A1 1/2025 Meyer et al.
2025/0138697 A1 5/2025 Smith et al.
2025/0165123 A1 5/2025 Anzures et al.
2025/0202961 A1 6/2025 Triverio et al.
2025/0224859 A1 7/2025 Kim et al.
2025/0294237 A1 9/2025 Manzari et al.
2025/0330554 A1 10/2025 Cranfill et al.
2026/0011065 A1 1/2026 Scapel et al.
2026/0037114 A1 2/2026 Chang et al.
2026/0119110 A1 4/2026 Chang et al.
2026/0122355 A1 4/2026 Manzari et al.

FOREIGN PATENT DOCUMENTS

CA 2917174 A1 1/2015
CN 1473430 A 2/2004
CN 1689327 A 10/2005
CN 1801926 A 7/2006
CN 1890996 A 1/2007
CN 1985319 A 6/2007
CN 101075173 A 11/2007
CN 101296356 A 10/2008
CN 101431564 A 5/2009
CN 101443727 A 5/2009
CN 101472158 A 7/2009
CN 101566866 A 10/2009
CN 101682622 A 3/2010
CN 101853132 A 10/2010
CN 101854247 A 10/2010
CN 101854261 A 10/2010
CN 101917529 A 12/2010
CN 101930284 A 12/2010
CN 101950236 A 1/2011
CN 102111454 A 6/2011
CN 102111505 A 6/2011
CN 102215217 A 10/2011
CN 102239740 A 11/2011
CN 102317887 A 1/2012
CN 102479388 A 5/2012
CN 102572369 A 7/2012
CN 102651731 A 8/2012
CN 102821180 A 12/2012
CN 102929917 A 2/2013
CN 102999934 A 3/2013
CN 103019681 A 4/2013
CN 103039064 A 4/2013
CN 103049274 A 4/2013
CN 103116902 A 5/2013
CN 103179283 A 6/2013
CN 103222247 A 7/2013
CN 103235688 A 8/2013
CN 103237191 A 8/2013
CN 103384235 A 11/2013
CN 103442774 A 12/2013
CN 103458215 A 12/2013
CN 103649985 A 3/2014
CN 103718152 A 4/2014
CN 103748610 A 4/2014
CN 103886632 A 6/2014
CN 104010158 A 8/2014
CN 104011738 A 8/2014
CN 104035663 A 9/2014
CN 104081335 A 10/2014
CN 104090720 A 10/2014
CN 104115503 A 10/2014
CN 104169855 A 11/2014
CN 104170318 A 11/2014
CN 104170358 A 11/2014
CN 104270597 A 1/2015
CN 104317516 A 1/2015
CN 104331246 A 2/2015
CN 104375741 A 2/2015
CN 104427288 A 3/2015
CN 104469143 A 3/2015
CN 104503689 A 4/2015
CN 104584488 A 4/2015
CN 104602133 A 5/2015
CN 104615430 A 5/2015
CN 104869046 A 8/2015
CN 104980578 A 10/2015
CN 105094957 A 11/2015
CN 105139438 A 12/2015
CN 105141498 A 12/2015
CN 105204846 A 12/2015
CN 105264473 A 1/2016
CN 105308634 A 2/2016
CN 105374055 A 3/2016
CN 105389173 A 3/2016
CN 105391778 A 3/2016
CN 105528805 A 4/2016
CN 105554429 A 5/2016
CN 105578111 A 5/2016
CN 105900376 A 8/2016
CN 106210855 A 12/2016
CN 106303648 A 1/2017
CN 106471793 A 3/2017
CN 106575444 A 4/2017
CN 106664389 A 5/2017
CN 106713946 A 5/2017
CN 106716954 A 5/2017
CN 106843626 A 6/2017
CN 107066523 A 8/2017
CN 107122049 A 9/2017
CN 107491257 A 12/2017
CN 107533417 A 1/2018
CN 107534656 A 1/2018
CN 107704177 A 2/2018
CN 107728876 A 2/2018
CN 104025538 B 4/2018
CN 107992248 A 5/2018
CN 108933965 A 12/2018
CN 109196825 A 1/2019
CN 109891827 A 6/2019
CN 110456971 A 11/2019
CN 111095165 A 5/2020
CN 111108740 A 5/2020
CN 111601065 A 8/2020
CN 111913630 A 11/2020
CN 112088530 A 12/2020
CN 112214275 A 1/2021
CN 112261338 A 1/2021

(56) References Cited

FOREIGN PATENT DOCUMENTS

| | | | |
|---|---|---|---|
| CN | 112416223 | A | 2/2021 |
| EP | 1903791 | A2 | 3/2008 |
| EP | 1986431 | A2 | 10/2008 |
| EP | 2056568 | A1 | 5/2009 |
| EP | 2219105 | A1 | 8/2010 |
| EP | 2237534 | A1 | 10/2010 |
| EP | 2237536 | A1 | 10/2010 |
| EP | 2521080 | A2 | 11/2012 |
| EP | 2600584 | A1 | 6/2013 |
| EP | 2787465 | A1 | 10/2014 |
| EP | 2446619 | B1 | 10/2015 |
| EP | 3038427 | A1 | 6/2016 |
| EP | 2761582 | B1 | 3/2017 |
| EP | 2258103 | B1 | 5/2018 |
| EP | 3163866 | B1 | 5/2020 |
| EP | 4109891 | A1 | 12/2022 |
| IN | 1038/MUM/2005 | A | 6/2007 |
| JP | 6-113297 | A | 4/1994 |
| JP | 6-276335 | A | 9/1994 |
| JP | 6-276515 | A | 9/1994 |
| JP | 6-282405 | A | 10/1994 |
| JP | 7-135594 | A | 5/1995 |
| JP | 8-279998 | A | 10/1996 |
| JP | 9-182046 | A | 7/1997 |
| JP | 9-233384 | A | 9/1997 |
| JP | 9-247655 | A | 9/1997 |
| JP | 9-265457 | A | 10/1997 |
| JP | 2001-67099 | A | 3/2001 |
| JP | 2001-169166 | A | 6/2001 |
| JP | 2002-251365 | A | 9/2002 |
| JP | 2002-320140 | A | 10/2002 |
| JP | 2002-351802 | A | 12/2002 |
| JP | 2003-101981 | A | 4/2003 |
| JP | 2003-134382 | A | 5/2003 |
| JP | 2003-189168 | A | 7/2003 |
| JP | 2003-274376 | A | 9/2003 |
| JP | 2003-299050 | A | 10/2003 |
| JP | 2003-299051 | A | 10/2003 |
| JP | 2003-348444 | A | 12/2003 |
| JP | 2004-101708 | A | 4/2004 |
| JP | 2004-187273 | A | 7/2004 |
| JP | 2004-193860 | A | 7/2004 |
| JP | 2004-221738 | A | 8/2004 |
| JP | 2004-287558 | A | 10/2004 |
| JP | 2005-94696 | A | 4/2005 |
| JP | 2005-159567 | A | 6/2005 |
| JP | 2005-260289 | A | 9/2005 |
| JP | 2005-286445 | A | 10/2005 |
| JP | 2005-303736 | A | 10/2005 |
| JP | 2006-65683 | A | 3/2006 |
| JP | 2006-135495 | A | 5/2006 |
| JP | 2006-166414 | A | 6/2006 |
| JP | 2006-222822 | A | 8/2006 |
| JP | 2006-245732 | A | 9/2006 |
| JP | 2006-246019 | A | 9/2006 |
| JP | 2006-254166 | A | 9/2006 |
| JP | 2006-254350 | A | 9/2006 |
| JP | 2006-319742 | A | 11/2006 |
| JP | 2007-88630 | A | 4/2007 |
| JP | 2007-140060 | A | 6/2007 |
| JP | 2007-150877 | A | 6/2007 |
| JP | 2007-150917 | A | 6/2007 |
| JP | 2007-150921 | A | 6/2007 |
| JP | 2007-200329 | A | 8/2007 |
| JP | 2007-201727 | A | 8/2007 |
| JP | 2007-274034 | A | 10/2007 |
| JP | 2007-282263 | A | 10/2007 |
| JP | 2007-300452 | A | 11/2007 |
| JP | 2008-28586 | A | 2/2008 |
| JP | 2008-99330 | A | 4/2008 |
| JP | 2008-125105 | A | 5/2008 |
| JP | 2008-136119 | A | 6/2008 |
| JP | 2008-533838 | A | 8/2008 |
| JP | 2008-289014 | A | 11/2008 |
| JP | 2009-502048 | A | 1/2009 |
| JP | 2009-159253 | A | 7/2009 |
| JP | 2009-188975 | A | 8/2009 |
| JP | 2009-232290 | A | 10/2009 |
| JP | 2009-265692 | A | 11/2009 |
| JP | 2009-296583 | A | 12/2009 |
| JP | 2010-15239 | A | 1/2010 |
| JP | 2010-206745 | A | 9/2010 |
| JP | 2010-541398 | A | 12/2010 |
| JP | 2011-70623 | A | 4/2011 |
| JP | 2012-244340 | A | 12/2012 |
| JP | 2013-97814 | A | 5/2013 |
| JP | 2013-524683 | A | 6/2013 |
| JP | 2014-71835 | A | 4/2014 |
| JP | 2014-87126 | A | 5/2014 |
| JP | 2014-149856 | A | 8/2014 |
| JP | 2014-170982 | A | 9/2014 |
| JP | 2015-11507 | A | 1/2015 |
| JP | 2015-75915 | A | 4/2015 |
| JP | 2015-170234 | A | 9/2015 |
| JP | 2015-201087 | A | 11/2015 |
| JP | 2016-1446 | A | 1/2016 |
| JP | 2016-24557 | A | 2/2016 |
| JP | 2016-38615 | A | 3/2016 |
| JP | 2016-53929 | A | 4/2016 |
| JP | 2016-157292 | A | 9/2016 |
| JP | 2016-167806 | A | 9/2016 |
| JP | 2016-174282 | A | 9/2016 |
| JP | 2017-532645 | A | 11/2017 |
| JP | 2017-228843 | A | 12/2017 |
| JP | 2017-229060 | A | 12/2017 |
| JP | 2018-7158 | A | 1/2018 |
| JP | 2018-56719 | A | 4/2018 |
| JP | 2018-136828 | A | 8/2018 |
| JP | 2018-200624 | A | 12/2018 |
| JP | 2019-114282 | A | 7/2019 |
| JP | 2020-510929 | A | 4/2020 |
| JP | 2021-40300 | A | 3/2021 |
| JP | 2024-519801 | A | 5/2024 |
| JP | 2024-170463 | A | 12/2024 |
| KR | 1997-0031883 | A | 6/1997 |
| KR | 1999-0044201 | A | 6/1999 |
| KR | 10-2003-0016405 | A | 2/2003 |
| KR | 10-2004-0016688 | A | 2/2004 |
| KR | 10-2004-0045338 | A | 6/2004 |
| KR | 10-2005-0054684 | A | 6/2005 |
| KR | 10-2006-0031959 | A | 4/2006 |
| KR | 10-2006-0064326 | A | 6/2006 |
| KR | 10-2006-0116902 | A | 11/2006 |
| KR | 10-2007-0111270 | A | 11/2007 |
| KR | 10-2008-0096042 | A | 10/2008 |
| KR | 10-2009-0002641 | A | 1/2009 |
| KR | 10-2009-0002699 | A | 1/2009 |
| KR | 10-2009-0004176 | A | 1/2009 |
| KR | 10-2009-0017901 | A | 2/2009 |
| KR | 10-2009-0017906 | A | 2/2009 |
| KR | 10-2009-0036226 | A | 4/2009 |
| KR | 10-2009-0040613 | A | 4/2009 |
| KR | 10-2009-0042499 | A | 4/2009 |
| KR | 10-0891449 | B1 | 4/2009 |
| KR | 10-2009-0122805 | A | 12/2009 |
| KR | 10-2009-0126516 | A | 12/2009 |
| KR | 10-2011-0014224 | A | 2/2011 |
| KR | 10-2011-0063741 | A | 6/2011 |
| KR | 10-2011-0089429 | A | 8/2011 |
| KR | 10-2012-0006610 | A | 1/2012 |
| KR | 10-2012-0018479 | A | 3/2012 |
| KR | 10-2012-0047616 | A | 5/2012 |
| KR | 10-2012-0130627 | A | 12/2012 |
| KR | 10-2013-0032620 | A | 4/2013 |
| KR | 10-2013-0090244 | A | 8/2013 |
| KR | 10-2013-0138150 | A | 12/2013 |
| KR | 10-2014-0039737 | A | 4/2014 |
| KR | 10-2016-0092820 | A | 8/2016 |
| KR | 10-2017-0012384 | A | 2/2017 |
| KR | 10-2017-0128498 | A | 11/2017 |
| KR | 10-2018-0085931 | A | 7/2018 |
| KR | 10-2019-0033082 | A | 3/2019 |

(56) References Cited

FOREIGN PATENT DOCUMENTS

| | | | |
|---|---|---|---|
| KR | 10-1989433 | B1 | 6/2019 |
| KR | 10-2020-0039030 | A | 4/2020 |
| TV | I321955 | B | 3/2010 |
| TW | I321955 | B | 3/2010 |
| WO | 01/18665 | A1 | 3/2001 |
| WO | 01/27783 | A1 | 4/2001 |
| WO | 02/37848 | A1 | 5/2002 |
| WO | 02/093344 | A1 | 11/2002 |
| WO | 2003/077553 | A1 | 9/2003 |
| WO | 2004/032507 | A1 | 4/2004 |
| WO | 2005/060501 | A2 | 7/2005 |
| WO | 2005/086159 | A2 | 9/2005 |
| WO | 2006/063343 | A2 | 6/2006 |
| WO | 2007/008321 | A2 | 1/2007 |
| WO | 2007/063922 | A1 | 6/2007 |
| WO | 2008/040566 | A1 | 4/2008 |
| WO | 2009/005914 | A1 | 1/2009 |
| WO | 2009/012820 | A1 | 1/2009 |
| WO | 2009/042579 | A1 | 4/2009 |
| WO | 2010/001672 | A1 | 1/2010 |
| WO | 2010/037956 | A1 | 4/2010 |
| WO | 2010/059306 | A2 | 5/2010 |
| WO | 2010/065752 | A2 | 6/2010 |
| WO | 2010/065752 | A3 | 9/2010 |
| WO | 2010/137513 | A1 | 12/2010 |
| WO | 2011/126505 | A1 | 10/2011 |
| WO | 2011/146605 | A1 | 11/2011 |
| WO | 2011/146839 | A1 | 11/2011 |
| WO | 2011/161145 | A1 | 12/2011 |
| WO | 2012/037170 | A1 | 3/2012 |
| WO | 2012/170118 | A1 | 12/2012 |
| WO | 2012/170446 | A2 | 12/2012 |
| WO | 2012/172164 | A1 | 12/2012 |
| WO | 2013/097139 | A1 | 7/2013 |
| WO | 2013/097264 | A1 | 7/2013 |
| WO | 2013/114821 | A1 | 8/2013 |
| WO | 2013/152453 | A1 | 10/2013 |
| WO | 2013/152454 | A1 | 10/2013 |
| WO | 2014/004524 | A2 | 1/2014 |
| WO | 2014/052871 | A1 | 4/2014 |
| WO | 2014/058937 | A1 | 4/2014 |
| WO | 2014/077987 | A1 | 5/2014 |
| WO | 2014/094199 | A1 | 6/2014 |
| WO | 2014/101527 | A1 | 7/2014 |
| WO | 2014/160327 | A1 | 10/2014 |
| WO | 2014/168616 | A1 | 10/2014 |
| WO | 2014/200730 | A1 | 12/2014 |
| WO | 2015/065928 | A1 | 5/2015 |
| WO | 2015/167590 | A1 | 11/2015 |
| WO | 2016/026402 | A2 | 2/2016 |
| WO | 2016/040535 | A1 | 3/2016 |
| WO | 2016/046589 | A1 | 3/2016 |
| WO | 2016/101132 | A1 | 6/2016 |
| WO | 2016/168154 | A1 | 10/2016 |
| WO | 2017/013936 | A1 | 1/2017 |
| WO | 2017/015949 | A1 | 2/2017 |
| WO | 2017/038261 | A1 | 3/2017 |
| WO | 2017/218143 | A1 | 12/2017 |
| WO | 2017/218153 | A1 | 12/2017 |
| WO | 2018/057272 | A1 | 3/2018 |
| WO | 2018/081023 | A1 | 5/2018 |
| WO | 2018/213401 | A1 | 11/2018 |
| WO | 2018/213415 | A1 | 11/2018 |
| WO | 2018/213844 | A1 | 11/2018 |
| WO | 2018/232333 | A1 | 12/2018 |
| WO | 2019/067131 | A1 | 4/2019 |
| WO | 2019/217009 | A1 | 11/2019 |
| WO | 2019/217477 | A1 | 11/2019 |
| WO | 2020/227386 | A2 | 11/2020 |
| WO | 2020/227386 | A3 | 1/2021 |
| WO | 2020/227386 | A4 | 3/2021 |
| WO | 2021/112983 | A1 | 6/2021 |
| WO | 2022/245665 | A1 | 11/2022 |
| WO | 2022/245666 | A1 | 11/2022 |

OTHER PUBLICATIONS

Advisory Action received for U.S. Appl. No. 15/725,868, mailed on Dec. 10, 2018, 5 pages.

Advisory Action received for U.S. Appl. No. 16/666,073, mailed on Jul. 7, 2020, 5 pages.

Advisory Action received for U.S. Appl. No. 17/950,868, mailed on Sep. 24, 2024, 3 pages.

Applicant-Initiated Interview Summary received for U.S. Appl. No. 14/263,889, mailed on Apr. 15, 2016, 3 pages.

Applicant-Initiated Interview Summary received for U.S. Appl. No. 15/725,868, mailed on Jul. 25, 2018, 3 pages.

Applicant-Initiated Interview Summary received for U.S. Appl. No. 15/725,868, mailed on May 13, 2019.

Applicant-Initiated Interview Summary received for U.S. Appl. No. 15/725,868, mailed on Nov. 20, 2018, 3 pages.

Applicant-Initiated Interview Summary received for U.S. Appl. No. 17/970,417, mailed on Nov. 4, 2024, 2 pages.

Applicant-Initiated Interview Summary received for U.S. Appl. No. 18/140,449, mailed on Aug. 27, 2024, 2 pages.

Applicant-Initiated Interview Summary received for U.S. Appl. No. 18/389,655, mailed on Sep. 20, 2024, 6 pages.

Baudisch et al., "Back-of-device interaction allows creating very small touch devices", Chi 2009—Digital Life, New World:Conference Proceedings And Extended Abstracts; The 27th Annual Chi Conference On Human Factors In Computing Systems. Available online at <http://dx.doi.org/10.1145/1518701.1518995>, Apr. 9, 2009, pp. 1923-1932.

Corrected Notice of Allowance received for U.S. Appl. No. 15/725,868, mailed on Aug. 23, 2019, 2 pages.

Corrected Notice of Allowance received for U.S. Appl. No. 15/725,868, mailed on Sep. 30, 2019, 3 pages.

Corrected Notice of Allowance received for U.S. Appl. No. 16/666,073, mailed on Apr. 6, 2021, 3 pages.

Corrected Notice of Allowance received for U.S. Appl. No. 16/666,073, mailed on Apr. 26, 2021, 4 pages.

Corrected Notice of Allowance received for U.S. Appl. No. 16/666,073, mailed on Feb. 22, 2021, 3 pages.

Corrected Notice of Allowance received for U.S. Appl. No. 16/666,073, mailed on Mar. 11, 2021, 3 pages.

Corrected Notice of Allowance received for U.S. Appl. No. 17/684,843, mailed on Oct. 7, 2024, 2 pages.

Decision on Appeal received for Korean Patent Application No. 10-2020-7034959, mailed on Jul. 25, 2022, 28 pages (5 pages of English Translation and 23 pages of Official Copy).

Decision to Grant received for European Patent Application No. 10763539.3, mailed on Jul. 19, 2018, 3 pages.

Decision to Grant received for European Patent Application No. 18188433.9, mailed on Aug. 13, 2020, 3 pages.

Decision to Refuse received for Japanese Patent Application No. 2013-503731, mailed on Jun. 23, 2014, 4 pages (2 pages of English Translation and 2 pages of Official Copy).

Examiner's Pre-Review Report received for Japanese Patent Application No. 2014-212867, mailed on Nov. 4, 2016, 5 pages (2 pages of English Translation and 3 pages of Official Copy).

Extended European Search Report received for European Patent Application No. 18188433.9, mailed on Oct. 29, 2018, 8 pages.

Final Office Action received for U.S. Appl. No. 12/794,766, mailed on Nov. 26, 2012, 23 pages.

Final Office Action received for U.S. Appl. No. 14/263,889, mailed on Jan. 4, 2016, 9 pages.

Final Office Action received for U.S. Appl. No. 15/725,868, mailed on Sep. 27, 2018, 25 pages.

Final Office Action received for U.S. Appl. No. 16/666,073, mailed on Apr. 17, 2020, 18 pages.

Final Office Action received for U.S. Appl. No. 17/332,829, mailed on Feb. 6, 2023, 19 pages.

Final Office Action received for U.S. Appl. No. 18/067,350, mailed on Oct. 31, 2024, 44 pages.

Final Office Action received for U.S. Appl. No. 18/138,348, mailed on Oct. 18, 2024, 10 pages.

Final Office Action received for U.S. Appl. No. 18/140,449, mailed on Oct. 18, 2024, 11 pages.

(56) References Cited

OTHER PUBLICATIONS

Intention to Grant received for European Patent Application No. 10763539.3, mailed on Mar. 15, 2018, 6 pages.
Intention to Grant received for European Patent Application No. 18188433.9, mailed on Apr. 6, 2020, 9 pages.
Intention to Grant received for European Patent Application No. 22734711.9, mailed on Sep. 13, 2024, 7 pages.
International Preliminary Report on Patentability received for PCT Patent Application No. PCT/US2010/050311, mailed on Oct. 18, 2012, 11 pages.
International Preliminary Report on Patentability received for PCT Patent Application No. PCT/US2023/017280, mailed on Oct. 17, 2024, 15 pages.
International Search Report and Written Opinion received for PCT Patent Application No. PCT/US2010/050311, mailed on Aug. 24, 2011, 15 pages.
Invitation to Pay Additional Fees and Partial International Search Report received for PCT Patent Application No. PCT/US2010/050311, mailed on Dec. 21, 2010, 6 pages.
Koyama, Kaori, "Mac Fan Macintosh Master Book Mac OS X v10.4 "Tiger" & iLife", '06 version, Mainichi Communications Inc. Nobuyuki Nakagawa. Jul. 9, 2007. 4 pages (Official Copy Only) {See Communication under Rule 37 CFR § 1.98(a) (3)}.
Non-Final Office Action received for U.S. Appl. No. 12/794,766, mailed on Aug. 5, 2013, 9 pages.
Non-Final Office Action received for U.S. Appl. No. 12/794,766, mailed on Jun. 25, 2012, 18 pages.
Non-Final Office Action received for U.S. Appl. No. 12/794,768, mailed on Oct. 10, 2012, 14 pages.
Non-Final Office Action received for U.S. Appl. No. 14/263,889, mailed on Jul. 2, 2015, 9 pages.
Non-Final Office Action received for U.S. Appl. No. 14/263,889, mailed on Jul. 26, 2016, 11 pages.
Non-Final Office Action received for U.S. Appl. No. 15/725,868, mailed on Apr. 27, 2018, 17 pages.
Non-Final Office Action received for U.S. Appl. No. 15/725,868, mailed on Feb. 12, 2019, 26 pages.
Non-Final Office Action received for U.S. Appl. No. 16/666,073, mailed on Dec. 10, 2019, 16 pages.
Non-Final Office Action received for U.S. Appl. No. 17/332,829, mailed on Aug. 1, 2022, 17 pages.
Non-Final Office Action received for U.S. Appl. No. 18/140,449, mailed on May 24, 2024, 19 pages.
Notice of Acceptance received for Australian Patent Application No. 2010350749, mailed on Jan. 13, 2015, 3 pages.
Notice of Acceptance received for Australian Patent Application No. 2015201127, mailed on Feb. 14, 2017, 3 pages.
Notice of Allowance received for Brazilian Patent Application No. BR112012025746-3, mailed on Jul. 6, 2021, 3 pages (1 page of English Translation and 2 pages of Official Copy).
Notice of Allowance received for Chinese Patent Application No. 201010602653.9, mailed on Nov. 15, 2014, 2 pages (1 page of English Translation and 1 page of Official Copy).
Notice of Allowance received for Chinese Patent Application No. 2010106600623.4, mailed on Aug. 11, 2014, 4 pages (1 page of English Translation and 3 pages of Official Copy).
Notice of Allowance received for Chinese Patent Application No. 201410575145.4, mailed on May 10, 2018, 3 pages (1 page of English Translation and 2 pages of Official Copy).
Notice of Allowance received for Chinese Patent Application No. 201910704856.X, mailed on Sep. 30, 2024, 4 pages (1 page of English Translation and 3 pages of Official Copy).
Notice of Allowance received for Japanese Patent Application No. 2014-212867, mailed on Mar. 30, 2018, 3 pages (1 page of English Translation and 2 pages of Official Copy).
Notice of Allowance received for Japanese Patent Application No. 2016-151497, mailed on Jun. 4, 2018, 4 pages (1 page of English Translation and 3 pages of Official Copy).
Notice of Allowance received for Japanese Patent Application No. 2019-182484, mailed on Aug. 30, 2021, 4 pages (1 page of English Translation and 3 pages of Official Copy).
Notice of Allowance received for Japanese Patent Application No. 2021-154573, mailed on Nov. 11, 2022, 4 pages (1 page of English Translation and 3 pages of Official Copy).
Notice of Allowance received for Japanese Patent Application No. 2022-197327, mailed on May 31, 2024, 4 pages (1 page of English Translation and 3 pages of Official Copy).
Notice of Allowance received for Korean Patent Application No. 10-2012-7028535, mailed on Jul. 16, 2014, 5 pages (1 page of English Translation and 4 pages of Official Copy).
Notice of Allowance received for Korean Patent Application No. 10-2014-7005164, mailed on Dec. 21, 2014, 4 pages (1 page of English Translation and 3 pages of Official Copy).
Notice of Allowance received for Korean Patent Application No. 10-2014-7029838, mailed on Jul. 28, 2015, 4 pages (1 page of English Translation and 3 pages of Official Copy).
Notice of Allowance received for Korean Patent Application No. 10-2015-7007050, mailed on Feb. 26, 2016, 4 pages (1 page of English Translation and 3 pages of Official Copy).
Notice of Allowance received for Korean Patent Application No. 10-2016-7014580, mailed on Dec. 17, 2019, 6 pages (2 pages of English Translation and 4 pages of Official Copy).
Notice of Allowance received for Korean Patent Application No. 10-2018-7036975, mailed on Sep. 18, 2019, 6 pages (2 pages of English Translation and 4 pages of Official Copy).
Notice of Allowance received for Korean Patent Application No. 10-2020-7002845, mailed on Sep. 24, 2020, 5 pages (1 page of English Translation and 4 pages of Official Copy).
Notice of Allowance received for Korean Patent Application No. 10-2023-7005442, mailed on Jan. 22, 2024, 8 pages (2 pages of English Translation and 6 pages of Official Copy).
Notice of Allowance received for Korean Patent Application No. 10-2023-7018775, mailed on Sep. 30, 2024, 7 pages (2 pages of English Translation and 5 pages of Official Copy).
Notice of Allowance received for Korean Patent Application No. 10-2023-7040599, mailed on Oct. 18, 2024, 7 pages (2 pages of English Translation and 5 pages of Official Copy).
Notice of Allowance received for Mexican Patent Application No. MX/a/2012/011623, mailed on Jan. 16, 2014, 2 pages (1 page of English Translation and 1 page of Official Copy).
Notice of Allowance received for Mexican Patent Application No. MX/a/2014/004295, mailed on May 21, 2015, 2 pages (1 page of English Translation and 1 page of Official Copy).
Notice of Allowance received for Mexican Patent Application No. MX/a/2015/010523, mailed on May 25, 2016, 2 pages (1 page of English Translation and 1 page of Official Copy).
Notice of Allowance received for Mexican Patent Application No. MX/a/2016/012174, mailed on Jan. 17, 2020, 3 pages (1 page of English Translation and 2 pages of Official Copy).
Notice of Allowance received for Mexican Patent Application No. MX/a/2020/003290, mailed on Feb. 9, 2023, 4 pages (1 page of English Translation and 3 pages of Official Copy).
Notice of Allowance received for Taiwanese Patent Application No. 099132253, mailed on Apr. 27, 2016, 3 pages (1 page of English Translation and 2 pages of Official Copy).
Notice of Allowance received for Taiwanese Patent Application No. 099132254, mailed on Feb. 18, 2014, 3 pages (1 page of English Translation and 2 pages of Official Copy).
Notice of Allowance received for U.S. Appl. No. 12/794,766, mailed on Jan. 17, 2014, 6 pages.
Notice of Allowance received for U.S. Appl. No. 12/794,768, mailed on Mar. 22, 2013, 6 pages.
Notice of Allowance received for U.S. Appl. No. 14/263,889, mailed on Feb. 1, 2017, 10 pages.
Notice of Allowance received for U.S. Appl. No. 14/263,889, mailed on Jun. 16, 2017, 6 pages.
Notice of Allowance received for U.S. Appl. No. 15/725,868, mailed on Jun. 12, 2019, 9 pages.
Notice of Allowance received for U.S. Appl. No. 16/666,073, mailed on Jan. 21, 2021, 11 pages.

(56) References Cited

OTHER PUBLICATIONS

Notice of Allowance received for U.S. Appl. No. 17/950,868, mailed on Oct. 23, 2024, 10 pages.
Office Action received for Australian Patent Application No. 2010350749, mailed on Oct. 16, 2013, 3 pages.
Office Action received for Australian Patent Application No. 2015201127, mailed on Mar. 21, 2016, 3 pages.
Office Action received for Brazilian Patent Application No. BR112012025746-3, mailed on Jun. 2, 2020, 7 pages (4 pages of English Translation and 3 pages of Official Copy).
Office Action received for Chinese Patent Application No. 201010602653.9, mailed on Apr. 1, 2013, 21 pages (13 pages of English Translation and 8 pages of Official Copy).
Office Action received for Chinese Patent Application No. 201010602653.9, mailed on Dec. 9, 2013, 10 pages (6 pages of English Translation and 4 pages of Official Copy).
Office Action received for Chinese Patent Application No. 201010602653.9, mailed on May 15, 2014, 6 pages (3 pages of English Translation and 3 pages of Official Copy).
Office Action received for Chinese Patent Application No. 2010106600623.4, mailed on Apr. 28, 2014, 7 pages (4 pages of English Translation and 3 pages of Official Copy).
Office Action received for Chinese Patent Application No. 2010106600623.4, mailed on Jan. 24, 2014, 7 pages (4 pages of English Translation and 3 pages of Official Copy).
Office Action received for Chinese Patent Application No. 2010106600623.4, mailed on May 2, 2013, 27 pages (15 pages of English Translation and 12 pages of Official Copy).
Office Action received for Chinese Patent Application No. 201410575145.4, mailed on Feb. 13, 2017, 18 pages (11 pages of English Translation and 7 pages of Official Copy).
Office Action received for Chinese Patent Application No. 201410575145.4, mailed on Nov. 30, 2017, 17 pages (11 pages of English Translation and 6 pages of Official Copy).
Office Action received for Chinese Patent Application No. 202311753064.4, mailed on Aug. 23, 2024, 18 pages (11 pages of English Translation and 7 pages of Official Copy).
Office Action received for Chinese Patent Application No. 202311831154.0, mailed on Aug. 30, 2024, 13 pages (7 pages of English Translation and 6 pages of Official Copy).
Office Action received for Chinese Patent Application No. 202311835200.4, mailed on Aug. 29, 2024, 16 pages (7 pages of English Translation and 9 pages of Official Copy).
Office Action received for European Patent Application No. 10763539.3, mailed on Jun. 13, 2016, 5 pages.
Office Action received for European Patent Application No. 22705232.1, mailed on Sep. 26, 2024, 8 pages.
Office Action received for European Patent Application No. 2273778.9, mailed on Oct. 22, 2024, 6 pages.
Office Action received for European Patent Application No. 22792995.7, mailed on Oct. 15, 2024, 8 pages.
Office Action received for Japanese Patent Application No. 2013-503731, mailed on Mar. 3, 2014, 8 pages (2 pages of English Translation and 6 pages of Official Copy).
Office Action received for Japanese Patent Application No. 2013-503731, mailed on Sep. 24, 2013, 3 pages (1 page of English Translation and 2 pages of Official Copy).
Office Action received for Japanese Patent Application No. 2014-212867, mailed on Aug. 18, 2017, 4 pages (1 page of English Translation and 3 pages of Official Copy).
Office Action received for Japanese Patent Application No. 2014-212867, mailed on Jun. 29, 2015, 8 pages (4 pages of English Translation and 4 pages of Official Copy).
Office Action received for Japanese Patent Application No. 2016-151497, mailed on Sep. 25, 2017, 7 pages (2 pages of English Translation and 5 pages of Official Copy).
Office Action received for Japanese Patent Application No. 2018-127760, mailed on Feb. 22, 2019, 10 pages (5 pages of English Translation and 5 pages of Official Copy).
Office Action received for Japanese Patent Application No. 2018-127760, mailed on Jul. 5, 2019, 4 pages (1 page of English Translation and 3 pages of Official Copy).
Office Action received for Japanese Patent Application No. 2019-182484, mailed on Dec. 4, 2020, 6 pages (1 page of English Translation and 5 pages of Official Copy).
Office Action received for Japanese Patent Application No. 2022-197327, mailed on Mar. 1, 2024, 14 pages (7 pages of English Translation and 7 pages of Official Copy).
Office Action received for Japanese Patent Application No. 2023-572748, mailed on Jul. 29, 2024, 4 pages (2 pages of English Translation and 2 pages of Official Copy).
Office Action received for Korean Patent Application No. 10-2012-7028535, mailed on Nov. 26, 2013, 10 pages (4 pages of English Translation and 6 pages of Official Copy).
Office Action received for Korean Patent Application No. 10-2014-7005164, mailed on May 23, 2014, 15 pages (6 pages of English Translation and 9 pages of Official Copy).
Office Action received for Korean Patent Application No. 10-2014-7029838, mailed on Dec. 20, 2014, 13 pages (5 pages of English Translation and 8 pages of Official Copy).
Office Action received for Korean Patent Application No. 10-2015-7007050, mailed on Apr. 16, 2015, 14 pages (6 pages of English Translation and 8 pages of Official Copy).
Office Action received for Korean Patent Application No. 10-2015-7007050, mailed on Oct. 23, 2015, 7 pages (3 pages of English Translation and 4 pages of Official Copy).
Office Action received for Korean Patent Application No. 10-2016-7014580, mailed on Jan. 30, 2018, 10 pages (4 pages of English Translation and 6 pages of Official Copy).
Office Action received for Korean Patent Application No. 10-2016-7014580, mailed on Jul. 30, 2018, 7 pages (3 pages of English Translation and 4 pages of Official Copy).
Office Action received for Korean Patent Application No. 10-2016-7014580, mailed on Jun. 29, 2017, 7 pages (1 page of English Translation and 6 pages of Official Copy).
Office Action received for Korean Patent Application No. 10-2016-7014580, mailed on Sep. 19, 2018, 7 pages (3 pages of English Translation and 4 pages of Official Copy).
Office Action received for Korean Patent Application No. 10-2016-7014580, mailed on Sep. 27, 2016, 9 pages (4 pages of English Translation and 5 pages of Official Copy).
Office Action received for Korean Patent Application No. 10-2017-7002774, mailed on Apr. 18, 2017, 10 pages (4 pages of English Translation and 6 pages of Official Copy).
Office Action received for Korean Patent Application No. 10-2017-7002774, mailed on Jul. 30, 2018, 6 pages (3 pages of English Translation and 3 pages of Official Copy).
Office Action received for Korean Patent Application No. 10-2017-7002774, mailed on Sep. 20, 2018, 12 pages (6 pages of English Translation and 6 pages of Official Copy).
Office Action received for Korean Patent Application No. 10-2018-7036975, mailed on Mar. 22, 2019, 11 pages (5 pages of English Translation and 6 pages of Official Copy).
Office Action received for Korean Patent Application No. 10-2020-7002845, mailed on Feb. 17, 2020, 14 pages (6 pages of English Translation and 8 pages of Official Copy).
Office Action received for Korean Patent Application No. 10-2020-7034959, mailed on Jan. 27, 2022, 7 pages (3 pages of English Translation and 4 pages of Official Copy).
Office Action received for Korean Patent Application No. 10-2020-7034959, mailed on Mar. 2, 2021, 12 pages (5 pages of English Translation and 7 pages of Official Copy).
Office Action received for Korean Patent Application No. 10-2020-7034959, mailed on Oct. 27, 2021, 8 pages (4 pages of English Translation and 4 pages of Official Copy).
Office Action received for Korean Patent Application No. 10-2022-7006973, mailed on May 19, 2022, 10 pages (4 pages of English Translation and 6 pages of Official Copy).
Office Action received for Korean Patent Application No. 10-2022-7006973, mailed on Nov. 24, 2022, 6 pages (3 pages of English Translation and 3 pages of Official Copy).

(56) References Cited

OTHER PUBLICATIONS

Office Action received for Korean Patent Application No. 10-2023-7005442, mailed on Jul. 25, 2023, 10 pages (4 pages of English Translation and 6 pages of Official Copy).
Office Action received for Korean Patent Application No. 10-2024-7019962, mailed on Sep. 25, 2024, 7 pages (2 pages of English Translation and 5 pages of Official Copy).
Office Action received for Mexican Patent Application No. MX/a/2014/004295, mailed on Aug. 21, 2014, 4 pages (2 pages of English Translation and 2 pages of Official Copy).
Office Action received for Mexican Patent Application No. MX/a/2014/004295, mailed on Jan. 20, 2015, 4 pages (1 page of English Translation and 3 pages of Official Copy).
Office Action received for Mexican Patent Application No. MX/a/2015/010523, mailed on Jan. 26, 2016, 4 pages (2 pages of English Translation and 2 pages of Official Copy).
Office Action received for Mexican Patent Application No. MX/a/2016/012174, mailed on Apr. 10, 2019, 7 pages (4 pages of English Translation and 3 pages of Official Copy).
Office Action received for Mexican Patent Application No. MX/a/2016/012174, mailed on Aug. 8, 2019, 7 pages (2 pages of English Translation and 5 pages of Official Copy).
Office Action received for Mexican Patent Application No. MX/a/2020/003290, mailed on Nov. 11, 2022, 7 pages (2 pages of English Translation and 5 pages of Official Copy).
Office Action received for Mexican Patent Application No. MX/a/2020/003290, mailed on Oct. 26, 2022, 8 pages (3 pages of English Translation and 5 pages of Official Copy).
Office Action received for Mexican Patent Application No. MX/a/2023/005388, mailed on Dec. 15, 2023, 18 pages (9 pages of English Translation and 9 pages of Official Copy).
Office Action received for Mexican Patent Application No. MX/a/2023/005388, mailed on Jun. 2, 2023, 24 pages (12 pages of English Translation and 12 pages of Official Copy).
Office Action received for Taiwanese Patent Application No. 099132253, mailed on Jun. 24, 2013, 16 pages (8 pages of English Translation and 8 pages of Official Copy).
Office Action received for Taiwanese Patent Application No. 099132253, mailed on Mar. 27, 2014, 10 pages (4 pages of English Translation and 6 pages of Official Copy).
Office Action received for Taiwanese Patent Application No. 099132254, mailed on May 27, 2013, 24 pages (12 pages of English Translation and 12 pages of Official Copy).
Sharf et al., "SnapPaste:an interactive technique for easy mesh composition", The Visual Computer; International Journal of Computer Graphics, Springer, Berlin, De, vol. 22, No. 9-11. Available Online at <http://dx.doi.org/10.1007/s00371-006-0068-5>, Aug. 25, 2006, pp. 835-844.
Supplemental Notice of Allowance received for U.S. Appl. No. 17/484,899, mailed on Oct. 29, 2024, 5 pages.
Supplemental Notice of Allowance received for U.S. Appl. No. 17/484,899, mailed on Sep. 30, 2024, 5 pages.
"6. Voice chat with friends through QQ", Online available at: https://v.qq.com/x/page/a0166p7xrt0.html, Sep. 22, 2015, 1 page.
Jiutian Technology, "Windows 8 Chinese version from entry to proficiency", Jan. 1, 2014, 5 pages.
QQ, "Method of QQ voice chat", Online Available at: https://www.taodocs.com/p-47909082.html, May 25, 2016, 3 pages.
Shangmeng, Li, "The Design and Implementation of Mobile Terminal System of Multimedia Conference Based on Symbian Operating System", China Academic Journal Electronic Publishing House, online available at: http://www.cnki.net, 2011, 66 pages.
Song Jianhua, "Guidelines for Network", Feb. 29, 2008, 11 pages.
Notice of Allowance received for U.S. Appl. No. 18/138,348, mailed on Mar. 12, 2025, 10 pages.
Office Action received for Chinese Patent Application No. 202311185909.4, mailed on Feb. 13, 2025, 16 pages (10 pages of English Translation and 6 pages of Official Copy).
Office Action received for Chinese Patent Application No. 202410924550.6, mailed on Mar. 1, 2025, 12 pages (5 pages of English Translation and 7 pages of Official Copy).
Office Action received for Chinese Patent Application No. 202410924556.3, mailed on Feb. 28, 2025, 11 pages (5 pages of English Translation and 6 pages of Official Copy).
Office Action received for European Patent Application No. 22729921.1, mailed on Mar. 13, 2025, 8 pages.
Applicant-Initiated Interview Summary received for U.S. Appl. No. 17/745,680, mailed on Apr. 24, 2025, 2 pages.
Board Decision received for Chinese Patent Application No. 201810375380.5, mailed on Jul. 6, 2022, 2 pages (1 page of English Translation and 1 page of Official Copy).
CNET, "Android Lollipop Lock-Screen Notification Tips", Available online at: https://www.youtube.com/watch?v=LZTxHBOwzIU, Nov. 13, 2014, 3 pages.
Decision on Appeal received for U.S. Appl. No. 16/136,178, mailed on Jun. 2, 2022, 10 pages.
Decision to Grant received for Danish Patent Application No. 201570874, mailed on Jan. 26, 2018, 2 pages.
Decision to Grant received for Danish Patent Application No. PA201570865, mailed on Mar. 19, 2018, 2 pages.
Decision to Grant received for Danish Patent Application No. PA201570867, mailed on Mar. 13, 2018, 2 pages.
Decision to Grant received for Danish Patent Application No. PA201570871, mailed on Mar. 19, 2018, 2 pages.
Decision to Grant received for European Patent Application No. 16728165.8, mailed on Sep. 12, 2019, 2 pages.
Decision to Grant received for European Patent Application No. 18196448.7, mailed on Aug. 6, 2020, 2 pages.
Decision to Grant received for European Patent Application No. 20193661.4, mailed on Sep. 7, 2023, 2 pages.
Extended European Search Report received for European Patent Application No. 18196448.7, mailed on Oct. 16, 2018, 9 pages.
Extended European Search Report received for European Patent Application No. 20193661.4, mailed on Feb. 2, 2021, 10 pages.
Final Office Action received for U.S. Appl. No. 15/835,366, mailed on Apr. 5, 2019, 17 pages.
Final Office Action received for U.S. Appl. No. 15/835,366, mailed on Oct. 21, 2019, 18 pages.
Final Office Action received for U.S. Appl. No. 15/835,382, mailed on Apr. 8, 2019, 20 pages.
Final Office Action received for U.S. Appl. No. 16/136,178, mailed on Jul. 10, 2020, 17 pages.
Final Office Action received for U.S. Appl. No. 18/127,535, mailed on Jul. 19, 2024, 26 pages.
Intention to Grant received for Danish Patent Application No. PA201570865, mailed on Jan. 3, 2018, 2 pages.
Intention to Grant received for Danish Patent Application No. PA201570867, mailed on Sep. 22, 2017, 2 pages.
Intention to Grant received for Danish Patent Application No. PA201570871, mailed on Jan. 15, 2018, 2 pages.
Intention to Grant received for Danish Patent Application No. PA201570874, mailed on Nov. 16, 2017, 2 pages.
Intention to Grant received for Danish Patent Application No. PA201570880, mailed on May 9, 2018, 2 pages.
Intention to Grant received for European Patent Application No. 16728165.8, mailed on Apr. 30, 2019, 7 pages.
Intention to Grant received for European Patent Application No. 18196448.7, mailed on Jun. 19, 2020, 7 pages.
Intention to Grant received for European Patent Application No. 20166552.8, mailed on Apr. 30, 2025, 9 pages.
International Preliminary Report on Patentability received for PCT Patent Application No. PCT/US2016/033528, mailed on Dec. 12, 2017, 30 pages.
International Search Report and Written Opinion received for PCT Patent Application No. PCT/US2016/033528, mailed on Feb. 6, 2017, 43 pages.
International Search Report and Written Opinion received for PCT Patent Application No. PCT/US2024/053247, mailed on Jan. 28, 2025, 13 pages.
Non-Final Office Action received for U.S. Appl. No. 15/835,366, mailed on Feb. 6, 2020, 15 pages.

(56) References Cited

OTHER PUBLICATIONS

Non-Final Office Action received for U.S. Appl. No. 15/835,366. mailed on Jun. 26, 2019, 19 pages.
Non-Final Office Action received for U.S. Appl. No. 15/835,366, mailed on Nov. 16, 2018, 14 pages.
Non-Final Office Action received for U.S. Appl. No. 15/835,382, mailed on Nov. 29, 2018, 14 pages.
Non-Final Office Action received for U.S. Appl. No. 16/136,178, mailed on Jan. 6, 2020, 15 pages.
Non-Final Office Action received for U.S. Appl. No. 17/745,680, mailed on May 2, 2025, 27 pages.
Non-Final Office Action received for U.S. Appl. No. 18/127,535, mailed on Dec. 20, 2023, 20 pages.
Notice of Acceptance received for Australian Patent Application No. 2016276028, mailed on Aug. 6, 2019, 3 pages.
Notice of Allowance received for Chinese Patent Application No. 201680026995.6, mailed on Mar. 18, 2020, 2 pages (1 page of English Translation and 1 page of Official Copy).
Notice of Allowance received for Chinese Patent Application No. 201810368058.X, mailed on Jul. 30, 2021, 2 pages (1 page of English Translation and 1 page of Official Copy).
Notice of Allowance received for Chinese Patent Application No. 201810375380.5, mailed on Jul. 25, 2022, 1 pages (1 page of English Translation and 1 page of Official Copy).
Notice of Allowance received for Chinese Patent Application No. 201810760112.5, mailed on Sep. 21, 2020, 4 pages (1 page of English Translation and 3 pages of Official Copy).
Notice of Allowance received for U.S. Appl. No. 15/835,366, malled on Jul. 23, 2020, 10 pages.
Notice of Allowance received for U.S. Appl. No. 16/136,178, mailed on Dec. 5, 2022, 9 pages.
Notice of Allowance received for U.S. Appl. No. 16/136,178, mailed on Sep. 9, 2022, 8 pages.
Office Action received for Australian Patent Application No. 2016276028, mailed on Aug. 9, 2018, 4 pages.
Office Action received for Australian Patent Application No. 2016276028, mailed on May 13, 2019, 4 pages.
Office Action received for Australian Patent Application No. 2019257353, mailed on Sep. 7, 2020, 4 pages.
Office Action received for Chinese Patent Application No. 201680026995.6, mailed on Oct. 22, 2019, 15 pages (6 pages of English Translation and 9 pages of Official Copy).
Office Action received for Chinese Patent Application No. 201810368058.X, mailed on Mar. 20. 2020, 15 pages (7 pages of English Translation and 8 pages of Official Copy).
Office Action received for Chinese Patent Application No. 201810368058.X, mailed on May 8, 2021, 6 pages (3 pages of English Translation and 3 pages of Official Copy).
Office Action received for Chinese Patent Application No. 201810368058.X, mailed on Nov. 3, 2020, 16 pages (7 pages of English Translation and 9 pages of Official Copy).
Office Action received for Chinese Patent Application No. 201810375380.5, mailed on Apr. 2, 2022, 11 pages (6 pages of English Translation and 5 pages of Official Copy).
Office Action received for Chinese Patent Application No. 201810375380.5, mailed on Jan. 14, 2022, 16 pages (8 pages of English Translation and 8 pages of Official Copy).
Office Action received for Chinese Patent Application No. 201810375380.5, mailed on Mar. 3, 2020, 13 pages (6 pages of English Translation and 7 pages of Official Copy).
Office Action received for Chinese Patent Application No. 201810375380.5, mailed on Nov. 12, 2020, 16 pages (8 pages of English Translation and 8 pages of Official Copy).
Office Action received for Chinese Patent Application No. 201810375380.5, mailed on Sep. 15, 2021, 10 pages (5 pages of English Translation and 5 pages of Official Copy).
Office Action received for Chinese Patent Application No. 201810760112.5, mailed on Feb. 26, 2020, 11 pages (5 pages of English Translation and 6 pages of Official Copy).
Office Action received for Chinese Patent Application No. 201810760112.5, mailed on Jul. 21, 2020, 6 pages (3 pages of English Translation and 3 pages of Official Copy).
Office Action received for Chinese Patent Application No. 202110327012.5, mailed on Mar. 31, 2025, 19 pages (1 page of English Translation and 18 pages of Official Copy).
Office Action received for Danish Patent Application No. PA201570865, malled on Mar. 8, 2017, 5 pages.
Office Action received for Danish Patent Application No. PA201570865, mailed on Oct. 10, 2017, 2 pages.
Office Action received for Danish Patent Application No. PA201570865, mailed on Sep. 2, 2016, 4 pages.
Office Action received for Danish Patent Application No. PA201570867, mailed on Feb. 21, 2017, 2 pages.
Office Action received for Danish Patent Application No. PA201570867, mailed on Sep. 7, 2016, 3 pages.
Office Action received for Danish Patent Application No. PA201570871, mailed on Jun. 12, 2017, 3 pages.
Office Action received for Danish Patent Application No. PA201570871, mailed on Oct. 18, 2016, 4 pages.
Office Action received for Danish Patent Application No. PA201570874. mailed on Aug. 31, 2016, 4 pages.
Office Action received for Danish Patent Application No. PA201570874, mailed on May 15, 2017, 4 pages.
Office Action received for Danish Patent Application No. PA201570880, mailed on Feb. 1, 2018, 2 pages.
Office Action received for Danish Patent Application No. PA201570880, mailed on Mar. 31, 2017, 5 pages.
Office Action received for Danish Patent Application No. PA201570880, mailed on Oct. 24, 2017. 4 pages.
Office Action received for Danish Patent Application No. PA201570880, mailed on Sep. 7, 2016, 3 pages.
Office Action received for European Patent Application No. 16728165. 8, mailed on Aug. 29, 2018, 4 pages.
Office Action received for European Patent Application No. 18196448. 7, mailed on Sep. 16, 2019, 4 pages.
Office Action received for European Patent Application No. 20193661. 4, mailed on Sep. 13, 2021, 6 pages.
Pre-Appeal Review Report received for Japanese Patent Application No. 2023-572748, mailed on Apr. 1, 2025, 4 pages (2 pages of English Translation and 2 pages of Official Copy).
Schulzrinne H, "Indication of Message Composition for Instant Messaging", Network Working Group, Columbia University, Jan. 2005, 14 pages.
Search Report and Opinion received for Danish Patent Application No. PA201570865, mailed on Mar. 30, 2016, 6 pages.
Search Report and Opinion received for Danish Patent Application No. PA201570867, mailed on Apr. 1, 2016, 6 pages.
Search Report and Opinion received for Danish Patent Application No. PA201570871, mailed on Apr. 12, 2016, 7 pages.
Search Report and Opinion received for Danish Patent Application No. PA201570874, mailed on Mar. 30, 2016, 7 pages.
Search Report and Opinion received for Danish Patent Application No. PA201570880, mailed on Apr. 4, 2016, 6 pages.
Non-Final Office Action received for U.S. Appl. No. 18/499,848, mailed on Jan. 27, 2025, 18 pages.
Notice of Allowance received for U.S. Appl. No. 17/970,417, mailed on Feb. 5, 2025, 6 pages.
Office Action received for Chinese Patent Application No. 202311835200.4, mailed on Dec. 26, 2024, 11 pages (6 pages of English Translation and 5 pages of Official Copy).
Office Action received for Japanese Patent Application No. 2023-572748, mailed on Nov. 21, 2024, 31 pages (28 pages of English Translation and 3 pages of Official Copy).
Office Action received for Japanese Patent Application No. 2024-173274, mailed on Jan. 6, 2025, 3 pages (2 pages of English Translation and 1 page of Official Copy).
Supplemental Notice of Allowance received for U.S. Appl. No. 17/484,899, mailed on Feb. 3, 2025, 5 pages.
Corrected Notice of Allowance received for U.S. Appl. No. 17/745,680, mailed on Jul. 28, 2025, 3 pages.
Corrected Notice of Allowance received for U.S. Appl. No. 18/498,779, mailed on Aug. 6, 2025, 2 pages.

(56) References Cited

OTHER PUBLICATIONS

Final Office Action received for U.S. Appl. No. 18/242,363, mailed on Jul. 30, 2025, 51 pages.
Notice of Allowance received for U.S. Appl. No. 18/077,154, mailed on Jul. 28, 2025, 14 pages.
Office Action received for Chinese Patent Application No. 202310585927.5, mailed on Jun. 27, 2025, 17 pages (9 pages of English Translation and 8 pages of Official Copy).
Office Action received for European Patent Application No. 23203414.0, mailed on Jul. 29, 2025, 6 pages.
Office Action received for Japanese Patent Application No. 2024-106235, mailed on Jul. 22, 2025, 14 pages (7 pages of English Translation and 7 pages of Official Copy).
Result of Consultation received for European Patent Application No. 22733778.9, mailed on Jul. 21, 2025, 3 pages.
Summons to Attend Oral Proceedings received for European Patent Application No. 22705232.1, mailed on Jul. 23, 2025, 12 pages.
Applicant-Initiated Interview Summary received for U.S. Appl. No. 18/242,363, mailed on Jun. 4, 2025, 3 pages.
Intention to Grant received for European Patent Application No. 22792995.7, mailed on Jun. 10, 2025, 9 pages.
Notice of Allowance received for U.S. Appl. No. 18/499,848, mailed on Jun. 16, 2025, 7 pages.
Result of Consultation received for European Patent Application No. 22729921.1, mailed on Jun. 12, 2025, 3 pages.
Corrected Notice of Allowance received for U.S. Appl. No. 18/138,348, mailed on Apr. 16, 2025, 2 pages.
International Preliminary Report on Patentability received for PCT Patent Application No. PCT/US2023/032792, mailed on Apr. 3, 2025, 10 pages.
Non-Final Office Action received for U.S. Appl. No. 18/067,350, mailed on Apr. 17, 2025, 49 pages.
Non-Final Office Action received for U.S. Appl. No. 18/077,154, mailed on Apr. 10, 2025. 27 pages.
Office Action received for Chinese Patent Application No. 202110327012.5, mailed on Feb. 10, 2025, 22 pages (13 pages of English Translation and 9 pages of Official Copy).
Office Action received for European Patent Application No. 22733778.9, mailed on Feb. 20, 2025, 4 pages.
Applicant-Initiated Interview Summary received for U.S. Appl. No. 17/745,680, mailed on Jun. 30, 2025, 2 pages.
Applicant-Initiated Interview Summary received for U.S. Appl. No. 18/077,154, mailed on Jul. 2, 2025, 2 pages.
Applicant-Initiated Interview Summary received for U.S. Appl. No. 18/367,977, mailed on Jul. 3, 2025, 5 pages.
Examiner-Initiated Interview Summary received for U.S. Appl. No. 18/067,350, mailed on Jun. 26, 2025, 4 pages.
Intention to Grant received for European Patent Application No. 24160234.1, mailed on Jun. 20, 2025, 9 pages.
Office Action received for European Patent Application No. 22733778.9, mailed on Jun. 20, 2025, 4 pages.
Office Action received for Indian Patent Application No. 202315041189, mailed on Jun. 26, 2025, 7 pages.
Office Action received for Japanese Patent Application No. 2024-146741, mailed on Jun. 20, 2025, 6 pages (3 pages of English Translation and 3 pages of Official Copy).
Office Action received for Korean Patent Application No. 10-2023-7039401, mailed on May 19, 2025, 7 pages (3 pages of English Translation and 4 pages of Official Copy).
Result of Consultation received for European Patent Application No. 22729921.1, mailed on Jun. 27, 2025, 3 pages.
Koyama, Kaori, "Mac Fan Macintosh Master Book Mac OS X v10.4 "Tiger" & iLife", '06 version, Mainichi Communications Inc. Nobuyuki Nakagawa, Jul. 9, 2007, 4 pages.
A Day in the Life of Mike,"#SnapChat Vs #Msqrd", Available Online at: <https://www.youtube.com/watch?v=vS_1mrWXmC8>, See especially 4:22-6:05, Mar. 9, 2016, 4 pages.
Androidslide, "Camera Zoom FX", Available at: <https://www.youtube.com/watch?v=AHmPnBy74wY>, Nov. 5, 2011, 3 pages.
Appes Stela, "Gif Me! Camera [Android] Video review by Stelapps", Available Online at: <https://www.youtube.com/watch?v=uae0xUucOyY>, Jul. 17, 2014, 3 pages.
Applicant-Initiated Interview Summary received for U.S. Appl. No. 15/940,017, mailed on Dec. 26, 2019, 5 pages.
Applicant-Initiated Interview Summary received for U.S. Appl. No. 15/940,017, mailed on Jun. 30, 2020, 5 pages.
Applicant-Initiated Interview Summary received for U.S. Appl. No. 17/220,752, mailed on Jul. 22, 2022, 3 pages.
Applicant-Initiated Interview Summary received for U.S. Appl. No. 18/737,710, mailed on May 22, 2025, 3 pages.
Beyouravatar,"Faceshift studio tutorial part 4.8: tracking—fbx export", Available online at: https://www.youtube.com/watch?v=_yqmc9yzKLM, Nov. 19, 2012, 3 pages.
Chicaview,"What is New! Make Funny GIFs Clips—Gif Me (Phone App)", Available online at: <https://www.youtube.com/watch?v=0LPGSFFP-V0>, See especially 1:15-2:25, Sep. 20, 2016, 3 pages.
Chun et al., "3D face pose estimation by a robust real time tracking of facial features", Multimedia Tools and Applications, Kluwer Academic Publishers, Boston, US vol. 75, No. 23, Available online at 10.1007/S11042-014-2356-9, Nov. 18, 2014, pp. 15693-15708.
Chun et al., "Real-Time Face Pose Tracking and Facial Expression Synthesizing for the Animation of 3D Avatar", Technologies For E-Learning and Digital Entertainment, Springer Berlin Heidelberg, Jun. 11, 2007, pp. 191-201.
Corrected Notice of Allowance received for U.S. Appl. No. 15/940,017, mailed on Aug. 27, 2020, 2 pages.
Notice of Allowance for U.S. Appl. No. 15/940,017, mailed on Oct. 21, 2020, 3 pages.
Corrected Notice of Allowance received for U.S. Appl. No. 15/981,754, mailed on Oct. 15, 2019, 2 pages.
Corrected Notice of Allowance received for U.S. Appl. No. 15/981,754, mailed on Oct. 24, 2019, 2 pages.
Corrected Notice of Allowance received for U.S. Appl. No. 16/676,087, mailed on Aug. 3, 2020, 2 pages.
Corrected Notice of Allowance received for U.S. Appl. No. 16/676,087, mailed on Aug. 19, 2020, 2 pages.
Corrected Notice of Allowance received for U.S. Appl. No. 16/676,087, mailed on Jul. 8, 2020, 2 pages.
Corrected Notice of Allowance received for U.S. Appl. No. 16/896,457, mailed on Apr. 6, 2021, 3 pages.
Corrected Notice of Allowance received for U.S. Appl. No. 16/896,457, mailed on Feb. 24, 2021, 2 pages.
Corrected Notice of Allowance received for U.S. Appl. No. 16/896,457, mailed on Jan. 28, 2021, 2 pages.
Corrected Notice of Allowance received for U.S. Appl. No. 17/220,752, mailed on Oct. 14, 2022, 2 pages.
Corrected Notice of Allowance received for U.S. Appl. No. 18/071,434, mailed on Apr. 24, 2024, 2 pages.
Corrected Notice of Allowance received for U.S. Appl. No. 18/071,434, mailed on Mar. 21, 2024, 2 pages.
Corrected Notice of Allowance received for U.S. Appl. No. 18/071,434, mailed on May 29, 2024, 2 pages.
Corrected Notice of Allowance received for U.S. Appl. No. 18/737,710, mailed on Jul. 1, 2025, 2 pages.
Decision on Appeal received for Japanese Patent Application No. 2021-173713, mailed on Nov. 5, 2024, 8 pages (1 page of English Translation and 7 pages of Official Copy).
Decision to Grant received for Danish Patent Application No. PA201770720, mailed on Aug. 8, 2019, 2 pages.
Decision to Grant received for Danish Patent Application No. PA201770721, mailed on Jun. 17, 2019, 2 pages.
Decision to Grant received for Danish Patent Application No. PA201870381, mailed on Oct. 14, 2019, 2 pages.
Decision to Grant received for European Patent Application No. 18703184.4, mailed on Nov. 21, 2024, 4 pages.
Decision to Grant received for European Patent Application No. 18732519.6, mailed on Mar. 28, 2024, 4 pages.
Decision to Grant received for Japanese Patent Application No. 2019-563408, mailed on Aug. 25, 2021, 3 pages (1 page of English Translation and 2 pages of Official Copy).

(56) References Cited

OTHER PUBLICATIONS

Decision to Grant received for Japanese Patent Application No. 2023-169627, mailed on Nov. 5, 2024, 3 pages (1 page of English Translation and 2 pages of Official Copy).
European Search Report received for European Patent Application No. 19186042.8, mailed on Sep. 12, 2019, 4 pages.
European Search Report received for European Patent Application No. 19211833.9, mailed on Jul. 1, 2020, 4 pages.
Extended European Search Report received for European Patent Application No. 24165004.3, mailed on Jul. 5, 2024, 8 pages.
Extended European Search Report received for European Patent Application No. 25170895.4, mailed on Jul. 3, 2025, 11 pages.
FaceRig,“FaceRig Mobile Selfie Tip”, Available online at: https://www.youtube.com/watch?v=x3DZHnXWZ3U, Oct. 18, 2016, 3 pages.
FaceRig,“FaceRig Mobile Tip: How to record with and without the camera feed”, Available Online at: https://www.youtube.com/watch?v=lwk9FIWGvVM, Nov. 8, 2016, 3 pages.
Final Office Action received for U.S. Appl. No. 15/870,195, mailed on Dec. 13, 2018, 27 pages.
Final Office Action received for U.S. Appl. No. 15/940,017, mailed on Apr. 15, 2020, 19 pages.
Final Office Action received for U.S. Appl. No. 15/940,17, mailed on Dec. 20, 2018, 17 pages.
Final Office Action received for U.S. Appl. No. 15/940,232, mailed on Jan. 10, 2019, 27 pages.
Giphy Inc. Communication,“Giphy Cam. The GIF Camera”, Available at: <https://web.archive.org/web/20170309234909/https://play.google.com/store/apps/details?id=com.giphy.camera>, Mar. 9, 2017, pp. 1-3.
Holotech Studios Entertainment,“FaceRig”, Available at: <https://web.archive.org/web/20161120090627/https://play.google.com/store/apps/details?id=com.holotech.facerig&hl=da>, Nov. 9, 2016, 3 pages.
How to Use MSQRD, Availabe Online at: <https://web.archive.org/web/20160505072814/https:/www.wikihow.com/Use-MSQRD>, May 5, 2016, 3 pages.
Intention to Grant received for Danish Patent Application No. PA201770720, mailed on Apr. 4, 2019, 2 pages.
Intention to Grant received for Danish Patent Application No. PA201770720, mailed on Jun. 21, 2019, 2 pages.
Intention to Grant received for Danish Patent Application No. PA201770721, mailed on Apr. 4, 2019, 2 pages.
Intention to Grant received for Danish Patent Application No. PA201870381, mailed on Jul. 18, 2019, 2 pages.
Intention to Grant received for European Patent Application No. 18703184.4, mailed on Jul. 24, 2024, 12 pages.
Intention to Grant received for European Patent Application No. 18732519.6, mailed on Dec. 15, 2023, 10 pages.
Intention to Grant received for European Patent Application No. 24165004.3, mailed on Jun. 5, 2025, 9 pages.
International Preliminary Report on Patentability received for PCT Patent Application No. PCT/US2018/014892, mailed on Nov. 28, 2019, 8 pages.
International Preliminary Report on Patentability received for PCT Patent Application No. PCT/US2018/033044, mailed on Nov. 28, 2019, 8 pages.
International Search Report and Written Opinion received for PCT Patent Application No. PCT/US2018/014892, mailed on Mar. 7, 2018, 10 pages.
International Search Report and Written Opinion received for PCT Patent Application No. PCT/US2018/033044, mailed on Sep. 11, 2018, 13 pages.
Mega Ninja, “Face rig review”, Available online at: https://www.youtube.com/watch?v=8YqeeiEVkRg, Feb. 6, 2017, 3 pages.
NCCU DCT, “Faceshift”, Available online at: https://www.youtube.com/watch?v=4Ph0_SP8tpA, Dec. 1, 2014, 3 pages.
Non-Final Office Action received for U.S. Appl. No. 15/940,017, mailed on Jun. 18, 2018, 15 pages.
Non-Final Office Action received for U.S. Appl. No. 15/940,017, mailed on Sep. 30, 2019, 16 pages.
Non-Final Office Action received for U.S. Appl. No. 15/940,232, mailed on Jun. 18, 2018, 23 pages.
Non-Final Office Action received for U.S. Appl. No. 16/676,087, mailed on Apr. 9, 2020, 55 pages.
Non-Final Office Action received for U.S. Appl. No. 17/220,752, mailed on Apr. 15, 2022, 21 pages.
Non-Final Office Action received for U.S. Appl. No. 18/071,434, mailed on Sep. 22, 2023, 27 pages.
Non-Final Office Action received for U.S. Appl. No. 18/737,710, mailed on Mar. 14, 2025, 39 pages.
Non-Final Office Action received for U.S. Appl. No. 15/870,195, mailed on May 2, 2018, 22 pages.
Notice of Acceptance received for Australian Patent Application No. 2018269375, mailed on Dec. 3, 2020, 3 pages.
Notice of Acceptance received for Australian Patent Application No. 2021201681, mailed on Feb. 3, 2022, 3 pages.
Notice of Acceptance received for Australian Patent Application No. 2022203285, mailed on Jun. 16, 2023, 3 pages.
Notice of Acceptance received for Australian Patent Application No. 2023233200, mailed on Oct. 17, 2023, 3 pages.
Notice of Acceptance received for Australian Patent Application No. 2024200460, mailed on Mar. 20, 2025, 3 pages.
Notice of Allowance received for Chinese Patent Application No. 201880004632.1, mailed on Mar. 20, 2025, 4 pages (1 page of English Translation and 3 pages of Official Copy).
Notice of Allowance received for Chinese Patent Application No. 201880022585.3, mailed on Oct. 28, 2020, 6 pages (3 pages of English Translation and 3 pages of Official Copy).
Notice of Allowance received for Chinese Patent Application No. 201910563974.3, mailed on Jun. 2, 2021, 2 pages (1 page of English Translation and 1 page of Official Copy).
Notice of Allowance received for Chinese Patent Application No. 201910692958.4, mailed on Jul. 21, 2020, 2 pages (1 page of English Translation and 1 page of Official Copy).
Notice of Allowance received for Chinese Patent Application No. 201911219517.9, mailed on Jul. 4, 2022, 6 pages (3 pages of English Translation and 3 pages of Official Copy).
Notice of Allowance received for Chinese Patent Application No. 202410924550.6, mailed on Jun. 30, 2025, 4 pages (1 page of English Translation and 3 pages of Official Copy).
Notice of Allowance received for Chinese Patent Application No. 202410924556.3, mailed on Jun. 30, 2025, 4 pages (1 page of English Translation and 3 pages of Official Copy).
Notice of Allowance received for Chinese Patent Application No. 202411117608.2, mailed on Jul. 1, 2025, 4 pages (1 page of English Translation and 3 pages of Official Copy).
Notice of Allowance received for Korean Patent Application No. 10-2019-7033634, mailed on Aug. 20, 2021, 4 pages (1 page of English Translation and 3 pages of Official Copy).
Notice of Allowance received for Korean Patent Application No. 10-2021-7038284, mailed on Feb. 25, 2022, 5 pages (1 page of English Translation and 4 pages of Official Copy).
Notice of Allowance received for Korean Patent Application No. 10-2022-7017766, mailed on Jun. 14, 2022, 6 pages (2 pages of English Translation and 4 pages of Official Copy).
Notice of Allowance received for Korean Patent Application No. 10-2022-7017767, mailed on Jun. 14, 2022, 6 pages (2 pages of English Translation and 4 pages of Official Copy).
Notice of Allowance received for Korean Patent Application No. 10-2022-7029803, mailed on Mar. 23, 2023, 8 pages (2 pages of English Translation and 6 pages of Official Copy).
Notice of Allowance received for Korean Patent Application No. 10-2023-7021441, mailed on Jul. 6, 2023, 8 pages (2 pages of English Translation and 6 pages of Official Copy).
Notice of Allowance received for Korean Patent Application No. 10-2023-7033560, mailed on Mar. 6, 2025, 8 pages (2 pages of English Translation and 6 pages of Official Copy).
Notice of Allowance received for Korean Patent Application No. 10-2024-7023682, mailed on Feb. 3, 2025, 8 pages (2 pages of English Translation and 6 pages of Official Copy).
Notice of Allowance received for U.S. Appl. No. 15/870,195, mailed on Sep. 23, 2019, 13 pages.

(56) References Cited

OTHER PUBLICATIONS

Notice of Allowance received for U.S. Appl. No. 15/940,017, mailed on Aug. 6, 2020, 10 pages.
Notice of Allowance received for U.S. Appl. No. 15/940,232, mailed on Jun. 4, 2019, 12 pages.
Notice of Allowance received for U.S. Appl. No. 15/981,754, mailed on Jul. 17, 2019, 15 pages.
Notice of Allowance received for U.S. Appl. No. 15/981,754, mailed on Sep. 18, 2019, 14 pages.
Notice of Allowance received for U.S. Appl. No. 16/676,087, mailed on Jun. 19, 2020, 9 pages.
Notice of Allowance received for U.S. Appl. No. 16/676,087, mailed on Oct. 21, 2020, 9 pages.
Notice of Allowance received for U.S. Appl. No. 16/896,457, mailed on Jan. 8, 2021, 22 pages.
Notice of Allowance received for U.S. Appl. No. 17/220,752, mailed on Sep. 7, 2022, 8 pages.
Notice of Allowance received for U.S. Appl. No. 17/745,680, mailed on Jul. 18, 2025, 8 pages.
Notice of Allowance received for U.S. Appl. No. 18/071,434, mailed on Jan. 31, 2024, 10 pages.
Notice of Allowance received for U.S. Appl. No. 18/071,434, mailed on May 20, 2024, 9 pages.
Notice of Allowance received for U.S. Appl. No. 18/498,779, mailed on Jul. 14, 2025, 9 pages.
Notice of Allowance received for U.S. Appl. No. 18/737,710, mailed on Jun. 20, 2025, 8 pages.
Office Action received for Australian Patent Application No. 2018269375, mailed on Jun. 19, 2020, 4 pages.
Office Action received for Australian Patent Application No. 2018269375, mailed on Sep. 7, 2020, 3 pages.
Office Action received for Australian Patent Application No. 2021201681, mailed on Nov. 11, 2021, 4 pages.
Office Action received for Australian Patent Application No. 2022203285, mailed on Apr. 20, 2023, 4 pages.
Office Action received for Australian Patent Application No. 2022203285, mailed on Jan. 18, 2023, 3 pages.
Office Action received for Australian Patent Application No. 2024200460, mailed on Nov. 14, 2024, 3 pages.
Office Action received for Chinese Patent Application No. 201880004632.1, mailed on Apr. 3, 2024, 13 pages (7 pages of English Translation and 6 pages of Official Copy).
Office Action received for Chinese Patent Application No. 201880004632.1, mailed on Jan. 6, 2025, 2 pages (1 page of English Translation and 1 page of Official Copy).
Office Action received for Chinese Patent Application No. 201880004632.1, mailed on Jan. 31, 2024, 7 pages (3 pages of English Translation and 4 pages of Official Copy).
Office Action received for Chinese Patent Application No. 201880004632.1, mailed on Jul. 16, 2024, 11 pages (5 pages of English Translation and 6 pages of Official Copy).
Office Action received for Chinese Patent Application No. 201880022585.3, mailed on May 22, 2020, 11 pages (6 pages of English Translation and 5 pages of Official Copy).
Office Action received for Chinese Patent Application No. 201910563974.3, mailed on Feb. 7, 2021, 7 pages (4 pages of English Translation and 3 pages of Official Copy).
Office Action received for Chinese Patent Application No. 201910563974.3, mailed on May 8, 2020, 18 pages (8 pages of English Translation and 10 pages of Official Copy).
Office Action received for Chinese Patent Application No. 201910692958.4, mailed on Mar. 19, 2020, 20 pages (9 pages of English Translation and 11 pages of Official Copy).
Office Action received for Chinese Patent Application No. 201911219517.9, mailed on Jan. 19, 2022, 11 pages (6 pages of English Translation and 5 pages of Official Copy).
Office Action received for Chinese Patent Application No. 201911219517.9, mailed on Mar. 2, 2021, 20 pages (11 pages of English Translation and 9 pages of Official Copy).
Office Action received for Danish Patent Application No. PA201770393, mailed on Dec. 12, 2018, 7 pages.
Office Action received for Danish Patent Application No. PA201770393, mailed on Jan. 31, 2020, 6 pages.
Office Action received for Danish Patent Application No. PA201770393, mailed on Jul. 11, 2019, 2 pages.
Office Action received for Danish Patent Application No. PA201770393, mailed on Mar. 19, 2018, 8 pages.
Office Action received for Danish Patent Application No. PA201770720, mailed on Apr. 26, 2018, 3 pages.
Office Action received for Danish Patent Application No. PA201770720, mailed on Nov. 16, 2018, 3 pages.
Office Action received for Danish Patent Application No. PA201770720, mailed on Oct. 18, 2017, 8 pages.
Office Action received for Danish Patent Application No. PA201770721, mailed on Apr. 26, 2018, 3 pages.
Office Action received for Danish Patent Application No. PA201770721, mailed on Nov. 16, 2018, 3 Pages.
Office Action received for Danish Patent Application No. PA201770721, mailed on Oct. 19, 2017, 8 pages.
Office Action received for European Patent Application No. 18703184.4, mailed on Dec. 14, 2021, 4 pages.
Office Action received for European Patent Application No. 18703184.4, mailed on Jul. 2, 2021, 6 pages.
Office Action received for European Patent Application No. 18703184.4, mailed on Jul. 13, 2022, 4 pages.
Office Action received for European Patent Application No. 18703184.4, mailed on May 6, 2020, 7 pages.
Office Action received for European Patent Application No. 18703184.4, mailed on Nov. 23, 2020, 8 pages.
Office Action received for European Patent Application No. 18732519.6, mailed on Apr. 24, 2020, 6 pages.
Office Action received for European Patent Application No. 18732519.6, mailed on Oct. 6, 2020, 5 pages.
Office Action received for European Patent Application No. 19186042.8, mailed on Dec. 2, 2021, 5 pages.
Office Action received for European Patent Application No. 19186042.8, mailed on Feb. 13, 2025, 7 pages.
Office Action received for European Patent Application No. 19186042.8, mailed on Jul. 18, 2024, 8 pages.
Office Action received for European Patent Application No. 19186042.8, mailed on May 12, 2020, 5 pages.
Office Action received for European Patent Application No. 19186042.8, mailed on Nov. 13, 2024, 7 pages.
Office Action received for European Patent Application No. 19186042.8, mailed on Oct. 10, 2023, 6 pages.
Office Action received for European Patent Application No. 19186042.8, mailed on Sep. 24, 2019, 6 pages.
Office Action received for European Patent Application No. 19211833.9, mailed on Aug. 23, 2024, 5 pages.
Office Action received for European Patent Application No. 19211833.9, mailed on Jan. 29, 2021, 5 pages.
Office Action received for European Patent Application No. 19211833.9, mailed on Jul. 13, 2020, 7 pages.
Office Action received for European Patent Application No. 24165004.3, mailed on Dec. 5, 2024, 5 pages.
Office Action received for European Patent Application No. 18703184.4, mailed on Oct. 29, 2019, 6 pages.
Office Action received for Indian Patent Application No. 201917046737, mailed on Aug. 9, 2021, 8 pages.
Office Action received for Indian Patent Application No. 202218005498, mailed on May 31, 2024, 6 pages.
Office Action received for Japanese Patent Application No. 2019-563408, mailed on Nov. 2, 2020, 4 pages (2 pages of English Translation and 2 pages of Official Copy).
Office Action received for Japanese Patent Application No. 2021-173713, mailed on Jun. 15, 2023, 4 pages (2 pages of English Translation and 2 pages of Official Copy).
Office Action received for Japanese Patent Application No. 2021-173713, mailed on Jun. 18, 2024, 4 pages (2 pages of English Translation and 2 pages of Official Copy).

(56) References Cited

OTHER PUBLICATIONS

Office Action received for Japanese Patent Application No. 2021-173713, mailed on Nov. 16, 2022, 9 pages (5 pages of English Translation and 4 pages of Official Copy).
Office Action received for Japanese Patent Application No. 2023-169627, mailed on Jul. 29, 2024, 4 pages (2 pages of English Translation and 2 pages of Official Copy).
Office Action received for Korean Patent Application No. 10-2019-7033634, mailed on Sep. 28, 2020, 15 pages (7 pages of English Translation and 8 pages of Official Copy).
Office Action received for Korean Patent Application No. 10-2022-7029803, mailed on Sep. 3, 2022, 5 pages (2 pages of English Translation and 3 pages of Official Copy).
Office Action received for Korean Patent Application No. 10-2024-7023682, mailed on Aug. 5, 2024, 6 pages (2 pages of English Translation and 4 pages of Official Copy).
Opuni Kojo, "FaceShift Studio Demo", Available online at: https://www.youtube.com/watch?v=72ty7PYKwGU, Oct. 1, 2012, 3 pages.
Pre-Appeal Review Report received for Japanese Patent Application No. 2021-173713, mailed on Nov. 10, 2023, 4 pages (2 pages of English Translation and 2 pages of Official Copy).
Result of Consultation received for European Patent Application No. 19211833.9, mailed on Jul. 15, 2021, 3 pages.
Result of Consultation received for European Patent Application No. 24165004.3, mailed on Feb. 4, 2025, 3 pages.
Sambrook Jade, "Video Selfie Filters with MSQRD for Facebook Live", Available Online at: <https://www.youtube.com/watch?v=JZrWK2NEFeg>, See especially 2:44-3:03, Jul. 2, 2016, 3 pages.
Search Report and Opinion received for Danish Patent Application No. PA201770393, mailed on Jun. 21, 2017, 9 pages.
Search Report received for Danish Patent Application No. PA201870381, mailed on Sep. 13, 2018, 7 pages.
Supplemental Notice of Allowance received for U.S. Appl. No. 15/870,195, mailed on Nov. 14, 2019, 9 pages.
Ting,"Giphy Cam (iOS) | Ting Download", Available online at: https://www.youtube.com/watch?v=mykfBpyD3gg, Oct. 2, 2015, 3 pages.
Twins Tornado, "New Tutorial: Add Facial Expressions to your Game Characters?", Available online at: https://www.youtube.com/watch?v=wKSjByNyaKA, Mar. 14, 2014, 4 pages.
Yom Mama, "SnapChat Tutorial For Beginners!", Available Online at: <https://www.youtube.com/watch?v=zUmj039NNOU>, See especially 6:55-7:22, Jun. 6, 2016, 3 pages.
Corrected Notice of Allowance received for U.S. Appl. No. 18/138,348, mailed on Mar. 26, 2025, 2 pages.
International Preliminary Report on Patentability received for PCT Patent Application No. PCT/US2023/032911, mailed on Apr. 3, 2025, 13 pages.
Notice of Allowance received for U.S. Appl. No. 18/140,449, mailed on Mar. 26, 2025, 10 pages.
Notice of Allowance received for U.S. Appl. No. 18/499,848, mailed on Apr. 2, 2025, 11 pages.
Office Action received for Japanese Patent Application No. 2024-146741, mailed on Mar. 28, 2025, 10 pages (5 pages of English Translation and 5 pages of Official Copy).
Office Action received for Korean Patent Application No. 10-2024-7043493, mailed on Mar. 19, 2025, 11 pages (4 pages of English Translation and 7 pages of Official Copy).
Result of Consultation received for European Patent Application No. 22705232.1, mailed on Mar. 26, 2025, 3 pages.
6. Voice chat with friends through QQ, online available at: https://v.qq.com/x/page/a0166p7xrt0.html, Sep. 22, 2015, 1 page (Official Copy Only) See Communication Under Rule 37 CFR § 1.98(a) (3).
Abdulezer et al., "Skype for Dummies", Available Online at: https://ixn.es/Skype%20For%20Dummies.pdf, 2007, 361 pages.
Advisory Action received for U.S. Appl. No. 17/483,679, mailed on Sep. 20, 2022, 8 pages.
Androidcentral, "How do i respond to group messages from notification bar?", Available online at: https://forums.androidcentral.com/ask-question/952030-how-do-i-respond-group-messages-notification-bar.html, Mar. 25, 2019, 3 pages.
Applicant Initiated Interview Summary received for U.S. Appl. No. 16/790,619, mailed on Jul. 28, 2020, 3 pages.
Applicant-Initiated Interview Summary received for U.S. Appl. No. 16/528,941, mailed on Jun. 19, 2020, 3 pages.
Applicant-Initiated Interview Summary received for U.S. Appl. No. 16/528,941, mailed on Nov. 10, 2020, 2 pages.
Applicant-Initiated Interview Summary received for U.S. Appl. No. 16/799,481, mailed on Jul. 24, 2020, 3 pages.
Applicant-Initiated Interview Summary received for U.S. Appl. No. 17/026,818, mailed on Dec. 15, 2020, 7 pages.
Applicant-Initiated Interview Summary received for U.S. Appl. No. 17/026,818, mailed on Mar. 8, 2021, 4 pages.
Applicant-Initiated Interview Summary received for U.S. Appl. No. 17/121,610, mailed on Oct. 29, 2021, 2 pages.
Applicant-Initiated Interview Summary received for U.S. Appl. No. 17/223,794, mailed on Sep. 7, 2021, 3 pages.
Applicant-Initiated Interview Summary received for U.S. Appl. No. 17/476,404, mailed on Dec. 20, 2022, 2 pages.
Applicant-Initiated Interview Summary received for U.S. Appl. No. 17/476,404, mailed on Jul. 27, 2022, 6 pages.
Applicant-Initiated Interview Summary received for U.S. Appl. No. 17/476,404, mailed on Jun. 2, 2023, 2 pages.
Applicant-Initiated Interview Summary received for U.S. Appl. No. 17/476,404, mailed on Mar. 18, 2022, 2 pages.
Applicant-Initiated Interview Summary received for U.S. Appl. No. 17/476,404, mailed on Oct. 31, 2023, 4 pages.
Applicant-Initiated Interview Summary received for U.S. Appl. No. 17/479,897, mailed on Jun. 12, 2023, 2 pages.
Applicant-Initiated Interview Summary received for U.S. Appl. No. 17/479,897, mailed on Oct. 31, 2022, 3 pages.
Applicant-Initiated Interview Summary received for U.S. Appl. No. 17/482,977, mailed on Dec. 5, 2022, 2 pages.
Applicant-Initiated Interview Summary received for U.S. Appl. No. 17/482,987, mailed on Apr. 11, 2022, 4 pages.
Applicant-Initiated Interview Summary received for U.S. Appl. No. 17/483,542, mailed on May 22, 2023, 3 pages.
Applicant-Initiated Interview Summary received for U.S. Appl. No. 17/483,542, mailed on Nov. 23, 2022, 4 pages.
Applicant-Initiated Interview Summary received for U.S. Appl. No. 17/483,564, mailed on Apr. 21, 2023, 5 pages.
Applicant-Initiated Interview Summary received for U.S. Appl. No. 17/483,564, mailed on Jul. 21, 2022, 5 pages.
Applicant-Initiated Interview Summary received for U.S. Appl. No. 17/483,564, mailed on Jun. 21, 2023, 4 pages.
Applicant-Initiated Interview Summary received for U.S. Appl. No. 17/483,564, mailed on Mar. 14, 2022, 2 pages.
Applicant-Initiated Interview Summary received for U.S. Appl. No. 17/483,679, mailed on Apr. 29, 2022, 2 pages.
Applicant-Initiated Interview Summary received for U.S. Appl. No. 17/483,679, mailed on Aug. 18, 2023, 2 pages.
Applicant-Initiated Interview Summary received for U.S. Appl. No. 17/483,679, mailed on Aug. 23, 2022, 3 pages.
Applicant-Initiated Interview Summary received for U.S. Appl. No. 17/483,679, mailed on Dec. 18, 2023, 2 pages.
Applicant-Initiated Interview Summary received for U.S. Appl. No. 17/483,679, mailed on May 19, 2023, 3 pages.
Applicant-Initiated Interview Summary received for U.S. Appl. No. 17/484,899, mailed on Apr. 27, 2022, 5 pages.
Applicant-Initiated Interview Summary received for U.S. Appl. No. 17/484,899, mailed on Sep. 1, 2022, 5 pages.
Applicant-Initiated Interview Summary received for U.S. Appl. No. 17/484,899, mailed on Sep. 12, 2023, 6 pages.
Applicant-Initiated Interview Summary received for U.S. Appl. No. 17/484,907, mailed on Jan. 10, 2022, 2 pages.
Applicant-Initiated Interview Summary received for U.S. Appl. No. 17/684,843, mailed on Oct. 5, 2023, 4 pages.
Applicant-Initiated Interview Summary received for U.S. Appl. No. 17/872,736, mailed on Jul. 25, 2023, 2 pages.
Applicant-Initiated Interview Summary received for U.S. Appl. No. 17/950,900, mailed on Jan. 26, 2023, 5 pages.

(56) References Cited

OTHER PUBLICATIONS

Applicant-Initiated Interview Summary received for U.S. Appl. No. 18/067,350, mailed on Sep. 11, 2023, 4 pages.
Brief Communication Regarding Oral Proceedings received for European Patent Application No. 20205496.1, mailed on Apr. 19, 2023, 1 page.
Certificate of Examination received for Australian Patent Application No. 2019100499, mailed on Aug. 15, 2019, 2 pages.
Certificate of Examination received for Australian Patent Application No. 2019101062, mailed on Jun. 2, 2020, 2 pages.
Certificate of Examination received for Australian Patent Application No. 2020101324, mailed on Sep. 7, 2020, 2 pages.
Corrected Notice of Allowance received for U.S. Appl. No. 16/109,552, mailed on Jun. 13, 2019, 2 pages.
Corrected Notice of Allowance received for U.S. Appl. No. 16/144,572, mailed on Mar. 21, 2019, 3 pages.
Corrected Notice of Allowance received for U.S. Appl. No. 16/147,432, mailed on Jan. 18, 2019, 3 pages.
Corrected Notice of Allowance received for U.S. Appl. No. 16/147,432, mailed on Jul. 16, 2019, 3 pages.
Corrected Notice of Allowance received for U.S. Appl. No. 16/511,578, mailed on Feb. 13, 2020, 3 pages.
Corrected Notice of Allowance received for U.S. Appl. No. 16/790,619, mailed on Oct. 13, 2020, 3 pages.
Corrected Notice of Allowance received for U.S. Appl. No. 16/799,481, mailed on Oct. 27, 2020, 3 pages.
Corrected Notice of Allowance received for U.S. Appl. No. 17/027,373, mailed on Jul. 12, 2022, 2 pages.
Corrected Notice of Allowance received for U.S. Appl. No. 17/027,373, mailed on Oct. 26, 2022, 2 pages.
Corrected Notice of Allowance received for U.S. Appl. No. 17/121,610, mailed on Jun. 7, 2022, 4 pages.
Corrected Notice of Allowance received for U.S. Appl. No. 17/121,610, mailed on Mar. 31, 2022, 3 pages.
Corrected Notice of Allowance received for U.S. Appl. No. 17/121,610, mailed on May 20, 2022, 4 pages.
Corrected Notice of Allowance received for U.S. Appl. No. 17/157,166, mailed on Apr. 13, 2022, 4 pages.
Corrected Notice of Allowance received for U.S. Appl. No. 17/157,166, mailed on Apr. 25, 2022, 4 pages.
Corrected Notice of Allowance received for U.S. Appl. No. 17/157,166, mailed on Dec. 9, 2021, 4 pages.
Corrected Notice of Allowance received for U.S. Appl. No. 17/157,166, mailed on Dec. 15, 2021, 4 pages.
Corrected Notice of Allowance received for U.S. Appl. No. 17/157,166, mailed on Jan. 5, 2022, 4 pages.
Corrected Notice of Allowance received for U.S. Appl. No. 17/157,166, mailed on Jun. 29, 2022, 4 pages.
Corrected Notice of Allowance received for U.S. Appl. No. 17/479,897, mailed on Aug. 17, 2023, 2 pages.
Corrected Notice of Allowance received for U.S. Appl. No. 17/482,977, mailed on Apr. 24, 2023, 3 pages.
Corrected Notice of Allowance received for U.S. Appl. No. 17/483,542, mailed on Aug. 25, 2023, 3 pages.
Corrected Notice of Allowance received for U.S. Appl. No. 17/483,542, mailed on Feb. 5, 2024, 3 pages.
Corrected Notice of Allowance received for U.S. Appl. No. 17/483,549, mailed on Aug. 24, 2022, 3 pages.
Corrected Notice of Allowance received for U.S. Appl. No. 17/483,582, mailed on Feb. 15, 2022, 2 pages.
Corrected Notice of Allowance received for U.S. Appl. No. 17/484,907, mailed on Aug. 26, 2022, 2 pages.
Corrected Notice of Allowance received for U.S. Appl. No. 17/484,907, mailed on Jun. 15, 2022, 2 pages.
Corrected Notice of Allowance received for U.S. Appl. No. 17/484,907, mailed on Mar. 18, 2022, 2 pages.
Corrected Notice of Allowance received for U.S. Appl. No. 17/732,204, mailed on Dec. 4, 2023, 5 pages.
Corrected Notice of Allowance received for U.S. Appl. No. 17/732,204, mailed on Jan. 18, 2024, 5 pages.
Corrected Notice of Allowance received for U.S. Appl. No. 17/732,204, mailed on Nov. 16, 2023, 6 pages.
Corrected Notice of Allowance received for U.S. Appl. No. 17/740,104, mailed on Jan. 2, 2024, 2 pages.
Corrected Notice of Allowance received for U.S. Appl. No. 17/872,736, mailed on Oct. 13, 2023, 4 pages.
Corrected Notice of Allowance received for U.S. Appl. No. 17/950,900, mailed on Apr. 14, 2023, 2 pages.
Corrected Notice of Allowance received for U.S. Appl. No. 17/950,900, mailed on Jun. 30, 2023, 2 pages.
Corrected Notice of Allowance received for U.S. Appl. No. 17/950,922, mailed on Apr. 14, 2023, 2 pages.
Corrected Notice of Allowance received for U.S. Appl. No. 17/950,922, mailed on Oct. 2, 2023, 3 pages.
Corrected Search Report and Opinion received for Danish Patent Application No. PA20187064, mailed on Sep. 5, 2018, 13 pages.
Decision to Grant received for Danish Patent Application No. PA201870362, mailed on May 15, 2020, 2 pages.
Decision to Grant received for European Patent Application No. 19729395.4, mailed on Dec. 9, 2021, 2 pages.
Decision to Refuse received for European Patent Application No. 20205496.1, mailed on May 12, 2023, 16 pages.
Dolan Tim, "How to Make a Laptop Webcam into a Document Camera—IPEVO Mirror-Cam Review", Retrieved from the Internet: URL: https://www.youtube.com/watch?v =- K8jyZ1hbbg, Aug. 29, 2020, 1 page.
Ex Parte Quayle Action received for U.S. Appl. No. 17/121,610, mailed on Dec. 9, 2021, 7 pages.
Examiner Initiated-Interview Summary received for U.S. Appl. No. 16/528,941, mailed on Dec. 1, 2020, 2 pages.
Examiner Interview Summary received for U.S. Appl. No. 17/903,946, mailed on Jun. 28, 2023, 2 pages.
Examiner-Initiated Interview Summary received for U.S. Appl. No. 17/027,373, mailed on Mar. 31, 2022, 4 pages.
Ex-Parte Quayle Action received for U.S. Appl. No. 17/903,946, mailed on Aug. 4, 2023, 4 pages.
Extended European Search Report received for European Patent Application No. 20166552.8, mailed on Jun. 12, 2020, 9 pages.
Extended European Search Report received for European Patent Application No. 20205496.1, mailed on Mar. 11, 2021, 11 pages.
Extended European Search Report received for European Patent Application No. 23172038.4, mailed on Oct. 11, 2023, 10 pages.
Extended European Search Report received for European Patent Application No. 23203414.0, mailed on Jan. 26, 2024, 10 pages.
Final Office Action received for U.S. Appl. No. 16/528,941, mailed on Jul. 13, 2020, 15 pages.
Final Office Action received for U.S. Appl. No. 17/026,818, mailed on Jan. 29, 2021, 21 pages.
Final Office Action received for U.S. Appl. No. 17/476,404, mailed on May 5, 2022, 30 pages.
Final Office Action received for U.S. Appl. No. 17/476,404, mailed on Sep. 12, 2023, 30 pages.
Final Office Action received for U.S. Appl. No. 17/479,897, mailed on Jan. 10, 2023, 15 pages.
Final Office Action received for U.S. Appl. No. 17/483,564, mailed on Apr. 18, 2022, 23 pages.
Final Office Action received for U.S. Appl. No. 17/483,564, mailed on May 25, 2023, 26 pages.
Final Office Action received for U.S. Appl. No. 17/483,679, mailed on Feb. 6, 2024, 45 pages.
Final Office Action received for U.S. Appl. No. 17/483,679, mailed on Jun. 13, 2023, 33 pages.
Final Office Action received for U.S. Appl. No. 17/483,679, mailed on May 24, 2022, 21 pages.
Final Office Action received for U.S. Appl. No. 17/484,899, mailed on May 12, 2022, 29 pages.
Final Office Action received for U.S. Appl. No. 17/484,899, mailed on Nov. 6, 2023, 39 pages.
Final Office Action received for U.S. Appl. No. 17/950,900, mailed on Jan. 23, 2023, 14 pages.
Final Office Action received for U.S. Appl. No. 18/067,350, mailed on Dec. 13, 2023, 44 pages.

(56) References Cited

OTHER PUBLICATIONS

Garrison DR., "An Analysis and Evaluation of Audio Teleconferencing to Facilitate Education at a Distance", Online Available at: https://doi.org/10.1080/08923649009526713,American journal of distance education, Jol. 4, No. 3, Sep. 24, 2009, 14 pages.
HuddleCamHD SimplTrack2 Auto Tracking Camera Installation & Operation Manual, Available Online at: https://huddlecamhd.com/wp-content/uploads/2021/01/SimplTrack2-User-Manual-v1_2-6-20.pdf, Jun. 2020, 41 pages.
Intention to Grant received for Danish Patent Application No. PA201870362, mailed on Feb. 14, 2020, 2 pages.
Intention to Grant received for Danish Patent Application No. PA202070617, mailed on Nov. 15, 2021, 2 pages.
Intention to Grant received for European Patent Application No. 19729395.4, mailed on Jul. 23, 2021, 10 pages.
Intention to Grant received for European Patent Application No. 20166552.8, mailed on Jun. 29, 2023, 8 pages.
Intention to Grant received for European Patent Application No. 21728781.2, mailed on Dec. 12, 2023, 9 pages.
Intention to Grant received for European Patent Application No. 21728781.2, mailed on Jul. 28, 2023, 9 pages.
International Preliminary Report on Patentability received for PCT Patent Application No. PCT/US2018/048151, mailed on Apr. 9, 2020, 14 pages.
International Preliminary Report on Patentability received for PCT Patent Application No. PCT/US2019/031202, mailed on Nov. 19, 2020, 13 pages.
International Preliminary Report on Patentability received for PCT Patent Application No. PCT/US2021/031760, mailed on Nov. 24, 2022, 11 pages.
International Preliminary Report on Patentability received for PCT Patent Application No. PCT/US2022/014271, mailed on Aug. 10, 2023, 17 pages.
International Preliminary Report on Patentability received for PCT Patent Application No. PCT/US2022/029261, mailed on Nov. 30, 2023, 12 pages.
International Preliminary Report on Patentability received for PCT Patent Application No. PCT/US2022/029273, mailed on Nov. 30, 2023, 14 pages.
International Preliminary Report on Patentability received for PCT Patent Application No. PCT/US2022/029580, mailed on Nov. 30, 2023, 14 pages.
International Search Report and Written Opinion received for PCT Patent Application No. PCT/US2018/048151, mailed on Jan. 10, 2019, 23 pages.
International Search Report and Written Opinion received for PCT Patent Application No. PCT/US2019/031202, mailed on Oct. 4, 2019, 19 pages.
International Search Report and Written Opinion received for PCT Patent Application No. PCT/US2021/031760, mailed on Sep. 16, 2021, 18 pages.
International Search Report and Written Opinion received for PCT Patent Application No. PCT/US2022/014271, mailed on Jul. 4, 2022, 23 pages.
International Search Report and Written Opinion received for PCT Patent Application No. PCT/US2022/029261, mailed on Oct. 20, 2022, 18 pages.
International Search Report and Written Opinion received for PCT Patent Application No. PCT/US2022/029273, mailed on Oct. 27, 2022, 19 pages.
International Search Report and Written Opinion received for PCT Patent Application No. PCT/US2022/029580, mailed on Nov. 7, 2022, 20 pages.
International Search Report and Written Opinion received for PCT Patent Application No. PCT/US2022/044592, mailed on Mar. 14, 2023, 22 pages.
International Search Report and Written Opinion received for PCT Patent Application No. PCT/US2023/017280, mailed on Jun. 26, 2023, 20 pages.
International Search Report and Written Opinion received for PCT Patent Application No. PCT/US2023/020569, mailed on Nov. 13, 2023, 23 pages.
Invitation to Pay Additional Fees and Partial International Search Report received for PCT Patent Application No. PCT/US2022/014271, mailed on May 12, 2022, 20 pages.
Invitation to Pay Additional Fees and Partial International Search Report received for PCT Patent Application No. PCT/US2022/029261, mailed on Aug. 29, 2022, 16 pages.
Invitation to Pay Additional Fees and Partial International Search Report received for PCT Patent Application No. PCT/US2022/029580, mailed on Sep. 5, 2022, 13 pages.
Invitation to Pay Additional Fees and Partial International Search Report received for PCT Patent Application No. PCT/US2023/020569, mailed on Sep. 21, 2023, 14 pages.
Invitation to Pay Additional Fees received for PCT Patent Application No. PCT/US2018/048151, mailed on Nov. 6, 2018, 18 pages.
Invitation to Pay Additional Fees received for PCT Patent Application No. PCT/US2019/031202, mailed on Aug. 8, 2019, 12 pages.
Invitation to Pay Additional Fees received for PCT Patent Application No. PCT/US2022/029273, mailed on Sep. 2, 2022, 13 pages.
Invitation to Pay Additional Fees received for PCT Patent Application No. PCT/US2022/044592, mailed on Jan. 16, 2023, 21 pages.
Invitation to Pay Search Fees received for European Patent Application No. 21728781.2, mailed on Dec. 2, 2022, 3 pages.
Jiutian Technology, "Windows 8 Chinese version from entry to proficiency", Jan. 1, 2014, 5 pages (Official Copy Only) See Communication Under Rule 37 CFR § 1.98(a) (3).
Larson Tom, "How to Turn your Webcam into a Document Camera", Retrieved from the Internet: URL: https://www.youtube.com/watchv=UlaW22FxRZM, Nov. 7, 2020, 1 page.
Minutes of the Oral Proceedings received for European Patent Application No. 19729395.4, mailed on Jul. 21, 2021, 6 pages.
Minutes of the Oral Proceedings received for European Patent Application No. 20205496.1, mailed on May 9, 2023, 7 pages.
Non-Final Office Action received for U.S. Appl. No. 16/035,422, mailed on Nov. 30, 2018, 13 Pages.
Non-Final Office Action received for U.S. Appl. No. 17/157,166, mailed on Jul. 9, 2021, 12 pages.
Non-Final Office Action received for U.S. Appl. No. 16/109,552, mailed on Oct. 17, 2018, 16 pages.
Non-Final Office Action received for U.S. Appl. No. 16/144,572, mailed on Nov. 30, 2018, 8 pages.
Non-Final Office Action received for U.S. Appl. No. 16/383,403, mailed on Aug. 23, 2019, 10 pages.
Non-Final Office Action received for U.S. Appl. No. 16/528,941, mailed on Dec. 7, 2020, 15 pages.
Non-Final Office Action received for U.S. Appl. No. 16/528,941, mailed on Jan. 30, 2020, 14 pages.
Non-Final Office Action received for U.S. Appl. No. 16/790,619, mailed on May 4, 2020, 13 pages.
Non-Final Office Action received for U.S. Appl. No. 16/799,481, mailed on May 1, 2020, 13 pages.
Non-Final Office Action received for U.S. Appl. No. 17/026,818, mailed on Nov. 25, 2020, 20 pages.
Non-Final Office Action received for U.S. Appl. No. 17/027,373, mailed on Feb. 2, 2022, 17 pages.
Non-Final Office Action received for U.S. Appl. No. 17/121,610, mailed on May 13, 2021, 17 pages.
Non-Final Office Action received for U.S. Appl. No. 17/223,794, mailed on Jun. 16, 2021, 32 pages.
Non-Final Office Action received for U.S. Appl. No. 17/476,404, mailed on Feb. 8, 2022, 26 pages.
Non-Final Office Action received for U.S. Appl. No. 17/476,404, mailed on Mar. 30, 2023, 29 pages.
Non-Final Office Action received for U.S. Appl. No. 17/476,404, mailed on Sep. 14, 2022, 31 pages.
Non-Final Office Action received for U.S. Appl. No. 17/479,897, mailed on Apr. 25, 2023, 14 pages.
Non-Final Office Action received for U.S. Appl. No. 17/479,897, mailed on Aug. 30, 2022, 10 pages.
Non-Final Office Action received for U.S. Appl. No. 17/482,977, mailed on Oct. 13, 2022, 20 pages.

(56) References Cited

OTHER PUBLICATIONS

Non-Final Office Action received for U.S. Appl. No. 17/482,987, mailed on Jan. 18, 2022, 25 pages.
Non-Final Office Action received for U.S. Appl. No. 17/483,542, mailed on Jan. 31, 2023, 14 pages.
Non-Final Office Action received for U.S. Appl. No. 17/483,542, mailed on Sep. 22, 2022, 18 pages.
Non-Final Office Action received for U.S. Appl. No. 17/483,549, mailed on Jan. 11, 2022, 5 pages.
Non-Final Office Action received for U.S. Appl. No. 17/483,564, mailed on Jan. 6, 2022, 23 pages.
Non-Final Office Action received for U.S. Appl. No. 17/483,564, mailed on Nov. 28, 2022, 24 pages.
Non-Final Office Action received for U.S. Appl. No. 17/483,679, mailed on Dec. 9, 2022, 31 pages.
Non-Final Office Action received for U.S. Appl. No. 17/483,679, mailed on Feb. 1, 2022, 19 pages.
Non-Final Office Action received for U.S. Appl. No. 17/483,679, mailed on Sep. 13, 2023, 32 pages.
Non-Final Office Action received for U.S. Appl. No. 17/484,899, mailed on Jan. 24, 2022, 24 pages.
Non-Final Office Action received for U.S. Appl. No. 17/484,899, mailed on Jun. 14, 2023, 41 pages.
Non-Final Office Action received for U.S. Appl. No. 17/484,907, mailed on Nov. 19, 2021, 24 pages.
Non-Final Office Action received for U.S. Appl. No. 17/684,843, mailed on Aug. 11, 2023, 23 pages.
Non-Final Office Action received for U.S. Appl. No. 17/732,204, mailed on Aug. 4, 2023, 18 pages.
Non-Final Office Action received for U.S. Appl. No. 17/740,104, mailed on Aug. 2, 2023, 15 pages.
Non-Final Office Action received for U.S. Appl. No. 17/872,736, mailed on May 11, 2023, 17 pages.
Non-Final Office Action received for U.S. Appl. No. 17/903,946, mailed on Apr. 14, 2023, 17 pages.
Non-Final Office Action received for U.S. Appl. No. 17/950,900, mailed on Dec. 1, 2022, 14 pages.
Non-Final Office Action received for U.S. Appl. No. 18/067,350, mailed on Aug. 3, 2023, 41 pages.
Notice of Acceptance received for Austrlian Patent Appliation No. 2019266225, mailed on Dec. 23, 2020, 3 pages.
Notice of Acceptance received for Austrlian Patent Appliation No. 2020239711, mailed on Dec. 16, 2021, 3 pages.
Notice of Acceptance received for Austrlian Patent Appliation No. 2021200789, mailed on Feb. 26, 2021, 3 pages.
Notice of Acceptance received for Australian Patent Application No. 2021203903, mailed on May 25, 2022, 3 pages.
Notice of Acceptance received for Australian Patent Application No. 2022201532, mailed on May 22, 2023, 3 pages.
Notice of Acceptance received for Australian Patent Application No. 2023248185, mailed on Jan. 23, 2024, 3 pages.
Notice of Allowance received for Australian Patent Application No. 2022228207, mailed on Jul. 3, 2023, 3 pages.
Notice of Allowance received for Chinese Patent Application No. 201910400179.2, mailed on Oct. 9, 2022, 4 pages (1 page of English Translation and 3 pages of Official Copy).
Notice of Allowance received for Chinese Patent Application No. 201880056514.5, mailed on Jan. 11, 2021, 2 pages (1 page of English Translation and 1 page of Official Copy).
Notice of Allowance received for Chinese Patent Application No. 201910400180.5, mailed on Nov. 5, 2020, 2 pages (1 page of English Translation and 1 page of Official Copy).
Notice of Allowance received for Chinese Patent Application No. 202011243876.0, mailed on Sep. 8, 2021, 4 pages (1 page of English Translation and 3 pages of Official Copy).
Notice of Allowance received for Chinese Patent Application No. 202110328601.5, mailed on Jul. 5, 2023, 5 pages (1 page of English Translation and 4 pages of Official Copy).
Notice of Allowance received for Japanese Patent Application No. 2018-183504, mailed on Sep. 27, 2019, 4 pages (1 page of English Translation and 3 pages of Official Copy).
Notice of Allowance received for Japanese Patent Application No. 2019-194597, mailed on Nov. 19, 2021, 4 pages (1 page of English Translation and 3 pages of Official Copy).
Notice of Allowance received for Japanese Patent Application No. 2020-159840, mailed on Jul. 8, 2022, 4 pages (1 page of English Translation and 3 pages of Official Copy).
Notice of Allowance received for Japanese Patent Application No. 2021-206121, mailed on May 15, 2023, 4 pages (1 page of English Translation and 3 pages of Official Copy).
Notice of Allowance received for Japanese Patent Application No. 2022-125792, mailed on Jan. 27, 2023, 4 pages (1 page of English Translation and 3 pages of Official Copy).
Notice of Allowance received for Korean Patent Application No. 10-2020-0123805, mailed on Jun. 19, 2022, 5 pages (2 pages of English Translation and 3 pages of Official Copy).
Notice of Allowance received for Korean Patent Application No. 10-2020-7032110, mailed on Mar. 8, 2021, 4 pages (1 page of English Translation and 3 pages of Official Copy).
Notice of Allowance received for Korean Patent Application No. 10-2021-7017731, mailed on Feb. 28, 2023, 5 pages (2 pages of English Translation and 3 pages of Official Copy).
Notice of Allowance received for Korean Patent Application No. 10-2022-0091730, mailed on Oct. 4, 2022, 5 pages (2 pages of English Translation and 3 pages of Official Copy).
Notice of Allowance received for Korean Patent Application No. 10-2023-7024157, mailed on Sep. 19, 2023, 7 pages (2 pages of English Translation and 5 pages of Official Copy).
Notice of Allowance received for U.S. Appl. No. 16/035,422, mailed on Apr. 10, 2019, 6 pages.
Notice of Allowance received for U.S. Appl. No. 16/528,941, mailed on Aug. 10, 2021, 5 pages.
Notice of Allowance received for U.S. Appl. No. 16/528,941, mailed on May 19, 2021, 5 pages.
Notice of Allowance received for U.S. Appl. No. 17/157,166, mailed on Nov. 16, 2021, 6 pages.
Notice of Allowance received for U.S. Appl. No. 16/109,552, mailed on Mar. 13, 2019, 25 pages.
Notice of Allowance received for U.S. Appl. No. 16/109,552, mailed on May 13, 2019, 2 pages.
Notice of Allowance received for U.S. Appl. No. 16/144,572, mailed on Feb. 28, 2019, 7 pages.
Notice of Allowance received for U.S. Appl. No. 16/147,432, mailed on Dec. 18, 2018, 13 pages.
Notice of Allowance received for U.S. Appl. No. 16/147,432, mailed on May 20, 2019, 6 pages.
Notice of Allowance received for U.S. Appl. No. 16/383,403, mailed on Jan. 10, 2020, 11 pages.
Notice of Allowance received for U.S. Appl. No. 16/511,578, mailed on Nov. 18, 2019, 12 pages.
Notice of Allowance received for U.S. Appl. No. 16/790,619, mailed on Sep. 8, 2020, 6 pages.
Notice of Allowance received for U.S. Appl. No. 16/799,481, mailed on Sep. 8, 2020, 6 pages.
Notice of Allowance received for U.S. Appl. No. 17/026,818, mailed on May 13, 2021, 10 pages.
Notice of Allowance received for U.S. Appl. No. 17/027,373, mailed on Aug. 2, 2022, 2 pages.
Notice of Allowance received for U.S. Appl. No. 17/027,373, mailed on Jun. 3, 2022, 8 pages.
Notice of Allowance received for U.S. Appl. No. 17/027,373, mailed on Oct. 3, 2022, 5 pages.
Notice of Allowance received for U.S. Appl. No. 17/121,610, mailed on Jul. 7, 2022, 5 pages.
Notice of Allowance received for U.S. Appl. No. 17/121,610, mailed on Jul. 13, 2022, 4 pages.
Notice of Allowance received for U.S. Appl. No. 17/121,610, mailed on Mar. 11, 2022, 5 pages.
Notice of Allowance received for U.S. Appl. No. 17/157,166, mailed on Mar. 30, 2022, 6 pages.

(56) References Cited

OTHER PUBLICATIONS

Notice of Allowance received for U.S. Appl. No. 17/479,897, mailed on Jul. 26, 2023, 7 pages.
Notice of Allowance received for U.S. Appl. No. 17/479,897, mailed on Oct. 3, 2023, 5 pages.
Notice of Allowance received for U.S. Appl. No. 17/482,977, mailed on Jan. 24, 2023, 10 pages.
Notice of Allowance received for U.S. Appl. No. 17/482,987, mailed on Jun. 23, 2022, 9 pages.
Notice of Allowance received for U.S. Appl. No. 17/482,987, mailed on May 11, 2022, 10 pages.
Notice of Allowance received for U.S. Appl. No. 17/483,542, mailed on Aug. 11, 2023, 9 pages.
Notice of Allowance received for U.S. Appl. No. 17/483,542, mailed on Dec. 20, 2023, 6 pages.
Notice of Allowance received for U.S. Appl. No. 17/483,549, mailed on Apr. 15, 2022, 10 pages.
Notice of Allowance received for U.S. Appl. No. 17/483,564, mailed on Jul. 17, 2023, 46 pages.
Notice of Allowance received for U.S. Appl. No. 17/483,582, mailed on Apr. 19, 2022, 5 pages.
Notice of Allowance received for U.S. Appl. No. 17/483,582, mailed on Jan. 20, 2022, 10 pages.
Notice of Allowance received for U.S. Appl. No. 17/484,907, mailed on Jul. 25, 2022, 10 pages.
Notice of Allowance received for U.S. Appl. No. 17/484,907, mailed on Mar. 2, 2022, 13 pages.
Notice of Allowance received for U.S. Appl. No. 17/484,907, mailed on May 20, 2022, 13 pages.
Notice of Allowance received for U.S. Appl. No. 17/732,204, mailed on Oct. 12, 2023, 8 pages.
Notice of Allowance received for U.S. Appl. No. 17/740,104, mailed on Oct. 4, 2023, 5 pages.
Notice of Allowance received for U.S. Appl. No. 17/872,736, mailed on Aug. 21, 2023, 6 pages.
Notice of Allowance received for U.S. Appl. No. 17/872,736, mailed on Aug. 30, 2023, 4 pages.
Notice of Allowance received for U.S. Appl. No. 17/950,900, mailed on Jun. 16, 2023, 6 pages.
Notice of Allowance received for U.S. Appl. No. 17/950,900, mailed on Mar. 7, 2023, 10 pages.
Notice of Allowance received for U.S. Appl. No. 17/950,922, mailed on Apr. 5, 2023, 10 pages.
Notice of Allowance received for U.S. Appl. No. 17/950,922, mailed on Sep. 20, 2023, 6 pages.
Notice of Hearing received for Indian Patent Application No. 201814036860, mailed on Sep. 8, 2023, 2 pages.
Office Action received for Australian Patent Application No. 2019100499, mailed on Jun. 28, 2019., 4 pages.
Office Action received for Australian Patent Application No. 2019101062, mailed on Apr. 22, 2020, 2 pages.
Office Action received for Australian Patent Application No. 2019101062, mailed on Dec. 5, 2019, 3 pages.
Office Action received for Australian Patent Application No. 2019266225, mailed on Nov. 23, 2020, 4 pages.
Office Action received for Australian Patent Application No. 2020239711, mailed on Sep. 13, 2021, 5 pages.
Office Action received for Australian Patent Application No. 2021203903, mailed on Feb. 24, 2022, 3 pages.
Office Action received for Australian Patent Application No. 2022201532, mailed on Dec. 19, 2022, 5 pages.
Office Action received for Australian Patent Application No. 2022228207, mailed on Apr. 28, 2023, 3 pages.
Office Action received for Australian Patent Application No. 2023204396, mailed on Jan. 8, 2024, 5 pages.
Office Action received for Australian Patent Application No. 2023248185, mailed on Nov. 22, 2023, 2 pages.
Office Action received for Australian Patent Application No. 2023248185, mailed on Oct. 20, 2023, 3 pages.
Office Action received for Chinese Patent Application No. 201880056514.5, mailed on Sep. 2, 2020, 7 pages (1 page of English Translation and 6 pages of Official Copy).
Office Action received for Chinese Patent Application No. 201910400179.2, mailed on Dec. 27, 2021, 32 pages (13 pages of English Translation and 19 pages of Official Copy).
Office Action received for Chinese Patent Application No. 201910400180.5, mailed on Jun. 1, 2020, 11 pages (5 pages of English Translation and 6 pages of Official Copy).
Office Action received for Chinese Patent Application No. 201910704856.X, mailed on Apr. 6, 2021, 13 pages (7 pages of English Translation and 6 pages of Official Copy).
Office Action received for Chinese Patent Application No. 201910704856.X, mailed on Dec. 9, 2020, 23 pages (13 pages of English Translation and 10 pages of Official Copy).
Office Action received for Chinese Patent Application No. 201910704856.X, mailed on May 27, 2020, 26 pages (14 pages of English Translation and 12 pages of Official Copy).
Office Action received for Chinese Patent Application No. 202010126661.4, mailed on Feb. 3, 2021, 16 pages (9 pages of English Translation and 7 pages of Official Copy).
Office Action received for Chinese Patent Application No. 202010126661.4, mailed on Jun. 2, 2022, 11 pages (7 pages of English Translation and 4 pages of Official Copy).
Office Action received for Chinese Patent Application No. 202010126661.4, mailed on Mar. 4, 2022, 13 pages (8 pages of English Translation and 5 pages of Official Copy).
Office Action received for Chinese Patent Application No. 202011243876.0, mailed on Apr. 6, 2021, 11 pages (5 pages of English Translation and 6 pages of Official Copy).
Office Action received for Chinese Patent Application No. 202110327012.5, mailed on Apr. 29, 2022, 17 pages (10 pages of English Translation and 7 pages of Official Copy).
Office Action received for Chinese Patent Application No. 202110327012.5, mailed on Mar. 16, 2023, 12 pages (7 pages of English Translation and 5 pages of Official Copy).
Office Action received for Chinese Patent Application No. 202110327012.5, mailed on Nov. 28, 2022, 16 pages (10 pages of English Translation and 6 pages of Official Copy).
Office Action received for Chinese Patent Application No. 202110328597.2, mailed on Apr. 15, 2022, 18 pages (9 pages of English Translation and 9 pages of Official Copy).
Office Action received for Chinese Patent Application No. 202110328597.2, mailed on Jul. 18, 2023, 21 pages (6 pages of English Translation and 15 pages of Official Copy).
Office Action received for Chinese Patent Application No. 202110328597.2, mailed on May 15, 2023, 13 pages (6 pages of English Translation and 7 pages of Official Copy).
Office Action received for Chinese Patent Application No. 202110328597.2, mailed on Oct. 10, 2022, 13 pages (7 pages of English Translation and 6 pages of Official Copy).
Office Action received for Chinese Patent Application No. 202110328601.5, mailed on Apr. 27, 2022, 25 pages (14 pages of English Translation and 11 pages of Official Copy).
Office Action received for Chinese Patent Application No. 202110328601.5, mailed on Mar. 24, 2023, 25 pages (15 pages of English Translation and 10 pages of Official Copy).
Office Action received for Chinese Patent Application No. 202110328601.5, mailed on Nov. 2, 2022, 29 pages (19 pages of English Translation and 10 pages of Official Copy).
Office Action received for Chinese Patent Application No. 202110328602.X, mailed on Dec. 1, 2022, 28 pages (17 pages of English Translation 11 pages of Official Copy).
Office Action received for Chinese Patent Application No. 202110328602.X, mailed on Jun. 29, 2023, 27 pages (18 pages of English Translation and 9 pages of Official Copy).
Office Action received for Chinese Patent Application No. 202110328602.X, mailed on Mar. 24, 2022, 6 pages (3 pages of English Translation and 3 pages of Official Copy).
Office Action received for Chinese Patent Application No. 202111652452.4, mailed on Aug. 29, 2022, 23 pages (12 pages of English Translation and 11 pages of Official Copy).

(56) References Cited

OTHER PUBLICATIONS

Office Action received for Chinese Patent Application No. 202111652452.4, mailed on Feb. 11, 2023, 28 pages (13 pages of English Translation and 15 pages of Official Copy).
Office Action received for Chinese Patent Application No. 202111652452.4, mailed on May 19, 2023, 15 pages (8 pages of English Translation and 7 pages of Official Copy).
Office Action received for Danish Patent Application No. PA201870362, mailed on Aug. 22, 2019, 4 pages.
Office Action received for Danish Patent Application No. PA201870362, mailed on Dec. 18, 2018, 2 pages.
Office Action received for Danish Patent Application No. PA201870363, mailed on Mar. 26, 2019, 3 pages.
Office Action received for Danish Patent Application No. PA201870364, mailed on Jan. 28, 2019, 8 pages.
Office Action received for Danish Patent Application No. PA201870364, mailed on Jun. 11, 2019, 11 pages.
Office Action received for Danish Patent Application No. PA202070617, mailed on Sep. 24, 2021, 4 pages.
Office Action received for European Patent Application No. 18779093.6, mailed on Dec. 11, 2020, 4 pages.
Office Action received for European Patent Application No. 18779093.6, mailed on Jun. 28, 2023, 4 pages.
Office Action received for European Patent Application No. 18779093.6, mailed on Mar. 17, 2022, 4 pages.
Office Action received for European Patent Application No. 19729395.4, mailed on Jul. 15, 2020, 4 pages.
Office Action received for European Patent Application No. 19729395.4, mailed on Sep. 29, 2020, 10 pages.
Office Action received for European Patent Application No. 20166552.8, mailed on Mar. 24, 2021, 8 pages.
Office Action received for European Patent Application No. 20166552.8, mailed on Nov. 3, 2023, 3 pages.
Office Action received for European Patent Application No. 20205496.1, mailed on Nov. 10, 2021, 5 pages.
Office Action received for European Patent Application No. 21728781.2, mailed on Mar. 1, 2023, 13 pages.
Office Action received for Indian Patent Application No. 201814036860, mailed on Jul. 29, 2021, 8 pages.
Office Action received for Indian Patent Application No. 202014041529, mailed on Dec. 6, 2021, 6 pages.
Office Action received for Indian Patent Application No. 202015013360, mailed on Mar. 17, 2023, 7 pages.
Office Action received for Indian Patent Application No. 202215025360, mailed on Mar. 29, 2023, 6 pages.
Office Action received for Indian Patent Application No. 202215025361, mailed on Mar. 29, 2023, 6 pages.
Office Action received for Indian Patent Application No. 202215025363, mailed on Mar. 29, 2023, 6 pages.
Office Action received for Indian Patent Application No. 202215025364, mailed on Mar. 29, 2023, 6 pages.
Office Action received for Japanese Patent Application No. 2019-194597, mailed on Jan. 18, 2021, 10 pages (5 pages of English Translation and 5 pages of Official Copy).
Office Action received for Japanese Patent Application No. 2020-159840, mailed on Dec. 10, 2021, 13 pages (7 pages of English Translation and 6 pages of Official Copy).
Office Action received for Japanese Patent Application No. 2020-159840, mailed on Mar. 28, 2022, 6 pages (3 pages of English Translation and 3 pages of Official Copy).
Office Action received for Japanese Patent Application No. 2021-206121, mailed on Feb. 20, 2023, 7 pages (3 pages of English Translation and 4 pages of Official Copy).
Office Action received for Korean Patent Application No. 10-2020-7032110, mailed on Dec. 15, 2020, 6 pages (2 pages of English Translation and 4 pages of official Copy).
Office Action received for Korean Patent Application No. 10-2021-7017731, mailed on May 30, 2022, 5 pages (2 pages of English Translation and 3 pages of Official Copy).
Office Action received for Korean Patent Application No. 10-2023-0001668, mailed on Nov. 3, 2023, 5 pages (2 pages of English Translation and 3 pages of Official Copy).
QQ, "Method of QQ voice chat", Online Available at: https://www.taodocs.com/p-47909082.html, May 25, 2016, 3 pages (Official Copy only) See Communication Under Rule 37 CFR § 1.98(a) (3).
Result of Consultation received for European Patent Application No. 19729395.4, mailed on Jun. 22, 2021, 3 pages.
Result of Consultation received for European Patent Application No. 19729395.4, mailed on Jun. 23, 2021, 3 pages.
Result of Consultation received for European Patent Application No. 20205496.1, mailed on Apr. 18, 2023, 3 pages.
Rossignol Joe, "iOS 10 Concept Simplifies Lock Screen with Collapsed Notifications", Available online at: https://www.macrumors.com/2016/06/16/ios-10-collapsed-notifications-concept/, Jun. 16, 2016, 10 pages.
Search Report and Opinion received for Danish Patent Application No. PA201870362, mailed on Sep. 7, 2018, 9 pages.
Search Report and Opinion received for Danish Patent Application No. PA201870363, mailed on Sep. 11, 2018, 12 pages.
Search Report and Opinion received for Danish Patent Application No. PA201870364, mailed on Sep. 4, 2018, 12 pages.
Search Report and Opinion received for Danish Patent Application No. PA202070617, mailed on Dec. 23, 2020, 8 pages.
Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
Shangmeng Li, "The Design and Implementation of Mobile Terminal System of Multimedia Conference Based on Symbian Operating System", China Academic Journal Electronic Publishing House, online available at: http://www.cnki.net, 2011, 66 pages (Official Copy only) See Communication Under Rule 37 CFR § 1.98(a) (3).
Song Jianhua, "Guidelines for Network", Feb. 29, 2008, 11 pages (Official Copy Only) See Communication Under Rule 37 CFR § 1.98(a) (3).
Summons to Attend Oral Proceedings received for European Patent Application No. 19729395.4, mailed on Mar. 11, 2021, 7 pages.
Summons to Attend Oral Proceedings received for European Patent Application No. 19729395.4, mailed on Mar. 19, 2021, 9 pages.
Summons to Attend Oral Proceedings received for European Patent Application No. 20205496.1, mailed on Sep. 8, 2022, 9 pages.
Non-Final Office Action received for U.S. Appl. No. 18/367,977, mailed on May 29, 2025, 20 pages.
Office Action received for Chinese Patent Application No. 202410030102.1, mailed on Apr. 24, 2025, 11 pages (6 pages of English Translation and 5 pages of Official Copy).
Office Action received for Chinese Patent Application No. 202311835200.4, mailed on Apr. 29, 2025, 9 pages (5 pages of English Translation and 4 pages of Official Copy).
Office Action received for European Patent Application No. 23172038.4, mailed on May 22, 2025, 6 pages.
Anonymous, "Split Your Screen with IPEVO Visualizer Software", On IPEVO, Available online at: https://medium.com/ipevo/split-your-screen-with-ipevo-visualizer-software-e9641024d24f, Feb. 24, 2020, 10 pages.
Applicant-Initiated Interview Summary received for U.S. Appl. No. 17/484,899, mailed on Jun. 24, 2024, 4 pages.
Applicant-Initiated Interview Summary received for U.S. Appl. No. 17/950,868, mailed on Jul. 19, 2024, 2 pages.
Applicant-Initiated Interview Summary received for U.S. Appl. No. 17/950,868, mailed on Sep. 10, 2024, 3 pages.
Applicant-Initiated Interview Summary received for U.S. Appl. No. 17/970,417, mailed on Jun. 26, 2024, 2 pages.
Applicant-Initiated Interview Summary received for U.S. Appl. No. 18/067,350, mailed on Jul. 29, 2024, 3 pages.
Corrected Notice of Allowance received for U.S. Appl. No. 17/903,946, mailed on Sep. 3, 2024, 2 pages.
Cosmic, Mook, "LINE laboratory, New function Exhaustive Coverage! LINE 120% Application Guide, Inc.", Jan. 24, 2018, 7 pages (Official Copy Only). {See Communication under Rule 37 CFR § 1.98(a) (3)}.

(56) References Cited

OTHER PUBLICATIONS

Decision to Grant received for Japanese Patent Application No. 2023-571312, mailed on Aug. 29, 2024, 3 pages (1 page of English Translation and 2 pages of Official Copy).
Decision to Grant received for Japanese Patent Application No. 2024-003876, mailed on Sep. 2, 2024, 3 pages (1 page of English Translation and 2 pages of Official Copy).
Examiner-Initiated Interview Summary received for U.S. Appl. No. 17/950,868, mailed on Jul. 5, 2024, 2 pages.
Extended European Search Report received for European Patent Application No. 24159026.4, mailed on Jul. 10, 2024, 9 pages.
Final Office Action received for U.S. Appl. No. 17/950,868, mailed on Aug. 29, 2024, 13 pages.
Final Office Action received for U.S. Appl. No. 17/970,417, mailed on Sep. 18, 2024, 24 pages.
International Search Report and Written Opinion received for PCT Patent Application No. PCT/US2024/017017, mailed on Aug. 2, 2024, 27 pages.
Myoko, Mori, “Line Perfect Guide Book [Revised Version]”. Sotec Co. Ltd., Dec. 31, 2013, 5 pages (Official Copy Only). {See Communication under Rule 37 CFR § 1.98(a) (3)}.
Non-Final Office Action received for U.S. Appl. No. 18/380,116, mailed on Jul. 18, 2024, 16 pages.
Non-Final Office Action received for U.S. Appl. No. 18/389,655, mailed on Aug. 23, 2024, 23 pages.
Notice of Allowance received for Japanese Patent Application No. 2023-097196, mailed on Jul. 29, 2024, 4 pages (1 page of English Translation and 3 pages of Official Copy).
Notice of Allowance received for Japanese Patent Application No. 2023-571161, mailed on Jul. 30, 2024, 3 pages (1 page of English Translation and 2 pages of Official Copy).
Notice of Allowance received for Korean Patent Application No. 10-2023-0001668, mailed on May 22, 2024, 6 pages (2 pages of English Translation and 4 pages of Official Copy).
Notice of Allowance received for Korean Patent Application No. 10-2023-7040599, mailed on Jun. 26, 2024, 7 pages (2 pages of English Translation and 5 pages of Official Copy).
Notice of Allowance received for U.S. Appl. No. 17/484,899, mailed on Aug. 26, 2024, 21 pages.
Notice of Allowance received for U.S. Appl. No. 17/684,843, mailed on Sep. 17, 2024, 5 pages.
Notice of Allowance received for U.S. Appl. No. 17/903,946, mailed on Aug. 27, 2024, 5 pages.
Octoba, “Enjoy free calls with LINE! Part 2”, retrieved from: https://web.archive.org/web/20170923013859/https://octoba.net/archives/line-call2.html, Sep. 23, 2017, 13 pages (Official Copy Only). {See Communication under Rule 37 CFR § 1.98(a) (3)}.
Office Action received for Chinese Patent Application No. 201910704856.X, mailed on Jun. 11, 2024, 33 pages (1 page of English Translation and 32 pages of Official Copy).
Office Action received for Chinese Patent Application No. 201910704856.X, mailed on Jun. 23, 2024, 12 pages (6 pages of English Translation and 6 pages of Official Copy).
Office Action received for Chinese Patent Application No. 202311185909.4, mailed on Jun. 12, 2024, 18 pages (10 pages of English Translation and 8 pages of Official Copy).
Office Action received for Chinese Patent Application No. 202410030102.1. mailed on Jul. 23, 2024, 18 pages (9 pages of English Translation and 9 pages of Official Copy).
Office Action received for European Patent Application No. 22792995.7, mailed on Jun. 24, 2024, 6 pages.
Office Action received for Japanese Patent Application No. 2023-028786, mailed on Aug. 23, 2024, 10 pages (5 pages of English Translation and 5 pages of Official Copy).
Office Action received for Japanese Patent Application No. 2023-097196, mailed on Jun. 7, 2024, 7 pages (3 pages of English Translation and 4 pages of Official Copy).
Office Action received for Japanese Patent Application No. 2023-571312, mailed on Jul. 16, 2024, 4 pages (2 pages of English Translation and 2 pages of Official Copy).
Office Action received for Japanese Patent Application No. 2024-003876, mailed on Jul. 2, 2024, 3 pages (1 page of English Translation and 2 pages of Official Copy).
Office Action received for Korean Patent Application No. 10-2024-7019962, mailed on Jul. 16, 2024, 6 pages (2 pages of English Translation and 4 pages of Official Copy).
That Guy who Loves METV and SSBB MODS. “Kinect Party Gameplay”, Available online at: https://youtu.be/bkbOlzfyLzc?si=QAAKh_V4aqY0iegL, Oct. 20, 2021, 2 pages.
Xbox, “Kinect Tips, Part 3: Gesture Controls”, Available online at: https://youtu.be/VXhhE-I96qQ?si=gLmHbp9jOm-w0fNW, May 7, 2014, 3 pages.
Advisory Action received for U.S. Appl. No. 17/970,417, mailed on Dec. 12, 2024, 7 pages.
Applicant-Initiated Interview Summary received for U.S. Appl. No. 18/067,350, mailed on Nov. 26, 2024, 3 pages.
Applicant-Initiated Interview Summary received for U.S. Appl. No. 18/140,449, mailed on Nov. 26, 2024, 2 pages.
Corrected Notice of Allowance received for U.S. Appl. No. 17/745,680, mailed on Nov. 20, 2024, 2 pages.
Corrected Notice of Allowance received for U.S. Appl. No. 17/950,868, mailed on Nov. 27, 2024, 3 pages.
Corrected Notice of Allowance received for U.S. Appl. No. 18/138,348, mailed on Nov. 27, 2024, 2 pages.
Decision to Grant received for European Patent Application No. 22734711.9, mailed on Jan. 7, 2025, 2 pages.
Extended European Search Report received for European Patent Application No. 24215184.3, mailed on Jan. 24, 2025, 11 pages.
Final Office Action received for U.S. Appl. No. 18/380,116, mailed on Jan. 30, 2025, 17 pages.
Intention to Grant received for European Patent Application No. 24160234.1, mailed on Nov. 4, 2024, 9 pages.
International Preliminary Report on Patentability received for PCT Patent Application No. PCT/US2023/020569, mailed on Nov. 21, 2024, 16 pages.
International Search Report and Written Opinion received for PCT Patent Application No. PCT/US2024/023231, mailed on Oct. 23, 2024, 24 pages.
Invitation to Pay Additional Fees and Partial International Search Report received for PCT Patent Application No. PCT/US2024/023231, mailed on Aug. 29, 2024, 17 pages.
Notice of Allowance received for Chinese Patent Application No. 202311831154.0, mailed on Jan. 17, 2025, 4 pages (1 page of English Translation and 3 pages of Official Copy).
Notice of Allowance received for Japanese Patent Application No. 2023-028786, mailed on Dec. 2, 2024, 4 pages (1 page of English Translation and 3 pages of Official Copy).
Notice of Allowance received for Korean Patent Application No. 10-2024-0112016, mailed on Dec. 2, 2024, 6 pages (2 pages of English Translation and 4 pages of Official Copy).
Notice of Allowance received for U.S. Appl. No. 17/483,679, mailed on Jan. 29, 2025, 5 pages.
Notice of Allowance received for U.S. Appl. No. 17/483,679, mailed on Nov. 21, 2024, 8 pages.
Notice of Allowance received for U.S. Appl. No. 17/484,899, mailed on Jan. 16, 2025, 16 pages.
Notice of Allowance received for U.S. Appl. No. 17/745,680, mailed on Dec. 12, 2024, 2 pages.
Notice of Allowance received for U.S. Appl. No. 17/745,680, mailed on Nov. 12, 2024, 8 pages.
Notice of Allowance received for U.S. Appl. No. 18/138,348, mailed on Nov. 13, 2024, 10 pages.
Notice of Allowance received for U.S. Appl. No. 18/140,449, mailed on Jan. 21, 2025, 10 pages.
Notice of Allowance received for U.S. Appl. No. 18/389,655, mailed on Nov. 27, 2024, 8 pages.
Notice of Hearing received for Indian Patent Application No. 202015013360, mailed on Dec. 26, 2024, 2 pages.
Office Action received for Japanese Patent Application No. 2024-146741, mailed on Nov. 25, 2024, 12 pages (6 pages of English Translation and 6 pages of Official Copy).
Advisory Action received for U.S. Appl. No. 18/380,116, mailed on May 21, 2025, 4 pages.

(56) References Cited

OTHER PUBLICATIONS

Corrected Notice of Allowance received for U.S. Appl. No. 18/499,848, mailed on May 19, 2025, 3 pages.
Intention to Grant received for European Patent Application No. 18779093.6, mailed on May 9, 2025, 9 pages.
Non-Final Office Action received for U.S. Appl. No. 18/242,363, mailed on May 13, 2025, 29 pages.
Notice of Allowance received for Chinese Patent Application No. 202311185909.4, mailed on Apr. 30, 2025, 3 pages (2 pages of English Translation and 1 page of Official Copy).
Notice of Allowance received for Chinese Patent Application No. 202311753064.4, mailed on May 12, 2025, 6 pages (2 pages of English Translation and 4 pages of Official Copy).
Applicant-Initiated Interview Summary received for U.S. Appl. No. 18/499,848, mailed on Feb. 12, 2025, 2 pages.
Corrected Notice of Allowance received for U.S. Appl. No. 17/970,417, mailed on Feb. 20, 2025, 2 pages.
Corrected Notice of Allowance received for U.S. Appl. No. 18/389,655, mailed on Feb. 24, 2025, 2 pages.
Decision to Grant received for Japanese Patent Application No. 2024-173274, mailed on Feb. 10, 2025, 3 pages (1 page of English Translation and 2 pages of Official Copy).
Examiner-Initiated Interview Summary received for U.S. Appl. No. 18/499,848, mailed on Feb. 14, 2025, 3 pages.
Intention to Grant received for European Patent Application No. 22792995.7, mailed on Feb. 17, 2025, 9 pages.
Non-Final Office Action received for U.S. Appl. No. 17/745,680, mailed on Feb. 20, 2025, 28 pages.
Notice of Allowance received for U.S. Appl. No. 17/950,868, mailed on Feb. 12, 2025, 6 pages.
Office Action received for Chinese Patent Application No. 202410030102.1, mailed on Jan. 22, 2025, 14 pages (8 pages of English Translation and 6 pages of Official Copy).
Office Action received for European Patent Application No. 22705232.1, mailed on Feb. 4, 2025, 10 pages.
Office Action received for European Patent Application No. 24160234.1, mailed on Feb. 20, 2025, 3 pages.
Applicant-Initiated Interview Summary received for U.S. Appl. No. 17/484,899, mailed on Feb. 14, 2024, 8 pages.
Applicant-Initiated Interview Summary received for U.S. Appl. No. 18/067,350, mailed on Mar. 13, 2024, 4 pages.
Corrected Notice of Allowance received for U.S. Appl. No. 17/684,843, mailed on Mar. 4, 2024, 2 pages.
Corrected Notice of Allowance received for U.S. Appl. No. 17/903,946, mailed on Apr. 22, 2024, 2 pages.
Decision to Grant received for European Patent Application No. 21728781.2, mailed on Feb. 8, 2024, 3 pages.
Extended European Search Report received for European Patent Application No. 24160234.1, mailed on May 28, 2024, 6 pages.
International Preliminary Report on Patentability received for PCT Patent Application No. PCT/US2022/044592, mailed on Apr. 4, 2024, 21 pages.
International Search Report and Written Opinion received for PCT Patent Application No. PCT/US2023/032792, mailed on Jan. 19, 2024, 15 pages.
International Search Report and Written Opinion received for PCT Patent Application No. PCT/US2023/032911, mailed on Jan. 4, 2024, 18 pages.
Invitation to Pay Additional Fees received for PCT Patent Application No. PCT/US2024/017017. mailed on May 15, 2024, 3 pages.
Non-Final Office Action received for U.S. Appl. No. 17/484,899, mailed on Mar. 21, 2024, 42 pages.
Non-Final Office Action received for U.S. Appl. No. 17/950,868, mailed on Apr. 24, 2024, 16 pages.
Non-Final Office Action received for U.S. Appl. No. 17/970,417, mailed on Apr. 10, 2024. 16 pages.
Non-Final Office Action received for U.S. Appl. No. 18/067,350, mailed on May 28, 2024, 43 pages.
Non-Final Office Action received for U.S. Appl. No. 18/138,348, mailed on Apr. 30, 2024, 16 pages.
Notice of Acceptance received for Australian Patent Application No. 2023204396, mailed on Apr. 15, 2024, 3 pages.
Notice of Acceptance received for Australian Patent Application No. 2024202768, mailed on Jun. 4, 2024, 3 pages.
Notice of Allowance received for Chinese Patent Application No. 202311042451.7, mailed on May 15, 2024, 4 pages (1 page of English Translation and 3 pages of Official Copy).
Notice of Allowance received for Korean Patent Application No. 10-2023-7039382, mailed on Feb. 13, 2024, 6 pages (2 pages of English Translation and 4 pages of Official Copy).
Notice of Allowance received for Korean Patent Application No. 10-2023-7044044, mailed on Mar. 14, 2024, 7 pages (2 pages of English Translation and 5 pages of Official Copy).
Notice of Allowance received for Korean Patent Application No. 10-2024-7000870, mailed on Feb. 13, 2024, 5 pages (2 pages of English Translation and 3 pages of Official Copy).
Notice of Allowance received for U.S. Appl. No. 17/684,843, mailed on Feb. 14, 2024, 8 pages.
Notice of Allowance received for U.S. Appl. No. 17/684,843, mailed on Jun. 5, 2024, 5 pages.
Notice of Allowance received for U.S. Appl. No. 17/903,946, mailed on Apr. 10, 2024, 7 pages.
Office Action received for Chinese Patent Application No. 201910704856.X, mailed on Mar. 8, 2024, 13 pages (7 pages of English Translation and 6 pages of Official Copy).
Office Action received for European Patent Application No. 22705232.1. mailed on May 27. 2024, 7 pages.
Office Action received for Japanese Patent Application No. 2023-028786, mailed on Mar. 22, 2024, 10 pages (5 pages of English Translation and 5 pages of Official Copy).
Office Action received for Japanese Patent Application No. 2023-571161, mailed on May 28, 2024, 4 pages (2 pages of English Translation and 2 pages of Official Copy).
Office Action received for Korean Patent Application No. 10-2023-7018775, mailed on Feb. 28, 2024, 8 pages (3 pages of English Translation and 5 pages of Official Copy).
Office Action received for Korean Patent Application No. 10-2023-7040599, mailed on Mar. 12, 2024, 6 pages (2 pages of English Translation and 4 pages of Official Copy).
Avery et al., "Kinect", Wikipedia, Feb. 26, 2015, 14 pages.
Applicant-Initiated Interview Summary received for U.S. Appl. No. 18/242,363, mailed on Oct. 7, 2025, 5 pages.
Board Decision received for Chinese Patent Application No. 202010126661.4, mailed on Sep. 26, 2025, 27 pages (11 pages of English Translation and 16 pages of Official Copy).
Corrected Notice of Allowance received for U.S. Appl. No. 18/380,116, mailed on Oct. 14, 2025, 20 pages.
Decision to Grant received for European Patent Application No. 22792995.7, mailed on Oct. 9, 2025, 4 pages.
Decision to Grant received for European Patent Application No. 24160234.1, mailed on Oct. 2, 2025, 4 pages.
Extended European Search Report received for European Patent Application No. 25201688.6, mailed on Sep. 29, 2025, 9 pages.
Notice of Allowance received for U.S. Appl. No. 18/380,116, mailed on Oct. 6, 2025, 25 pages.
Applicant-Initiated Interview Summary received for U.S. Appl. No. 18/242,363, mailed on Aug. 18, 2025, 3 pages.
Board Opinion received for Chinese Patent Application No. 202010126661.4, mailed on Jul. 31, 2025, 16 pages (9 pages of English Translation and 7 pages of Official Copy).
Corrected Notice of Allowance received for U.S. Appl. No. 18/498,779, mailed on Sep. 17, 2025, 4 pages.
Corrected Notice of Allowance received for U.S. Appl. No. 18/498,779, mailed on Sep. 30, 2025, 3 pages.
Corrected Notice of Allowance received for U.S. Appl. No. 18/737,710, mailed on Aug. 13, 2025, 2 pages.
Corrected Notice of Allowance received for U.S. Appl. No. 18/737,710, mailed on Sep. 23, 2025, 2 pages.
Decision to Grant received for European Patent Application No. 20166552.8, mailed on Aug. 28, 2025, 4 pages.
Gamexplain, "Making a Call in the Nintendo Switch Online App (Splatoon 2 Voice Chat Test!)", Online Available at: https://www.youtube.com/watch?v=HYtBLcw08_s, Jul. 19, 2017, 1 page.

(56) References Cited

OTHER PUBLICATIONS

Intention to Grant received for European Patent Application No. 24165004.3, mailed on Sep. 11, 2025, 10 pages.
International Preliminary Report on Patentability received for PCT Patent Application No. PCT/US2024/017017, mailed on Sep. 4, 2025, 23 pages.
Non-Final Office Action received for U.S. Appl. No. 18/242,363, mailed on Sep. 24, 2025, 59 pages.
Non-Final Office Action received for U.S. Appl. No. 18/428,549, mailed on Sep. 24, 2025, 13 pages.
Notice of Allowance received for Korean Patent Application No. 10-2024-7043493, mailed on Aug. 26, 2025, 7 pages (2 pages of English Translation and 5 pages of Official Copy).
Notice of Allowance received for Korean Patent Application No. 10-2025-0026405, mailed on Jul. 22, 2025, 7 pages (2 pages of English Translation and 5 pages of Official Copy).
Notice of Allowance received for U.S. Appl. No. 18/737,710, mailed on Sep. 4, 2025, 9 pages.
Office Action received for European Patent Application No. 24215184.3. mailed on Sep. 5, 2025, 6 pages.
Office Action received for Japanese Patent Application No. 2024-146741, mailed on Aug. 25, 2025, 4 pages (2 pages of English Translation and 2 pages of Official Copy).
Brief Communication Regarding Oral Proceedings received for European Patent Application No. 22705232.1, mailed on Nov. 10, 2025, 11 pages.
Corrected Notice of Allowance received for U.S. Appl. No. 18/380,116, mailed on Dec. 22, 2025, 20 pages.
Decision on Appeal received for Mexican Patent Application No. MX/a/2023/005388, mailed on Jan. 7, 2025, 36 pages.
Decision to Refuse received for Japanese Patent Application No. 2024-106235, mailed on Dec. 12, 2025, 23 pages (11 pages of English Translation and 12 pages of Official Copy).
Examiner-Initiated Interview Summary received for U.S. Appl. No. 18/428,549, mailed on Nov. 20, 2025, 2 pages.
Extended European Search Report received for European Patent Application No. 25201240.6, mailed on Dec. 23, 2025, 7 pages.
Extended European Search Report received for European Patent Application No. 25203910.2, mailed on Nov. 25, 2025, 11 pages.
Final Office Action received for U.S. Appl. No. 18/067,350, mailed on Oct. 16, 2025, 55 pages.
Intention to Grant received for European Patent Application No. 22705232.1, mailed on Nov. 26, 2025, 9 pages.
International Preliminary Report on Patentability received for PCT Patent Application No. PCT/US2024/023231, mailed on Nov. 20, 2025, 19 pages.
Notice of Allowance received for Japanese Patent Application No. 2024-146741, mailed on Nov. 25, 2025, 4 pages (1 page of English Translation and 3 pages of Official Copy).
Notice of Allowance received for Korean Patent Application No. 10-2023-7039401, mailed on Aug. 25, 2025, 6 pages (1 page of English Translation and 5 pages of Official Copy).
Notice of Allowance received for Korean Patent Application No. 10-2024-7015406, mailed on Sep. 22, 2025, 6 pages (2 pages of English Translation and 4 pages of Official Copy).
Notice of Allowance received for U.S. Appl. No. 18/077,154, mailed on Nov. 25, 2025, 14 pages.
Notice of Allowance received for U.S. Appl. No. 18/367,977, mailed on Oct. 20, 2025, 9 pages.
Office Action received for Chinese Patent Application No. 202310585927.5, mailed on Oct. 30, 2025, 7 pages (4 pages of English Translation and 3 pages of Official Copy).
Office Action received for Chinese Patent Application No. 202510503352.7, mailed on Nov. 4, 2025, 12 pages (6 pages of English Translation and 6 pages of Official Copy).
Office Action received for European Patent Application No. 22733778.9, mailed on Nov. 18, 2025, 8 pages.
Office Action received for European Patent Application No. 25170895.4, mailed on Nov. 21, 2025, 9 pages.
Office Action received for Indian Patent Application No. 202318051670, mailed on Nov. 28, 2025, 7 pages.
Office Action received for Japanese Patent Application No. 2023-572748, mailed on Oct. 30, 2025, 6 pages (3 pages of English Translation and 3 pages of Official Copy).
Office Action received for Japanese Patent Application No. 2024-212271, mailed on Oct. 6, 2025, 4 pages (2 pages of English Translation and 2 pages of Official Copy).
Office Action received for Korean Patent Application No. 10-2024-7013375, mailed on Dec. 2, 2025, 13 pages (5 pages of English Translation and 8 pages of Official Copy).
Intention to Grant received for European Patent Application No. 24159026.4, mailed on Feb. 10, 2026, 9 pages.
Result of Consultation received for European Patent Application No. 24159026.4, mailed on Jan. 30, 2026, 3 pages.
Office Action received for European Patent Application No. 24159026.4, mailed on May 19, 2026, 7 pages.
Applicant-Initiated Interview Summary received for U.S. Appl. No. 18/914,913, mailed on Apr. 23, 2026, 3 pages.
Corrected Notice of Allowance received for U.S. Appl. No. 18/077,154, mailed on Jan. 27, 2026, 3 pages.
Corrected Notice of Allowance received for U.S. Appl. No. 18/367,977, mailed on Feb. 10, 2026, 5 pages.
Examiner's Pre-Review Report received for Japanese Patent Application No. 2024-106235, mailed on Apr. 1, 2026, 5 pages (1 page of English Translation and 4 pages of Official Copy).
Extended European Search Report received for European Patent Application No. 25196990.3, mailed on Mar. 11, 2026, 13 pages.
Final Office Action received for U.S. Appl. No. 18/428,549, mailed on Feb. 11, 2026, 12 pages.
Intention to Grant received for European Patent Application No. 22705232.1, mailed on Mar. 4, 2026, 8 pages.
Intention to Grant received for European Patent Application No. 24215184.3, mailed on Feb. 4, 2026, 8 pages.
Non-Final Office Action received for U.S. Appl. No. 18/444,447, mailed on May 7, 2026, 33 pages.
Non-Final Office Action received for U.S. Appl. No. 18/914,913, mailed on Feb. 10, 2026, 11 pages.
Notice of Allowance received for Chinese Patent Application No. 202310585927.5, mailed on Jan. 13, 2026, 3 pages (2 pages of English Translation and 1 page of Official Copy).
Notice of Allowance received for Korean Patent Application No. 10-2024-7015391, mailed on Feb. 17, 2026, 6 pages (2 pages of English Translation and 4 pages of Official Copy).
Notice of Allowance received for Korean Patent Application No. 10-2024-7015406, mailed on Jan. 19, 2026, 6 pages (2 pages of English Translation and 4 pages of Official Copy).
Notice of Allowance received for U.S. Appl. No. 18/242,363, mailed on Jan. 21, 2026, 10 pages.
Notice of Allowance received for U.S. Appl. No. 18/367,977, mailed on Jan. 30, 2026, 9 pages.
Office Action received for Chinese Patent Application No. 202280036185.4, mailed on Mar. 27, 2026, 23 pages (14 pages of English Translation and 9 pages of Official Copy).
Office Action received for Chinese Patent Application No. 202510503352.7, mailed on Feb. 13, 2026, 7 pages (4 pages of English Translation and 3 pages of Official Copy).
Office Action received for Chinese Patent Application No. 202510977559.8, mailed on Feb. 7, 2026, 7 pages (4 pages of English Translation and 3 pages of Official Copy).
Office Action received for European Patent Application No. 23720207.2, mailed on Jan. 23, 2026, 10 pages.
Office Action received for European Patent Application No. 25203910.2, mailed on Mar. 30, 2026, 4 pages.
Office Action received for Indian Patent Application No. 202218005499, mailed on Apr. 15, 2026, 8 pages.
Office Action received for Indian Patent Application No. 202317077439, mailed on Jan. 23, 2026, 14 pages.
Office Action received for Japanese Patent Application No. 2024-170555, mailed on Jan. 22, 2026, 11 pages (6 pages of English Translation and 5 pages of Official Copy).

(56) References Cited

OTHER PUBLICATIONS

Office Action received for Japanese Patent Application No. 2024-212271, mailed on Mar. 18, 2026, 3 pages (1 page of English Translation and 2 pages of Official Copy).

Office Action received for Japanese Patent Application No. 2025-039121, mailed on Apr. 23, 2026, 6 pages (3 pages of English Translation and 3 pages of Official Copy).

Office Action received for Japanese Patent Application No. 2025-260791, mailed on Mar. 16, 2026, 15 pages (8 pages of English Translation and 7 pages of Official Copy).

Samsung UK, "Samsung Galaxy Tab 4 | How To: Multiwindow", Available online at: https://youtu.be/XEDEQc1WMig?si=YyTzlDbmO3rFrfIE, Sep. 9, 2014, 3 pages.

* cited by examiner

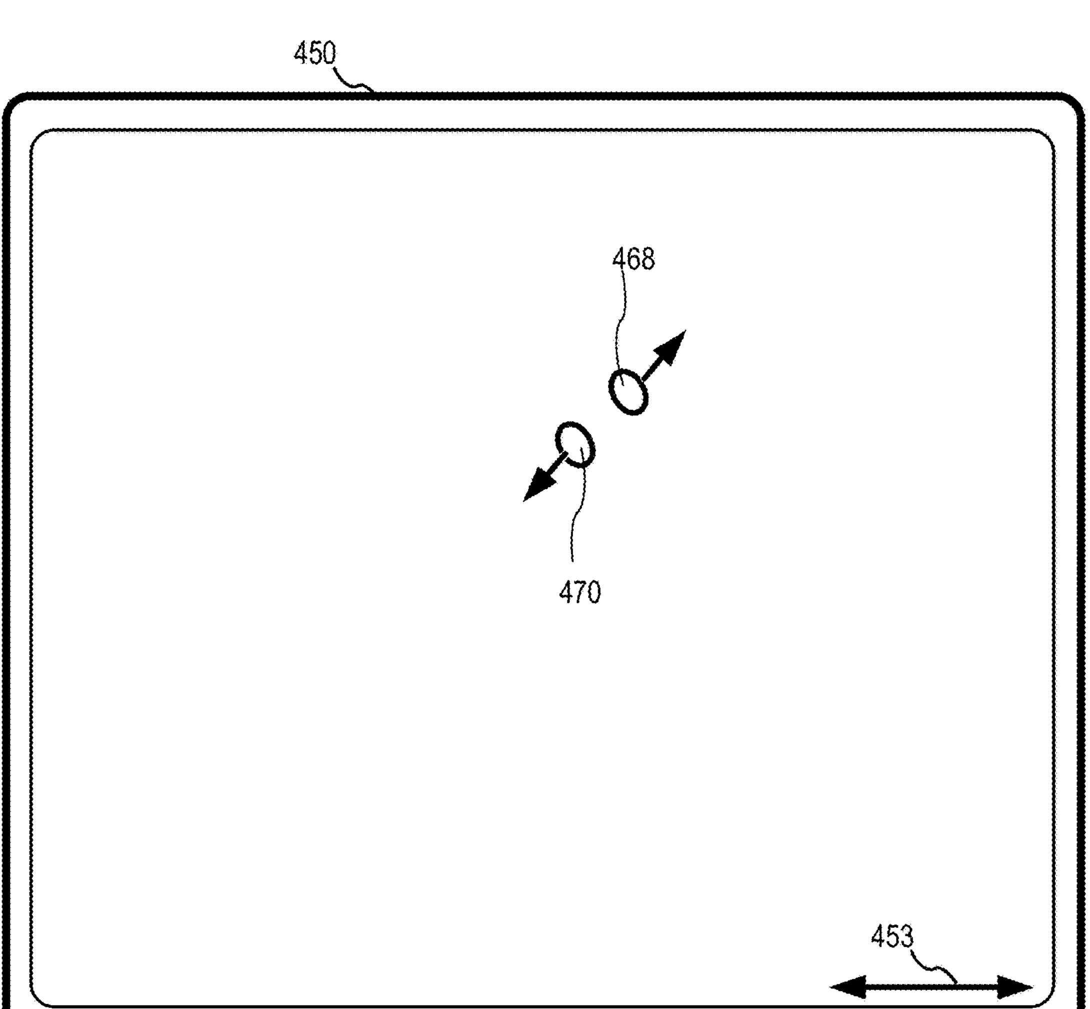
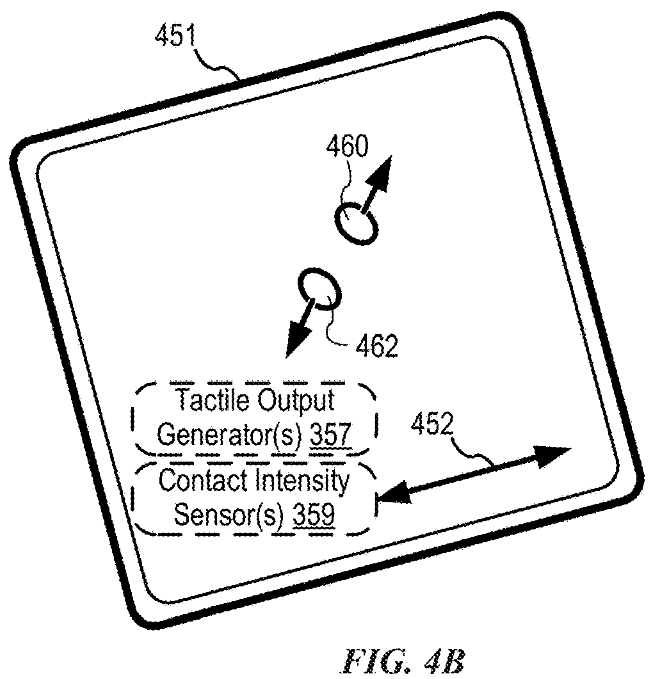
*FIG. 4B*

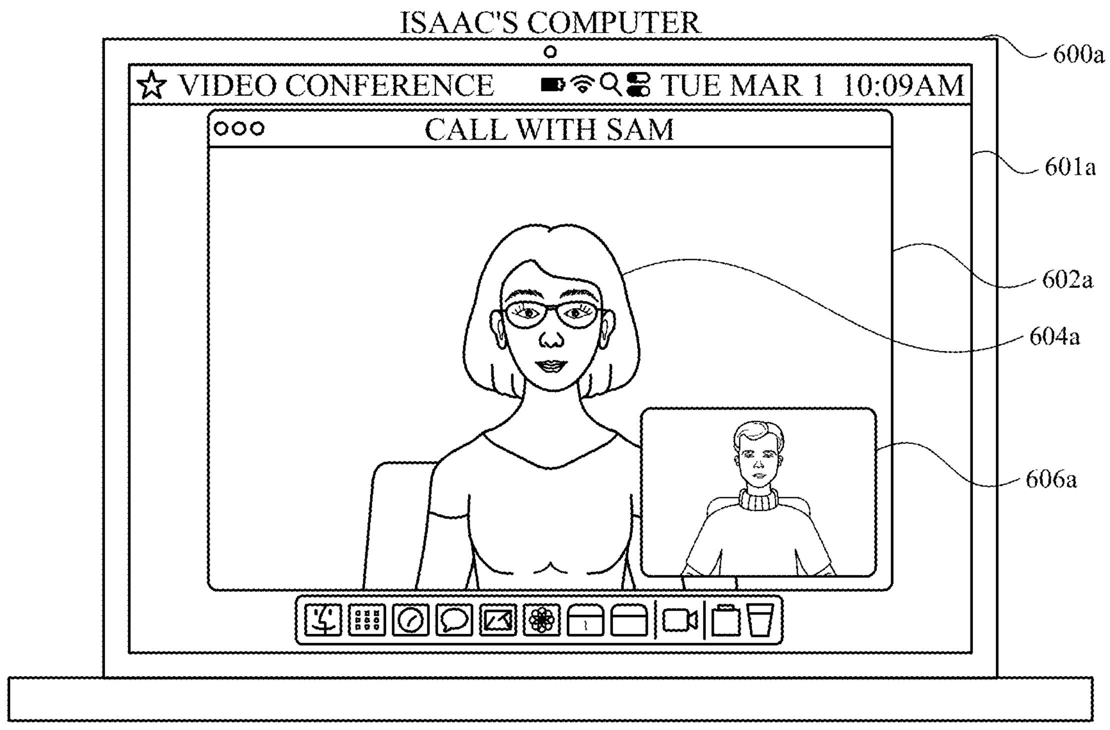
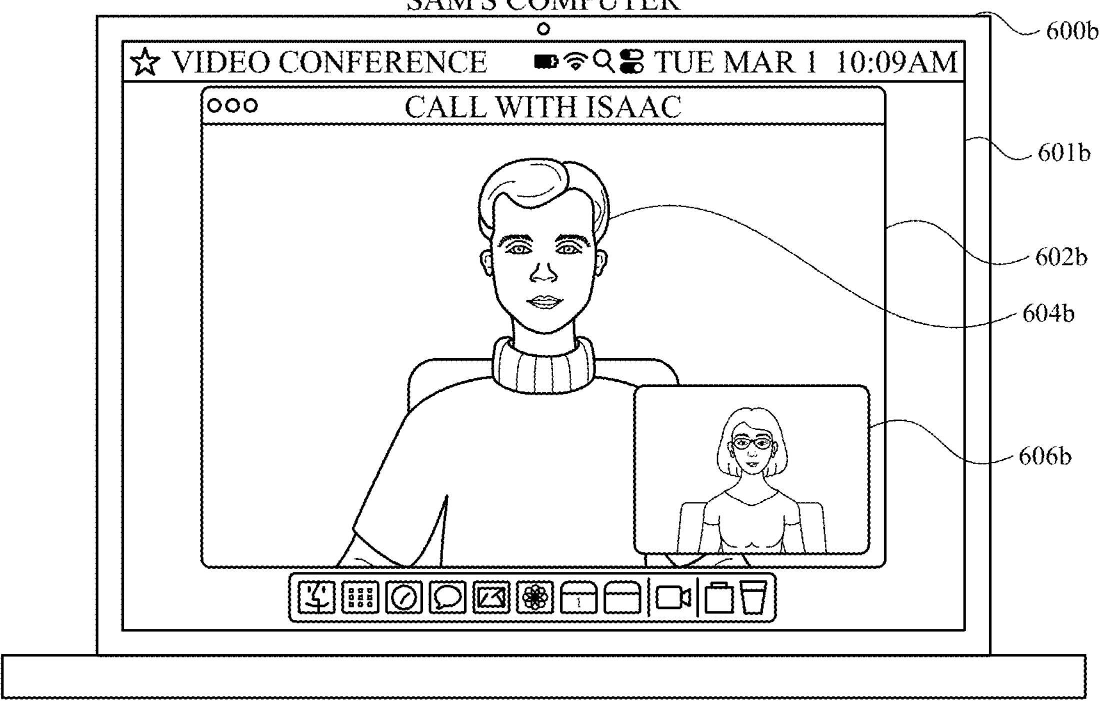
*FIG. 6A*

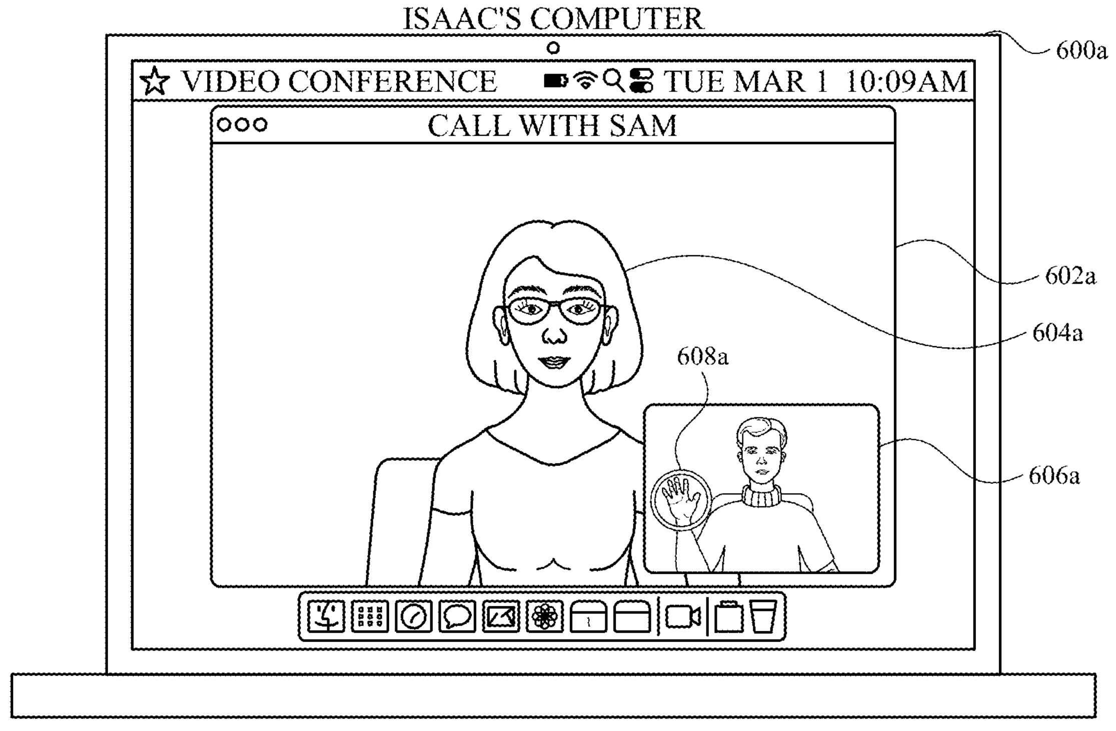
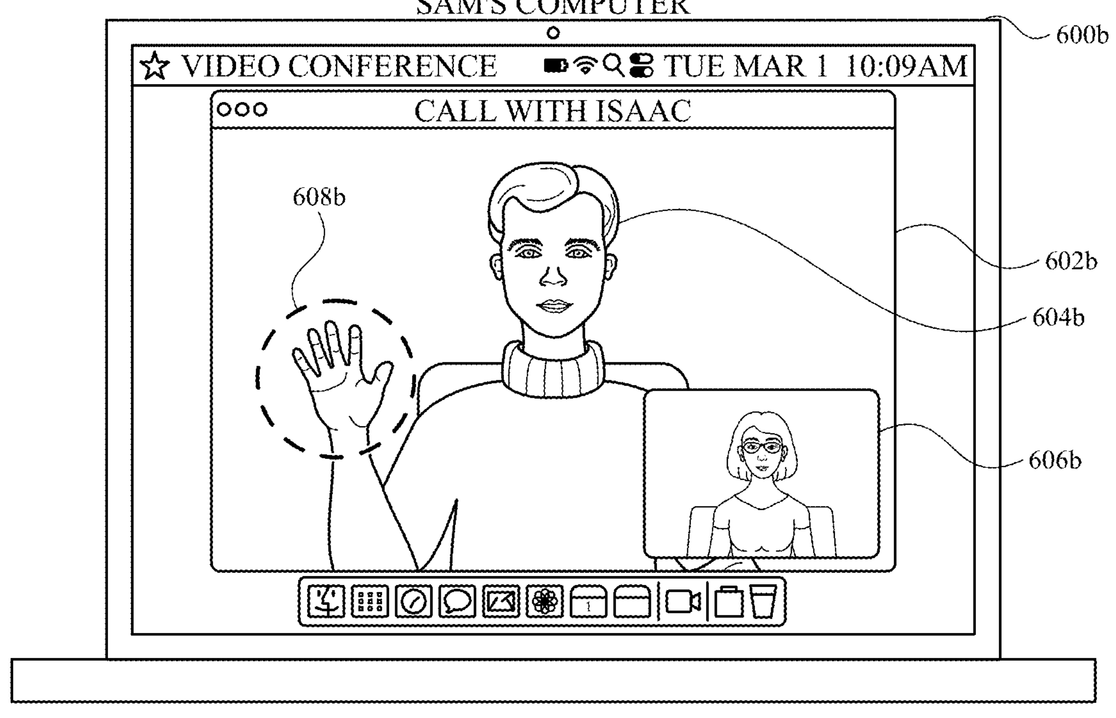
*FIG. 6B*

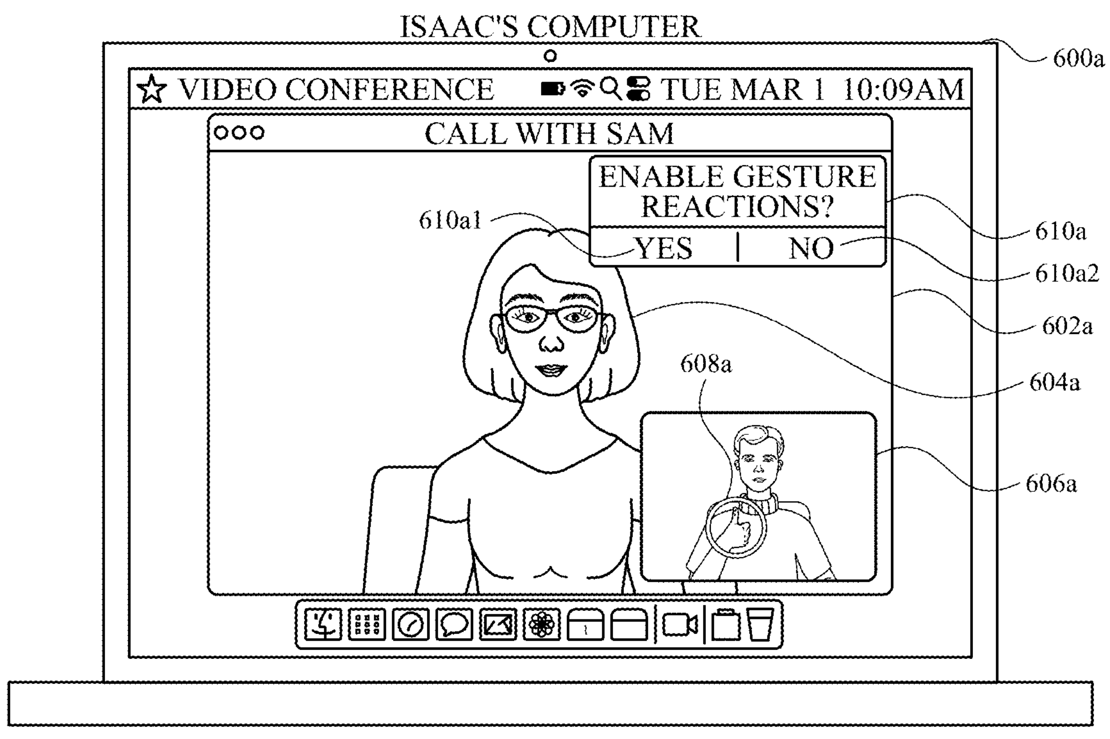
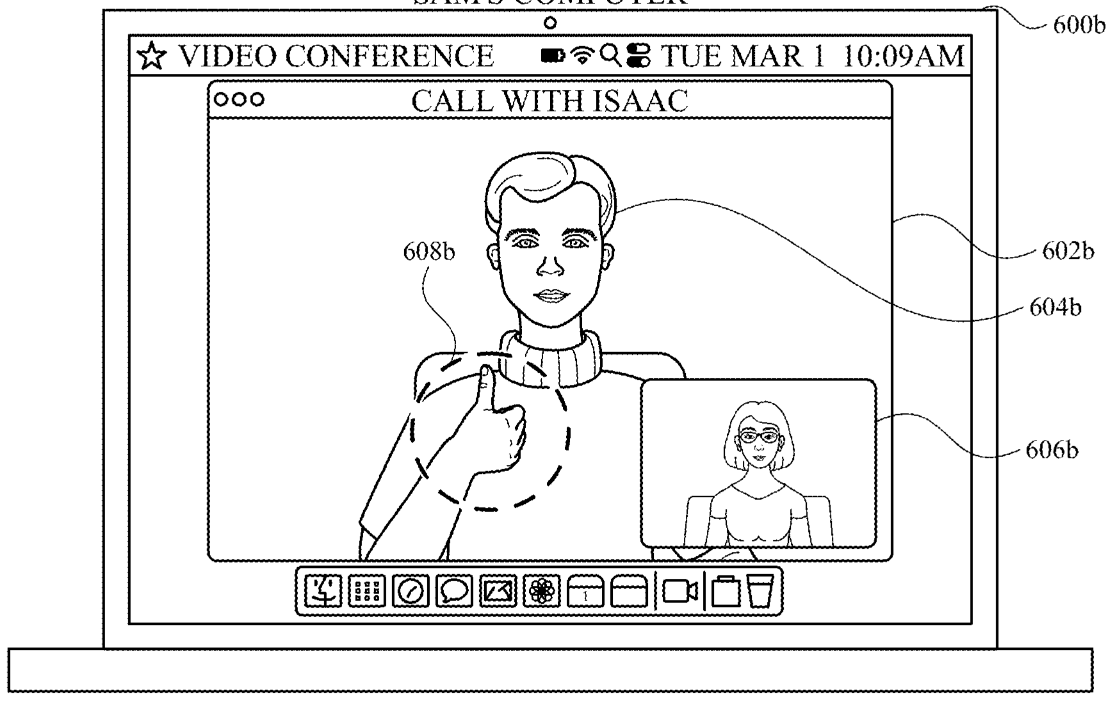
*FIG. 6C*

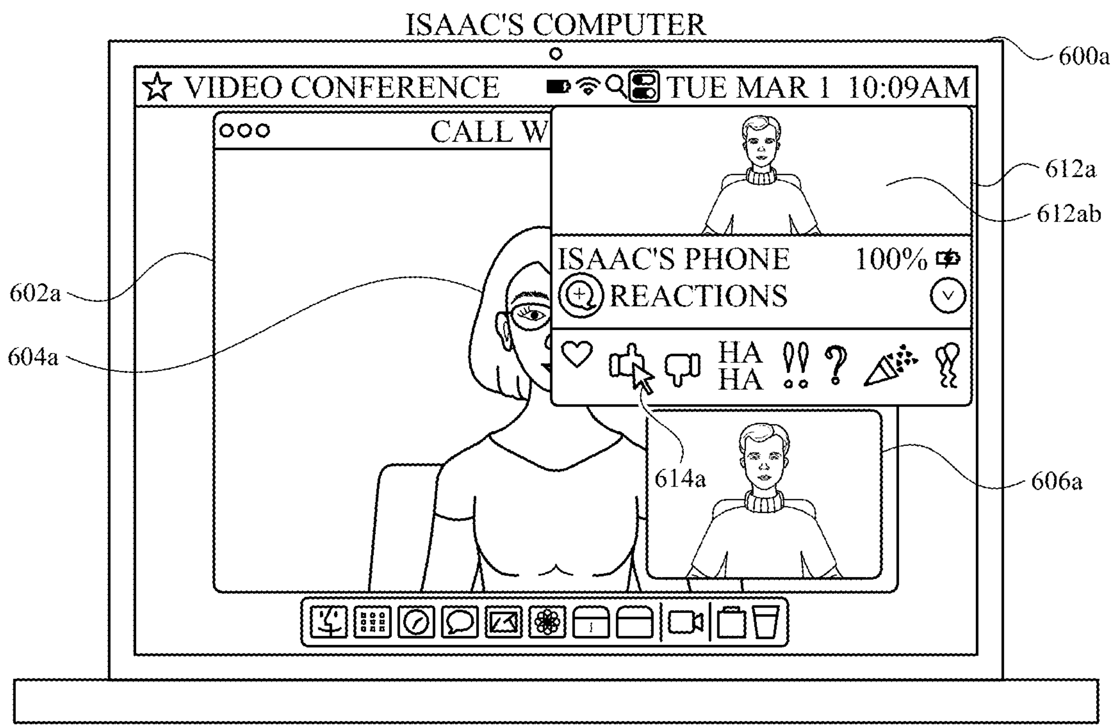
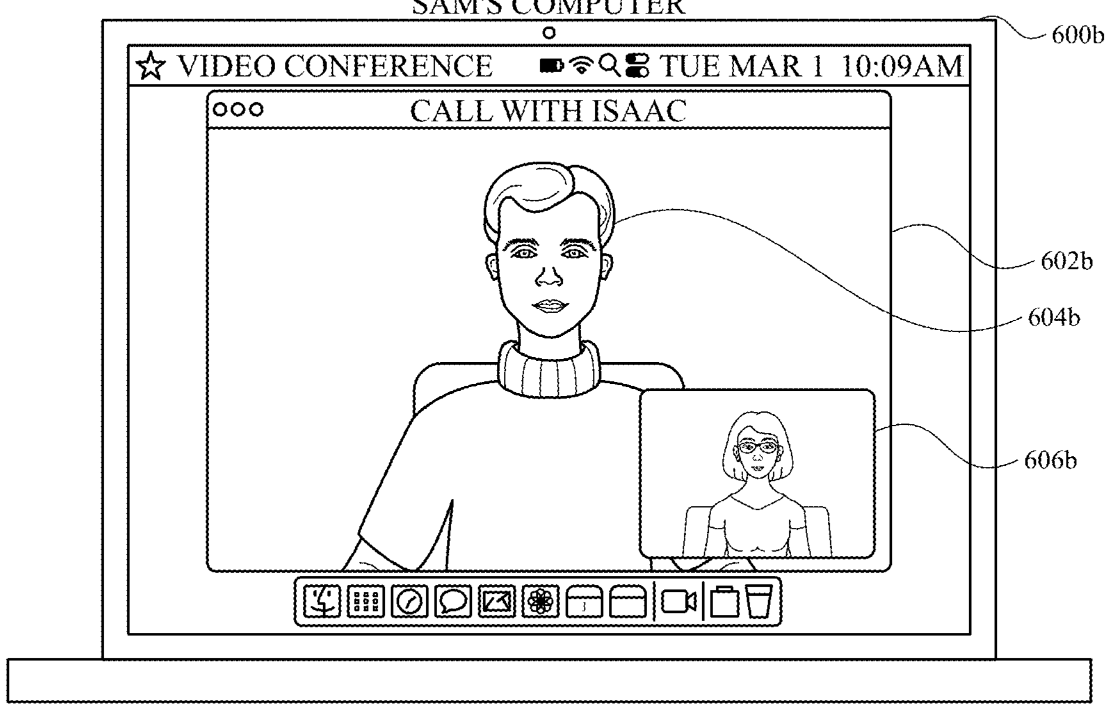
*FIG. 6D*

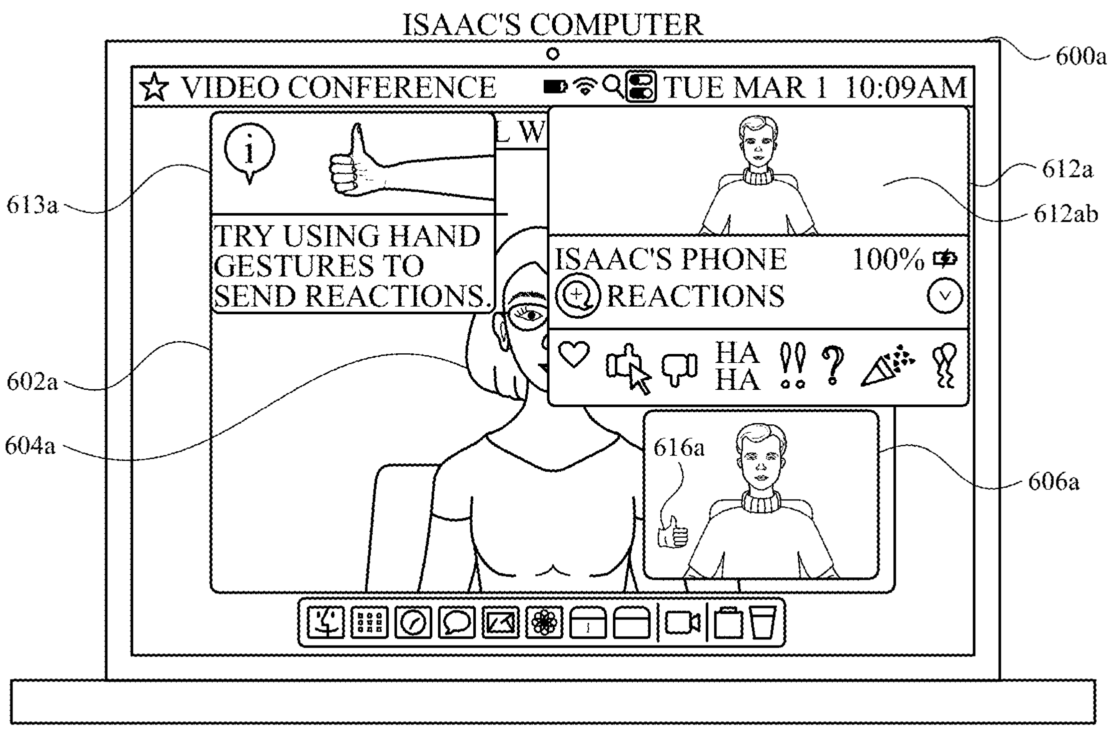
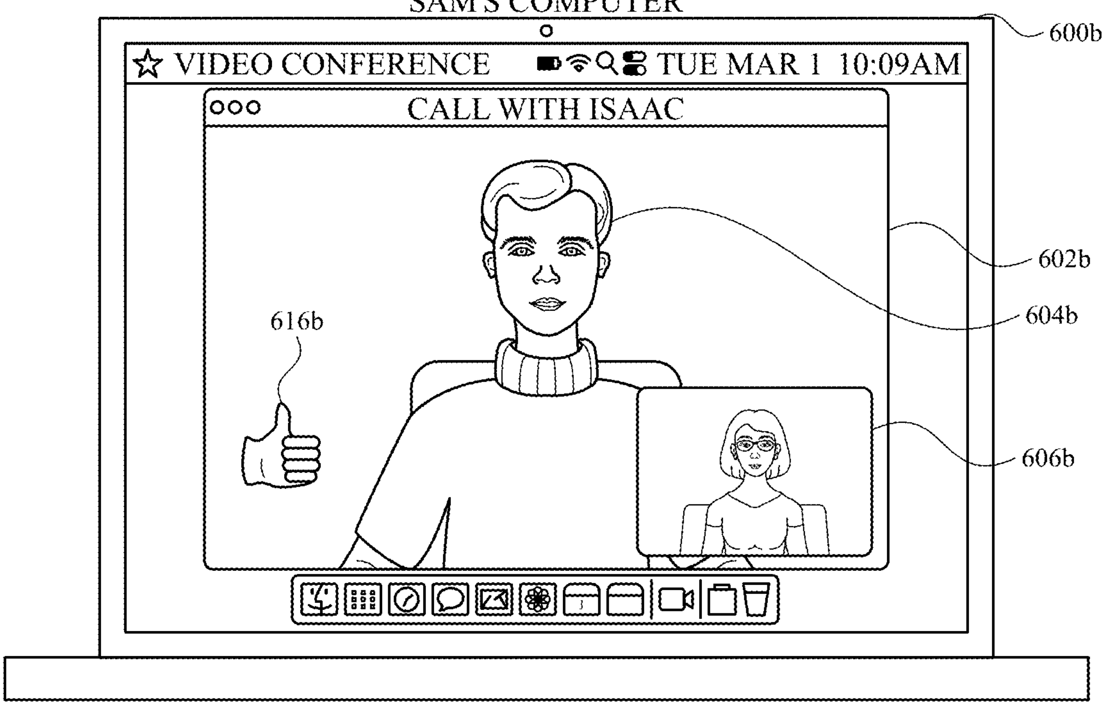
*FIG. 6E*

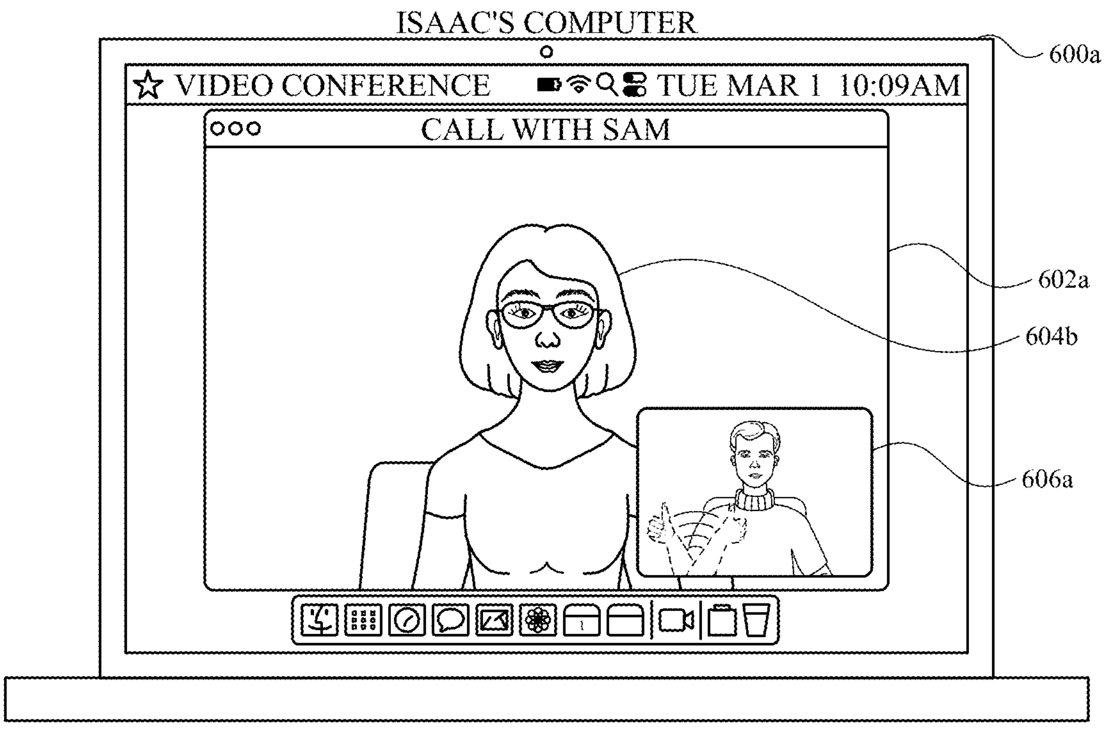
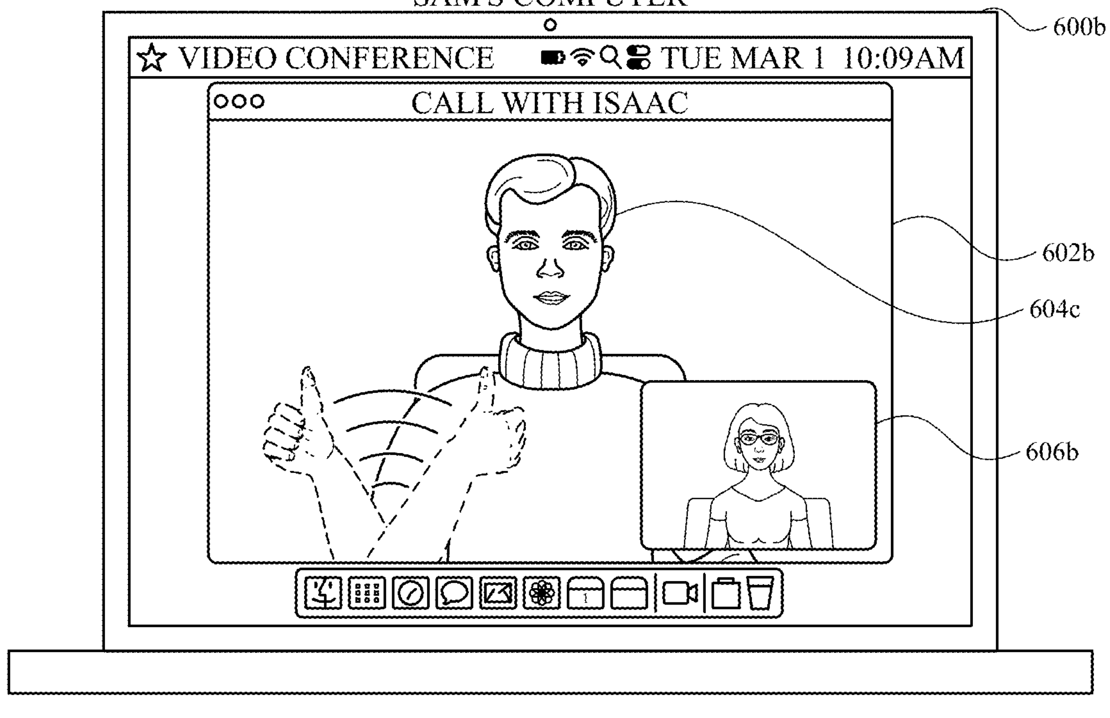
*FIG. 6F*

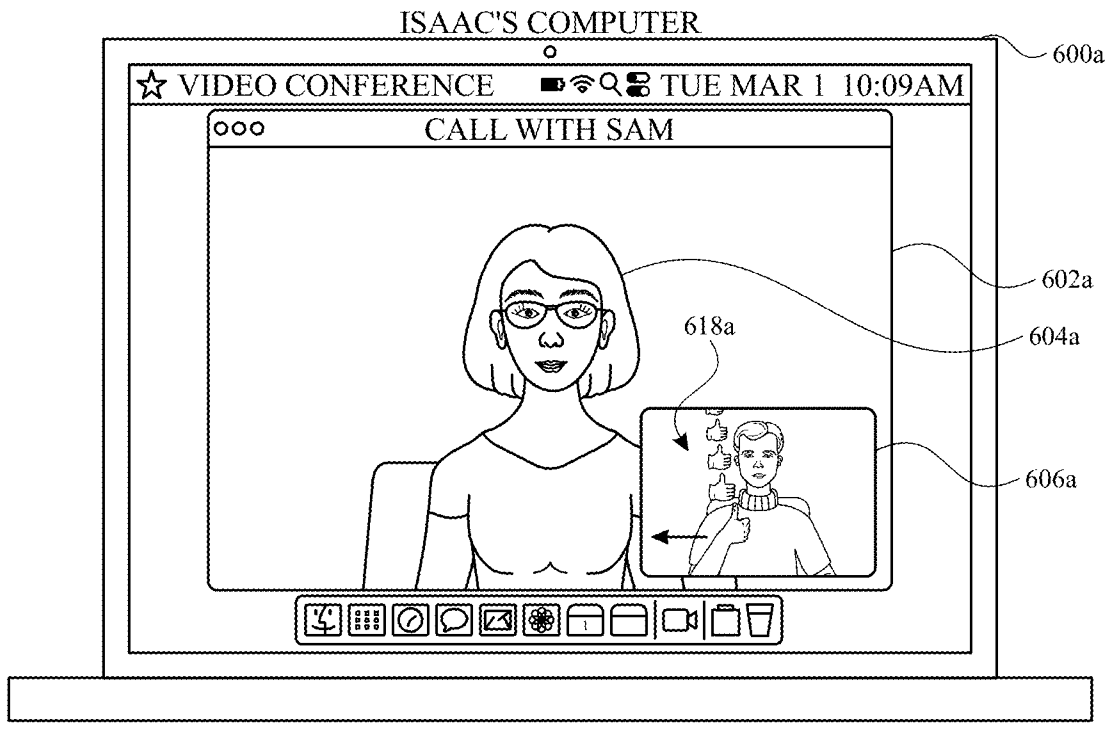
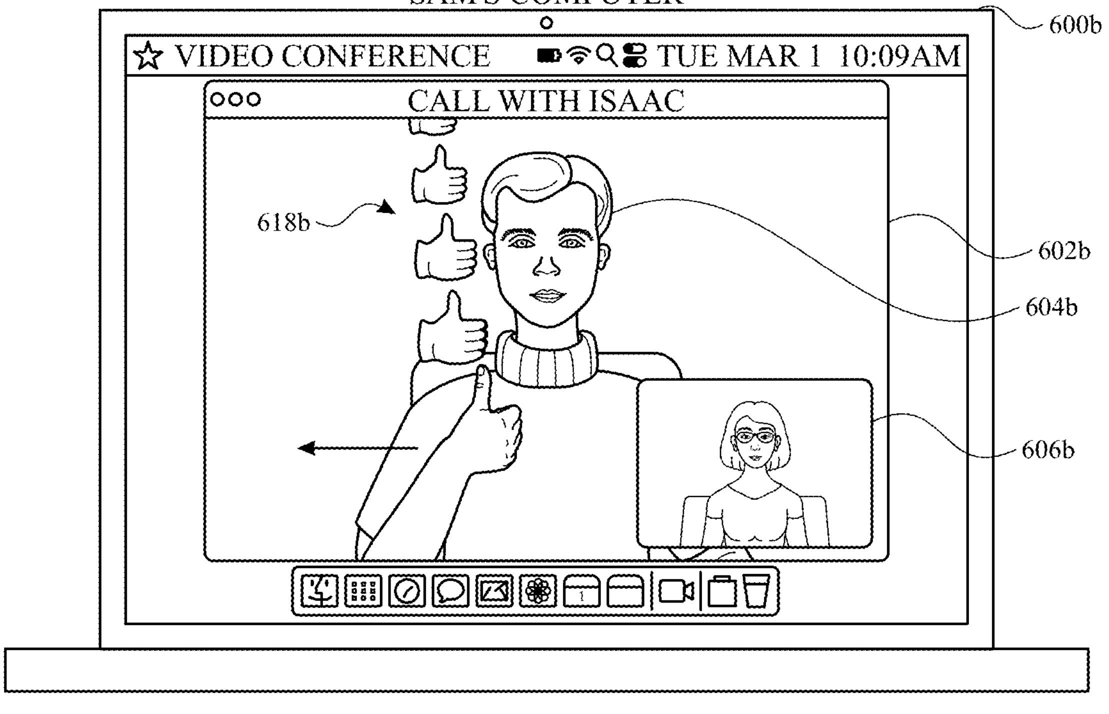
*FIG. 6G*

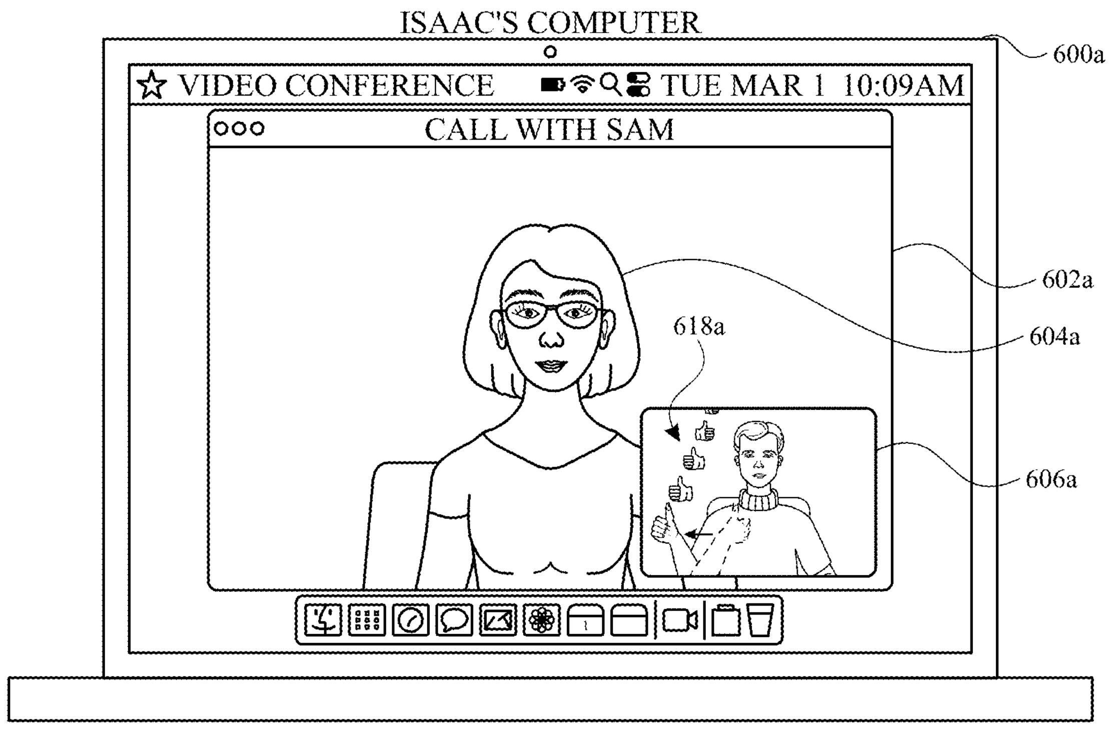
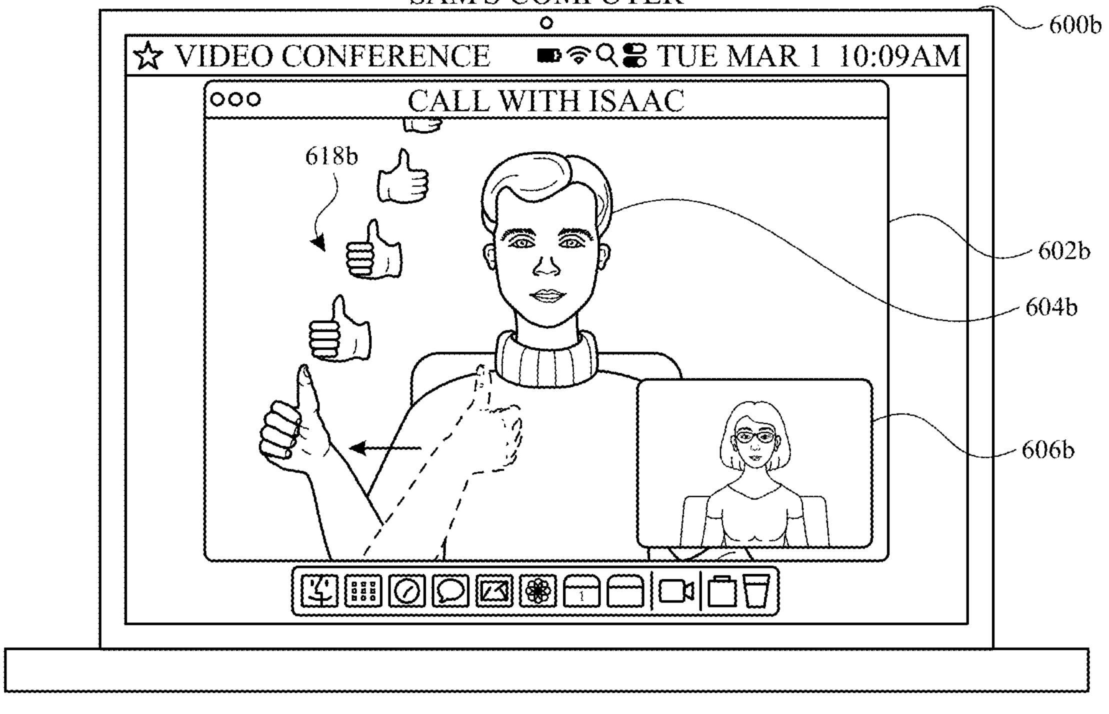
*FIG. 6H*

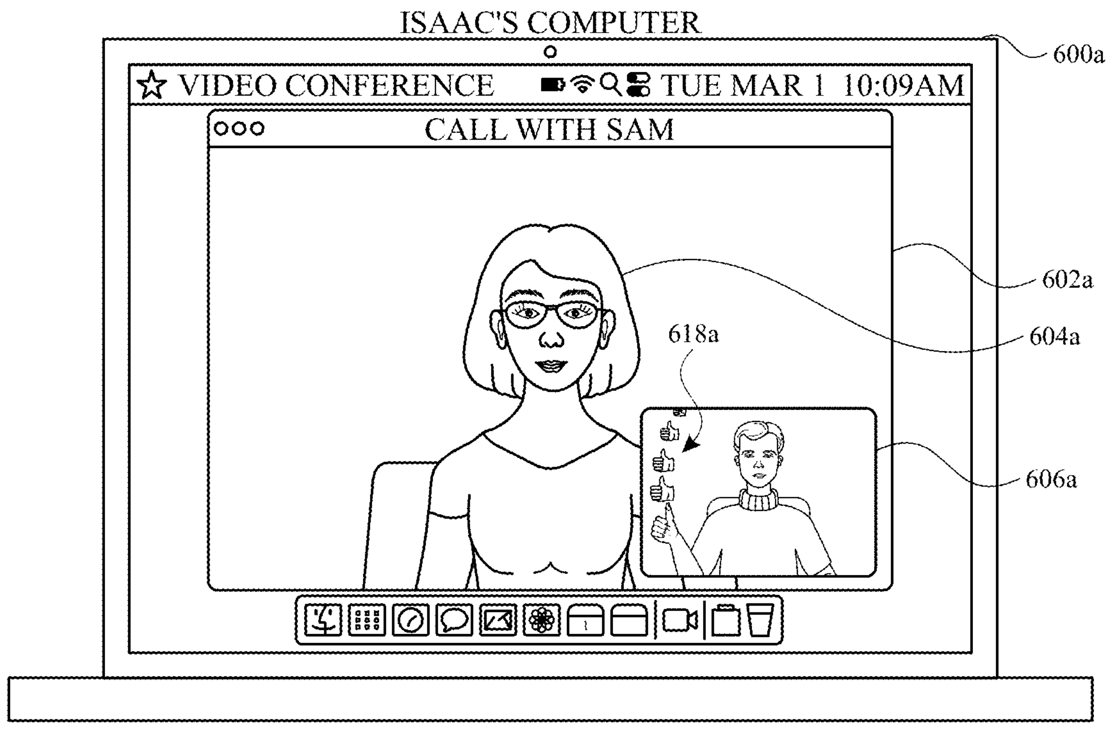
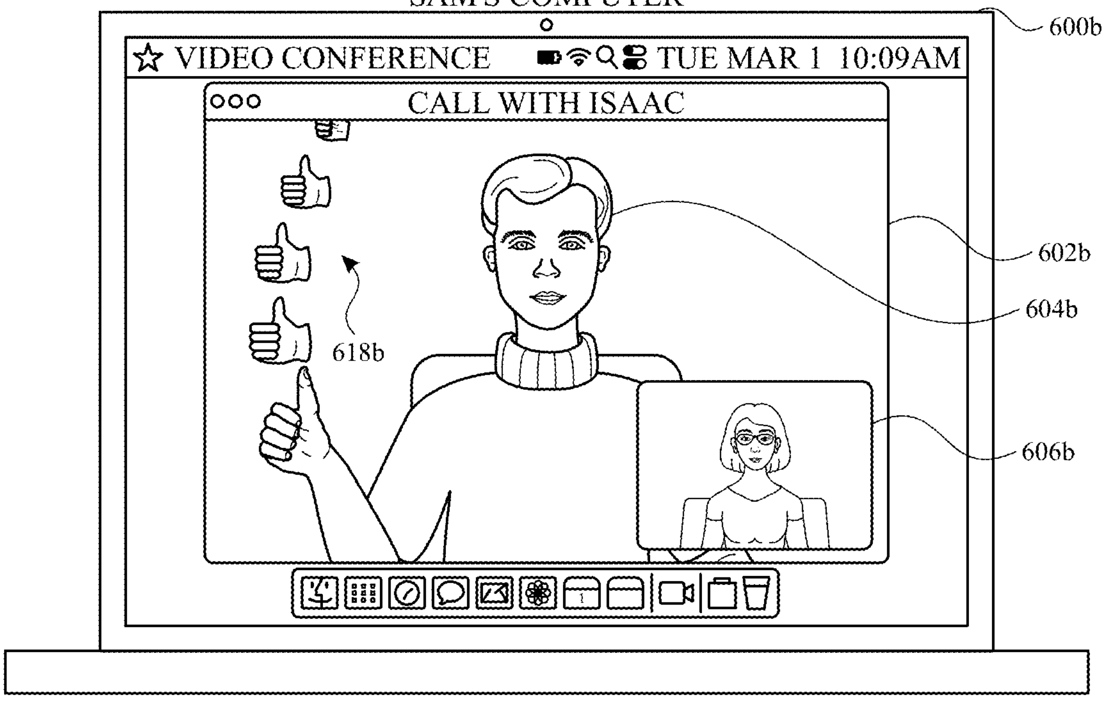
*FIG. 6I*

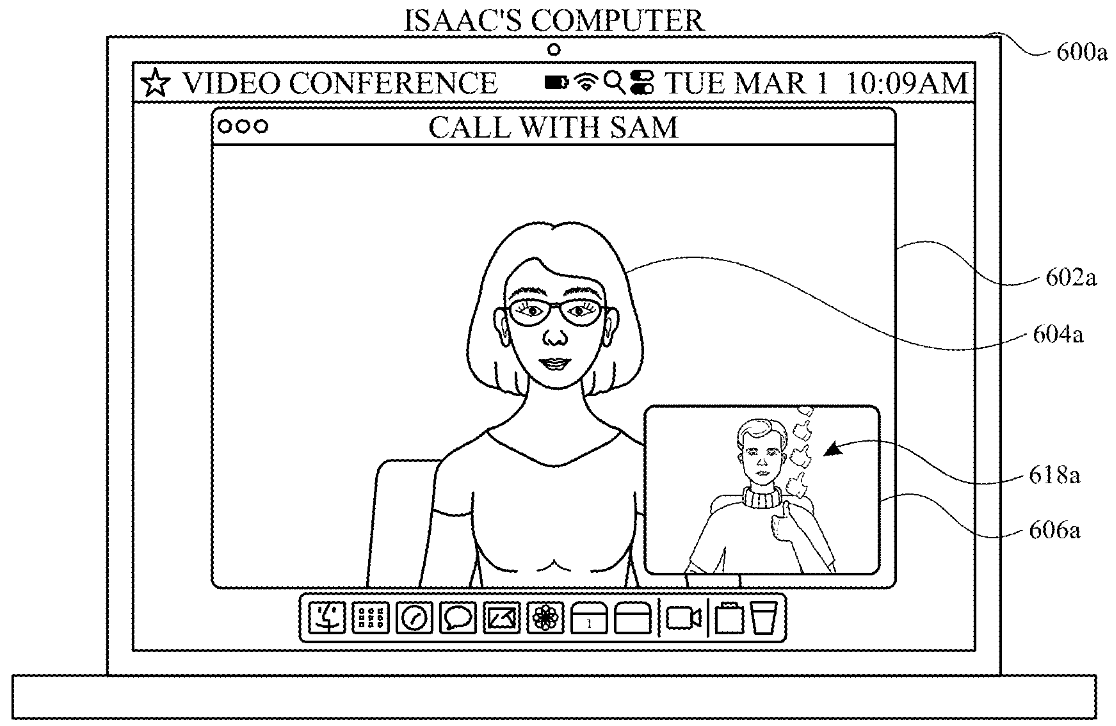
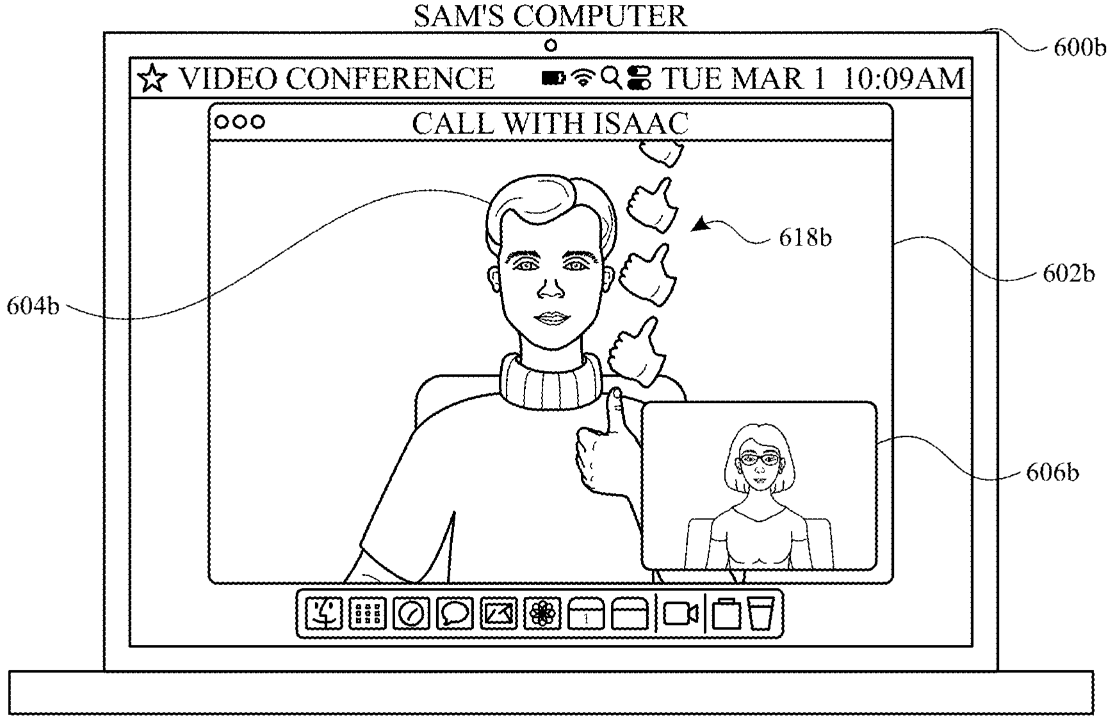
*FIG. 6J*

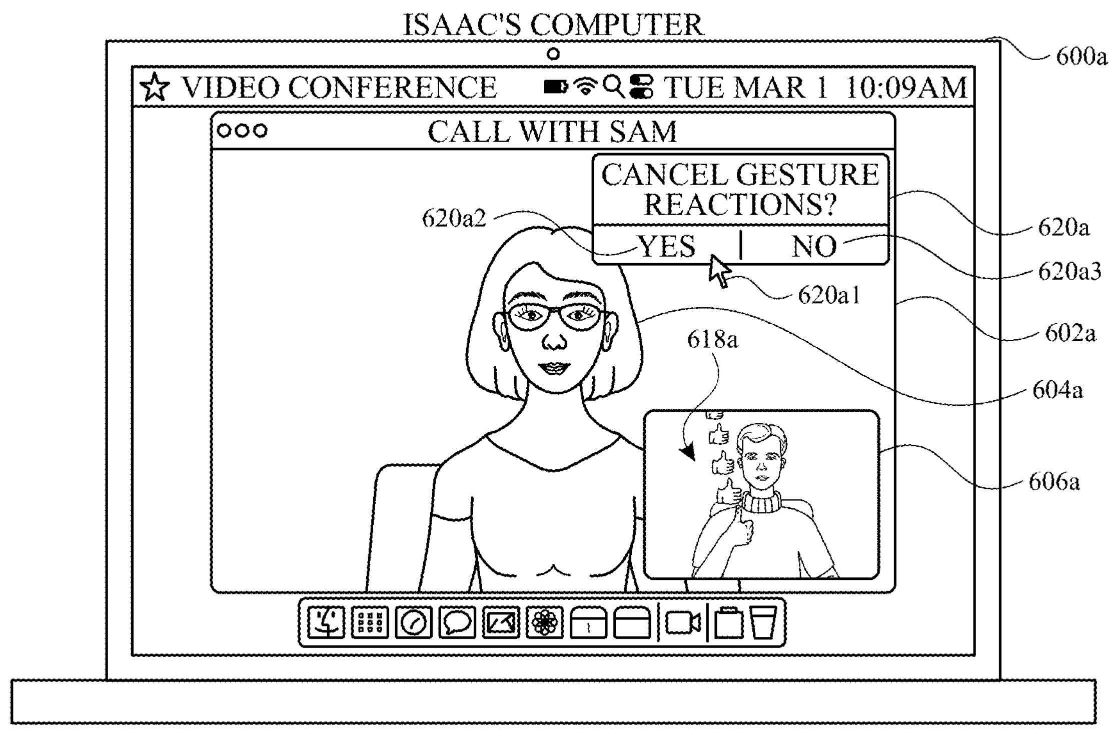
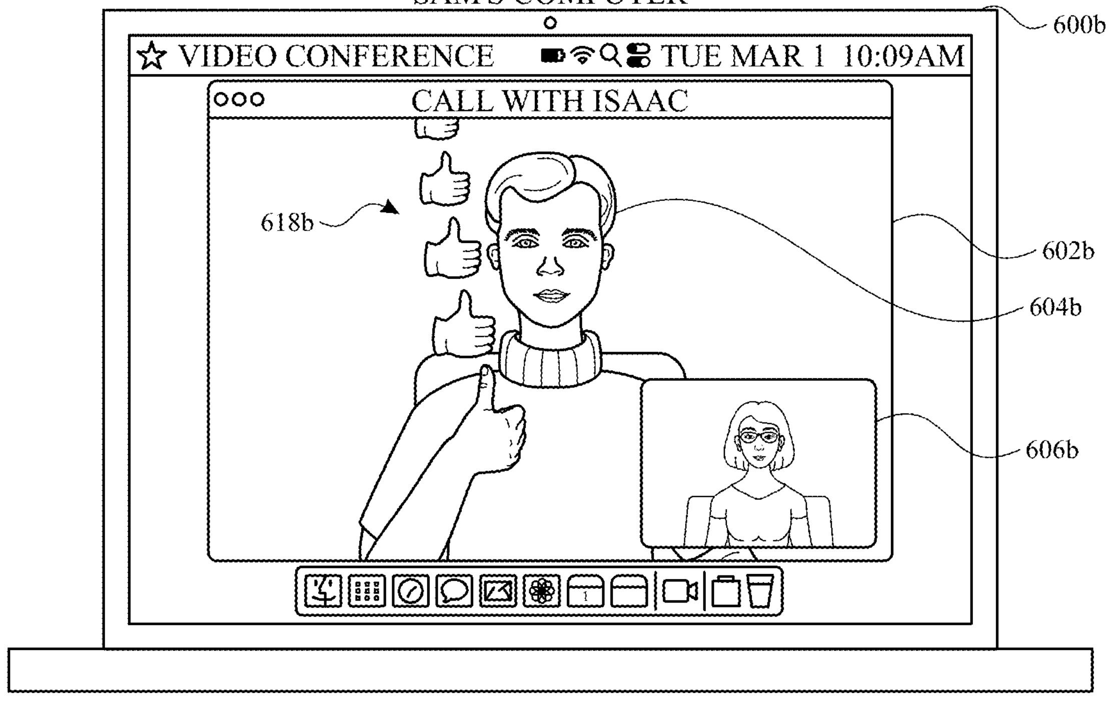
*FIG. 6K*

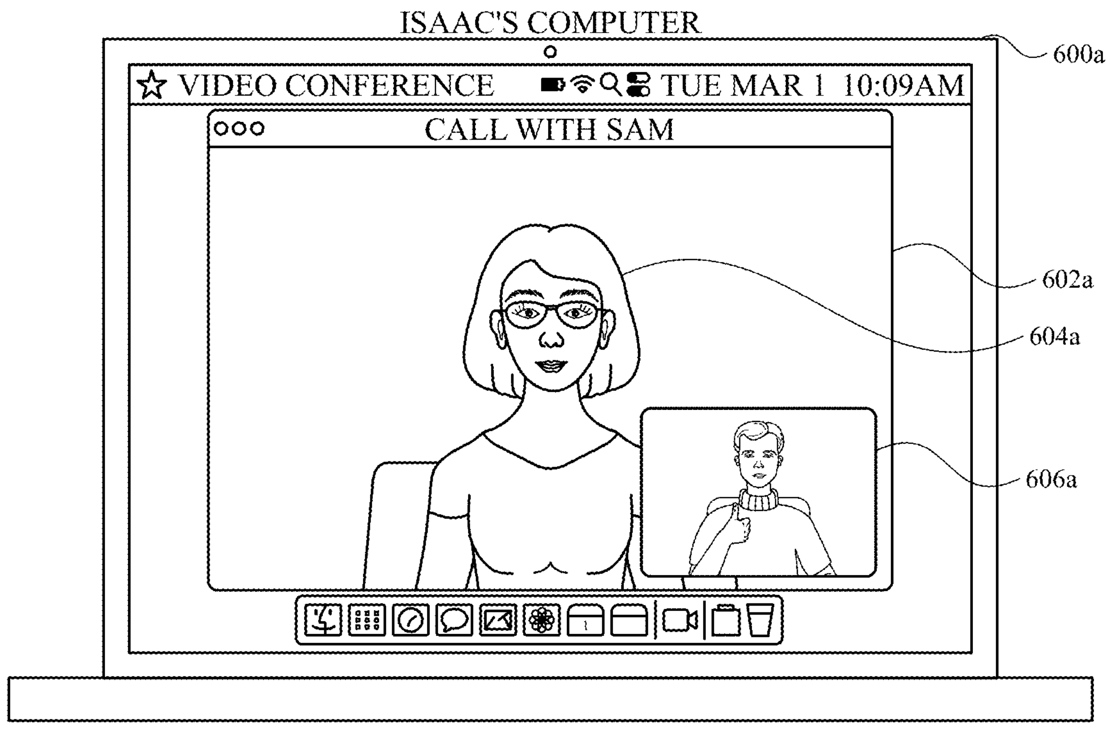
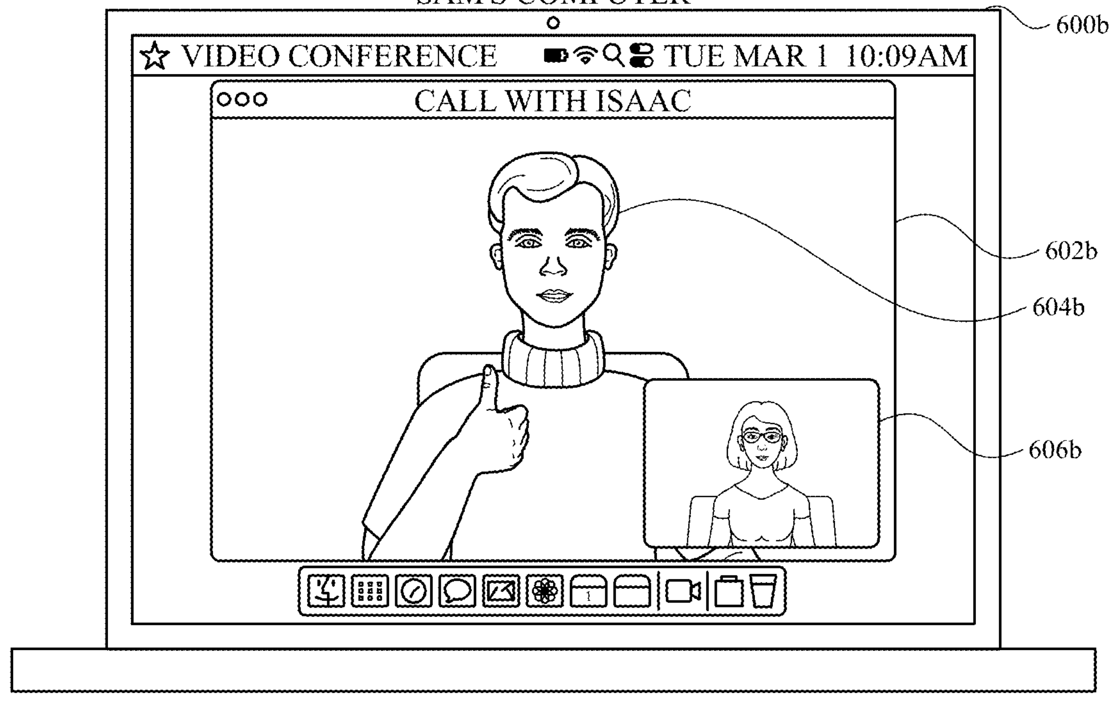
*FIG. 6L*

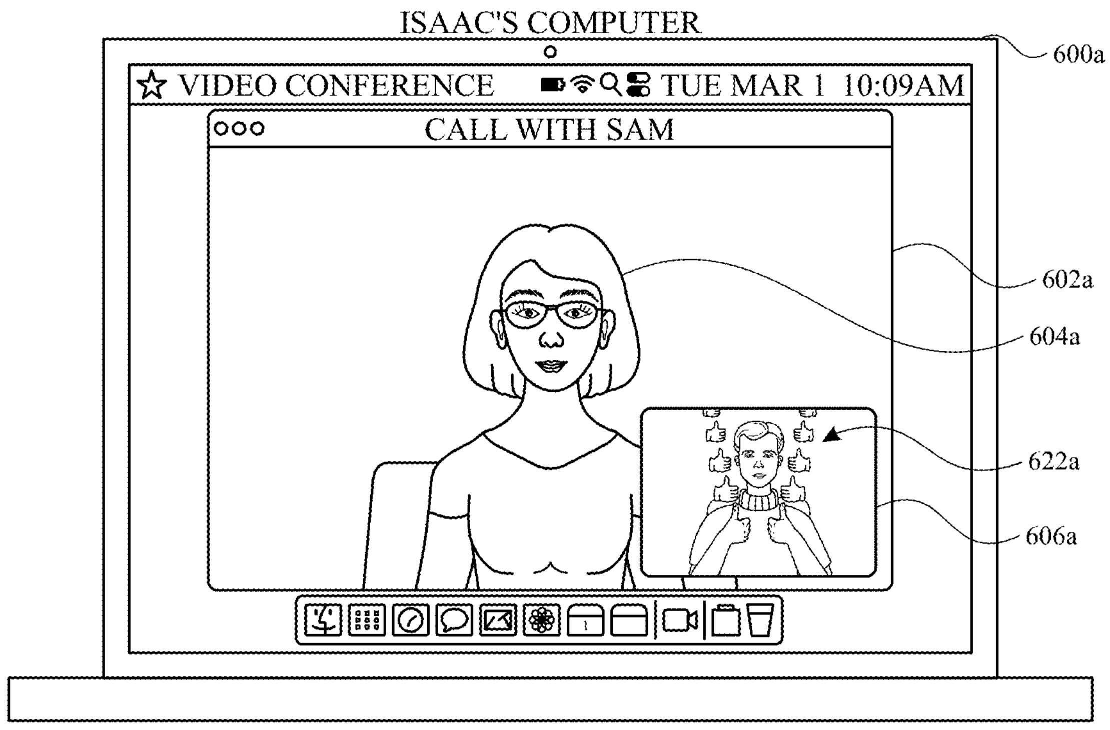
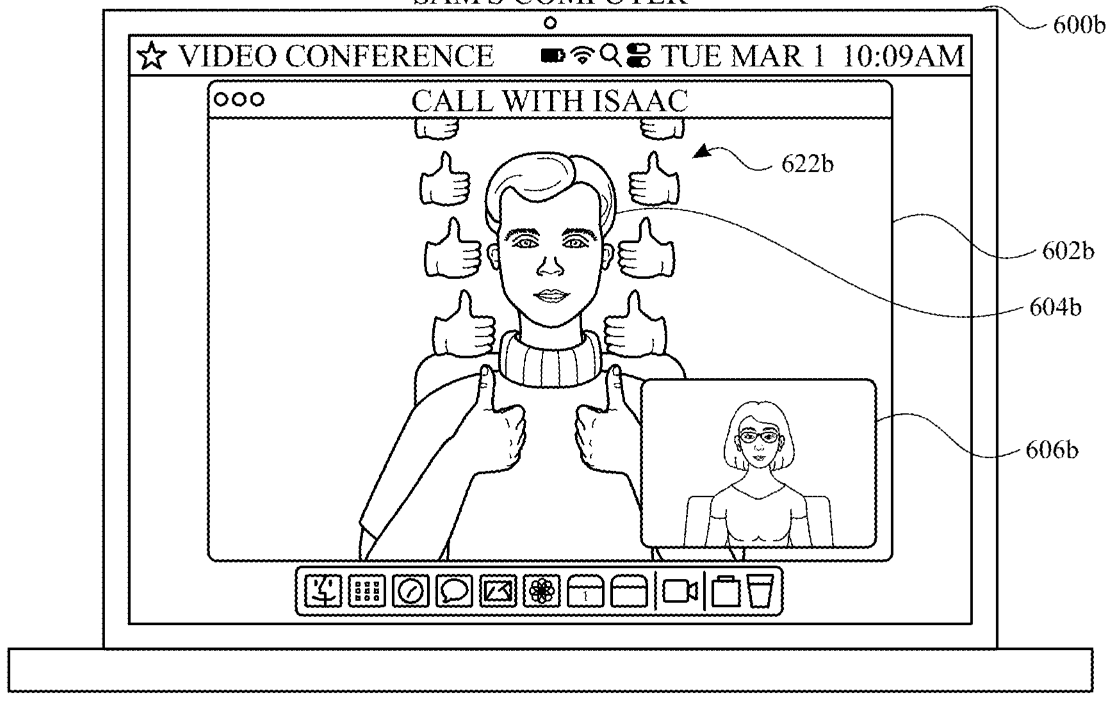
*FIG. 6M*

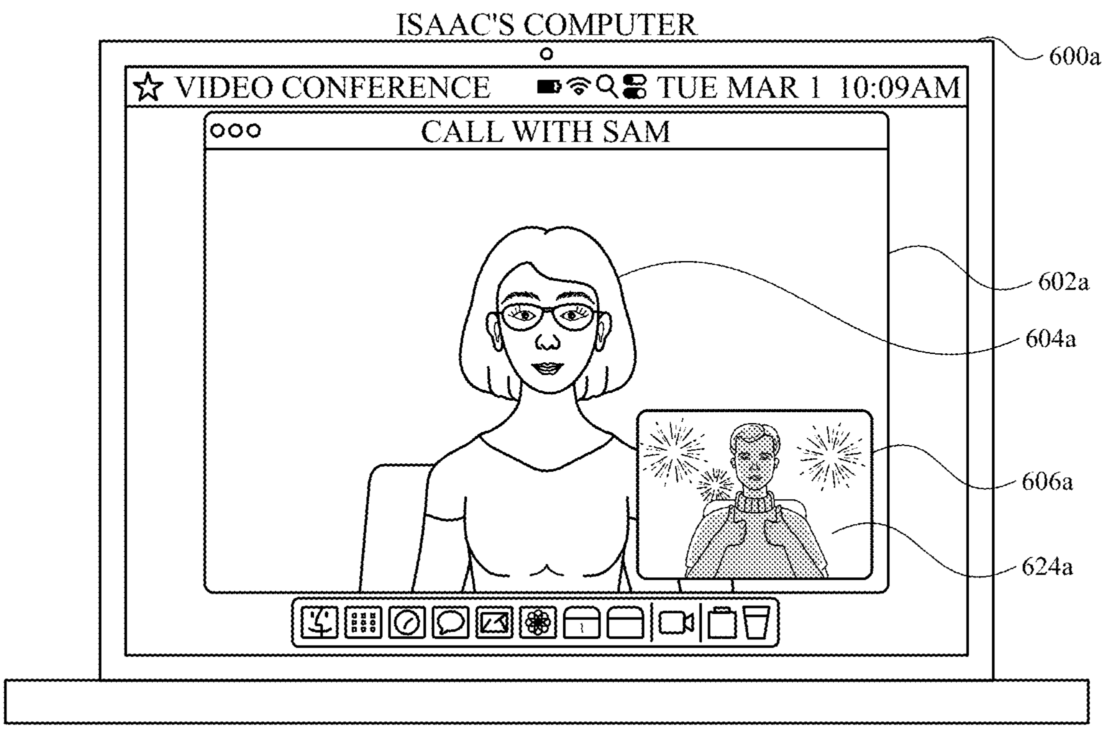
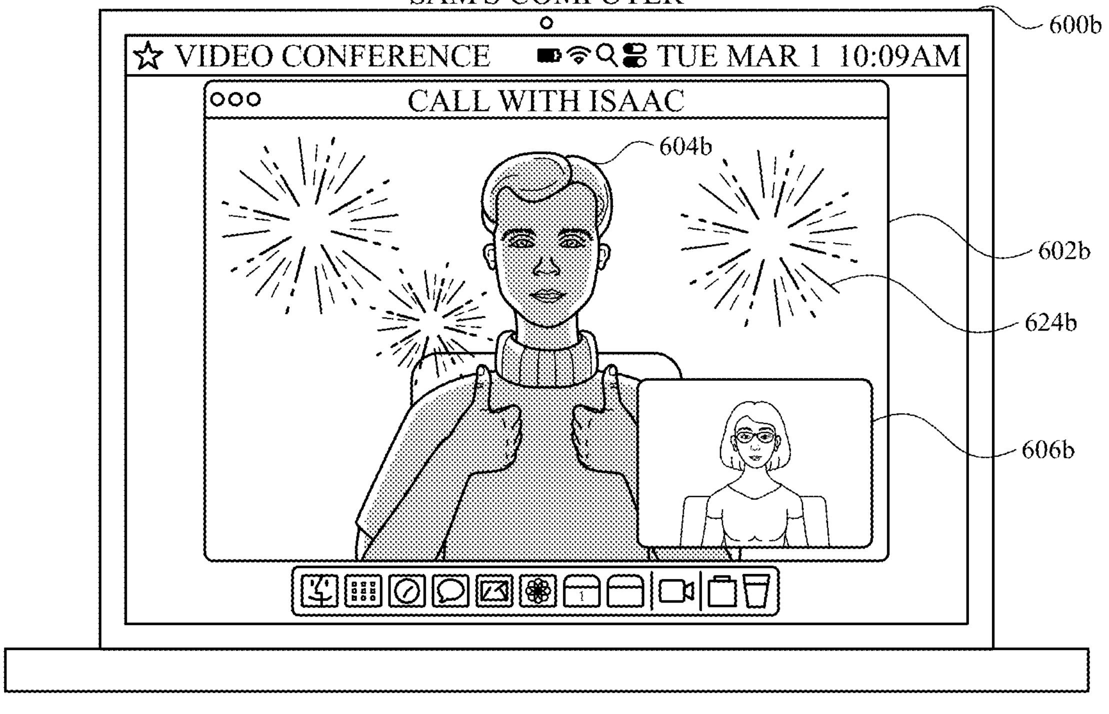
*FIG. 6N*

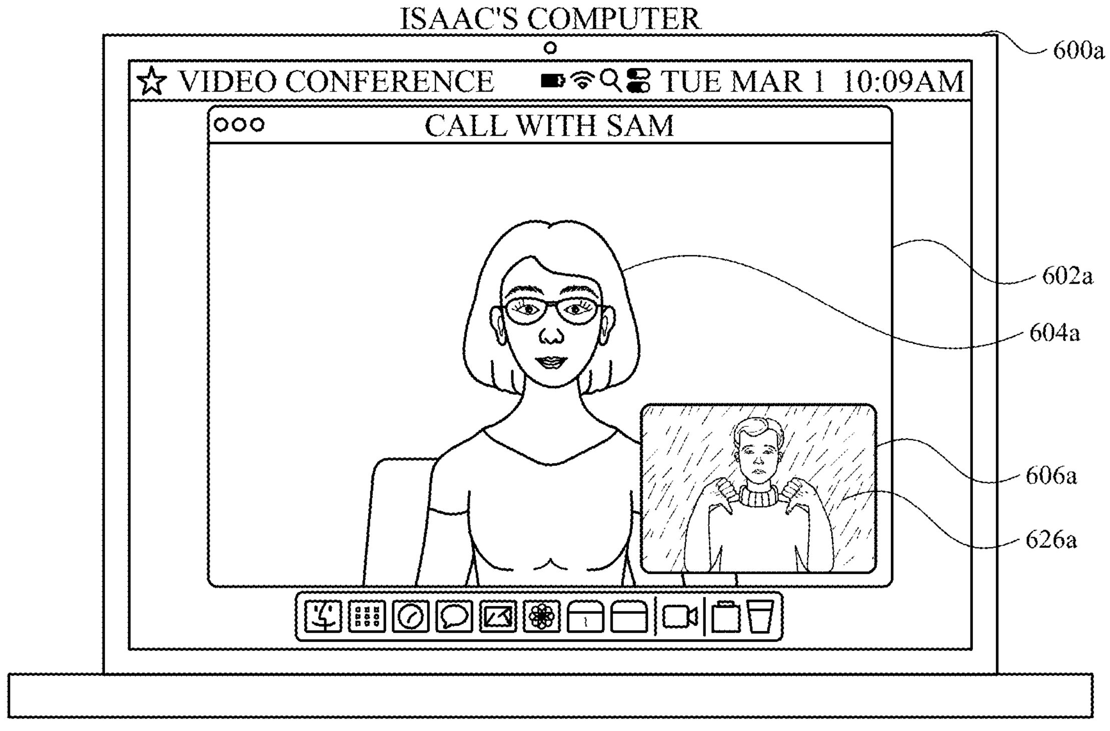
*FIG. 6O*

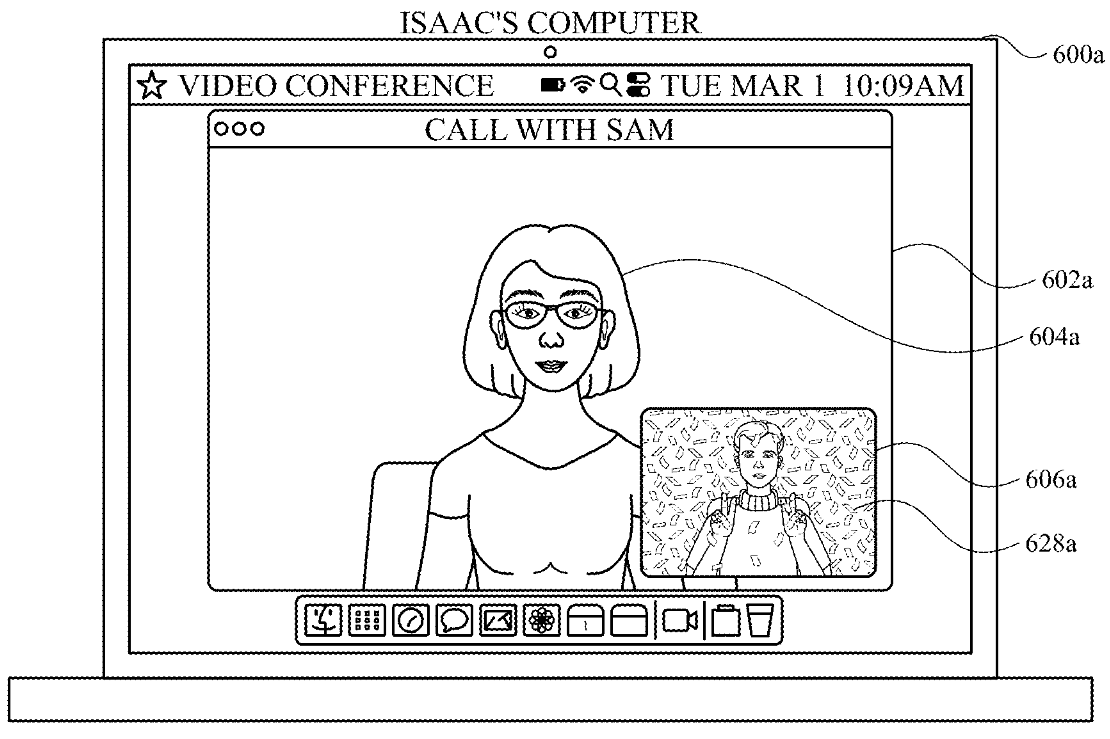
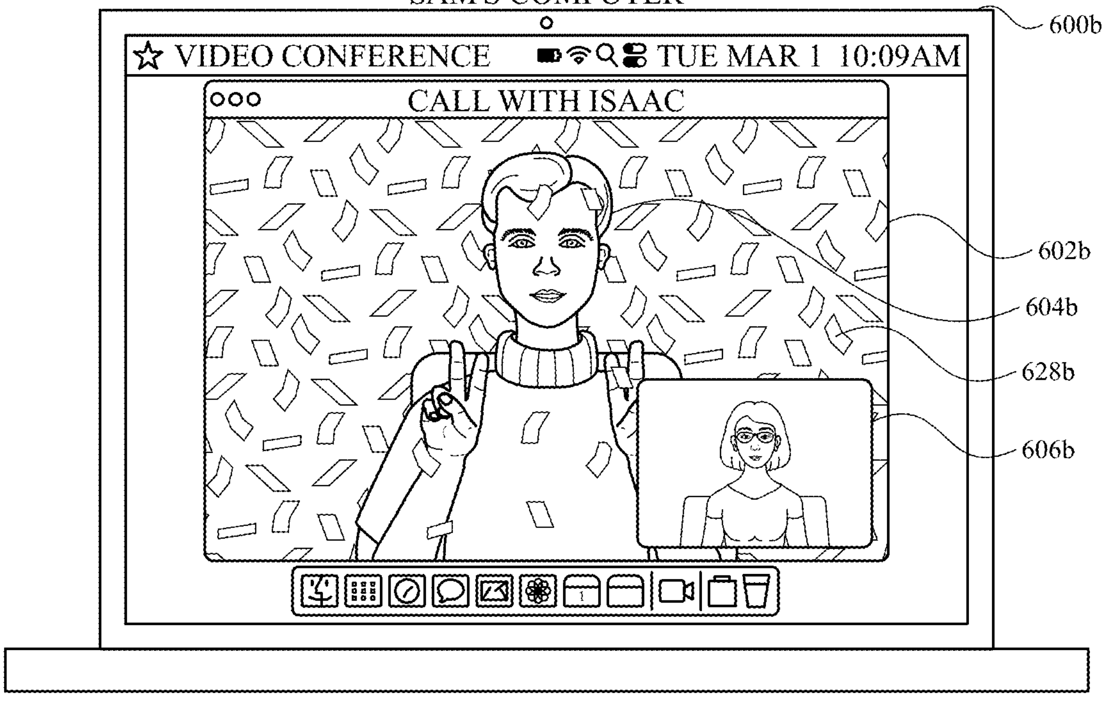
*FIG. 6P*

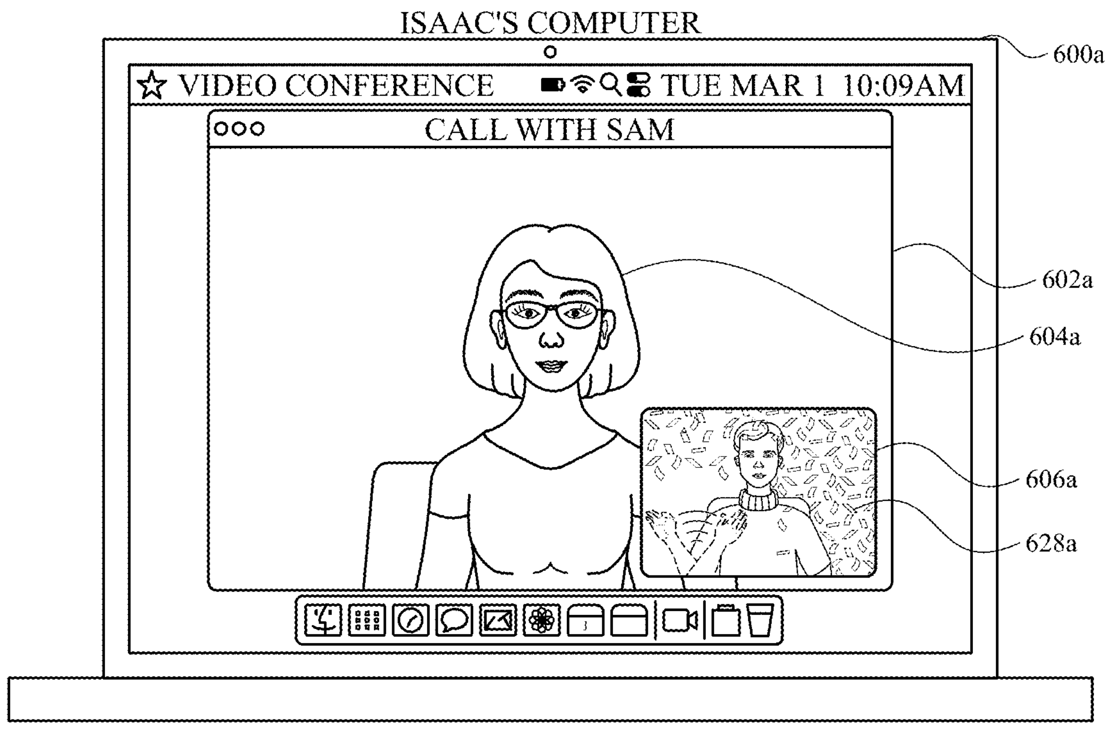
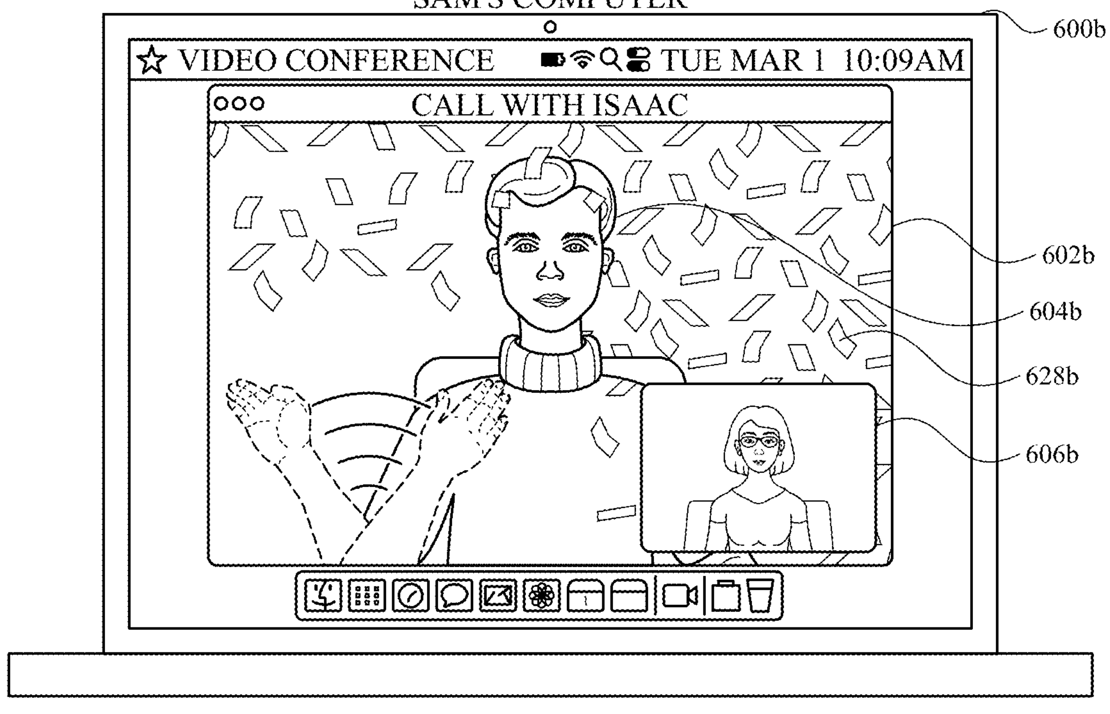
*FIG. 6Q*

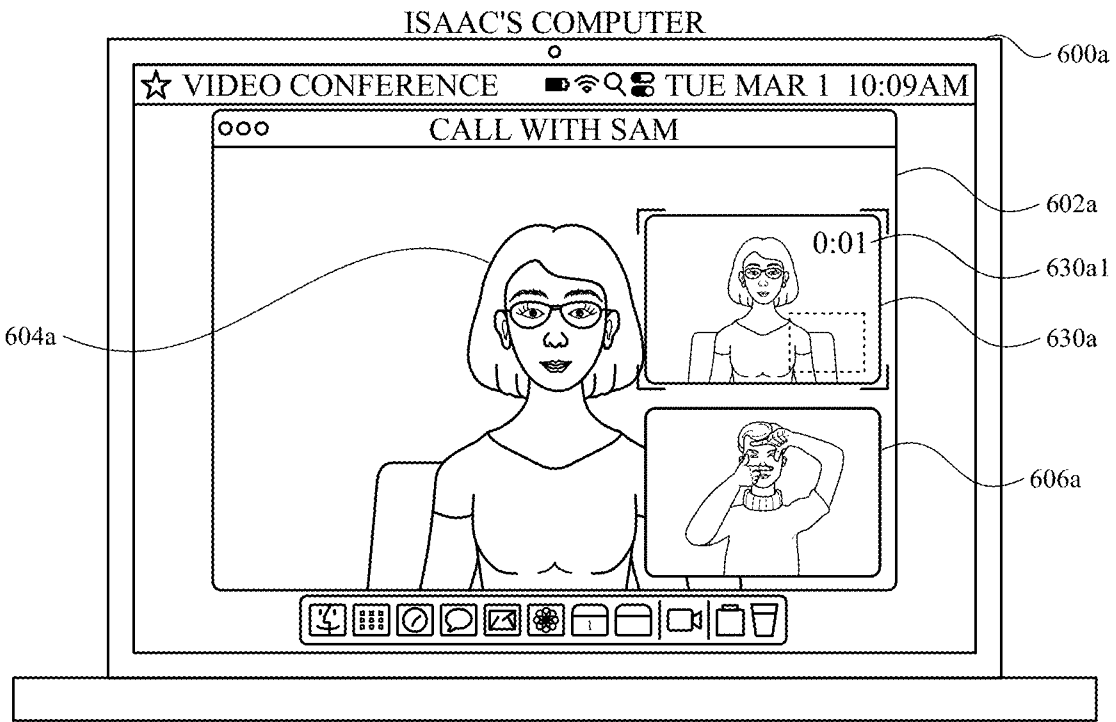
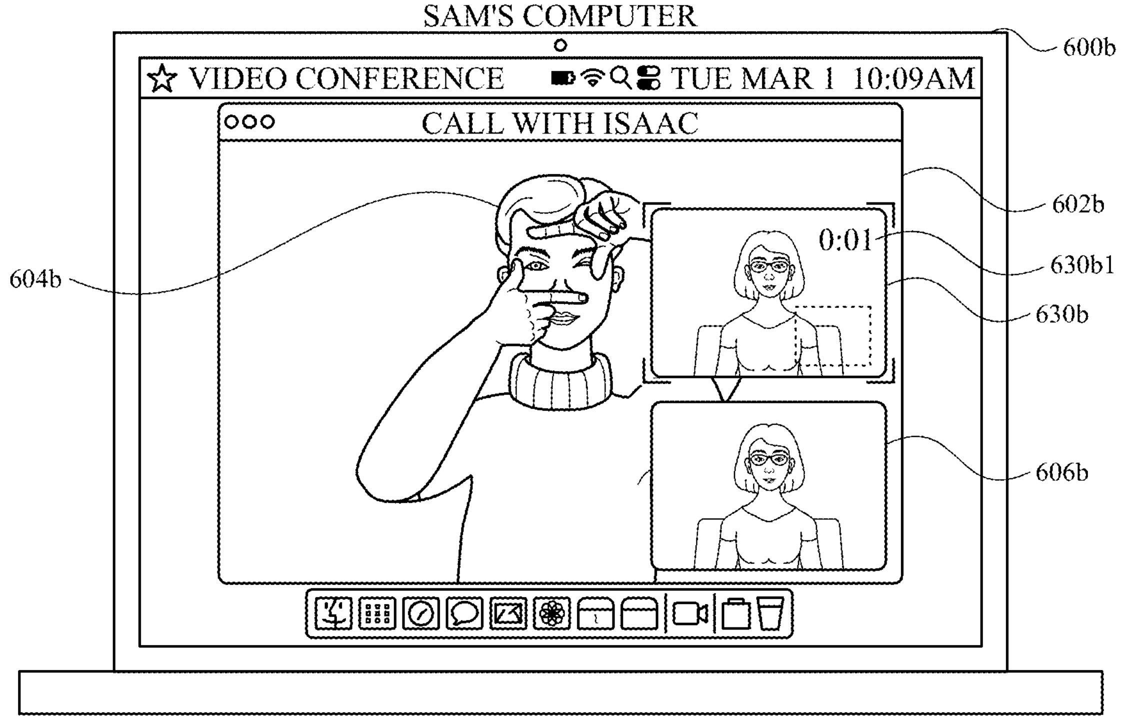
*FIG. 6R*

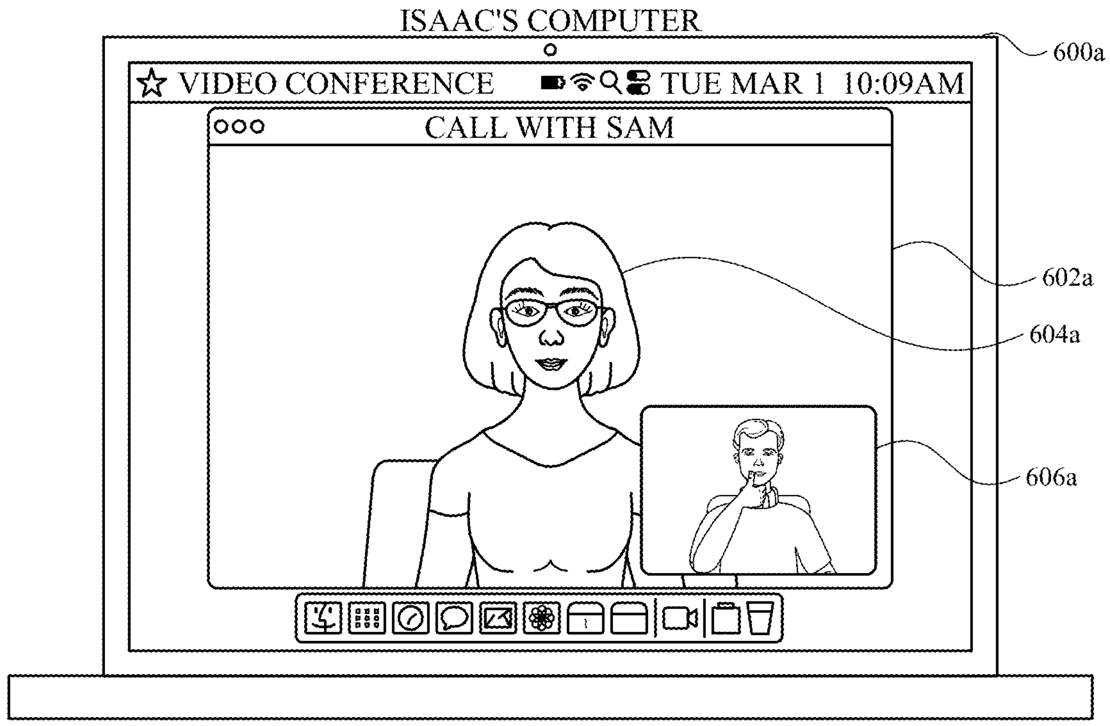
*FIG. 6S*

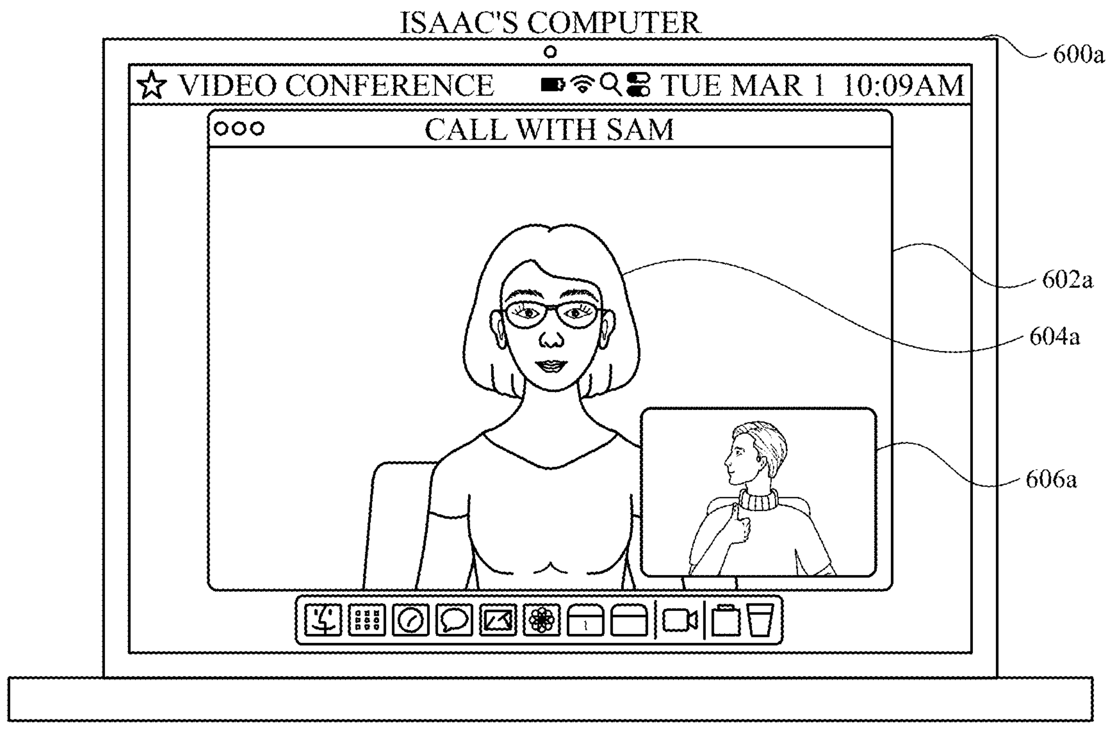
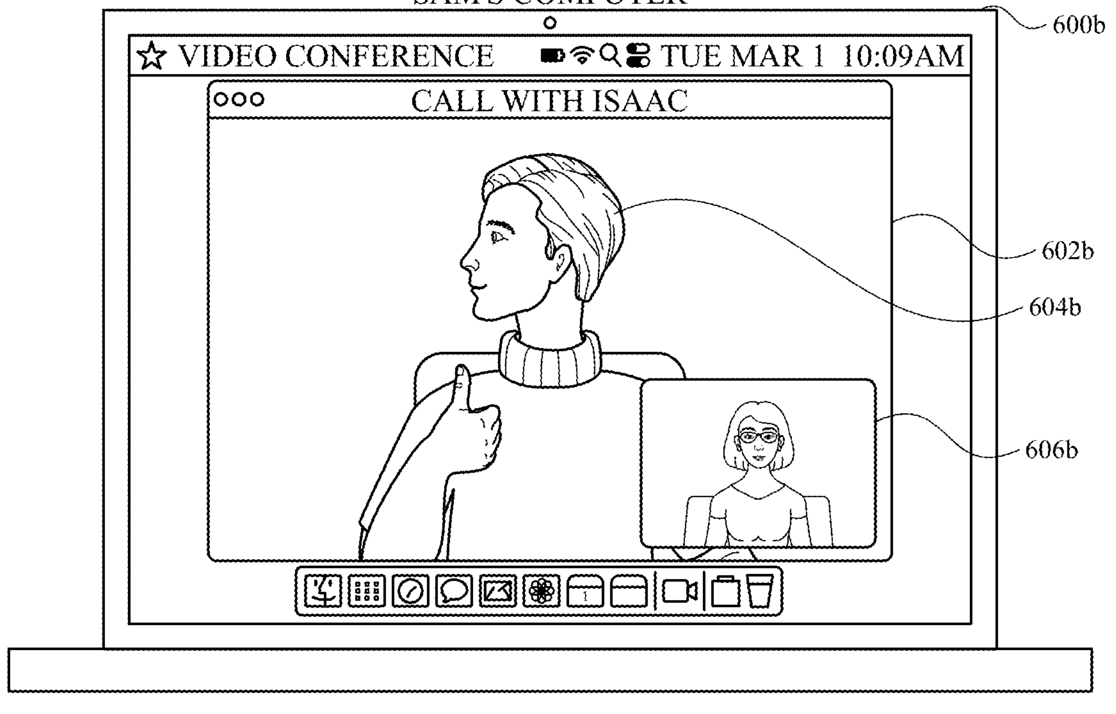
*FIG. 6T1*

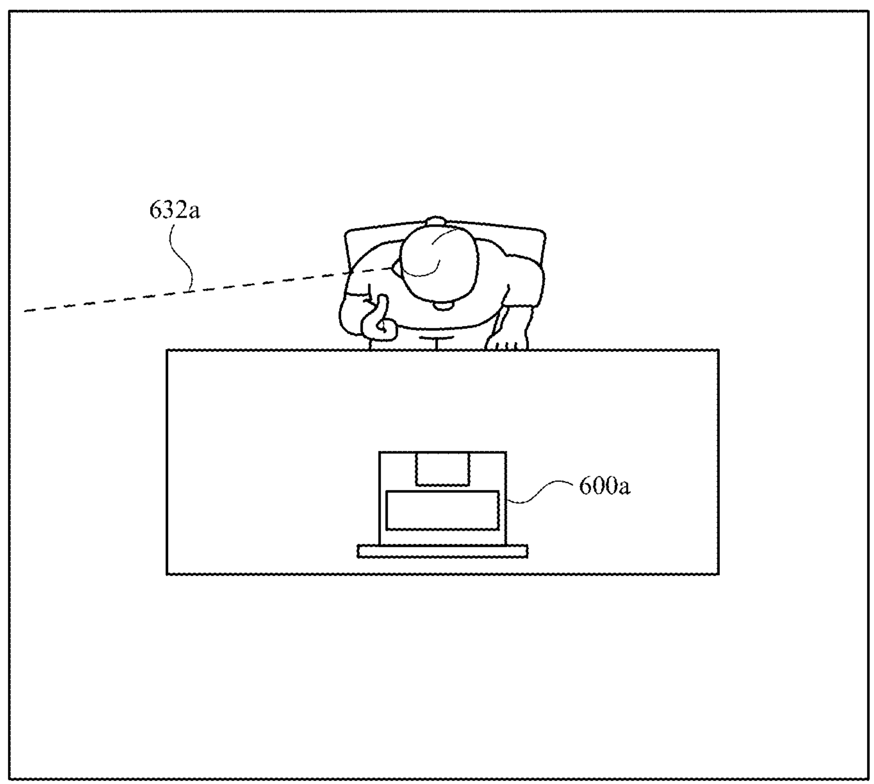
*FIG. 6T2*

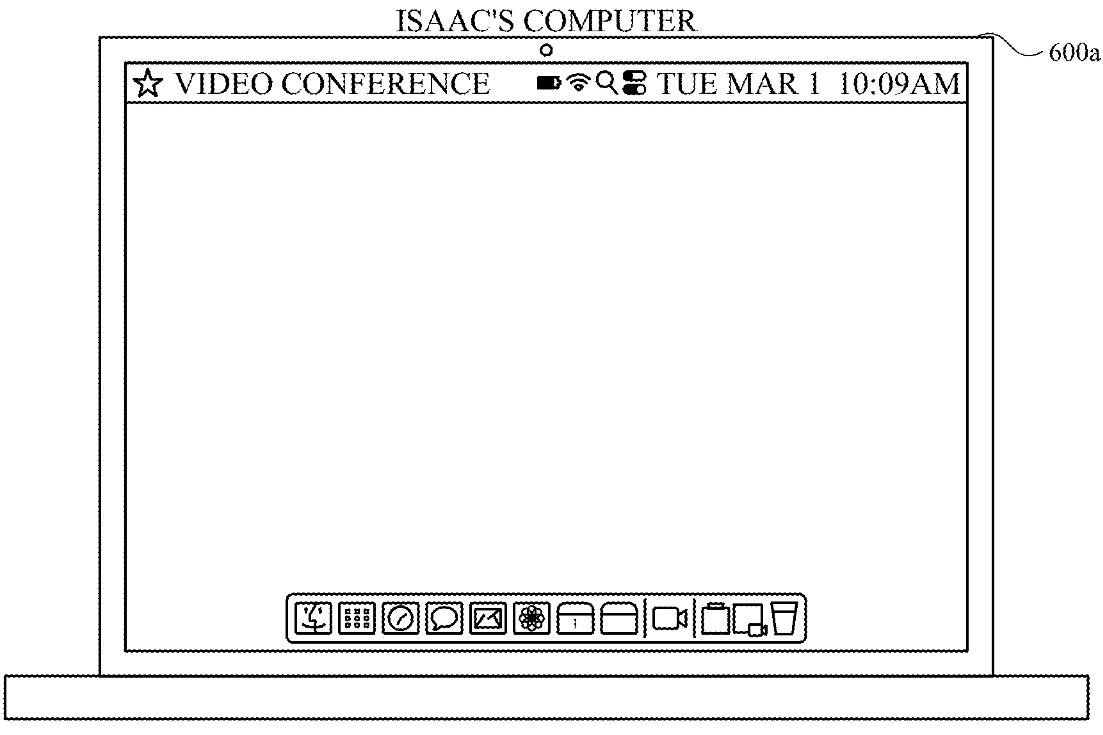
*FIG. 6U*

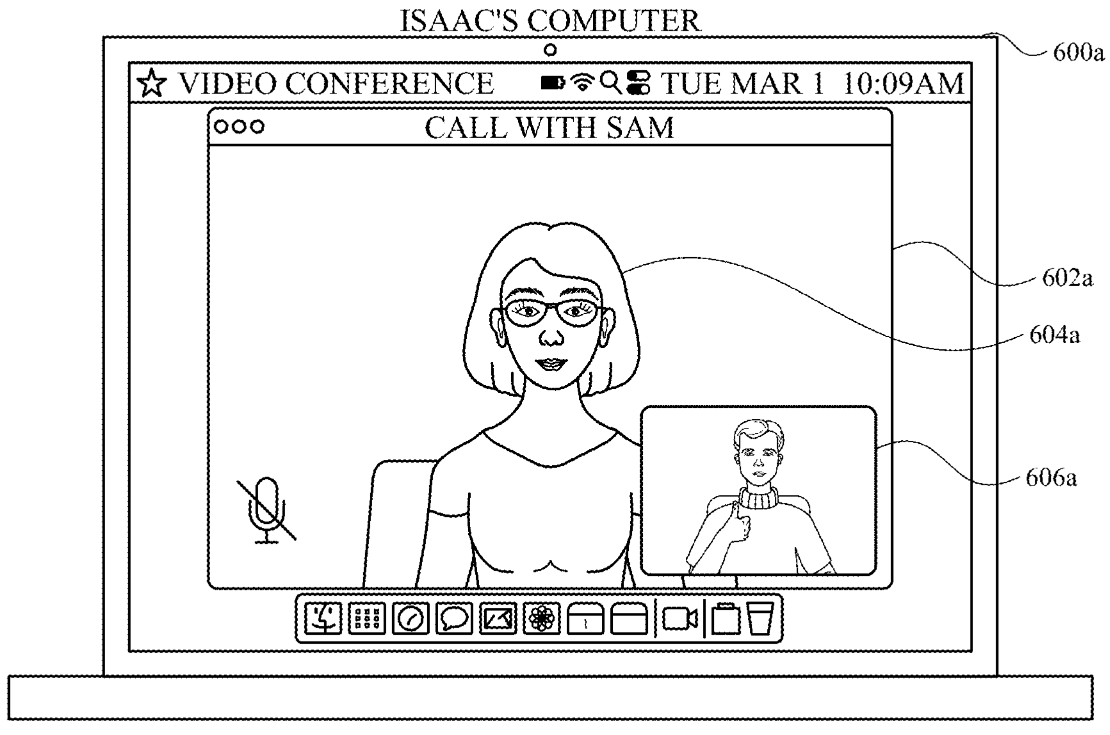
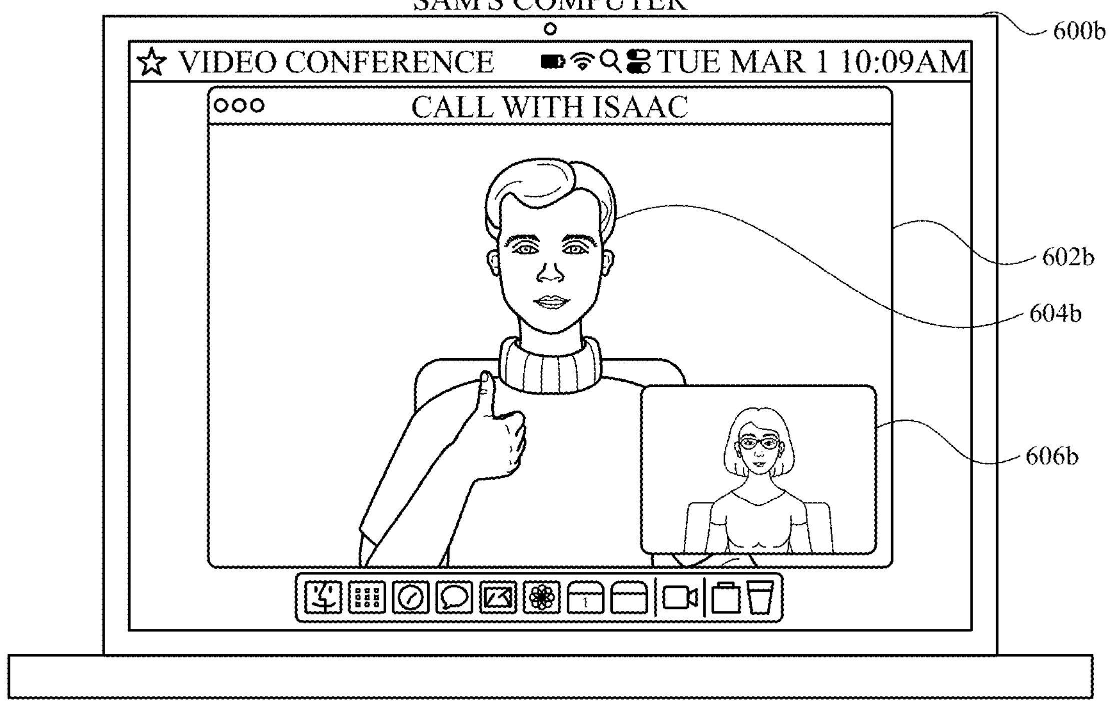
*FIG. 6V*

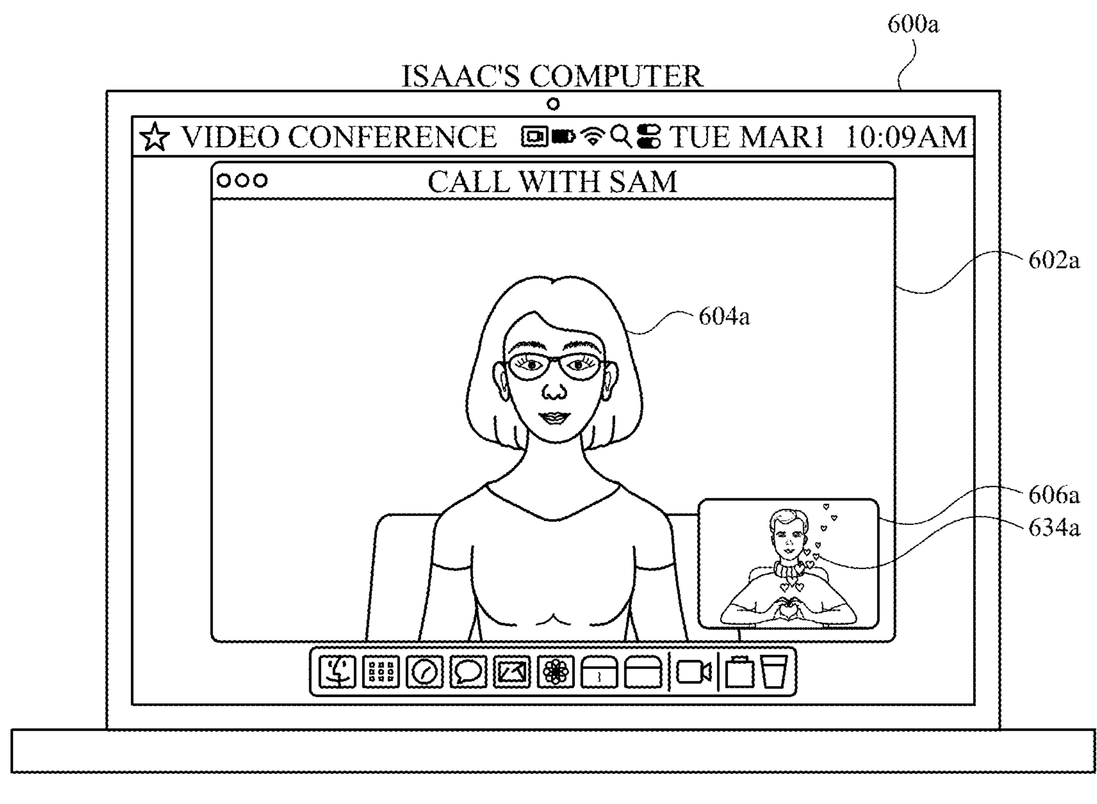
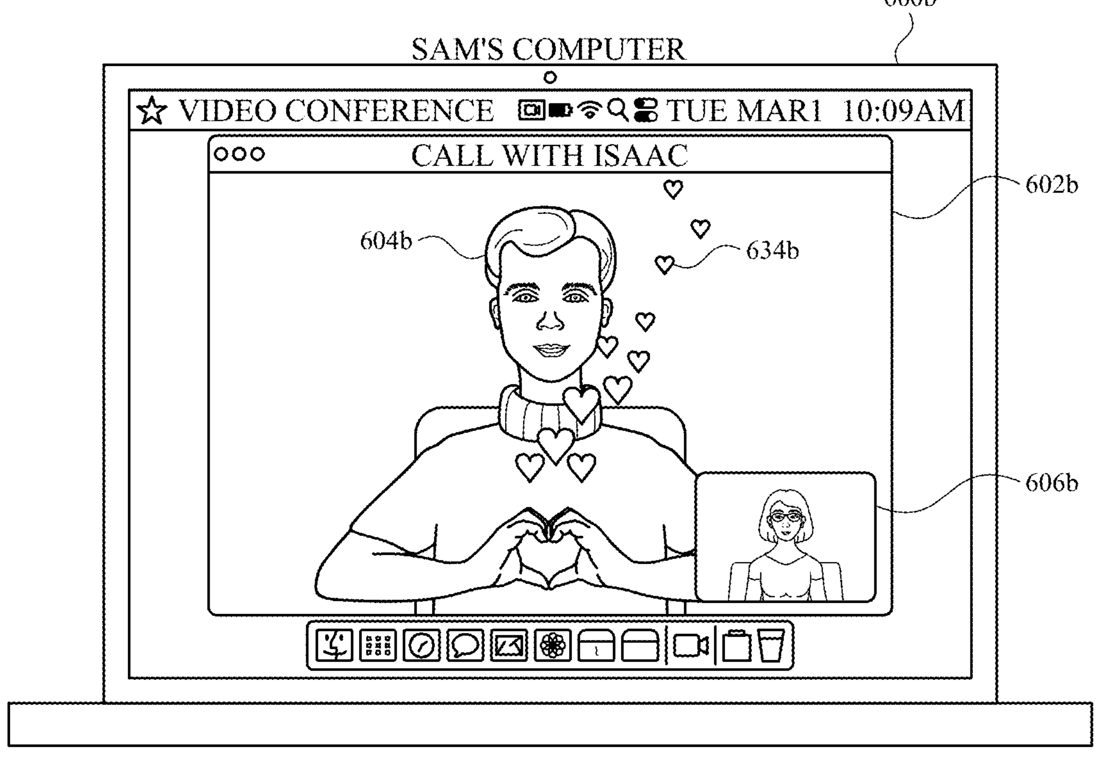
*FIG. 6W*

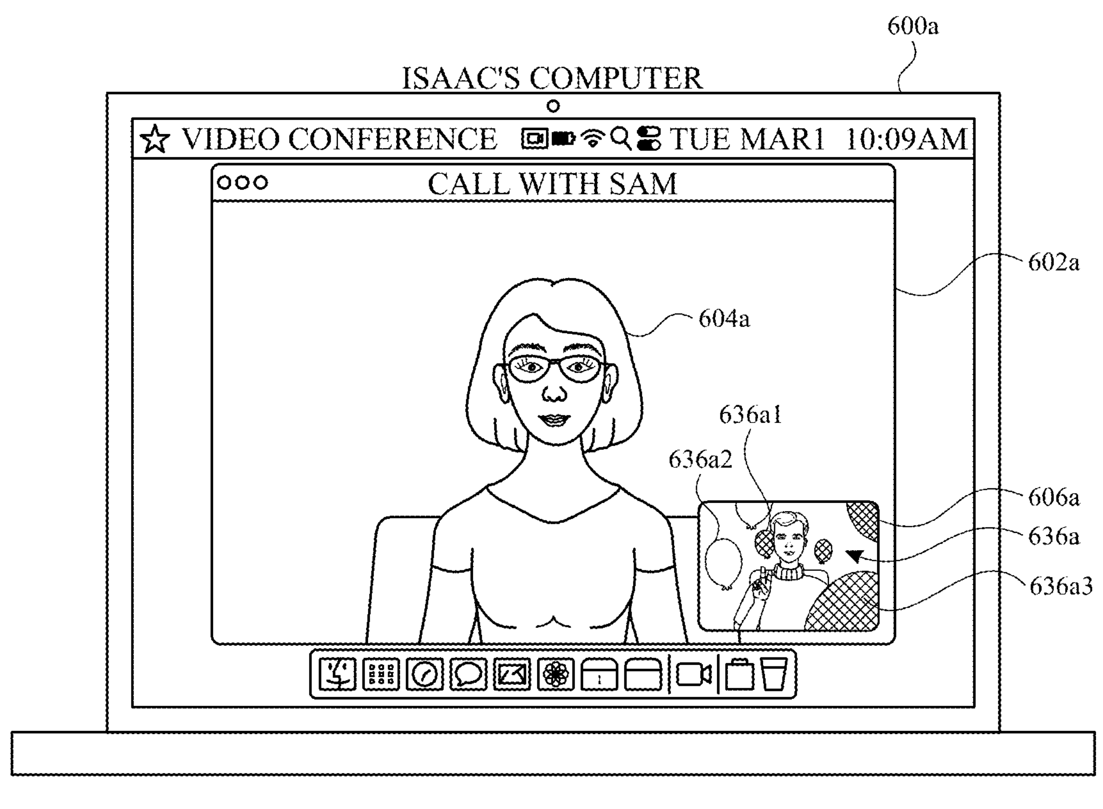
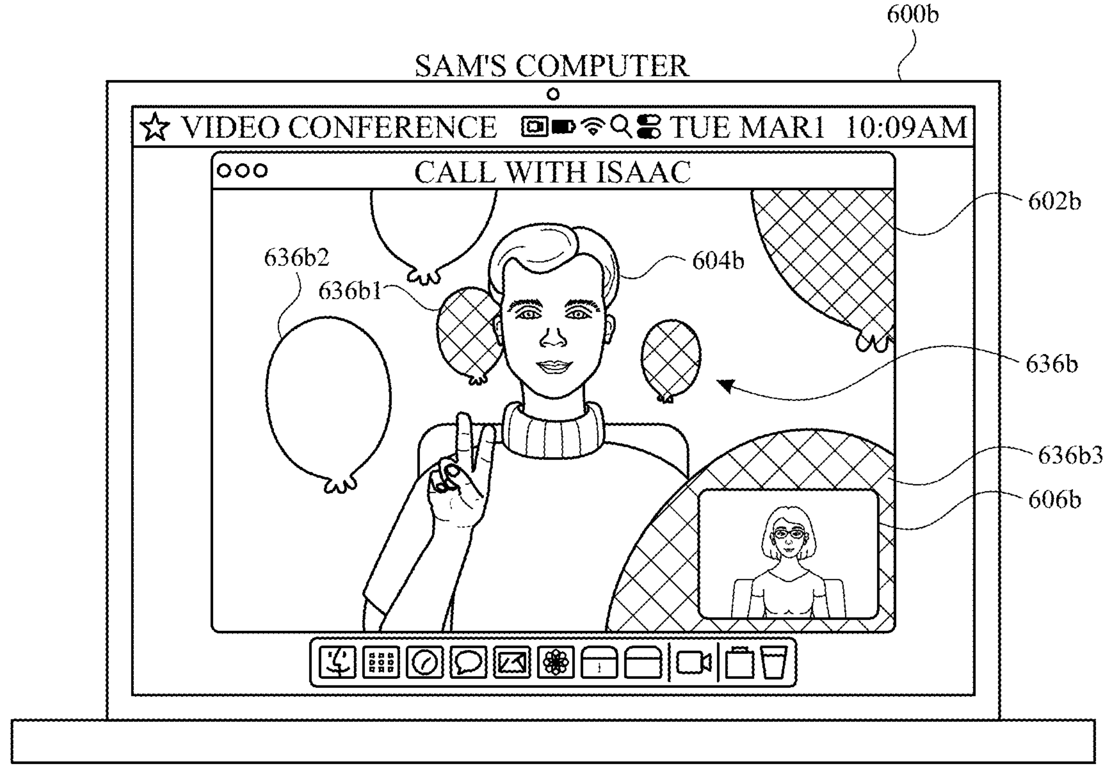
*FIG. 6X*

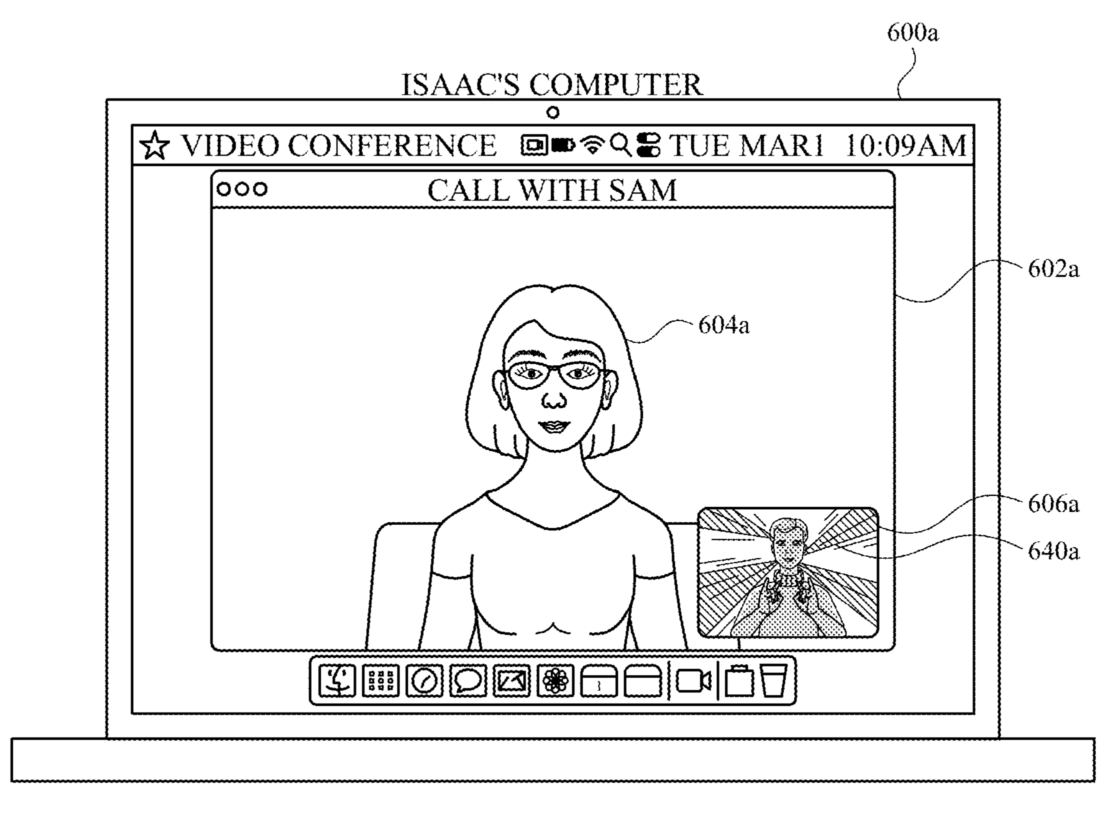
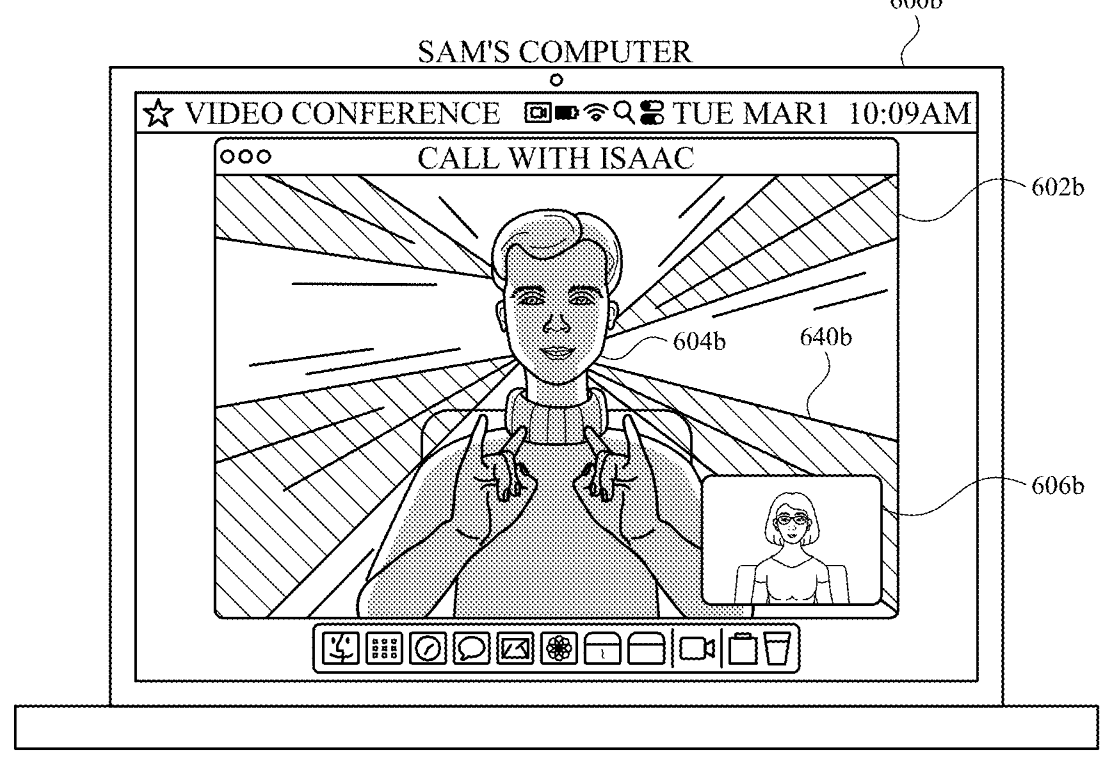
*FIG. 6Y*

Figure 7A:
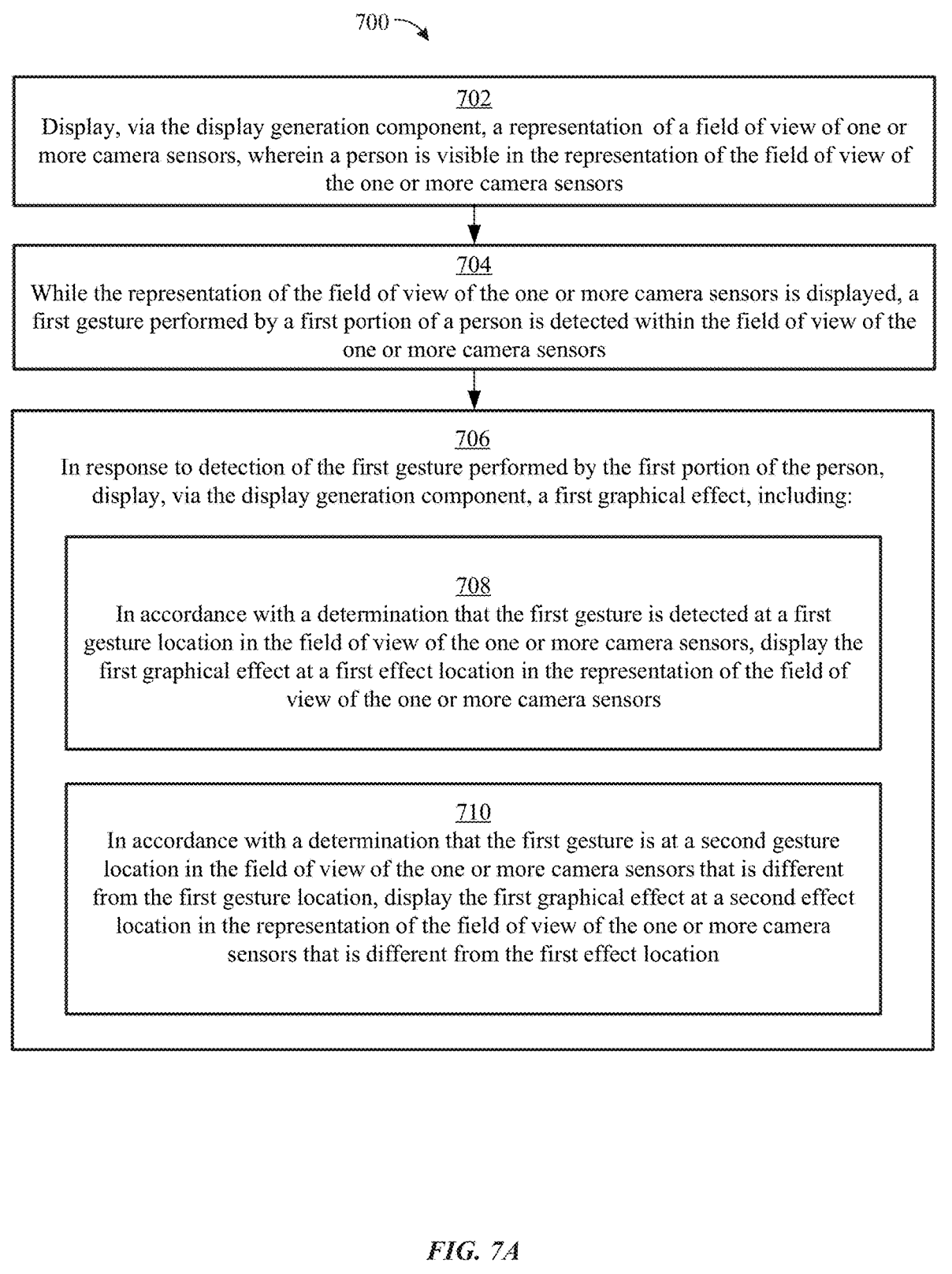

700

702
Display, via the display generation component, a representation of a field of view of one or more camera sensors, wherein a person is visible in the representation of the field of view of the one or more camera sensors 704
While the representation of the field of view of the one or more camera sensors is displayed, a first gesture performed by a first portion of a person is detected within the field of view of the one or more camera sensors 706
In response to detection of the first gesture performed by the first portion of the person, display, via the display generation component, a first graphical effect, including:

708
In accordance with a determination that the first gesture is detected at a first gesture location in the field of view of the one or more camera sensors, display the first graphical effect at a first effect location in the representation of the field of view of the one or more camera sensors 710
In accordance with a determination that the first gesture is at a second gesture location in the field of view of the one or more camera sensors that is different from the first gesture location, display the first graphical effect at a second effect location in the representation of the field of view of the one or more camera sensors that is different from the first effect location

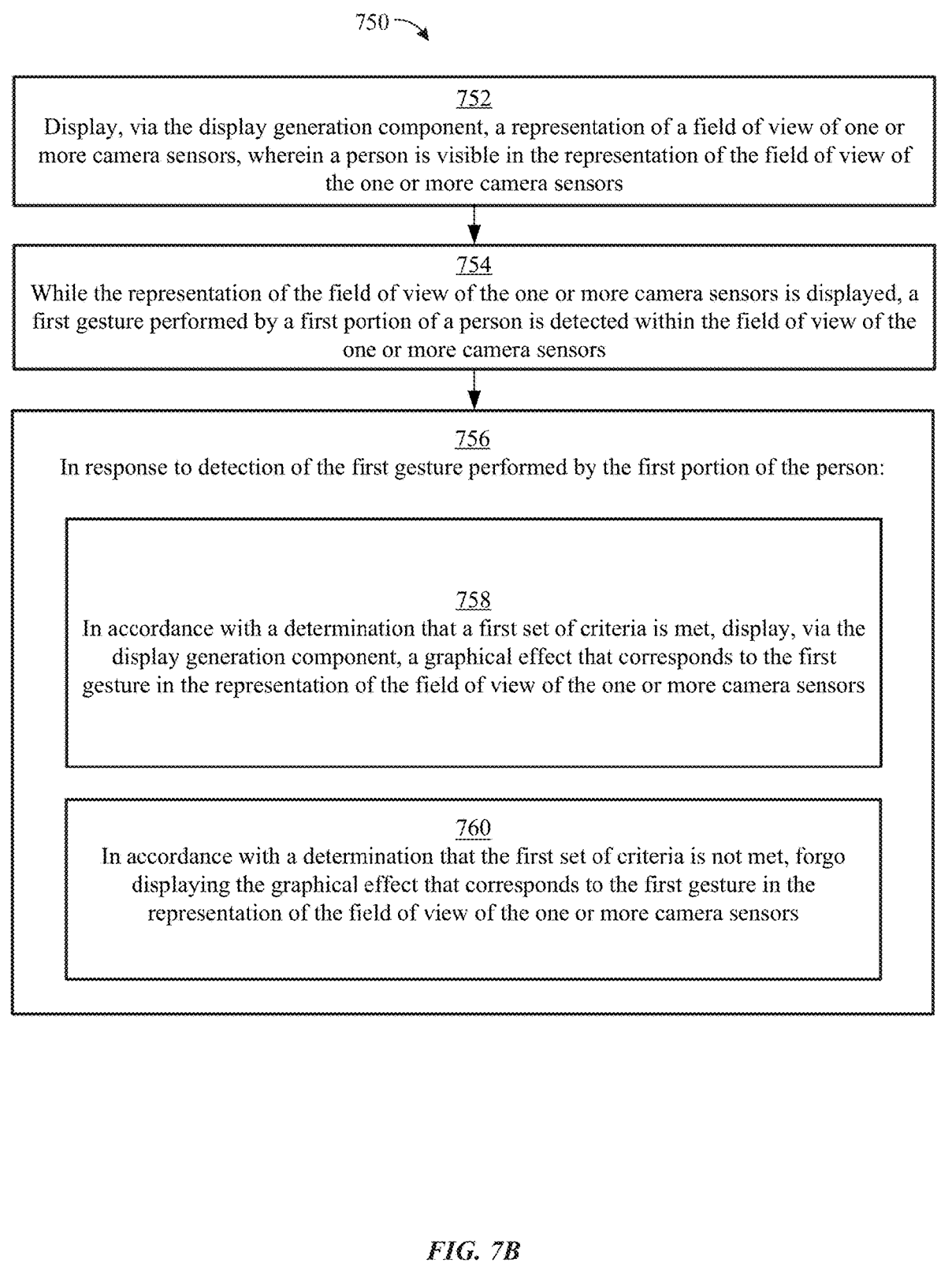

752
Display, via the display generation component, a representation of a field of view of one or more camera sensors, wherein a person is visible in the representation of the field of view of the one or more camera sensors 754
While the representation of the field of view of the one or more camera sensors is displayed, a first gesture performed by a first portion of a person is detected within the field of view of the one or more camera sensors 756
In response to detection of the first gesture performed by the first portion of the person:

758
In accordance with a determination that a first set of criteria is met, display, via the display generation component, a graphical effect that corresponds to the first gesture in the representation of the field of view of the one or more camera sensors 760
In accordance with a determination that the first set of criteria is not met, forgo displaying the graphical effect that corresponds to the first gesture in the representation of the field of view of the one or more camera sensors

*FIG. 7B*

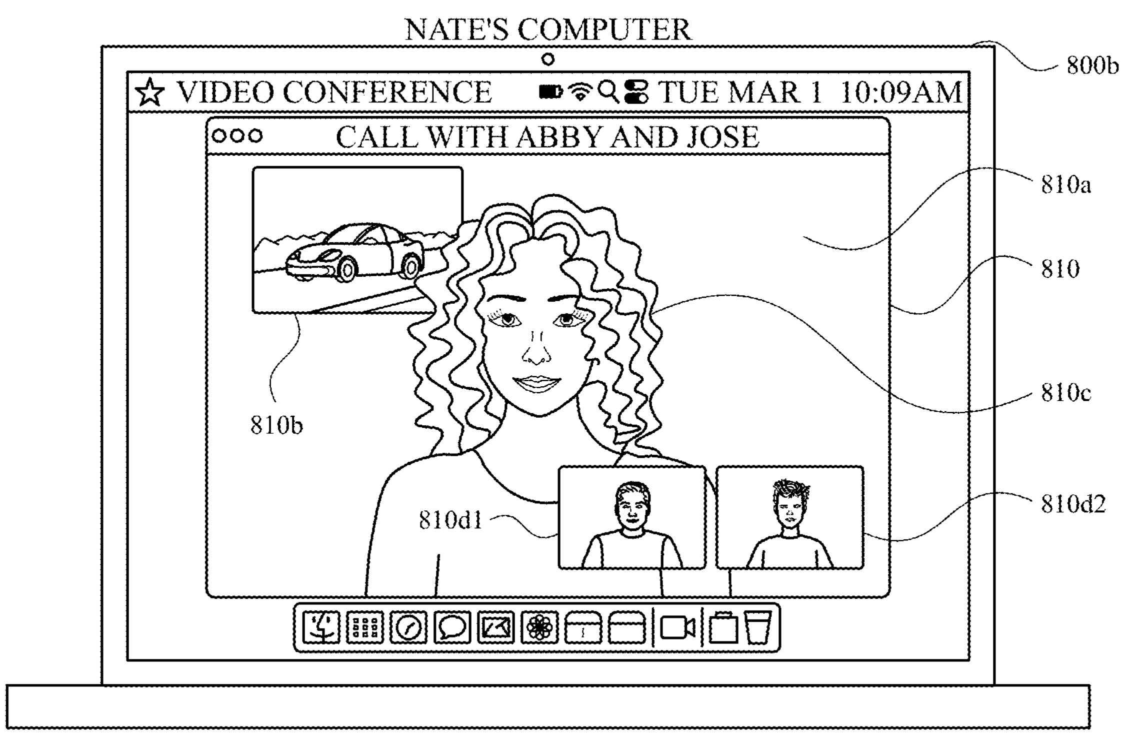
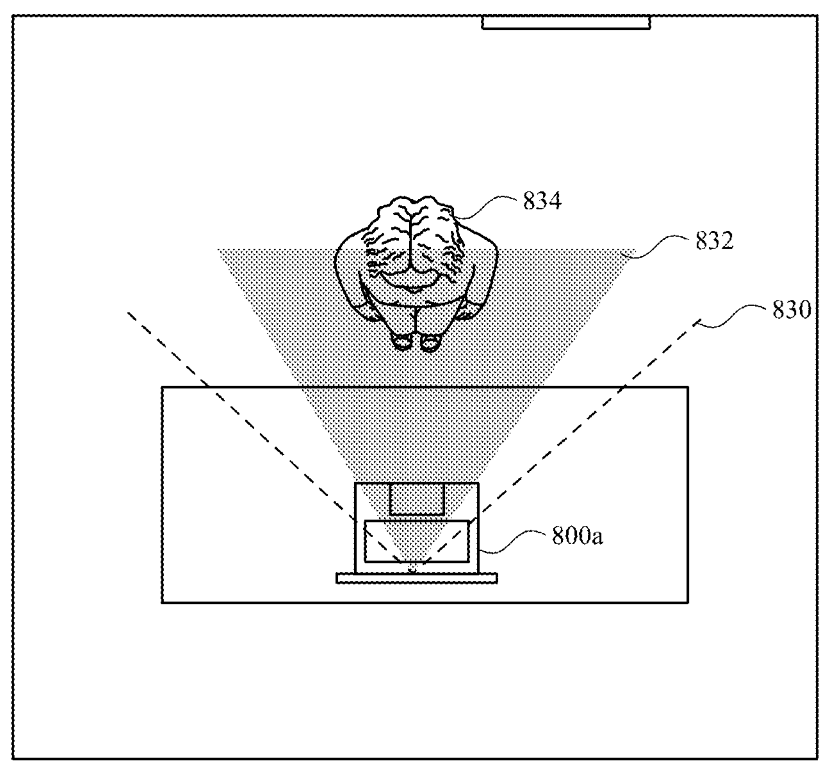
*FIG. 8H*

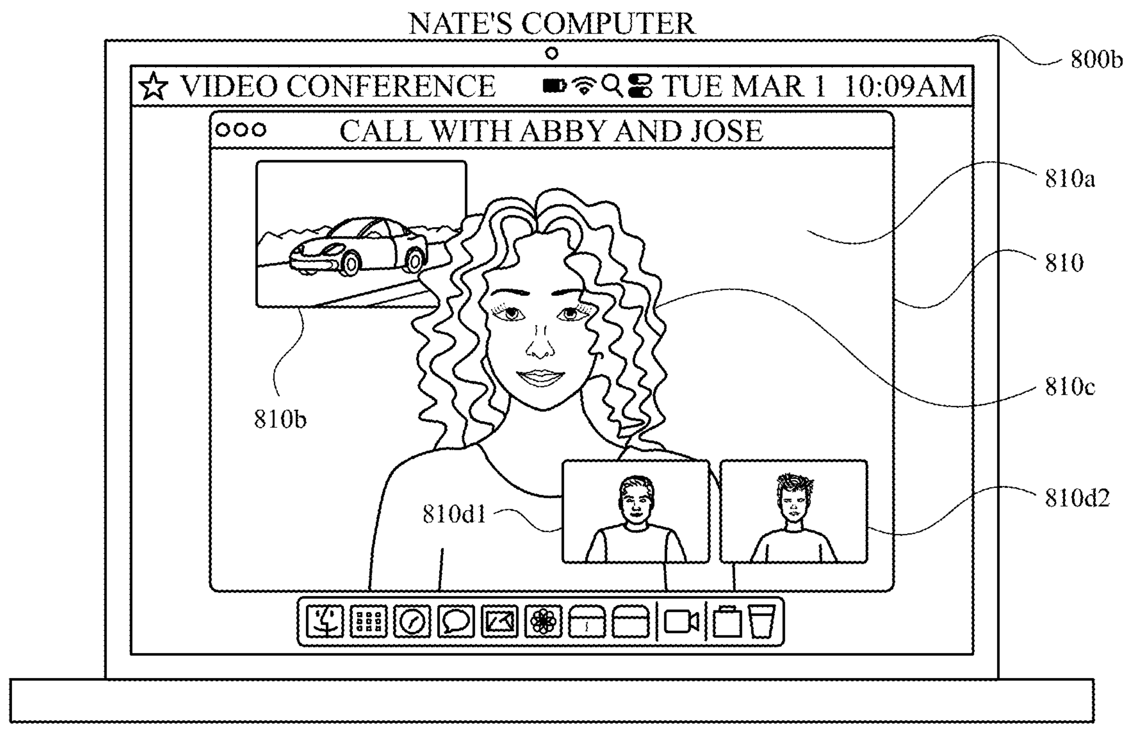
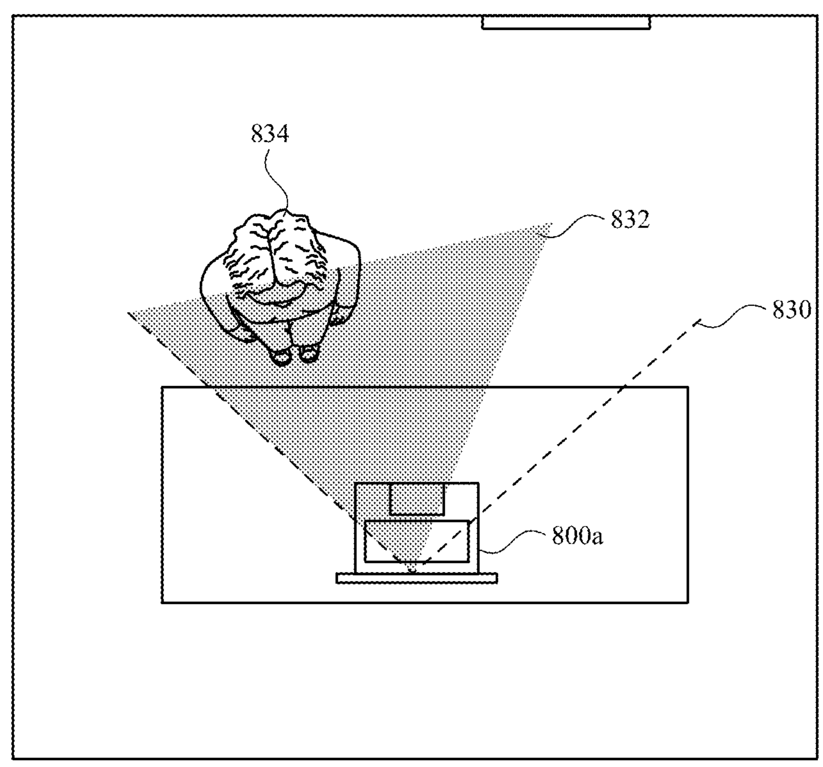
*FIG. 8I*

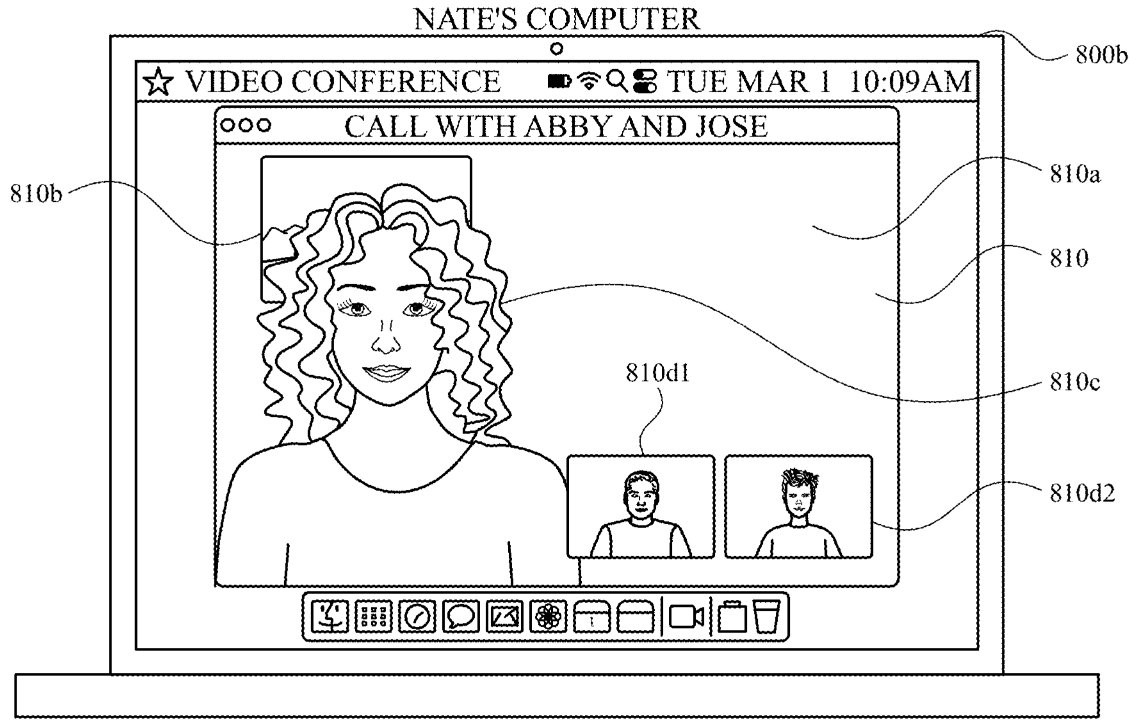
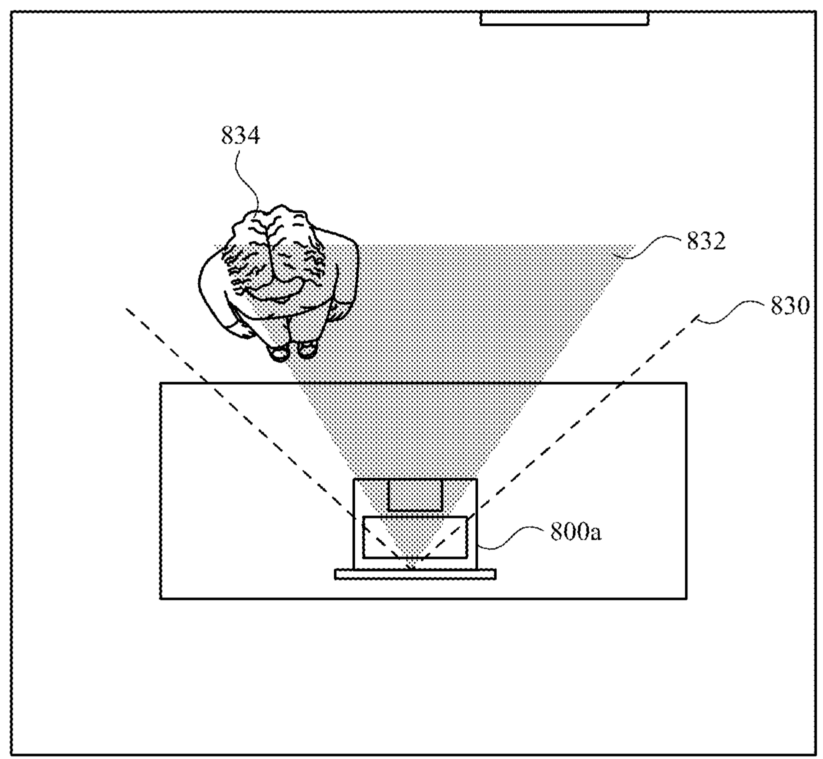
*FIG. 8J*

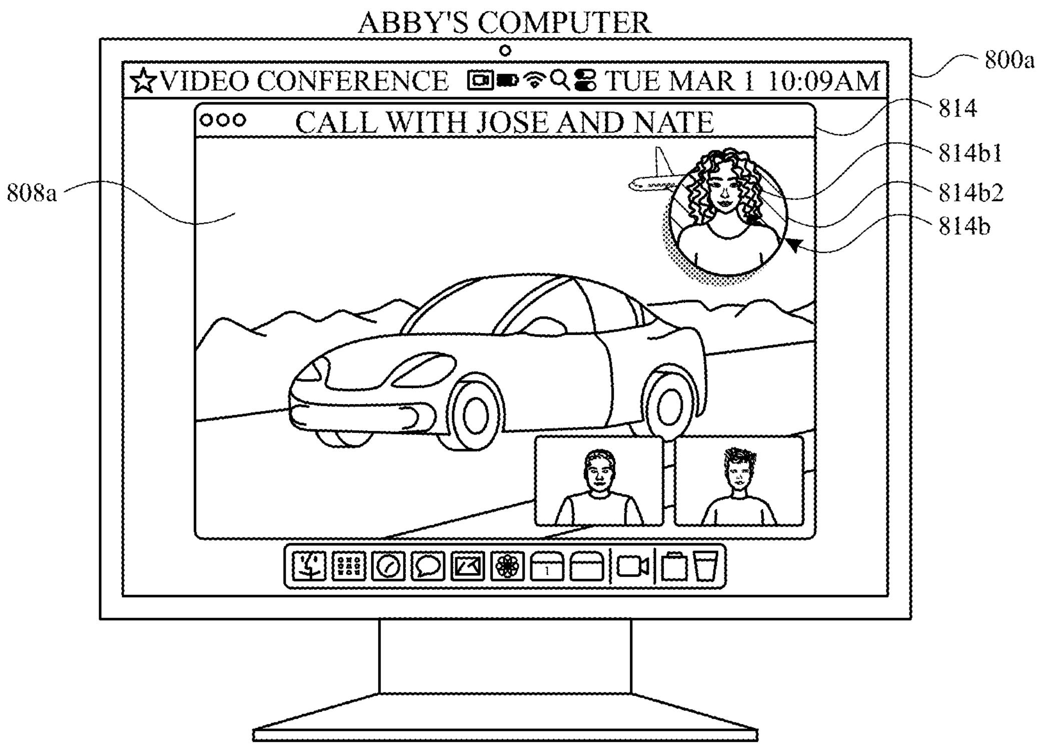
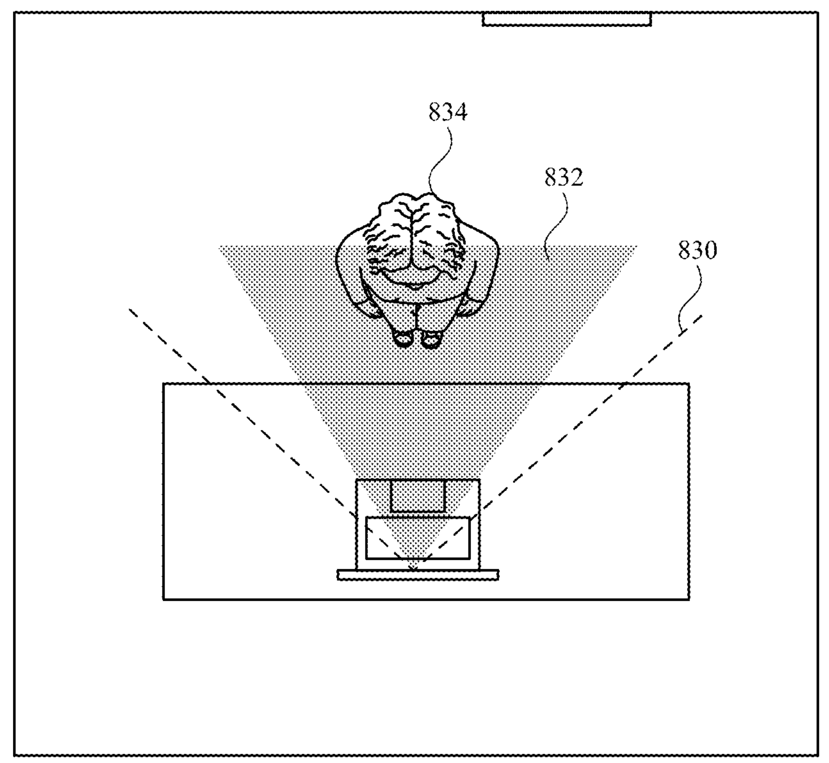
*FIG. 8W*

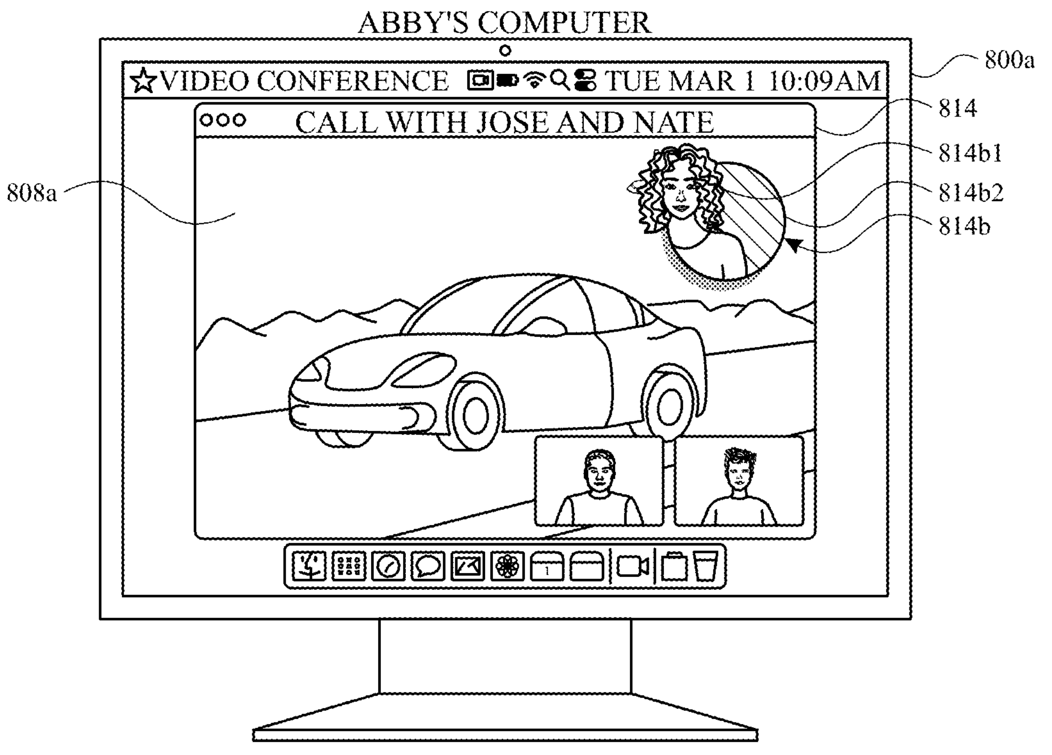
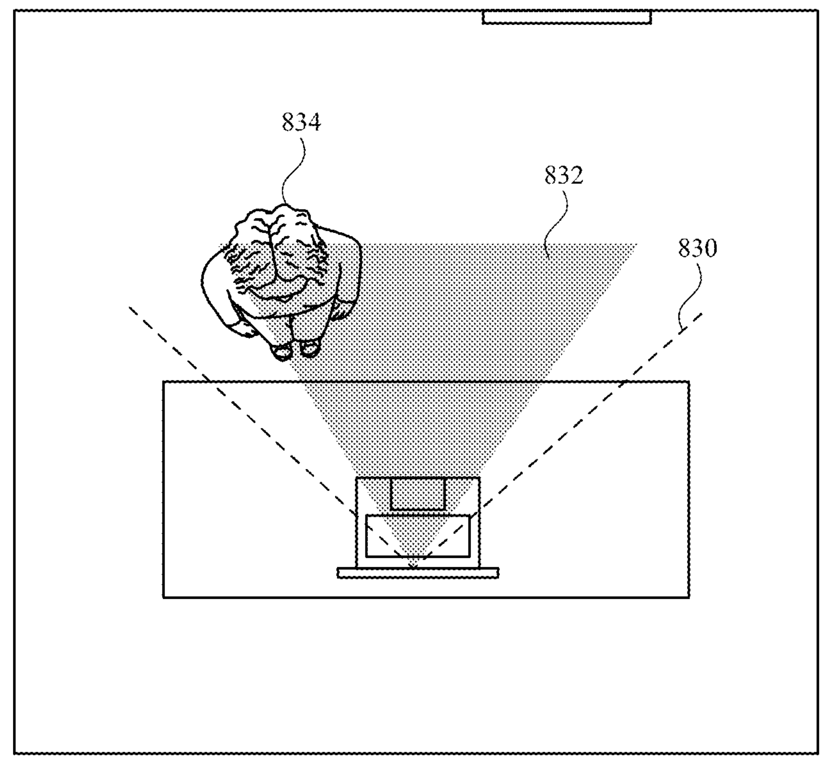
*FIG. 8X*

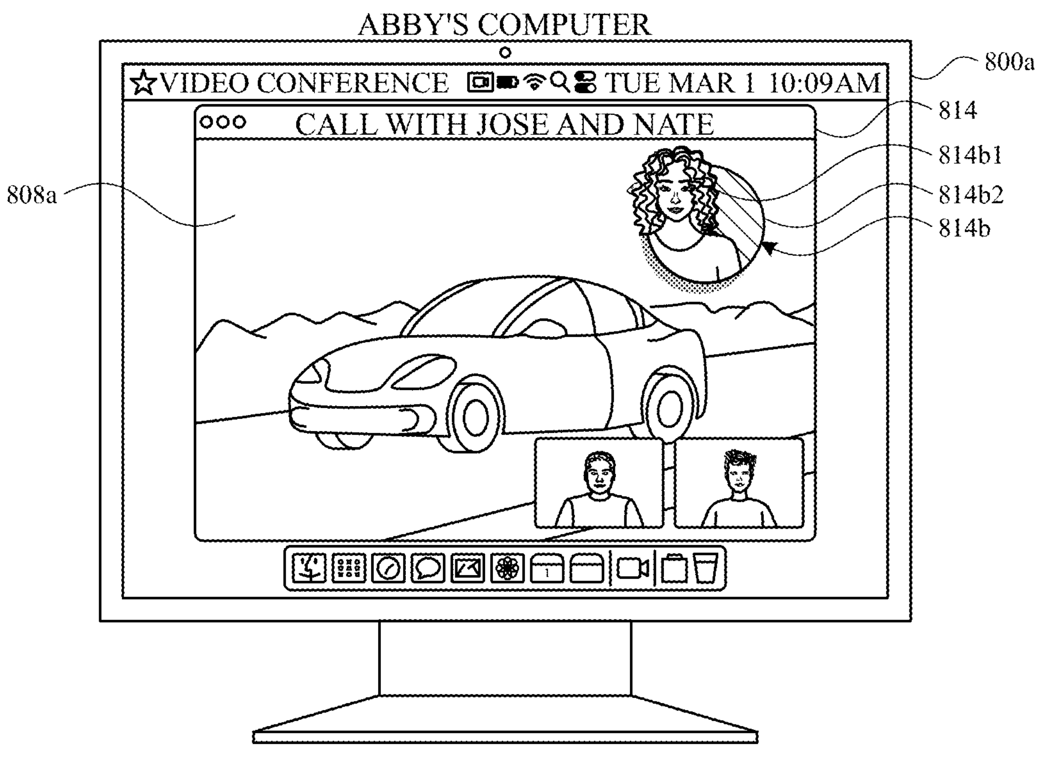
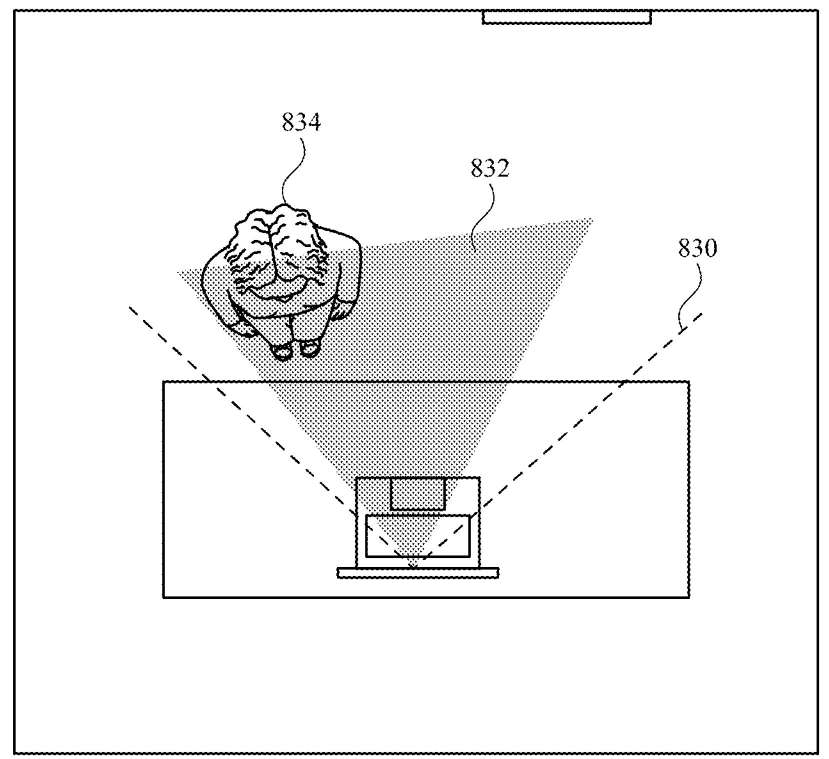
*FIG. 8Y*

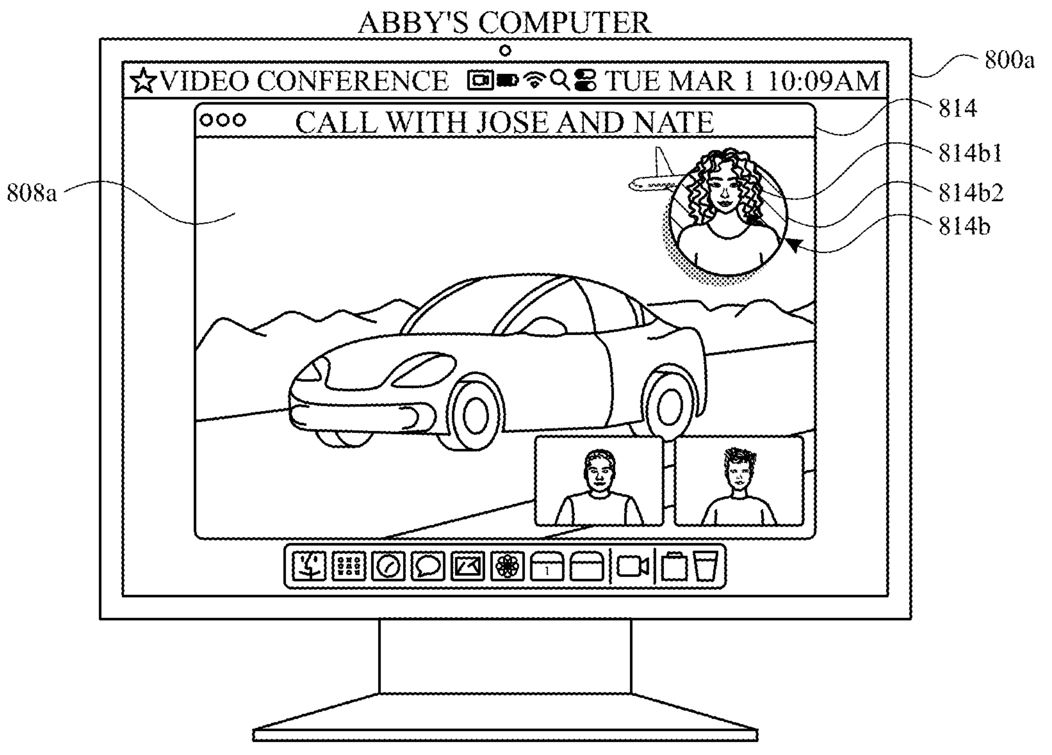
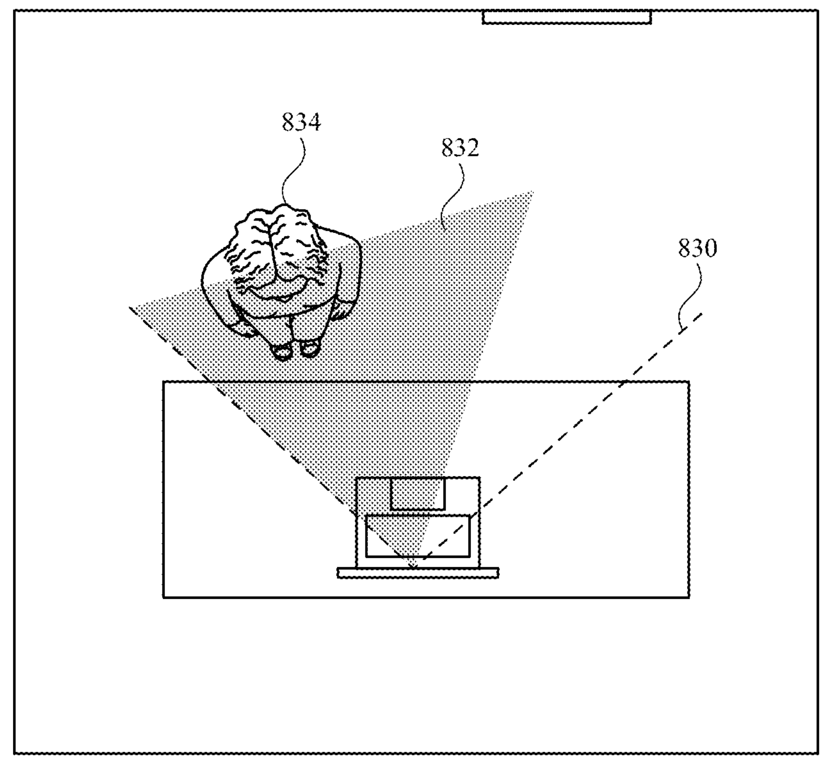
*FIG. 8Z*

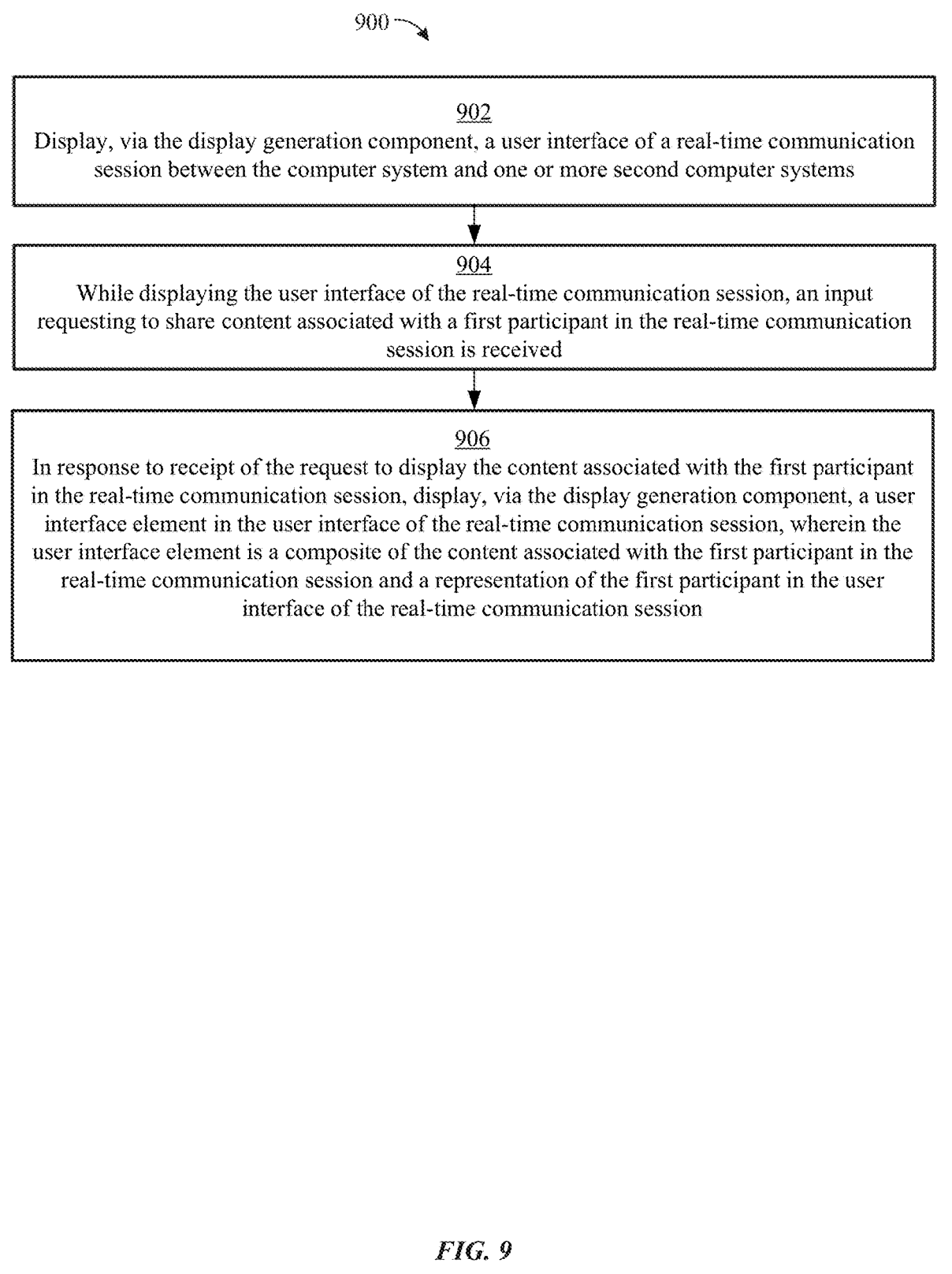

900

902
Display, via the display generation component, a user interface of a real-time communication session between the computer system and one or more second computer systems 904
While displaying the user interface of the real-time communication session, an input requesting to share content associated with a first participant in the real-time communication session is received 906
In response to receipt of the request to display the content associated with the first participant in the real-time communication session, display, via the display generation component, a user interface element in the user interface of the real-time communication session, wherein the user interface element is a composite of the content associated with the first participant in the real-time communication session and a representation of the first participant in the user interface of the real-time communication session

*FIG. 9*

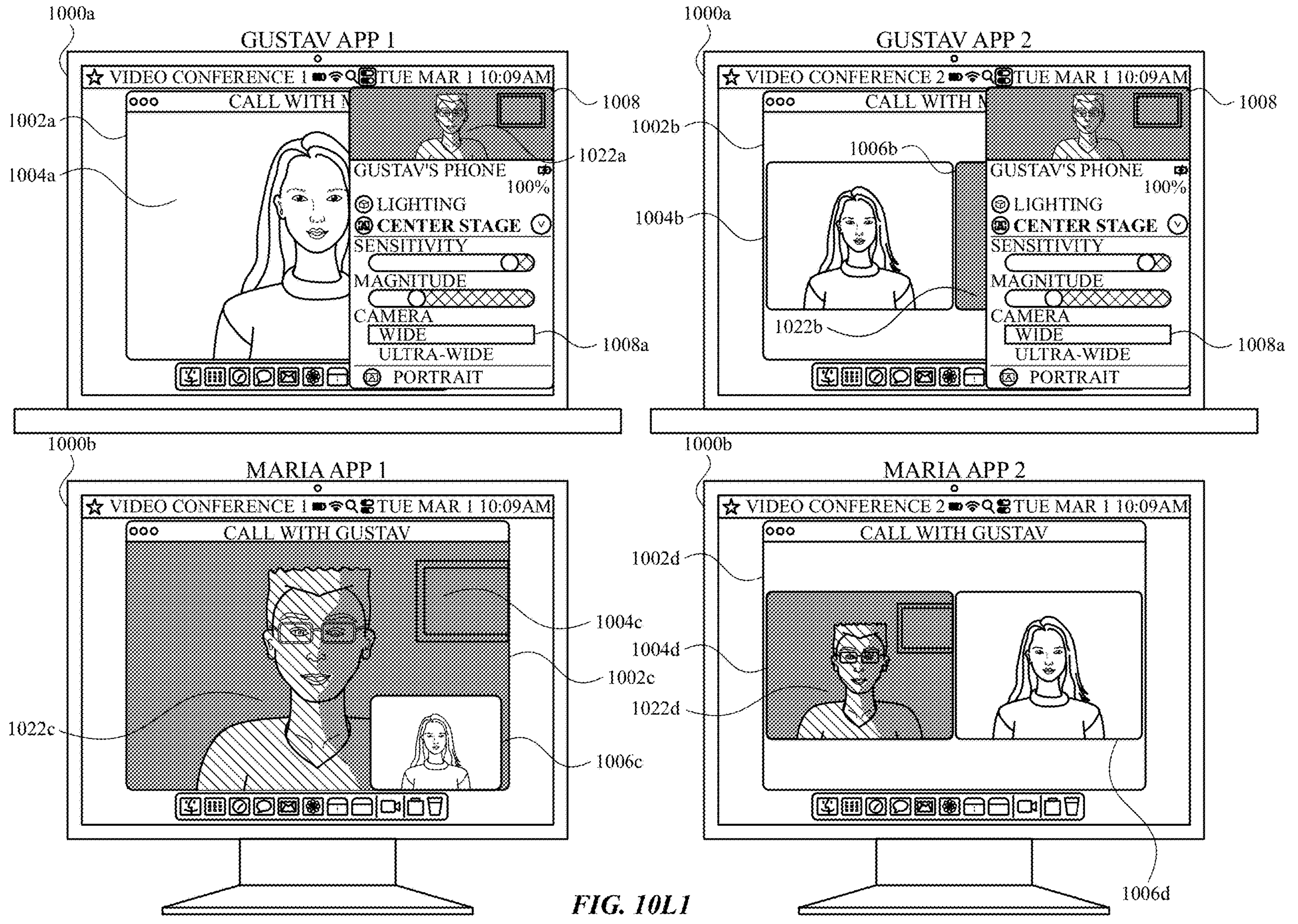
FIG. 10L1

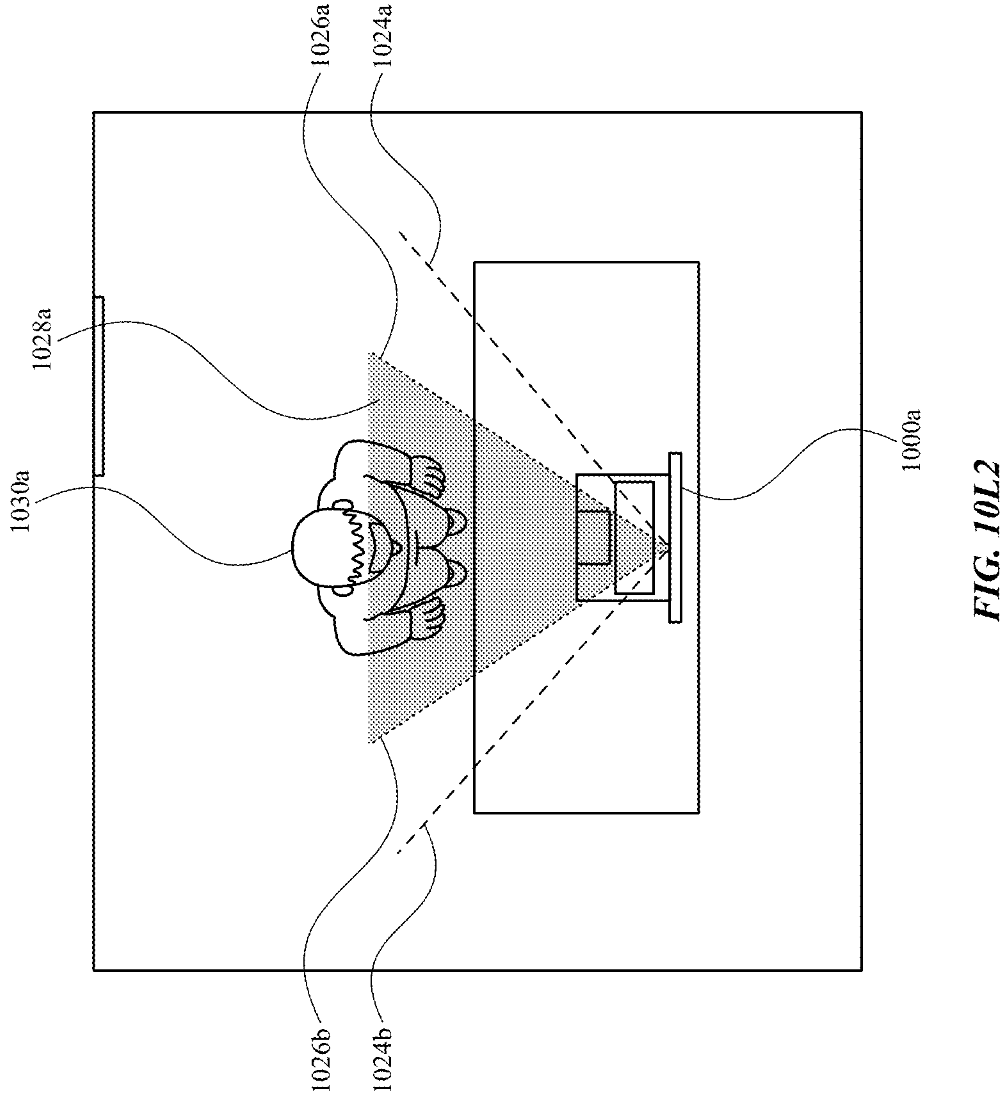
FIG. 10L2

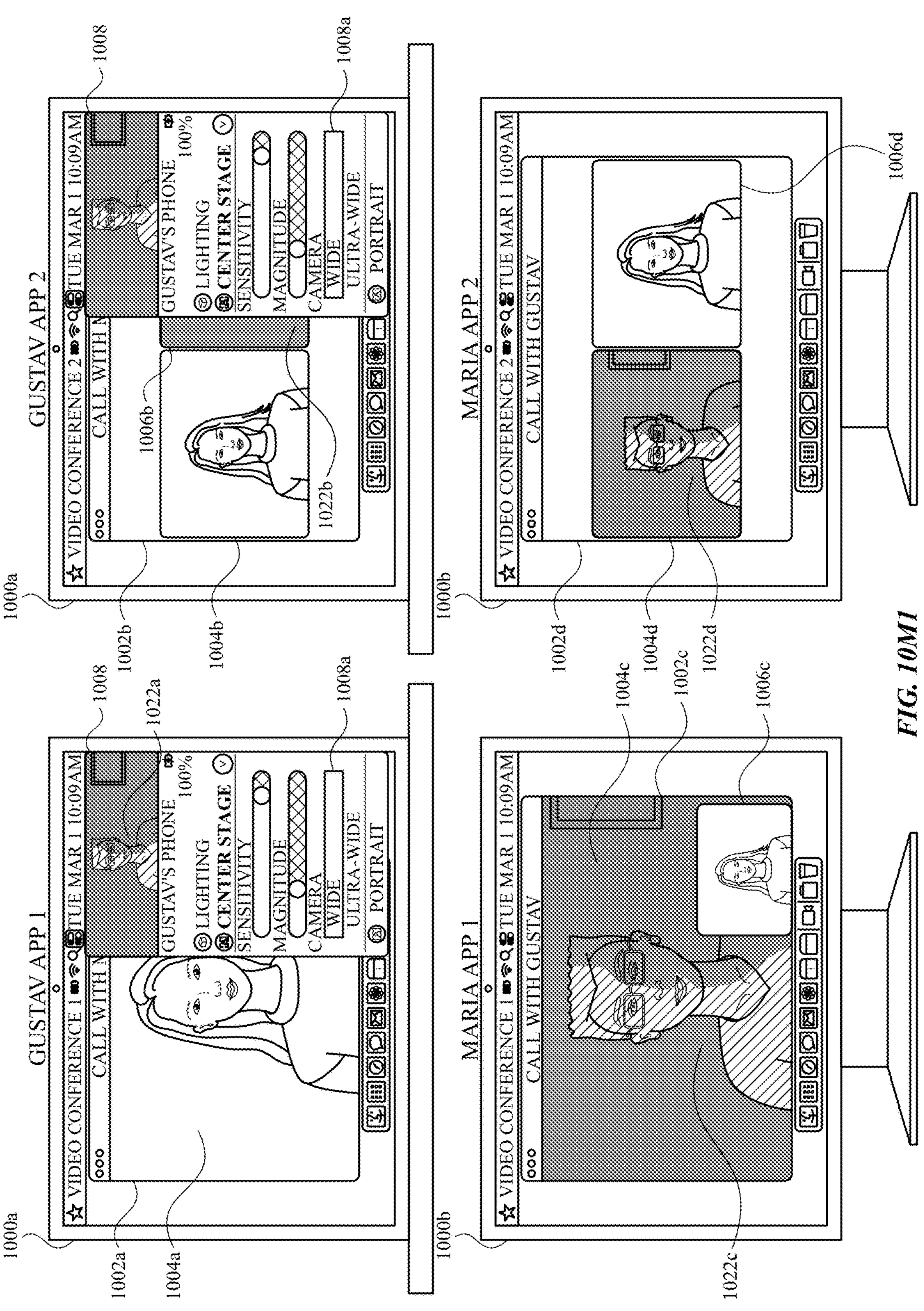
FIG. 10M1

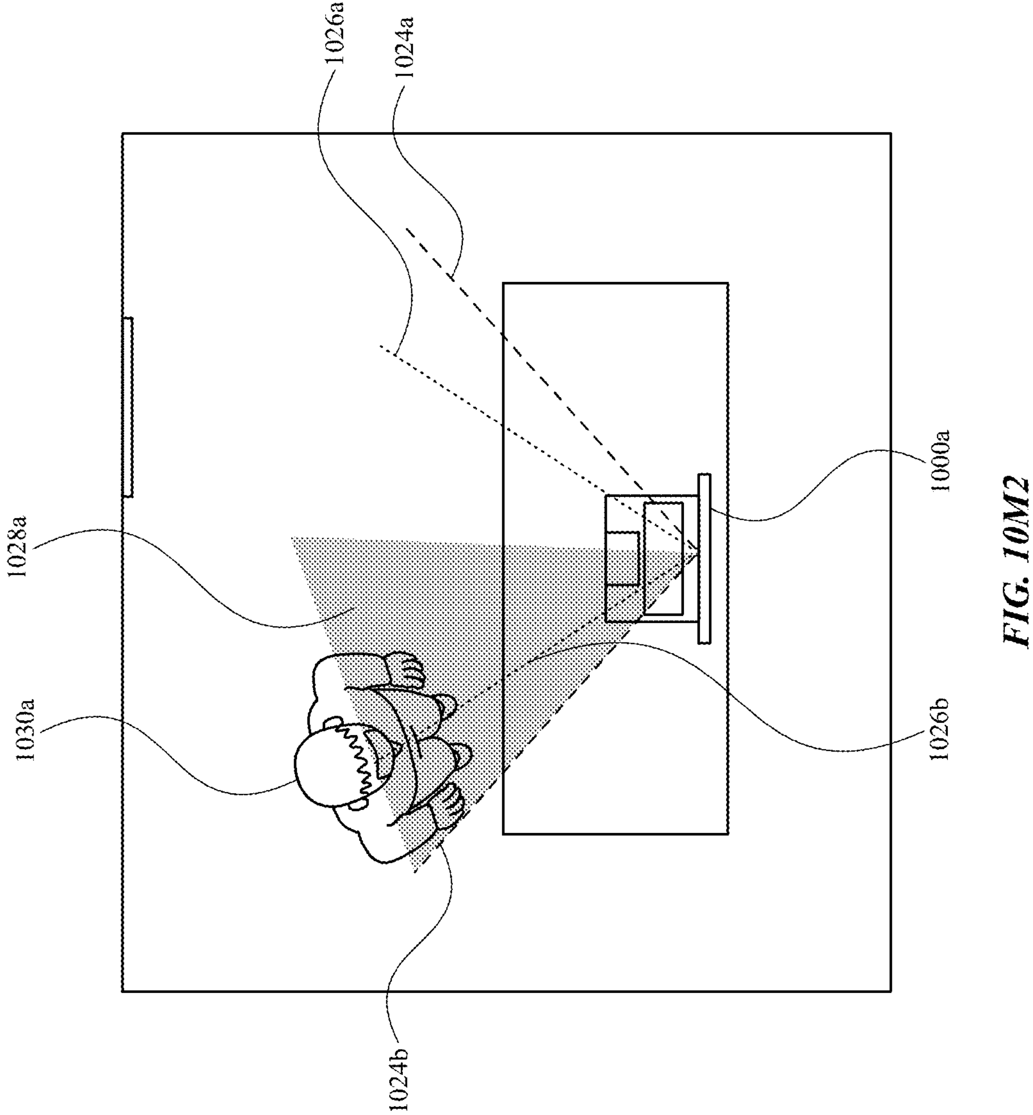
FIG. 10M2

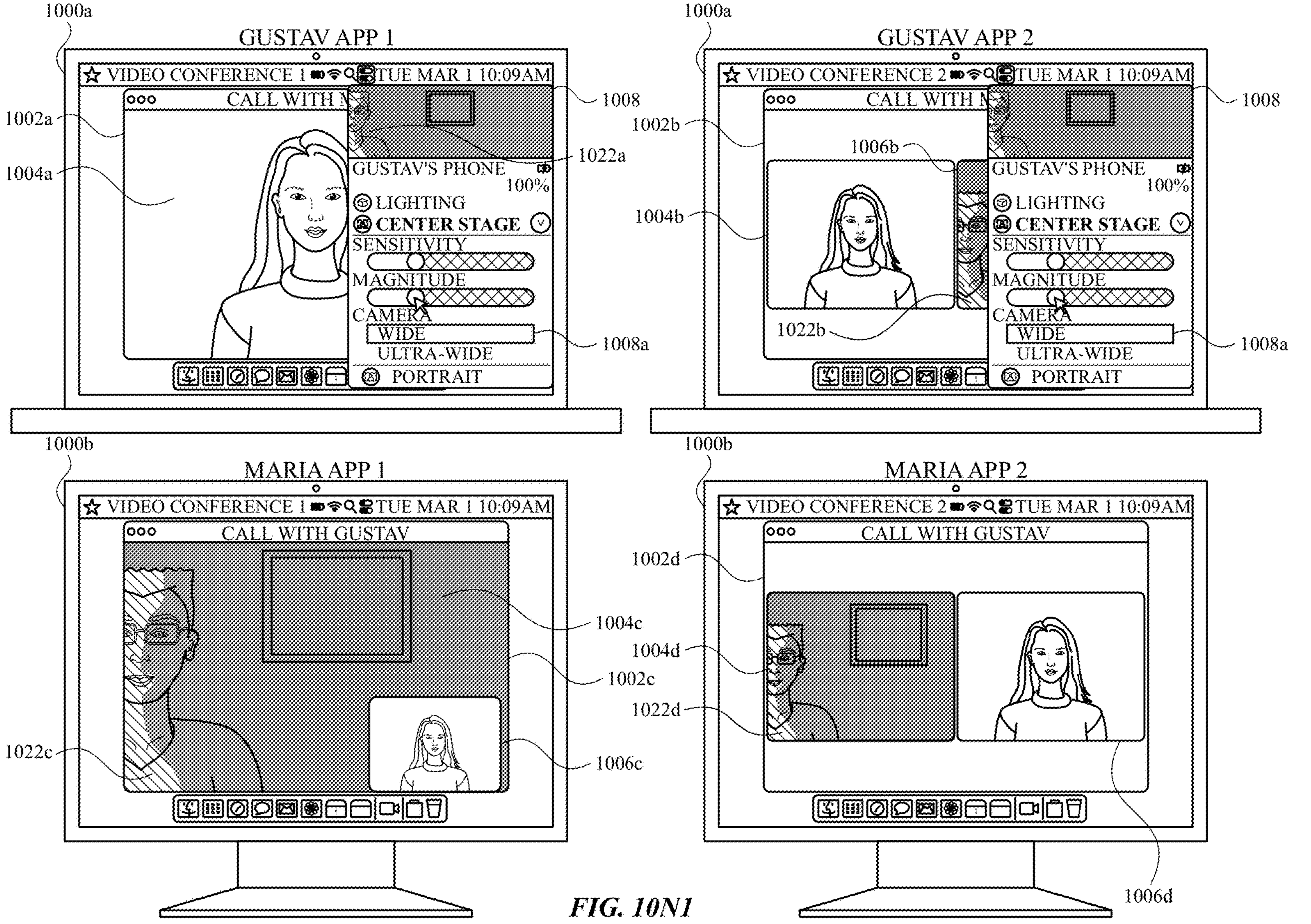
FIG. 10N1

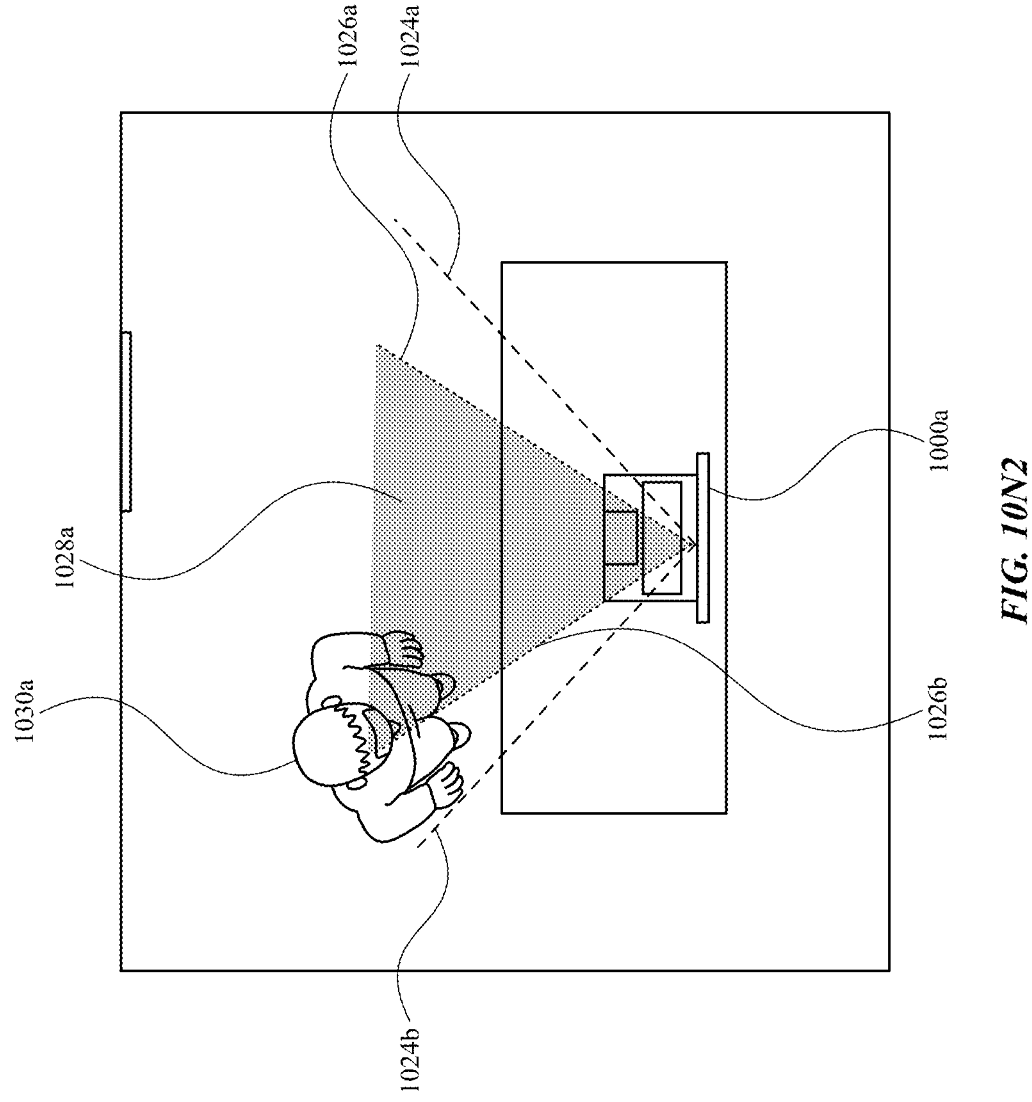
FIG. 10N2

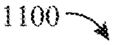

1102
Detect, via the one or more input devices, a first set of one or more inputs including a request to display a user interface of a first application 1104
In response to detecting the first set of one or more inputs, display, via the display generation component, the user interface of the first application including displaying a first representation of a field of view of the one or more camera sensors and a graphical enhancement applied to the representation of the field of view of the one or more camera sensors, including:

1106
In accordance with a determination that a parameter associated with the graphical enhancement is set to a first value, display the graphical enhancement with a first characteristic 1108
In accordance with a determination that the parameter associated with the graphical enhancement is set to a second value that is different from the first value, display the first graphical enhancement with a second characteristic that is different from the first characteristic 1110
Detect, via the one or more input devices, a second set of one or more inputs including a request to display a user interface of a second application that is different from the first application

*FIG. 11A*

1112
In response to detecting the second set of one or more inputs, display, via the display generation component, the user interface of the second application including displaying a second representation of the field of view of the one or more camera sensors with the graphical enhancement, including:

1114
In accordance with a determination that the parameter associated with the graphical enhancement is set to the first value, display the graphical enhancement with the first characteristic 1116
In accordance with a determination that the parameter associated with the graphical enhancement is set to the second value, display the graphical enhancement with the second characteristic

*FIG. 11B*

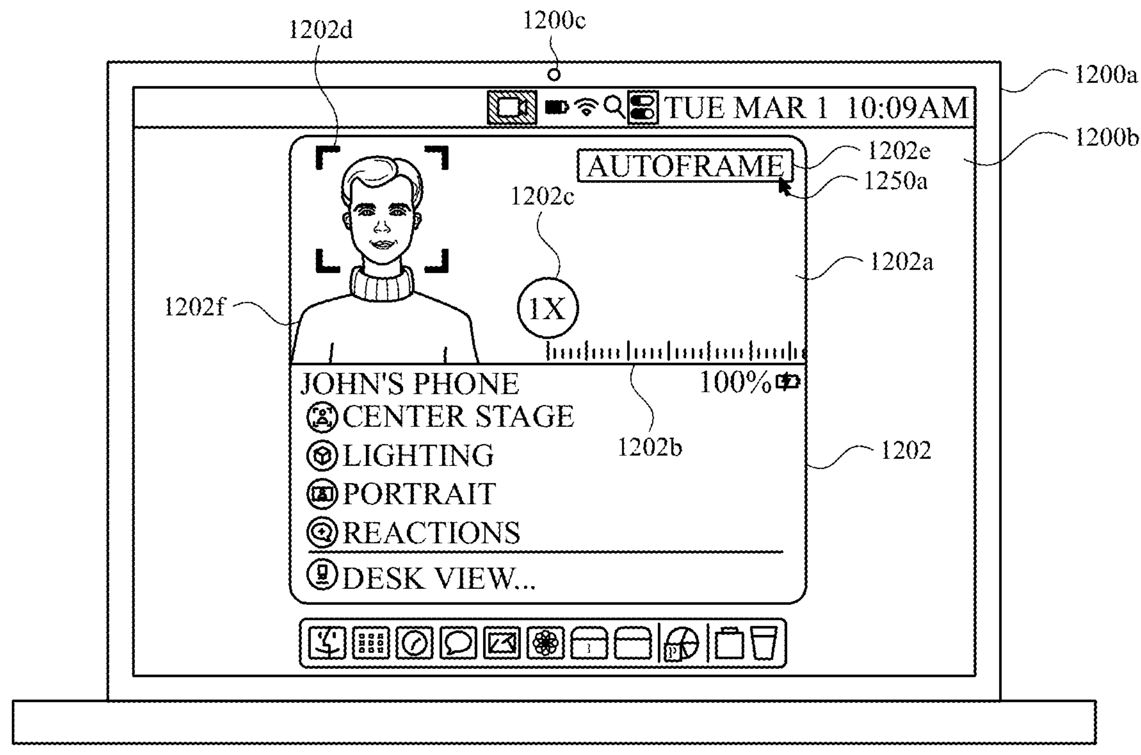
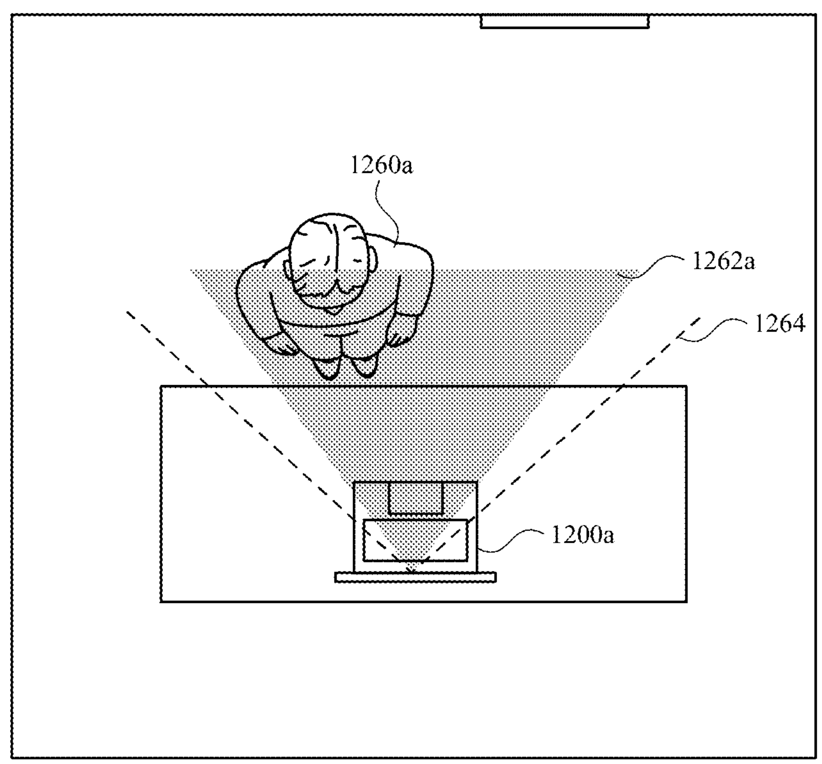
*FIG. 12A*

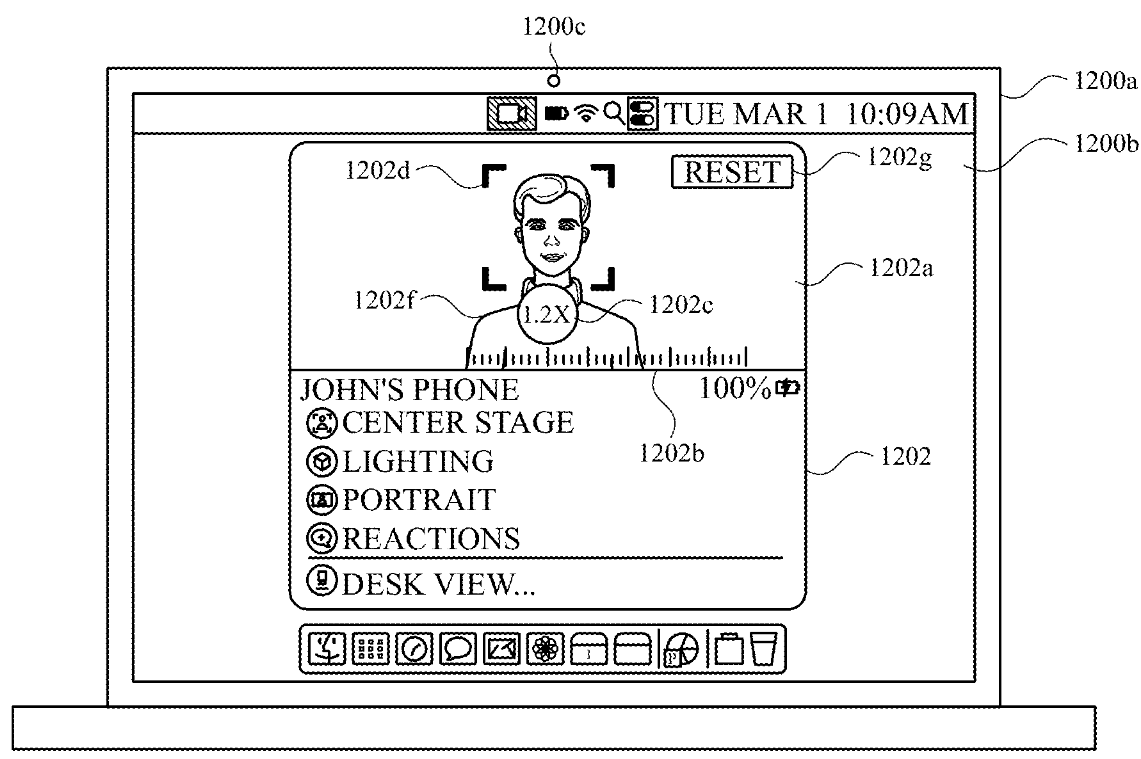
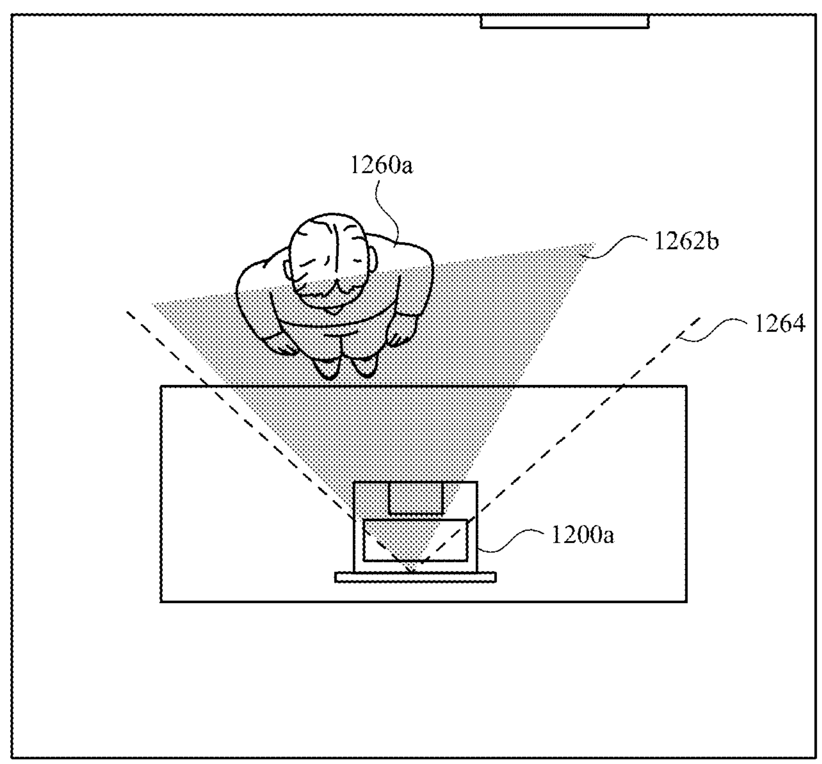
*FIG. 12B*

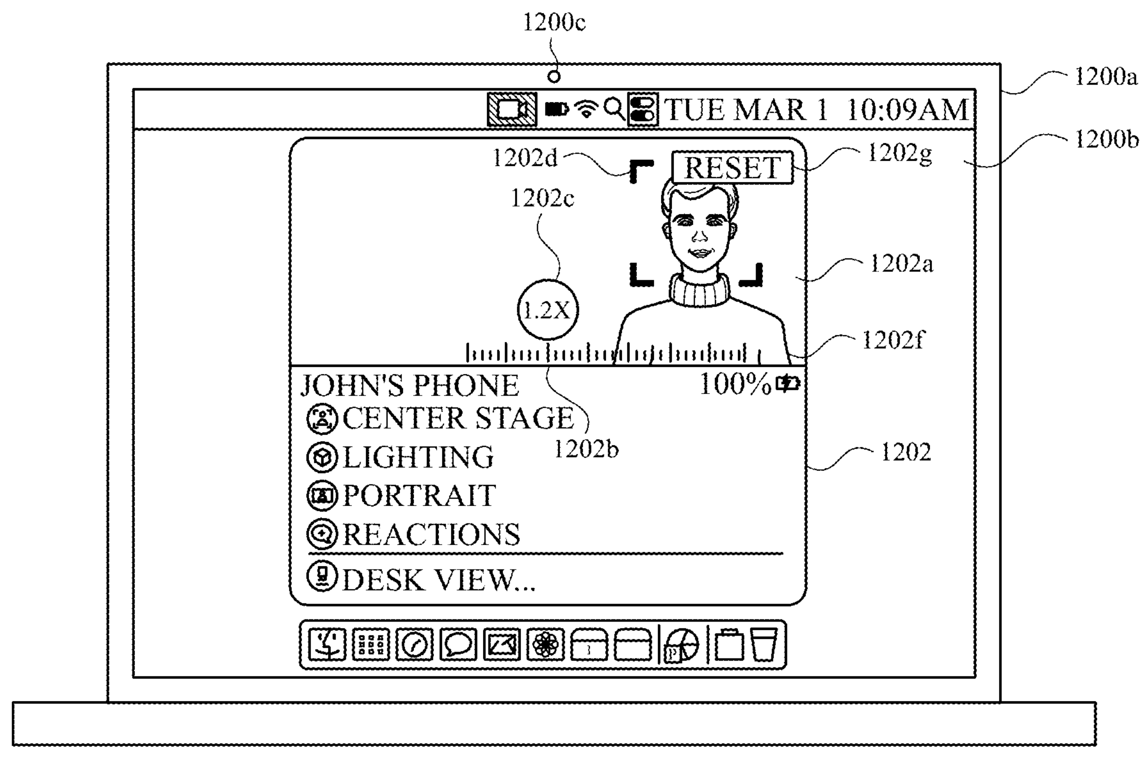
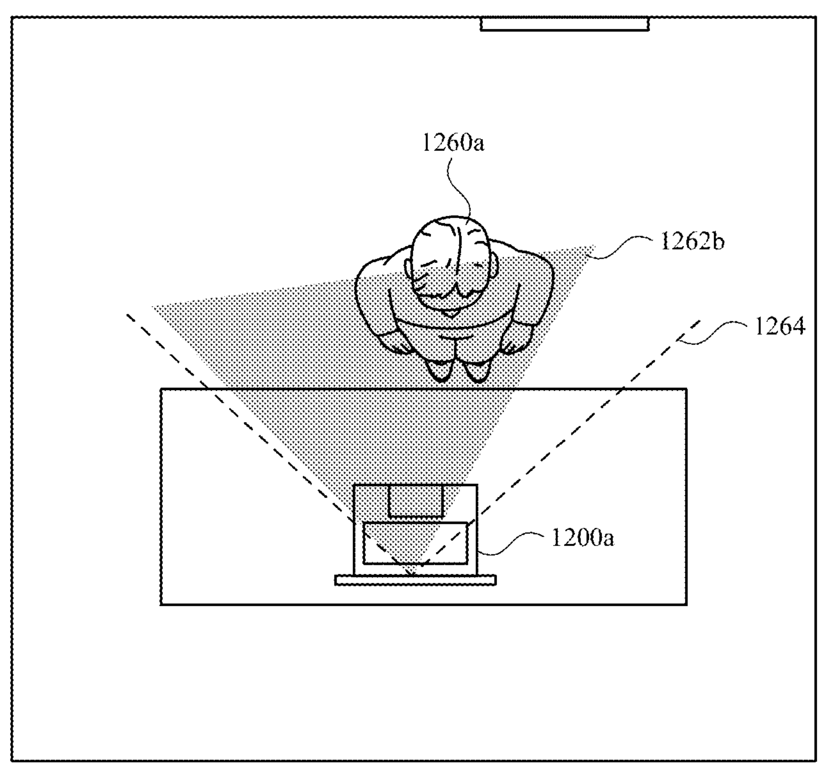
*FIG. 12C*

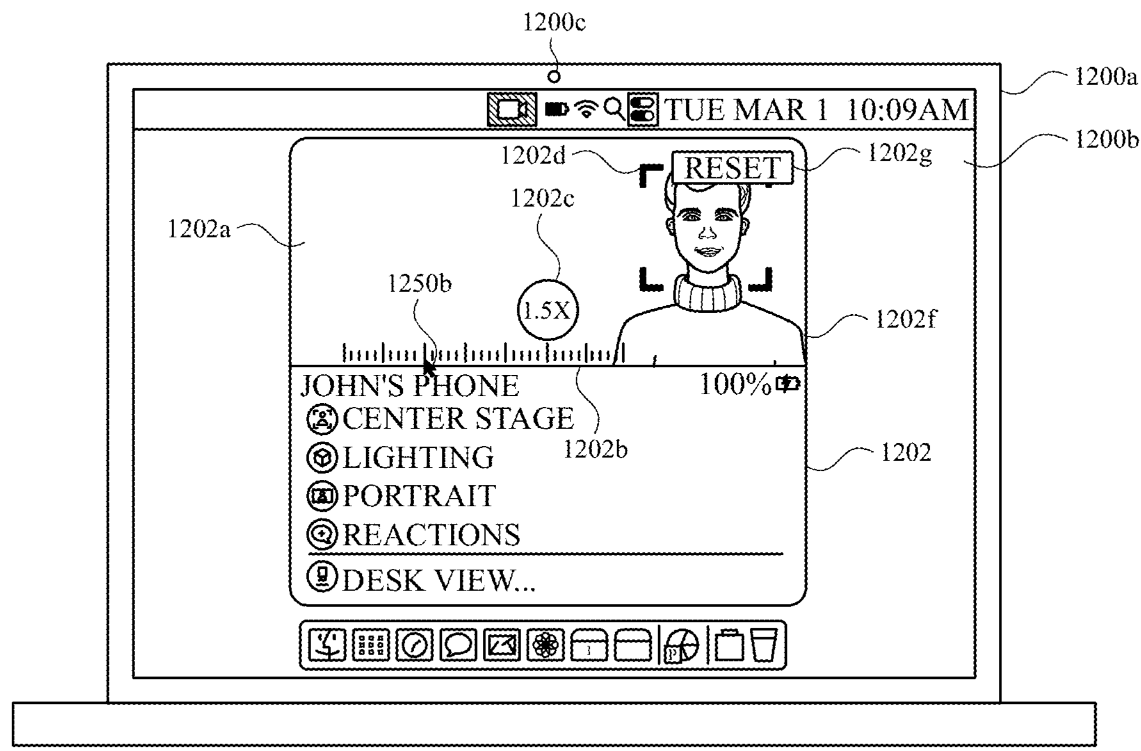
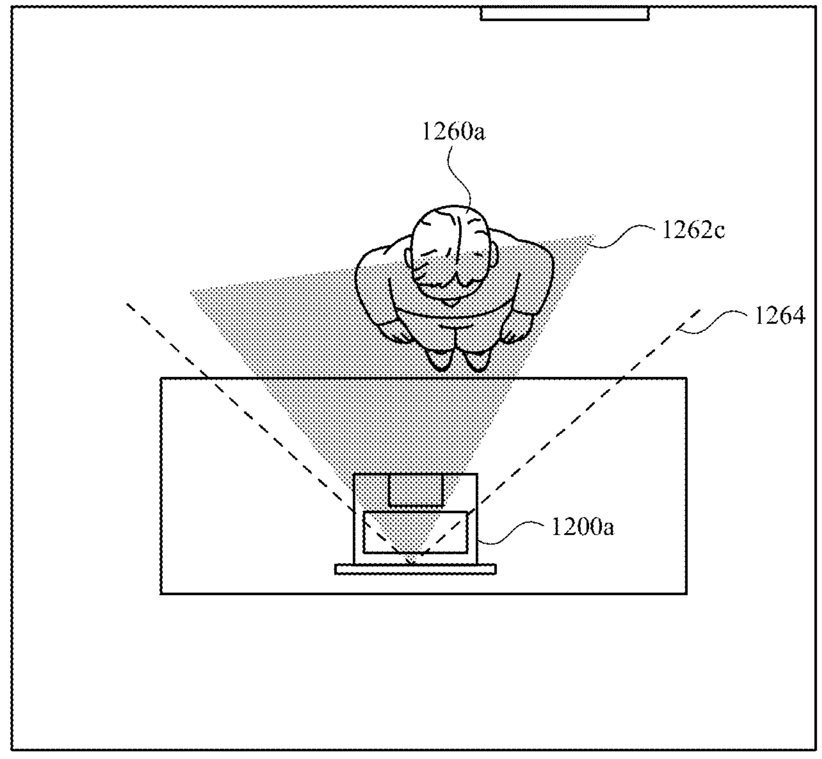
*FIG. 12D*

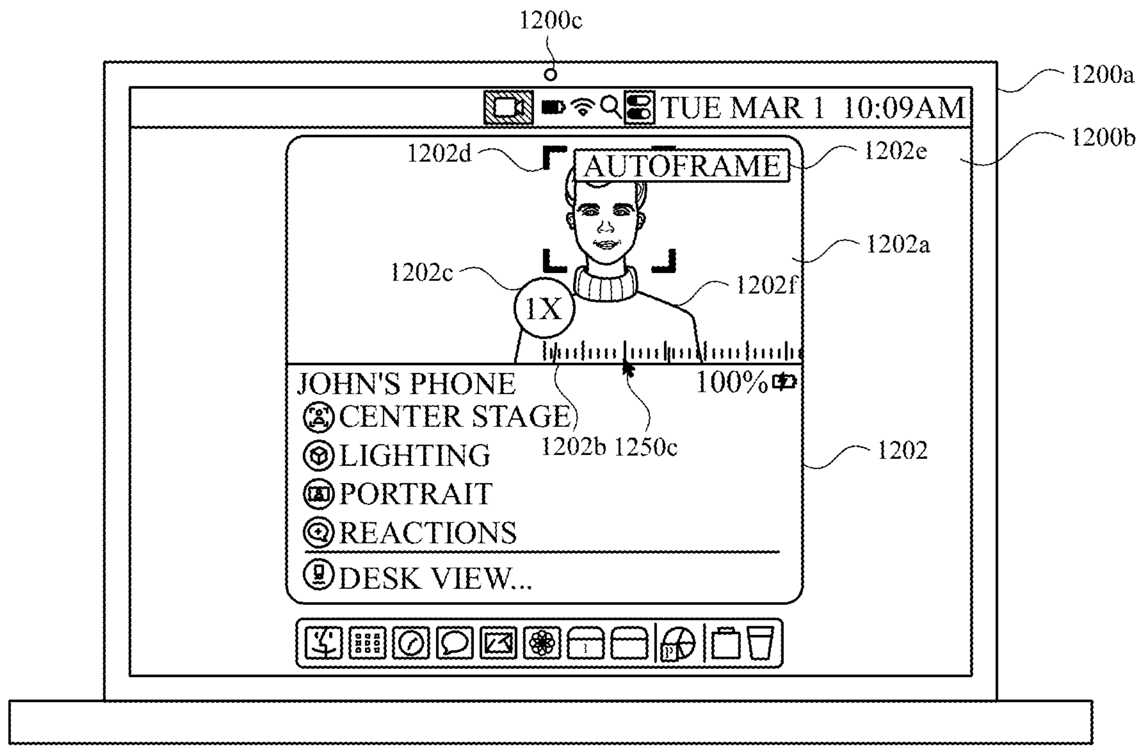
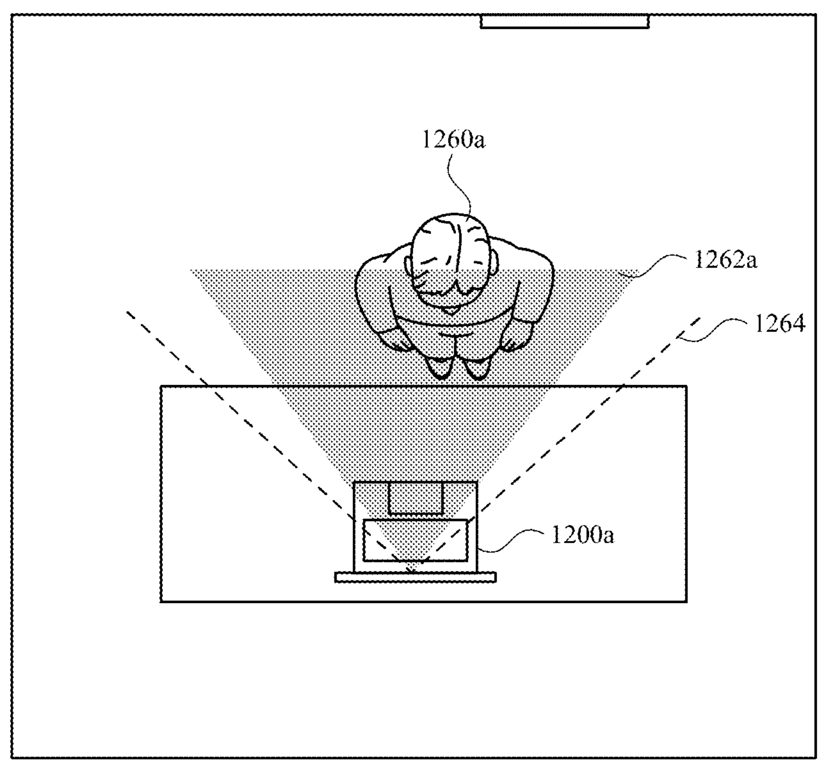
*FIG. 12E*

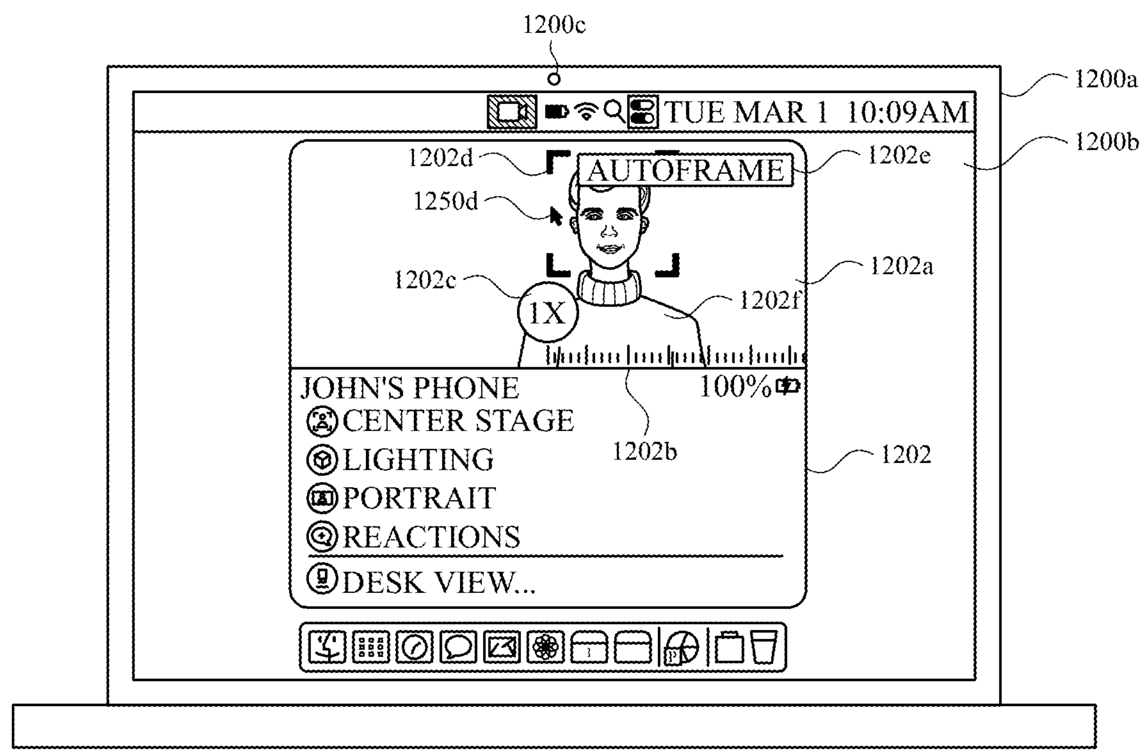
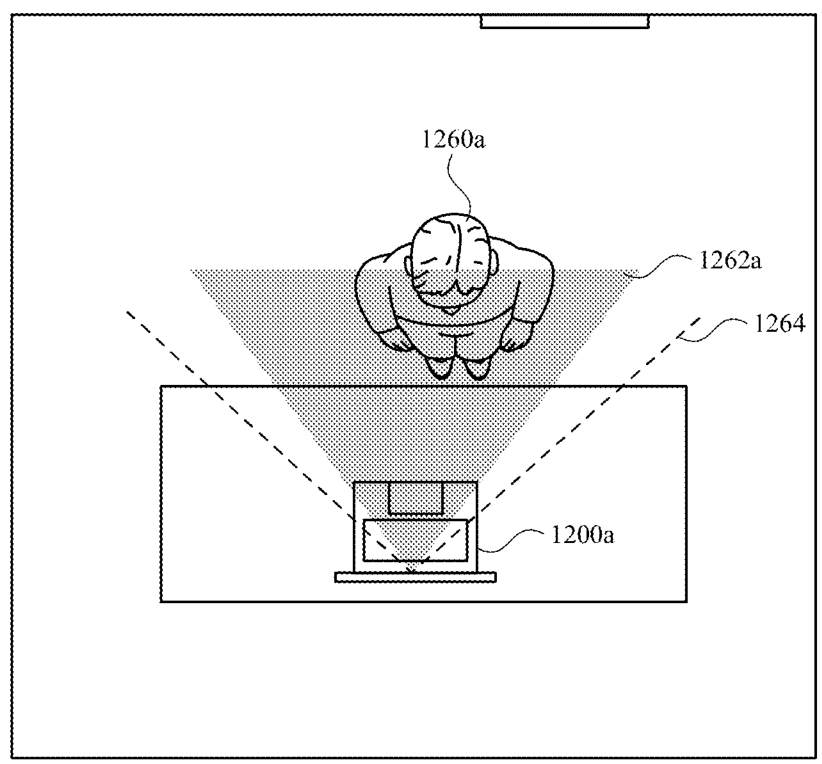
*FIG. 12F*

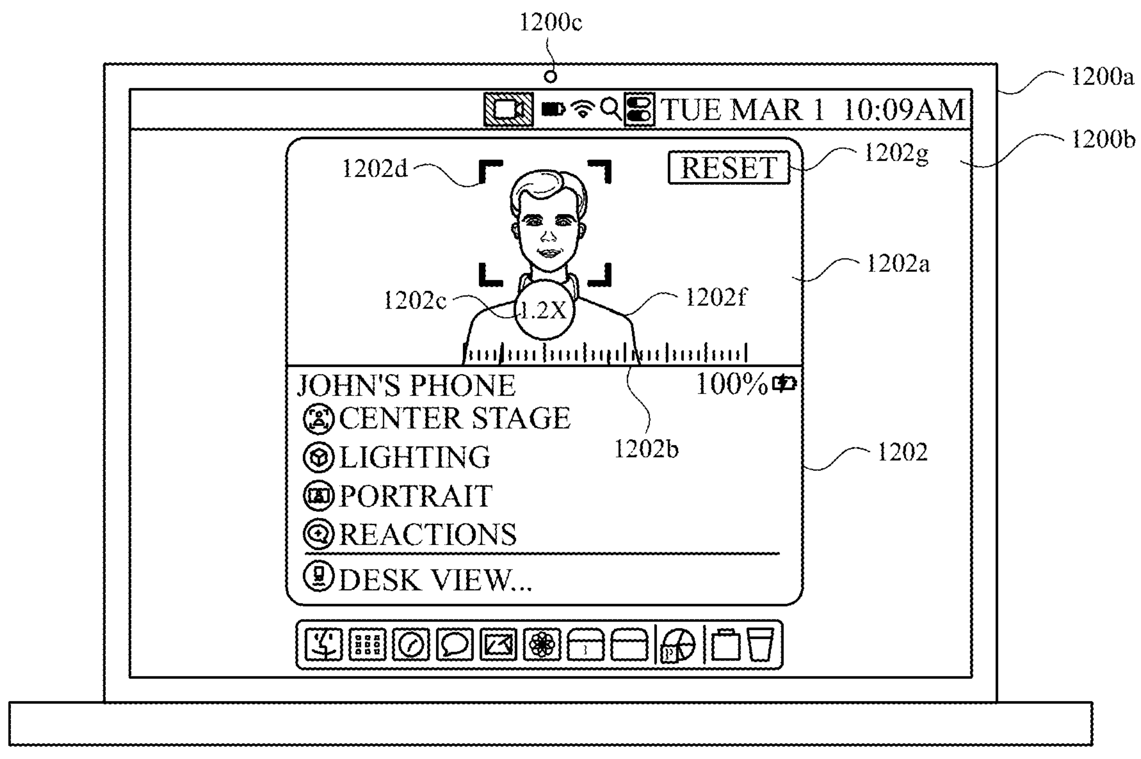
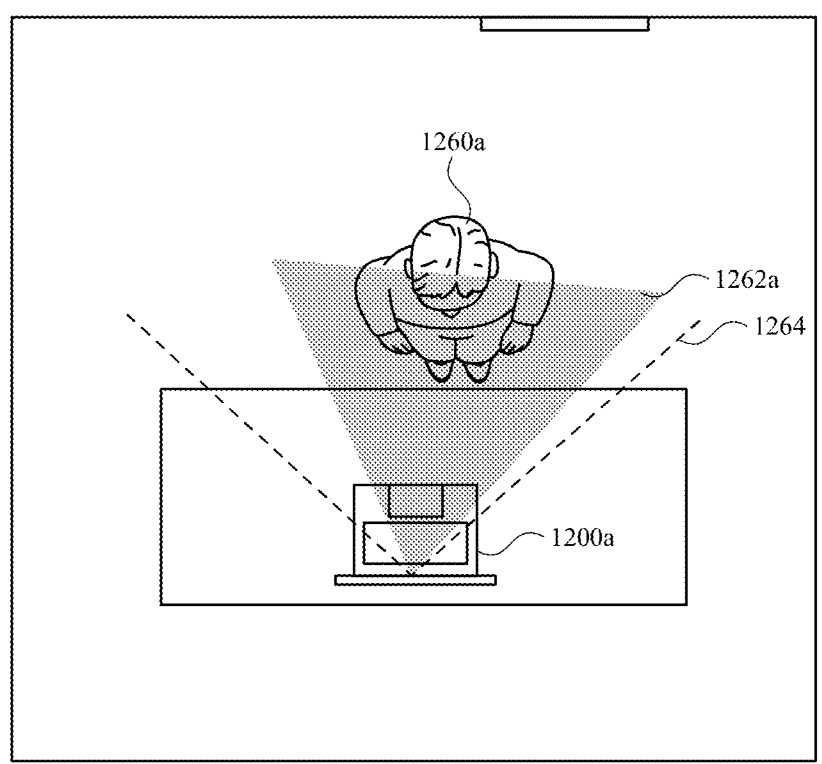
*FIG. 12G*

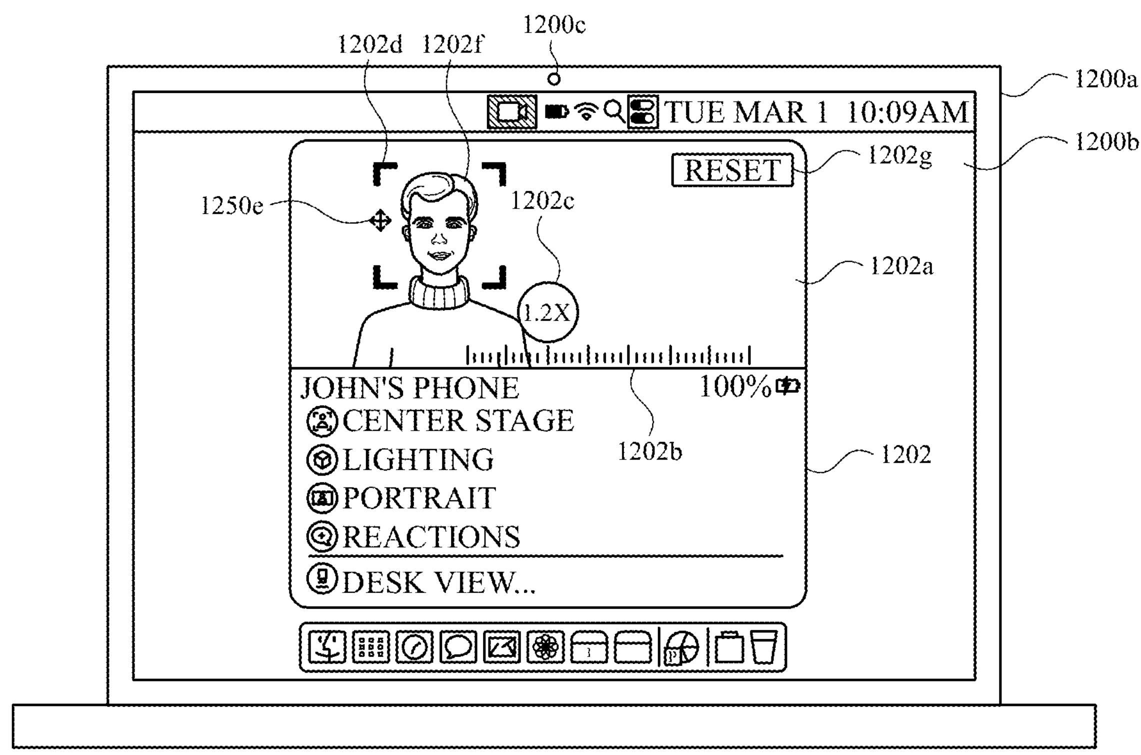
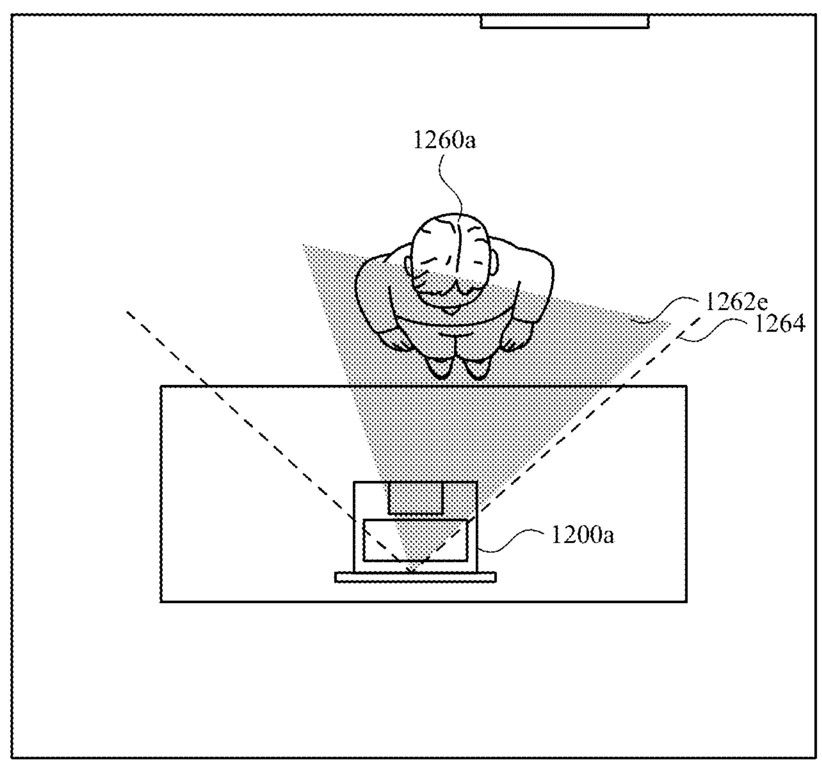
*FIG. 12H*

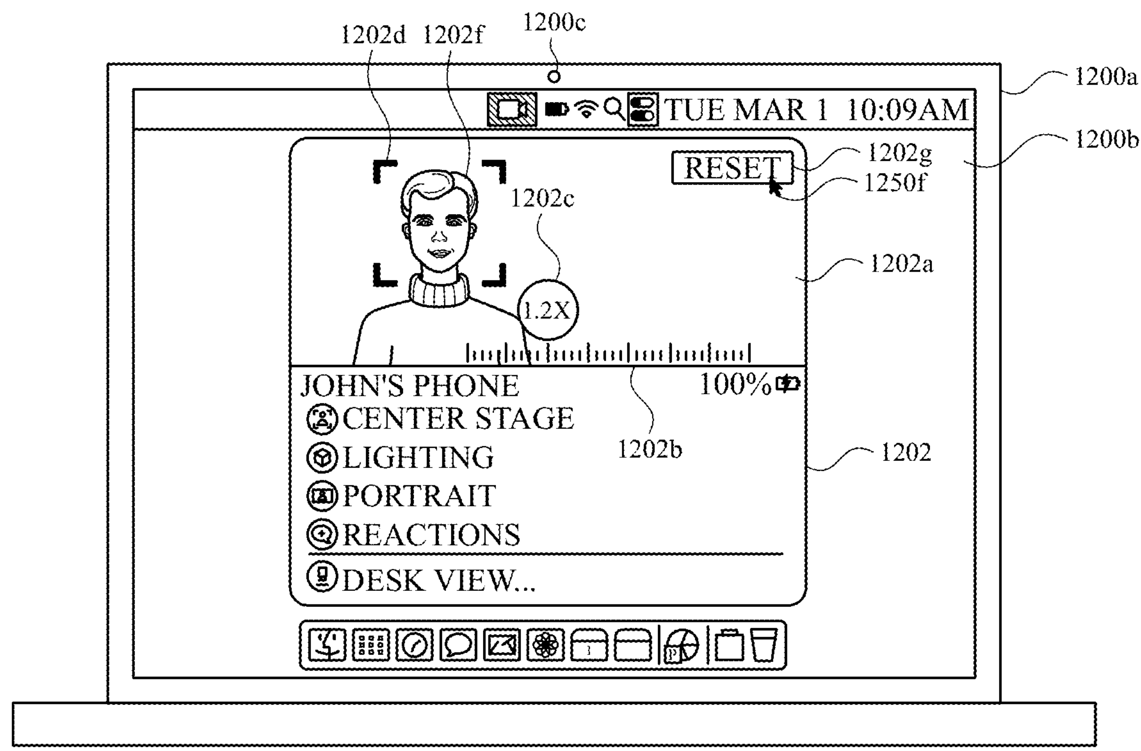
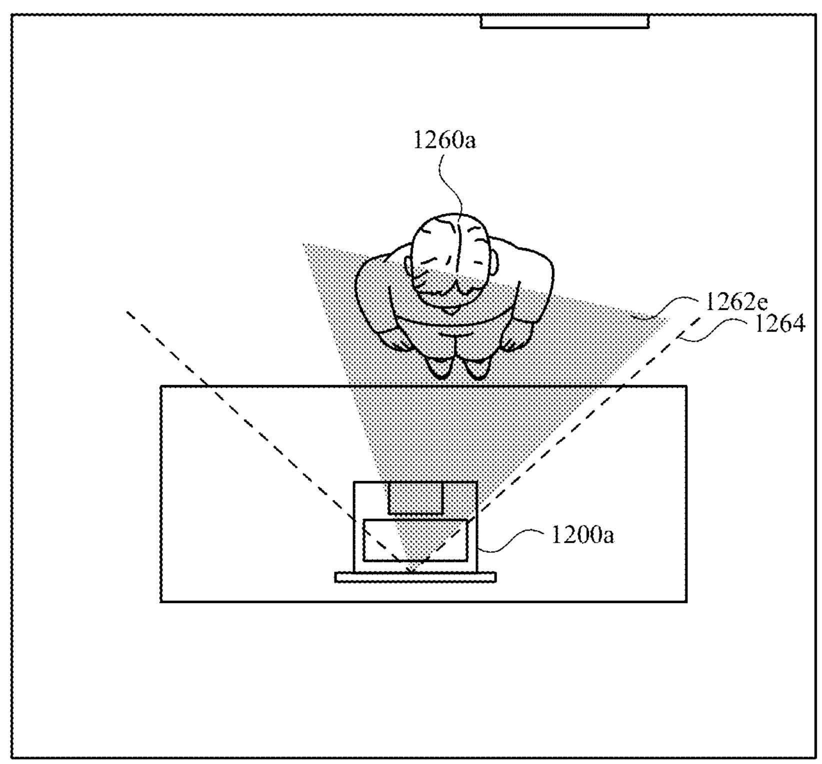
*FIG. 12I*

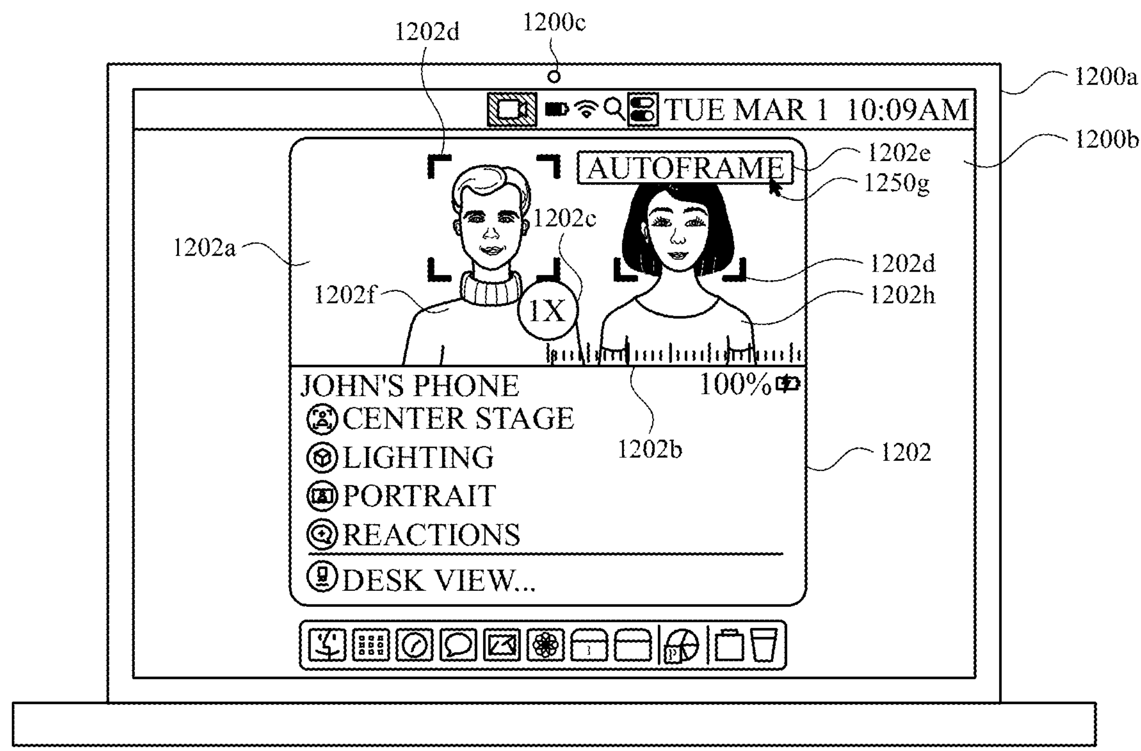
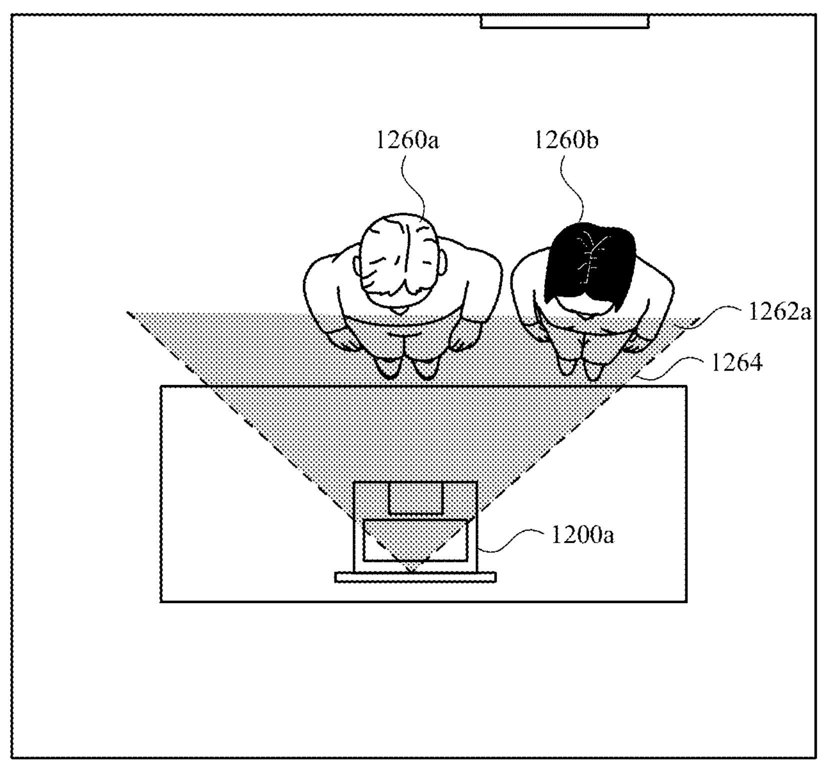
*FIG. 12J*

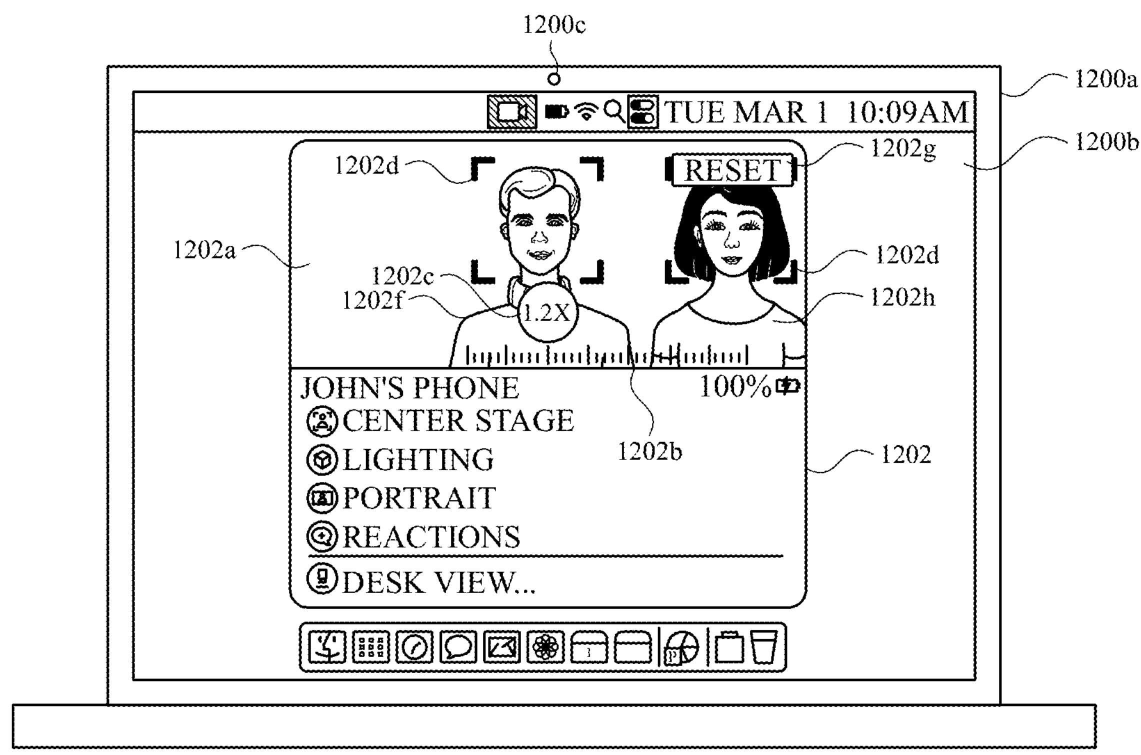
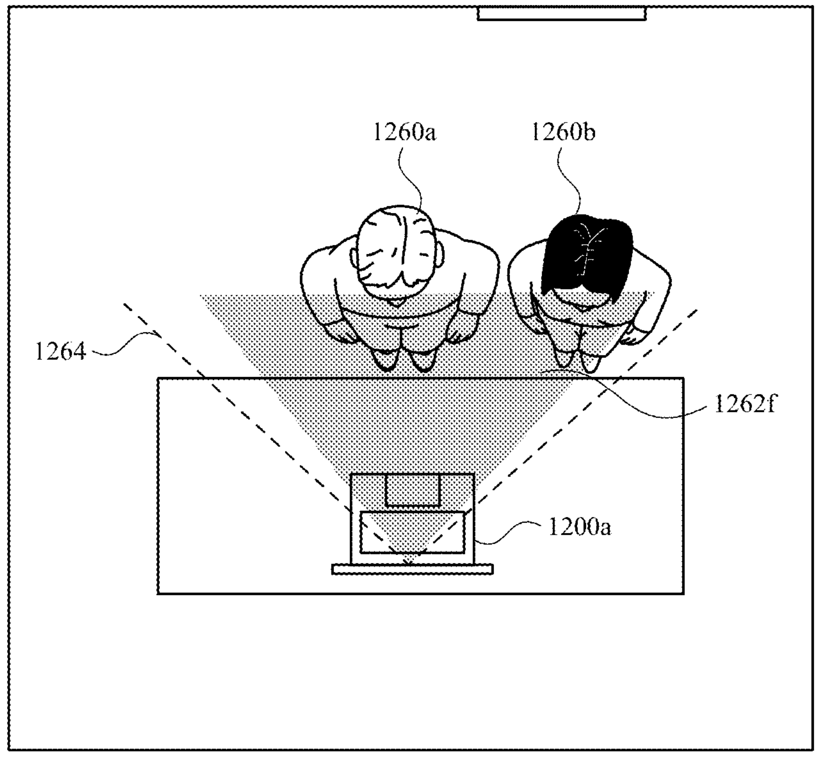
*FIG. 12K*

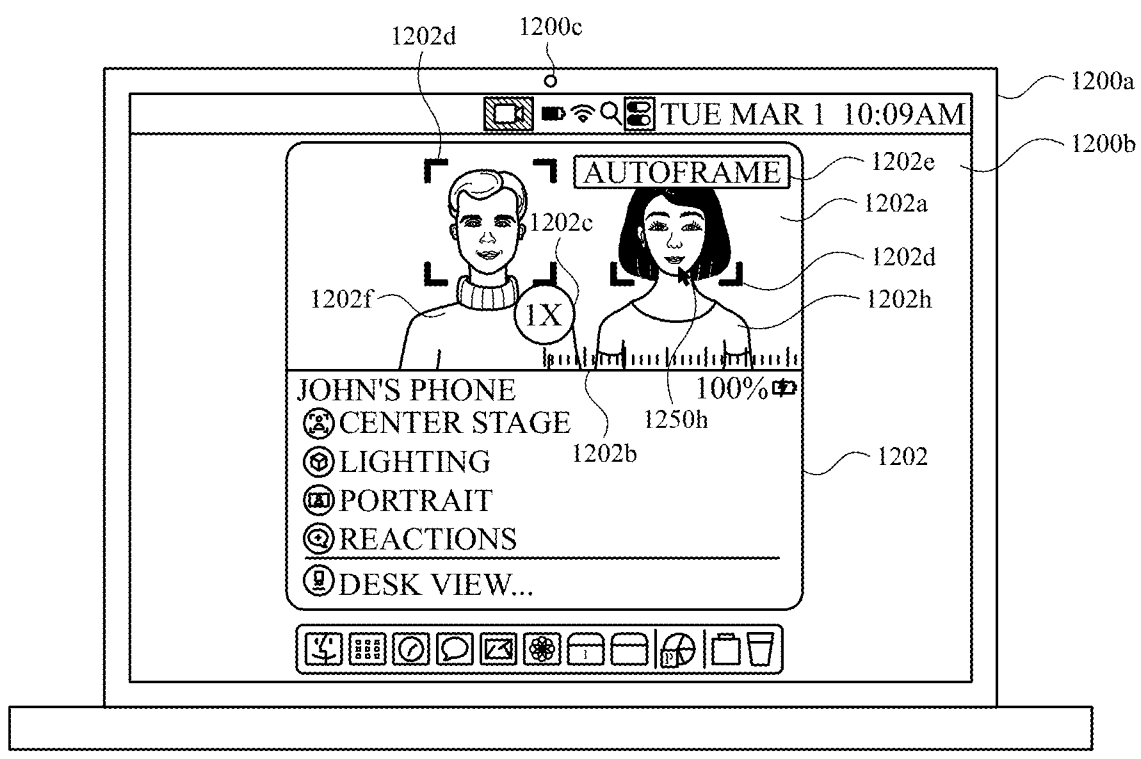
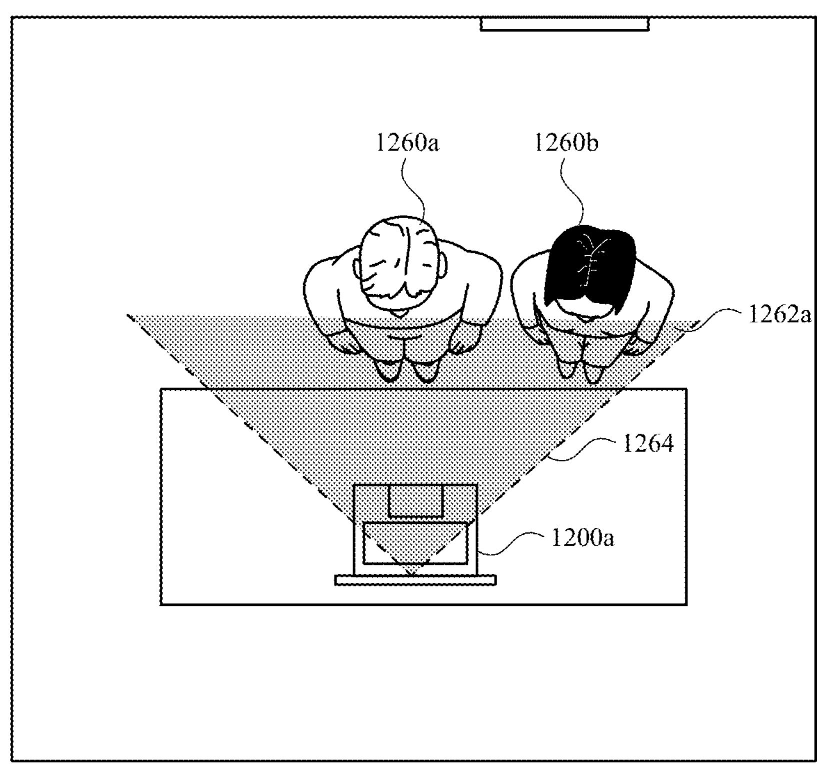
*FIG. 12L*

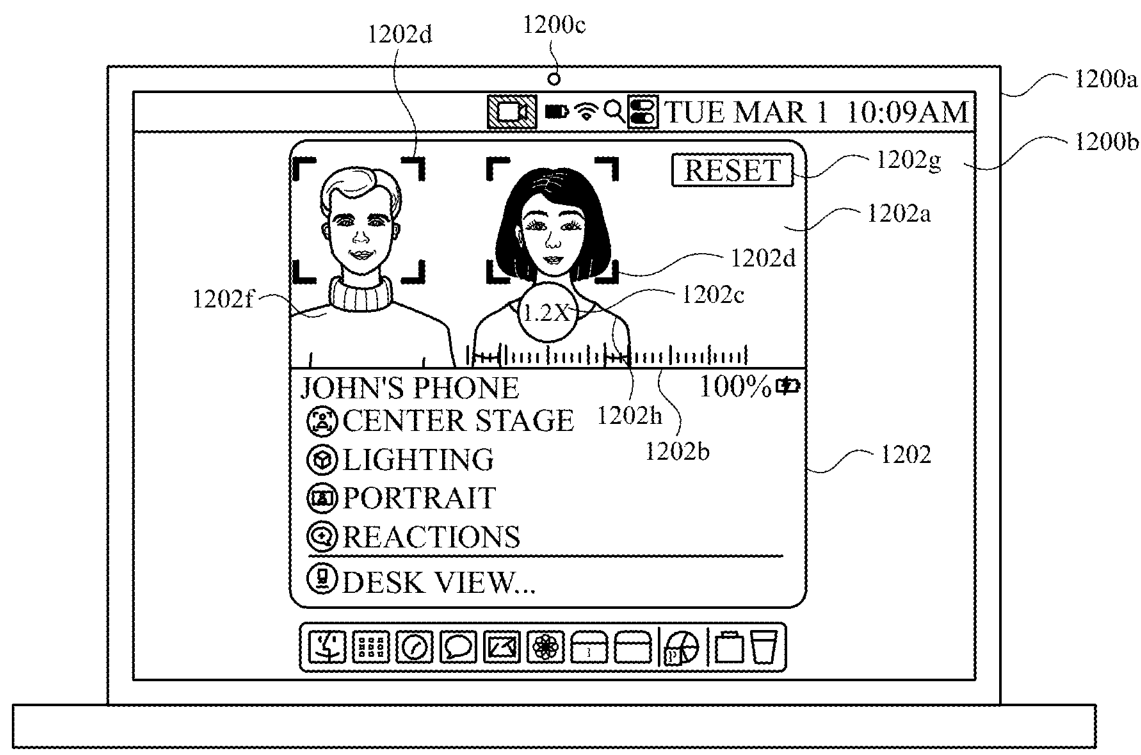
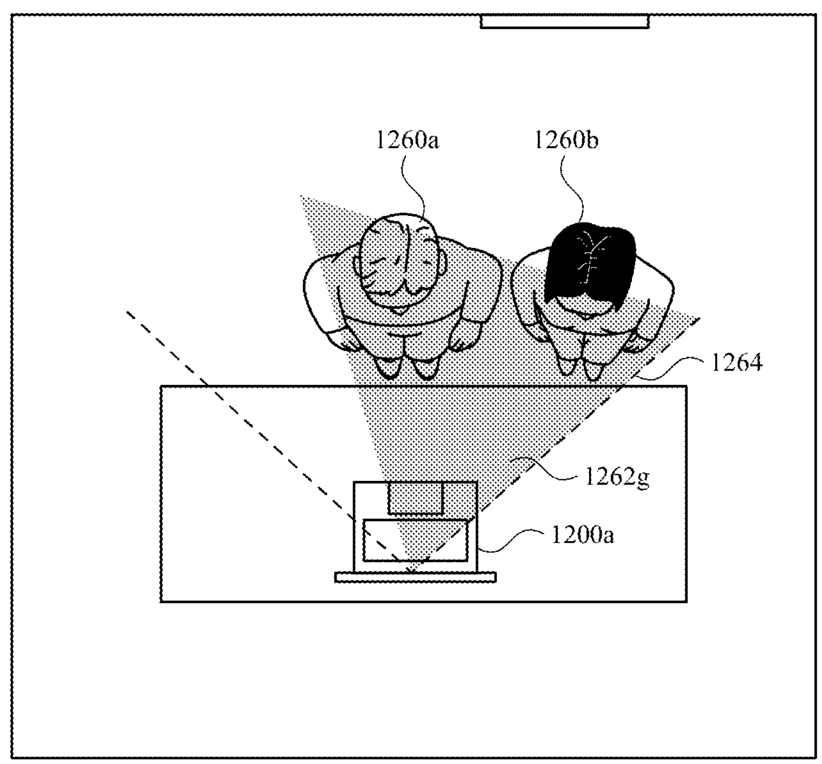
*FIG. 12M*

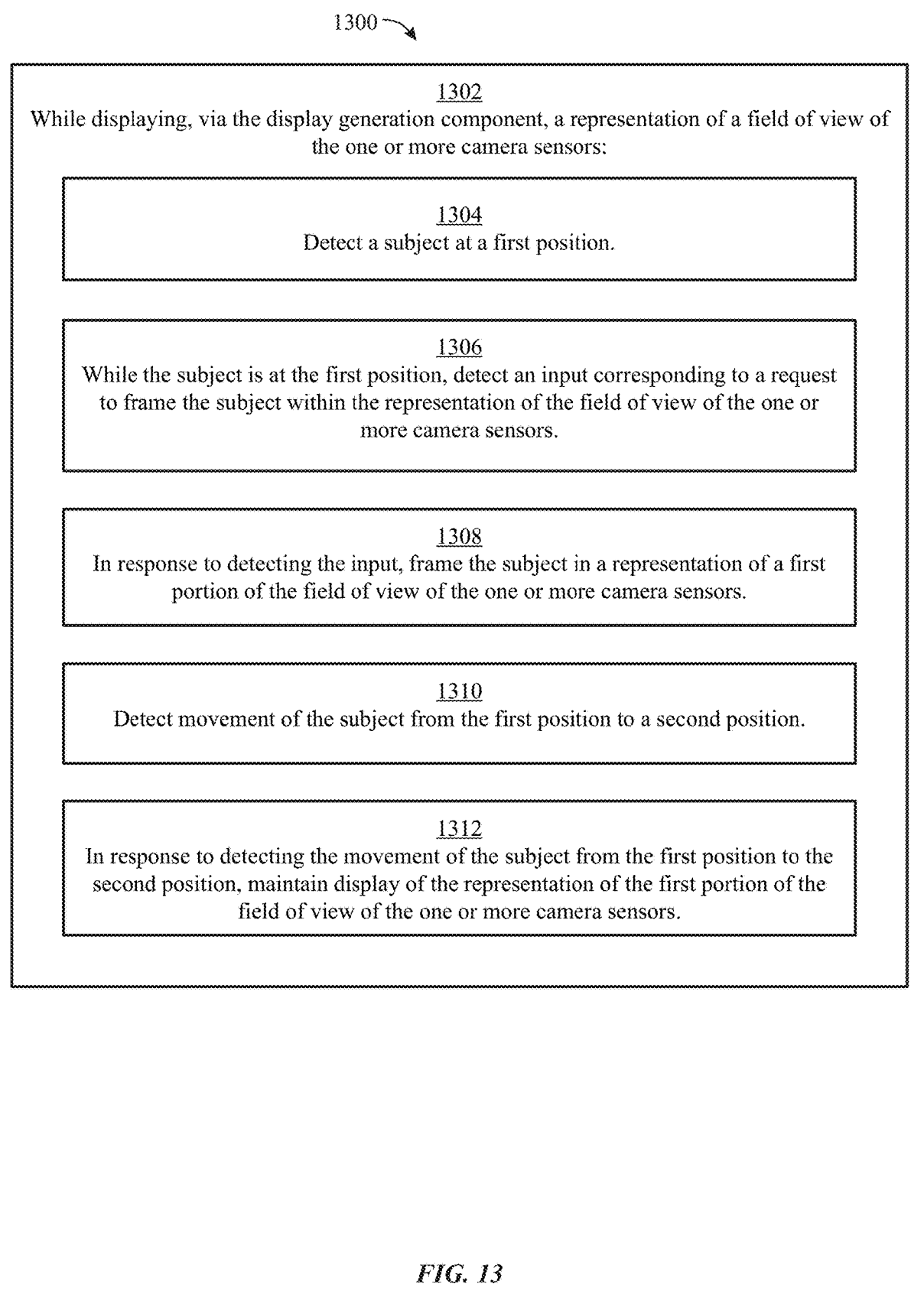

1300

1302
While displaying, via the display generation component, a representation of a field of view of the one or more camera sensors:

1304
Detect a subject at a first position.

1306
While the subject is at the first position, detect an input corresponding to a request to frame the subject within the representation of the field of view of the one or more camera sensors.

1308
In response to detecting the input, frame the subject in a representation of a first portion of the field of view of the one or more camera sensors.

1310
Detect movement of the subject from the first position to a second position.

1312
In response to detecting the movement of the subject from the first position to the second position, maintain display of the representation of the first portion of the field of view of the one or more camera sensors.

*FIG. 13*

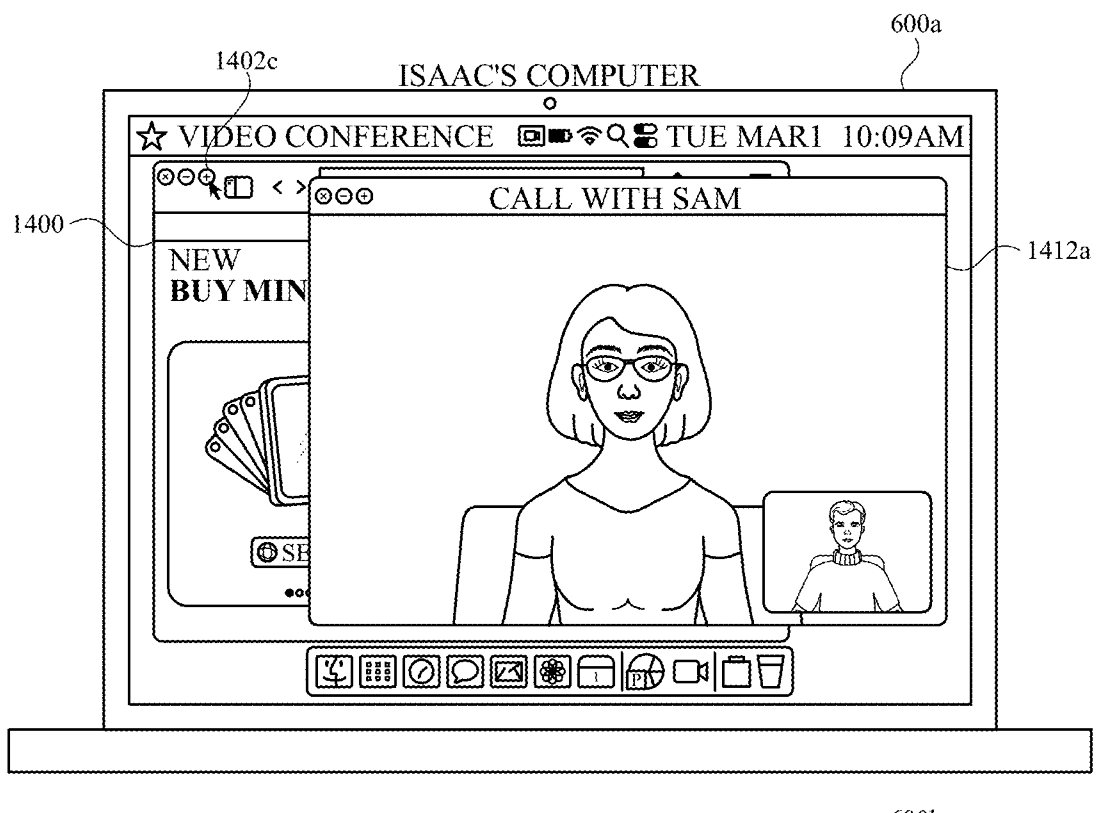
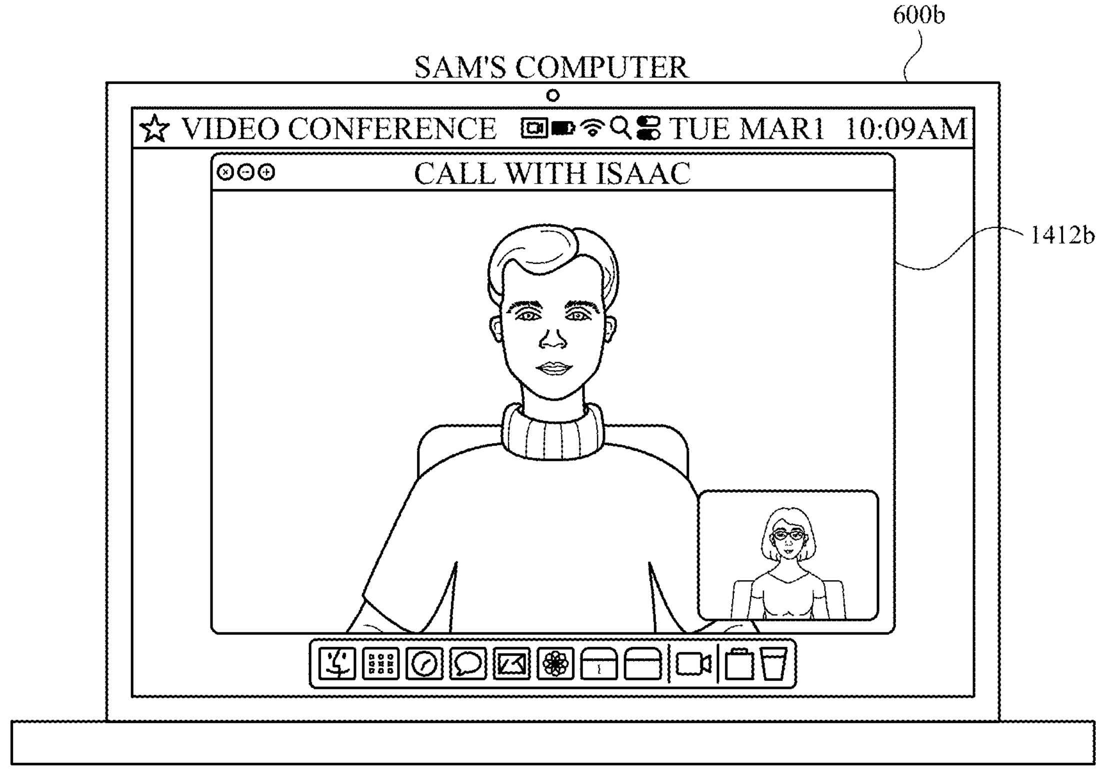
*FIG. 14E*

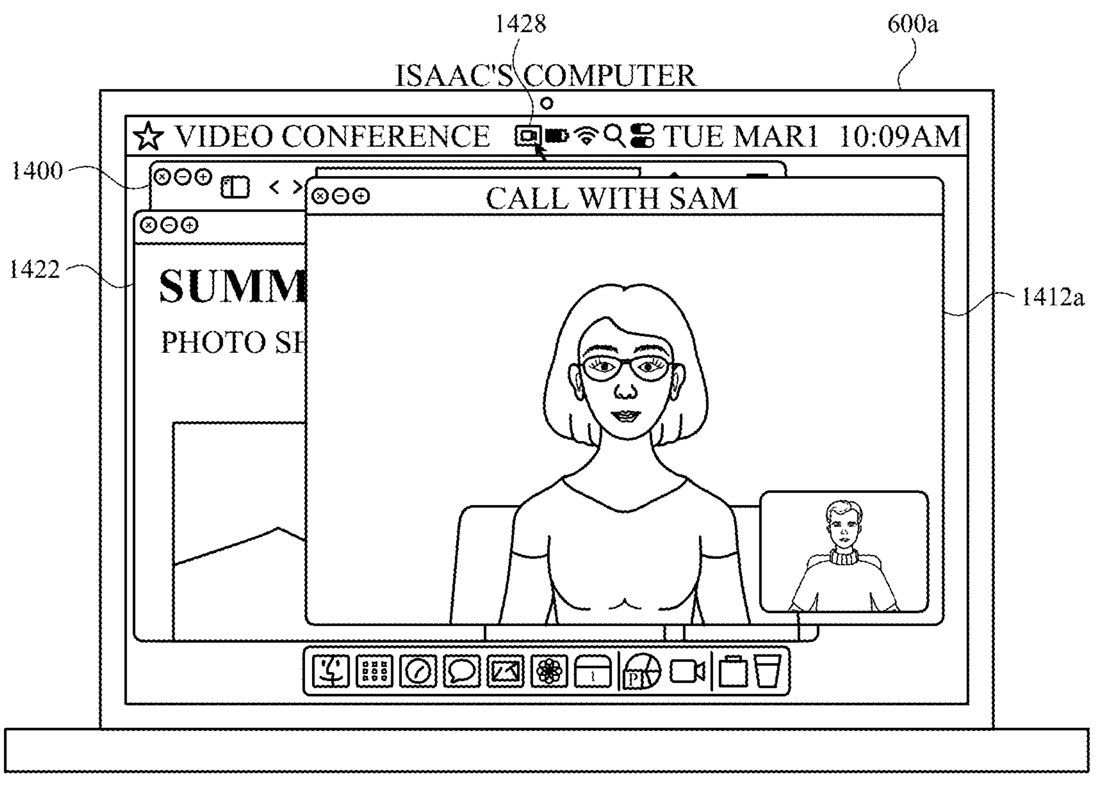
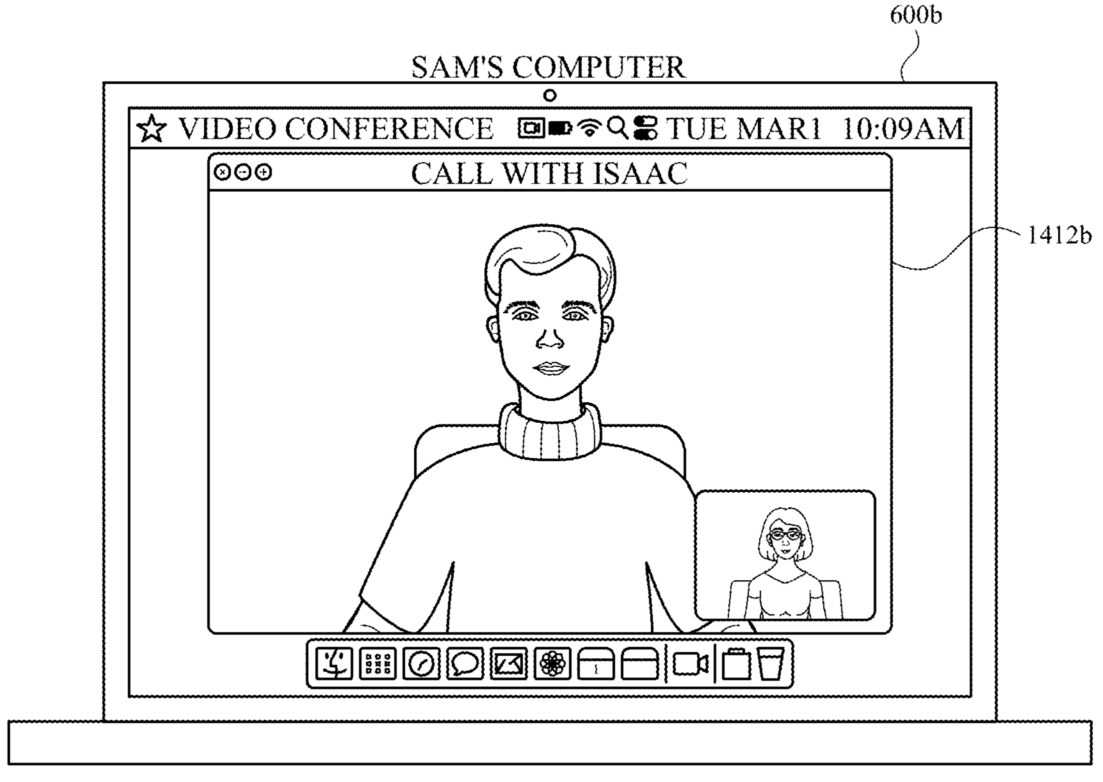
*FIG. 14L*

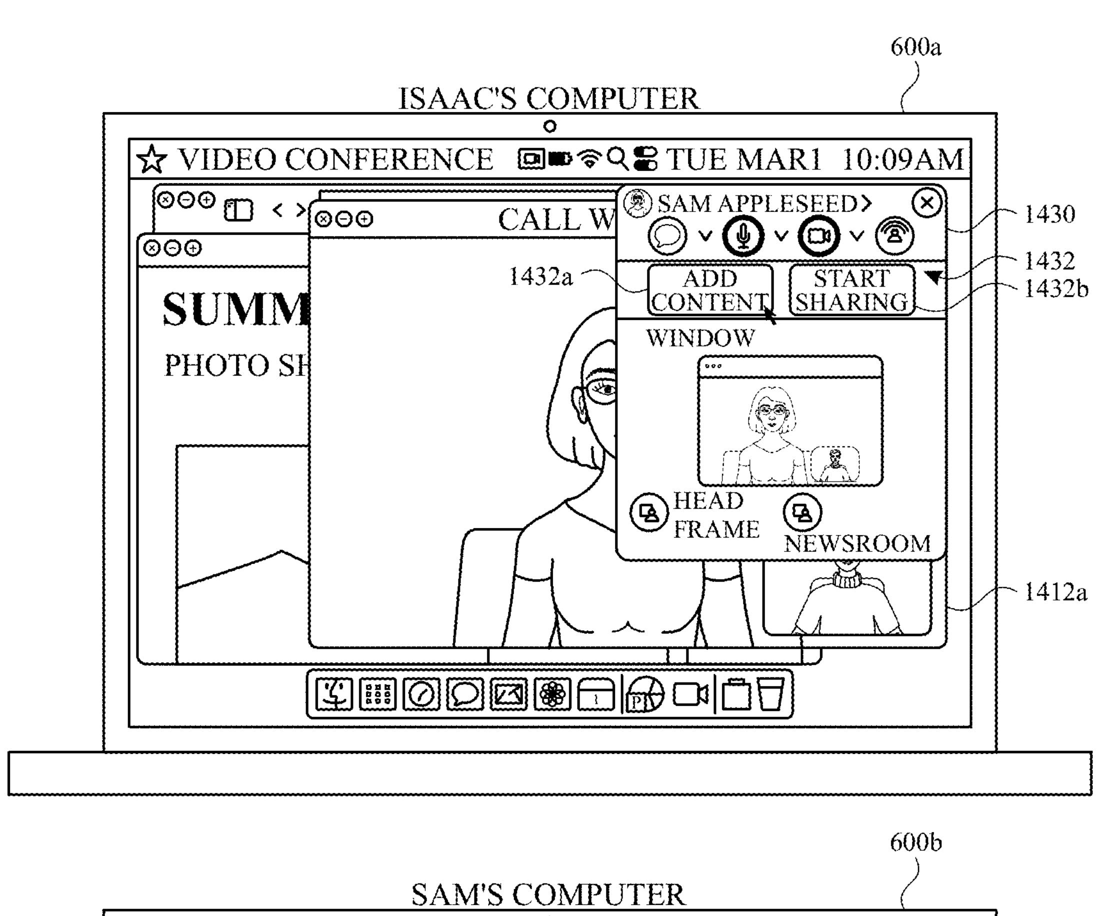
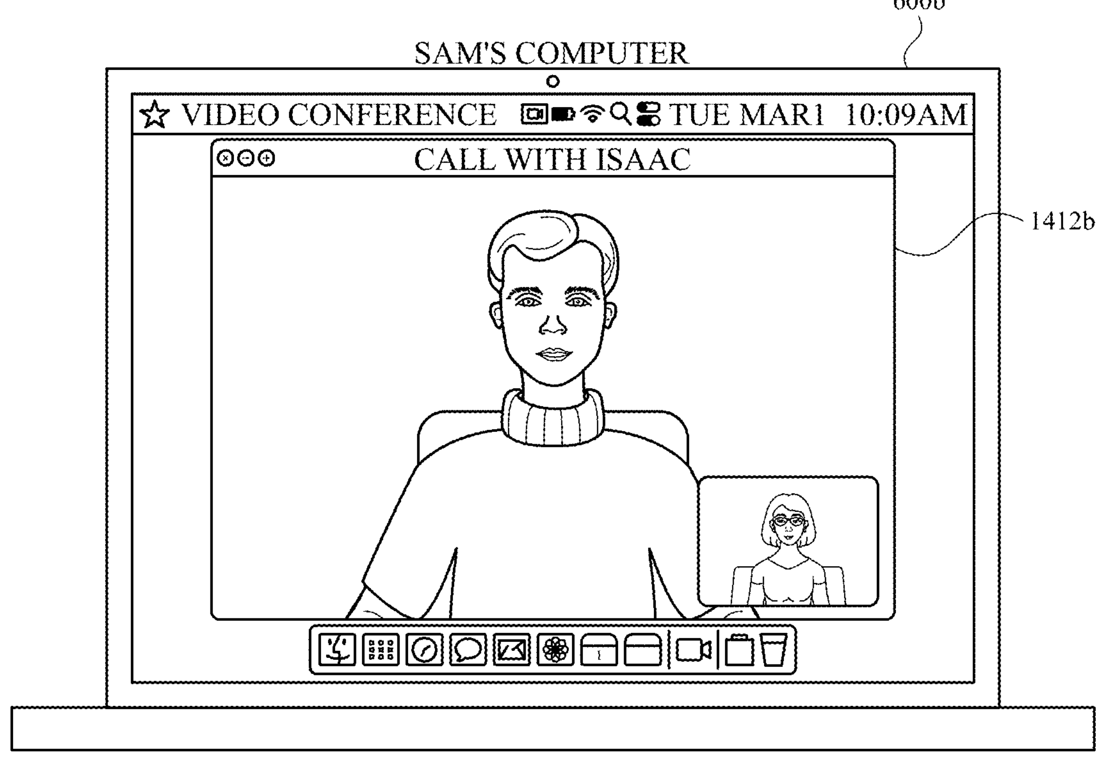
*FIG. 14M*

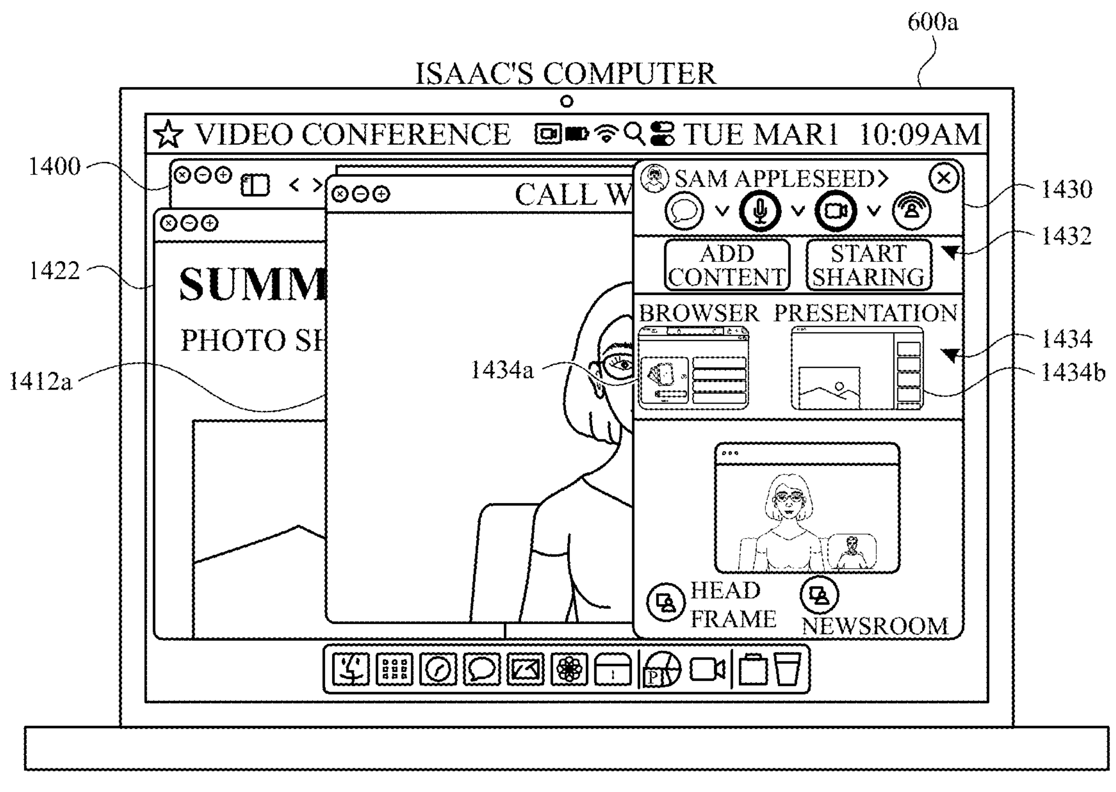
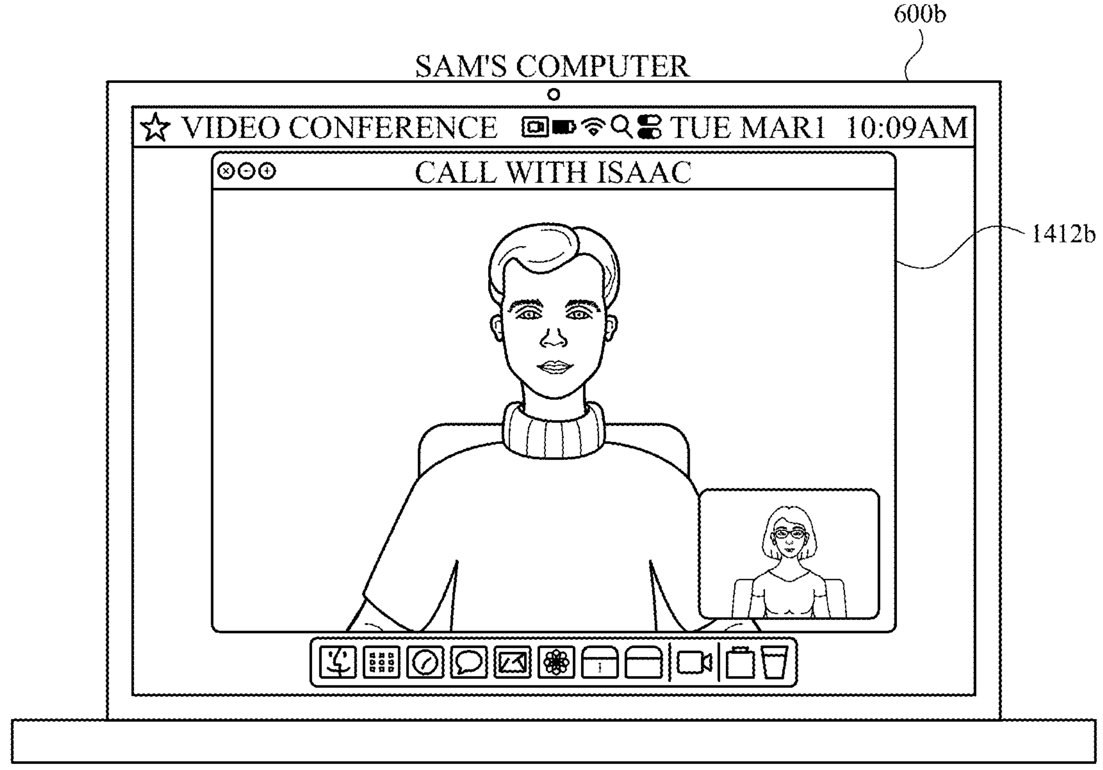
*FIG. 14N*

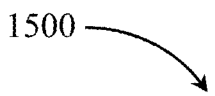

1502
Detect, via one or more input devices, a request to display a user interface menu associated with first content.

1504
In response to detecting the request to display the user interface menu, display, via a display generation component, the user interface menu, including:

1506
In accordance with a determination that a set of sharing options criteria is met and that content is being shared in a real-time communication session, display a first set of one or more sharing user interface elements that, when selected, cause the first content to be included in the real-time communication session.

1508
In accordance with a determination that the set of sharing options criteria is met and that content is not being shared in a real-time communication session, display a second set of one or more sharing user interface elements that, when selected, cause the first content to be included in the real-time communication session, wherein the first set of one or more sharing user interface elements is different from the second set of one or more sharing user interface elements.

*FIG. 15*

VIDEO APPLICATION GRAPHICAL EFFECTS

CROSS-REFERENCE TO RELATED APPLICATIONS

This application claims priority to: U.S. Prov. Pat. App. No. 63/448,237, entitled "VIDEO APPLICATION GRAPHICAL EFFECTS," filed Feb. 24, 2023, and U.S. Prov. Pat. App. No. 63/465,093, entitled "VIDEO APPLICATION GRAPHICAL EFFECTS," filed May 9, 2023, and U.S. Prov. Pat. App. No. 63/470,885, entitled "VIDEO APPLICATION GRAPHICAL EFFECTS," filed Jun. 3, 2023, the content of each of these applications is hereby incorporated by reference in its entirety.

FIELD

The present disclosure relates generally to computer user interfaces, and more specifically to displaying graphical effects in a video application.

BACKGROUND

Users often apply graphical effects to a representation of a camera field of view in a video application. Such techniques typically request the user to provide various inputs to apply the graphical effect.

BRIEF SUMMARY

Some techniques for displaying graphical effects using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for displaying graphical effects. Such methods and interfaces optionally complement or replace other methods for displaying graphical effects. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component is described. The method comprises: displaying, via the display generation component, a representation of a field of view of one or more camera sensors, wherein a person is visible in the representation of the field of view of the one or more camera sensors; while the representation of the field of view of the one or more camera sensors is displayed, a first gesture performed by a first portion of a person is detected within the field of view of the one or more camera sensors; and in response to detection of the first gesture performed by the first portion of the person, displaying, via the display generation component, a first graphical effect, including: in accordance with a determination that the first gesture is detected at a first gesture location in the field of view of the one or more camera sensors, displaying the first graphical effect at a first effect location in the representation of the field of view of the one or more camera sensors; and in accordance with a determination that the first gesture is at a second gesture location in the field of view of the one or more camera sensors that is different from the first gesture location, displaying the first graphical effect at a second effect location in the representation of the field of view of the one or more camera sensors that is different from the first effect location.

In accordance with some embodiments, a non-transitory computer-readable storage medium is described. The non-transitory computer-readable storage medium stores one or more programs configured to be executed by one or more processors of a computer system in communication with a display generation component, the one or more programs including instructions for: displaying, via the display generation component, a representation of a field of view of one or more camera sensors, wherein a person is visible in the representation of the field of view of the one or more camera sensors; while the representation of the field of view of the one or more camera sensors is displayed, a first gesture performed by a first portion of a person is detected within the field of view of the one or more camera sensors; and in response to detection of the first gesture performed by the first portion of the person, displaying, via the display generation component, a first graphical effect, including: in accordance with a determination that the first gesture is detected at a first gesture location in the field of view of the one or more camera sensors, displaying the first graphical effect at a first effect location in the representation of the field of view of the one or more camera sensors; and in accordance with a determination that the first gesture is at a second gesture location in the field of view of the one or more camera sensors that is different from the first gesture location, displaying the first graphical effect at a second effect location in the representation of the field of view of the one or more camera sensors that is different from the first effect location.

In accordance with some embodiments, a transitory computer-readable storage medium is described. The transitory computer-readable storage medium stores one or more programs configured to be executed by one or more processors of a computer system in communication with a display generation component, the one or more programs including instructions for: displaying, via the display generation component, a representation of a field of view of one or more camera sensors, wherein a person is visible in the representation of the field of view of the one or more camera sensors; while the representation of the field of view of the one or more camera sensors is displayed, a first gesture performed by a first portion of a person is detected within the field of view of the one or more camera sensors; and in response to detection of the first gesture performed by the first portion of the person, displaying, via the display generation component, a first graphical effect, including: in accordance with a determination that the first gesture is detected at a first gesture location in the field of view of the one or more camera sensors, displaying the first graphical effect at a first effect location in the representation of the field of view of the one or more camera sensors; and in accordance with a determination that the first gesture is at a second gesture location in the field of view of the one or more camera sensors that is different from the first gesture location, displaying the first graphical effect at a second effect location in the representation of the field of view of the one or more camera sensors that is different from the first effect location.

In accordance with some embodiments, a computer system that is in communication with a display generation component is described. The computer system comprises: one or more processors; and memory storing one or more programs configured to be executed by the one or more processors, the one or more programs including instructions for: displaying, via the display generation component, a representation of a field of view of one or more camera sensors, wherein a person is visible in the representation of the field of view of the one or more camera sensors; while the representation of the field of view of the one or more camera sensors is displayed, a first gesture performed by a first portion of a person is detected within the field of view of the one or more camera sensors; and in response to detection of the first gesture performed by the first portion of the person, displaying, via the display generation component, a first graphical effect, including: in accordance with a determination that the first gesture is detected at a first gesture location in the field of view of the one or more camera sensors, displaying the first graphical effect at a first effect location in the representation of the field of view of the one or more camera sensors; and in accordance with a determination that the first gesture is at a second gesture location in the field of view of the one or more camera sensors that is different from the first gesture location, displaying the first graphical effect at a second effect location in the representation of the field of view of the one or more camera sensors that is different from the first effect location.

In accordance with some embodiments, a computer system that is in communication with a display generation component is described. The computer system comprises: one or more processors; and memory storing one or more programs configured to be executed by the one or more processors, the one or more programs including instructions for: means for displaying, via the display generation component, a representation of a field of view of one or more camera sensors, wherein a person is visible in the representation of the field of view of the one or more camera sensors; means for while the representation of the field of view of the one or more camera sensors is displayed, a first gesture performed by a first portion of a person is detected within the field of view of the one or more camera sensors; and means for in response to detection of the first gesture performed by the first portion of the person, displaying, via the display generation component, a first graphical effect, including: means for in accordance with a determination that the first gesture is detected at a first gesture location in the field of view of the one or more camera sensors, displaying the first graphical effect at a first effect location in the representation of the field of view of the one or more camera sensors; and means for in accordance with a determination that the first gesture is at a second gesture location in the field of view of the one or more camera sensors that is different from the first gesture location, displaying the first graphical effect at a second effect location in the representation of the field of view of the one or more camera sensors that is different from the first effect location.

In accordance with some embodiments, a computer program product is described. The computer program product comprises one or more programs configured to be executed by one or more processors of a computer system that is in communication with a display generation component, the one or more programs including instructions for: displaying, via the display generation component, a representation of a field of view of one or more camera sensors, wherein a person is visible in the representation of the field of view of the one or more camera sensors; while the representation of the field of view of the one or more camera sensors is displayed, a first gesture performed by a first portion of a person is detected within the field of view of the one or more camera sensors; and in response to detection of the first gesture performed by the first portion of the person, displaying, via the display generation component, a first graphical effect, including: in accordance with a determination that the first gesture is detected at a first gesture location in the field of view of the one or more camera sensors, displaying the first graphical effect at a first effect location in the representation of the field of view of the one or more camera sensors; and in accordance with a determination that the first gesture is at a second gesture location in the field of view of the one or more camera sensors that is different from the first gesture location, displaying the first graphical effect at a second effect location in the representation of the field of view of the one or more camera sensors that is different from the first effect location.

In accordance with some embodiments, a method performed at a computer system that is in communication with a display generation component is described. The method comprises: displaying, via the display generation component, a representation of a field of view of one or more camera sensors, wherein a person is visible in the representation of the field of view of the one or more camera sensors; while the representation of the field of view of the one or more camera sensors is displayed, a first gesture performed by a first portion of a person is detected within the field of view of the one or more camera sensors; and in response to detection of the first gesture performed by the first portion of the person: in accordance with a determination that a first set of criteria is met, displaying, via the display generation component, a graphical effect that corresponds to the first gesture in the representation of the field of view of the one or more camera sensors; and in accordance with a determination that the first set of criteria is not met, forgoing displaying the graphical effect that corresponds to the first gesture in the representation of the field of view of the one or more camera sensors.

In accordance with some embodiments, a non-transitory computer-readable storage medium is described. The non-transitory computer readable storage medium stores one or more programs configured to be executed by one or more processors of a computer system in communication with a display generation component, the one or more programs including instructions for: displaying, via the display generation component, a representation of a field of view of one or more camera sensors, wherein a person is visible in the representation of the field of view of the one or more camera sensors; while the representation of the field of view of the one or more camera sensors is displayed, a first gesture performed by a first portion of a person is detected within the field of view of the one or more camera sensors; and in response to detection of the first gesture performed by the first portion of the person: in accordance with a determination that a first set of criteria is met, displaying, via the display generation component, a graphical effect that corresponds to the first gesture in the representation of the field of view of the one or more camera sensors; and in accordance with a determination that the first set of criteria is not met, forgoing displaying the graphical effect that corresponds to the first gesture in the representation of the field of view of the one or more camera sensors.

In accordance with some embodiments, a transitory computer-readable storage medium is described. The transitory computer readable storage medium stores one or more programs configured to be executed by one or more processors of a computer system in communication with a display generation component, the one or more programs including instructions for: displaying, via the display generation component, a representation of a field of view of one or more camera sensors, wherein a person is visible in the representation of the field of view of the one or more camera sensors; while the representation of the field of view of the one or more camera sensors is displayed, a first gesture performed by a first portion of a person is detected within the field of view of the one or more camera sensors; and in response to detection of the first gesture performed by the first portion of the person: in accordance with a determination that a first set of criteria is met, displaying, via the display generation component, a graphical effect that corresponds to the first gesture in the representation of the field of view of the one or more camera sensors; and in accordance with a determination that the first set of criteria is not met, forgoing displaying the graphical effect that corresponds to the first gesture in the representation of the field of view of the one or more camera sensors.

In accordance with some embodiments, a computer system that is in communication with a display generation component is described. The computer system comprises one or more processors; and memory storing one or more programs configured to be executed by the one or more processors, the one or more programs including instructions for: displaying, via the display generation component, a representation of a field of view of one or more camera sensors, wherein a person is visible in the representation of the field of view of the one or more camera sensors; while the representation of the field of view of the one or more camera sensors is displayed, a first gesture performed by a first portion of a person is detected within the field of view of the one or more camera sensors; and in response to detection of the first gesture performed by the first portion of the person: in accordance with a determination that a first set of criteria is met, displaying, via the display generation component, a graphical effect that corresponds to the first gesture in the representation of the field of view of the one or more camera sensors; and in accordance with a determination that the first set of criteria is not met, forgoing displaying the graphical effect that corresponds to the first gesture in the representation of the field of view of the one or more camera sensors.

In accordance with some embodiments, a computer system that is in communication with a display generation component and one or more input devices is described. The computer system comprises one or more processors; and memory storing one or more programs configured to be executed by the one or more processors, the one or more programs including instructions for: means for displaying, via the display generation component, a representation of a field of view of one or more camera sensors, wherein a person is visible in the representation of the field of view of the one or more camera sensors; means for while the representation of the field of view of the one or more camera sensors is displayed, a first gesture performed by a first portion of a person is detected within the field of view of the one or more camera sensors; and means for in response to detection of the first gesture performed by the first portion of the person: means for in accordance with a determination that a first set of criteria is met, displaying, via the display generation component, a graphical effect that corresponds to the first gesture in the representation of the field of view of the one or more camera sensors; and means for in accordance with a determination that the first set of criteria is not met, forgoing displaying the graphical effect that corresponds to the first gesture in the representation of the field of view of the one or more camera sensors.

In accordance with some embodiments, a computer program product is described. The computer program product comprises one or more programs configured to be executed by one or more processors of a computer system that is in communication with a display generation component, the one or more programs including instructions for: displaying, via the display generation component, a representation of a field of view of one or more camera sensors, wherein a person is visible in the representation of the field of view of the one or more camera sensors; while the representation of the field of view of the one or more camera sensors is displayed, a first gesture performed by a first portion of a person is detected within the field of view of the one or more camera sensors; and in response to detection of the first gesture performed by the first portion of the person: in accordance with a determination that a first set of criteria is met, displaying, via the display generation component, a graphical effect that corresponds to the first gesture in the representation of the field of view of the one or more camera sensors; and in accordance with a determination that the first set of criteria is not met, forgoing displaying the graphical effect that corresponds to the first gesture in the representation of the field of view of the one or more camera sensors.

In accordance with some embodiments, a method is described. The method is performed at a first computer system that is in communication with a display generation component, one or more input devices, and one or more camera sensors, wherein the first computer system is associated with a first user is described. The method comprises: displaying, via the display generation component, a user interface of a real-time communication session between the first computer system and one or more second computer systems; while displaying the user interface of the real-time communication session, an input requesting to share content associated with a first participant in the real-time communication session is received; and in response to receipt of the request to display the content associated with the first participant in the real-time communication session, displaying, via the display generation component, a user interface element in the user interface of the real-time communication session, wherein the user interface element is a composite of the content associated with the first participant in the real-time communication session and a representation of the first participant in the user interface of the real-time communication session.

In accordance with some embodiments, a non-transitory computer-readable storage medium is described. The non-transitory computer readable storage medium stores one or more programs configured to be executed by one or more processors of a first computer system in communication with a display generation component, one or more input devices, and one or more camera sensors, wherein the first computer system is associated with a first user, the one or more programs including instructions for: displaying, via the display generation component, a user interface of a real-time communication session between the first computer system and one or more second computer systems; while displaying the user interface of the real-time communication session, an input requesting to share content associated with a first participant in the real-time communication session is received; and in response to receipt of the request to display the content associated with the first participant in the real-time communication session, displaying, via the display generation component, a user interface element in the user interface of the real-time communication session, wherein the user interface element is a composite of the content associated with the first participant in the real-time communication session and a representation of the first participant in the user interface of the real-time communication session.

In accordance with some embodiments, a transitory computer-readable storage medium is described. The transitory computer readable storage medium stores one or more programs configured to be executed by one or more processors of a first computer system in communication with a display generation component, one or more input devices, and one or more camera sensors, wherein the first computer system is associated with a first user, the one or more programs including instructions for: displaying, via the display generation component, a user interface of a real-time communication session between the first computer system and one or more second computer systems; while displaying the user interface of the real-time communication session, an input requesting to share content associated with a first participant in the real-time communication session is received; and in response to receipt of the request to display the content associated with the first participant in the real-time communication session, displaying, via the display generation component, a user interface element in the user interface of the real-time communication session, wherein the user interface element is a composite of the content associated with the first participant in the real-time communication session and a representation of the first participant in the user interface of the real-time communication session.

In accordance with some embodiments, a first computer system is described. The first computer system is in communication with a display generation component, one or more input devices, and one or more camera sensors, wherein the first computer system is associated with a first user. The first computer system comprises: one or more processors; and memory storing one or more programs configured to be executed by the one or more processors, the one or more programs including instructions for: displaying, via the display generation component, a user interface of a real-time communication session between the first computer system and one or more second computer systems; while displaying the user interface of the real-time communication session, an input requesting to share content associated with a first participant in the real-time communication session is received; and in response to receipt of the request to display the content associated with the first participant in the real-time communication session, displaying, via the display generation component, a user interface element in the user interface of the real-time communication session, wherein the user interface element is a composite of the content associated with the first participant in the real-time communication session and a representation of the first participant in the user interface of the real-time communication session.

In accordance with some embodiments, a first computer system is described. The first computer system is in communication with a display generation component, one or more input devices, and one or more camera sensors, wherein the first computer system is associated with a first user. The first computer system comprises: one or more processors; and memory storing one or more programs configured to be executed by the one or more processors, the one or more programs including instructions for: means for displaying, via the display generation component, a user interface of a real-time communication session between the first computer system and one or more second computer systems; means for while displaying the user interface of the real-time communication session, an input requesting to share content associated with a first participant in the real-time communication session is received; and means for in response to receipt of the request to display the content associated with the first participant in the real-time communication session, displaying, via the display generation component, a user interface element in the user interface of the real-time communication session, wherein the user interface element is a composite of the content associated with the first participant in the real-time communication session and a representation of the first participant in the user interface of the real-time communication session.

In accordance with some embodiments, a computer program product is described. The computer program product comprises one or more programs configured to be executed by one or more processors of a first computer system that is in communication with a display generation component, one or more input devices, and one or more camera sensors, wherein the first computer system is associated with a first user. The one or more programs include instructions for: displaying, via the display generation component, a user interface of a real-time communication session between the first computer system and one or more second computer systems; while displaying the user interface of the real-time communication session, an input requesting to share content associated with a first participant in the real-time communication session is received; and in response to receipt of the request to display the content associated with the first participant in the real-time communication session, displaying, via the display generation component, a user interface element in the user interface of the real-time communication session, wherein the user interface element is a composite of the content associated with the first participant in the real-time communication session and a representation of the first participant in the user interface of the real-time communication session.

In accordance with some embodiments, a method performed at a computer system that is in communication with a display generation component, one or more input devices, and one or more camera sensors is described. The method comprises: detecting, via the one or more input devices, a first set of one or more inputs including a request to display a user interface of a first application; and in response to detecting the first set of one or more inputs, displaying, via the display generation component, the user interface of the first application including displaying a first representation of a field of view of the one or more camera sensors and a graphical enhancement applied to the representation of the field of view of the one or more camera sensors, including: in accordance with a determination that a parameter associated with the graphical enhancement is set to a first value, displaying the graphical enhancement with a first characteristic; and in accordance with a determination that the parameter associated with the graphical enhancement is set to a second value that is different from the first value, displaying the first graphical enhancement with a second characteristic that is different from the first characteristic; and detecting, via the one or more input devices, a second set of one or more inputs including a request to display a user interface of a second application that is different from the first application; and in response to detecting the second set of one or more inputs, displaying, via the display generation component, the user interface of the second application including displaying a second representation of the field of view of the one or more camera sensors with the graphical enhancement, including: in accordance with a determination that the parameter associated with the graphical enhancement is set to the first value, displaying the graphical enhancement with the first characteristic; and in accordance with a determination that the parameter associated with the graphical enhancement is set to the second value, displaying the graphical enhancement with the second characteristic.

In accordance with some embodiments, a non-transitory computer-readable storage medium is described. The non-transitory computer readable storage medium stores one or more programs configured to be executed by one or more processors of a computer system in communication with a display generation component, one or more input devices, and one or more camera sensors, the one or more programs including instructions for: detecting, via the one or more input devices, a first set of one or more inputs including a request to display a user interface of a first application; and in response to detecting the first set of one or more inputs, displaying, via the display generation component, the user interface of the first application including displaying a first representation of a field of view of the one or more camera sensors and a graphical enhancement applied to the representation of the field of view of the one or more camera sensors, including: in accordance with a determination that a parameter associated with the graphical enhancement is set to a first value, displaying the graphical enhancement with a first characteristic; and in accordance with a determination that the parameter associated with the graphical enhancement is set to a second value that is different from the first value, displaying the first graphical enhancement with a second characteristic that is different from the first characteristic; and detecting, via the one or more input devices, a second set of one or more inputs including a request to display a user interface of a second application that is different from the first application; and in response to detecting the second set of one or more inputs, displaying, via the display generation component, the user interface of the second application including displaying a second representation of the field of view of the one or more camera sensors with the graphical enhancement, including: in accordance with a determination that the parameter associated with the graphical enhancement is set to the first value, displaying the graphical enhancement with the first characteristic; and in accordance with a determination that the parameter associated with the graphical enhancement is set to the second value, displaying the graphical enhancement with the second characteristic.

In accordance with some embodiments, a transitory computer-readable storage medium is described. The transitory computer readable storage medium stores one or more programs configured to be executed by one or more processors of a computer system in communication with a display generation component, one or more input devices, and one or more camera sensors, the one or more programs including instructions for: detecting, via the one or more input devices, a first set of one or more inputs including a request to display a user interface of a first application; and in response to detecting the first set of one or more inputs, displaying, via the display generation component, the user interface of the first application including displaying a first representation of a field of view of the one or more camera sensors and a graphical enhancement applied to the representation of the field of view of the one or more camera sensors, including: in accordance with a determination that a parameter associated with the graphical enhancement is set to a first value, displaying the graphical enhancement with a first characteristic; and in accordance with a determination that the parameter associated with the graphical enhancement is set to a second value that is different from the first value, displaying the first graphical enhancement with a second characteristic that is different from the first characteristic; and detecting, via the one or more input devices, a second set of one or more inputs including a request to display a user interface of a second application that is different from the first application; and in response to detecting the second set of one or more inputs, displaying, via the display generation component, the user interface of the second application including displaying a second representation of the field of view of the one or more camera sensors with the graphical enhancement, including: in accordance with a determination that the parameter associated with the graphical enhancement is set to the first value, displaying the graphical enhancement with the first characteristic; and in accordance with a determination that the parameter associated with the graphical enhancement is set to the second value, displaying the graphical enhancement with the second characteristic.

In accordance with some embodiments, a computer system that is in communication with a display generation component, one or more input devices, and one or more camera sensors is described. The computer system comprises one or more processors; and memory storing one or more programs configured to be executed by the one or more processors, the one or more programs including instructions for: detecting, via the one or more input devices, a first set of one or more inputs including a request to display a user interface of a first application; and in response to detecting the first set of one or more inputs, displaying, via the display generation component, the user interface of the first application including displaying a first representation of a field of view of the one or more camera sensors and a graphical enhancement applied to the representation of the field of view of the one or more camera sensors, including: in accordance with a determination that a parameter associated with the graphical enhancement is set to a first value, displaying the graphical enhancement with a first characteristic; and in accordance with a determination that the parameter associated with the graphical enhancement is set to a second value that is different from the first value, displaying the first graphical enhancement with a second characteristic that is different from the first characteristic; and detecting, via the one or more input devices, a second set of one or more inputs including a request to display a user interface of a second application that is different from the first application; and in response to detecting the second set of one or more inputs, displaying, via the display generation component, the user interface of the second application including displaying a second representation of the field of view of the one or more camera sensors with the graphical enhancement, including: in accordance with a determination that the parameter associated with the graphical enhancement is set to the first value, displaying the graphical enhancement with the first characteristic; and in accordance with a determination that the parameter associated with the graphical enhancement is set to the second value, displaying the graphical enhancement with the second characteristic.

In accordance with some embodiments, a computer system that is in communication with a display generation component, one or more input devices, and one or more camera sensors is described. The computer system comprises one or more processors; and memory storing one or more programs configured to be executed by the one or more processors, the one or more programs including instructions for: means for detecting, via the one or more input devices, a first set of one or more inputs including a request to display a user interface of a first application; and means for in response to detecting the first set of one or more inputs, displaying, via the display generation component, the user interface of the first application including displaying a first representation of a field of view of the one or more camera sensors and a graphical enhancement applied to the representation of the field of view of the one or more camera sensors, including: means for in accordance with a determination that a parameter associated with the graphical enhancement is set to a first value, displaying the graphical enhancement with a first characteristic; and means for in accordance with a determination that the parameter associated with the graphical enhancement is set to a second value that is different from the first value, displaying the first graphical enhancement with a second characteristic that is different from the first characteristic; and means for detecting, via the one or more input devices, a second set of one or more inputs including a request to display a user interface of a second application that is different from the first application; and means for in response to detecting the second set of one or more inputs, displaying, via the display generation component, the user interface of the second application including displaying a second representation of the field of view of the one or more camera sensors with the graphical enhancement, including: means for in accordance with a determination that the parameter associated with the graphical enhancement is set to the first value, displaying the graphical enhancement with the first characteristic; and means for in accordance with a determination that the parameter associated with the graphical enhancement is set to the second value, displaying the graphical enhancement with the second characteristic.

In accordance with some embodiments, a computer program product is described. The computer program product comprises one or more programs configured to be executed by one or more processors of a computer system that is in communication with a display generation component, one or more input devices, and one or more camera sensors. The one or more programs include instructions for: detecting, via the one or more input devices, a first set of one or more inputs including a request to display a user interface of a first application; and in response to detecting the first set of one or more inputs, displaying, via the display generation component, the user interface of the first application including displaying a first representation of a field of view of the one or more camera sensors and a graphical enhancement applied to the representation of the field of view of the one or more camera sensors, including: in accordance with a determination that a parameter associated with the graphical enhancement is set to a first value, displaying the graphical enhancement with a first characteristic; and in accordance with a determination that the parameter associated with the graphical enhancement is set to a second value that is different from the first value, displaying the first graphical enhancement with a second characteristic that is different from the first characteristic; and detecting, via the one or more input devices, a second set of one or more inputs including a request to display a user interface of a second application that is different from the first application; and in response to detecting the second set of one or more inputs, displaying, via the display generation component, the user interface of the second application including displaying a second representation of the field of view of the one or more camera sensors with the graphical enhancement, including: in accordance with a determination that the parameter associated with the graphical enhancement is set to the first value, displaying the graphical enhancement with the first characteristic; and in accordance with a determination that the parameter associated with the graphical enhancement is set to the second value, displaying the graphical enhancement with the second characteristic.

In accordance with some embodiments, a method performed at a computer system that is in communication with a display generation component and one or more camera sensors is described. The method comprises: while displaying, via the display generation component, a representation of a field of view of the one or more camera sensors: detecting a subject at a first position; while the subject is at the first position, detecting an input corresponding to a request to frame the subject within the representation of the field of view of the one or more camera sensors; in response to detecting the input, framing the subject in a representation of a first portion of the field of view of the one or more camera sensors; detecting movement of the subject from the first position to a second position; and in response to detecting the movement of the subject from the first position to the second position, maintaining display of the representation of the first portion of the field of view of the one or more camera sensors.

In accordance with some embodiments, a non-transitory computer-readable storage medium is described. The non-transitory computer-readable storage medium stores one or more programs configured to be executed by one or more processors of a computer system in communication with a display generation component and with one or more camera sensors, the one or more programs including instructions for: while displaying, via the display generation component, a representation of a field of view of the one or more camera sensors: detecting a subject at a first position; while the subject is at the first position, detecting an input corresponding to a request to frame the subject within the representation of the field of view of the one or more camera sensors; in response to detecting the input, framing the subject in a representation of a first portion of the field of view of the one or more camera sensors; detecting movement of the subject from the first position to a second position; and in response to detecting the movement of the subject from the first position to the second position, maintaining display of the representation of the first portion of the field of view of the one or more camera sensors.

In accordance with some embodiments, a transitory computer-readable storage medium is described. The transitory computer-readable storage medium stores one or more programs configured to be executed by one or more processors of a computer system in communication with a display generation component and with one or more camera sensors, the one or more programs including instructions for: while displaying, via the display generation component, a representation of a field of view of the one or more camera sensors: detecting a subject at a first position; while the subject is at the first position, detecting an input corresponding to a request to frame the subject within the representation of the field of view of the one or more camera sensors; in response to detecting the input, framing the subject in a representation of a first portion of the field of view of the one or more camera sensors; detecting movement of the subject from the first position to a second position; and in response to detecting the movement of the subject from the first position to the second position, maintaining display of the representation of the first portion of the field of view of the one or more camera sensors.

In accordance with some embodiments, a computer system that is in communication with a display generation component and with one or more camera sensors is described. The computer system comprises: one or more processors; and memory storing one or more programs configured to be executed by the one or more processors, the one or more programs including instructions for: while displaying, via the display generation component, a representation of a field of view of the one or more camera sensors: detecting a subject at a first position; while the subject is at the first position, detecting an input corresponding to a request to frame the subject within the representation of the field of view of the one or more camera sensors; in response to detecting the input, framing the subject in a representation of a first portion of the field of view of the one or more camera sensors; detecting movement of the subject from the first position to a second position; and in response to detecting the movement of the subject from the first position to the second position, maintaining display of the representation of the first portion of the field of view of the one or more camera sensors.

In accordance with some embodiments, a computer system that is in communication with a display generation component and with one or more camera sensors is described. The computer system comprises: one or more processors; and memory storing one or more programs configured to be executed by the one or more processors, the one or more programs including instructions for: means, while displaying, via the display generation component, a representation of a field of view of the one or more camera sensors, for: detecting a subject at a first position; while the subject is at the first position, detecting an input corresponding to a request to frame the subject within the representation of the field of view of the one or more camera sensors; in response to detecting the input, framing the subject in a representation of a first portion of the field of view of the one or more camera sensors; detecting movement of the subject from the first position to a second position; and in response to detecting the movement of the subject from the first position to the second position, maintaining display of the representation of the first portion of the field of view of the one or more camera sensors.

In accordance with some embodiments, a computer program product is described. The computer program product comprises one or more programs configured to be executed by one or more processors of a computer system that is in communication with a display generation component and with one or more camera sensors, the one or more programs including instructions for: while displaying, via the display generation component, a representation of a field of view of the one or more camera sensors: detecting a subject at a first position; while the subject is at the first position, detecting an input corresponding to a request to frame the subject within the representation of the field of view of the one or more camera sensors; in response to detecting the input, framing the subject in a representation of a first portion of the field of view of the one or more camera sensors; detecting movement of the subject from the first position to a second position; and in response to detecting the movement of the subject from the first position to the second position, maintaining display of the representation of the first portion of the field of view of the one or more camera sensors.

In accordance with some embodiments, a method is described. The method includes, at a computer system that is in communication with a display generation component and one or more input devices: detecting, via the one or more input devices, a request to display a user interface menu associated with first content; and in response to detecting the request to display the user interface menu, displaying, via the display generation component, the user interface menu, including: in accordance with a determination that a set of sharing options criteria is met and that content is being shared in a real-time communication session, displaying a first set of one or more sharing user interface elements that, when selected, cause the first content to be included in the real-time communication session; and in accordance with a determination that the set of sharing options criteria is met and that content is not being shared in a real-time communication session, displaying a second set of one or more sharing user interface elements that, when selected, cause the first content to be included in the real-time communication session, wherein the first set of one or more sharing user interface elements is different from the second set of one or more sharing user interface elements.

In accordance with some embodiments, a non-transitory computer-readable storage medium is described. The non-transitory computer-readable storage medium stores one or more programs configured to be executed by one or more processors of a computer system that is in communication with a display generation component and with one or more input devices. The one or more programs include instructions for: detecting, via the one or more input devices, a request to display a user interface menu associated with first content; and in response to detecting the request to display the user interface menu, displaying, via the display generation component, the user interface menu, including: in accordance with a determination that a set of sharing options criteria is met and that content is being shared in a real-time communication session, displaying a first set of one or more sharing user interface elements that, when selected, cause the first content to be included in the real-time communication session; and in accordance with a determination that the set of sharing options criteria is met and that content is not being shared in a real-time communication session, displaying a second set of one or more sharing user interface elements that, when selected, cause the first content to be included in the real-time communication session, wherein the first set of one or more sharing user interface elements is different from the second set of one or more sharing user interface elements.

In accordance with some embodiments, a transitory computer-readable storage medium is described. The transitory computer-readable storage medium stores one or more programs configured to be executed by one or more processors of a computer system that is in communication with a display generation component and with one or more input devices. The one or more programs include instructions for: detecting, via the one or more input devices, a request to display a user interface menu associated with first content; and in response to detecting the request to display the user interface menu, displaying, via the display generation component, the user interface menu, including: in accordance with a determination that a set of sharing options criteria is met and that content is being shared in a real-time communication session, displaying a first set of one or more sharing user interface elements that, when selected, cause the first content to be included in the real-time communication session; and in accordance with a determination that the set of sharing options criteria is met and that content is not being shared in a real-time communication session, displaying a second set of one or more sharing user interface elements that, when selected, cause the first content to be included in the real-time communication session, wherein the first set of one or more sharing user interface elements is different from the second set of one or more sharing user interface elements.

In accordance with some embodiments, a computer system that is in communication with a display generation component and with one or more input devices is described. The computer system comprises: one or more processors and memory storing one or more programs configured to be executed by the one or more processors. The one or more processors include instructions for: detecting, via the one or more input devices, a request to display a user interface menu associated with first content; and in response to detecting the request to display the user interface menu, displaying, via the display generation component, the user interface menu, including: in accordance with a determination that a set of sharing options criteria is met and that content is being shared in a real-time communication session, displaying a first set of one or more sharing user interface elements that, when selected, cause the first content to be included in the real-time communication session; and in accordance with a determination that the set of sharing options criteria is met and that content is not being shared in a real-time communication session, displaying a second set of one or more sharing user interface elements that, when selected, cause the first content to be included in the real-time communication session, wherein the first set of one or more sharing user interface elements is different from the second set of one or more sharing user interface elements.

In accordance with some embodiments, a computer system that is in communication with a display generation component and with one or more input devices is described. The computer system comprises: means for detecting, via the one or more input devices, a request to display a user interface menu associated with first content; and means for, in response to detecting the request to display the user interface menu, displaying, via the display generation component, the user interface menu, including: in accordance with a determination that a set of sharing options criteria is met and that content is being shared in a real-time communication session, displaying a first set of one or more sharing user interface elements that, when selected, cause the first content to be included in the real-time communication session; and in accordance with a determination that the set of sharing options criteria is met and that content is not being shared in a real-time communication session, displaying a second set of one or more sharing user interface elements that, when selected, cause the first content to be included in the real-time communication session, wherein the first set of one or more sharing user interface elements is different from the second set of one or more sharing user interface elements.

In accordance with some embodiments, a computer program product is described. The computer program product comprises one or more programs configured to be executed by one or more processors of a computer system that is in communication with a display generation component and with one or more input devices. The one or more programs includes instructions for: detecting, via the one or more input devices, a request to display a user interface menu associated with first content; and in response to detecting the request to display the user interface menu, displaying, via the display generation component, the user interface menu, including: in accordance with a determination that a set of sharing options criteria is met and that content is being shared in a real-time communication session, displaying a first set of one or more sharing user interface elements that, when selected, cause the first content to be included in the real-time communication session; and in accordance with a determination that the set of sharing options criteria is met and that content is not being shared in a real-time communication session, displaying a second set of one or more sharing user interface elements that, when selected, cause the first content to be included in the real-time communication session, wherein the first set of one or more sharing user interface elements is different from the second set of one or more sharing user interface elements.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for displaying graphical effects, thereby increasing the effectiveness, efficiency, and user satisfaction with such devices. Such methods and interfaces may complement or replace other methods for displaying graphical effects.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 6A-6Y illustrate exemplary user interfaces for displaying graphical effects based on the detection of gestures, in accordance with some embodiments.

FIGS. 7A-7B are flow diagrams illustrating methods for displaying graphical effects based on the detection of gestures, in accordance with some embodiments.

FIG. 9 is a flow diagram illustrating a method for sharing content between computer systems in a real-time communication session, in accordance with some embodiments.

FIGS. 11A-11B are flow diagrams illustrating a method for displaying graphical enhancements in multiple different video applications, in accordance with some embodiments.

FIGS. 12A-12M illustrate exemplary user interfaces for framing a representation of a subject in a representation of a field of view of one or more camera sensors, in accordance with some embodiments.

FIG. 13 is a flow diagram illustrating a method for framing a subject in a representation of a field of view of one or more camera sensors, in accordance with some embodiments.

FIG. 15 is a flow diagram illustrating a method for displaying a menu, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for enhancing communication via graphical effects and/or shared content during a real-time communication session. For example, there is a need to provide efficient methods and interfaces for displaying graphical effects. As another example, there is a need to provide efficient methods and interfaces for preventing unintentional effects during a real-time communication session. As another example, there is a need to provide efficient methods and interfaces for sharing content during a real-time communication session. As another example, there is a need to provide efficient methods and interfaces for managing effects across multiple video applications. Such techniques can reduce the cognitive burden on a user and enhance communication via graphical effects and/or shared content, thereby enhancing productivity. Further, such techniques can reduce processor and battery power otherwise wasted on redundant user inputs.

Figure 8A:
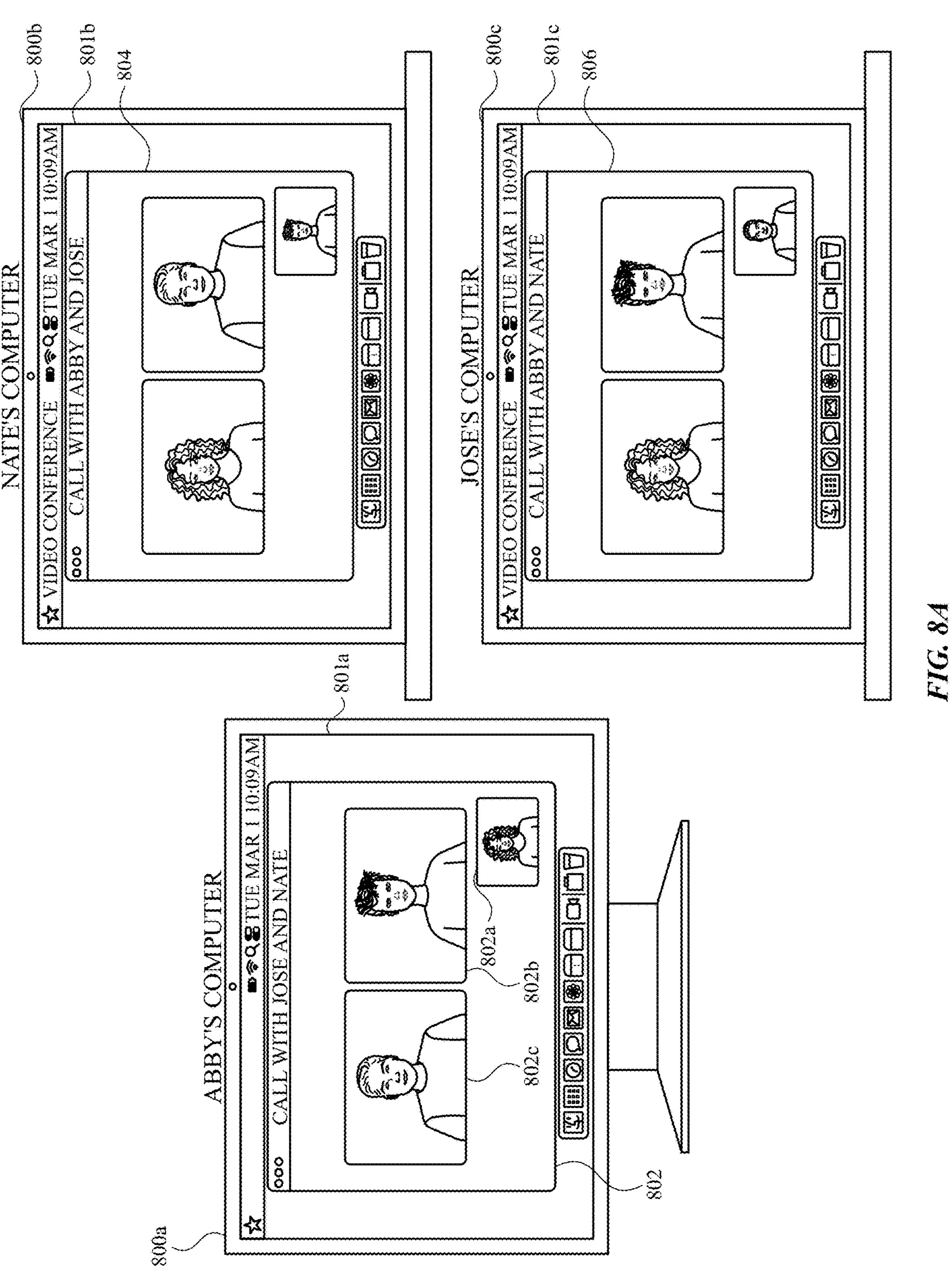
FIGS. 8A-8Z illustrate exemplary user interfaces for sharing content between computer systems in a real-time communication session, in accordance with some embodiments.
Figure 10A:
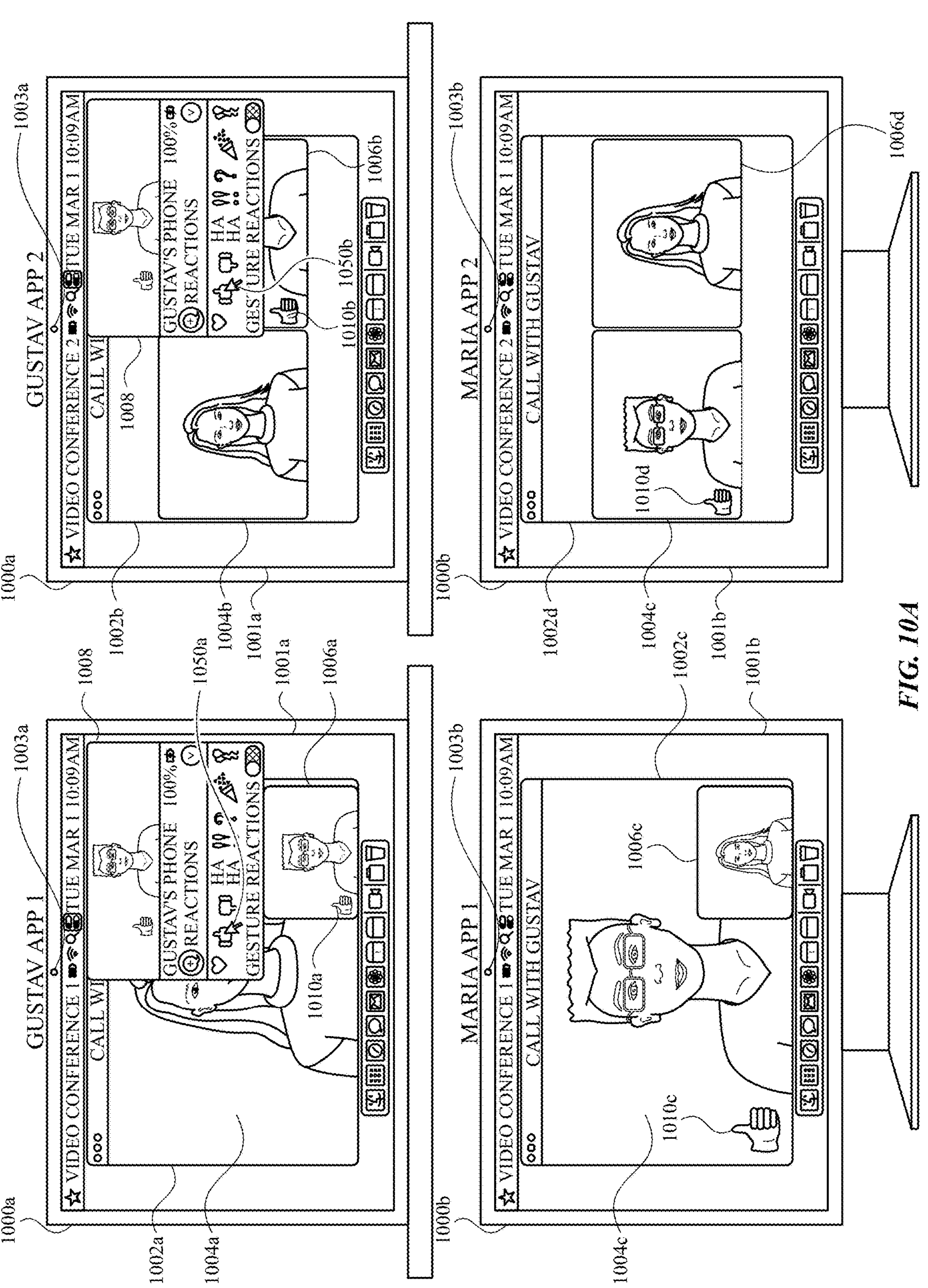
FIGS. 10A-10Q illustrate exemplary user interfaces for displaying graphical enhancements in multiple different video applications, in accordance with some embodiments.
Figure 14A:
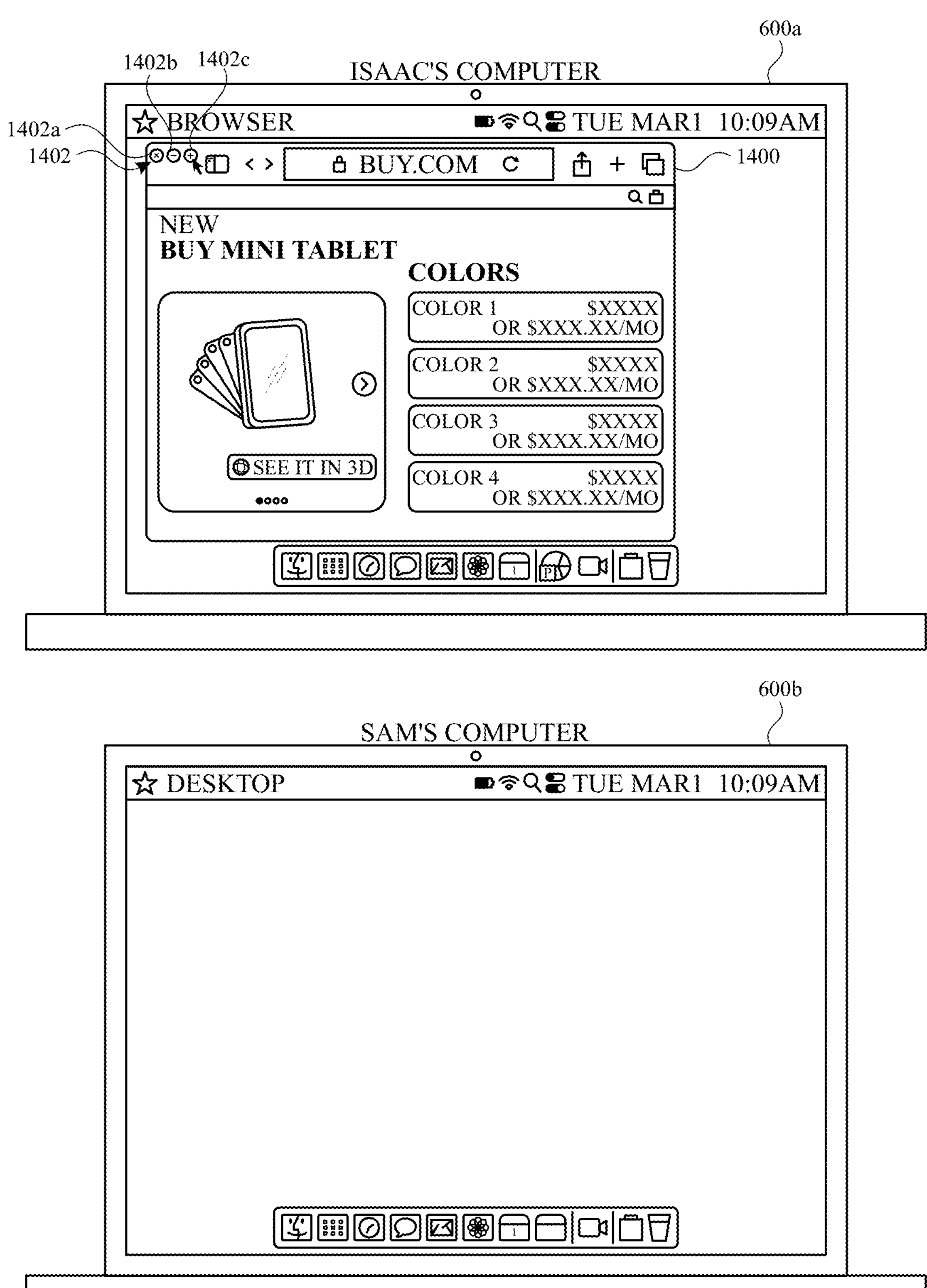
FIGS. 14A-14N illustrate exemplary user interfaces for displaying a menu, in accordance with some embodiments.

Below, FIGS. 1A-1B, 2, 3, 4A-4B, and 5A-5C provide a description of exemplary devices for performing the techniques for managing event notifications. FIGS. 6A-6Y illustrate exemplary user interfaces for displaying graphical effects in response to detected gestures. FIGS. 7A-7B are flow diagrams illustrating methods for displaying graphical effects in response to detected gestures in accordance with some embodiments. The user interfaces in FIGS. 6A-6Y are used to illustrate the processes described below, including the processes in FIGS. 7A-7B. FIGS. 8A-8Z illustrate exemplary user interfaces for sharing content during a real-time communication session. FIG. 9 is a flow diagram illustrating a method for sharing content during a real-time communication session in accordance with some embodiments. The user interfaces in FIGS. 8A-8Z are used to illustrate the processes described below, including the processes in FIG. 9. FIGS. 10A-10Q illustrate exemplary user interfaces for managing graphical enhancements across multiple different video applications in accordance with some embodiments. FIGS. 11A-11B are flow diagrams illustrating a method for managing graphical enhancements across multiple different video applications. The user interfaces in FIGS. 10A-10Q are used illustrate the processes described below, including the process in FIGS. 11A-11B. FIGS. 12A-12M illustrate exemplary user interfaces for framing a representation of a subject in a representation of a field of view of one or more cameras. FIG. 13 is a flow diagram illustrating a method for framing a representation of a subject in a representation of a field of view of one or more cameras, in accordance with some embodiments. FIGS. 12A-12M are used to illustrate the processes described below, including the processes in FIG. 13. FIGS. 14A-14N illustrate exemplary user interfaces for displaying a menu. FIG. 15 is a flow diagram illustrating a method for displaying a menu, in accordance with some embodiments. FIGS. 14A-14N are used to illustrate the processes described below, including the processes in FIG. 14.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
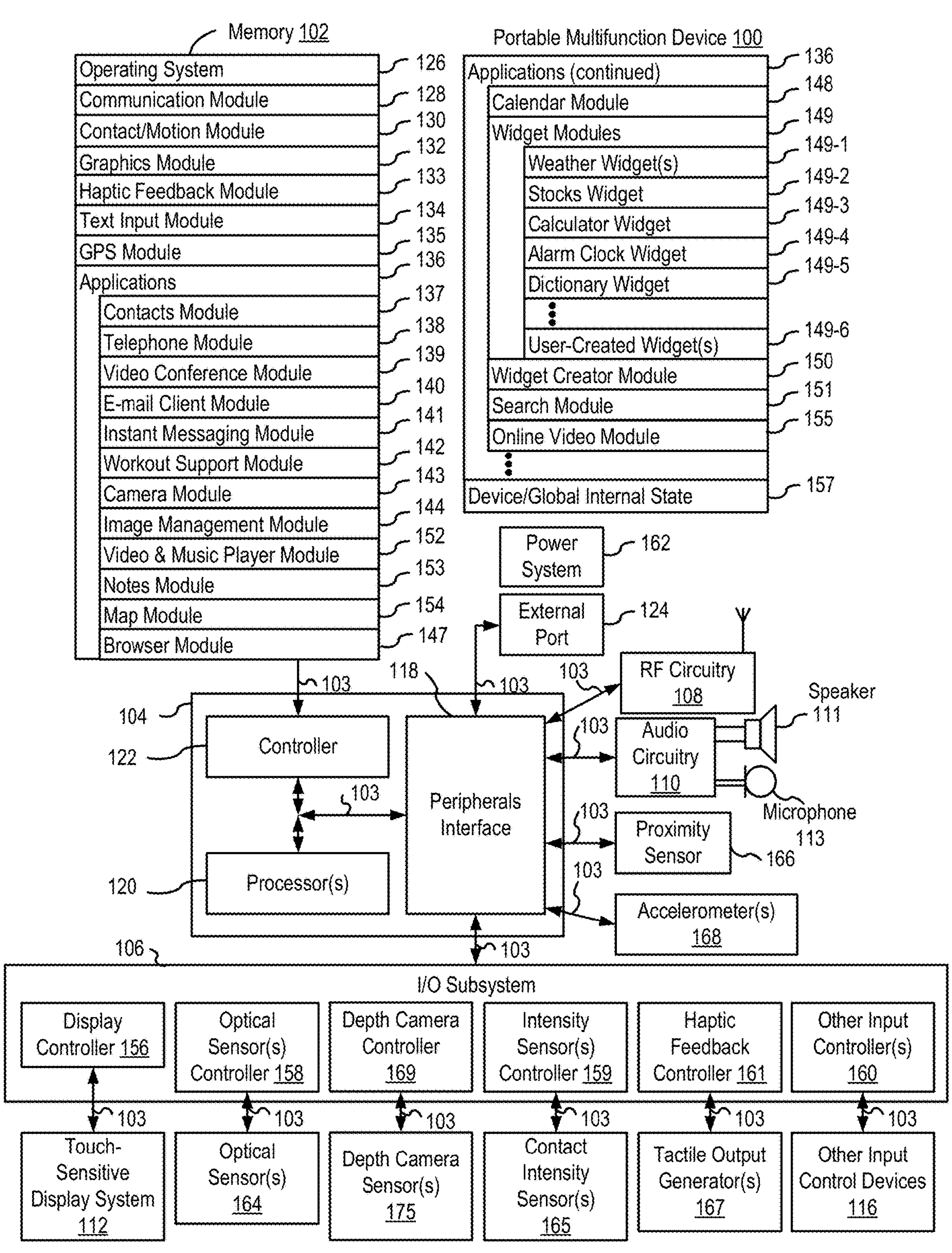
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both cars) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S.

patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "O" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety.

In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
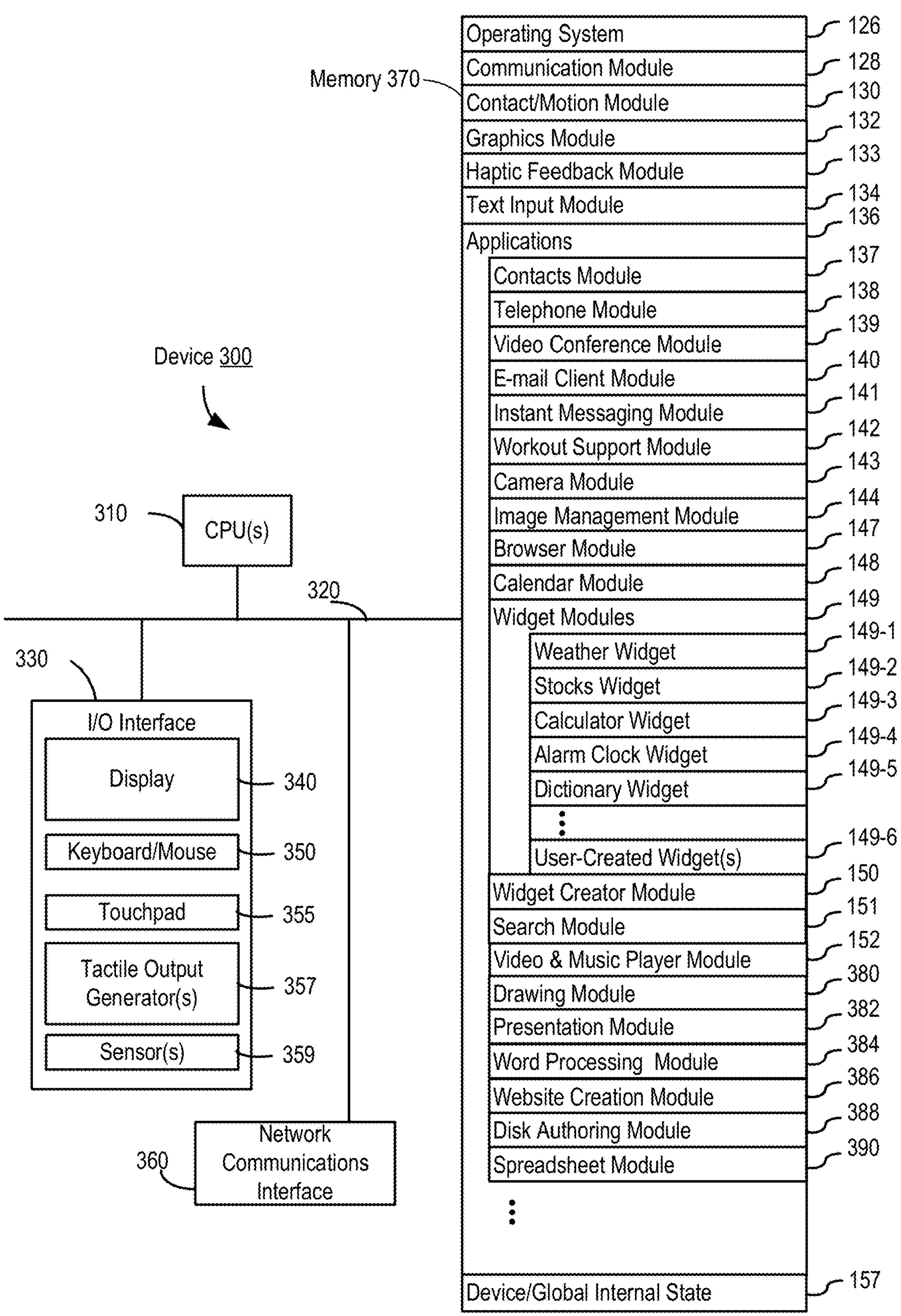
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
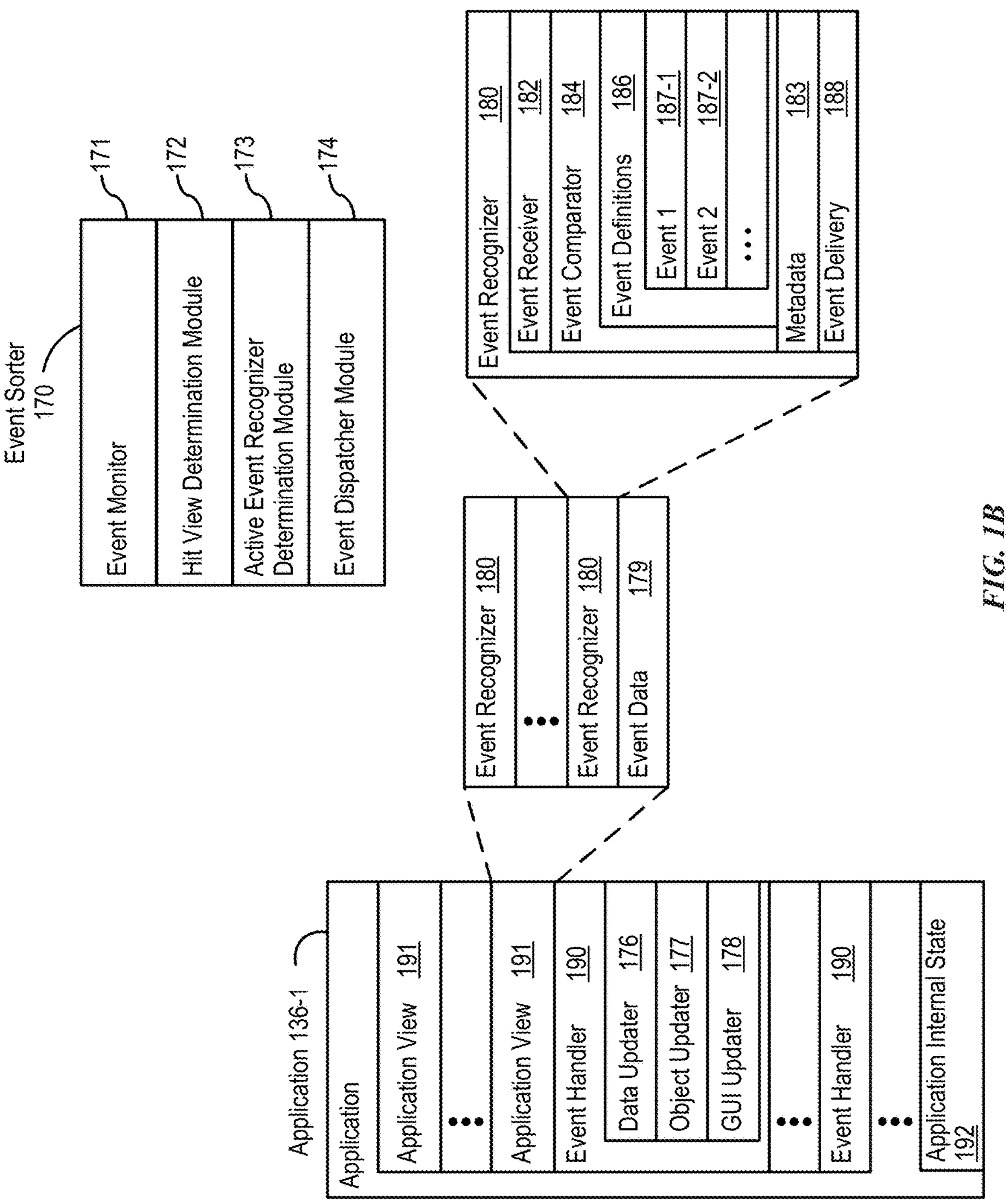
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
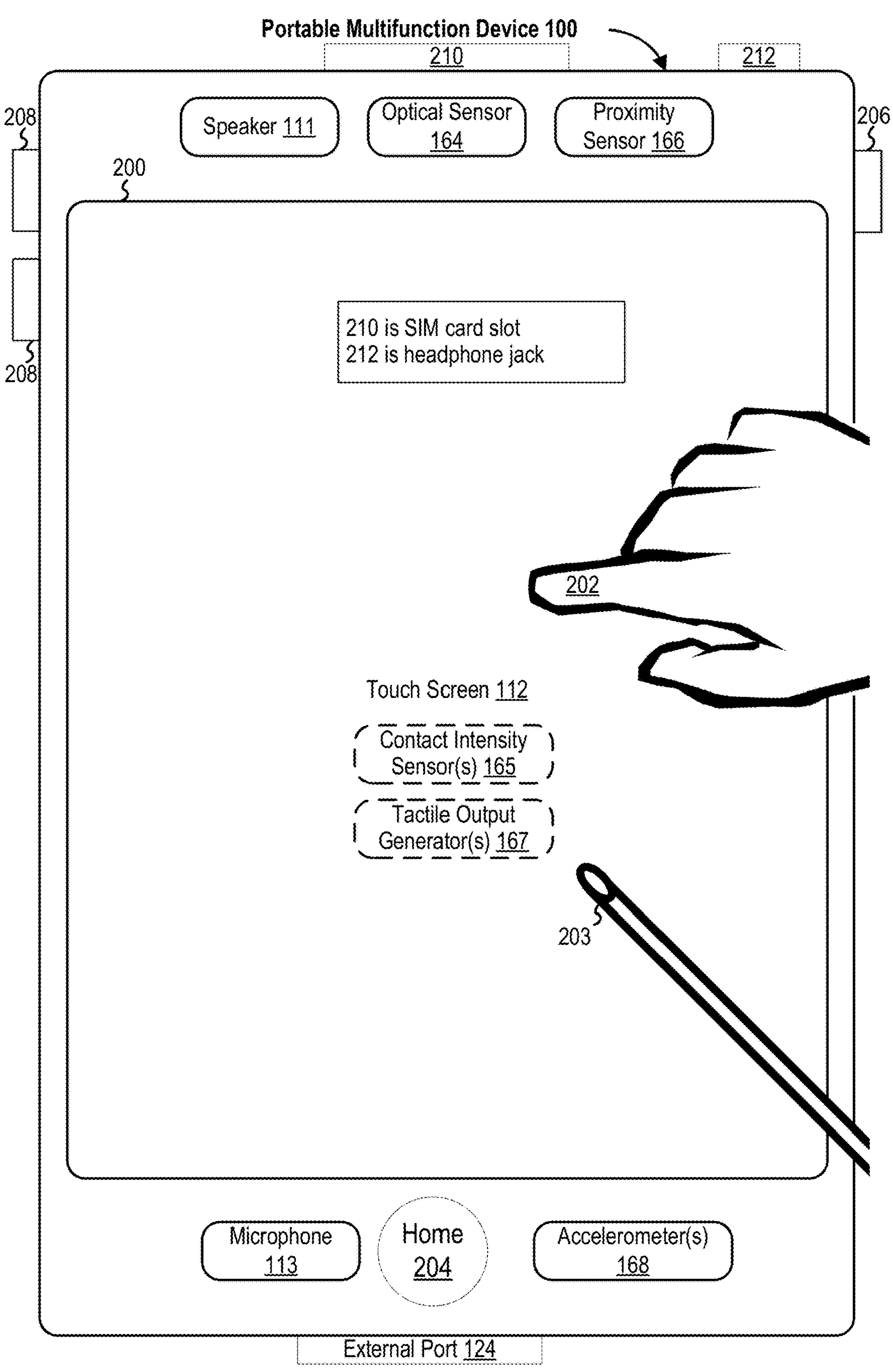
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as “home” or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child’s learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
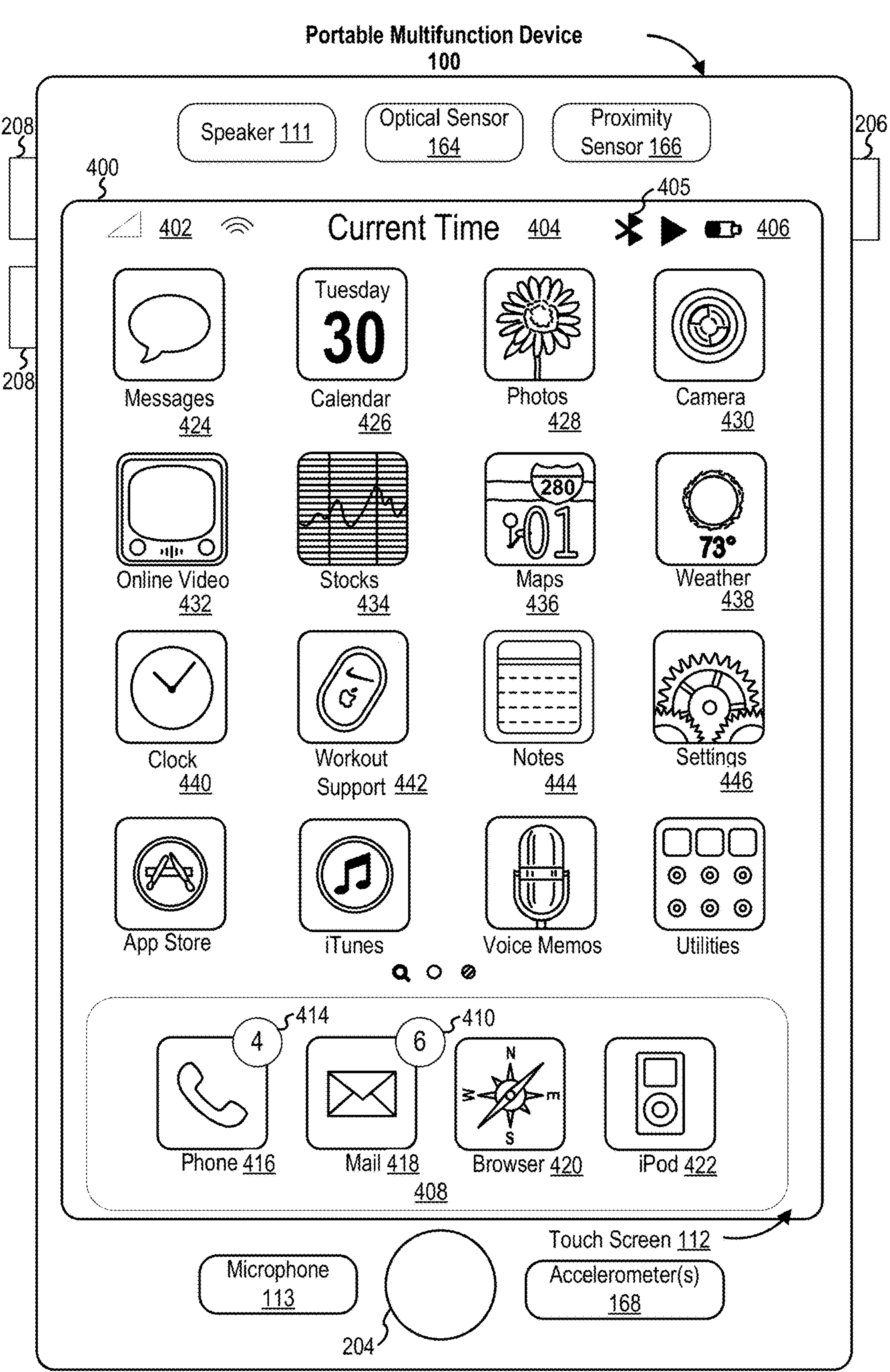
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
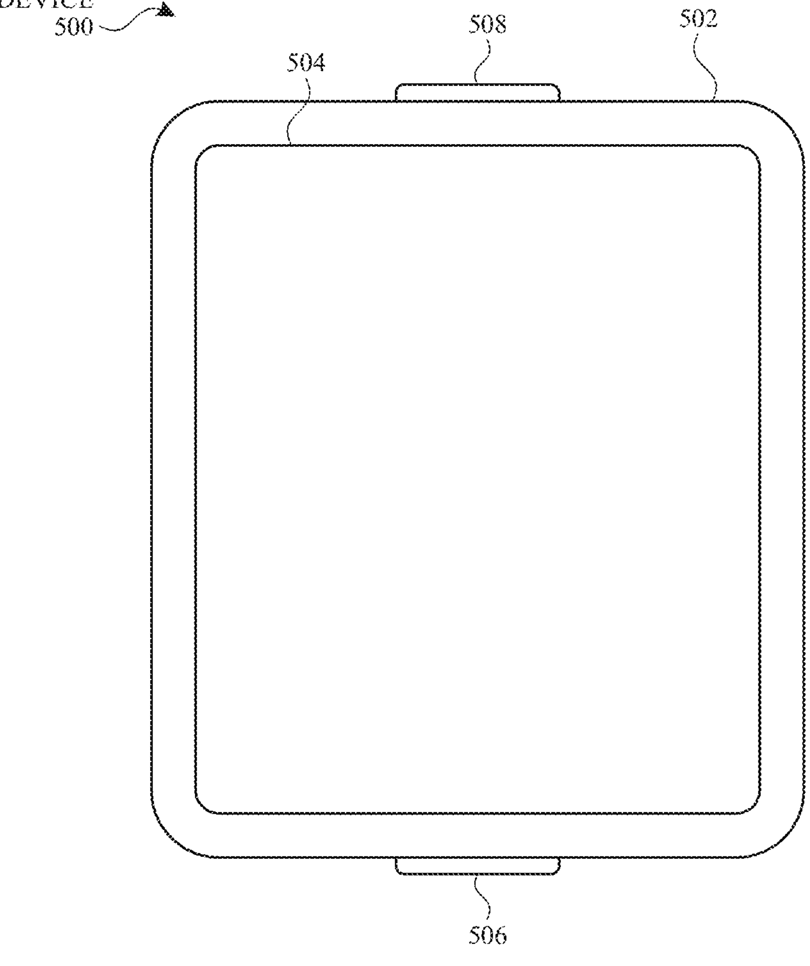
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
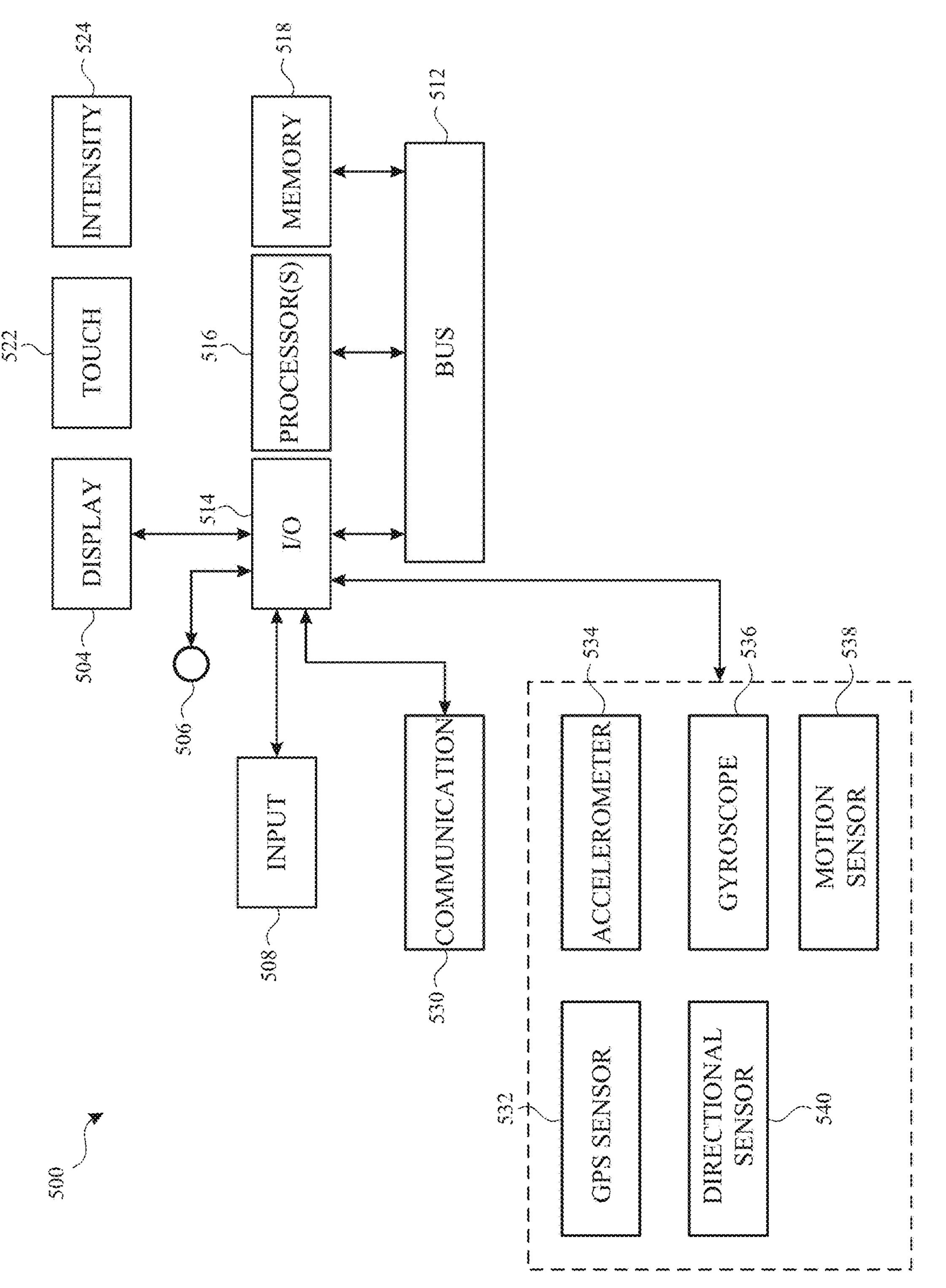
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 750, 900, 1100, 1300, and 1500 (FIGS. 7A, 7B, 9, 11A, 11B, 13, and 15). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
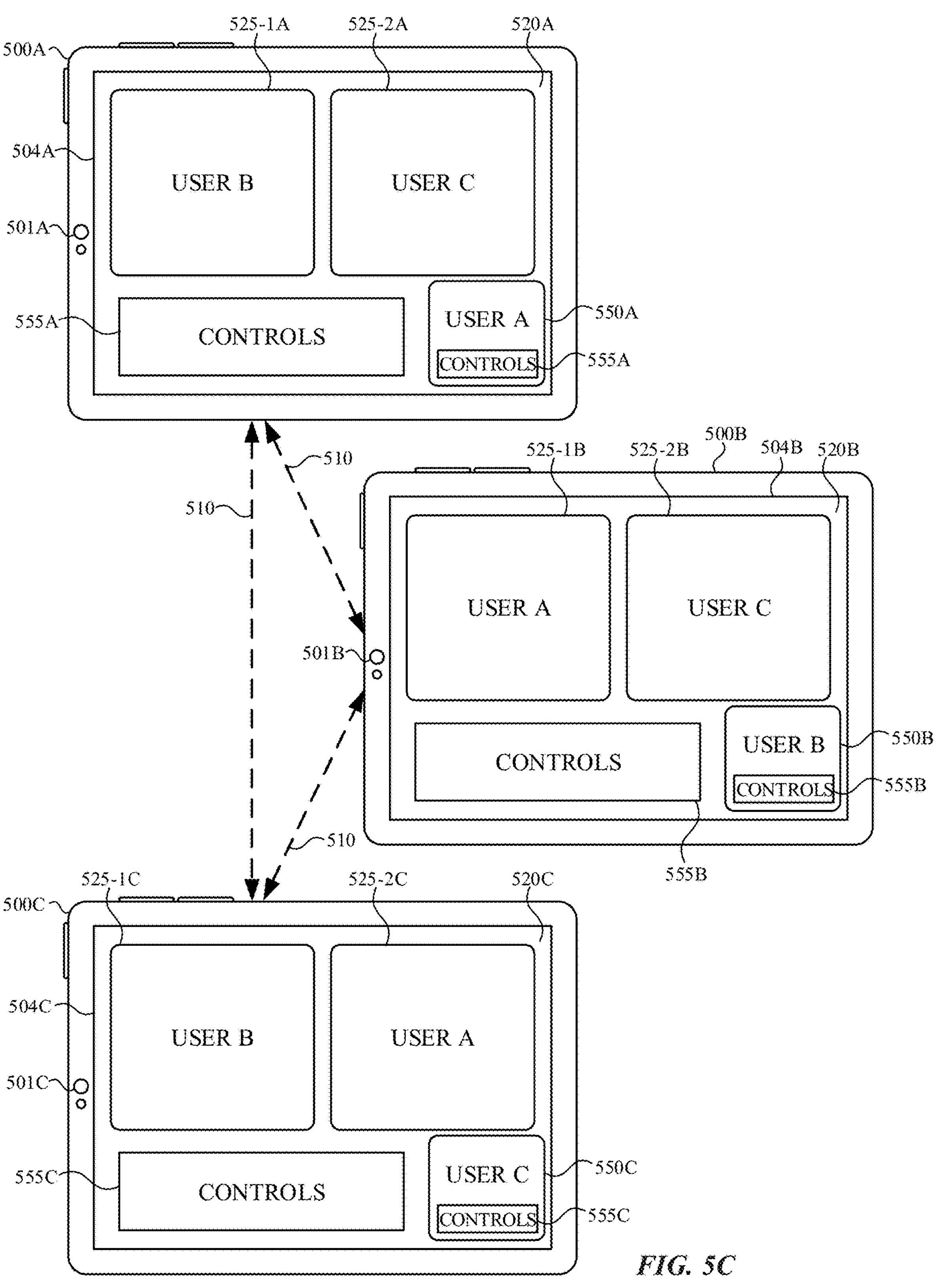
FIG. 5C illustrates an exemplary diagram of a communication session between electronic devices in accordance with some embodiments.

FIG. 5C depicts an exemplary diagram of a communication session between electronic devices 500A, 500B, and 500C. Devices 500A, 500B, and 500C are similar to electronic device 500, and each share with each other one or more data connections 510 such as an Internet connection, Wi-Fi connection, cellular connection, short-range communication connection, and/or any other such data connection or network so as to facilitate real time communication of audio and/or video data between the respective devices for a duration of time. In some embodiments, an exemplary communication session can include a shared-data session whereby data is communicated from one or more of the electronic devices to the other electronic devices to enable concurrent output of respective content at the electronic devices. In some embodiments, an exemplary communication session can include a video conference session whereby audio and/or video data is communicated between devices 500A, 500B, and 500C such that users of the respective devices can engage in real time communication using the electronic devices.

In FIG. 5C, device 500A represents an electronic device associated with User A. Device 500A is in communication (via data connections 510) with devices 500B and 500C, which are associated with User B and User C, respectively. Device 500A includes camera 501A, which is used to capture video data for the communication session, and display 504A (e.g., a touchscreen), which is used to display content associated with the communication session. Device 500A also includes other components, such as a microphone (e.g., 113) for recording audio for the communication session and a speaker (e.g., 111) for outputting audio for the communication session.

Device 500A displays, via display 504A, communication UI 520A, which is a user interface for facilitating a communication session (e.g., a video conference session) between device 500B and device 500C. Communication UI 520A includes video feed 525-1A and video feed 525-2A. Video feed 525-1A is a representation of video data captured at device 500B (e.g., using camera 501B) and communicated from device 500B to devices 500A and 500C during the communication session. Video feed 525-2A is a representation of video data captured at device 500C (e.g., using camera 501C) and communicated from device 500C to devices 500A and 500B during the communication session.

Communication UI 520A includes camera preview 550A, which is a representation of video data captured at device 500A via camera 501A. Camera preview 550A represents to User A the prospective video feed of User A that is displayed at respective devices 500B and 500C.

Communication UI 520A includes one or more controls 555A for controlling one or more aspects of the communication session. For example, controls 555A can include controls for muting audio for the communication session, changing a camera view for the communication session (e.g., changing which camera is used for capturing video for the communication session, adjusting a zoom value), terminating the communication session, applying visual effects to the camera view for the communication session, activating one or more modes associated with the communication session. In some embodiments, one or more controls 555A are optionally displayed in communication UI 520A. In some embodiments, one or more controls 555A are displayed separate from camera preview 550A. In some embodiments, one or more controls 555A are displayed overlaying at least a portion of camera preview 550A.

In FIG. 5C, device 500B represents an electronic device associated with User B, which is in communication (via data connections 510) with devices 500A and 500C. Device 500B includes camera 501B, which is used to capture video data for the communication session, and display 504B (e.g., a touchscreen), which is used to display content associated with the communication session. Device 500B also includes other components, such as a microphone (e.g., 113) for recording audio for the communication session and a speaker (e.g., 111) for outputting audio for the communication session.

Device 500B displays, via touchscreen 504B, communication UI 520B, which is similar to communication UI 520A of device 500A. Communication UI 520B includes video feed 525-1B and video feed 525-2B. Video feed 525-1B is a representation of video data captured at device 500A (e.g., using camera 501A) and communicated from device 500A to devices 500B and 500C during the communication session. Video feed 525-2B is a representation of video data captured at device 500C (e.g., using camera 501C) and communicated from device 500C to devices 500A and 500B during the communication session. Communication UI 520B also includes camera preview 550B, which is a representation of video data captured at device 500B via camera 501B, and one or more controls 555B for controlling one or more aspects of the communication session, similar to controls 555A. Camera preview 550B represents to User B the prospective video feed of User B that is displayed at respective devices 500A and 500C.

In FIG. 5C, device 500C represents an electronic device associated with User C, which is in communication (via data connections 510) with devices 500A and 500B. Device 500C includes camera 501C, which is used to capture video data for the communication session, and display 504C (e.g., a touchscreen), which is used to display content associated with the communication session. Device 500C also includes other components, such as a microphone (e.g., 113) for recording audio for the communication session and a speaker (e.g., 111) for outputting audio for the communication session.

Device 500C displays, via touchscreen 504C, communication UI 520C, which is similar to communication UI 520A of device 500A and communication UI 520B of device 500B. Communication UI 520C includes video feed 525-1C and video feed 525-2C. Video feed 525-1C is a representation of video data captured at device 500B (e.g., using camera 501B) and communicated from device 500B to devices 500A and 500C during the communication session. Video feed 525-2C is a representation of video data captured at device 500A (e.g., using camera 501A) and communicated from device 500A to devices 500B and 500C during the communication session. Communication UI 520C also includes camera preview 550C, which is a representation of video data captured at device 500C via camera 501C, and one or more controls 555C for controlling one or more aspects of the communication session, similar to controls 555A and 555B. Camera preview 550C represents to User C the prospective video feed of User C that is displayed at respective devices 500A and 500B.

While the diagram depicted in FIG. 5C represents a communication session between three electronic devices, the communication session can be established between two or more electronic devices, and the number of devices participating in the communication session can change as electronic devices join or leave the communication session. For example, if one of the electronic devices leaves the communication session, audio and video data from the device that stopped participating in the communication session is no longer represented on the participating devices. For example, if device 500B stops participating in the communication session, there is no data connection 510 between devices 500A and 500C, and no data connection 510 between devices 500C and 500B. Additionally, device 500A does not include video feed 525-1A and device 500C does not include video feed 525-1C. Similarly, if a device joins the communication session, a connection is established between the joining device and the existing devices, and the video and audio data is shared among all devices such that each device is capable of outputting data communicated from the other devices.

The embodiment depicted in FIG. 5C represents a diagram of a communication session between multiple electronic devices, including the example communication sessions depicted in FIGS. 6A-6Y, 8A-8G, 10A-10Q, and 14E-14N. In some embodiments, the communication sessions depicted in FIGS. 6A-6Y, 8A-8G, 10A-10Q, and 14E-14N include two or more electronic devices, even if other electronic devices participating in the communication session are not depicted in the figures.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6Y illustrate exemplary user interfaces for displaying graphical effects during a real-time communication session, in accordance with some embodiments. The user interfaces in these figures are used to illustrate the processes described below, including the processes in FIGS. 7A-7B.

At FIG. 6A, computer system 600*a* (e.g., Isaac's computer) and computer system 600*b* (e.g., Sam's computer) are in communication via a real-time communication session. Computer system 600*a* displays user interface 602*a*, which includes representation 606*a* of the participant associated with computer system 600*a* and representation 604*a* of the participant associated with computer system 600*b*. For example, on Isaac's computer (e.g., computer system 600*a*), representation 606*a* is a representation of Isaac (e.g., a self-view) and representation 604*a* is a representation of Sam (e.g., a representation of a remote participant).

Computer system 600*b* displays user interface 602*b*, which includes representation 606*b* of the participant associated with computer system 600*b* and representation 604*b* of the participant associated with computer system 600*a*. For example, on Sam's computer (e.g., computer system 600*b*), representation 606*b* is a representation of Sam (e.g., a self-view) and representation 604*b* is a representation of Isaac (e.g., a representation of a remote participant).

In some embodiments, representation 606*a* and representation 606*b* are displayed at a smaller size than representation 604*a* and representation 604*b*. In some embodiments, representations 604*a*, 604*b*, 606*a*, and/or 606*b* include an animated avatar, an avatar, a photo, or a video feed from one or more camera sensors. In some embodiments, representation 604*a*, representation 604*b*, representation 606*a*, and representation 606*b* include a background environment behind the participant. In some embodiments, representation 604*a*, representation 604*b*, representation 606*a*, and representation 606*b* include a simulated background environment behind the representation of the participant.

At FIG. 6B, the participant in the real-time communication session associated with computer system 600*a* (e.g., Isaac) waves his hand in the field of view of the one or more camera sensors of computer system 600*a*. In response to detection of Isaac's hand, computer system 600*a* displays hint 608*a* in user interface 602*a*, and computer system 600*b* displays hint 608*b* in user interface 602*b*. In user interface 602*a*, hint 608*a* is displayed around Isaac's hand in representation 606*a*. In user interface 602*b*, hint 608*b* is displayed around Isaac's hand in representation 604*b*. In some embodiments, hint 608*b* is not displayed in user interface 602*b* on computer system 600*b* and is instead only displayed on computer system 600*a* (e.g., the hint is only displayed on the computer system associated with the participant that is performing the gesture, such as on Isaac's device and not on Sam's device). Hint 608*a* and hint 608*b* indicate that graphical effects can be displayed in response to performing a gesture. In some embodiments, hint 608*a* and/or hint 608*b* include circles displayed around the participant's hand. In some embodiments, hint 608*a* and/or hint 608*b* move with the hand of the participant. In some embodiments, hint 608*a* and/or hint 608*b* include text describing that a graphical effect can be displayed in response to detection of a gesture. In some embodiments, hint 608*a* and/or hint 608*b* include a graphical effect, such as glowing, lighting, and/or a color effect displayed around the participant's hand.

At FIG. 6C, the participant in the real-time communication session associated with computer system 600*a* (e.g., Isaac) performs a thumbs up gesture in the view of the one or more camera sensors of computer system 600*a*. In response to detection of the thumbs up gesture, computer system 600*a* displays prompt 610*a*, which includes a prompt to enable displaying graphical effects in response to detecting a performed gesture. If computer system 600*a* detects a user input corresponding to a selection of "yes" option 610*al*, graphical effects will be displayed in representation 606*a* and/or representation 604*b* (e.g., representations of Isaac) in response to detection of gestures performed by Isaac in the field of view of one or more camera sensors in communication with computer system 600*a*. If computer system 600*a* detects a user input corresponding to Isaac selecting "no" option 610*a*2 in response to prompt 610*a*, graphical effects will not be displayed in representation 604*b* and representation 606*a* in response to computer system 600*a* detecting gestures performed by Isaac in the field of view of computer system 600*a*. In some embodiments, computer system 600*a* ceases displaying prompt 610*a* after a predetermined time if no selection is made. In some embodiments, gesture-based reactions are not turned on if no selection is detected within a predetermined time. In some embodiments, gesture-based reactions are turned on or off via an application menu or an operating system menu, such as menu 612*a* described with reference to FIG. 6D or menu 1008 described with reference to FIG. 10A. In some embodiments, selection of a state (e.g., on or off) for gesture-based reactions is persistent (e.g., the state is maintained for one or more applications such that a user does not have to enable or disable gesture-based reactions when an application is launched or a new real-time communication session is initiated).

At FIG. 6D, the participant in the real-time communication session associated with computer system 600*a* (e.g., Isaac) opens menu 612*a* on computer system 600*a* and selects a thumbs up graphical effect via input 614*a* (e.g., an input via a mouse and/or keyboard, and/or a touch gesture). In some embodiments, menu 612*a* includes options to display graphical effects including representations of a thumbs up effect, a thumbs down effect, a peace sign effect, fireworks effect, rain effect, and/or confetti effect. In some embodiments, menu 612*a* includes preview thumbnail 612*ab*, which shows a preview representation of graphical effects that can be applied via menu 612*a* before the graphical effects are applied to representation 606*a* and/or representation 604*b*. In some embodiments, menu 612*a* is an operating system menu. In some embodiments, menu 612*a* is an application menu associated with the real-time communication session.

At FIG. 6E, in response to detecting input 614*a*, computer system 600*a* (e.g., Isaac's computer) displays graphical effect 616*a* in representation 606*a*. In some embodiments, graphical effect 616*a* includes a representation of a thumbs up gesture, such as a thumbs up emoji. In response to detecting input 614*a*, computer system 600*a* displays hint 613*a*. In some embodiments, hint 613*a* includes a video clip demonstrating that graphical effects can be displayed in response to performing a gesture s. In some embodiments, hint 613*a* includes text describing that graphical effects can be displayed in response to performing a gesture. Computer system 600*b* (e.g., Sam's computer) displays graphical effect 616*b* in representation 604*b*. In some embodiments, graphical effect 616*b* can include any or all features of graphical effect 616*a*.

At FIG. 6F, the participant in the real-time communication session associated with computer system 600*a* (e.g., Isaac) performing a thumbs up gesture while moving his hand back and forth. In response to detection of the moving thumbs up gesture, computer system 600*a* and computer system 600*b* forgo displaying a graphical effect. In some embodiments, computer system 600*a* and computer system 600*b* forgo displaying a graphical effect in response to moving gestures (or gestures moving above a threshold velocity). In some embodiments, computer system 600*a* and computer system 600*b* forgo displaying a graphical effect in response to gestures that are maintained for less than a predetermined duration (e.g., 0.5, 1, 3, 5, or 10 seconds). In some embodiments, computer system 600*a* and computer system 600*b* display a graphical effect in response to detecting the gesture if the gesture is not moving, moving below a threshold velocity, and/or maintained for more than a predetermined duration.

At FIG. 6G, in response to detection of the participant in the real-time communication session associated with computer system 600*a* (e.g., Isaac) performing a thumbs up gesture with his right hand, computer system 600*a* displays graphical effect 618*a*. Graphical effect 618*a* is included in representation 606*a* (e.g., the representation of Isaac). In some embodiments, graphical effect 618*a* includes a representation of the thumbs up gesture, such as an emoji. In some embodiments, graphical effect 618*a* includes a sequence of effects. In some embodiments, the sequence of effects includes multiple emoji that begin displaying at the location of Isaac's hand in representation 606*a* and move to the top of representation 606*a*. In some embodiments, the sequence of effects continues until the gesture is no longer detected. Computer system 600*b* displays graphical effect 618*b* in representation 604*b* of Isaac. In some embodiments, graphical effect 618*b* and representation 604*b* can include any or all features of graphical effect 618*a* and/or representation 606*a* of Isaac on computer system 600*a*, as described with respect to FIG. 6G.

In FIG. 6G, Isaac begins moving his hand from in front of his body (e.g., a first location) to the right of his torso (e.g., a second location). In some embodiments, the movement speed of Isaac's hand is below a threshold velocity. In FIG. 6H, Isaac's hand continues to move to the right of his torso (e.g., towards the second location) and computer system 600*a* displays graphical effect 618*a* at the current location of the gesture within representation 606*a*. In some embodiments, only the most recently displayed portion of graphical effect 618*a* aligns with the current horizontal location of Isaac's hand in representation 606*a*. For example, the more recent effects are displayed at the current location of Isaac's hand and the less recent effects align horizontally with first location of Isaac's hand and are higher vertically than the most recent effects, creating a "trail" of effects floating away from the location of the gesture in representation 606*a*. Similarly, computer system 600*b* displays graphical effect 618*b* at the second location within representation 604*b* of Isaac in user interface 602*b*. In some embodiments, graphical effect 618*b* and/or representation 604*b* can include any or all features of graphical effect 618*a* and/or representation 606*a* as described with respect to FIG. 6H.

At FIG. 6I, Isaac's hand is now to the right of his torso. Graphical effect 618*a* is displayed at the second location within representation 606*a*. In some embodiments, graphical effect 618*a* creates a vertical line of effects above the gesture moving vertically out of frame within representation 606*a*. In some embodiments, graphical effect 618*a* is no longer displayed at the first location of Isaac's hand. Similarly, computer system 600*b* displays graphical effect 618*b* at the second location within representation 604*b*. In some embodiments, graphical effect 618*b* and/or representation

604*b* can include any or all features of graphical effect 618*a* and/or representation 606*a* as described with respect to FIG. 6I.

At FIG. 6J, the participant associated with computer system 600*a* (e.g., Isaac) performs a thumbs up gesture with his left hand. In response to detection of the gesture performed with Isaac's left hand, computer system 600*a* displays graphical effect 618*a* with an orientation matching the orientation of Isaac's hand. For example, the palm and fingers are no longer included in graphical effect 618*a*, and instead the back of the hand is represented. In some embodiments, graphical effect 618*a* includes fingers and/or a palm or the back of a hand. Which portion of the hand is represented changes based on which hand performs the gesture and the orientation of the gesture. For example, in FIG. 6I, the gesture is performed by Isaac's right hand with the hand on the right side of Isaac's body, and graphical effect 618*a* includes fingers and a palm. Alternatively, if Isaac performed the same gesture with the right hand on the left side of his body, the back of his hand would be visible in representation 606*a* and graphical effect 618*a* would include a representation of the back of a hand instead of fingers. In some embodiments, graphical effect 618*a* includes a wrist in the same orientation as the participant's hand. In some embodiments, in graphical effect 618*a*, the wrist and thumb are represented in the same orientation as the participant's hand. In some embodiments, the orientation of graphical effect 618*a* matches the angle of rotation as the participant's hand (e.g., if Isaac's hand is at an angle, graphical effects 618 is rotated to match the angle of Isaac's hand). In some embodiments, the angle of the gesture is rotated to be a thumbs down gesture. In response to detecting the participant associated with computer 600*a* performing the thumbs up gesture with his left hand, computer system 600*b* displays graphical effect 618*b* to match the orientation of the participant's hand. In some embodiments, graphical effect 618*b* displayed on computer system 600*b* can include any or all features of graphical effect 618*a* as described with respect to FIG. 6J.

At FIG. 6K, the participant associated with computer system 600*a* (e.g., Isaac) performs a thumbs up gesture, and in response to detection of the thumbs up gesture, computer system 600*a* displays prompt 620*a* in user interface 602*a*. Prompt 620*a* prompts the user to cancel gesture-based reactions. In some embodiments, the prompt includes "yes" option 620*a*2 corresponding to a selection to cancel displaying graphical effects in response to detecting gestures and "no" option 620*a*3 corresponding to a selection to continue displaying graphical effects in response to detecting gestures. In some embodiments, prompt 620*a* is displayed a predetermined number of times after a graphical effect is displayed in response to detecting a gesture, and prompt 620*a* is not displayed after graphical effects have been displayed in response to a gesture more than the predetermined number of times. At FIG. 6K, user input 620*al* corresponding to prompt 620*a* and a selection to cease displaying graphical effects in response to gestures is detected. At computer system 600*b*, in response to detecting Isaac performing the thumbs up gesture, computer system 600*b* displays graphical effect 618*b* without displaying prompt 620*a*.

At FIG. 6L, after user input 620*al* (which selects prompt 620*a* to cease displaying graphical effects in response to detecting gestures), computer system 600*a* does not display graphical effect 618*a* in response to Isaac's thumbs up gesture. Similarly, computer system 600*b* does not display graphical effect 618*b* in representation 604*b* when Isaac performs the thumbs up gesture.

At FIG. 6M, the feature of displaying graphical effects in response to detecting gestures has been reactivated on computer system 600*a*, and a double thumbs up gesture is performed by the participant associated with computer system 600*a* (e.g., Isaac). In response to detection of the double thumbs up gesture, computer system 600*a* displays graphical effect 622*a* in representation 606*a*. Graphical effect 622*a* includes representations of both hands (e.g., a left-hand emoji and a right-hand emoji) performing the double thumbs up gesture. Similarly, in response to the double thumbs up gesture being detected, computer system 600*b* displays graphical effect 622*b* in representation 604*b* of Isaac. Graphical effect 622*a* and/or graphical effect 622*b* can include any or all of the features of graphical effect 618*a* and/or graphical effect 618*b* described with reference to FIGS. 6G, 6H, 6I, and 6J.

At FIG. 6N, a double thumbs up gesture is performed by the participant associated with computer system 600*a* (e.g., Isaac), and in response to detection of the double thumbs up gesture, computer system 600*a* displays graphical effect 624*a* in representation 606*a*. Graphical effect 624*a* includes simulated fireworks displayed behind the participant performing the gesture (e.g., Isaac) in representation 606*a*. In some embodiments, graphical effect 624*a* illuminates a portion of the participant performing the gesture (e.g., Isaac's body) with simulated light. In some embodiments, graphical effect 624*a* includes displaying a portion of the participant performing the gesture (e.g., Isaac's body) covered in a simulated shadow. In some embodiments, graphical effect 624*a* is shown for a predetermined duration. In some embodiments, graphical effect 624*a* is displayed for as long as the double thumbs up gesture is detected. In some embodiments, graphical effect 624*a* fades away and computer system 600*a* ceases displaying graphical effect 624*a* after a predetermined time has elapsed since detection of the gesture (e.g., after the gesture is initially detected or after detection of an end of the gesture). In some embodiments, graphical effect 622*a* is replaced with graphical effect 624*a* if the double thumbs up gesture is detected for longer than a predetermined time period. In some embodiments, graphical effect 624*a* (e.g., a special effect, such as fireworks) is displayed instead of graphical effect 622*a* (e.g., double thumbs up emojis) in response to the double thumbs up gesture. In some embodiments, computer system 600*a* displays graphical effect 624*a* in response to different gesture types. At computer system 600*b*, in response to detection of the double thumbs up gesture, computer system 600*b* displays graphical effect 624*b* in representation 604*b*. In some embodiments, graphical effect 624*b* can include any and/or all features of graphical effect 624*a* as described with respect to FIG. 6N.

At FIG. 6O, in response to detection of a double thumbs down gesture, computer system 600*a* displays graphical effect 626*a* in representation 606*a*. In some embodiments, graphical effect 626*a* includes displaying a simulated rain effect behind the participant performing the gesture (e.g., Isaac). In some embodiments, the simulated rain effect appears in front of the representation of the participant performing the gesture (e.g., Isaac). In some embodiments, graphical effect 626*a* (e.g., the simulated rain effect) interacts with the representation of the participant performing the gesture. In some embodiments, the simulated rain effect includes rain drops contacting (e.g., falling on) the participant performing the gesture. In some embodiments, the simulated lighting effect includes a simulated lighting effect causing the participant performing the gesture to be shown in an environment with decreased light (e.g., as if in a rainstorm). In some embodiments, graphical effect 626*a* is shown for a predetermined duration. In some embodiments, graphical effect 626*a* is displayed for as long as the double thumbs down gesture is detected. In some embodiments, graphical effect 626*a* fades away and computer system 600*a* ceases displaying graphical effect 626*a* after a predetermined time has elapsed after detection of the gesture (e.g., after the gesture is initially detected or after detection of an end of the gesture). In some embodiments computer system 600*a* displays graphical effect 626*a* in response to different gesture types. At computer system 600*b*, in response to detection of a double thumbs down gesture, computer system displays graphical effect 626*b* in representation 604*b*. In some embodiments, graphical effect 626 can include any or all features of graphical effect 626*a*.

At FIG. 6P, in response to detection of the participant associated with computer system 600*a* (e.g., Isaac) performing a peace sign (or victory sign) gesture, computer system 600*a* displays graphical effect 628*a* in representation 606*a*. Graphical effect 628*a* includes simulated confetti. In some embodiments, the peace sign gesture is performed with two hands. In some embodiments, the peace sign is performed with a single hand. In some embodiments, a portion of the simulated confetti is displayed as if the pieces of confetti are falling in front of the participant performing the peace sign gesture (e.g., some pieces of confetti block portions of the representation of Isaac's body and/or face) and a second portion of the confetti is displayed behind the participant performing the peace sign gesture (e.g., pieces of confetti are blocked by Isaac and/or his surroundings) in representation 606*a*. In some embodiments, graphical effect 628*a* is displayed for a predetermined duration. In some embodiments, graphical effect 628*a* is displayed for as long as the peace sign (or victory sign) gesture is detected. In some embodiments, graphical effect 628*a* fades away and computer system 600*a* ceases displaying graphical effect 628*a* after a predetermined time elapses after detection of the peace sign gesture. In some embodiments, computer system 600*a* displays graphical effect 628*a* in response to different gesture types. At computer system 600*b*, in response to detection of the peace sign gesture, computer system 600*b* displays graphical effect 628*b* in representation 604*b*. In some embodiments, graphical effect 628*b* can include any or all features of graphical effect 628*a* as described with respect to FIG. 6P.

At FIG. 6Q, after detection of the participant associated with computer system 600*a* (e.g., Isaac) performing the peace sign gesture, computer system 600*a* detects Isaac performing a wave gesture. In response to detecting the wave gesture, computer system 600*a* ceases displaying graphical effect 628*a* at the location corresponding to the location of the wave gesture in representation 606*a*. In some embodiments, graphical effect 628*a* fades away in the location corresponding to the wave gesture. In some embodiments, a portion of graphical effect 628*a* moves "off screen" in representation 606*a* as if being blown out of view by the wave gesture. At computer system 600*b*, in response to detection of the wave gesture, computer system 600*b* ceases displaying graphical effect 628*b* at the location corresponding to the wave gesture in representation 604*b*. In some embodiments, graphical effect 628*b* can include any or all features of graphical effect 628*a* as described with respect to FIG. 6Q.

In some embodiments, computer system 600*a* displays graphical effects (e.g., graphical effect 616*a*, graphical effect 618*a*, graphical effect 622*a*, graphical effect 624*a*, graphical effect 626*a*, and/or graphical effect 628*a*) at a location within representation 606*a* that corresponds to the location of the gesture within the field of view of the one or more camera sensors (e.g., the graphical effect is displayed at the same location relative to the representation of the participant performing gesture as the physical location of the gesture relative to the participant). For example, in response to computer system 600*a* detecting Isaac performing a wave gesture near Isaac's head, computer system 600*a* ceases displaying graphical effect 628*a* near Isaac's head in representation 606*a*. As another example, in response to computer system 600*a* detecting Isaac performing a wave gesture in front of Isaac's left shoulder, computer system 600*a* ceases displaying graphical effect 628*a* in front of Isaac's left shoulder in representation 606*a*.

In some embodiments, computer system 600*b* displays graphical effects (e.g., graphical effect 616*b*, graphical effect 618*b*, graphical effect 622*b*, graphical effect 624*b*, graphical effect 626*b*, and/or graphical effect 628*b*) at a location within representation 604*b* that corresponds to the location of the gesture within the field of view of the one or more camera sensors (e.g., the graphical effect is displayed at the same location relative to the representation of the participant performing gesture as the physical location of the gesture relative to the participant in the field of view of the one or more camera sensors).

At FIG. 6R, the participant associated with computer system 600*a* (e.g., Isaac) performs a gesture corresponding to a request to capture a screenshot and/or screen recording (e.g., a two-handed gesture forming a rectangle with an index finger and thumb of both hands). In response to detection of the gesture corresponding to the request to capture a screenshot and/or screen recording, computer system 600*a* displays user interface element 630*a* within user interface 602*a* and captures a screenshot and/or screen recording. In some embodiments, the screenshot and/or screen recording is captured after a delay (e.g., a countdown). User interface element 630*a* includes countdown timer 630*al* indicating the amount of time before the screenshot and/or screen recording is captured. In some embodiments, user interface element 630*a* includes a preview of the content to be captured before the screenshot and/or screen recording is taken. In some embodiments, user interface element 630*a* includes a representation of the captured content (e.g., a thumbnail of the screenshot and/or screen recording) after the screenshot and/or screen recording is captured. In some embodiments, the screen recording is recorded for a predetermined duration. In some embodiments, the screen shot and/or screen recording includes a representation of content that is shared in the communication session (e.g., a shared screen, a presentation, and/or shared media). In some embodiments, the screenshot and/or screen recording includes representation 604*a* and/or representation 604*b* (e.g., the representations of Isaac and/or Sam).

At computer 600*b*, in response to detection of the gesture corresponding to the request to capture a screenshot and/or screen recording, computer system 600*b* displays user interface element 630*b* (e.g., a representation of the screen shot and/or screen recording captured by computer system 600*a*) in user interface 602*b*. In some embodiments, the representation of the screen shot and/or screen recording displayed by computer system 600*b* can include any or all features of the screen shot and/or screen recording captured by computer system 600*a*. In some embodiments, user interface element 630*b* can include any or all features of user interface element 630*a* described with respect to FIG. 6R.

In some embodiments, graphical effects are not displayed if the gesture is within a predetermined distance of the participant's head (e.g., if the gesture obscures a portion of the participant's head and/or face). For example, at FIG. 6S, the participant associated with computer system 600*a* (e.g., Isaac) performs a thumbs up gesture within a predetermined distance of the participant's head (e.g., the same gesture as in FIG. 6G, but closer to the participant's face), and in response to detection of the thumbs up gesture, computer system 600*a* forgoes displaying a graphical effect (e.g., computer system 600*a* does not display graphical effect 618*a*). At computer system 600*b*, in response to detection of the gesture within a predetermined distance of the participant's own head, computer system 600*b* forgoes displaying a graphical effect (e.g., computer system 600*b* does not display graphical effect 618*b*).

In some embodiments, graphical effects are not displayed if the gesture is performed while the participant performing the gesture is not looking at the camera sensors and/or display generation component of the computer system. For example, at FIGS. 6T1 and 6T2, the participant associated with computer system 600*a* (e.g., Isaac) performs a thumbs up gesture (e.g., the same gesture as in FIG. 6G) while not looking at computer system 600*a* (e.g., computer system 600*a* does not detect Isaac's gaze 632*a* or computer system 600*a* detects that gaze 632*a* is not directed at computer system 600*a* and/or user interface 602*a*). In response to detection of a thumbs up gesture while gaze 632*a* of the participant performing the gesture is not detected, computer system 600*a* forgoes displaying a graphical effect (e.g., computer system 600*a* does not display graphical effect 618*a*). At computer system 600*b*, in response to gaze 632*a* not being detected while Isaac performs a thumbs up gesture, computer system 600*b* forgoes displaying a graphical effect (e.g., computer system 600*b* does not display graphical effect 618*b*).

In some embodiments, graphical effects are not displayed if the gesture is performed while the user interface of the real-time communication session is not displayed on the display component of the computer system. For example, at FIG. 6U, the participant associated with computer system 600*a* (e.g., Isaac) performs a thumbs up gesture while user interface 602*a* is not displayed on computer system 600*a*. For example, Isaac has minimized the user interface of the real-time communication session, Isaac is looking at another program, another window is on top of the real-time communication session interface, and/or Isaac is looking at an operating system window. In response to detection of a thumbs up gesture performed by the participant associated with computer system 600*a* while computer system 600*a* is not displaying user interface 602*a*, computer system 600*a* and computer system 600*b* forgo displaying graphical effects.

In some embodiments, graphical effects are not displayed if the computer system associated with the participant performing the gesture has muted audio input. For example, at FIG. 6V, the participant associated with computer system 600*a* (e.g., Isaac) performs a thumbs up gesture while a microphone that is in communication with computer system 600*a* (and that is used in the real-time communication session) is muted (e.g., not transmitting audio to computer system 600*b*). In response to detection of a thumbs up gesture while audio associated with computer system 600*a* is not being transmitted, computer system 600*a* and computer system 600*b* forgo displaying graphical effects.

At FIG. 6X, in response to detection of the participant associated with computer system 600*a* (e.g., Isaac) performing a peace sign gesture (e.g., with only one hand), computer system 600*a* displays graphical effect 636*a* in representation 606*a*. Graphical effect 636*a* includes simulated balloons. In some embodiments, graphical effect 636*a* includes a three-dimensional and/or depth effect in which different portions of graphical effect 634*a* appear to be at different depths. For example, a portion (e.g., 636*a*3) of the simulated balloons is displayed in front of the participant performing the peace sign gesture (e.g., some of the simulated balloons block portions of the representation of Isaac's body and/or face) and a second portion (e.g., 636*a*1) of the simulated balloons is displayed behind the participant performing the peace sign gesture (e.g., some of the simulated balloons are blocked by Isaac and/or his surroundings) in representation 606*a*. In some embodiments, one or more individual elements (e.g., balloons) of the simulated balloons includes a depth effect (e.g., appears rounded such that a center portion of the balloon protrudes from an edge of the balloon). In some embodiments, representation 606*a* includes a background effect (e.g., a blurred background). In some embodiments, the background effect is applied to portions of graphical effect 636*a* that are in the background (e.g., behind the participant performing the peace sign gesture). For example, in FIG. 6X, the background effect is applied to simulated balloon 636*al* (e.g., simulated balloon 636*al* is blurred relative to other portions of graphical effect 636*a*) because simulated balloon 636*al* is behind the participant performing the peace sign gesture. In some embodiments, graphical effect 636*a* is displayed with a color that is based on a color temperature of the representation 606*a* of the field of view of the one or more camera sensors (e.g., a color temperature of the scene in the field of view of the one or more camera sensors is applied to graphical effect 636*a* and/or a color of graphical effect 636*a* is matched with a color temperature of the representation 606*a* of the field of view of the one or more camera sensors). In some embodiments, graphical effect 636*a* is displayed for a predetermined duration. In some embodiments, graphical effect 636*a* is displayed for as long as the peace sign gesture is detected. In some embodiments, graphical effect 636*a* fades away and computer system 600*a* ceases displaying graphical effect 636*a* after a predetermined time elapses after detection of the peace sign gesture. In some embodiments, computer system 600*a* displays graphical effect 636*a* in response to different gesture types. At computer system 600*b*, in response to detection of the peace sign gesture, computer system 600*b* displays graphical effect 636*b* in representation 604*b*. In some embodiments, graphical effect 636*b* can include any or all features of graphical effect 636*a* as described with respect to FIG. 6Y (e.g., simulated balloon 636*b*3 is in front of representation 604*b* and simulated balloon 636*bl* is blurred and behind representation 604*b*).

At FIG. 6Y, a double horns up gesture (e.g., index and little fingers extended with middle and ring fingers folded on both hands) is performed by the participant associated with computer system 600*a* (e.g., Isaac), and in response to detection of the double horns up gesture, computer system 600*a* displays graphical effect 640*a* in representation 606*a*. Graphical effect 640*a* includes simulated laser beams emitted from behind the participant performing the gesture (e.g., Isaac) in representation 606*a* and pointed forward and to the sides of the participant. In some embodiments, graphical effect 640*a* interacts with a portion of the participant performing the gesture (e.g., Isaac's body). For example, in FIG. 6Y, simulated light from graphical effect 640*a* illuminates an edge of the participant performing the gesture and/or creates a simulated shadow on a portion of the participant performing the gesture (e.g., Isaac's body). In some embodiments, graphical effect 640*a* is shown for a predetermined duration. In some embodiments, graphical effect 640*a* is displayed for as long as the double horns up gesture is detected. In some embodiments, graphical effect 640*a* fades away and computer system 600*a* ceases displaying graphical effect 640*a* after a predetermined time has elapsed since detection of the gesture (e.g., after the gesture is initially detected or after detection of an end of the gesture). In some embodiments, computer system 600*a* displays graphical effect 640*a* in response to different gesture types. At computer system 600*b*, in response to detection of the double horns up gesture, computer system 600*b* displays graphical effect 640*b* in representation 604*b*. In some embodiments, graphical effect 640*b* can include any and/or all features of graphical effect 640*a* as described with respect to FIG. 6Y (e.g., simulated light from graphical effect 640*b* illuminates an edge of representation 604*b* and/or creates a simulated shadow on a portion of representation 604*b*).

FIG. 7A is a flow diagram illustrating a method for displaying graphical effects during a real-time communication session using a computer system (e.g., a smartphone, a desktop computer, a laptop, a tablet, a head-mounted device, a wearable device, and/or a smart watch) that is in communication with a display generation component (e.g., a display controller, a touch-sensitive display system, a projector, a head-mounted display, and/or a holographic display) in accordance with some embodiments. Method 700 is performed at a computer system (e.g., 100, 300, 500, 600*a*, 600*b*, 800*a*, 800*b*, 800*c*, 1000*a*, 1000*b*, and/or 1200*a*) that is in communication with a display generation component (e.g., 601*a* and/or 601*b*). Some operations in method 700 are, optionally, combined, the orders of some operations are, optionally, changed, and some operations are, optionally, omitted.

As described below, method 700 provides an intuitive way for displaying graphical effects during a real-time communication session. The method reduces the cognitive burden on a user for displaying graphical effects during a real-time communication session, thereby creating a more efficient human-machine interface. For battery-operated computing devices, enabling a user to display graphical effects during a real-time communication session faster and more efficiently conserves power and increases the time between battery charges.

In method 700, the computer system displays (702), via the display generation component, a representation (e.g., 602*a*, 602*b*, 606*a*, and/or 606*b*) (e.g., an image, a video feed, and/or a live preview) of a field of view of one or more camera sensors, wherein a person is visible in the representation of the field of view of the one or more camera sensors. While the representation of the field of view of the one or more camera sensors is displayed (704), a first gesture (e.g., a body gesture, a hand gesture, an air gesture, a thumbs up gesture, a thumbs down gesture, a victory sign gesture, a heart gesture, and/or a clapping gesture) performed by a first portion of a person is detected within the field of view of the one or more camera sensors (e.g., a portion of a person's body, a hand of the user, and/or both hands of the user). In response to detection of the first gesture performed by the first portion of the person (and, in some embodiments, in accordance with a determination that a set of criteria is met), the computer system displays (706), via the display generation component, a first graphical effect (e.g., 616*a*, 616*b*, 618*a*, 618*b*, 622*a*, 622*b*, 624*a*, 624*b*, 626*a*, 626*b*, 628*a*, and/or 628*b*) (e.g., one or more graphical elements, an animation, and/or a graphical representation of the first gesture, such as an emoji corresponding to the first gesture and/or an animation corresponding to the first gesture). In some embodiments, the computer system displays the graphical effect concurrently with (e.g., within) the representation (e.g., 602*a*, 602*b*, 606*a*, and/or 606*b*) of the field of view of the one or more camera sensors. In some embodiments, displaying the graphical effect includes displaying an animation corresponding to the first gesture (e.g., a fireworks animation, a confetti animation, rain falling, and/or clouds moving). In accordance with a determination (e.g., by the computer system and/or by an external computer system, such as a remote server or a computer system of a remote participant of a video communication session) that the first gesture is detected at a first gesture location (e.g., the thumbs up gesture is in front of the subject "Isaac" in FIG. 6G) in the field of view of the one or more camera sensors (e.g., a first location relative to the field of view of the one or more camera sensors, a first location relative to a portion of the user, and/or a first location relative to a physical environment or object within the physical environment), the computer system displays (708) the first graphical effect at a first effect location in the representation of the field of view of the one or more camera sensors (e.g., a first location on the display generation component, a first location in a user interface, a first location in the representation of the field of view of the one or more camera sensors, the first gesture location, and/or a first location relative to a displayed representation of the user). In some embodiments, the first graphical effect (e.g., the graphical effect that corresponds to the first gesture) is different from a movement of the first portion of the person that corresponds to the first gesture. In accordance with a determination that the first gesture is at a second gesture location (e.g., the thumbs up gesture is to the side of the subject "Isaac" in FIG. 6I) in the field of view of the one or more camera sensors (e.g., a second location relative to the field of view of the one or more camera sensors, a second location relative to a portion of the user, and/or a second location relative to a physical environment or object within the physical environment) that is different from the first gesture location, the computer system displays (710) the first graphical effect at a second effect location in the representation of the field of view of the one or more camera sensors that is different from the first effect location (e.g., a second location on the display generation component, a second location in a user interface, a second location in the representation of the field of view of the one or more camera sensors, the second gesture location, and/or a second location relative to a displayed representation of the user). Displaying a graphical effect in response detecting a gesture provides the user with a simple and efficient method of displaying graphical effects without the need to provide an input via touch-sensitive display, mouse, and/or a keyboard, which reduces the number of inputs needed to perform an operation and provides additional control options without cluttering the UI with additional displayed controls. In some embodiments, the graphical effect is displayed (e.g., with a representation of the field of view of the one or more camera sensors) by one or more other computer systems that are in a real-time video communication session with the computer system.

In some embodiments, while the representation (e.g., 604*a*, 606*a*, 604*b*, and/or 606*b*) of the field of view of the one or more camera sensors is displayed, a second gesture (e.g., a body gesture, a hand gesture, an air gesture, a thumbs up gesture, a thumbs down gesture, a victory sign gesture, a heart gesture, and/or a clapping gesture) is detected by the computer system within the field of view of the one or more camera sensors, wherein the second gesture is performed by (e.g., includes) the first portion (e.g., a first hand of a user) of the person and a second portion (e.g., a second hand of a user) of the person (in some embodiments, the first gesture does not include the second portion of the person). In response to detection of the second gesture performed by the first portion of the person and the second portion of a person, the computer system displays, via the display generation component, a second graphical effect (e.g., 622*a*, 622*b*, 624*a*, 624*b*, 626*a*, 626*b*, 628*a*, and/or 628*b*) (e.g., one or more graphical elements, an animation, and/or one or more graphical representations of the second gesture, such as an emoji corresponding to the second gesture, one or more emojis corresponding to the first portion of the user performing the gesture, one or more emojis corresponding to the second portion of the user performing the gesture, and/or an animation corresponding to the second gesture) that is different from the first graphical effect. Displaying a second graphical effect in response detecting a second gesture provides the user with a simple and efficient method of displaying graphical effects without the need to provide an input via touch-sensitive display, mouse, and/or a keyboard, which reduces the number of inputs needed to perform an operation and provides additional control options without cluttering the UI with additional displayed controls.

In some embodiments, in accordance with a determination that the second gesture includes the first portion of the person and the second portion of the person, the computer system displays, via the display generation component, the second graphical effect with a first visual appearance; and in accordance with a determination that the second gesture includes the first portion of the person and not the second portion of the person, the computer system displays, via the display generation component, the second graphical effect with a second visual appearance (e.g., the second graphical effect is different from the effect displayed when the gesture is performed by a single portion). In some embodiments, the second graphical effect includes the graphical effect displayed when the gesture is performed with a single portion of the person (e.g., the first portion of the person). In some embodiments, the computer system displays the second graphical effect concurrently with (e.g., within) the representation of the field of view of the one or more camera sensors. In some embodiments, displaying the second graphical effect includes displaying an animation corresponding to the second gesture (e.g., a fireworks animation, a confetti animation, rain falling, and/or clouds moving).

In some embodiments, the first gesture includes a thumbs up gesture performed by the first portion of the person (e.g., as illustrated by the thumbs up gesture performed by a single hand in FIG. 6G), and the second gesture includes a thumbs up gesture performed by the first portion of the person (e.g., a first hand of a user) and a thumbs up gesture performed by the second portion of the person (e.g., a second hand of a user) (e.g., as illustrated by the thumbs up gesture performed by two hands in FIG. 6M). Displaying the first graphical effect in response to detecting a thumbs up gesture performed by a first portion and displaying the second graphical effect in response to detecting a thumbs up gesture performed by the first portion and second portion provides the user with a simple and efficient method of displaying graphical effects without the need to provide an input via touch-sensitive display, mouse, and/or a keyboard, which reduces the number of inputs needed to perform an operation and provides additional control options without cluttering the UI with additional displayed controls.

In some embodiments, displaying the first graphical effect (e.g., 618*a*, 618*b*, 622*a*, 622*b*, 624*a*, 624*b*, 626*a*, 626*b*, 628*a*, and/or 628*b*) includes, in accordance with a determination that the first gesture is performed by a first type of body portion (e.g., a first hand of a person, a first arm of the person, and/or a first side of the person), the computer system displays, via the display generation component, the first graphical effect with a first characteristic (e.g., as illustrated by the right handed emoji and right handed thumbs up gesture in FIG. 6G) (e.g., a first orientation, a first graphical object, a first animation, and/or an effect oriented to match the first portion type of the person performing the gesture). In accordance with a determination that the first gesture is performed by a second type of body portion (e.g., a second hand of a person, a second arm of the person, and/or a second side of the person), the computer system displays, via the display generation component, the first graphical effect with a second characteristic (e.g., as illustrated by the left handed emoji and left handed thumbs up gesture in FIG. 6J) (e.g., a second orientation, a second graphical object, a second animation, and/or an effect oriented to match the second portion type of the person performing the gesture) that is different from the first characteristic (e.g., an effect oriented to match the portion of the body performing the gesture). Displaying a graphical effect with a first characteristic or a second characteristic in response detecting a gesture performed by a first portion type or a second portion type provides the user with a simple and efficient method displaying different graphical effects and variations of a graphical effect without the need to provide an input via touch-sensitive display, mouse, and/or a keyboard, which reduces the number of inputs needed to performing to perform an operation and provides additional control options without cluttering the UI with additional displayed controls.

In some embodiments, the first type of body portion is a right hand, and the first characteristic is a right-hand emoji (e.g., a graphical representation of a right hand) (e.g., as illustrated in FIG. 6G) and the second type of body portion is a left hand and the second characteristic is a left-hand emoji (e.g., as illustrated in FIG. 6J) (e.g., a graphical representation of a left hand).

In some embodiments, while the representation (e.g., 604*a*, 606*a*, 604*b*, and/or 606*b*) of the field of view of the one or more camera sensors is displayed, (e.g., and while displaying the first graphical effect and/or while the first gesture is detected) a second gesture (e.g., a body gesture, a hand gesture, an air gesture, a thumbs up gesture, a thumbs down gesture, a victory sign gesture, a heart gesture, and/or a clapping gesture) performed by a second portion of the person (e.g., that is different from the first portion of the person) is detected within the field of view of the one or more camera sensors (e.g., a portion of a person's body, a hand of the user, and/or both hands of the user). In response to detection of the second gesture performed by the second portion of the person, the computer system displays (e.g., concurrently with the first graphical effect), via the display generation component, a second graphical effect that is different from the first graphical effect (e.g., 622*a*, and/or 622*b*) (e.g., one or more graphical elements, an animation, and/or a graphical representation of the first gesture, such as an emoji corresponding to the first gesture and/or an animation corresponding to the first gesture). Displaying a graphical effect in response detecting a second gesture provides the user with a simple and efficient method for displaying different graphical effects and variations of a graphical effect without the need to provide an input via touch-sensitive display, mouse, and/or keyboard, which reduces the number of inputs needed to perform an operation and provides additional control options without cluttering the UI with additional displayed controls.

In some embodiments, the computer system displays the second graphical effect concurrently with (e.g., within) the representation of the field of view of the one or more camera sensors. In some embodiments, displaying the second graphical effect includes displaying an animation corresponding to the second gesture (e.g., a fireworks animation, a confetti animation, rain falling, and/or clouds moving). In some embodiments the second gesture is detected while the first gesture is detected. In some embodiments the second graphical effect is displayed concurrently with the first graphical effect (e.g., while both gestures are detected).

In some embodiments, displaying the first graphical effect and displaying the second graphical effect includes beginning display of the first graphical effect within a predetermined time interval of beginning display of the second graphical effect (e.g., beginning display of graphical effect 618*a* and/or 618*b* as illustrated in FIG. 6G and graphical effect 618*a* and/or 618*b* as illustrated in FIG. 6J within a predetermined time interval) (e.g., at substantially the same time) (e.g., the first gesture and the second gesture are performed at the same time). Beginning display of the first graphical effect and beginning display of the second graphical effect within a predetermined time interval provides the user with feedback that both gestures have been detected even if they are close together in time, thereby providing the user with improved visual feedback. In some embodiments the first gesture and the second gesture end at the same time. In some embodiments the first graphical effect and the second graphical effect end at the same time. In some embodiments the first gesture and the second gesture do not end at the same time. In some embodiments the first graphical effect and the second graphical effect do not end at the same time.

In some embodiments, displaying the second graphical effect includes beginning display of the second graphical effect after beginning display of the first graphical effect (e.g., beginning display of graphical effect 618*a* and/or 618*b* as illustrated in FIG. 6G after beginning display of graphical effect 618*a* and/or 618*b* as illustrated in FIG. 6J) (e.g., if the second gesture is detected after the first gesture is detected). Beginning display of the second graphical effect after beginning display of the first graphical effect provides the user with feedback that the gestures were detected sequentially (one after the other), thereby providing the user with improved visual feedback.

In some embodiments, displaying the first graphical effect includes, in accordance with a determination that the first gesture is of a first gesture type (e.g., a first gesture, a thumbs up gesture, a thumbs down gesture, gestures performed with a left hand, gestures performed with a right hand, gestures performed with a single hand, and/or gestures performed with two hands), the computer system displaying, via the display generation component, the first graphical effect with a first visual appearance (e.g., 618*a*, and/or 618*b*) (e.g., one or more graphical elements, an animation, and/or a graphical representation of the first gesture, such as an emoji corresponding to the first gesture and/or an animation corresponding to the first gesture). In accordance with a determination that the first gesture is of a second gesture type (e.g., a second gesture, a thumbs up gesture, a thumbs down gesture, gestures performed with a single hand, and/or gestures performed with two hands), the computer system displays, via the display generation component, the first graphical effect with a second visual appearance that is different from the first graphical appearance (e.g., 622*a*, 622*b*, 624*a*, 624*b*, 626*a*, 626*b*, 628*a*, and/or 628*b*). Displaying a first graphical effect with a first visual appearance in response detecting that the first gesture is of a first gesture type, and displaying the first graphical effect with a second visual effect in response to detecting that the first gesture is of a second gesture type, provides the user with a simple and efficient method for displaying different graphical effects and variations of a graphical effect without the need to provide an input via touch-sensitive display, mouse, and/or a keyboard, which reduces the number of inputs needed to performing to perform an operation and provides additional control options without cluttering the UI with additional displayed controls. In some embodiments, displaying the second graphical effect includes displaying an animation corresponding to the first gesture (e.g., a fireworks animation, a confetti animation, rain falling, and/or clouds moving).

In some embodiments, the computer system displays, via the display generation component, the first graphical effect (e.g., 618*a*, 618*b*, 622*a*, and/or 622*b*) including displaying a sequence of effects, including a first sequence effect and a second sequence effect (e.g., two or more emojis, one or more first effects followed by one or more second effects, and/or effects continually appear). In some embodiments, the effects continually appear at a location on the display corresponding to the location of the gesture and move to a second location. In some embodiments, the effects move to an edge of the display and cease to be displayed when they reach the edge of the display. In some embodiments, the sequence of effects includes a sequence of graphical elements, a sequence of animations, and/or sequence of a graphical representation of the first gesture.

In some embodiments, while the first gesture performed by the first portion of the person is detected within the field of view of the one or more camera sensors, the computer system detects movement by the first portion of the person from a first location to a second location (e.g., the subject Isaac moves his hand from in front of his body to the right of his body while performing a thumbs up gesture as illustrated in FIGS. 6G-6I) (e.g., movement from a first gesture location to a second gesture location and/or back and forth movement) within the field of view of the one or more camera sensors (e.g., a portion of a person's body, a hand of the user, and/or both hands of the user). In response to detection of movement by the first portion of the person, the computer system displays, via the display generation component, the first sequence effect (e.g., graphical effect 618*b* and/or 618*a* is displayed at the first location as illustrated in FIG. 6G) at a first display location within the representation of the field view of the one or more camera sensors corresponding to the first location and the second sequence effect (e.g., graphical effect 618*b* and/or 618*a* is displayed at the first location as illustrated in FIG. 6H) at a second display location within the representation of the field view of the one or more camera sensors corresponding to the second location (e.g., as the person's hand moves, the location of the graphical effect on the display generation component also moves, matching the movement and location of the person's hand). Displaying the first sequence effect at a first display location and displaying the second sequence effect at a second display location in response to detecting movement by the first portion, provides the user with feedback that the gesture is still being detected while the gesture is moving, thereby providing the user with improved visual feedback.

In some embodiments, displaying the first graphical effect (e.g., 624*a*, 624*b*, 626*a*, 626*b*, 628*a*, and/or 628*b*) includes displaying the first graphical effect such that a portion of the first graphical effect is obscured by at least a portion of a representation of the person (e.g., 604*a*, 604*b*, 606*a*, and/or 616*b*) in the representation of the field of view of the one or more camera sensors (e.g., the effect is displayed as if the effect is behind at least a portion of the person performing the gesture and/or the graphical effect does not obscure a portion of the person performing the gesture). Displaying the first graphical effect such that a portion of the first graphical effect is obscured by at least a portion of a representation of the person enables the computer system to distinguish for the user the representation of the person in the representation of the field of view of the one or more camera sensors from the first graphical effect, thereby providing the user with improved visual feedback.

In some embodiments, displaying the first graphical effect includes (e.g., 618*a*, and/or 618*b*), in accordance with a determination that the first gesture is detected with a first orientation (e.g., as illustrated in FIG. 6I the hand performing the gesture is fully upright with the back of the hand facing the one or more camera sensors) (e.g., the angle of the hand performing the gesture and/or side of the hand) within the field of view of the one or more camera sensors, the computer system displays, via the display generation component, the first graphical effect in a first effect orientation corresponding to the first orientation. In accordance with a determination that the first gesture is detected with a second orientation (e.g., as illustrated in FIG. 6J the hand performing the gesture is angled to one side; and/or as illustrated in FIG. 6H the hand performing the gesture has the palm of the hand towards the one or more camera sensors) (e.g., the angle of the hand performing the gesture and/or side of the hand) within the field of view of the one or more camera sensors that is different from the first orientation, the computer system displays, via the display generation component, the first graphical effect in a second effect orientation corresponding to the second orientation that is different from the first effect orientation. Displaying a first graphical effect with a first effect orientation in response detecting that the first gesture with a first orientation, and displaying the first graphical effect with a second effect orientation in response to detecting that the first gesture with a second orientation, provides the user with a simple and efficient method for displaying different graphical effects and variations of a graphical effect without the need to provide an input via touch-sensitive display, mouse, and/or a keyboard and provides the user with feedback that the gesture is at a particular orientation, which reduces the number of inputs needed to performing to perform an operation, provides additional control options without cluttering the UI with additional displayed controls, and provides improved visual feedback.

In some embodiments the orientation of the first gestured is based on the position of the fingers and/or palm in space with respect to the field of view of the one or more camera sensors, for example whether the thumb is pointing directly up, slightly to the side, forward, and/or back while performing a thumbs up gesture. In some embodiments the orientation of the first gesture is based on which side of the body of the person is detected within the field of view of the one or more camera sensors (e.g., palm or back of a hand directed to the camera while performing the first gesture).

In some embodiments, displaying the first graphical effect includes displaying an animation that is based on movement of the first portion of the person (e.g., the subject Isaac moves his hand from in front him to the right of his body while performing a thumbs up gesture as illustrated in FIGS. 6G-6I). Displaying an animation that is based on movement of the first portion of the person provides the user with feedback that the gesture is still being detected while the gesture is moving, thereby providing the user with improved visual feedback. In some embodiments, a movement of the first portion of the person is detected. In some embodiments, displaying the first graphical effect includes: in accordance with a determination that the movement has a first characteristic (e.g., speed, direction, and/or pattern), displaying a first animation; and in accordance with a determination that the movement has a second characteristic that is different from the first characteristic, displaying a second animation that is different from the first animation. In some embodiments, a speed, direction, magnitude, and/or quantity of the animation (e.g., a number of graphical objects that are included in the animation and/or a velocity of one or more graphical objects that are included in the animation) is based on one or more characteristics of the movement of the person.

In some embodiments, displaying the animation includes displaying the animation based on a speed of the movement of the first portion of the person (e.g., the subject Isaac moves his hand from in front him to the right of his body while performing a thumbs up gesture as illustrated in FIGS. 6G-6I) (e.g., the first graphical effect includes movement that is based on the speed of the movement of the first portion of the person). Displaying the animation based on a speed of the movement of the first portion of the person provides the user with feedback that the gesture is still being detected while the gesture is moving, thereby providing the user with improved feedback. In some embodiments, in accordance with a determination that the movement of the first portion of the user has a first speed, the first graphical effect has a first movement; and in accordance with a determination that the movement of the first portion of the user has a second speed that is different from the first speed, the first graphical effect has a second movement that is different from the first movement.

In some embodiments, while displaying the first graphical effect, a second gesture (e.g., the waving gesture as illustrated in FIG. 6Q) (e.g., a movement, a waving gesture, a dismal gesture, an air gesture, a thumbs up gesture, a thumbs down gesture, a victory sign gesture, a heart gesture, and/or a clapping gesture) performed by a third portion (e.g., the first portion, the second portion, or a portion different from the first portion and the second portion) of the person is detected by the computer system within the field of view of the one or more camera sensors. In response to detecting the second gesture, the computer system changes a state of the first graphical effect (e.g., portions of confetti are no longer displayed in the vicinity of the waving gesture as illustrated in FIG. 6Q) (e.g., changing a location of at least a portion of the first graphical effect and/or ceasing to display at least a portion the first graphical effect). Changing the state of the first graphical effect in response to detecting the second gesture provides the user with feedback that the second gesture has been detected and provides an efficient method for changing a graphical effect after it has been displayed, thereby providing the user with improved feedback, and providing additional control options without cluttering the UI with additional displayed controls.

In some embodiments, changing the state of the first graphical effect includes moving at least a portion of the first graphical effect to different location in the representation of the field of view of the one or more camera sensors (e.g., without moving and/or changing a direction of at least a portion of the first graphical effect). In some embodiments, changing the state of the first graphical effect includes moving the first graphical effect to an edge of a display and then moving at least a portion of the first graphical effect off the display. In some embodiments, changing the state of the first graphical effect includes moving at least a portion of the first graphical effect that is within a threshold distance (e.g., at the location) of the second gesture.

In some embodiments, the representation (e.g., 604a, 604b, 606a, and/or 606b) of the field of view of one or more camera sensors is included (e.g., transmitted and/or shared) in a real-time (e.g., real-time video and/or audio) communication session (e.g., in a real-time communication session application). Displaying a graphical effect in response detecting a gesture provides the user with a simple and efficient method of displaying graphical effects during a real-time communication session without the need to provide an input via touch-sensitive display, mouse, and/or a keyboard or interact with a menu interface that might obscure a participant in the communication session, which reduces the number of inputs needed to perform an operation and provides additional control options without cluttering the UI with additional displayed controls.

In some embodiments, the representation of the field of view of the one or more camera sensors includes a representation (e.g., a badge) of a first participant in the real-time communication session (e.g., 604a, 604b, 606a, and/or 606b) (e.g., in a view of a participant of the real-time communication session associated with the computer system and/or in a view of a participant of the real-time communication session associated with a remote computer system). Displaying a representation of a first participant in the real-time communication session provides the user with feedback that the user is in a real-time communication session and provides feedback that a graphical effect has been displayed, thereby providing the user with improved feedback.

In some embodiments, while the representation of the field of view of the one or more camera sensors is displayed, in accordance with a determination that the first portion of the person is being tracked (e.g., the location, position, and/or current shape of the portion is detected and/or monitored by the computer system), the computer system displays, via the display generation component, a hint user interface element (e.g., 608a, and/or 608b) that indicates that a graphical effect can be displayed in response to a gesture performed by the first portion of a person. In accordance with a determination that the first portion of a person is not being tracked (e.g., the location, position, and/or current shape of the portion is not detected and/or monitored by the computer system), the computer system forgoes displaying the hint user interface element that indicates that a graphical effect can be displayed in response to a gesture performed by the first portion of the person. Displaying a hint user interface element in response to a gesture performed by the first portion of a person in accordance with a determination that the first portion of the person is being tracked and forgoing display of the hint user interface element in accordance with a determination that the first portion of a person is not being tracked provides the user with feedback that certain body parts are being tracked and can be used to display graphical effects without the need to interact with a menu interface, thereby providing improved feedback and performing an operation when a set of conditions has been met without requiring further user input. In some embodiments, the hint user interface element includes highlighting the portion of the person that can be used to trigger a graphical effect. In some embodiments, the hint user interface element includes text that indicates that a graphical effect can be displayed in response to a gesture performed by the first portion of the person.

In some embodiments, displaying the hint user interface element (e.g., 608a, and/or 608b) includes displaying the hint user interface element at a first hint location (e.g., as illustrated in FIG. 6B) (e.g., in a user interface and/or within the representation of the field of view of the one or more camera sensors). In some embodiments, movement of the first portion of the person is detected by the computer system. In response to the movement of the first portion of the person being detected, the computer system displays, via the display generation component, the hint user interface element at a second position that is different from the first position (e.g., as illustrated in FIG. 6C) (e.g., based on the movement and/or change in position of the first portion of the person). Displaying the hint user interface element at a first hint location and displaying the hint user interface element at a second hint location in response to detecting movement of the first portion provides the user with feedback that certain body parts are being tracked and can be used to display graphical effects, thereby providing improved feedback. In some embodiments, the hint user interface element moves with the first portion of the user.

In some embodiments, while displaying the representation of the field of view of the one or more camera sensors, the hint user interface element (e.g., 608b) is not displayed in a representation of the person (e.g., a representation of the field of view of the one or more camera sensors or other representation of the person in a real-time communication session interface and/or application) displayed on a remote computer system (e.g., 600b) (e.g., the hint user interface element is displayed by the computer system of the person that is detected to be making the first gesture and is not displayed by the computer system of other participants in a real-time communication session). Forgoing displaying the hint user interface element in a representation of the person displayed on a remote computer system provides the user associated with the remote computer system with an uncluttered user interface as the user associated with the remote computer system has not initiated the display of the hint user interface element, thereby providing the user with additional control options without cluttering the user interface with additional displayed control. In some embodiments, in accordance with a determination that the first gesture is performed by a first participant in the real-time communication session, the hint user interface element is displayed on a display generation component in communication with a computer system associated with the first participant without the hint user interface element being displayed on computer systems not associated with the first participant.

In some embodiments, the hint user interface element (e.g., 608a, and/or 608b) is displayed on one or more display generation components in communication with one or more computer systems (e.g., 600a, and/or 600b) that are in communication (e.g., with the computer system) via a real-time communication session (e.g., the hint user interface element is displayed on two or more (e.g., all) of the computer systems participating in the real time communication session; e.g., the hint is shown to users that are not detected to be performing the first gesture). Displaying the hint user interface element on one or more display generation components in communication with one or more computer systems provides the user with feedback that certain body parts are being tracked and can be used to display graphical effects even when a particular user has not performed any actions or gestures, thereby performing an operation when a set of conditions has been met without requiring further user input.

In some embodiments, in response to detection of the first gesture performed by the first portion of the person, and in accordance with a determination that a set of criteria is met, the computer system displays, via the display generation component (and, in some embodiments, concurrently with displaying the first graphical effect), a cancel option (e.g., a selectable user interface object, button, icon, affordance) (e.g., 620*a*) that, when selected, disables displaying graphical effects in response to a detected gesture (e.g., causes the computer system to not display the first graphical effect in response to detection of the first gesture performed by the first portion of the person). Displaying a cancel option that disables displaying graphical effects in response to detection of the first gesture performed by the first portion of the person and in accordance with a determination that a set of criteria is met, provides the user with quick and efficient ability to disable graphical effects if displaying graphical effects is not a desired feature, and without the need to access additional menu items, thereby reducing the number of inputs needed to perform an operation. In some embodiments, the computer system detects selection of (e.g., a tap or other selection input directed to) the cancel option; and in response to detecting selection of the cancel option, the computer system disables displaying graphical effect in response to a detected gesture. In some embodiments, the cancel option is displayed to all users. In some embodiments the cancel option is displayed only to the user who triggered the effect. In some embodiments, selecting the cancel option stops the display of effects in response to detecting a gesture for all participants. In some embodiments, selecting the cancel option stops the display of effects in response to detecting a gesture only for the user who selected the cancel option. In some embodiments display generation component ceases displaying the cancel option after a predetermined period of time if no selection is made (e.g., if no input is detected corresponding to yes or no).

In some embodiments, the set of criteria is met when a number of times that the first graphical effect has been displayed (e.g., in response to detection of the first gesture performed by the first portion of the person) satisfies (e.g., is less than or is less than or equal to) a (e.g., predetermined) threshold number of times (e.g., the cancel option is displayed the first N times that the first gesture is detected). In accordance with a determination that the set of criteria is not met (e.g., that the number of times that the first graphical effect has been displayed does not satisfy (e.g., is equal to or greater than, or is greater than) the threshold number of times), the computer system forgoes displaying the cancel option (e.g., 620*a*).

In some embodiments, the computer system detects an input (e.g., 614*a*) (e.g., an input that is different from the first gesture) corresponding to a request to display the first graphical effect (e.g., 616*a*, and/or 616*b*) (e.g., selection of a user interface element corresponding to the first graphical effect, such as an option in a menu that includes one or more selectable options corresponding to respective graphical effects). In response to detecting the input corresponding to the request to display the first graphical effect, the computer system displays, via the display generation component, the first graphical effect and the computer system displays, via the display generation component (and, in some embodiments, concurrently with the first graphical effect), a graphical indication (e.g., 613*a*) that indicates a manner in which the first graphical effect can be displayed in response to a gesture (e.g., a video demonstrating how the gesture can be performed and/or a diagram demonstrating how a gesture can be performed). In some embodiments, the graphical indication is overlaid on the representation of the field of view of the one or more camera sensors. Displaying a graphical indication that indicates a manner in which first graphical effect can be displayed in response to detecting the input corresponding to a request to display the first graphical effect provides the user with improved feedback that the gesture can be used to trigger the first graphical effect without foreknowledge or requiring further user input to display the graphical indication, thereby reducing the number of inputs needed to perform an operation and performing an operation when a set of conditions has been met without requiring further user input.

In some embodiments, while the representation of the field of view of the one or more camera sensors is displayed, a second gesture (e.g., the square gesture as illustrated in FIG. 6R) (e.g., a body gesture, a hand gesture, an air gesture, a thumbs up gesture, a thumbs down gesture, a victory sign gesture, a heart gesture, and/or a clapping gesture) performed by a second portion of a person (e.g., the first portion of the person or a portion of the person that is different from the first portion of the person) is detected within the field of view of the one or more camera sensors (e.g., a portion of a person's body, a hand of the user, and/or both hands of the user). In response to detection of the second gesture performed by the second portion of the person (and, in some embodiments, in accordance with a determination that the second gesture is a respective gesture type), the computer system initiates a process for saving (e.g., to memory in communication with the computer system, such as local or network memory storage) an image (e.g., thumbnail 630*a* and/or thumbnail 630*b* as illustrated in FIG. 6R) (e.g., the representation of the field of view of the one or more camera sensors, a screen capture, and/or a screen recording). Initiating a process for saving an image in response to detection of the second gesture performed by the second portion of the person provides the user with an efficient way to save an image without the need for additional user interface elements, thereby providing additional control options without cluttering the UI with additional displayed controls.

In some embodiments, while displaying the first graphical effect (or, in some embodiments, displaying the first graphical effect includes), the computer system displays, via the display generation component, a simulated lighting effect (e.g., the back and edges of the subject performing the gesture (Isaac) are illuminated and the a portion of the front of the subject is covered in shadow as illustrated in FIG. 6N) on a representation of the person (e.g., 604*a*, 606*a*, 604*b*, and/or 606*b*) (e.g., an image of the person within the field of view of the one or more camera sensors). Displaying a simulated lighting effect on a representation of the person while displaying the first graphical effect, provides the user with a more visually distinctive graphical effect and provides the user with feedback the first gesture has been detected, thereby providing the user with improved feedback. In some embodiments, displaying the simulated lighting effect includes applying an illumination effect to a third portion of the person and applying a shadow effect to a fourth portion of the person. In some embodiments, the simulated lighting effect includes an effect (e.g., a fireworks effect) that illuminates a portion of the representation of the person (e.g., a head, shoulders, a side of the person's body, and/or an edge of the person's body) while casting a shadow on one or more other portions of the representation of the person. In some embodiments, the simulated lighting effect includes a rain effect that casts a shadow on the representation of the person, and/or a confetti effect that casts small shadows across the representation of the person.

In some embodiments, while the representation of the field of view of the one or more camera sensors is displayed, a second gesture (e.g., a body gesture, a hand gesture, an air gesture, a thumbs up gesture, a thumbs down gesture, a victory sign gesture, a heart gesture, and/or a clapping gesture) performed by a second portion of the person (e.g., the first portion of a person or a portion of the person that is different from the first portion of the person) is detected within the field of view of the one or more camera sensors (e.g., a portion of a person's body, a hand of the user, and/or both hands of the user). In response to detection of a second gesture performed by the second portion of the person, and in accordance with a determination that displaying a graphical effect in response to detection of a gesture is disabled, the computer system displays, via the display generation component, a prompt (e.g., 610) (e.g., instructions and/or a selectable option) to enable display of graphical effects in response to a detected gesture and forgoes display of a second graphical effect. In accordance with a determination that displaying a graphical effect in response to detection of a gesture is enabled, the computer system displays a second graphical effect corresponding to the second gesture. Displaying a prompt to enable display of graphical effects in response to a detected gesture and forgoing display of a second graphical effect in response to detection of a second gesture and in accordance with a determination that displaying a graphical effect in response to detection of a gesture is disabled provides the an efficient technique for displaying graphical effects in response to a detected gesture without the need to open additional menus or options, thereby reducing the number of inputs needed to perform an operation.

In some embodiments, displaying the first graphical effect includes displaying the first graphical effect having a depth effect (e.g., as described for 634*a* in FIG. 6W and/or 636*a* in FIG. 6X). ISE, displaying the first graphical effect having a depth effect includes displaying a first portion of the first graphical effect at a first depth (e.g., in front of the person or a representation of the person) and displaying a second portion of the first graphical effect at a second depth (e.g., behind the person or the representation of the person) that is different from the first depth. ISE, displaying the first graphical effect having the depth effect includes displaying the first graphical effect at a first depth at a first time and displaying the first graphical effect at a second depth that is different from the first depth at a second time that is different from the first time. In some embodiments, displaying the representation (e.g., 606*a* and/or 602*b*) of the field of view of the one or more camera sensors includes displaying a representation (e.g., 606*a* and/or 604*b*) of the person and a representation of a background behind the representation of the person, including applying a visual effect (e.g., a blurring effect, a portrait effect, lighting effect, reduced definition, and/or out of focus) to the representation of the background and to a portion of the first graphical effect that is behind the representation of the person (e.g., as described for 636*a* in FIG. 6X). ISE, the first graphical effect moves from a foreground (e.g., in front of the representation of the person) to the background (e.g., behind the representation of the person), and the computer system applies the visual effect to the first graphical effect (e.g., blurs the first graphical effect, reduces the definition of the first graphical effect, and/or displays the first graphical effect out of focus) when the first graphical effect is displayed in (e.g., moves to) the background.

In some embodiments, displaying the first graphical effect includes displaying the first graphical effect having a color that is based on (e.g., similar to or the same as) a color temperature of the representation of the field of view of the one or more camera sensors (e.g., the computer system applies a color temperature of the scene in the field of view of the one or more camera sensors to the first graphical effect; and/or the computer system matches a color of the first graphical effect with a color temperature of the representation of the field of view of the one or more camera sensors) (e.g., as described for 636*a* in FIG. 6X).

Note that details of the processes described above with respect to method 700 (e.g., FIG. 7A) are also applicable in an analogous manner to the methods described below. For example, method 750 optionally includes one or more of the characteristics of the various methods described above with reference to method 700. For example, method 750 optionally displays a hint that graphical effects can be displayed in response to gestures when the first set of criteria is not met. As another example, method 900 optionally includes one or more of the characteristics of the various methods described above with reference to method 700. For example, method 900 optionally displays a graphical effect in response to detecting a gesture while a computer system is sharing content associated with a participant. As another example, method 1100 optionally includes one or more characteristics of the various methods described above with reference to method 700. For example, method 1100 optionally displays a hint for displaying graphical effects in both the first application and the second application. As another example, method 1300 optionally includes one or more characteristics of the various methods described above with reference to method 700. For example, method 1300 optionally displays a graphical effect in response to detecting a gesture while a representation of a subject is framed by a computer system. For brevity, these details are not repeated below.

FIG. 7B is a flow diagram illustrating a method for displaying graphical effects during a real-time communication session using a computer system in accordance with some embodiments. Method 750 is performed at a computer system (e.g., 100, 300, 500, 600*a*, 600*b*, 800*a*, 800*b*, 800*c*, 1000*a*, 1000*b* and/or 1200*a*) that is in communication with a display generation component (e.g., 601*a*, and/or 601*b*). Some operations in method 750 are, optionally, combined, the orders of some operations are, optionally, changed, and some operations are, optionally, omitted.

As described below, method 750 provides an intuitive way for displaying graphical effects during a real-time communication session. The method reduces the cognitive burden on a user for displaying graphical effects during a real-time communication session, thereby creating a more efficient human-machine interface. For battery-operated computing devices, enabling a user to display graphical effects during a real-time communication session faster and more efficiently conserves power and increases the time between battery charges.

In method 750, the computer system displays (752), via the display generation component, a representation (e.g., 602*a*, 602*b*, 606*a*, and/or 606*b*) (e.g., an image, a video feed, and/or a live preview) of a field of view of one or more camera sensors, wherein a person is visible in the representation of the field of view of the one or more camera sensors. While the representation of the field of view of the one or more camera sensors is displayed (754), a first gesture (e.g., a body gesture, a hand gesture, an air gesture, a thumbs up gesture, a thumbs down gesture, a victory sign gesture, a heart gesture, and/or a clapping gesture) performed by a first portion of a person is detected within the field of view of the one or more camera sensors (e.g., a portion of a user's body, a hand of the user, and/or both hands of the user). In response to detection (756) of the first gesture performed by the first portion of the person, and in accordance with a determination (758) that a first set of criteria is met, the computer system displays, via the display generation component, a graphical effect that corresponds to the first gesture in the representation of the field of view of the one or more camera sensors (e.g., 618*a*, 618*b*, 622*a*, 622*b*, 624*a*, 624*b*, 626*a*, 626*b*, 628*a*, and/or 628*b*). In some embodiments, the computer system displays the graphical effect concurrently with (e.g., within) the representation of the field of view of the one or more camera sensors. In some embodiments, displaying the graphical effect includes displaying an animation corresponding to the first gesture (e.g., a fireworks animation, a confetti animation, rain falling, and/or clouds moving). In some embodiments, the graphical effect is displayed (e.g., with a representation of the field of view of the one or more camera sensors) by one or more other computer systems that are in a real-time video communication session with the computer system. In accordance with a determination (760) that the first set of criteria is not met, the computer system forgoes displaying the graphical effect that corresponds to the first gesture in the representation of the field of view of the one or more camera sensors (e.g., no graphical effect is displayed in response to detecting a gesture as illustrated in FIGS. 6F and 6S-6V) (e.g., displaying the representation of the field of view of the one or more camera sensors without displaying the graphical effect). Displaying the graphical effect in response to detection of the first gesture in accordance with a determination that a first set of criteria is met, and forgoing displaying the graphical effect in response to detection of the first gesture in accordance with a determination that the first set of criteria is not met indicates to the user that the user has successfully met the criteria required to display the graphical effect and allows the user to initiate the effect to be displayed without having to navigate a user interface, and requiring that the first set of criteria be met reduces mistakes by preventing unintentional display of the effect, thereby providing improved visual feedback and reducing the number of inputs needed to perform an operation.

In some embodiments, the first set of criteria includes a location criterion that is met (e.g., the first gesture will trigger a graphical effect and/or the first gesture will be displayed) when a location of the first portion of the person relative to a location of a second portion of the person (e.g., a second portion of a user's body, a head of a user, a face of a user, a hand of the user, and/or both hands of the user) satisfies a set of location criteria (e.g., a criteria that a hand performing a gesture is not in front of the face of the person performing the gesture, as illustrated in FIG. 6S). Displaying the graphical effect in response to detection of the first gesture in accordance with a determination that a first set of criteria is met, including a location criterion that is met, provides the ability to initiate the display of a graphical effect displayed without navigating a user interface, and requiring that the location criterion be met reduces mistakes by preventing unintentional display of the effect, thereby providing improved visual feedback and reducing the number of inputs needed to perform an operation. In some embodiments, the first set of criteria is based on the location of the first portion of the person relative to the second portion of the person. In some embodiments, the location criterion is met when the first portion of the person is in a first location relative to the second portion of the person (and the computer system displays the graphical effect); and the location criterion is not met when the first portion of the person is in a second location (that is different from the first location) relative to the second portion of the person (and the computer system foregoes display of the graphical effect). In some embodiments the location criterion is not met if the first portion of the person is within a threshold distance of a second portion such as the user's face, body, and/or the user's other hands.

In some embodiments, the first portion of the person is a hand of the person, the second portion of the person is a face of the person, and the first set of criteria is not met when the hand of the person is on the face of the person (e.g., as illustrated in FIG. 6S). Forgoing displaying the graphical effect in response to detection of the first gesture in accordance with a determination that the first set of criteria is not met, including a first set of criteria is not met when the hand of the person is on the face of the person enables the user to initiate the effect to be displayed without having to navigate a user interface, and requiring that the location criterion be met reduces mistakes by preventing unintentional display of the effect, thereby providing additional control options without cluttering the UI with additional displayed controls and reducing the number of inputs needed to perform an operation.

In some embodiments, the first set of criteria includes a duration criterion that is met when a duration (e.g., a continuous duration or a cumulative duration) of the first gesture satisfies (e.g., is greater than, or is greater than or equal to) a threshold duration (e.g., no graphical effect is displayed if the threshold duration is not satisfied as illustrated in FIG. 6F). In some embodiments, the computer system does not display the graphical effect (e.g., the first gesture is ignored) if the duration of the first gesture is less than the threshold duration. Displaying the graphical effect in response to detection of the first gesture in accordance with a determination that a first set of criteria is met, including a duration criterion, provides the user with a method to initiate display of a graphical effect without navigating a user interface, and requiring that the duration criterion be met reduces mistakes by preventing unintentional display of the effect, thereby providing additional control options without cluttering the UI with additional displayed controls and reducing the number of inputs needed to perform an operation.

In some embodiments, the first set of criteria includes a criterion that is met (e.g., the first gesture will not trigger a graphical effect and/or the first gesture will be ignored) when detected movement (e.g., lateral movement, vertical movement, and/or shaking movement) of the first gesture satisfies (e.g., is less than, or is less than or equal to) a movement threshold (e.g., no graphical effect is displayed if the movement threshold is not satisfied, as illustrated in FIG. 6F) (e.g., a velocity threshold, a speed threshold, a direction threshold, and/or a distance threshold). Displaying the graphical effect in response to detection of the first gesture in accordance with a determination that a first set of criteria is met, including a determination that detected movement of the gesture satisfies a movement threshold, and forgoing displaying the graphical effect in response to detection of the first gesture in accordance with a determination that the first set of criteria is not met, including a determination that detected movement of the gesture does not satisfy a movement threshold, provides the user with an indication that the criteria required to display the graphical effect has been met and allows the user to initiate the effect to be displayed without having to navigate a user interface, and requiring that the first set of criteria be met reduces mistakes by preventing unintentional display of the effect, thereby providing improved visual feedback and reducing the number of inputs needed to perform an operation.

In some embodiments, the first set of criteria is based on movement of the first portion of the person. In some embodiments, the computer system does not display the graphical effect (e.g., the first gesture is ignored) if the movement of the first gesture exceeds the movement threshold (e.g., exceeds a speed threshold).

In some embodiments, the first set of criteria includes a criterion that is met when an indicator of attention of the person performing the first gesture is determined to be directed to the representation of the field of view of the one or more camera sensors (and/or, in some embodiments, the display generation component, the one or more camera sensors, and/or the computer system). Displaying the graphical effect in response to detection of the first gesture in accordance with a determination that a first set of criteria is met, including a determination an indicator of attention is directed to the representation field of view of the one or more camera sensors, and forgoing displaying the graphical effect in response to detection of the first gesture in accordance with a determination that the first set of criteria is not met, including a determination an indicator of attention is not directed to the representation field of view of the one or more camera sensors, provides the user with an indication that the criteria required to display the graphical effect has been met and allows the user to initiate the effect to be displayed without having to navigate a user interface, and requiring that the first set of criteria be met reduces mistakes by preventing unintentional display of the effect, thereby providing improved visual feedback and reducing the number of inputs needed to perform an operation. In some embodiments, the first set of criteria is not met (e.g., the graphical effect that corresponds to the first gesture is not displayed) if the indicator of attention of the person performing the first gesture is not determined to be directed to the representation of the field of view of the one or more camera sensors.

In some embodiments, the indicator of attention includes a gaze (e.g., 632*a*) of the person performing the first gesture (e.g., as illustrated in FIG. 6T) (e.g., the indicator of attention is determined to be directed to the representation of the field of view of the one or more camera sensors when the person performing the gesture is looking in the direction of the representation of the field of view of the one or more camera sensors and/or looking at the display generation component). Displaying the graphical effect in response to detection of the first gesture in accordance with a determination that a first set of criteria is met, including a determination that the gaze of the person is directed to the representation field of view of the one or more camera sensors, and forgoing displaying the graphical effect in response to detection of the first gesture in accordance with a determination that the first set of criteria is not met, including a determination that the gaze of the person n is not directed to the representation field of view of the one or more camera sensors, provides the user with an indication that the criteria required to display the graphical effect has been met and allows the user to initiate the effect to be displayed without having to navigate a user interface, and requiring that the first set of criteria be met reduces mistakes by preventing unintentional display of the effect, thereby providing improved visual feedback and reducing the number of inputs needed to perform an operation.

In some embodiments, the indicator of attention includes a focus state (or, in some embodiments, an activity state) of a window displayed by the display generation component (e.g., the subject (Isaac) performing the gesture is not viewing the user interface 602*a*, as illustrated in FIG. 6U) (e.g., the indicator of attention is determined to be directed to the representation of the field of view of the one or more camera sensors when the application window or user interface containing the representation of the field of view of the one or more camera sensors). Displaying the graphical effect in response to detection of the first gesture in accordance with a determination that a first set of criteria is met, including a focus state, and forgoing displaying the graphical effect in response to detection of the first gesture in accordance with a determination that the first set of criteria is not met, including a focus state, provides the user with an indication that the criteria required to display the graphical effect has been met and allows the user to initiate the effect to be displayed without having to navigate a user interface, and requiring that the first set of criteria be met reduces mistakes by preventing unintentional display of the effect, thereby providing improved visual feedback and reducing the number of inputs needed to perform an operation. In some embodiments, the indicator of attention is determined to be directed to the representation of the field of view of the one or more camera sensors if the application window is minimized or closed (while the application is still running, and the person and gesture are detected within the field of view of the one or more camera sensors).

In some embodiments, the first set of criteria includes a criterion that is met when an audio setting (e.g., microphone setting) associated with the representation of the field of view of the one or more camera sensors (e.g., a microphone setting of a real-time communication session) is active (e.g., a graphical effect is not displayed when audio is not active as illustrated in FIG. 6V) (e.g., enabled and/or not muted). Displaying the graphical effect in response to detection of the first gesture in accordance with a determination that a first set of criteria is met, including a criterion that is met when an audio setting is active, and forgoing displaying the graphical effect in response to detection of the first gesture in accordance with a determination that the first set of criteria is not met, provides the user with an indication that the criteria required to display the graphical effect has been met and allows the user to initiate the effect to be displayed without having to navigate a user interface, and requiring that the first set of criteria be met reduces mistakes by preventing unintentional display of the effect, thereby providing improved visual feedback and reducing the number of inputs needed to perform an operation. In some embodiments, the criterion is not met (e.g., the graphical effect is not displayed) if the audio setting is disabled or muted.

In some embodiments, the first set of criteria includes a criterion that is met when an audio setting associated with the representation of the field of view of one or more camera sensors has been not muted (e.g., a graphical effect is not displayed when audio is muted as illustrated in FIG. 6V) within a predetermined amount of time (e.g., a non-zero amount of time, 1 second, 2 seconds, 3 seconds, or 5 seconds). Displaying the graphical effect in response to detection of the first gesture in accordance with a determination that a first set of criteria is met, including a criterion that is met when an audio setting has not been muted within a predetermined amount of time, and forgoing displaying the graphical effect in response to detection of the first gesture in accordance with a determination that the first set of criteria is not met, provides the user with an indication that the criteria required to display the graphical effect has been met and allows the user to initiate the effect to be displayed without having to navigate a user interface, and requiring that the first set of criteria be met reduces mistakes by preventing unintentional display of the effect, thereby providing improved visual feedback and reducing the number of inputs needed to perform an operation. In some embodiments, the first set of criteria is not met (e.g., the graphical effect is not displayed) if the audio setting was muted within the predetermined amount of time.

In some embodiments, the computer system (e.g., 600*a*) is in communication with one or more external computer systems (e.g., 600*b*) (e.g., a smartphone, a desktop computer, a laptop, a tablet, a head-mounted device, a wearable device, and/or a smart watch) via a real-time communication session (e.g., a live audio and/or video communication session. In some embodiments, the representation of the field of view of the one or more camera sensors is included (e.g., transmitted, shared, and/or displayed) in the real-time communication session (e.g., displayed in a user interface of a real-time communication application). Displaying the graphical effect in response to detection of the first gesture in accordance with a determination that a first set of criteria is met, and forgoing displaying the graphical effect in response to detection of the first gesture in accordance with a determination that the first set of criteria is not met while the computer system is in communication with one or more external computer systems via real-time communication session indicates to the user that the user has successfully met the criteria required to display the graphical effect and allows the user to initiate the effect to be displayed without having to navigate a user interface, and requiring that the first set of criteria be met reduces mistakes by preventing unintentional display of the effect, thereby providing improved visual feedback and reducing the number of inputs needed to perform an operation.

In some embodiments, the graphical effect that corresponds to the first gesture is different from a movement of the portion of the person that corresponds to the first gesture (e.g., the graphical effect includes one or more graphical elements, an animation, and/or a graphical representation of the first gesture, such as an emoji corresponding to the first gesture and/or an animation corresponding to the first gesture). Displaying the graphical effect in response to detection of the first gesture in accordance with a determination that a first set of criteria is met, wherein the graphical effect is different from a movement of the portion of the person and forgoing displaying the graphical effect in response to detection of the first gesture in accordance with a determination that the first set of criteria is not met provides the user with an indication that the criteria required to display the graphical effect has been met and allows the user to initiate the effect to be displayed without having to navigate a user interface, and requiring that the first set of criteria be met reduces mistakes by preventing unintentional display of the effect, thereby providing improved visual feedback and reducing the number of inputs needed to perform an operation.

Note that details of the processes described above with respect to method 750 (e.g., FIG. 7B) are also applicable in an analogous manner to the methods described below/above. For example, method 700 optionally includes one or more of the characteristics of the various methods described above with reference to method 750. For example, method 700 optionally forgoes displaying a graphical effect if criteria are not met. As another example, method 900 optionally includes one or more of the characteristics of the various methods described above with reference to method 750. For example, method 900 optionally forgoes displaying a graphical effect in response to detecting a gesture while a computer system is sharing content associated with a participant if criteria are not met. As another example, method 1100 optionally includes one or more characteristics of the various methods described above with reference to method 750. For example, method 1100 optionally forgoes displaying graphical enhancements if a set of criteria is not met. As another example, method 1300 optionally includes one or more characteristics of the various methods described above with reference to method 750. For example, method 1300 optionally forgoes displaying a graphical effect in response to detecting a gesture while a computer a representation of a subject is framed in a representation of the field of view of one or more camera sensors if criteria are not met. For brevity, these details are not repeated below.

FIGS. 8A-8Z illustrate exemplary user interfaces for sharing content during a real-time communication session, in accordance with some embodiments. The user interfaces in these figures are used to illustrate the processes described below, including the processes in FIG. 9.

At FIG. 8A, computer system 800*a* (e.g., Abby's computer) displays user interface 802 of a real-time communication session between computer system 800*a*, computer system 800*b* (e.g., Nate's computer), and computer system 800*c* (e.g., Jose's computer). In some embodiments, computer system 800*a*, computer system 800*b*, and/or computer system 800*c* are desktop computers, laptop computers, tablets, smartphones, and/or other mobile devices. User interface 802 includes representation 802*a*, representation 802*b*, and representation 802*c* (e.g., representations of the participants in the real-time communication session: Abby, Nate, and Jose). Representation 802*a* (e.g., a video feed, a still image, and/or an avatar) represents the participant (e.g., Abby) associated with computer system 800*a* (e.g., Abby's computer). Representation 802*b* represents the participant (e.g., Nate) associated with computer system 800*b* (e.g., Nate's computer). Representation 802*c* represents the participant (e.g., Jose) associated with computer system 800*c* (e.g., Jose's computer). Computer system 800*b* displays user interface 804, which includes representations of the participants in the real-time communication session (e.g., Abby, Nate, and Jose), and computer system 800*c* displays user interface 806, which includes representations of the participants in the real-time communication session (e.g., Abby, Nate, and Jose).

Figure 8B:
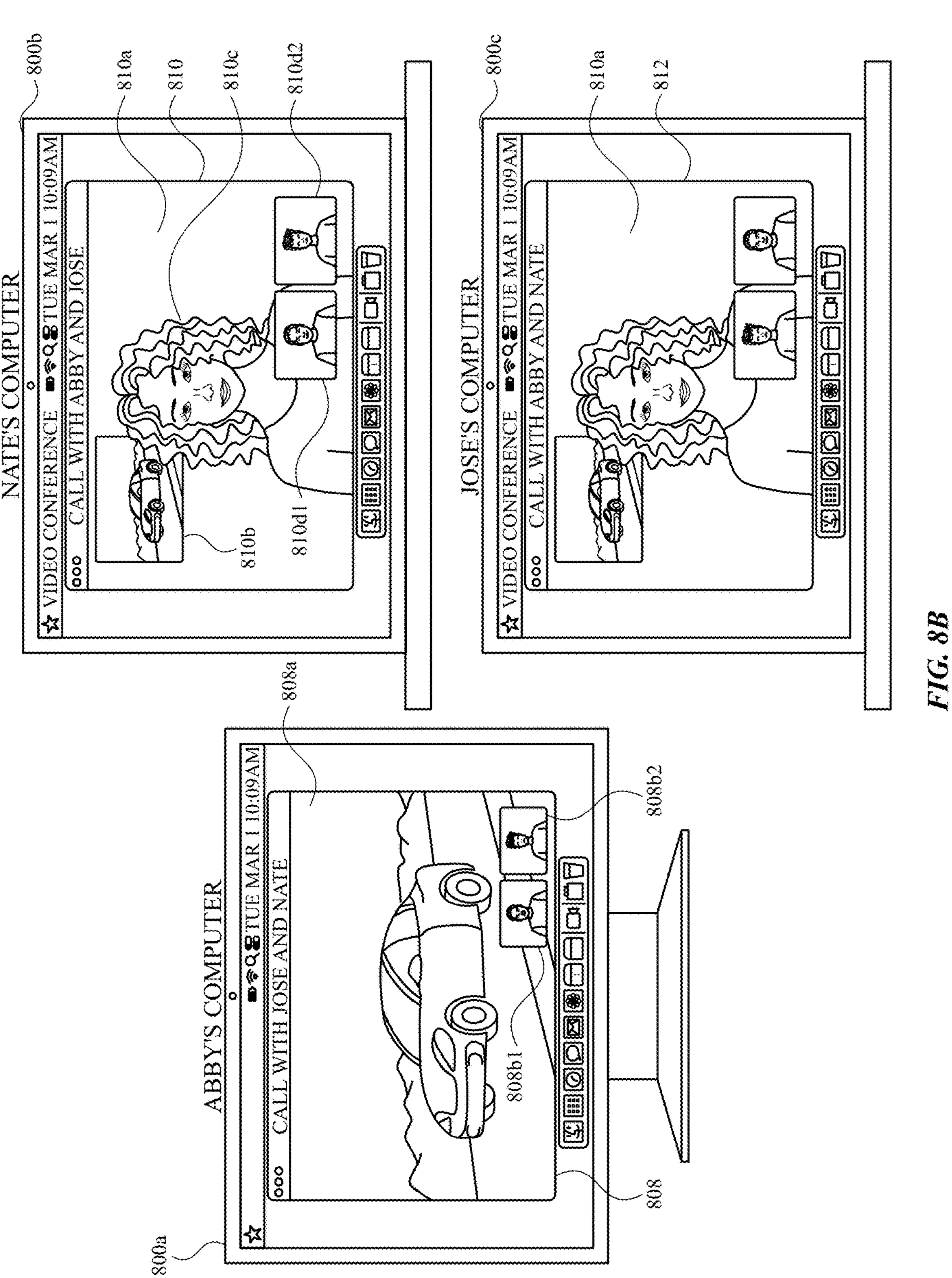

At FIG. 8B, computer system 800*a* (e.g., Abby's computer) detects a request to share content. In response to detection of the request to share content, computer system 800*a* begins sharing content in a first mode and displays user interface 808. User interface 808 includes shared content 808*a* and representation 808*b*1 and representation 808*b*2. Representation 808*b*1 and representation 808*b*2 are representations of other participants in the real-time communication session. In some embodiments, shared content 808*a* is shown in an expanded format (e.g., full screen) or in a reduced format (e.g., a portion of user interface 808). In some embodiments, representation of participant 808*b*1 and representation of participant 808*b*2 obscure a portion of shared content 808*a*. In some embodiments, user interface 808 does not include a representation of the participant associated with shared content 808*a* (e.g., Abby).

In response to detecting the request to share content, computer system 800*b* displays user interface 810 and computer system 800*c* displays user interface 812. User interface 810 on computer system 800*b* includes composite 810*a*, which is a composite of representation 810*b* of shared content 808*a* and representation 810*c* of the participant (e.g., Abby) associated with shared content 808*a*. Representation 810*c* of the participant associated with shared content 808*a* is not displayed separately from representation 810*b* of shared content 808*a*. In some embodiments, representation 810*b* of shared content 808*a* is displayed as if behind (and over the shoulder of) representation 810*c* of the participant (e.g., Abby) associated with shared content 808*a*. In some embodiments, representation 810*c* of participant associated with shared content 808*a* obscures a portion of shared content 810*b*. In some embodiments, representation 810*c* of shared content 808*a* is a different size (e.g., larger and/or occupies a larger portion of user interface 810) than as shown in FIG. 8B. In some embodiments, representation 810*c* of the participant associated with shared content 808*a* is a different size (e.g., smaller and/or occupies a smaller portion of user interface 810) than as shown in FIG. 8B. In some embodiments, representation 810*c* of shared content 808*a* is positioned more towards a center of user interface 810 than as shown in FIG. 8B. In some embodiments, representation 810*c* of the participant associated with shared content 808*a* is positioned (e.g., offset) more towards a side (e.g., a right side) of user interface 810 than as shown in FIG. 8B. User interface 810 includes representation of non-sharing participant 810*d*1 and representation of non-sharing participant 810*d*2 (e.g., participants who are not associated with shared content, such as Nate and Jose), displayed in front of composite 810*a*. In some embodiments, composite 810*a* is displayed in an expanded format (e.g., full screen). In some embodiments, representation of non-sharing participant 810*d*1 and representation of non-sharing participant 810*d*2 are displayed in a different order dependent on which representation is associated with the particular computer system. For example, on Nate's computer, the representation of Nate is displayed on the left side of the display and the representation of Jose is displayed on the right side of the display. Similarly, on Jose's computer, the representation of Jose is displayed on the left side of the display and the representation of Nate is displayed on the right side of the display. In some embodiments, a participant can select where the representations are displayed with respect to the other representations. User interface 812 on computer system 800*c* can include any or all features of user interface 810 as described with respect to FIG. 8B.

Figure 8C:
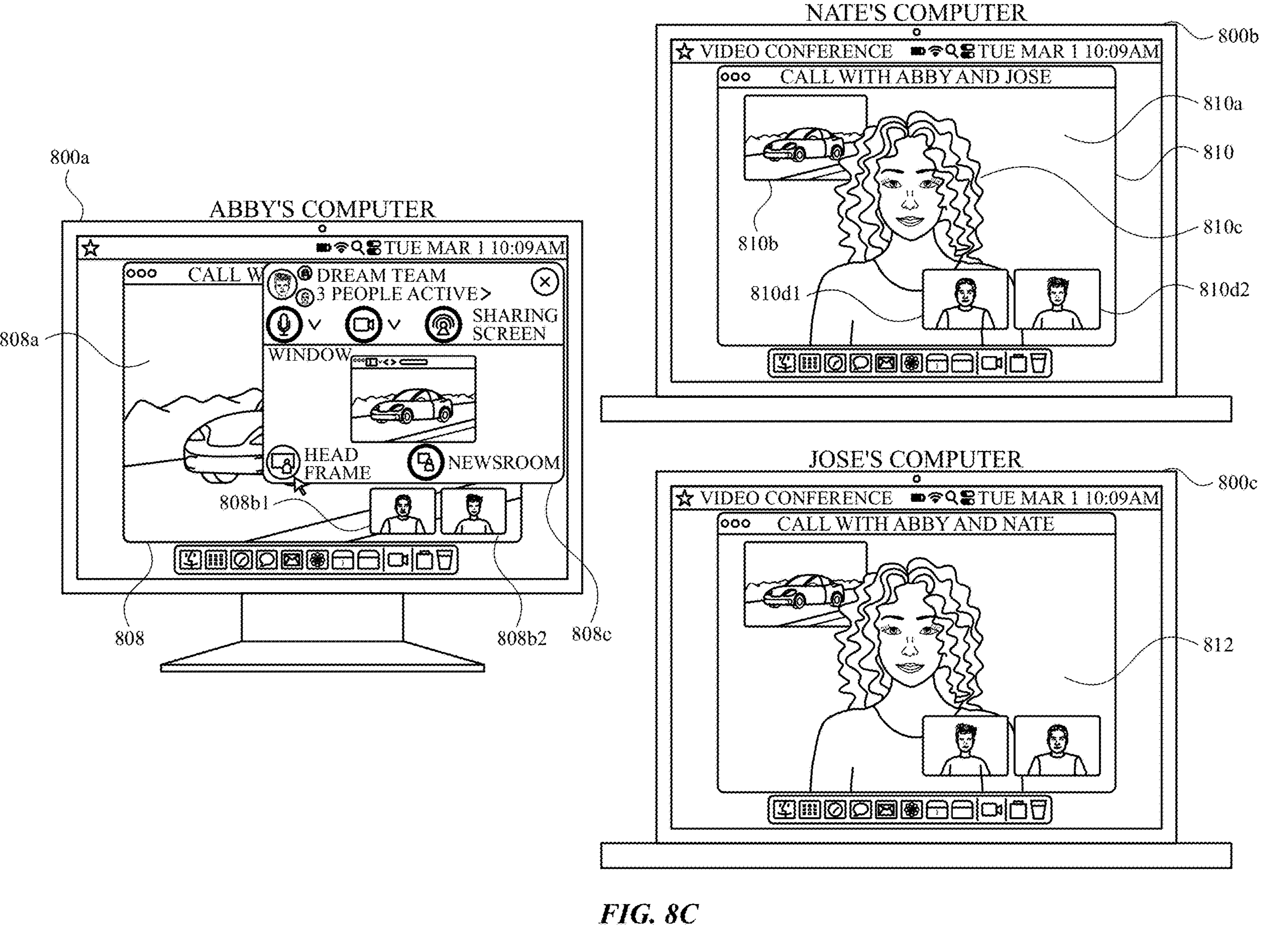

At FIG. 8C, computer system 800*a* (e.g., Abby's computer) detects (e.g., via menu 808*c*) a request to change the configuration in which shared content 808*a* is displayed on computer system 800*b* (e.g., Nate's computer) and computer system 800*c* (e.g., Jose's computer). In some embodiments, menu 808*c* is a settings menu associated with a real-time communication session application used for the real-time communication session between computer system 800*a*, computer system 800*b*, and computer system 800*c*. In some embodiments, menu 808*c* is a settings menu associated with the operating system of computer system 800*a*.

Figure 8D:
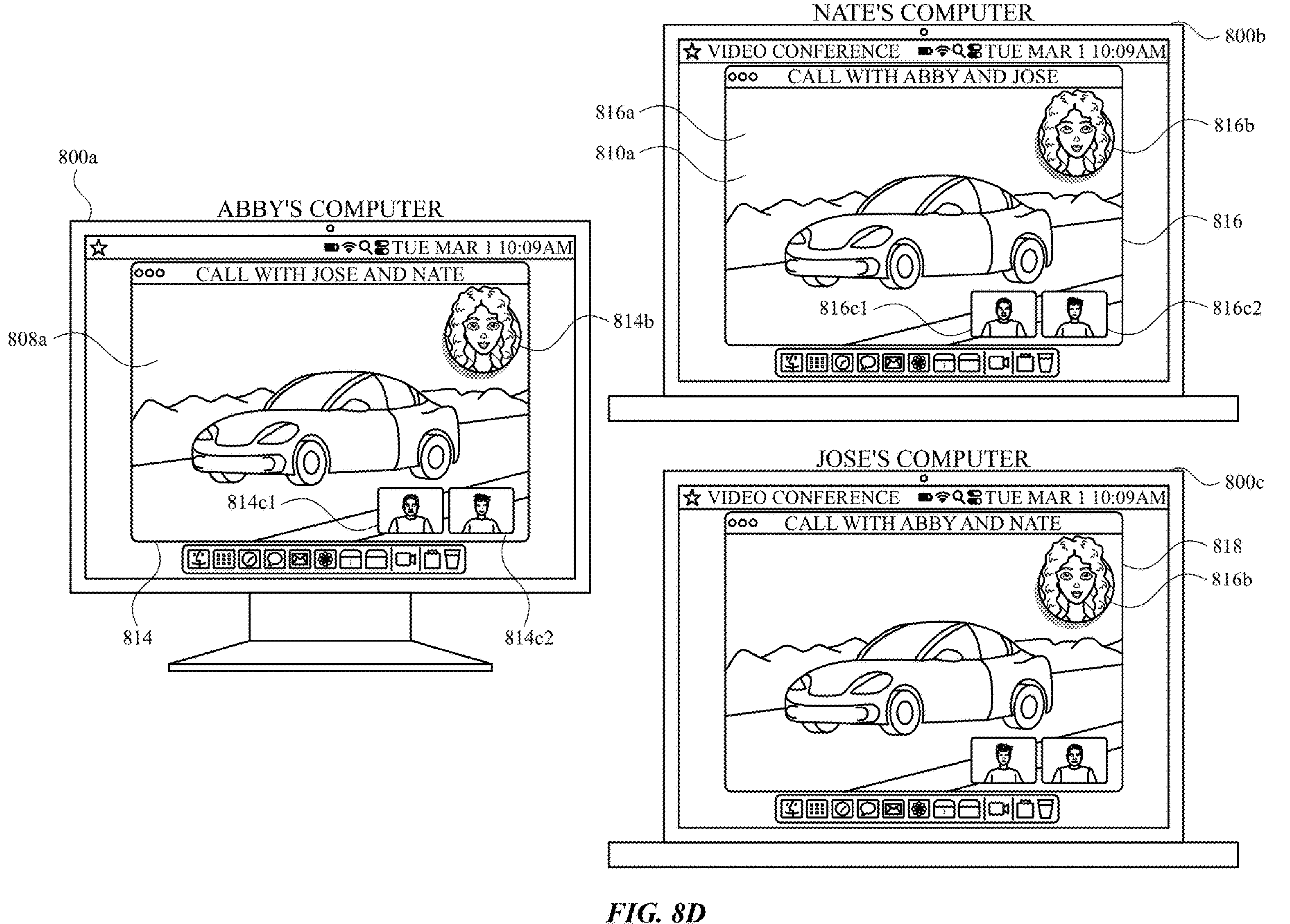

At FIG. 8D, in response to the request to change the configuration in which shared content 808*a* is displayed, computer system 800*a* provides shared content 808*a* to the real-time communication session in a second mode and displays user interface 814. User interface 814 includes representation of non-sharing participant 814*cl*, representation of non-sharing participant 814*c*2 (e.g., Nate and Jose), and representation of the sharing participant (e.g., Abby) 814*b*. In some embodiments, representation of the sharing participant 814*b* includes a representation of the participant's neck and head (e.g., only a representation of the participant's neck and head). In some embodiments, representation of the sharing participant 814*b* is a video feed of the sharing participant segmented from a physical background (e.g., the background in the field of view of the one or more camera sensors). In some embodiments, representation of the sharing participant 814*b* includes an animated avatar that is animated to match the mouth movements of the sharing participant (e.g., Abby) as the sharing participant is speaking. In some embodiments, representation of the sharing participant 814*b* includes a colored background in the shape of a circle. In some embodiments, the top of representation of the sharing participant 814*b* (e.g., the top of the head of the participant) is displayed outside a border (e.g., breaks a frame) of the colored circular background. In some embodiments, representation of the sharing participant 814*b* casts a simulated shadow on shared content 808*a*. In some embodiments, shared content 808*a* and representation of the sharing participant 814*b* are composited together and delivered to computer system 800*b* and computer system 800*c* as a single feed (e.g., a composited feed). In response to the request to change the configuration in which shared content 808*a* is displayed, computer system 800*b* displays user interface 816 and computer system 800*c* displays user interface 818. User interface 816 includes representation 816*a* of shared content 808*a*, representation of the sharing participant 816*b*, representation of non-sharing participant 816*cl* and representation of non-sharing participant 816*c*2. In some embodiments, representation of the non-sharing participant 816*cl* and representation of non-sharing participant 816*c*2 are displayed in a different order (e.g., from left to right) dependent on which representation is associated with the participant associated with the particular computer system. For example, on Nate's computer, the representation of Nate is displayed on the left side of the display and the representation of Jose is displayed on the right side of the display. Similarly, on Jose's computer, the representation of Jose is displayed on the left side of the display and the representation of Nate is displayed on the right side of the display. In some embodiments, a participant can select where the representations are displayed with respect to the other representations. Shared content 816*a* is shared content from computer system 800*a* (e.g., Abby's shared content; 808*a*). Representations of the sharing participant 816*b* corresponds to representation of the sharing participant 814*b* and is shown in the same position in user interface 816 and user interface 818 as in user interface 814. Representation 816*b* can include any or all of the features of representation 814*b* described with reference to FIG. 8D. In some embodiments, user interface 818 includes any or all features of user interface 816.

Figure 8E:
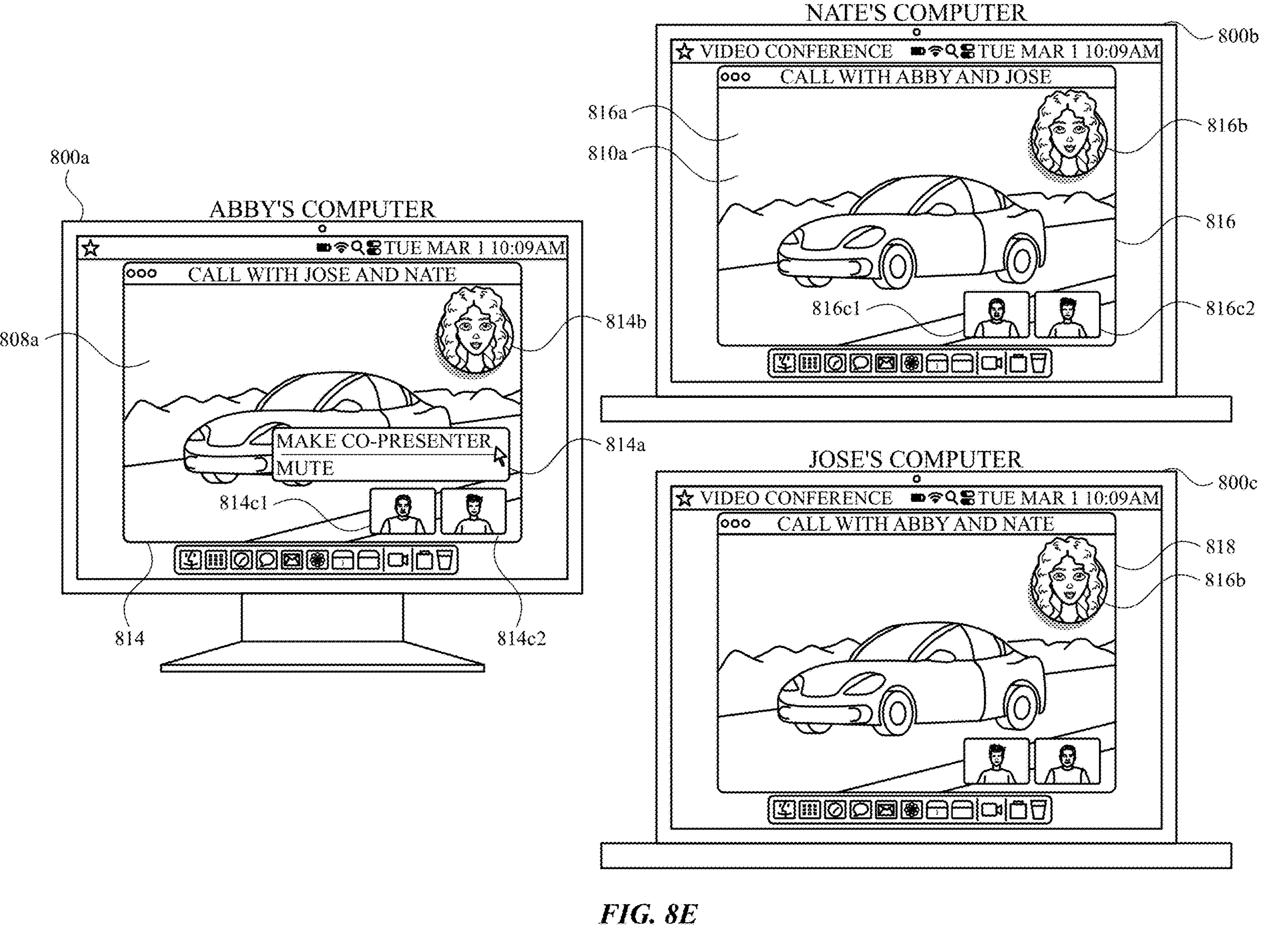

At FIG. 8E, computer system 800*a* detects a user input corresponding to a request to add a secondary presenter (e.g., Nate, the participant associated with computer system 800*b*) via menu 814*a*. In some embodiments, the secondary presenter is not sharing content at the time of the request. At FIG. 8F, in response to detecting the request to add a secondary presenter, the participant associated with computer system 800*b* (e.g., Nate) has been added as a secondary presenter of shared content 808*a*. On computer system 800*a*, in response to detecting the request to add a secondary presenter, representation of non-sharing participants 814*cl* is not displayed (e.g., the participant associated with computer system 800*b*, Nate), and representation of non-sharing participant 814*c*2 continues to be displayed. User interface 814 includes representation of sharing participant 814*b* (e.g., Abby) and representation of secondary presenter 814*d* (e.g., Nate). Representation of secondary presenter 814*d* can include any or all features of representation of sharing participant 814*b* described with respect to FIG. 8D.

In response to detecting the request to add a secondary presenter, computer system 800*b* ceases to display representation of non-sharing participant 816*c1* and displays representation of secondary presenter 816*d*. Representation of sharing participant 816*d* and representation of secondary presenter 816*d* can include any or all of the features of representation of sharing participant 814*b* and/or representation of secondary presenter 814*b* described with reference to FIG. 8D and FIG. 8F. In response to detecting the request to add a secondary presenter, computer system 800*c* displays user interface 818. User interface 818 includes any or all features of user interface 816 described with respect to FIG. 8F.

After participant Nate has been added as a secondary presenter in the real-time communication session, computer system 800*a* detects user input 850*a* (e.g., a click and drag input, a touch and drag input, and/or a swipe input) corresponding to a request to move representation of sharing participant 814*b* with respect to shared content 808*a* and user interface 814. In response to user input 850*a*, computer system 800*a* displays representation of sharing participant 814*b* at a second location within user interface 814. In some embodiments, in response to user input 850*a* computer system 800*b* and computer system 800*c* display representation 816*b* (e.g., the representations of Abby on computer system 800*b* and computer system 800*c*) at the second location. In some embodiments, computer system 800*b* and computer system 800*c* forgo displaying representation 816*b* at the second location in response to user input 850*a* (e.g., representation 816*b* remains displayed at the first location; the representation of the sharing participant is moved only on the computer system at which the request is made).

Figure 8F:
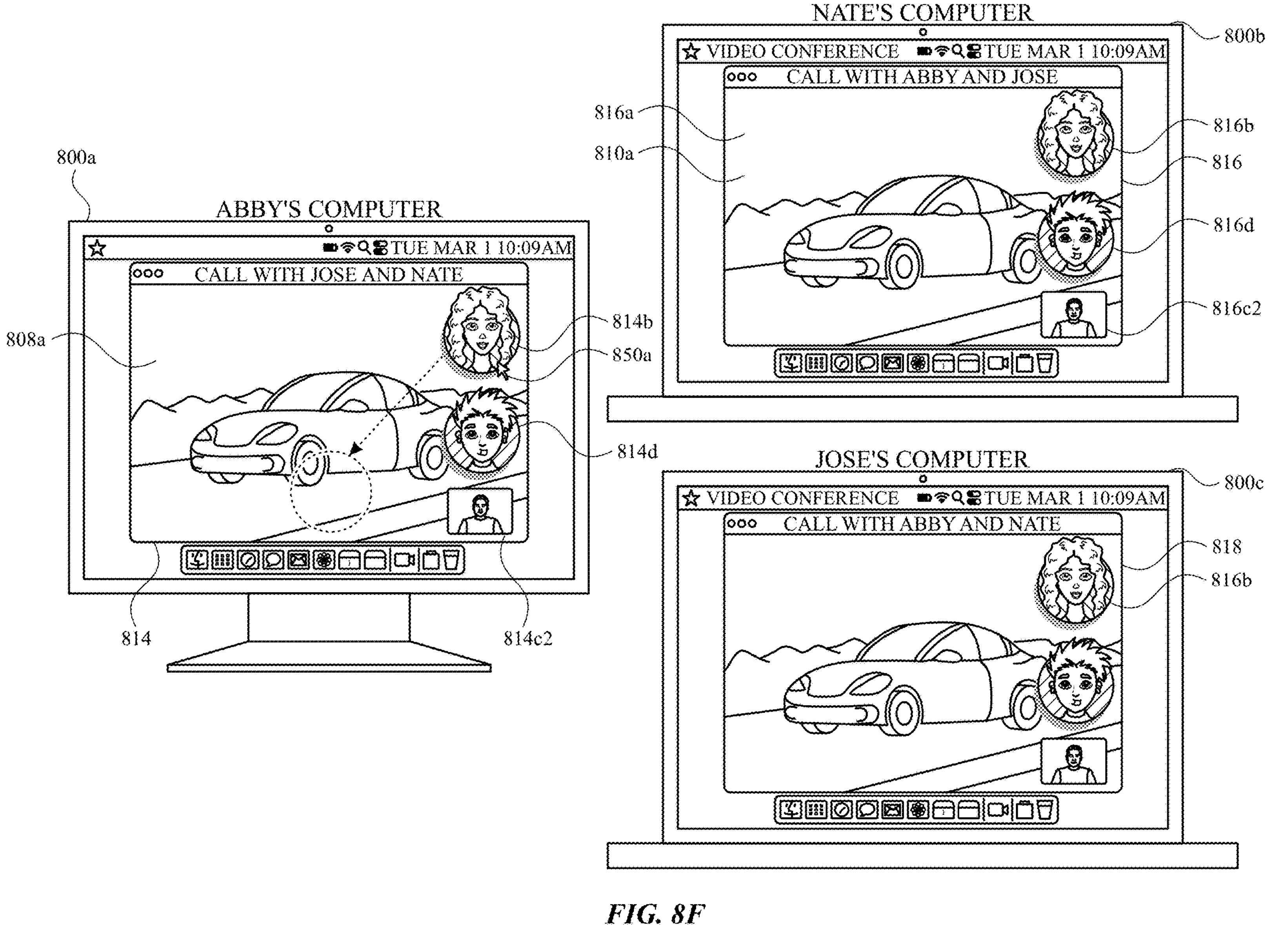
Figure 8G:
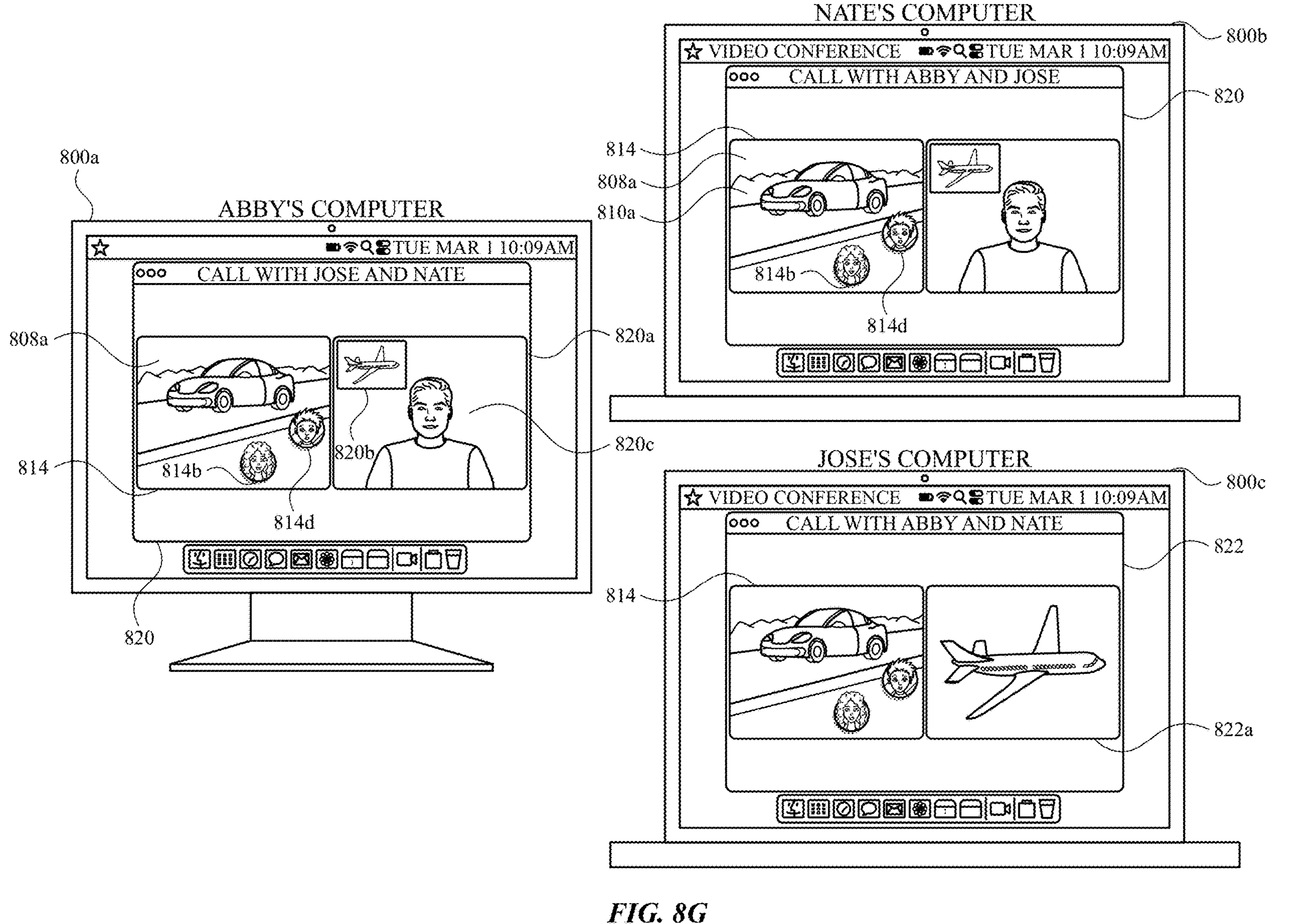

At FIG. 8G, computer system 800*c* (e.g., Jose's computer) detects a request to share content. In response to detecting the request to share content, computer system 800*c* (e.g., Jose's computer) displays user interface 822 and begins sharing content 822*a* with computer system 800*a* and computer system 800*b*. User interface 822 includes user interface 814 and shared content 822*a*. In FIG. 8G, user interface 814 does not include representation of non-sharing participant 814*c1* and representation of non-sharing participant 814*c*2 because all participants in the real-time communication session are associated with shared content (e.g., are sharing content). In response to detecting the request to share content 822*a*, computer system 800*a* and computer system 800*b* display user interface 820. User interface 820 includes user interface 814 and composite 820*a*. Composite 820*a* is a composite of representation of the tertiary presenter 820*c* (e.g., Jose) and representation of shared content 820*b*. In some embodiments, the representation of tertiary presenter 820*c* obscures a portion of shared content 822*a*. Representation 820*c* of the participant associated with the shared content 822*a* is not displayed separately from shared content 822*a*. In some embodiments, shared content 822*a* is displayed as if behind (and over the shoulder) of representation of tertiary presenter 820*c* (e.g., Jose). In some embodiments, representation of participant 820*c* obscures a portion of shared content 822*a*.

At FIG. 8H, computer system 800*b* (e.g., Nate's computer) displays user interface 810. As described with reference to FIG. 8B, computer system 800*b* displays user interface 810 while computer system 800*a* (e.g., Abby's computer) is sharing content in a first mode. Representation 810*c* of subject 834 (e.g., Abby, e.g., the sharing participant) is displayed at a first respective content location (e.g., a corner of composite 810*a*) and representation 810*b* of shared content 808*a* is displayed at a first respective participant location within composite 810*a*. Subject 834 (e.g., Abby) is standing at a first location (e.g., a central location) within the field of view of one or more camera sensors in communication with computer system 800*a* while a participant tracking mode is active on computer system 800*a* (e.g., Abby's computer). In some embodiments, the participant tracking mode includes any or all features of simulated camera following effect 1028*a*, simulated camera following effect 1028*b*, simulated camera following effect 1028*c*, and/or simulated camera following effect 1028*d* described with respect to FIGS. 10L1 and 10L2. The participant tracking mode includes current field of view 832 (e.g., the current field of view represented in user interface 810) and maximum range 830 (e.g., the maximum distance the participant tracking mode can track subject 834). In some embodiments, the participant tracking mode keeps representation 810*c* of subject 834 (e.g., Abby) centered in composite 810*a*.

At FIG. 8I, subject 834 (e.g., Abby) moves to a second location (e.g., a location near the right edge of maximum range 830) while the participant tracking mode is active on computer system 800*a*. In response to detecting subject 834 moving to the second location, computer system 800*a* shifts (e.g., pans the one or more camera sensors and/or performs a simulated camera pan) current field of view 832 to keep representation 810*c* of subject 834 centered in composite 810*a*. In response to detecting subject 834 moving to the second location and while the participant tracking mode is active on computer system 800*a*, computer system 800*b* and computer system 800*c* display representation 810*b* of shared content 808*a* at the first respective content location within composite 810*a* and representation 810*c* at the first respective participant location within composite 810*a* (e.g., the location of representation 810*b* of shared content 808*a* with respect to representation 810*c* of subject 834 does not change in response to the movement of subject 834 moving from the first location to the second location).

At FIG. 8J, subject 834 (e.g., Abby) is at the second location (e.g., a location near the right edge of maximum range 830), and the participant tracking mode has been deactivated on computer system 800*a*. In response to detecting that the participant tracking mode has been deactivated on computer system 800*a*, computer system 800*b* (e.g., Nate's computer) displays representation 810*c* of subject 834 at a second respective participant location within composite 810*a* (e.g., representation 810*c* is no longer centered in composite 810*a*). In some embodiments, representation 810*c* obscures at least a portion of representation 810*b* of shared content 808*a*. In some embodiments, in response to detecting that the participant tracking mode has been deactivated on computer system 800*a*, computer system 800*b* maintains display of representation 810*b* of shared content 808*a* at the same location with respect to the composite (e.g., the content does not move). In some embodiments, representation 810*b* of shared content 808*a* is displayed in a second content location in response to detecting that the participant tracking mode has been deactivated.

Figure 8K:
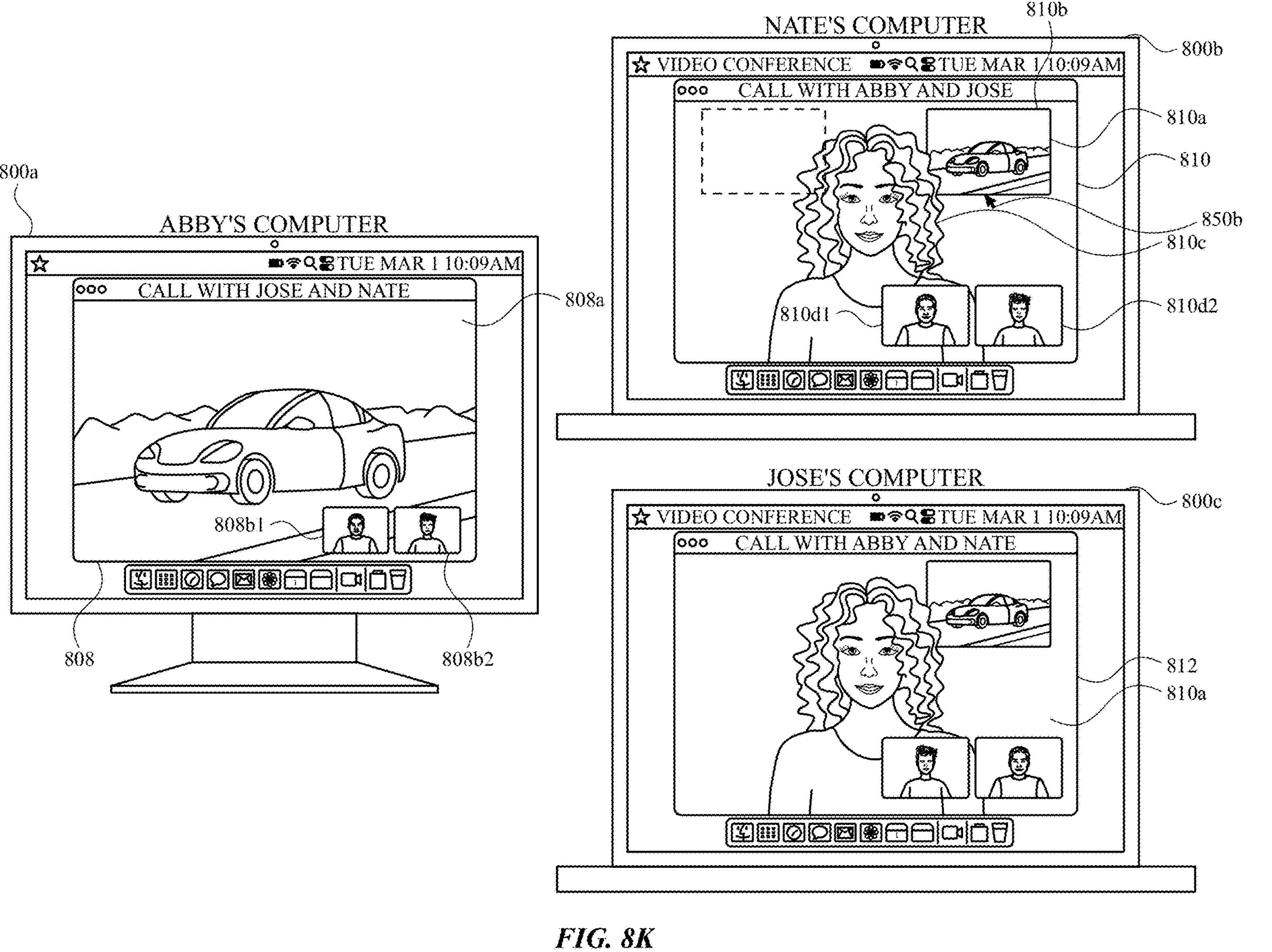

At FIG. 8K, the participant tracking mode is active on computer system 800*a* (e.g., Abby's computer), and Abby is sharing content 808*a*. Computer system 800*b* (e.g., Nate's computer) detects user input 850*b* (e.g., a click-and-drag input, a touch-and-drag input, and/or a swipe input) corresponding to a request to move representation 810*b* of shared content 808*a* from a first location (e.g., the top left corner of composite 810*a*) to a second location (e.g., the top right corner of composite 810*a*) in composite 810*a*. In some embodiments, user input 850*b* corresponds to a menu user interface. In some embodiments, user input 850*b* corresponds to the location of representation 810*b* within composite 810*a*. In response to user input 850*b*, computer system 800*b* displays representation 810*b* at the second location within composite 810*a*. In some embodiments, in response to user input 850*b*, computer system 800*c* displays representation 810*b* at the second location within composite 810*a*. In some embodiments, computer system 800*c* maintains display of representation 810*b* at the first location and forgoes displaying representation 810*b* at the second location (e.g., representation 810*b* of shared content 808*a* is moved only on the computer system at which the request is made). In some embodiments, the second position is a user defined position (e.g., user input 850*b* corresponds to (e.g., ends at) the second display location of representation 810*b*). In some embodiments, the second location is a predetermined location of a set of predetermined locations. For example, near the four corners of composite 810*a* and/or a centered position near an edge of composite 810*a*. In some embodiments, in response to detecting the end of user input 850*b*, computer system 800*b* displays representation 810*b* at a third (e.g., predetermined) location near the end location (e.g., the second location) of user input 850*b*.

Figure 8L:
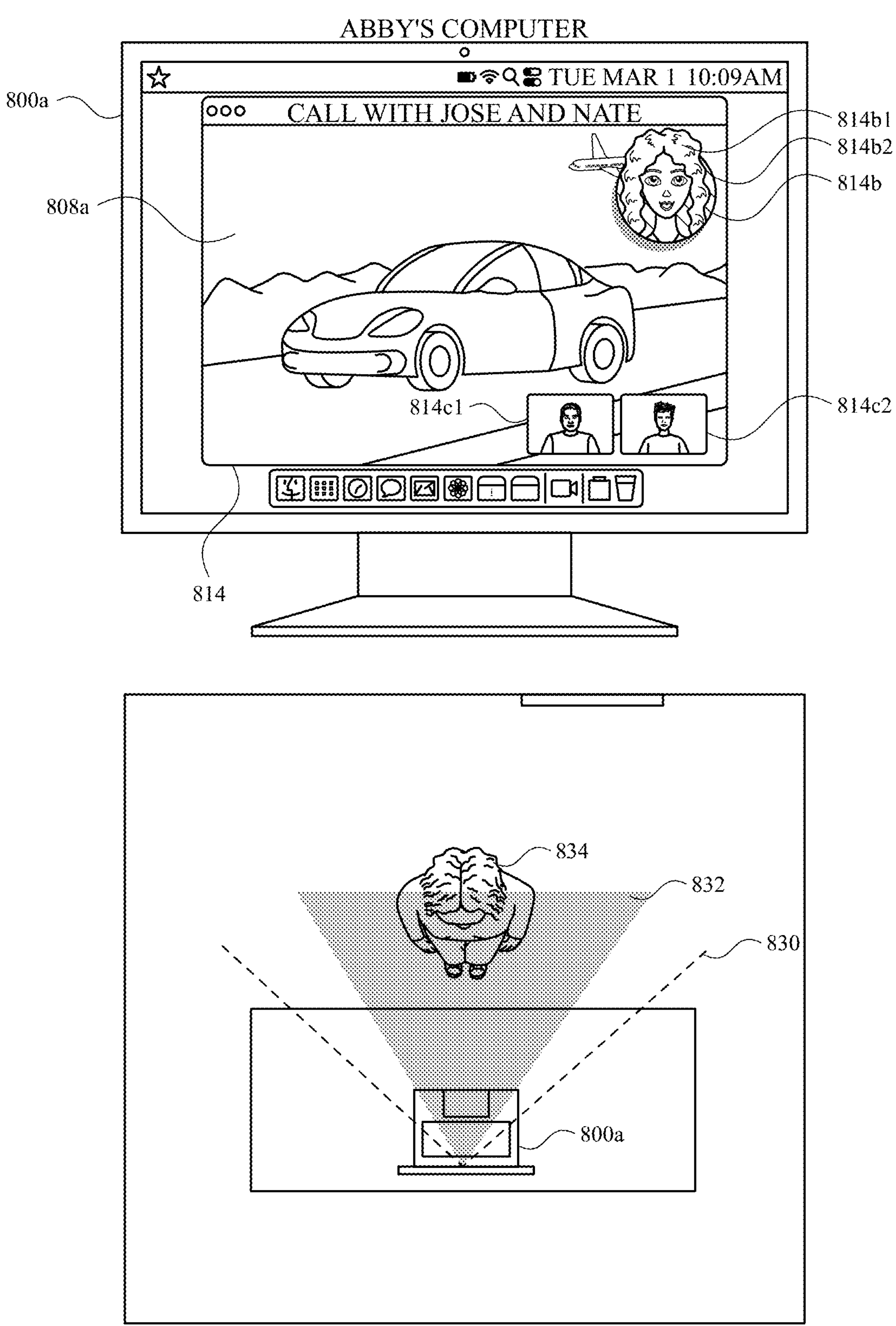

At FIG. 8L, computer system 800*a* (e.g., Abby's computer) displays user interface 814 and is sharing content 808*a* to the real-time communication session in the second mode while the participant tracking mode is active. User interface 814 includes representation 814*b* of subject 834 (e.g., Abby, the sharing participant) and representation 814*b* includes representation 814*b*1 of the head, neck, and/or shoulders of subject 834 and background 814*b*2. As described with respect to FIG. 8D, in some embodiments, the top of representation 814*b* of the sharing participant (e.g., the top of the head of the participant) is displayed outside a border (e.g., breaks a frame) of the colored circular background. Background 814*b*2 is displayed at a first location with respect to composite 810*a* and representation 814*bl* is displayed at a first location with respect to background 814*b*2 (e.g., representation 814*b*1 obscures a first portion of background 814*b*2 (e.g., a center portion) and/or a first portion of representation 814*bl* is displayed outside the border of background 814*b*2 (e.g., the top of head)). Subject 834 (e.g., Abby) is standing at the first location (e.g., a central location) within the field of view of the one or more camera sensors in communication with computer system 800*a*. In some embodiments, the participant tracking mode includes any or all features of the participant tracking mode described with respect to FIG. 8H and/or simulated camera following effect 1028*a*, simulated camera following effect 1028*b*, simulated camera following effect 1028*c*, and/or simulated camera following effect 1028*d* described with respect to FIGS. 10L1 and 10L2.

Figure 8M:
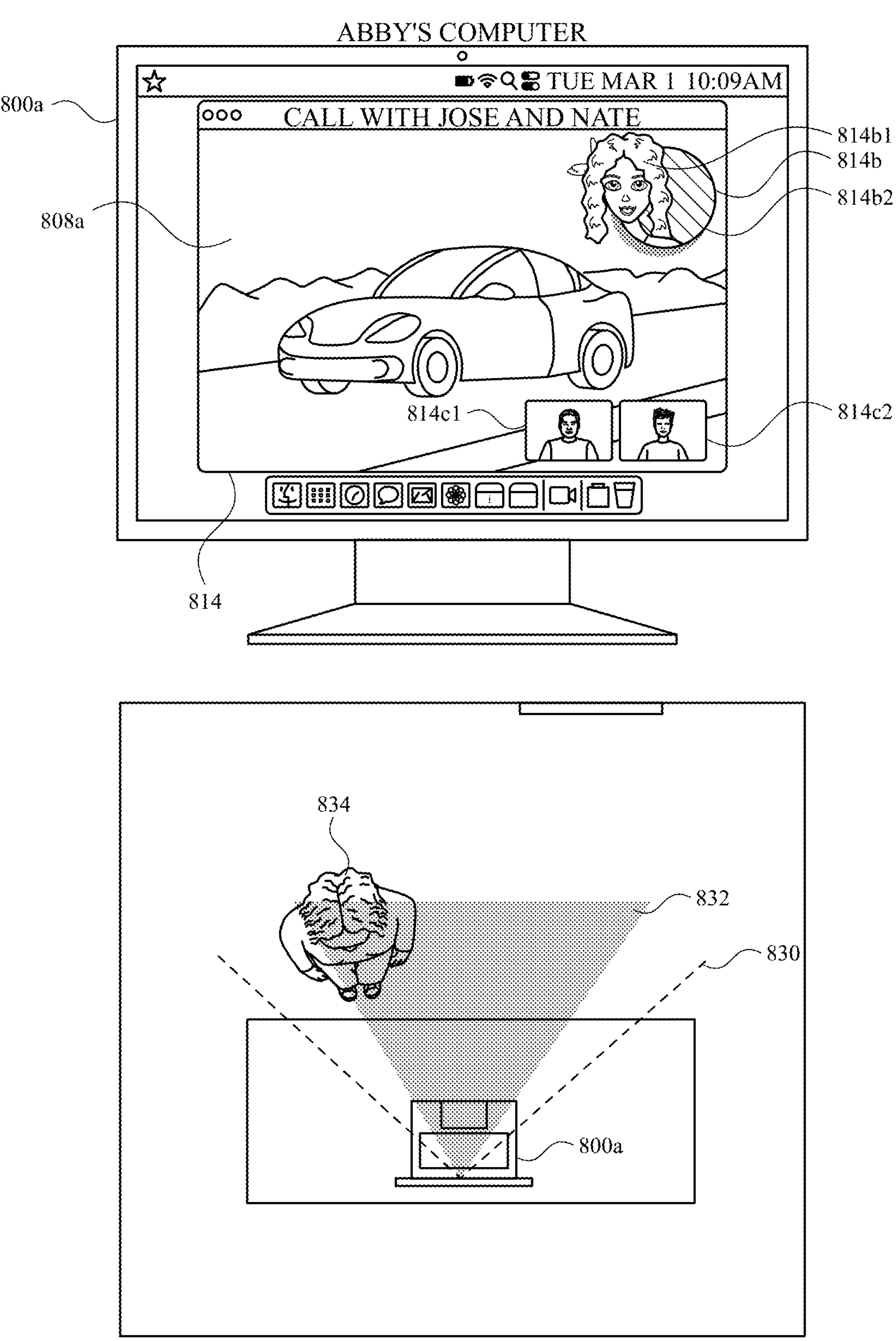

At FIG. 8M, subject 834 (e.g., Abby) begins moving to the second position (e.g., the location near the right edge of maximum range 830). In response to detecting the movement of subject 834, computer system 800*a* displays background 814*b*2 at the first location with respect to user interface 814 (e.g., background 814*bl* does not move) and displays representation 814*bl* at a second location with respect to background 814*b*2. For example, representation 814*b*1 moves within background 814*b*2. In some embodiments, representation 814*b*2 obscures a second portion of background 814*b*2. For example, a portion near the edge of background 814*b*2 and/or a second portion of representation 814*b*1 is displayed outside the border of background 814*b*2 (e.g., the top of head and the right edge of the head). In some embodiments, in response to detecting the movement of subject 834, computer system 800*b* and computer system 800*c* display the representation of the participant's head and neck at a second location with respect to the background of representation 816*b*.

Figure 8N:
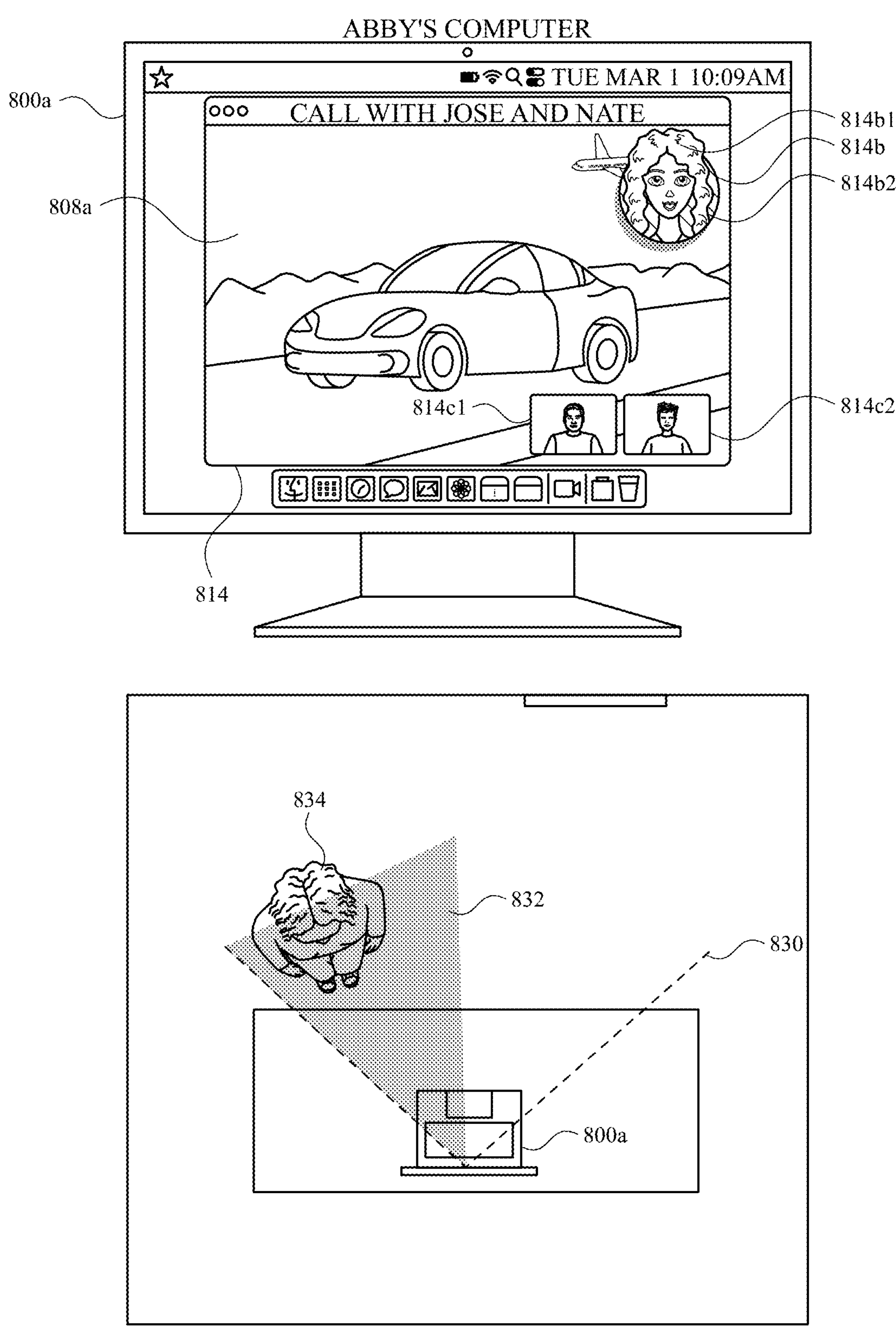

At FIG. 8N, subject 834 (e.g., Abby) arrives at the second position and has stopped moving. In response to detecting that the movement of subject 834 has stopped, computer system 800*a* maintains display of background 814*b*2 at the first location (e.g., background 814*b*2 is displayed in the same location in FIGS. 8L, 8M, and 8N) with respect to user interface 814 and representation 814*b*1 is displayed at the first location with respect to background 814*b*2 (e.g., computer system 800*a* displays representation 814*b*1 obscuring the center portion of background 814*b*2, and the top of the head is displayed outside the border of background 814*b*2 as described with reference to FIG. 8L.

Figure 8O:
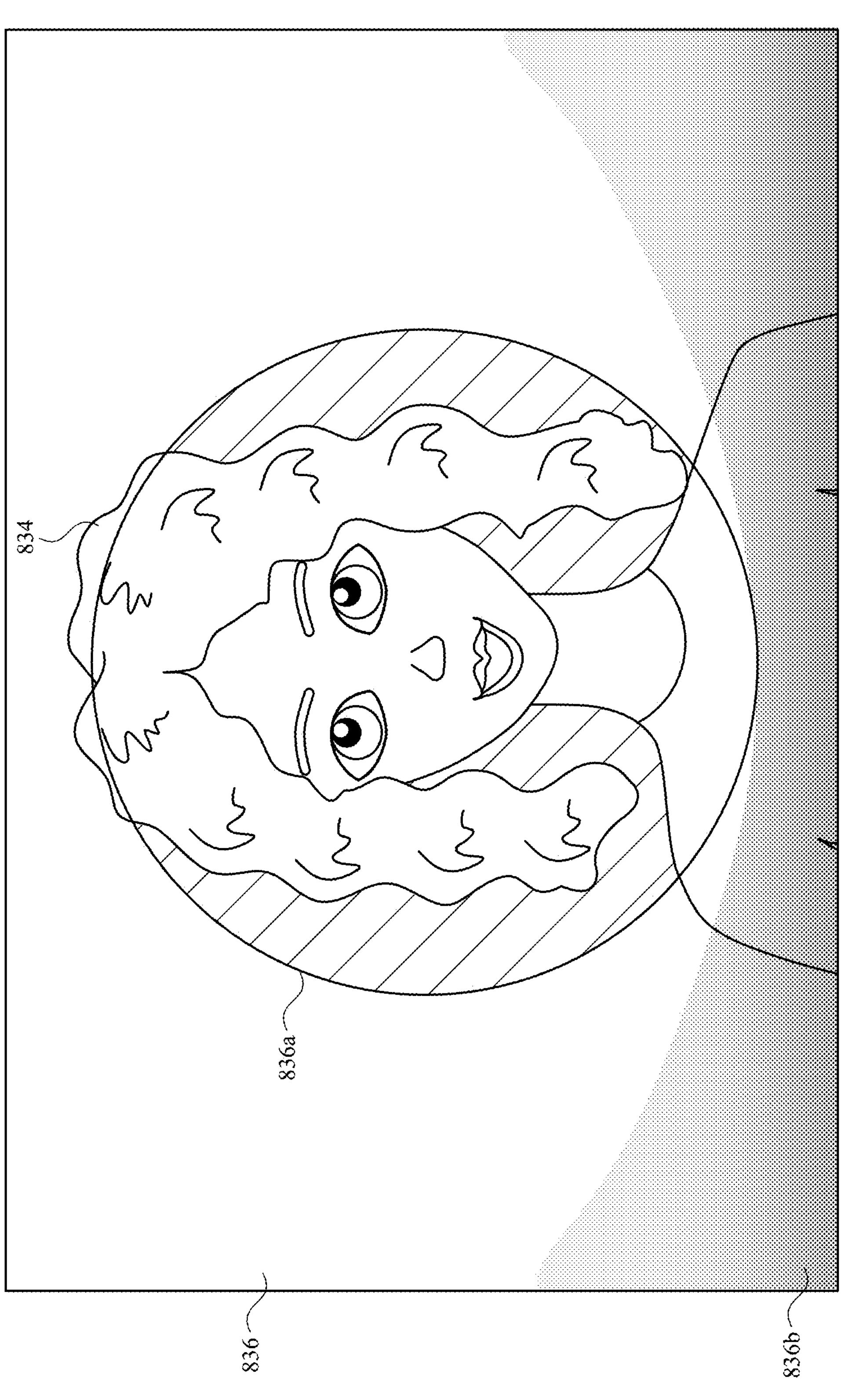

At FIG. 8O, exemplary mask 836 is shown. Mask 836 is applied to a representation of subject 834 to create representation 814*b* and representation 816*b* while computer system 800*a* is sharing content in the second mode. Mask 836 does not reduce visibility of subject 834 in predefined area 836*a* around the face, neck, and/or shoulders of subject 834, which allows for the face of subject 834 to remain visible while mask 836 is applied. In some embodiments predefined area 836*a* is a circular area, a square area, and/or any other shape. Mask 836 includes gradient 836*b*, which reduces the visibility of portions (e.g., hands and/or arms) of subject 834 outside of predefined area 836*a* based on the vertical location of the respective portion of subject 834 (e.g., portions of the body vertically lower are displayed at a lower visibility and portions of the body vertically higher are displayed at a higher visibility). The effects of mask 836 including predefined area 836*a* and gradient 836*b* are further described with respect to FIGS. 8P-8R. In some embodiments, mask 836 separates subject 834 from the background of subject 834. In some embodiments, the torso of subject 834 is not visible outside of predefined area 836*a* regardless of the vertical location.

Figure 8P:
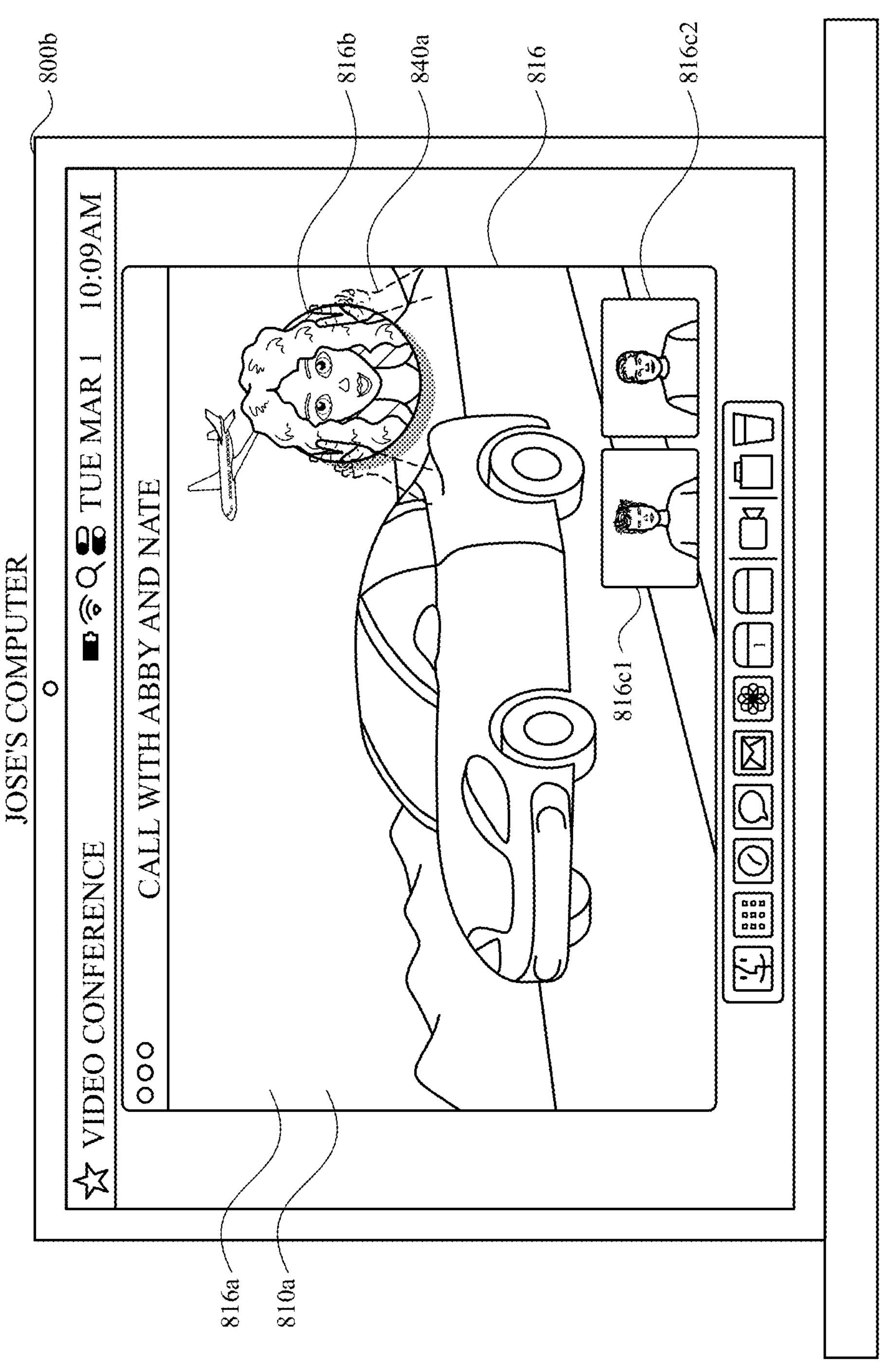

At FIG. 8P, computer system 800*b* displays user interface 816 including representation 816*b* of the sharing participant (e.g., subject 834, e.g., Abby). The sharing participant performs gesture 840*a*, which is partially within predefined arca 836*a* (e.g., at least a portion of the participant's hands and/or arms are within predefined area 836*a* and at least a portion of the participant's hands and/or arms are outside predefined area 836*a*). In response to detecting gesture 840*a*, computer system 800*b* and computer system 800*c* display representation 816*b* with a representation of 840*a*. The portion of gesture 840*a* (e.g., the portion of the hands and/or arms of subject 834) within predefined area 836*a* is displayed at a first (e.g., higher) visibility and the portion of gesture 840*a* outside of predefined area 836*a* is displayed at a second (e.g., lower) visibility. In some embodiments, the portion of gesture 840*a* within predefined arca 836*a* is fully opaque and blocks representation 816*a* of shared content 808*a*. In some embodiments, the portion of gesture 840*a* outside of predefined area 836*a* is partially opaque, and representation 816*a* of shared content 808*a* is partially visible through the portion of gesture 840*a* outside of predefined area 836*a*. For example, in FIG. 8P, the mountains and car are partially visible through the arms of subject 834. In response to detecting gesture 840*a*, computer system 800*a* (e.g., Abby's computer) displays representation 814*b* with a representation of gesture 840*a*, which includes any or all features of representation 816*b* described with respect to FIG. 8P.

Figure 8Q:
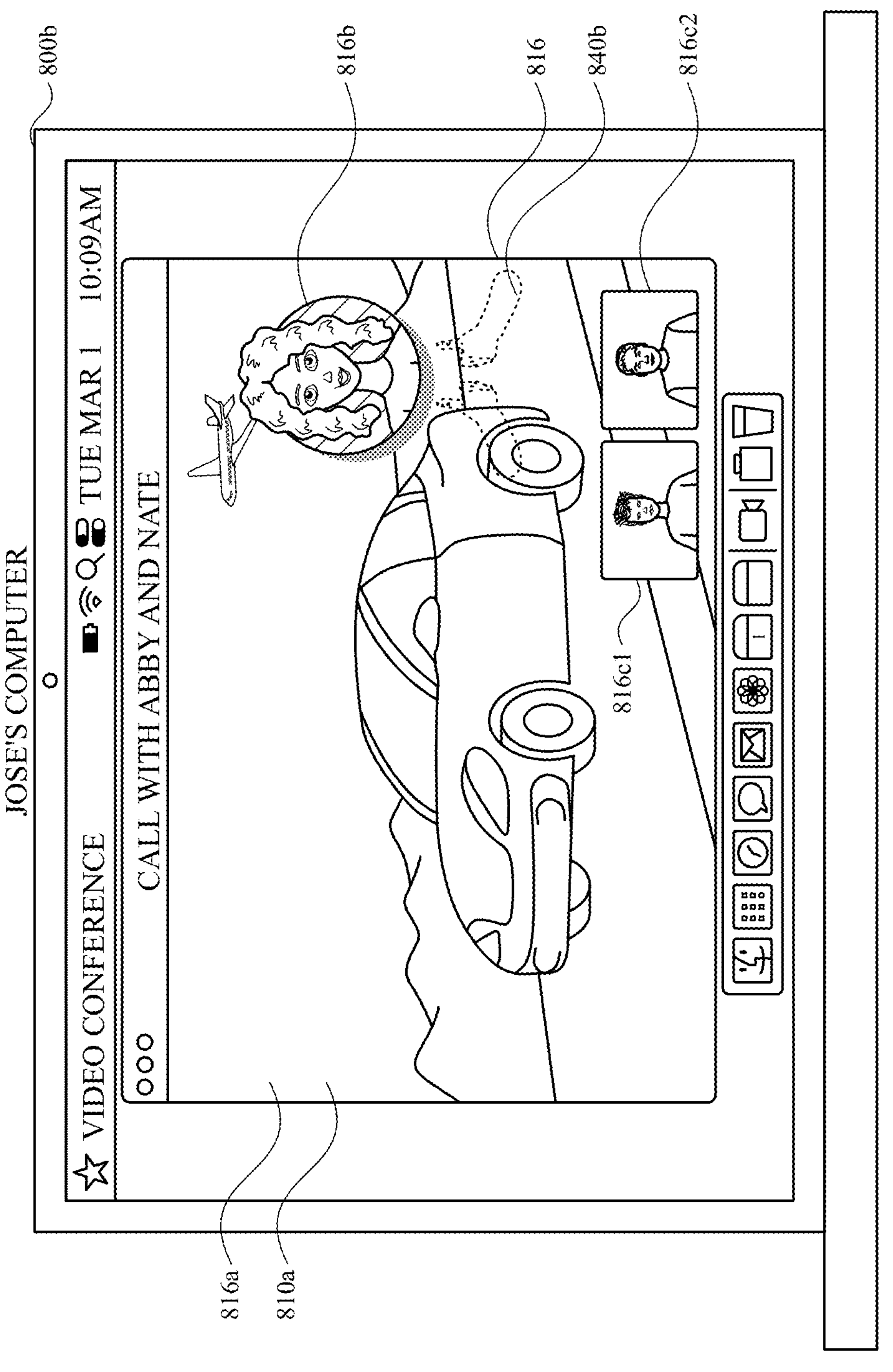

At FIG. 8Q, the sharing participant (e.g., subject 834, e.g., Abby) performs gesture 840*b*, which is below the head, neck, and/or shoulders (e.g., below predefined area 836*a*) of subject 834 (e.g., Abby). In response to detecting gesture 840*b*, computer system 800*b* and computer system 800*c* display representation 816*b* with a representation of gesture 840*b*. Gradient 836*b* of mask 836 reduces the visibility (e.g., opacity) of gesture 840*b* in representation 816*b*, and the mountains and car of representation 816*a* are visible through gesture 840*b*.

Figure 8R:
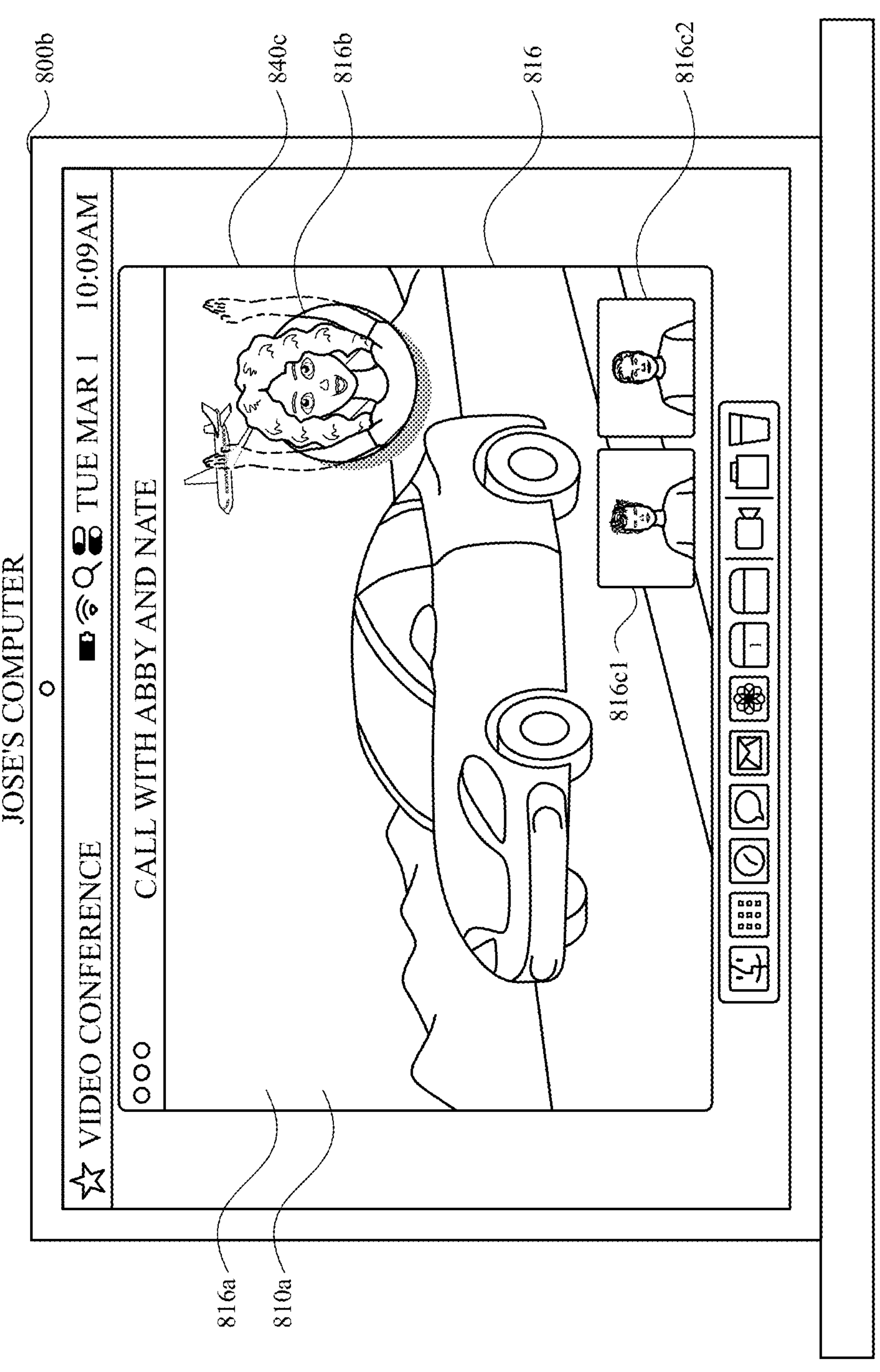

At FIG. 8R, the sharing participant performs gesture 840*c*, which is above the head, neck, and/or shoulders (e.g., above predefined area 836*a*) of subject 834 (e.g., Abby). In response to detecting gesture 840*c*, computer system 800*b* displays representation 816*b* with a representation of gesture 840*c*. Gradient 836*b* reduces the visibility (e.g., opacity) of gesture 840*c* in representation 816*b* to a lesser extent, so that gesture 840*c* is more visible (e.g., more opaque) than gesture 840*b*. For example, the airplane behind gesture 840*c* in FIG. 8R is less visible than the car and mountains behind gesture 840*b* in FIG. 8Q. In some embodiments gesture 840*c* has a higher visibility than gesture 840*a*. In some embodiments, gesture 840*a* has the same visibility as gesture 840*a*. In response to detecting gesture 840*b* and gesture 840*c*, computer system 800*a* (e.g., Abby's computer) displays representation 814*b* with a representation of gesture 840*b* and gesture 840*c*, which includes any or all features of representation 816*b* described with respect to FIGS. 8Q and 8R.

Figure 8S:
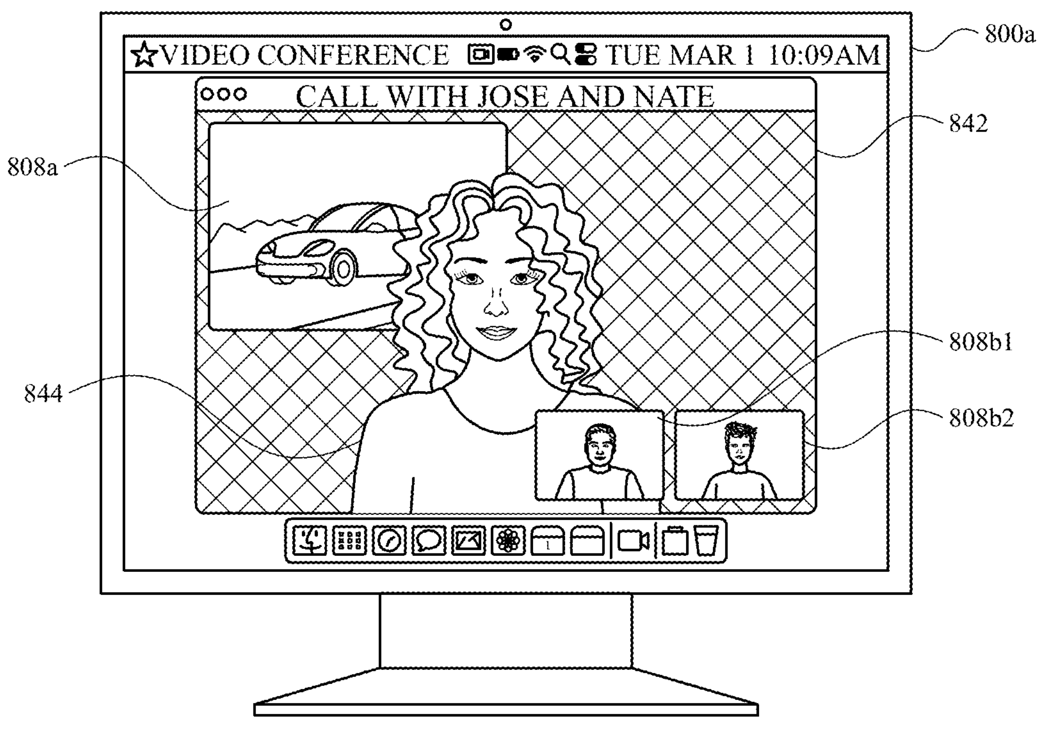

Turning to FIG. 8S, computer system 800*a* (e.g., Abby's computer) is in a real-time communication session with remote participants Jose (e.g., represented by representation 808*b*1) and Nate (e.g., represented by representation 808*b*2). The user of computer system 800*a* (e.g., Abby) is sharing shared content 808*a* in the real-time communication session. Computer system 800*a* displays real-time communication session in user interface 842, which includes a composite of representation 844 of image data (e.g., a video feed) captured by computer system 800*a* (e.g., a representation of the user of computer system 800*a* with a generic and/or blurred background) and shared content 808*a*. In FIG. 8S, shared content 808*a* is displayed behind representation 844 (e.g., in a newsroom mode, configuration, or layout). In some embodiments, a user interface of the real-time communication session is displayed on computer system 800*b* and/or computer system 800*c* described above.

Figure 8T:
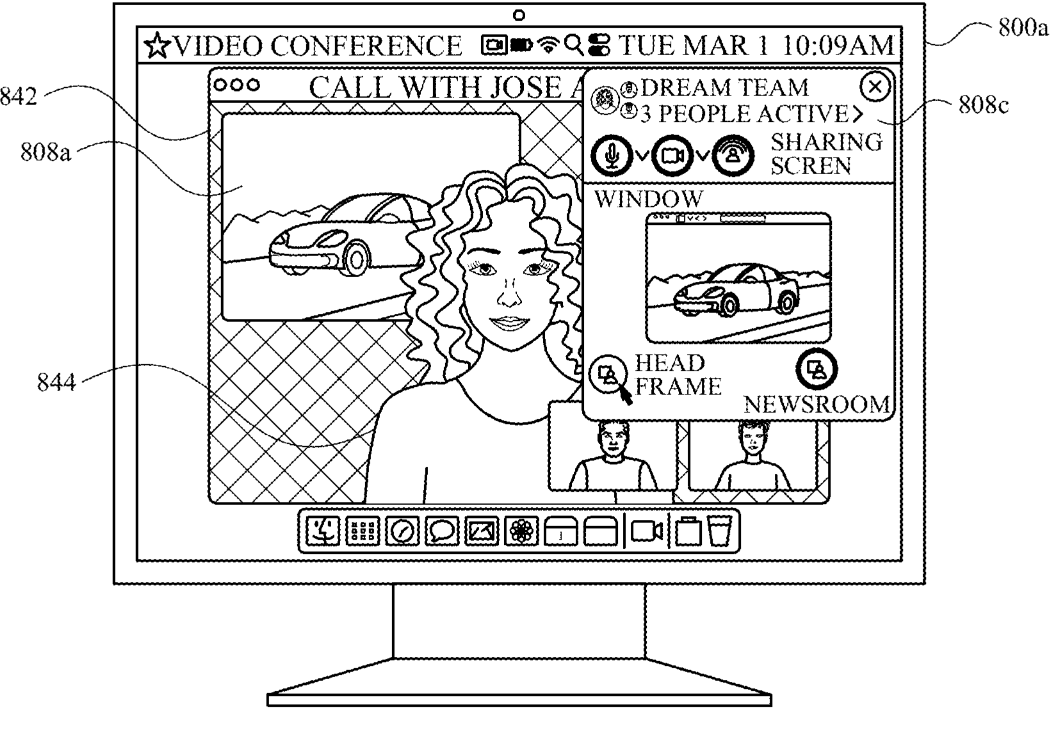
Figure 8U:
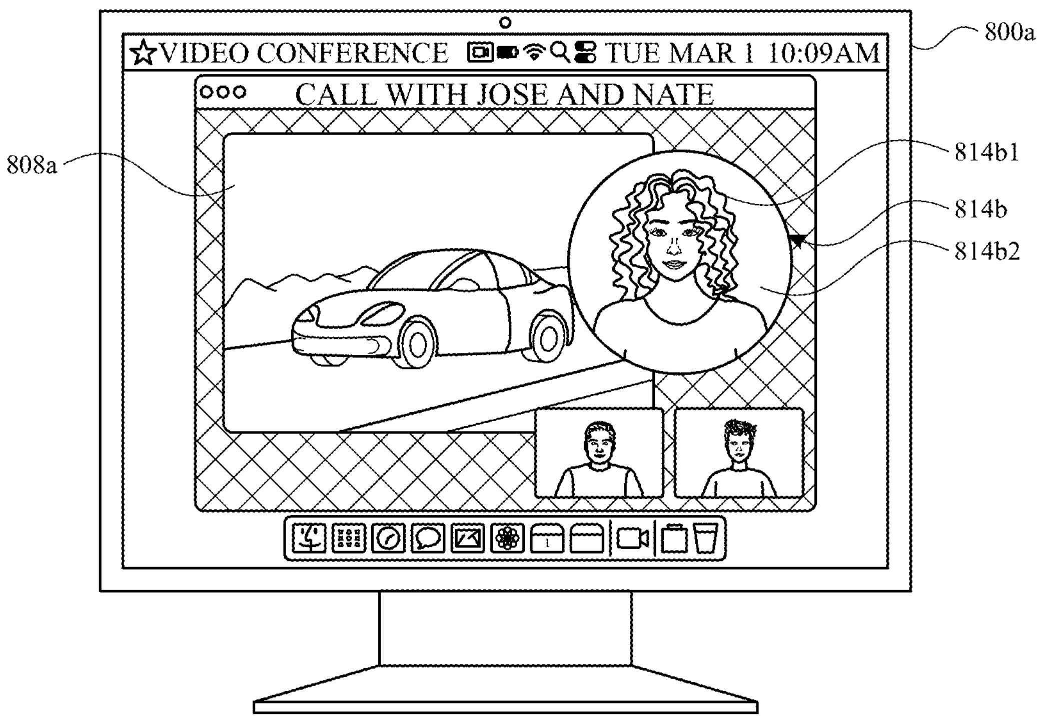
Figure 8V:
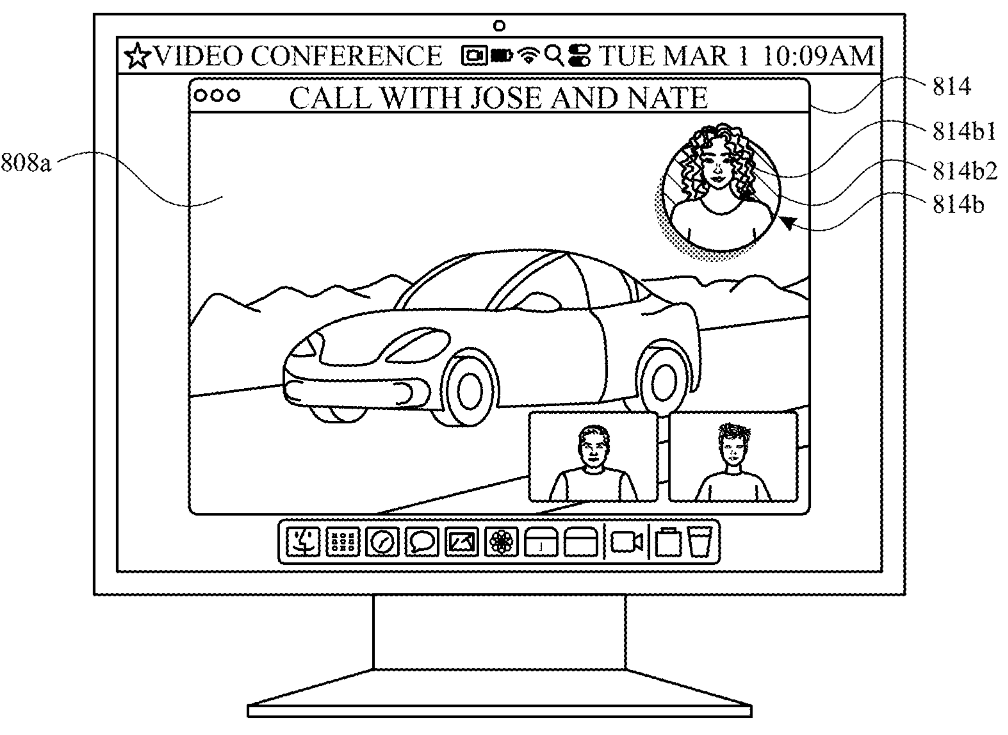

In FIG. 8T, computer system 800*a* (e.g., Abby's computer) detects (e.g., via menu 808*c*) a request to change the configuration in which shared content 808*a* and/or the representation (e.g., 844) of the sharing participant (e.g., Abby) is displayed (e.g., on computer system 800*a*, computer system 800*b*, and/or computer system 800*c*). In some embodiments, changing the configuration includes displaying an animation of the configuration changing from the configuration shown in FIG. 8T to the requested configuration. For example, in FIGS. 8U-8V, in response to the request to change the configuration in which shared content 808*a* and/or the representation (e.g., 844) of the sharing participant (e.g., Abby) is displayed, computer system 800*a* displays an animation that includes concurrently enlarging shared content 808*a* (e.g., from the size in FIG. 8T to a larger size in FIG. 8U and then an even larger size in FIG. 8V) and reducing the size of the representation of the sharing participant. In the embodiment illustrated in FIGS. 8U-8V, representation 844 of the sharing participant is replaced with representation 814*b* of the sharing participant 834 (e.g., described above with reference to user interface 814 in FIGS. 8D and 8L), where representation of sharing participant 814*b* is displayed at a first size (e.g., in FIG. 8U) and then a smaller (e.g., final) size (e.g., in FIG. 8V). As described above, representation of sharing participant 814*b* includes representation 814*b*1 of the head, neck, and/or shoulders of subject 834 and background 814*b*2.

Turning to FIG. 8W, computer system 800*a* (e.g., Abby's computer) displays user interface 814 and is sharing content 808*a* to the real-time communication session in the second mode while the participant tracking mode is active. Background 814*b*2 is displayed at a first position relative to user interface 814. In some embodiments, the participant tracking mode includes any or all features of the participant tracking mode described with respect to FIGS. 8H-8J and/or 8L-8N and/or simulated camera following effect 1028*a*, simulated camera following effect 1028*b*, simulated camera following effect 1028*c*, and/or simulated camera following effect 1028*d* described with respect to FIGS. 10L1 and 10L2. In FIG. 8W, subject 834 (e.g., Abby) is standing at the first location (e.g., a central location as described in FIG. 8L) within current field of view 832 of the one or more camera sensors in communication with computer system 800*a*.

At FIG. 8X, subject 834 (e.g., Abby) moves to a second position (e.g., the location towards the right edge of maximum range 830). In response to detecting the movement of subject 834, computer system 800*a* maintains display of background 814*b*2 at the first location relative to user interface 814 (e.g., background 814*b*1 does not move) and displays representation 814*b*1 at a second location relative to background 814*b*2 (e.g., similar to FIG. 8M). For example, representation 814*b*1 moves within background 814*b*2. In some embodiments, representation 814*b*2 obscures a second portion of background 814*b*2. For example, a portion near the edge of background 814*b*2 and/or a second portion of representation 814*b*1 is displayed outside the border of background 814*b*2 (e.g., the top of head and the right edge of the head). In some embodiments, in response to detecting the movement of subject 834, computer system 800*b* and computer system 800*c* display the representation of the participant's head and neck at a second location with respect to the background of representation 816*b*. At FIG. 8Y, subject 834 (e.g., Abby) remains at the second position. In response, computer system 800*a* shifts current field of view 832 such that subject 834 is more centered in, but still offset from a center of, current field of view 832. Also, computer system 800*a* moves background 814*b*2 to a second location relative to user interface 814 in the direction of representation 814*b*1 such that representation 814*b*1 is slightly more centered in, but still offset from a center of, background 814*b*2 (e.g., background 814*b*2 "follows" subject 834 and/or representation 814*b*1). At FIG. 8Z, subject 834 (e.g., Abby) remains at the second position. In response, computer system 800*a* shifts (e.g., further shifts) current field of view 832 such that subject 834 is centered in current field of view 832. Also, computer system 800*a* moves background 814*b*2 back to the first location relative to user interface 814 and re-centers representation 814*b*1 in a center of background 814*b*2.

FIG. 9 is a flow diagram illustrating a method for sharing content during a real-time communication session using a computer system in accordance with some embodiments. Method 900 is performed at first a computer system (e.g., 100, 300, 500, 600*a*, 600*b*, 800*a*, 800*b*, 800*c*, 1000*a*, 1000*b*, and/or 1200*a*) that is in communication with a display generation component (e.g., 801*a*, 801*b*, and/or 801*c*). Some operations in method 900 are, optionally, combined, the orders of some operations are, optionally, changed, and some operations are, optionally, omitted.

As described below, method 900 provides an intuitive way for sharing content during a real-time communication session. The method reduces the cognitive burden on a user for sharing content during a real-time communication session, thereby creating a more efficient human-machine interface. For battery-operated computing devices, enabling a user to share content during a real-time communication session faster and more efficiently conserves power and increases the time between battery charges.

In method 900, the first computer system (e.g., 800*a*, 800*b*, and/or 800*c*) displays (902), via the display generation component, a user interface (e.g., 802, 804, 806, 808, 810, 812, 814, 816, 818, 820, and/or 822) of a real-time communication session (e.g., video, one or more animated avatars, audio, and/or text sent and received in real time) between the computer system and one or more second computer systems (e.g., 800*a*, 800*b*, and/or 800*c*) (e.g., that are associated with one or more second users). While displaying the user interface of the real-time communication session (904), an input requesting to share content (e.g., 808*a*, and/or 822*a*) associated with a first participant (e.g., screen sharing content, a user interface of an application, a window that is open, and/or a screen) in the real-time communication session is received. In response to receipt (906) of the request to display the content associated with the first participant in the real-time communication session, the computer system displays, via the display generation component, a user interface element in the user interface of the real-time communication session, wherein the user interface element (e.g., 810*a*) is a composite (e.g., a composite image and/or a composite video feed) of the content (e.g., 808*a*, 810*b*, 816*a*, 820*b*, and/or 822*a*) (e.g., a representation of the content) associated with the first participant in the real-time communication session and a representation (e.g. 802*a*, 810*c*, 814*b*, 816*b*, and/or 820*c*) of the first participant (e.g., an avatar of a user, a picture of a user, and/or a video feed of a user) in the user interface of the real-time communication session. Displaying the composite of content associated with the first participant and a representation of the first participant in response to receipt of the request to display the content associated with the first participant provides participants in the real-time communication session with feedback that shared content is associated with the first participant and reduces user interface clutter by combining content associated with the first participant in the real-time communication session and a representation of the first participant in the user interface of the real-time communication session into a composite, thereby providing the user with improved visual feedback.

In some embodiments, the composite includes the content and the representation of the user displayed within the same frame. In some embodiments, the content and the representation of the first participant cannot be separated from the composite. In some embodiments, the content and the representation of the participant are composited together and cannot be moved separately. In some embodiments, the content associated with the first participant is at least partially obscured by the representation of the first participant. In some embodiments, the representation of the first participant casts a shadow on the content associated with the first participant. In some embodiments, the content associated with the first participant is not partially obscured by the representation of the first participant. In some embodiments, the content associated with the first participant is displayed over a shoulder of the representation of the first participant (e.g., in an upper corner of the user interface of the real-time video communication session and/or a content region of the user interface of the real-time video communication session). In some embodiments, the composite of the content associated with the first computer system and the representation of the first participant is transmitted to and/or displayed at the one or more second computer systems in the real-time video communication session.

In some embodiments, the representation of the first participant (e.g., 802*a*, 810*c*, 816*b*, and/or 814*b*) in the user interface of the real-time communication session (e.g., 802, 804, 806, 808, 810, 812, 814, 816, and/or 818) includes (e.g., is) a video feed of the first participant (e.g., the video feed is captured by the one or more camera sensors and/or the video feed is captured by the one or more second computer systems). Displaying the composite of content associated with the first participant and a video feed representation of the first participant in response to receipt of the request to display the content associated with the first participant provides participants in the real-time communication session with feedback that shared content is associated with the first participant and reduces user interface clutter by combining content associated with the first participant in the real-time communication session and a representation of the first participant in the user interface of the real-time communication session into a composite, thereby providing the user with improved visual feedback.

In some embodiments, the representation of the first participant (e.g., 802*a*, 810*c*, 816*b*, and/or 814*b*, and/or 820*c*) in the user interface of the real-time communication session (e.g., 802, 804, 806, 808, 810, 812, 814, 816, and/or 818) includes (e.g., is) an avatar of the first participant (e.g., a digital representation of the first participant, an animated representation of the first participant, and/or an image representing the first participant). Displaying the composite of content associated with the first participant and an avatar representation of the first participant in response to receipt of the request to display the content associated with the first participant provides participants in the real-time communication session with feedback that shared content is associated with the first participant and reduces user interface clutter by combining content associated with the first participant in the real-time communication session and a representation of the first participant in the user interface of the real-time communication session into a composite, thereby providing the user with improved visual feedback.

In some embodiments, at least a portion of the content (e.g., 808*a*, 810*b*, 816*a*, 820*b*, and/or 822*a*) associated with the first participant in the real-time communication session (e.g., screen sharing content, a user interface of an application, a window that is open, and/or a screen) is displayed (e.g., in the composite of the content associated with the first participant in the real-time communication session and the representation of the first participant), via the display generation component, behind at least a portion of the representation (e.g., 810*c*, 814*b*, 816*b*, and/or 820*c*) of the first participant (e.g., the content associated with the first participant is displayed over a shoulder of the representation of the first participant (e.g., in an upper corner of the user interface of the real-time video communication session and/or a content region of the user interface of the real-time video communication session)). Displaying a portion of the content associated with the first participant behind at least a portion of the representation of the first participant provides participants in the real-time communication session with feedback that shared content is associated with the first participant and reduces user interface clutter by combining content associated with the first participant in the real-time communication session and a representation of the first participant in the user interface of the real-time communication session into a composite, thereby providing the user with improved visual feedback.

In some embodiments, the representation of the content associated with the first participant is at least partially obscured by the representation of the first participant. In some embodiments, the representation of the first participant casts a shadow on the content associated with the first participant. In some embodiments, the content associated with the first participant is not partially obscured by the representation of the first participant. In some embodiments the content associated with the first participant is displayed at a size that is smaller, larger, or the same size as the representation of the first participant.

In some embodiments, at least a portion of the representation (e.g., 810*c*, 814*b*, 816*b*, and/or 820*c*) of the first participant obscures at least a portion of the content (e.g., a representation of the content) associated with the first participant (e.g., 808*a*, 810*b*, 816*a*, 820*b*, and/or 822*a*). Obscuring a portion of the content associated with the first participant with at least a portion of the representation of the first participant provides participants in the real-time communication session with feedback that shared content is associated with the first participant and reduces user interface clutter by combining content associated with the first participant in the real-time communication session and a representation of the first participant in the user interface of the real-time communication session into a composite, thereby providing the user with improved visual feedback. In some embodiments, the representation of the first participant includes an avatar. In some embodiments the representation of the first participant includes a frameless video feed of the participant's head (e.g., a mask is applied to the background in the video feed of the first participant and the background behind the first participant detected by the one or more camera sensors is not displayed with the representation of the first participant). In some embodiments the representation of the first participant is displayed at a smaller size than the content associated with the first participant. In some embodiments the content associated with the first participant fills the entirety of the real-time communication user interface.

In some embodiments, displaying the user interface element (e.g., 810*a*) includes displaying the representation of the first participant (e.g., 810*c*, 814*b*, 816*b*, and/or 820*c*) at a first location in the real-time communication user interface (e.g., within the composite). In some embodiments, while displaying the representation of the first participant at the first location in the real-time communication user interface, the computer system receives an input (e.g., 850*a*) (e.g., a click and drag via a mouse, a touch and drag gesture via a touch sensitive display, and/or touch a swipe gesture via a touch sensitive display) requesting to change the location of the representation of the first participant (e.g., within the composite). In response to receiving the request to change the location of the representation of the first participant, the computer system displays the representation of the first participant at a second location in the real-time communication user interface (e.g., within the composite) that is different from the first location in the real-time communication user interface (e.g., representation 814*b* and/or 816*b* is displayed at a first location before input 850*a*; and after input 850*a*, representation 814*b* and/or 816*b* is displayed at a second location as illustrated in FIGS. 8F-8G) (e.g., moving and/or changing the location of the representation of the first participant). Displaying the representation of the first participant at a second location in response to receipt of the request to change location provides the user with method to ensure that the content associated content is easily visible and not obscured by the representation of the first participant and allows the user to move the representation without accessing menus, thereby reducing the number of inputs needed to perform an operation and providing additional control options without cluttering the UI with additional displayed controls. In some embodiments the input requesting to change the location of the representation of the first participant is received via the computer system of the first participant. In some embodiments a request to change the location of the representation of the first participant is ignored if it was not detected by a computer system associated with the first participant. In some embodiments the location of the representation of the first participant is only changed on the computer system of the first participant. In some embodiments the location of the representation of the first participant is changed on the computer system and one or more other computer systems participating in the real-time communication session.

In some embodiments, displaying the user interface element (e.g., 810*a*), in the real-time communication user interface includes displaying the user interface element (e.g., displaying the content (e.g., a representation of the content) associated with the first participant and the representation of the first participant) in a first visual configuration (e.g., 810*a* as illustrated in FIG. 8B) (e.g., in a first mode, such as with the content associated with the first participant in an upper corner of the user interface of the real-time video communication session over a shoulder of the representation of the first participant). In some embodiments, after (or, in some embodiments, while) the computer system displays the user interface element in the first visual configuration, the computer system receives an input requesting to change a visual configuration of the user interface element (e.g., a cursor is selecting "Head Frame" as illustrated in FIG. 8C). In response to receiving the request to change the visual configuration of the user interface element, the computer system displays, via the display generation component, the user interface element in a second visual configuration (e.g., 810*a* as illustrated in FIG. 8D) that is different from the first visual configuration (e.g., changing or switching the visual configuration of the user interface element; e.g., a mask is applied to the background in the video feed of the first participant and the background behind the first participant detected by the one or more camera sensors is not displayed with the representation of the first participant). Displaying the user interface element in a second visual configuration in response to receipt of the request to change the visual configuration provides the user with alternative method of viewing the representation of the first participant and the associated content improves visibility of the associated content and makes the device easier to use and reduces mistakes, thereby providing improved visual feedback and reducing the number of inputs needed to perform an operation.

In some embodiments, displaying the user interface element (e.g., 810*a*) in the second visual configuration (e.g., as illustrated in FIG. 8D) includes the computer system displaying, via the display generation component, an animation of the user interface element transitioning from the first visual configuration (e.g., as illustrated in FIG. 8B) to the second visual configuration (e.g., an animation of the size of the content changing, the size of the representation of the first participant changing, and/or the location of the content and/or the representation of the first participant changing). Displaying an animation of the user interface element transitioning from the first visual configuration to the second visual configuration provides the user with feedback that the change in configuration is in response to the input request to change a visual configuration, thereby providing the user with improved visual feedback.

In some embodiments, in response to receiving the request to display the content (e.g., 808*a*, and/or 822*a*) associated with the first participant in the real-time communication session, the computer system changes display of the representation of the first participant (e.g., 810*c*, 814*b*, and/or 816*b*) from a first visual appearance to a second visual appearance that is different from the first visual appearance (e.g., reducing a prominence of the representation of the first participant, such as by reducing a size of the representation of the first participant and/or changing a location of the representation of the first participant). Changing display of the representation of the first participant from a first visual appearance to a second visual appearance in response to receipt of the request to display content associated with the first participant occurs automatically without user input, thereby performing an operation when a set of conditions has been met without requiring further user input.

In some embodiments, while displaying the user interface of the real-time communication session, the computer system receives an input requesting to share content (e.g., 822*a*) associated with a second participant (e.g., screen sharing content, a user interface of an application, a window that is open, and/or a screen) in the real-time communication session. In response to receiving the request to display the content associated with the second participant in the real-time communication session, the computer system displays, via the display generation component, (e.g., concurrently with the composite of the content associated with the first participant and representation of the first participant) a user interface element in the real-time communication user interface that is a composite (e.g., 820*a*) (e.g., a composite image and/or a composite video feed) of the content (e.g., 820*b*) associated with the second participant in the real-time communication session and a representation of the second participant (e.g., 820*c*) (e.g., an avatar of a user, a picture of a user, and/or a video feed of a user) in the user interface of the real-time communication session. Displaying a user interface element that is a composite of the content associated with the second participant and a representation of the second participant in response to receipt of the request to display the content associated with the second participant, provides the user with feedback that content is being shared and which participant the content is associated with, thereby providing the user with improved visual feedback.

In some embodiments, the composite includes the content and the representation of the user displayed within the same frame. In some embodiments, the content associated with the first participant is at least partially obscured by the representation of the first participant. In some embodiments, the representation of the first participant casts a shadow on the content associated with the first participant. In some embodiments, the content associated with the first participant is not partially obscured by the representation of the first participant. In some embodiments, the content associated with the first participant is displayed over a shoulder of the representation of the first participant (e.g., in an upper corner of the user interface of the real-time video communication session and/or a content region of the user interface of the real-time video communication session). In some embodiments, the composite of the content associated with the first computer system and the representation of the first participant is transmitted to and/or displayed at the one or more second computer systems in the real-time video communication session.

In some embodiments, the composite (e.g., 810*a*) of the content (e.g., 808*a*, 810*b*, 816*a*, 820*b*, and/or 822*a*) associated with the first participant in the real-time communication session and the representation of the first participant (e.g., 810*c*, 814*b*, 816*b*, and/or 820*c*) in the user interface of the real-time communication session is received by a real-time communication application associated with the real-time communication session as a single video feed (e.g., the real-time communication session does not perform the compositing of the content and the representation of the first participant). Receiving the composite of the content associated with the first participant and the representation of the first participant as a single video feed occurs without additional user input to combine the content with the representation, thereby performing an operation when set of conditions has been met without requiring further user input and reducing the number of inputs needed to perform an operation. In some embodiments, the content and representation of the first participant are composited by a secondary application before being received by the real-time communication session.

In some embodiments, while displaying the user interface (e.g., 802, 804, 806, 808, 810, 812, 814, 816, 818, 820, and/or 822) of the real-time communication session, the computer system receives data that indicates that a video feed of the real-time communication session includes the content associated with the first participant in the real-time communication session and a representation of the first participant (e.g., 810*c*, 814*b*, 816*b*, and/or 820*c*). Receiving data that indicates that the video feed includes the content associated with the first participant and the representation of the first participant allows the computer system to understand that the video feed includes content and the representation of the first participant without user input, thereby reducing the inputs needed to perform an operation. In some embodiments, in response to receiving the data that indicates that the video feed of the real-time communication session includes the content associated with the first participant in the real-time communication session and the representation of the first participant, the computer system visually emphasizes (e.g., highlights, enlarges, and/or outlines) the user interface element (e.g., the composite). In some embodiments, emphasizing the composite includes increasing the size of the composite relative to other user interface elements and/or decreasing the size of other user interface elements. In some embodiments, the composite is emphasized with a highlighted border.

In some embodiments, displaying the user interface element (e.g., 810*a*) includes displaying a segmented representation of the first participant (e.g., 814*b*, 814*d*, 816*b*, and/or 816*d*) (e.g., an avatar of a user, a picture of a user, and/or a video feed of a user) without displaying a background of the first participant that is captured in a field of view of one or more camera sensors that includes the first participant (e.g., the representation of the first participant included in the composite includes a segmented representation of the first participant that has been segmented from a background of the first participant). Displaying a segmented representation of the first participant without displaying a background of the participant provides the participants in the real-time communication session with feedback that the first participant is sharing content and removes distractions contained in the background of the first participant, thereby providing improved feedback. In some embodiments, the computer system displays the segmented representation of the first participant with a simulated background. In some embodiments the background of the first participant is identified using depth map information. In some embodiments the physical background of the first participant is removed with a mask.

In some embodiments, displaying the user interface element (e.g., 810*a*) includes displaying the segmented representation of the first participant (e.g., 814*b*, 814*d*, 816*b*, and/or 816*d*) with a simulated background (e.g., the simulated background is displayed behind at least a portion of the segmented representation of the first participant). Displaying a segmented representation of the first participant with a simulated background provides the participants in the real-time communication session with feedback that the first participant is sharing content and removes distractions contained in the background of the first participant, thereby providing improved feedback. In some embodiments, the background is a single color or a set of colors, such as red, yellow, and/or cyan.

In some embodiments, the simulated background occupies a first portion of the user interface of the real-time communication session, and wherein the segmented representation (e.g., 814*b*, 814*d*, 816*b*, and/or 816*d*) of the first participant occupies a second portion of the user interface of the real-time communication session that is not included in the first portion of the user interface of the real-time communication session (e.g., at least a portion of the segmented representation of the first participant (e.g., the head, torso, hands, and/or legs of the segmented representation) is displayed outside of the first portion of the user interface of the real-time communication session that is occupied by the simulated background). Displaying the simulated background occupying a first portion of the user interface and displaying the segmented representation of the second participant occupying a second portion provides the user with feedback that the segmented representation of the first participant is distinct from the simulated background and that the simulated background is a simulated background not in the field of view of the one or more camera sensors, thereby providing improved visual feedback.

In some embodiments, displaying the user interface element (e.g., 810*a*) (e.g., the composite) includes displaying a representation of a shadow (e.g., a background shadow) of the segmented representation of the first participant (e.g., 814*b*, 814*d*, 816*b*, and/or 816*d*) on the content associated with the first participant as a background of the segmented representation of the first participant. Displaying the user interface element including displaying a representation of a shadow provides the user with visual feedback that the representation of the first participant is distinct from the shared content associated with the first participant, thereby providing improved visual feedback. In some embodiments, the representation of the shadow includes a shadow effect around the border of the representation of the first participant which gives the impression of depth between the representation of the first participant and the content associated.

In some embodiments, the representation of the first participant (e.g., 810*c*, 814*b*, 816*b*, 814*d*, 816*d*, and/or 820*c*) includes an avatar corresponding to a portion of the first participant (and, in some embodiments, an image captured by one or more camera sensors of a portion of the first participant other than the portion of the first participant corresponding to the avatar). Displaying the representation of the first participant including an avatar provides the user with visual feedback that the representation of the first participant in the composite is distinct from the representation of the first participant outside of the composite, thereby providing improved visual feedback. In some embodiments, the head of the first participant is replaced with (e.g., represented by) an avatar head. In some embodiments, the avatar head is displayed with video data captured by the one or more camera sensors of a neck and/or shoulders of the first participant. In some embodiments, the entire upper body of the first participant is replaced with (e.g., represented by) an avatar.

In some embodiments, while the computer system displays, via the display generation component, the user interface element (e.g., 810*a*) in the real-time communication user interface, the computer system receives a request to add a second participant to the user interface element (e.g., a request to add a representation of a second participant, different from the first participant, to the composite). In response to receiving the request to add a second participant, the computer system displays, via the display generation component, a composite (e.g., a composite image and/or a composite video feed) of the content associated with the first participant in the real-time communication session, a representation of the first participant (e.g., 814*b* and/or 816*b*) (e.g., the same representation of the first participant or a different representation of the first participant) in the user interface of the real-time communication session, and a representation of the second participant (e.g., 814*d* and/or 816*d*) in the user interface of the real-time communication session (e.g., a representation of the second participant is added to the composite). Displaying a composite of the content associated with the first participant and a representation of the second participant in the real-time communication session provides feedback that the second participant is a co-presenter of the content associated with the first participant, thereby providing improved visual feedback.

In some embodiments, displaying the user interface element (e.g., 810*a*) (e.g., the composite of the content associated with the first participant and the representation of the first participant) includes displaying the content (e.g., 808*a*, 810*b*, 816*a*, 820*b*, and/or 822*a*) associated with the first participant at a first content location in the real-time communication user interface (e.g., within the composite; e.g., with respect to the representation of the first participant; e.g., a first content position within the frame of the composite). While displaying the user interface element and while a participant tracking mode is active (e.g., a mode is enabled in which the computer system maintains (or attempts to maintain) the representation of the first participant at or near a center of the user interface element), the computer system detects movement of the first participant (e.g., 834) from a first participant position (e.g., as described with respect to FIG. 8H, the subject is in a central location with respect to the one or more camera sensors) (e.g., in the field of view of one or more camera sensors) to a second participant position (e.g., as described with respect to FIG. 8I, the subject has moved to the right of the camera's field of view) that is different from the first participant position. In response to detecting the movement of the first participant, the computer system displays, via the display generation component, the content (e.g., 810*b* and/or 816*a*) associated with the first participant in the real-time communication session at the first content position (e.g., as described with respect to FIG. 8I) within the user interface element (e.g., the content does not change position within the frame of the composite). Displaying the content associated with the first participant in the real-time communication session at the first content position within the user interface element in response to detecting the movement of the first participant improves visibility of the content without the need for the presenter to manually adjust the content position, thereby providing improved visual feedback and reducing the number of inputs needed to perform an operation.

In some embodiments, displaying the user interface element (e.g., 810*a*) (e.g., the composite of the content associated with the first participant and the representation of the first participant) includes displaying the content (e.g., 810*b* and/or 816*a*) associated with the first participant at a first content location in the real-time communication user interface (e.g., within the composite; e.g., with respect to the representation of the first participant; e.g., a first content position within the frame of the composite). While displaying the user interface element (e.g., the composite of the content associated with the first participant and the representation of the first participant) and while a participant tracking mode is not active (e.g., a mode in which the computer system attempts to maintain the representation of the first participant at or near a center of the frame is not enabled; and/or the computer system does not attempt to maintain the representation of the first participant at or near the center of the frame), the computer system (e.g., 800*a*, 800*b*, and/or 800*c*) detects movement of the first participant (e.g., 834) from a first participant position (e.g., as described with respect to FIG. 8H, the subject is in a central location with respect to the one or more camera sensors) (e.g., in the field of view of one or more camera sensors) to a second participant position (e.g., as described with respect to FIG. 8J, the subject has moved to the edge of field of view of the one or more camera sensors) that is different from the first participant position. In response to detecting the movement of the first participant, displaying the content associated with the first participant at a second content position relative to the representation of the first participant (e.g., as described with respect to FIG. 8J, the content is obscured by the representation of the sharing participant) (e.g., the representation of the first participant has moved, but the content is displayed at the same location relative to the field of view of the one or more camera sensors). In some embodiments, at least a portion of the content is obscured by the representation of the first participant; while the first participant is at the second participant position (e.g., the first participant has moved in front of the content). Displaying the content associated with the first participant in the real-time communication session at the second content position within the user interface element in response to detecting the movement of the first participant improves visibility of the content without the need for the presenter to manually adjust the content position, thereby providing improved visual feedback and reducing the number of inputs needed to perform an operation.

In some embodiments, displaying the user interface element (e.g., 810*a*) (e.g., the composite of the content associated with the first participant and the representation of the first participant) includes displaying the content associated with the first participant at a first content location (e.g., as described with respect to FIG. 8K, the first position is indicated by dotted lines in the top left corner of the user interface on Nate's computer) in the real-time communication user interface (e.g., within the composite; e.g., with respect to the representation of the first participant; e.g., a first content position within the frame of the composite). While displaying the user interface element (e.g., the composite of the content associated with the first participant and the representation of the first participant), the computer system (e.g., 800*a*, 800*b*, and/or 800*c*) detects a user input (e.g., 850*b*) corresponding to a request to change the location of the content associated with the first participant. In response to detecting the user input, the computer system displays the content associated with the first participant at a second content location in the real-time communication user interface that is different from the first content location (e.g., as described with reference to FIG. 8K, the content has moved to a different corner) (e.g., the computer system moves the content to a different location in the user interface element in accordance with the user input). In some embodiments, the user input is a click-and-drag gesture, a swipe gesture, and/or a tap-and-drag gesture. Displaying the content associated with the first participant at the second content location in response to detecting the user input corresponding to a request to change the location of the content associated with the first participant provides the user with alternative methods to display the content associated with the first participant and improves visibility of the associated content and makes the device easier to use and reduces mistakes, thereby providing improved visual feedback and reducing the number of inputs needed to perform an operation.

In some embodiments, the second content location (e.g., as described with respect to FIG. 8K) is a first predetermined position of a plurality of predetermined positions. Displaying the content associated with the first participant at a predetermined position in response to detecting the user input corresponding to a request to change the location of the content associated with the first participant provides the user with alternative methods to display the content associated with the first participant and improves visibility of the associated content and makes the device easier to use and reduces mistakes, thereby providing improved visual feedback and reducing the number of inputs needed to perform an operation. In some embodiments, the user input corresponding to the request to change the location of the content associated with the first participant includes an input that corresponds to (e.g., ends at and/or is directed to) a first location in the real-time communication user interface; and in response to detecting the input that corresponds to the first location, the computer system displays the content associated with the first participant at (e.g., moves the content to) a second location (e.g., a predetermined location) in the real-time communication user interface that is different from the first location (e.g., the computer system moves and/or snaps the content to the second location instead of the first location). In some embodiments, in response to detecting the input that corresponds to the first location, the computer system moves the content associated with the first participant to the first location and then moves the content to the second (e.g., predetermined) location in response to an end of the input (e.g., a touch and drag gesture and/or a contact on a touch-sensitive surface being ended and/or lifted). In some embodiments, the user input is a click-and-drag gesture, a swipe gesture, a keyboard input, and/or a tap-and-drag gesture corresponding to content in the composite. In some embodiments, the second content location is a predefined content location in a set of predefined content locations, for example, the four corners of the composite and/or a centered position near an edge of the composite.

In some embodiments, the second content location (e.g., as described with respect to FIG. 8K) is defined by a user input (e.g., 850*b*). Displaying the content associated with the first participant at a position defined by the user input in response to detecting the user input corresponding to a request to change the location of the content associated with the first participant provides the user with alternative methods to display the content associated with the first participant and improves visibility of the associated content and makes the device easier to use and reduces mistakes, thereby providing improved visual feedback and reducing the number of inputs needed to perform an operation. In some embodiments, a user can select (e.g., via input at the computer system) one or more predefined locations at which the content associated with the first participant can be displayed. In some embodiments, the second content location is a location at which the user input corresponding to the request to change the location of the content associated with the first participant (e.g., a tap and drag gesture) ends.

In some embodiments, displaying the representation (e.g., 814*b*) of the first participant (e.g., 834) (e.g., an avatar of a user, a picture of a user, and/or a video feed of a user) includes displaying a first portion (e.g., 814*b*1) of the representation of the first participant at a first location relative to a simulated background (e.g., 814*b*2) that is displayed at a respective location in the user interface (e.g., 814 and/or 816) of the real-time communication (e.g., within the composite). In some embodiments, at least a portion of the representation of the first participant (e.g., the head, torso, hands, and/or legs of the segmented representation) is displayed outside of the portion of the user interface of the real-time communication session that is occupied by the simulated background). While displaying the user interface element (e.g., 810*a*) (e.g., the composite) and while a participant tracking mode is active (e.g., a mode is enabled in which the computer system (e.g., 800*a*, 800*b*, and/or 800*c*) maintains (or attempts to maintain) the representation of the first participant at or near a center of the user interface element), the computer system detects movement of the first participant from a first participant position (e.g., as described with respect to FIGS. 8L-8N) (e.g., in the field of view of one or more camera sensors) to a second participant position that is different from the first participant position. After (e.g., in response to) detecting the movement of the first participant, the computer system (e.g., 800*a*, 800*b*, and/or 800*c*) displays, via the display generation component, the first portion of the representation of the first participant at a first location relative to the simulated background (e.g., the representation of the first participant remains displayed in front of the simulated background; even though, the participant has moved in the field of view). Displaying the first portion of the representation of the first participant at a first location relative to the simulated background after detecting movement of the first participant provides the user with a way to move while sharing content without needing to adjust the position of the content or the representation of the participant after moving, thereby reducing the number of inputs need to perform an operation.

In some embodiments, in response to detecting the movement of the first participant (e.g., 834), the computer system (e.g., 800*a*, 800*b*, and/or 800*c*) displays, via the display generation component, the first portion (e.g., 814*b*1) of the representation of the first participant with the simulated background (e.g., 814*b*2) at the respective location in the user interface of the real-time communication (e.g., as described with respect to FIGS. 8L-8N, the representation does not change locations with respect to the shared content) (e.g., the representation of the first participant has not moved with respect to the content and is displayed at the first representation location relative to the content; e.g., the representation of the first participant does not change position within the frame of the composite). Displaying the first portion of the representation of the first participant with the simulated background at the respective location provides the user with a way to move while sharing content without needing to adjust the position of the content or the representation of the participant after moving, thereby reducing the number of inputs needed to perform an operation.

In some embodiments, in response to detecting the movement of the first participant, the computer system (e.g., 800*a*, 800*b*, and/or 800*c*) displays, via the display generation component, the first portion (e.g., 814*b*1) of the representation of the first participant at a second location relative to the simulated background (e.g., 814*b*2) (e.g., obscuring a second area of the simulated background; e.g., a non-centered position and/or a position near the edge of the simulated background) that is different from the first location relative to the simulated background (e.g., as described with respect to FIG. 8M, the representation of the sharing participant moves in front of the simulated background with changing location with respect to the shared content). Displaying the first portion of the representation of the first participant at a second location relative to the simulated background in response to detecting the movement of the first participant provides the user with feedback that the movement of the participant has been detected by the one or more camera sensors without requiring the user to adjust the location of the representation of the first participant, thereby providing the user with improved visual feedback.

In some embodiments, after displaying the first portion (e.g., 814*b*1) of the representation of the first participant at a second location relative to the simulated background (e.g., 814*b*2), moving the first portion of the representation of the first participant to the first location relative to the simulated background (e.g., as described with respect to FIG. 8N, the representation returns to the center position in front of the simulated background after the subject stops moving with respect to the one or more camera sensors) (e.g., the representation of the head of the first participant moves within the simulated background when the participant moves and then is moved back to a center of the simulated background). Moving the first portion of the representation of the first participant to the first location relative to the simulated background after displaying the first portion of the representation of the first participant at a second location relative to the simulated background provides the user with feedback that the first participant has stopped moving, thereby providing the user with improved visual feedback.

In some embodiments, displaying the representation (e.g., 814*b* and/or 816*b*) (e.g., the segmented representation) of the first participant includes applying a mask (e.g., 836) (e.g., a mask that transitions from a first transparency (e.g., no transparency) in a first area to a second transparency (e.g., full transparency) in a second area) to at least a portion of the representation of the first participant (e.g., 834), including displaying a first portion (e.g., 814*b*1) of the representation of the first participant with a first visibility and displaying a second portion (e.g., 840*a*, 840*b*, and/or 840*c*) of the representation of the first participant that is different from the first portion of the representation of the first participant with a second visibility that is different from the first visibility (e.g., the mask has different transparency at different locations such that different portions of the representation of the first participant have different visibilities when the mask is applied). Applying a mask to at least a portion of the representation of the first participant occurs automatically without user input, thereby reducing the number of inputs needed to perform an operation.

In some embodiments, the first portion (e.g., 840*b* and/or 840*c*) of the representation of the first participant (e.g., 834)

is displayed at a first vertical location in the user interface of the real-time communication and the second portion (e.g., 840*b* and/or 840*c*) of the representation of the first participant is displayed at a second vertical location in the user interface of the real-time communication that is different from the first vertical location in the user interface of the real-time communication (e.g., the mask has a vertical gradient that varies along a vertical direction of the user interface of the real-time communication). In some embodiments, a top of the mask is more transparent than a bottom of the mask (e.g., the top of the mask is fully transparent and the bottom on the mask is not transparent). Applying a mask to at least a portion of the representation of the first participant including displaying a first portion of the representation of the first participant that is at a first vertical location with a first visibility and displaying a second portion of the representation of the first participant that is at a second vertical location with a second visibility provides the user with a method to change visibility of first and second portion without needing additional user interface elements, thereby providing additional control options without cluttering the UI with additional displayed controls.

In some embodiments, the first visibility is greater than the second visibility (e.g., when the mask is applied, the first portion of the representation of the first participant is more visible than the second portion of the representation of the first participant).

In some embodiments, the first portion of the representation of the first participant (e.g., 834) includes a representation of one or more hands of the first participant. In accordance with a determination that the one or more hands of the first participant are above a head of the first participant (e.g., as described with respect to FIG. 8R the visibility of gesture 840*c* is higher than the visibility of gesture 840*b* described with respect to FIG. 8Q), the computer system (e.g., 800*a*, 800*b*, and/or 800*c*) displays the representation of the one or more hands of the first participant with a first hand visibility. In accordance with a determination that the one or more hands of the first participant are below the head of the first participant, the computer system displays the representation of the one or more hands of the first participant with a second hand visibility that is less than the first hand visibility. Displaying the one representation of the one or more hands of the first participant with a first hand visibility in accordance with a determination that the one or more hands are above the head of the first participant and displaying the representation of the one or more hands of the first participant with a second hand visibility that is less than the first hand visibility in accordance with a determination that the one or more hands of the first participant are below the head of the first participant provides the user with a method to disable their hands in the representation at different visibilities without requiring additional displayed controls, thereby Providing additional control options without cluttering the UI with additional displayed controls In some embodiments, applying the mask (e.g., 836) includes displaying the representation (e.g., 814*b*) of the first participant (e.g., 834) without reducing a visibility of the representation of the first participant in a predefined region (e.g., 836*a*) (e.g., a circular region; the mask includes a transparent (e.g., fully transparent) portion; and/or the mask is not applied to the region and/or to the portion of the representation of the first participant that is within the region) (e.g., the portion of the representation of the first participant in the transparent portion of the mask is fully visible). Displaying the representation of the first participant without reducing the visibility of the representation of the first participant in the predefined region improves the visibility of the representation of the first participant, thereby providing improved visual feedback. In some embodiments, the transparent portion is in the shape of a polygon. In some embodiments, the head and/or shoulders of the representation of the first participant are centered in the predetermined region (e.g., the head and shoulders of the first participant are displayed without reduced visibility, while the visibility of other portions of the participant outside the predetermined region is reduced).

In some embodiments, applying the mask (e.g., 836) includes displaying a portion (e.g., 840*a*) of the representation of the first participant outside of the predefined region (e.g., 836*a* with a visibility that is less than the visibility of the representation of the first participant in the predefined region. Displaying a portion of the representation of the first participant outside of the predefined region with a visibility that is less than the visibility of the representation of the first participant in the predefined region improves the visibility of the representation of the first participant, thereby providing improved visual feedback. In some embodiments, in accordance with a determination that a portion of the representation of the first participant is not within the predefined region, the computer system displays the portion of the representation of the first participant with a first visibility, and, in accordance with a determination that the portion of the representation of the first participant is outside the predefined region, the computer system displays the portion of the representation of the first portion at second visibility that is less than the first visibility.

In some embodiments, displaying the user interface element that is a composite of the content associated with the first participant and the representation of the first participant includes displaying the content associated with the first participant at a first size and displaying the representation of the first participant at a second size, and in response to a request (e.g., as described in FIG. 8T) to change a layout of the composite, the computer system displays, via the display generation component, an animation over time of the content associated with the first participant enlarging (e.g., from the first size to a third size that is larger than the first size) and the representation of the first participant reducing in size (e.g., from the second size to a fourth size that is smaller than the second size), wherein displaying the animation includes displaying (e.g., when the animation is complete and/or after the animation) the representation of the first participant in front of a simulated background (e.g., a circular region) (e.g., the animation shown and described in FIGS. 8T-8V).

In some embodiments, displaying the user interface element that is a composite of the content (e.g., 808*a*) associated with the first participant and the representation (e.g., 814*b*1) of the first participant includes displaying the representation of the first participant in front of a simulated background (e.g., 814*b* and/or a circular region), wherein the simulated background occupies a first portion of the user interface element (e.g., 814*b*2 in FIG. 8W), the computer system detects a movement (e.g., a horizontal movement) of the person (e.g., movement of 834 in FIG. 8X); and in response to detecting the movement of the person, the computer system displays the representation of the first participant in front of the simulated background, wherein the simulated background occupies a second portion of the user interface element (e.g., 814*b*2 in FIG. 8Y) that is different from the first portion of the user interface element (e.g., the computer system moves the simulated background in accordance with the movement of the person). ISE, the representation of the person moves relative to the simulated background. ISE, the simulated background follows the movement of the representation of the person (e.g., in the same direction but by a lesser amount).

Note that details of the processes described above with respect to method 900 (e.g., FIG. 9) are also applicable in an analogous manner to the methods described below/above. For example, method 700 optionally includes one or more of the characteristics of the various methods described above with reference to method 900. For example, method 700 optionally displays a hint that graphical effects can be displayed in response to gestures while content associated with a computer system is shared. As another example, method 750 optionally includes one or more of the characteristics of the various methods described above with reference to method 900. For example, method 750 optionally displays a graphical effect in response to detecting a gesture and forgoes displaying a graphical effect in response to detecting a gesture if a set of criteria is not met while a computer system is sharing content associated with a participant. As another example, method 1100 optionally includes one or more characteristics of the various methods described above with reference to method 900. For example, method 1100 optionally changes how shared content is displayed in accordance with the value of a parameter. As another example, method 1300 optionally includes one or more characteristics of the various methods described above with reference to method 900. For example, method 1300 optionally frames a representation of a sharing participant while content is being shared. For brevity, these details are not repeated below.

FIGS. 10A-10Q illustrate exemplary user interfaces for displaying graphical effects in multiple different video applications, in accordance with some embodiments. The user interfaces in these figures are used to illustrate the processes described below, including the processes in FIGS. 11A-11B FIG. 10A illustrates computer system 1000*a* and computer system 1000*b*. Computer system 1000*a* is associated with participant Gustav. Computer system 1000*b* is associated with participant Maria. Computer system 1000*a* and computer system 1000*b* are in communication via a first real-time communication session using video application 1. Computer system 1000*a* and computer system 1000*b* are in communication via a second real-time communication session via using video application 2. In some embodiments, computer system 1000*a* and computer system 1000*b* run video application 1 and video application 2 at different points in time. In some embodiments, computer system 1000*a* and computer system 1000*b* run video application 1 and video application 2 at the same time. While running video application 1 computer system 1000*a* displays user interface 1002*a* and computer system 1000*b* displays user interface 1002*c*. While running video application 2 computer system 1000*a* displays user interface 1002*b* and computer system 1000*b* displays user interface 1002*d*.

User interface 1002*a* includes primary representation 1004*a* of the participant associated with computer system 1000*b* (e.g., video captured by one or more cameras of computer system 1000*b*) and secondary representation 1006*a* (e.g., a self-view and/or video captured by one or more cameras of computer system 1000*a*). User interface 1002*b* includes primary representation 1004*b* of the participant associated with computer system 1000*b* (e.g., video captured by one or more cameras of computer system 1000*b*) and secondary representation 1006*b* (e.g., a self-view and/or video captured by one or more cameras of computer system 1000*a*). User interface 1002*c* includes primary representation 1004*c* of the participant associated with computer system 1000*a* (e.g., video captured by one or more cameras of computer system 1000*a*) and secondary representation 1006*c* (e.g., a self-view and/or video captured by one or more cameras of computer system 1000*b*). User interface 1002*d* includes primary representation 1004*d* of the participant associated with computer system 1000*a* (e.g., video captured by one or more cameras of computer system 1000*a*) and secondary representation 1006*d* (e.g., a self-view and/or video captured by one or more cameras of computer system 1000*b*). Collectively primary representation 1004*a*, primary representation 1004*b*, primary representation 1004*c*, and primary representation 1004*d* are referred to primary representation 1004. Primary representation 1004 is a representation of the participant in the real-time communication session that is not associated with the respective computer. For example, on computer system 1000*a* (e.g., Gustav's computer) primary representation 1004*a* and primary representation 1004*b* are representations of Maria, and on computer system 1000*b* (e.g., Maria's computer) primary representation 1004*c* and primary representation 1004*d* are representations of Gustav.

Collectively secondary representation 1006*a*, secondary representation 1006*b*, secondary representation 1006*c*, and secondary representation 1006*d* are referred to as secondary representation 1006. Secondary representation 1006 is a representation of the participant associated with the respective computer system (e.g., a self-view). For example, on computer system 1000*a* (e.g., Gustav's computer) secondary representation 1006*a* and secondary representation 1006*b* is a representation of Gustav and on computer system 1000*b* (e.g., Maria's computer) secondary representation 1006*c* and secondary representation 1006*d* are representations of Maria. In some embodiments, the sizes and/or relative position of the user interface elements of video application user interface 1002 may be adjustable and/or different than depicted. In some embodiments, primary representation 1004 and secondary representation 1006 include still images, avatars, animated avatars, and/or video feeds from one or more camera sensors in communication with computer system 1000*a*, and computer system 1000*b*.

At FIG. 10A, Gustav has opened menu 1008 on computer system 1000*a*. In some embodiments, menu 1008 is associated with the operating system of computer system 1000*a* and is the same menu regardless of video application. In some embodiments, menu 1008 includes options to apply graphical effects, lighting effects, and/or share content. In some embodiments, menu 1008 includes a preview thumbnail of selected effects and/or shared content before the effects are applied to primary representation 1004*a* and/or secondary representation 1006. While displaying user interface 1002*a*, computer system 1000*a* detects user input 1050*a*, corresponding to a request to display a thumbs up graphical effect. In some embodiments, user input 1050*a* is a mouse and/or keyboard input, and/or a touch input via touch-sensitive display. In response to detecting user input 1050*a*, computer system 1000*a* displays graphical effect 1010*a*, in secondary presentation 1006*a*. In response to user input 1050*a*, computer system 1000*b* displays graphical effect 1010*c* in primary representation 1004*c*. While displaying user interface 1002*b*, computer system 1000*a* detects user input 1050*b* corresponding to a request to display a thumbs up graphical effect. In some embodiments, user input 1050*b* is a mouse and/or keyboard input, and/or a touch input via touch-sensitive display. In response to detecting user input 1050*b*, computer system 1000*a* displays graphical effect 1010*b* in secondary presentation 1006*b*. While displaying user interface 1002*d*, and in response to user input 1050*b*, computer system 1000*b* displays graphical effect 1010*d* in primary representation 1004*d*. Collectively graphical effect 1010*a*, graphical effect 1010*b*, graphical effect 1010*c*, and graphical effect 1010*d* are referred to as graphical effect 1010. In some embodiments, graphical effect 1010 is a graphical representation of a thumbs up gesture (e.g., an emoji). In some embodiments, graphical effect 1010 can include any or all features of graphical effect 616*a* and graphical effect 616*b* as described with reference to FIG. 6E.

Figure 10B:
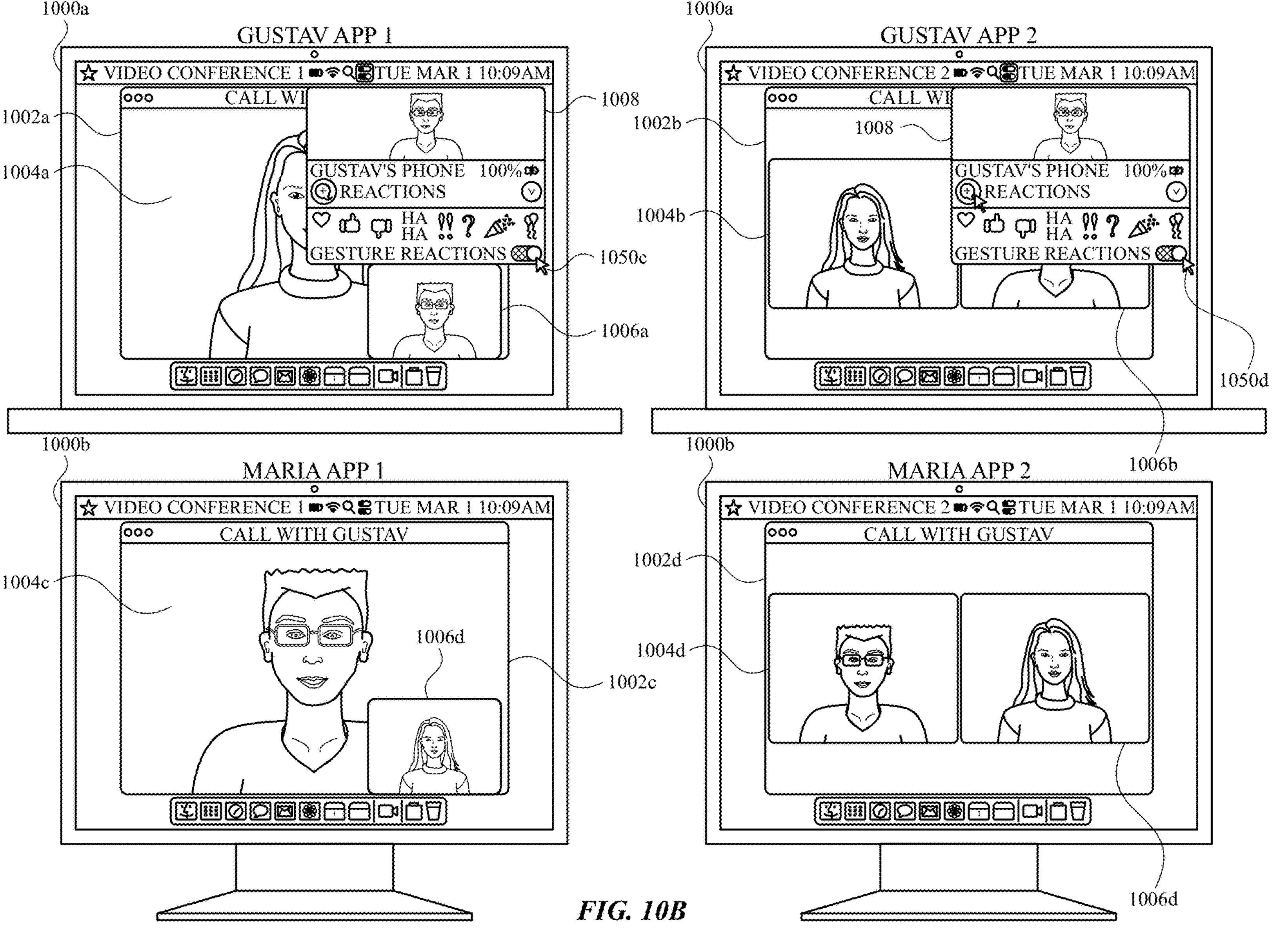

At FIG. 10B, while displaying user interface 1002*a*, computer system 1000*a* detects user input 1050*c*, corresponding to a request to turn on gesture-based reactions (e.g., display graphical effects in response to detecting a participant performing a gesture) via operating system menu 1008. While displaying user interface 1002*b*, computer system 1000*a* detects user input 1050*d*, corresponding to a request to turn on gesture-based reactions (e.g., display graphical effects in response to detecting a participant performing a gesture) via operating system menu 1008.

Figure 10C:
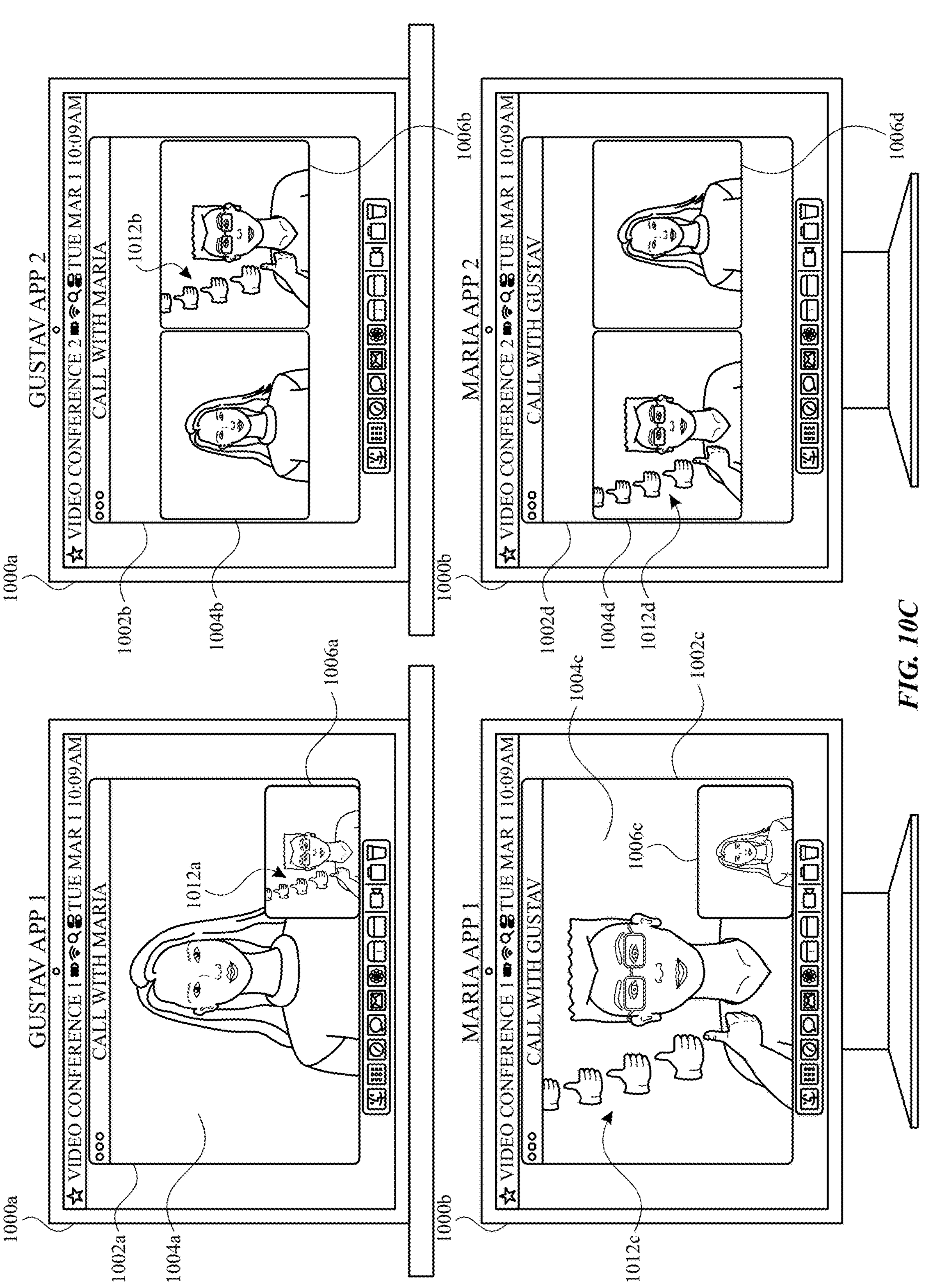

At FIG. 10C, computer system 1000*a* detects Gustav performing a thumbs up gesture with his right hand. While displaying user interface 1002*a*, in response to detecting Gustav performing a thumbs up gesture, computer system 1000*a* displays graphical effect 1012*a* in secondary representation 1006*a*. While displaying user interface 1002*b*, in response to detecting Gustav performing a thumbs up gesture, computer system 1000*a* displays graphical effect 1012*b* in secondary representation 1006*b*. In response to detecting Gustav performing a thumbs up gesture, while displaying user interface 1002*c*, computer system 1000*b* displays graphical effect 1012*c* in primary representation 1004*c*. While displaying user interface 1002*d*, in response to detecting Gustav performing a thumbs up gesture, computer system 1000*b* displays graphical effect 1012*d* in primary representation 1004*c*. In some embodiments, graphical effect 1012*a*, graphical effect 1012*b*, graphical effect 1012*c*, and graphical effect 1012*d* can include any or all features of the characteristics of graphical effect 618*a* and graphical effect 618*b* described with reference to FIGS. 6G-6J.

Figure 10D:
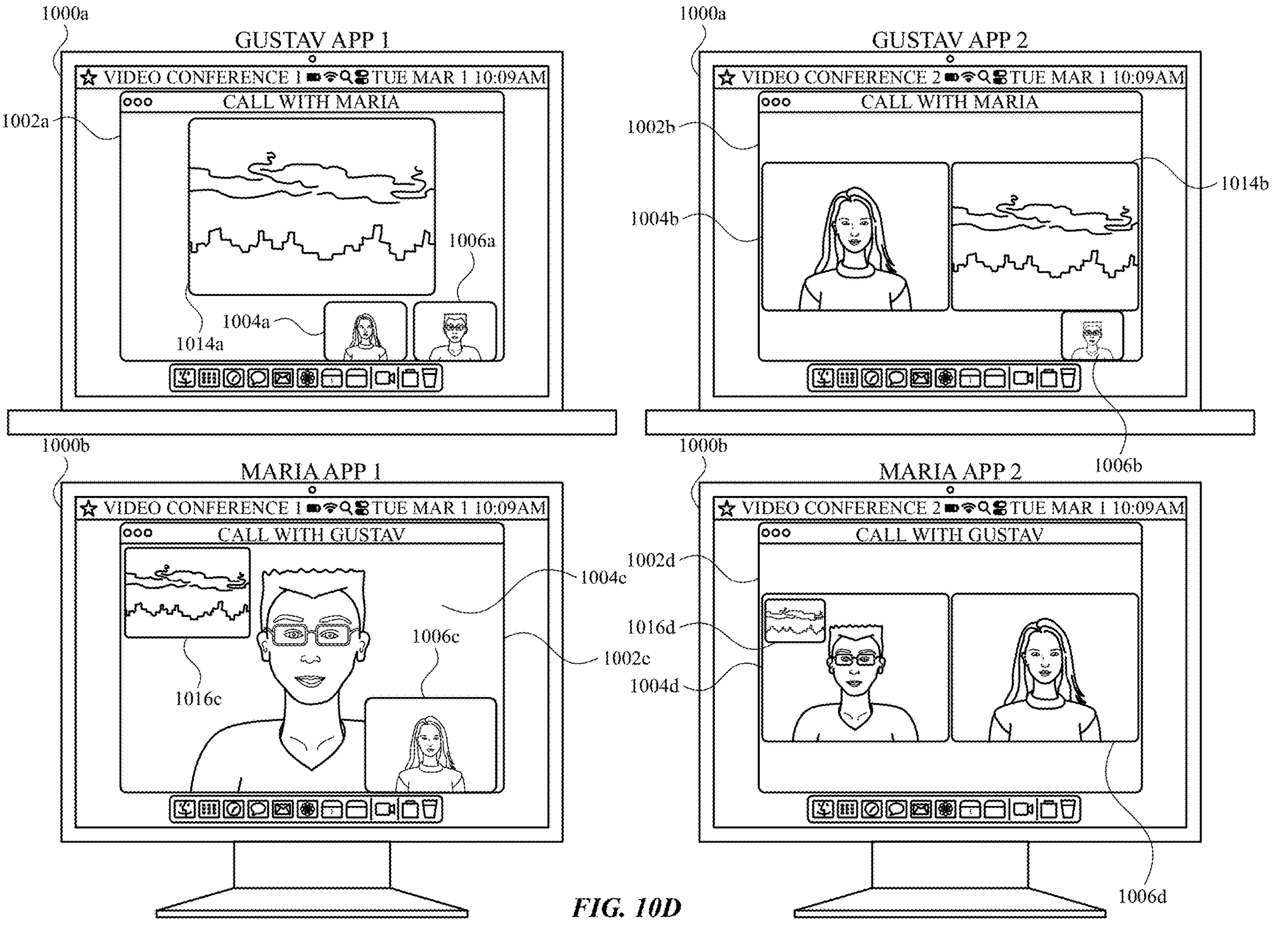

At FIG. 10D, while displaying user interface 1002*a*, computer system 1000*a* detects a request to share content 1014*a* (e.g., content associated with Gustav and computer system 1000*a*) in a first content sharing mode. In response to the request to share content 1014*a*, computer system 1000*a* reduces emphasis on representations of Gustav (e.g., representations 1006*a*), and displays shared content 1014*a* within user interface 1002*a*. In some embodiments, reducing emphasis includes decreasing the size of secondary representation 1006*a* in user interface 1002*a*. In some embodiments, reducing emphasis includes forgoing displaying secondary representation 1006*a* in user interface 1002*a*.

At FIG. 10D, while displaying user interface 1002*b*, computer system 1000*a* detects a request to share content 1014*b* (e.g., content associated with Gustav and computer system 1000*a*) in a first content sharing mode. In response to the request to share content 1014*b*, computer system 1000*a* reduces emphasis on representation of Gustav (e.g., representations 1006*a*), and displays shared content 1014*b* within user interface 1002*b*. In some embodiments, reducing emphasis includes decreasing the size of representation 1006*b* in user interface 1002*b*. In some embodiments, reducing emphasis includes forgoing displaying secondary representation 1006*b* in user interface 1002*b*.

In response to the request to share content 1014*a*, while displaying user interface 1002*c*, computer system 1000*b* displays representation 1004*c* composited with representation 1016*c* of shared content 1014*a*. In some embodiments, the composite of representation 1004*c* and representation 1016*c* can include any or all features of composite 810*a* and the relationship between composite 810*a* and shared content 810*b*, representation of participant 810*c*, representation 808*b*1 and representation 808*b*2 as described with reference to FIG. 8B.

In response to the request to share content 1014*b*, while displaying user interface 1002*d*, computer system 1000*b* displays representation 1004*d* composited with representation of shared content 1016*d*. In some embodiments, the composite of representation 1004*d* and representation of shared content 1016*d* can include any or all features of composite 810*a* and the relationship between composite 810*a* with shared content 810*b*, representation of participant 810*c* and participants 808*b* as described with reference to FIG. 8B.

Figure 10E:
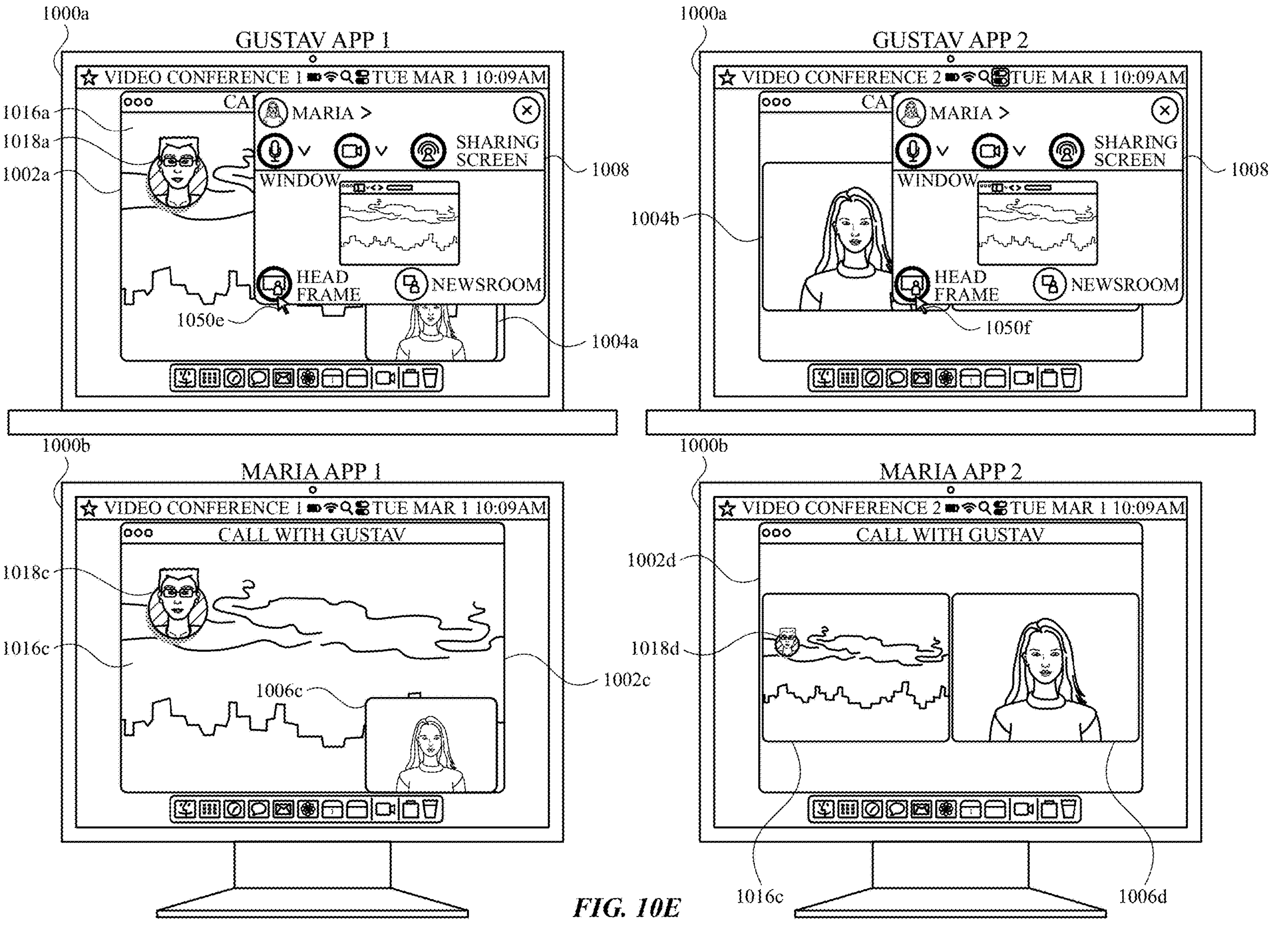

At FIG. 10E, while computer system 1000*a* displays user interface 1002*a*, Gustav has opened menu 1008 and computer system 1000*a* detects user input 1050*e* (e.g., a touch input, mouse, and/or keyboard input) corresponding to a request to share content 1014*a* in a second content sharing mode. In response to detecting user input 1050*e*, computer system 1000*a* displays representation of shared content 1016*a*. Representation of shared content 1016*a* includes representation of associated participant 1018*a*.

While computer system 1000*a* displays user interface 1002*b*, user input 1050*f* (e.g., a touch input, mouse, and/or keyboard input) via menu 1008 corresponding to a request to share content 1014*b* in a second content sharing mode is detected. In response to user input 1050*f*, computer system 1000*a* displays representation of shared content 1016*b* (which is obscured by menu 1008). Representation of shared content 1016*b* includes representation of associated participant 1018*b*.

While displaying user interface 1002*c*, and in response to user input 1050*e*, computer system 1000*b* displays representation of shared content 1016*c*. Representation of shared content 1016*c* includes representation of associated participant 1018*c*.

While displaying user interface 1002*d*, and in response to user input 1050*f*, computer system 1000*b* displays representation of shared content 1016*d*. Representation of shared content 1016*d* includes representation of associated participant 1018*d*.

Representation of associated participant 1018*a*, representation of associated participant 1018*b*, representation of associated participant 1018*c*, and representation of associated participant 1018*d* can include any or all of features of representation 814*b* and representation 816*b* described with reference to FIG. 8D. In some embodiments, representation 1004*a*, representation 1004*b*, representation 1006*c*, and representation 1006*d* (e.g., representations of Maria) are displayed left, right, above, below, and/or in front of representation shared content 1016 (e.g., shared content 1016*a*, shared content 1016*b*, shared content 1016*c*, and shared content 1016*d*).

Figure 10F:
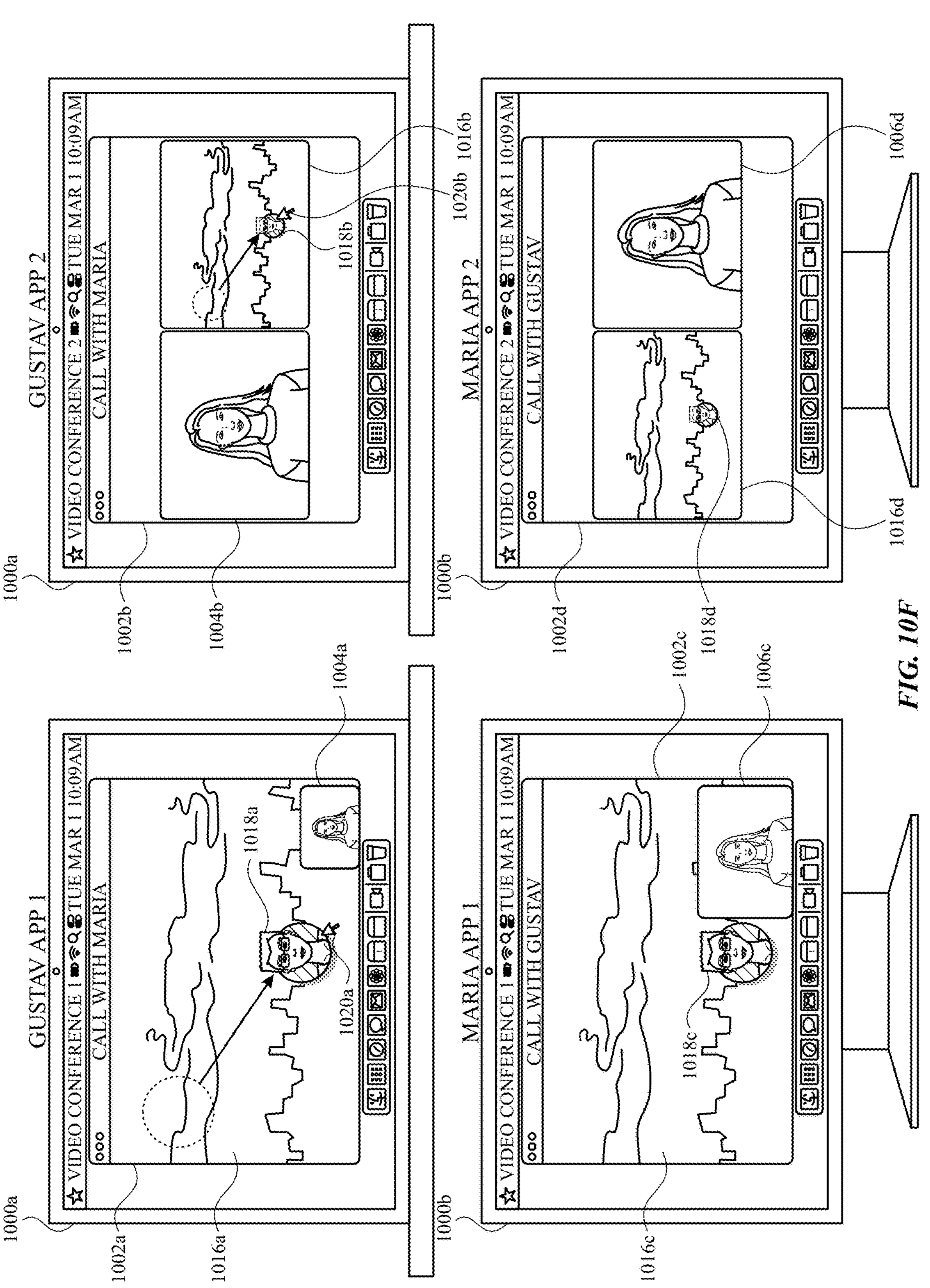

At FIG. 10F, while displaying user interface 1002*a*, computer system 1000*a* detects user input 1020*a* (e.g., a click and drag input, a touch and drag input, and/or a swipe input, via a touch-sensitive surface, a mouse, and/or keyboard) corresponding to a request to move representation 1018*a* with respect to representation of shared content 1016*a* (e.g., change which portion of representation of shared content 1016*a* is obscured by representation 1018*a*). In response to user input 1020*a*, computer system 1000*a* displays representation 1018*a* at a second location within representation of shared content 1016*a*. While displaying user interface 1002*c*, and in response to user input 1020*a*, computer system 1000*b* displays representation 1018*c* at the second location within representation of shared content 1016*c*. In some embodiments, computer system 1000*b* forgoes displaying representation 1018*a* at a second location in response to user input 1020*a*.

While displaying user interface 1002*b*, computer system 1000*a* detects user input 1020*b* (e.g., a click and drag input, a touch and drag input, and/or a swipe input, via a touch-sensitive surface, a mouse, and/or keyboard input) corresponding to a request to move representation 1018*b* with respect to representation of shared content 1016*b* (e.g., change which portion of representation of shared content 1016*a* is obscured by representation 1018*a*). In response to user input 1020*b*, computer system 1000*a* displays representation 1018*b* at a second location within representation of shared content 1016*b*. While displaying user interface 1002*d*, in response to user input 1020*b*, computer system 1000*b* displays representation 1018*d* at the second location within representation of shared content 1016*d*. In some embodiments, computer system 1000*b* forgoes displaying representation 1018*d* at a second location in response to user input 1020*b*.

Figure 10G:
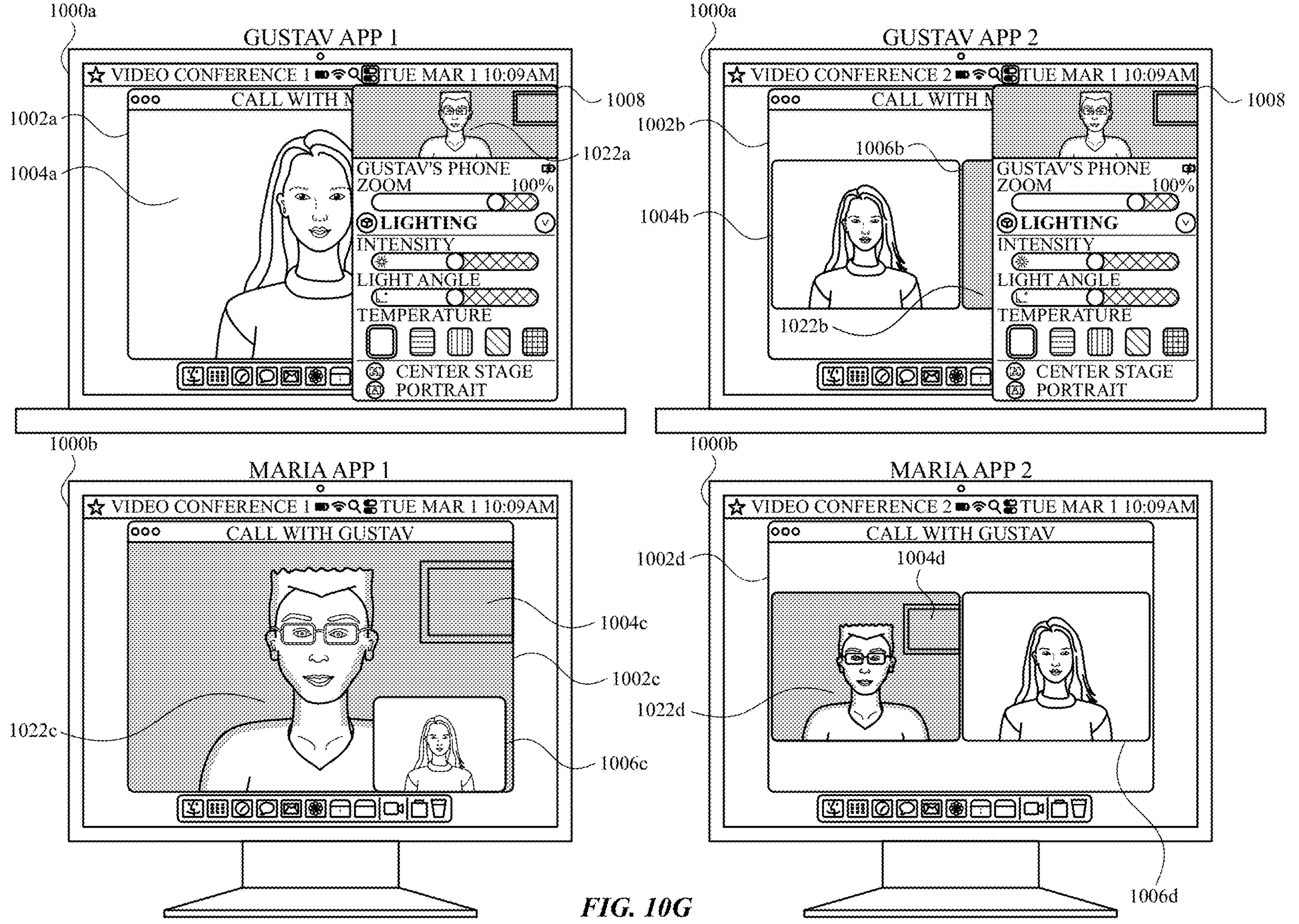

At FIG. 10G, while displaying user interface 1002*a*, computer system 1000*a* detects a user input corresponding to a request to apply simulated lighting effect 1022*a* via menu 1008. In response to the user input corresponding to a request to apply simulated lighting effect 1022*a*, computer system 1000*a* applies simulated lighting effect 1022*a* to representation 1006*a*. In FIG. 10G, representation 1006*a* is obscured by menu 1008 computer system 1000*a*. However, simulated lighting effect 1022*a* can be seen in the preview area of menu 1008. In response to the user input corresponding to a request to apply simulated lighting effect 1022*a*, simulated lighting effect 1022*c* is applied to representation 1004*c*.

While displaying user interface 1002*b*, computer system 1000*a* detects a user input corresponding to a request to apply simulated lighting effect 1022*b* via menu 1008. In response to the user input corresponding to a request to apply simulated lighting effect 1022*b*, simulated lighting effect 1022*b* is applied to representation 1006*b* and simulated lighting effect 1022*d* is applied to representation 1004*d*.

In some embodiments, simulated lighting effect 1022*a* is a simulated light source and includes parameters that are adjustable via menu 1008. In some embodiments, the adjustable parameters of simulated lighting effect 1022*a* include intensity (e.g., brightness), color temperature, and/or the angle of the simulated lighting effect (e.g., the location the simulated light source with respective to the subject (e.g., Gustav)). The parameters of simulated lighting effect 1022*a* are set so that the intensity of lighting effect 1022*a* is set to a mid-level intensity and angle so that Gustav appears to be lit from the front. In some embodiments, simulated lighting effect 1022*a* includes displaying simulated shadows on a portion of the illuminated subject and/or the background of the subject. In some embodiments, simulated lighting effect 1022*d*, simulated lighting effect 1022*c*, and simulated lighting effect 1022*d* can include any or all features of simulated lighting effect 1022*a* as described with respect to FIG. 10G.

Figure 10H:
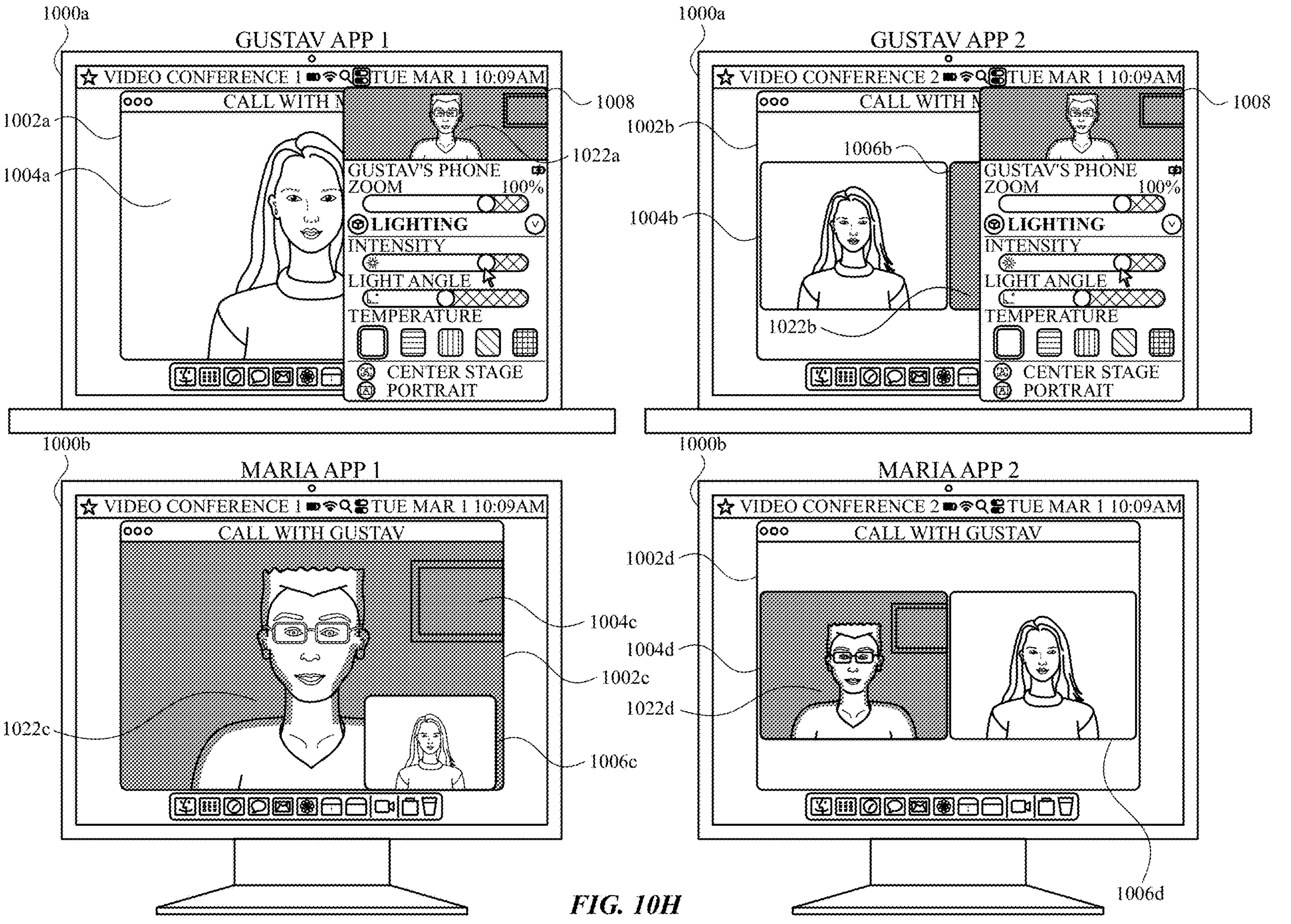

At FIG. 10H, while user interface 1002*a* is displayed on computer system 1000*a*, Gustav increases the intensity parameter of simulated lighting effect 1022*a* via menu 1008. In response to the increased intensity parameter, computer system 1000*a* displays simulated lighting effect 1022*a* with brighter illumination of Gustav and stronger shadows in representation 1006*a* (obscured by menu 1008, but visible in preview pane of menu 1008). While displaying user interface 1002*c*, and in response to detecting the increased intensity parameter on computer system 1000*a*, computer system 1000*b* adjusts display of simulated lighting effect 1022*c* in representation 1004*c* to match simulated lighting effect 1022*a* on computer system 1000*a* (e.g., brighter simulated light and stronger shadows).

While user interface 1002*b* is displayed on computer system 1000*a*, Gustav increases the intensity parameter of simulated lighting effect 1022*b* via menu 1008. In response to the increased intensity parameter, computer system 1000*a* displays simulated lighting effect 1022*b* with brighter illumination of Gustav and stronger shadows in representation 1006*b*. While displaying user interface 1002*d* and in response to detecting the increased intensity parameter on computer system 1000*a*, computer system 1000*b* adjusts display of simulated lighting effect 1022*d* in representation 1004*d* to match simulated lighting effect 1022*b* on computer system 1000*a* (e.g., brighter simulated light and stronger shadows).

Figure 10I:
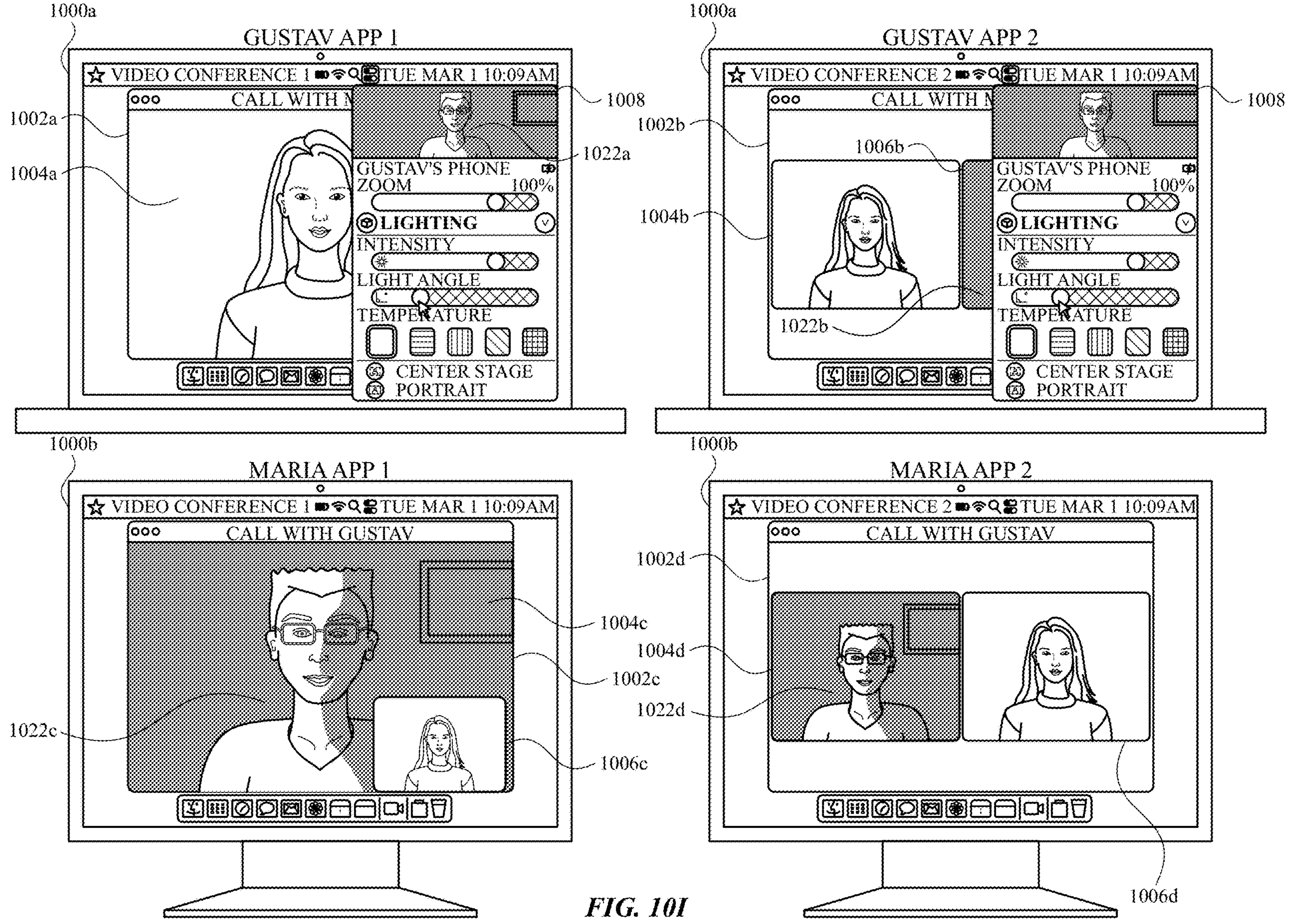

At FIG. 10I, while user interface 1002*a* is displayed on computer system 1000*a*, Gustav adjusts the angle of simulated lighting effect 1022*a*. In response to Gustav adjusting the angle of simulated lighting effect 1022*a*, Gustav is illuminated from his right side and his left side is covered in shadow in representation 1006*a* (obscured by menu 1008, but visible in preview pane of menu 1008). In response to the adjusted angle of simulated lighting effect 1022*a* and while user interface 1002*c* is displayed, computer system 1000*b* displays simulated lighting effect 1022*c* with the adjusted angle in representation 1004*c*, displaying Gustav illuminated from his right side and his left side covered in shadow.

While user interface 1002*b* is displayed on computer system 1000*a*, Gustav adjusts the angle of simulated lighting effect 1022*b*. In response to Gustav adjusting the angle of simulated lighting effect 1022*b*, Gustav is illuminated from his right side and his left side is covered in shadow in representation 1006*b* (obscured by menu 1008, but visible in preview pane of menu 1008). In response to the adjusted angle of simulated lighting effect 1022*b* and while displaying user interface 1002*d*, computer system 1000*b* displays simulated lighting effect 1022*d* with the adjusted angle in representation 1004*d* displaying Gustav illuminated from his right side and his left side covered in shadow.

Figure 10J:
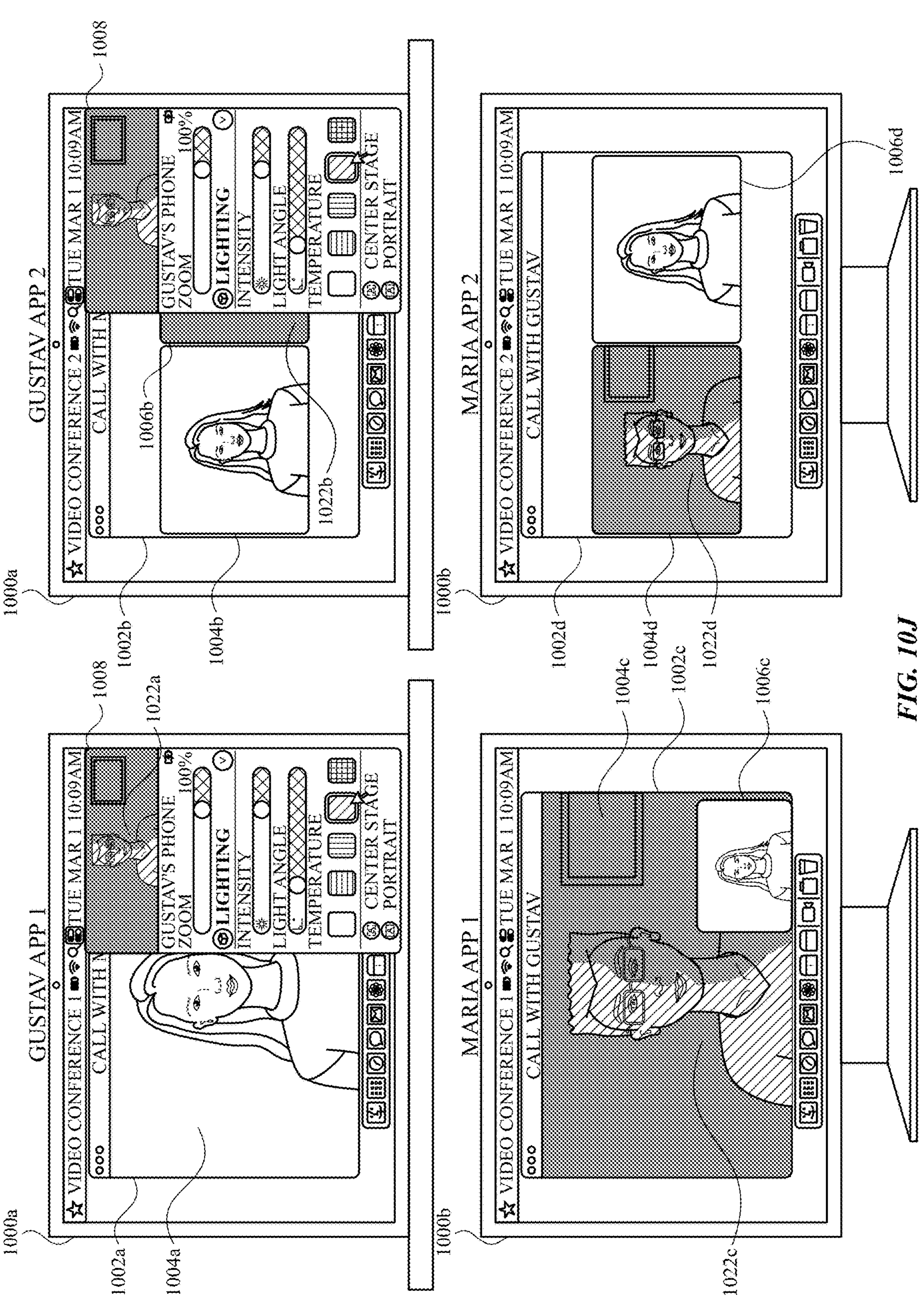

At FIG. 10J, Gustav adjusts the color temperature of simulated lighting effect 1022*a* and simulated lighting effect 1022*b* on computer system 1000*a*. In response to Gustav adjusting the color temperature of simulated lighting effect 1022*a* and simulated lighting light 1022*b*, Gustav is illuminated in a different color temperature of light (e.g., cooler temperature cooler, warmer temperature cooler, and/or a different color such as red, blue, green, yellow, orange, and/or violet) in representation 1006*a* (obscured by menu 1008, but visible in preview pane of menu 1008), representation 1006*b*, representation 1004*c*, and representation 1004*d*. In some embodiments, simulated lighting effect 1022*b*, simulated lighting effect 1022*c*, and simulated lighting effect 1022*d* can include any or all features of simulated lighting effect 1022*a* described with respect to FIGS. 10G-10J.

Figure 10K:
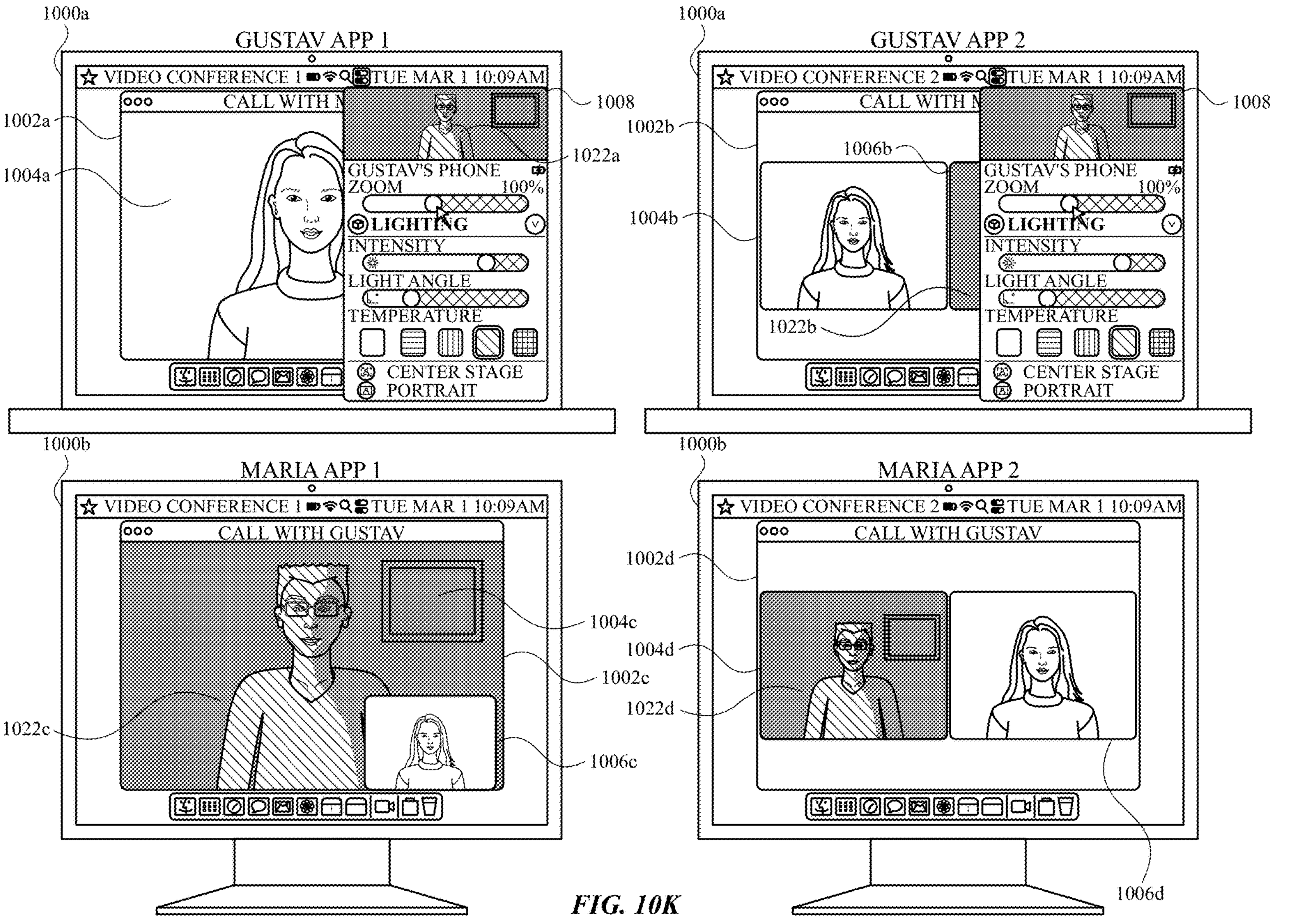

At FIG. 10K, while displaying user interface 1002*a*, computer system 1000*a* detects a user input (via menu 1008) corresponding to a request to adjust the magnification level of the one or more cameras associated with computer system 1000*a*. In response to computer system 1000*a* detecting a request to adjust the magnification level, computer system 1000*a* displays representation 1006*a* at a second magnification level. In some embodiments, the change in magnification level is an optical magnification change (e.g., optical zoom). In some embodiments, the change in magnification level is a simulated magnification change (e.g., digital zoom). In response to detecting the user input via menu 1008 corresponding to a request to adjust the magnification level and while displaying user interface 1002*c*, computer system 1000*b* displays representation 1004*c* at the second magnification level.

While displaying user interface 1002*b*, and in response to computer system 1000*a* detecting a user input (via menu 1008) corresponding to a request to adjust the magnification level of the one or more cameras associated with computer system 1000*a*, computer system 1000*a* displays representation 1006*b* at a second magnification level. In some embodiments, the change in magnification level is an optical magnification change (e.g., optical zoom). In some embodiments, the change in magnification level is a simulated magnification (e.g., digital zoom). In response to detecting the user input via menu 1008 corresponding to a request to adjust the magnification level, and while displaying user interface 1002*d*, computer system 1000*b* displays representation 1004*d* at the second magnification level.

At FIGS. 10L1 and 10L2, while displaying user interface 1002*a*, computer system 1000*a* detects a user input (via menu 1008) to enable simulated camera following effect 1028*a*. In response to the user input to enable simulated camera following effect 1028*a*, computer system 1000*a* applies simulated camera effect 1028*a* to representation 1006*a*. While displaying user interface 1002*c*, and in response to the user input to enable simulated camera following effect 1028*a*, computer system 1000*b* applies simulated camera effect 1028*c* to representation 1004*c*. In some embodiments, simulated camera following effect 1028*b* keeps subject 1030*a* (e.g., Gustav) centered in representation 1004*c* and can include any or all features of simulated camera following effect 1028*a* discussed below. Simulated camera following effect 1028*a* keeps subject 1030*a* (e.g., Gustav) centered in representation 1006*a* (e.g., representations of Gustav). At FIG. 10L2, subject 1030*a* (e.g., Gustav) is standing in a first location within the field of view of one or more camera sensors in communication with computer system 1000*a* (and/or computer system 1000*b*). Simulated camera following effect 1028*a* includes user adjustable parameters for sensitivity and magnitude. In some embodiments, the sensitivity parameter controls the delay in adjusting the representation of the field of view of the one or more camera sensors in response to detecting the subject (e.g., Gustav) moving from a first location to a second location. In some embodiments, a lower sensitivity level corresponds to a first (e.g., higher) predetermined time period before simulated camera following effect 1028*a* reacts to a change in location. In some embodiments, a higher sensitivity level corresponds to second (e.g., lower) predetermined time period before simulated camera following effect 1028*a* reacts to a change in location. In some embodiments, the magnitude parameter controls the maximum range simulated camera following effect 1028*a* will center subject 1030*a* in representation 1006*a*, representation 1006*b*, representation 1004*c*, and representation 1004*d*. For example, at high magnitude, simulated camera effect 1028*a* will keep subject 1030*a* centered when subject 1030*a* is between high magnitude range 1024*a* and 1024*b*. At low magnitude, simulated camera effect 1028*a* will keep subject 1030*a* centered when subject 1030*a* is between lower magnitude range 1026*a* and 1026*b*. In some embodiments, menu 1008 includes camera indicator 1008*a* which indicates which of the one or more camera sensors (e.g., wide, ultrawide, and/or telephoto) is being used to generate representation 1006*a*, representation 1006*b*, representation 1004*c*, and representation 1004*d* (e.g., representations of Gustav).

While displaying user interface 1002*b*, computer system 1000*a* detects a user input (via menu 1008) to enable simulated camera following effect 1028*b*. In response to the user input to enable simulated camera following effect 1028*b*, computer system 1000*a* applies simulated camera effect 2028*b* to representation 1006*b*. Simulated camera following effect 1028*b* keeps subject 1030*a* (e.g., Gustav) centered in representation 1006*b* (e.g., representations of Gustav) and can include any or all feature of simulated camera following effect 1028*a* discussed with respect to FIG. 10L1 and FIG. 10L2. While displaying user interface 1002*d* and in response to the user input to enable simulated camera following effect 1028*b*, computer system 1000*b* applies simulated camera effect 2028*d* to representation 1004*d*. In some embodiments, simulated camera following effect 1028*b* keeps subject 1030*a* (e.g., Gustav) centered in representation 1004*c* and can include any or all feature of simulated camera following effect 1028*a* discussed with respect to FIG. 10L1 and FIG. 10L2.

At FIG. 10M1 and FIG. 10M2, subject 1030*a* (e.g., Gustav) moves to a second location while the magnitude of simulated camera following effect 1028*a*, simulated camera following effect 1028*b*, simulated camera following effect 1028*c*, and simulated camera following effect 1028*d* is high. While displaying user interface 1002*a*, and in response to detecting subject 1030*a* moving to a second location, computer system 1000*a* adjusts simulated camera following effect 1028*a* to keep Gustav centered within representation 1006*a*. While displaying user interface 1002*b*, and in response to detecting subject 1030*a* moving to a second location, computer system 1000*a* adjusts simulated camera following effect 1028*a* to keep Gustav centered within representation 1006*b*. The background (e.g., the picture frame) has moved with respect to Gustav, but Gustav is still centered within representation 1006*a*, representation 1006*b*, representation 1004*c*, and representation 1004*d*.

While displaying user interface 1002*c*, and in response to detecting subject 1030*a* moving to a second location, computer system 1000*b* adjusts simulated camera following effect 1028*a* to keep Gustav centered within representation 1004*c*. In some embodiments, computer system 1000*b* receives representation 1004*c* from computer system 1000*a* with simulated camera following effect 1028*a* already applied and computer system 1000*b* does not apply camera following effect 1028*a*. While displaying user interface 1002*d*, and in response to detecting subject 1030*a* moving to a second location, computer system 1000*b* adjusts simulated camera following effect 1028*a* to keep Gustav centered within representation 1004*d*. At FIG. 10N1 and FIG. 10N2, subject 1030*a* (e.g., Gustav) is still at the second location, and computer system 1000*a* detects a user input corresponding to a lowered magnitude of simulated camera following effect 1028*a* via menu 1008. While displaying user interface 1002*a*, and in response to detecting the lowered magnitude of simulated camera following effect 1028*a*, the range of simulated camera following effect 1028*a* changes to lower magnitude range 1026*a* and 1026*b*, and computer system 1000*a* displays Gustav off center in representation 1006*a* because the second location is beyond the range of lower magnitude range 1026*a* and 1026*b*. While displaying user interface 1002*c*, and in response to detecting the lowered magnitude of simulated camera following effect 1028*a*, computer system 1000*a* displays Gustav off center in representation 1004*c*.

While subject 1030*a* (e.g., Gustav) is at the second location and while displaying user interface 1002*b*, computer system 1000*a* detects a user input corresponding to a lowered magnitude of simulated camera following effect 1028*a* via menu 1008. In response to detecting the lowered magnitude of simulated camera following effect 1028*a*, the range of simulated camera following effect 1028*a* changes to lower magnitude range 1026*a* and 1026*b*, and computer system 1000*a* displays Gustav off center in representation 1006*b* because the second location is beyond the range of lower magnitude range 1026*a* and 1026*b*. While displaying user interface 1002*d*, and in response to detecting the lowered magnitude of simulated camera following effect 1028*a*, computer system 1000*b* displays Gustav off center in representation 1004*d*.

Figure 10O:
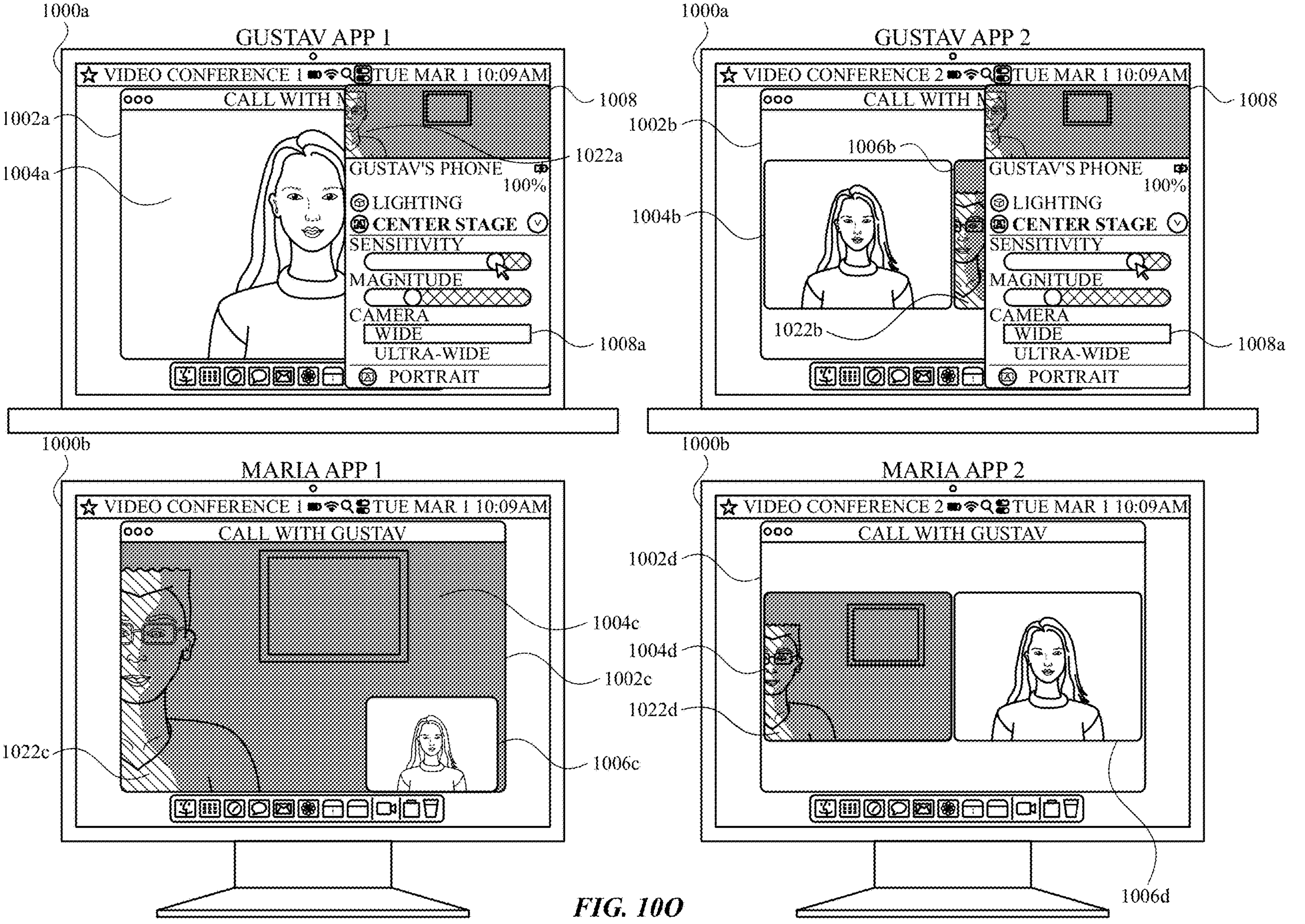

At FIG. 10O, while displaying user interface 1002*a*, computer system 1000*a* detects a user input corresponding to a change of the sensitivity parameter of simulated camera following effect 1028*a* to a lower sensitivity level. While displaying user interface 1002*a*, and in response to detecting the user input corresponding to the change of the sensitivity parameter, simulated camera following effect 1028*a* on computer system 1000*a* reacts to changes in Gustav's position after a second (e.g., longer) predetermined time period. While displaying user interface 1002*c* and in response to detecting the user input corresponding to the change of the sensitivity parameter, computer system 1000*b* reacts to changes in Gustav's position after the second predetermined time period.

While displaying user interface 1002*b*, computer system 1000*a* detects a user input corresponding to a change of the sensitivity parameter of simulated camera following effect 1028*a* to a lower sensitivity level. In response to detecting the user input corresponding to the change of the sensitivity parameter, simulated camera following effect 1028*a* on computer system 1000*a* reacts to changes in Gustav's position after a second (e.g., longer) predetermined time period. While displaying user interface 1002*d* and in response to detecting the user input corresponding to the change of the sensitivity parameter, computer system 1000*b* reacts to changes in Gustav's position after the second predetermined time period.

Figure 10P:
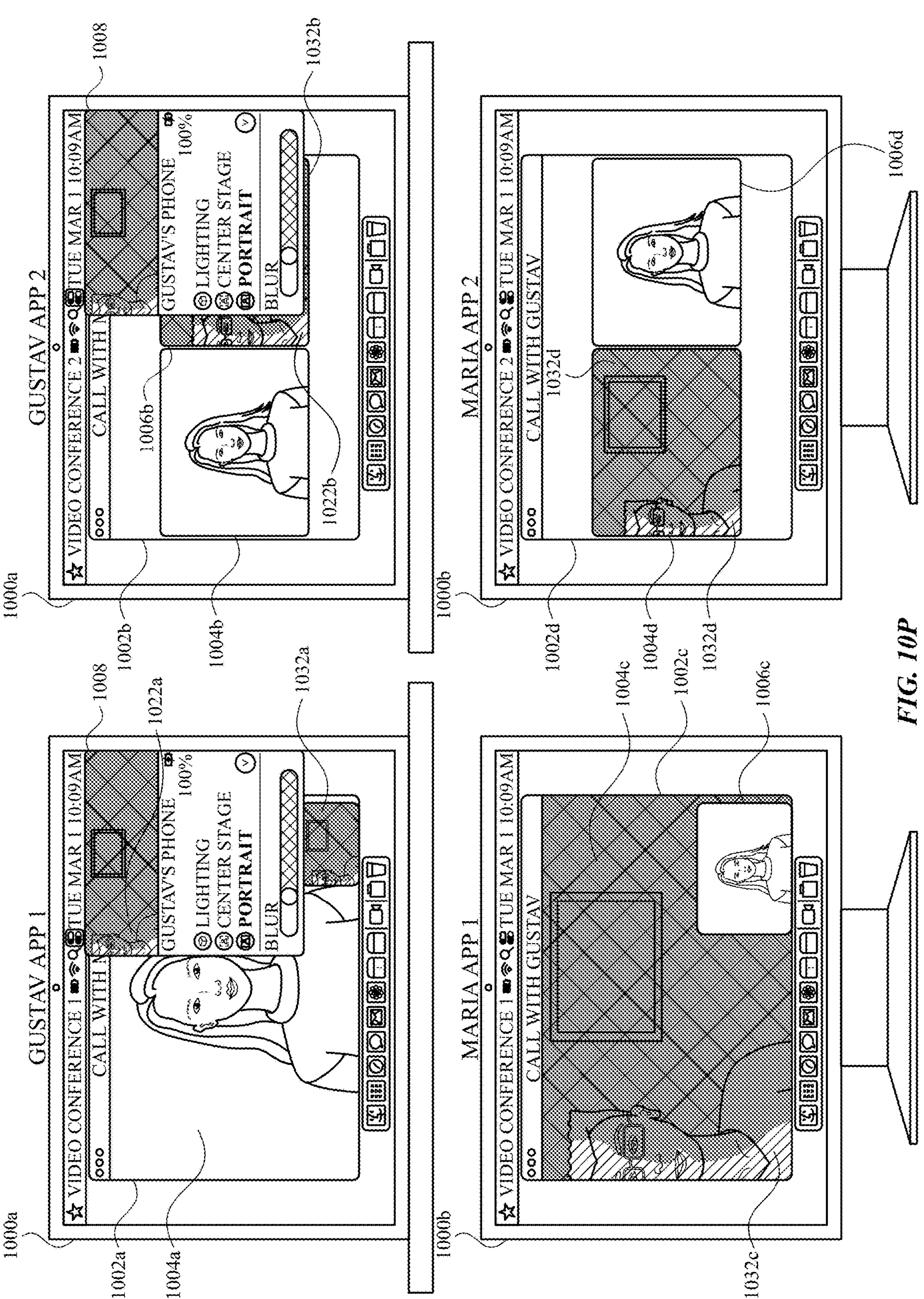
Figure 10Q:
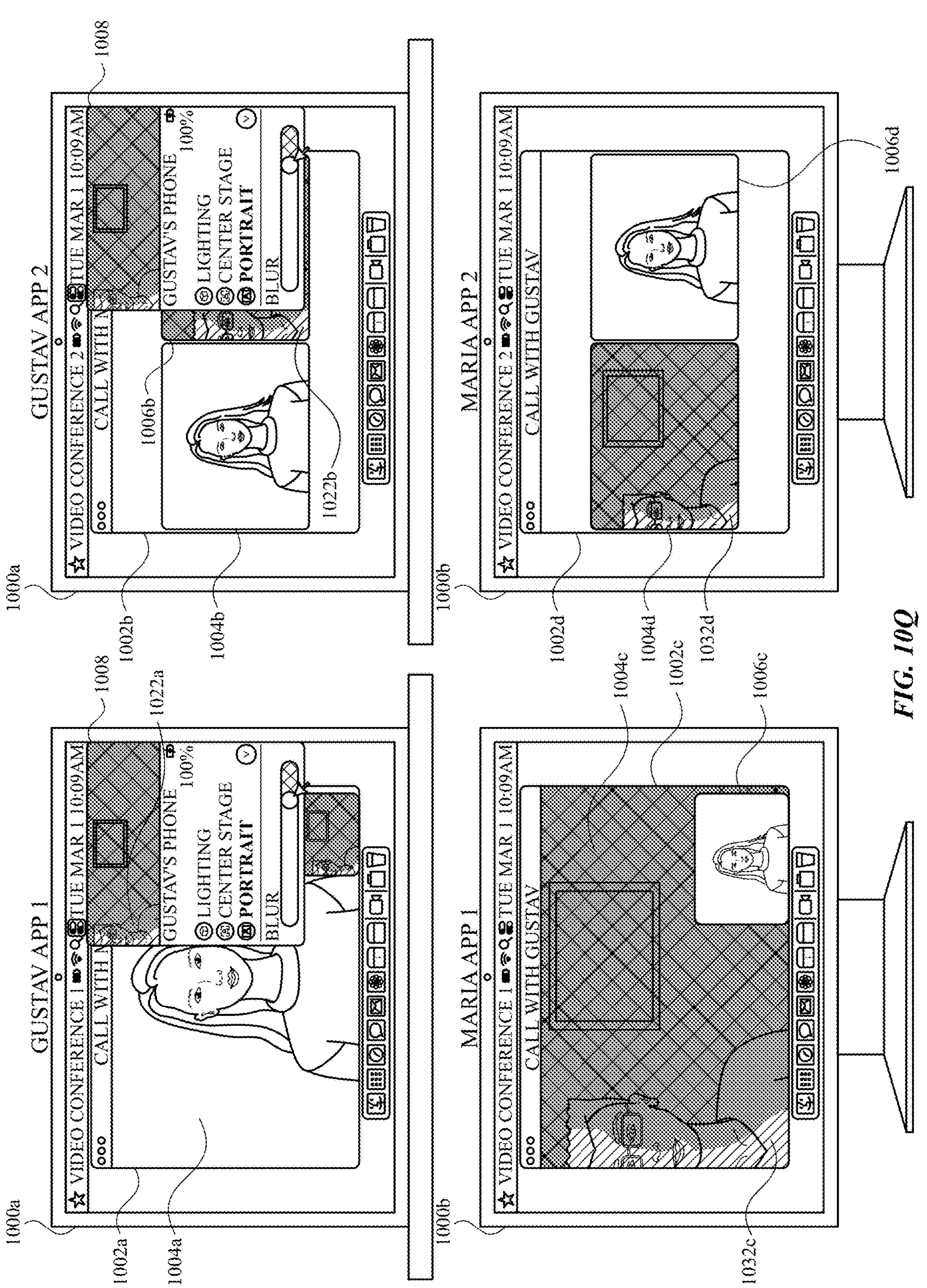

At FIG. 10P, while displaying user interface 1002*a*, computer system 1000*a* detects a user input via menu 1008 corresponding to a request to apply background blurring effect 1032*a*. In response to detecting the user input corresponding to a request to apply background blurring effect 1032*a*, computer system 1000*a* applies background blurring effect 1032*a* to representation 1006*a*. In some embodiments, background blurring effect 1032*a* applies a depth of field (e.g., bokch) effect to the background behind the subject. Background blurring effect 1032*a* includes user adjustable blur amount parameter. While displaying user interface 1002*c*, and in response to the input via menu 1008, computer system 1000*b* applies background blurring effect 1032*c* to representation 1004*c*. Background blurring effect 1032*c* can include any or all features of background blurring effect 1032*a* as described with reference to FIG. 10P.

While displaying user interface 1002*b*, computer system 1000*a* detects a user input via menu 1008 corresponding to a request to apply background blurring effect 1032*b*. In response to detecting the user input corresponding to a request to apply background blurring effect 1032*b*, computer system 1000*a* applies background blurring effect 1032*b* to representation 1006*b*. Background blurring effect 1032*b* can include any or all features of background blurring effect 1032*a* as described with reference to FIG. 10P. While displaying user interface 1002*d*, and in response to the input via menu 1008, computer system 1000*b* applies background blurring effect 1032*d* to representation 1004*d*. Background blurring effect 1032*d* can include any or all features of background blurring effect 1032*a* as described with reference to FIG. 10P.

At FIG. 10Q, while displaying user interface 1002*a* and in response to detecting an adjustment of the blur amount of simulated background blurring effect 1032*a*, computer system 1000*a* increases the amount of blurring of the backgrounds of representation 1006*a*. while displaying user interface 1002*b*, in response to detecting an adjustment of the blur amount of simulated background blurring effect 1032*a*, computer system 1000*b* increases the amount of blurring of the backgrounds of representation 1004*c*. While displaying user interface 1002*b* and in response to detecting an adjustment of the blur amount of simulated background blurring effect 1032*b*, computer system 1000*a* increases the amount of blurring of the backgrounds of representation 1006*b*. While displaying user interface 1002*c* and in response to detecting an adjustment of the blur amount of simulated background blurring effect 1032*b*, computer system 1000*b* increases the amount of blurring of the backgrounds of representation 1004*d*.

FIGS. 11A-11B are flow diagrams illustrating a method for displaying graphical effects to multiple different video applications using a computer system in accordance with some embodiments. Method 1100 is performed at a computer system (e.g., 100, 300, 500, 600*a*, 600*b*, 800*a*, 800*b*, 800*c*, 1000*a*, 1000*b*, and/or 1200*a*) that is in communication with a display generation component (e.g., 1001*a*, and/or 1001*b*), one or more input devices, and one or more camera sensors (e.g., 1003*a*, and/or 1003*b*). Some operations in method 1100 are, optionally, combined, the orders of some operations are, optionally, changed, and some operations are, optionally, omitted.

As described below, method 1100 provides an intuitive way for displaying graphical effects to multiple different video applications. The method reduces the cognitive burden on a user for displaying graphical effects to multiple different video applications, thereby creating a more efficient human-machine interface. For battery-operated computing devices, enabling a user to display graphical effects to multiple different video applications faster and more efficiently conserves power and increases the time between battery charges.

In method 1100, the computer system detects (1102), via the one or more input devices, a first set of one or more inputs (e.g., a gesture in the field of view of the one or more camera sensors, a touch input on a touch-sensitive display, a mouse input, and/or a keyboard input) including a request to display a user interface of a first application (e.g., real-time video communication application). In response to detecting the first set of one or more inputs, the computer system displays (1104), via the display generation component, the user interface of the first application (e.g., 1002*a*, 1002*b*, 1002*c*, and/or 1002*d*) including displaying (e.g., in the user interface of the first video application) a first representation (e.g., an image, a video feed, and/or a live preview) of a field of view of the one or more camera sensors and a graphical enhancement (e.g., 1010*a*, 1010*b*, 1010*b*, 1010*c*, 1010*d*, 1012*a*, 1012*b*, 1012*c*, 1012*d*, 1022*a*, 1022*b*, 1022*c*, and/or 1022*d*) applied to the representation of the field of view of the one or more camera sensors (e.g., one or more graphical objects, an animation, a color filter, a color effect, a lighting filter, a lighting effect, an effect that is displayed in response to a gesture, an effect that is displayed in response to a user input on a user interface, an effect that simulates a light source that illuminates a portion of the field of view of the one or more camera sensors, and/or an effect that simulates an optical zoom on the field of view of the one or more camera sensors). In accordance with a determination that a parameter (e.g., a user-adjustable parameter) associated with the graphical enhancement is set to a first value, the computer system displays (1106) the graphical enhancement with a first characteristic (e.g., a first animation, a first color filter, a first color effect, a first lighting filter, and/or a first lighting effect). In accordance with a determination that the parameter associated with the graphical enhancement is set to a second value that is different from the first value, the computer system displays (1108) the first graphical enhancement with a second characteristic (e.g., a second animation, a second color filter, a second color effect, a second lighting filter, and/or a second lighting effect) that is different from the first characteristic. In some embodiments, the value of the parameter is set, selected, and/or changed in response to a user input (e.g., in a settings menu and/or a settings user interface). The computer system detects (1110), via the one or more input devices, a second set of one or more inputs (e.g., a gesture in the field of view of the one or more camera sensors, a touch input on a touch-sensitive display, a mouse input, and/or a keyboard input) including a request to display a user interface of a second application (e.g. 1002*a*, 1002*b*, 1002*c*, and/or 1002*d*) (e.g., real-time video communication application) that is different from the first application. In response to detecting the second set of one or more inputs, the computer system displays (1112), via the display generation component, the user interface of the second application including displaying (e.g., in the user interface of the second video application) a second representation (e.g., an image, a video feed, and/or a live preview) of the field of view of the one or more camera sensors with the graphical enhancement. In accordance with a determination that the parameter associated with the graphical enhancement is set to the first value, the computer system displays (1114) the graphical enhancement with the first characteristic. In accordance with a determination that the parameter associated with the graphical enhancement is set to the second value (1116), the computer system displays the graphical enhancement with the second characteristic.

Displaying the user interface of the first application and the graphical enhancement with a first characteristic or a second characteristic in response to detecting the first set of one or more inputs and in accordance with a determination that the parameter is set to a first value or a second value, and displaying the user interface of the second application and the graphical enhancement with a first characteristic or a second characteristic in response to detecting the second set of one or more inputs and in accordance with a determination that the parameter is set to a first value or second value, provides the user with a method of displaying the graphical enhancement in multiple applications and provides the user with feedback when the first set of inputs and the second set of inputs have been detected, thereby providing improved visual feedback.

In some embodiments, displaying the graphical enhancement (e.g., 1010*a*, 1010*b*, 1010*b*, 1010*c*, 1010*d*, 1012*a*, 1012*b*, 1012*c*, 1012*d*, 1022*a*, 1022*b*, 1022*c*, and/or 1022*d*) includes displaying an animated effect (e.g., a fireworks animation, a confetti animation, rain falling, and/or clouds moving). Displaying the graphical enhancement including displaying a graphical effect provides the user with feedback that the graphical enhancement is displayed, thereby proving the user with improved feedback. In some embodiments, displaying the graphical enhancement with the first characteristic includes displaying a first animated effect, and displaying the graphical enhancement with the second characteristic includes displaying a second animated effect (e.g., a different animated effect from the first animated effect).

In some embodiments, the first set of one or more inputs includes a first gesture of a first type (e.g., such as a thumbs up gesture as illustrated in FIG. 10C) (e.g., a body gesture, a hand gesture, an air gesture, a thumbs up gesture, a thumbs down gesture, a victory sign gesture, a heart gesture, and/or a clapping gesture), performed by a portion of a person within a field of view of the one or more camera sensors. Displaying the graphical enhancement in response to first gesture provides the user with an efficient method to display the graphical enhancement without navigating menus or user interface elements, reducing potential errors, thereby reducing the number of inputs needed to perform an operation and providing additional control options without cluttering the UI with additional displayed controls. In some embodiments, the second set of one or more inputs includes a gesture (e.g., another instance of the same type of gesture as the gesture in the first set of one or more inputs) performed by a portion of the person.

In some embodiments, the computer system detects a third set of one or more inputs corresponding to a request to disable display of the graphical enhancement in response to detecting a gesture. After detecting the third set of one or more inputs, the computer system detects a second gesture of the first type (e.g., while displaying the user interface of the first application or the user interface of the second application). In response to detecting the second gesture, the computer system forgoes display of the graphical enhancement. Forgoing display of the graphical enhancement in response to detecting the second gesture after detecting the third set of one or more inputs, provides the user with an efficient method of disabling graphical enhancements initiated by gestures, and provides feedback that the third set of one or more inputs disable the graphical enhancements, thereby improving visual feedback.

In some embodiments, displaying the graphical enhancement includes displaying a user interface element that is a composite (e.g., a composite image and/or a composite video feed) of shared content (e.g., 1016*c* and/or 1016*d*) and a representation of a first participant (e.g. 1004*c*, 1004*d*, 1018*a*, 1018*b*, 1018*c*, and/or 1018*d*) (e.g., an avatar of a user, a picture of a user, and/or a video feed of a user), wherein the shared content is associated with the first participant, and wherein the shared content and the representation of the first participant are displayed in a first mode (e.g. as illustrated in FIG. 10D). Displaying the graphical enhancement including a user interface element that is a composite of shared content and a representation of the first participant provides the user with feedback that shared content is associated with the first participant and reduces cluttering the user interface by combining content associated with the first participant in the real-time communication session and a representation of the first participant in the user interface of the real-time communication session into a composite, thereby providing the user with improved visual feedback and providing control options without cluttering the user interface.

In some embodiments, displaying the shared content and representation of the first participant in the first mode includes displaying the content associated with the first participant over a shoulder of the representation of the first participant (e.g., in an upper corner of the user interface of the real-time video communication session and/or a content region of the user interface of the real-time video communication session). In some embodiments, the composite includes the content and the representation of the first participant displayed within the same frame. In some embodiments, the content associated with the first participant is at least partially obscured by the representation of the first participant. In some embodiments, the representation of the first participant casts a shadow on the content associated with the first participant. In some embodiments, the content associated with the first participant is not partially obscured by the representation of the first participant. In some embodiments, the composite of the content associated with the first computer system and the representation of the first participant is transmitted to and/or displayed at the one or more second computer systems in the real-time video communication session.

In some embodiments, while the computer system displays, via the display generation component, the composite (e.g., a composite image and/or a composite video feed) of the content (e.g., 1014_a_, 1014_b_, 1016_a_, 1016_b_, 1016_c_, and/or 1016_d_) associated with the first participant and the representation of the first participant (e.g., 1004_c_, 1004_d_, 1018_a_, 1018_b_, 1018_c_, and/or 1018_d_) (e.g., an avatar of a user, a picture of a user, and/or a video feed of a user), the computer system detects a user input (e.g., 1050_c_ and/or 1050_f_) corresponding to a request to change how the shared content is displayed within the composite. In response to the computer system detecting a user input corresponding to a request to change how the shared content is displayed within the composite, the computer system displays the shared content and the representation of the first participant in a second mode (e.g., as illustrated in FIGS. 10E and 10F) (e.g., changing the location of the shared content in relationship to the representation of the first participant and/or changing the size of the share content in relationship to the representation of the first participant). Displaying the user interface element in a second mode in response to detecting the user input provides the user with alternative method of viewing the representation of the first participant and the associated content, and improves visibility of the associated content, thereby providing improved visual feedback. In some embodiments, the composite includes the content and the representation of the user displayed within the same frame. In some embodiments, the content associated with the first participant is at least partially obscured by the representation of the first participant. In some embodiments, the representation of the first participant casts a shadow on the content associated with the first participant. In some embodiments, the content associated with the first participant is not partially obscured by the representation of the first participant. In some embodiments, the representation of the first participant is framed by a circle, and a portion of the representation breaks the frame of the circle.

In some embodiments, while the computer system displays, via the display generation component, the composite (e.g., a composite image and/or a composite video feed) of the content (e.g., 1014_a_, 1014_b_, 1016_a_, 1016_b_, 1016_c_, and/or 1016_d_) associated with the first participant and a representation of the first participant (e.g., 1004_c_, 1004_d_, 1018_a_, 1018_b_, 1018_c_, 1018_d_) (e.g., an avatar of a user, a picture of a user, and/or a video feed of a user), the computer system detects a first user input (e.g., 1020_a_ and/or 1020_b_) (e.g., a selection of a menu option, a click and drag gesture via an input device, a swipe motion and/or a touch and drag gesture on a touch sensitive input device or touch sensitive displayed) corresponding to a request to change the location of the representation of the first participant within the composite (e.g., if the representation of the user is in front of the content). In some embodiments, the shared content can move to the left, right, above, and/or below a representation of a user. In some embodiments, the representation of the user is smaller than the content and obscures a portion of the content. In some embodiments, the representation of the user can be in any position in front of the content. In some embodiments, the representation of the user snaps to a predefined position and/or to a predetermined distance from the edge of the composite. In response detecting the input corresponding to the request to change the location of the representation of the first participant within the composite, the computer system changes the location of the representation of the first participant within the composite (e.g., as illustrated in FIG. 10F). Changing the location of the representation of the first participant in response to a first user input corresponding to a request to change the location of the representation of the first participant within the composite provides the user with an efficient method to ensure that the content associated with the participant is easily visible and not obscured by the representation of the first participant and allows the user to move the representation without accessing menus, thereby reducing the number of inputs needed to perform an operation and providing additional control options without cluttering the UI with additional displayed controls.

In some embodiments, the graphical enhancement includes a simulated lighting effect (e.g., 1022_a_, 1022_b_, 1022_c_, and/or 1022_d_) (e.g., a simulated light source, a simulated color filter, and/or a simulated blurring effect, such as a bokeh effect) applied to a subject within the field of view of the one or more camera sensors (e.g., the participant Gustav is illuminated from the front by a simulated light source as illustrated in FIG. 10G). In some embodiments the simulated lighting effect is a simulated light source of a certain type (e.g., a ring light, a stage light, a soft right, a strong light) that simulate lights at one or more locations. Displaying the graphical enhancement including a simulated lighting effect enables the ability to efficiently apply a simulated lighting effect for two different applications with a single set of inputs, which reduces the number of inputs needed to perform an operation.

In some embodiments, the parameter associated with the graphical enhancement (e.g., 1022_a_, 1022_b_, 1022_c_, and/or 1022_d_) includes an intensity of the simulated lighting effect (e.g., a level of brightness, a simulated distance of the light from the illuminated subject, and/or a simulated area of illumination), and wherein the first characteristic is a first intensity (e.g., the participant Gustav is illuminated from the front by a simulated light source with a first intensity as illustrated in FIG. 10G) and the second characteristic is a second intensity (e.g., the participant Gustav is illuminated from the front by a simulated light source with a second intensity as illustrated in FIG. 10H) that is different from the first intensity. Displaying the graphical enhancement including a simulated lighting effect at a first intensity and a second intensity enables the ability to efficiently change the simulated lighting effect for two different applications by changing the value of a single parameter without requiring the user to change the value of the parameter for each application, which reduces the number of inputs needed to perform an operation.

In some embodiments, the parameter associated with the graphical enhancement (e.g., 1022*a*, 1022*b*, 1022*c*, and/or 1022*d*) includes a lighting mode of the simulated lighting effect (e.g., a type of simulated light source such as stage light or ring light, a location of the simulated light source with respect to the subject, and/or color filter (e.g., black and white and/or sepia)), and wherein the first characteristic is a first lighting mode (e.g., the participant Gustav is illuminated from the front by a simulated light source as illustrated in FIG. 10H) and the second characteristic is a second lighting mode (e.g., the participant Gustav is illuminated from the side by a simulated light source as illustrated in FIG. 10I) that is different from the first lighting mode. Displaying the graphical enhancement including a simulated lighting effect with a first lighting mode and a second lighting mode enables the ability to efficiently change the simulated lighting effect for two different applications by changing the value of a single parameter without requiring the user to change the value of the parameter for each application, which reduces the number of inputs needed to perform an operation.

In some embodiments, the parameter associated with the graphical enhancement (e.g., 1022*a*, 1022*b*, 1022*c*, and/or 1022*d*) includes a color temperature of the simulated lighting effect (e.g., color of light simulated by a color filter and/or simulated by a simulated light source), and wherein the first characteristic is a first color temperature (e.g., the participant Gustav is illuminated by a simulated light source with a first color temperature as illustrated in FIG. 10I) and the second characteristic is a second color temperature (e.g., the participant Gustav is illuminated by a simulated light source with a second color temperature as illustrated in FIG. 10J) that is different from the first color temperature. Displaying the graphical enhancement including a simulated lighting effect with a color temperature and a second color temperature enables the ability to efficiently change the simulated lighting effect for two different applications by changing the value of a single parameter without requiring the user to change the value of the parameter for each application, which reduces the number of inputs needed to perform an operation.

In some embodiments, the graphical enhancement (e.g., 1022*a*, 1022*b*, 1022*c*, and/or 1022*d*) includes displaying a (e.g., simulated or optical) magnification effect of the field of view of the one or more camera sensors (e.g., a zoom in effect, a zoom out effect, and/or a change in angle of field of view of the one or more camera sensors (e.g., fish eye, wide, ultra-wide, and/or telephoto)) applied to the first representation of the field of view of the one or more camera sensors (e.g., within the user interface of the first application) and the second representation of the field of view of the one or more camera sensors (e.g., within the user interface of second application). Displaying the graphical enhancement including a magnification effect applied to the first representation and the second representation enables the ability to efficiently change the magnification effect for two different applications by changing the value of a single parameter without requiring the user to change the value of the parameter for each application, which reduces the number of inputs needed to perform an operation.

In some embodiments, the parameter associated with the graphical enhancement (e.g., 1022*a*, 1022*b*, 1022*c*, and/or 1022*d*) includes a level of magnification, and wherein the first characteristic is a first magnification (e.g., as illustrated in FIG. 10J) and the second characteristic is a second magnification (e.g., as illustrated in FIG. 10K) that is different from the first magnification. Displaying the graphical enhancement including a magnification effect with a first magnification and a second magnification applied to the first representation and the second representation enables the ability to efficiently change the magnification effect for two different applications by changing the value of a single parameter without requiring the user to change the value of the parameter for each application, which reduces the number of inputs needed to perform an operation.

In some embodiments, the graphical enhancement (e.g., 1022*a*, 1022*b*, 1022*c*, and/or 1022*d*) includes simulating a camera following effect (e.g., as illustrated in FIGS. 10L-10O) (e.g., effect that simulates movement of a camera to follow a subject as the subject moves in the field of view of the one or more camera sensors). Displaying the graphical enhancement including a camera following effect provides the user with a method to highlight the first participant in the representation of the first participant, thereby improving visual feedback. In some embodiments the effect keeps the subject centered in the representation of the field of view of the one or more camera sensors. In some embodiments, the effect keeps the subject in the frame without keeping the subject centered. In some embodiments, the effect does not keep the subject in view and/or centered if the subject moves beyond a predetermined threshold.

In some embodiments, the parameter associated with the graphical enhancement (e.g., 1022*a*, 1022*b*, 1022*c*, and/or 1022*d*) is a portion of the field of view of the one or more camera sensors that the camera following effect will follow a subject (e.g., 1030*a*) in the field of view of the one or more camera sensors (e.g., how far a subject can move in the field of the view of the one or more camera sensors before the subject is no longer represented in the representation of the field of the view of the one or more camera sensors). In some embodiments, the first characteristic is a first portion (e.g., 1024*a*) of the field of view of the one or more camera sensors (e.g., a first distance a subject can move), and the second characteristics is a second portion (e.g., 1026*a*) of the field of view of the one or more camera sensors (e.g., a second distance a subject can move). Displaying the graphical enhancement including a simulated camera following effect with a first portion of the field of view of that the camera following effect will follow a subject and a second portion of the field of view of that the camera following effect will follow a subject applied to the first representation and the second representation enables the ability to efficiently change the camera following effect for two different applications by changing the value of a single parameter without requiring the user to change the value of the parameter for each application, which reduces the number of inputs needed to perform an operation. In some embodiments, a subject at a first position in the field of view of the one or more camera sensors in the field of view of the one or more cameras will be only partially represented (e.g., only partially in "frame") in representation of the field of view of the one or more camera sensors at a second sensitivity. In some embodiments a subject at a first position in the field of view of the one or more camera sensors.

In some embodiments, the parameter associated with the graphical enhancement (e.g., 1022*a*, 1022*b*, 1022*c*, and/or 1022*d*) is a sensitivity level of the camera following effect (e.g., how quickly the camera following effects reacts to a change in position of a subject in the field of view of the one or more camera sensors), and wherein the first characteristic is a first sensitivity level (e.g., a first simulated camera movement and/or reaction speed) and the second characteristic is a second sensitivity level that is different from the first sensitivity level. Displaying the graphical enhancement including a simulated camera following effect with a first sensitivity level and a second sensitivity level applied to the first representation and the second representation enables the ability to efficiently change the camera following effect for two different applications by changing the value of a single parameter without requiring the user to change the value of the parameter for each application, which reduces the number of inputs needed to perform an operation.

In some embodiments, the graphical enhancement (e.g., 1022*a*, 1022*b*, 1022*c*, and/or 1022*d*) includes a graphical indication (e.g., 1008*a*) of which of the one or more camera sensors (e.g., wide, ultrawide, and/or telephoto) is providing the image data used in the representation of the field of view of the one or more camera sensors. Displaying a graphical indication of which of the one or more camera sensors provides the image data used in the representation of the field of view of the one or more camera sensors provides the user with feedback when a setting or parameter changes which camera sensor is in use, thereby improving visual feedback.

In some embodiments, the graphical enhancement includes applying a blurring effect (e.g., 1022*a*, 1022*b*, 1022*c*, and/or 1022*d*) (e.g., a simulated bokeh effect; blurring the area behind (the background) a person or subject in the field of view of the one or more camera sensors) to a portion of the first representation of the field of view of the one or more camera sensors and to a portion of the second representation the field of view of the one or more camera sensors. Displaying the graphical enhancement including a blurring effect applied to the first representation, enables the ability to efficiently to apply a blurring effect for two different applications by applying a single effect without requiring the user to apply to effect for each application, which reduces the number of inputs needed to perform an operation, In some embodiments, the parameter associated with the graphical enhancement (e.g., 1022*a*, 1022*b*, 1022*c*, and/or 1022*d*) includes a level of blurring, and wherein the first characteristic is a first level of blurring (e.g., as illustrated in FIG. 10P), and the second characteristic is a second level of blurring that is different from the first level of blurring (e.g., as illustrated in FIG. 10Q). Displaying the graphical enhancement including a blurring effect with a first level of blurring applied to the first representation and displaying the graphical enhancement including a blurring effect with a second level of blurring applied to the first representation enables the ability to efficiently change the blurring effect for two different applications by changing the value of a single parameter without requiring the user to change the value of the parameter for each application, which reduces the number of inputs needed to perform an operation.

In some embodiments, the computer system detects a third set of inputs corresponding to a menu interface (e.g., 1008), wherein the menu interface is an operating system menu (e.g., the menu interface is not a menu of the first application or the second application; a third application menu, and/or an operating system menu interface). In response to detecting the third set of inputs, the computer system changes the parameter associated with the graphical enhancement (e.g., 1022*a*, 1022*b*, 1022*c*, and/or 1022*d*) from the first value to the second value. Changing the parameter via the menu interface that is an operating system menu in response to detecting the third set of inputs, enables the ability to efficiently change the settings for two different applications by changing the value of a single parameter without requiring the user to change the value of the parameter for each application, which reduces the number of inputs needed to perform an operation.

In some embodiments, the menu interface (e.g., 1008) includes a third representation of the field of view of the one or more cameras (e.g., a preview of the changes in the graphical enhancement to be applied). In response to detecting one or more inputs (e.g., a portion of the inputs; a user has selected the settings to be changed, but they have not yet been applied to the representation of the field of view of the one or more camera sensors in the first or second application) of the third set of inputs, the computer system displays the third representation of the field of view of the one or more cameras with the graphical enhancement (e.g., 1022*a*, 1022*b*, 1022*c*, and/or 1022*d*) with the second characteristic. Displaying the menu interface including a third representation in response to detecting one or more inputs provides the user with a method of previewing graphical enhancements before they are applied to the first representation, reducing the likelihood of errors and number of inputs required to reopen the menu interface when the wrong graphical enhancement is applied, thereby reducing the number of inputs needed to perform an operation.

Note that details of the processes described above with respect to method 1100 (e.g., FIGS. 11A-11B) are also applicable in an analogous manner to the methods described above. For example, method 700 optionally includes one or more of the characteristics of the various methods described above with reference to method 1100. For example, method 700 optionally includes modifying graphical effects in a first application and a second application via a parameter value. As another example, method 750 optionally includes one or more of the characteristics of the various methods described above with reference to method 1100. For example, method 750 optionally forgoes displaying a graphical effect in accordance with a determination that a parameter value is set to a first value. As another example, method 900 optionally includes one or more characteristics of the various methods described above with reference to method 1100. For example, method 900 optionally changes how shared content is displayed in accordance with the value of a parameter in method 1100. As another example, method 1300 optionally includes one or more characteristics of the various methods described above with reference to method 1100. For example, method 1300 optionally changes how a representation of a subject is framed in accordance with the value of a parameter with reference to method 1100.

FIGS. 12A-12M illustrate exemplary user interfaces for framing a subject in a representation of the field of view of one or more camera sensors. The user interfaces in these figures are used to illustrate the processes described below, including the processors in FIG. 13.

At FIG. 12A, computer system 1200*a* displays user interface 1202 via display generation component 1200*b*. Computer system 1200*a* is in communication with one or more camera sensors 1200*c*, which have maximum field of view 1264, and current field of view 1262*a*. Subject 1260*a* is in view of camera sensors 1200*c* and is in a first position with respect to computer system 1200*a* and camera sensors 1200*c*. User interface 1202 includes representation 1202*a* of current field of view 1262*a*, magnification scrubber 1202*b*, current magnification indicator 1202*c*, subject indicator 1202*d*, framing user interface element 1202*e*, and representation 1202*f* of subject 1260*a*. Subject indicator 1202*d* indicates that a subject (e.g., a face) has been detected in field of view 1262*a*. Representation 1202*f* is displayed off center in representation 1202*a* because subject 1260*a* is not directly in front of computer system 1200*a* and camera sensors 1200*c*. Computer system 1200*a* detects user input 1250*a* (e.g., a tap input, a mouse input, and/or a keyboard input) corresponding to selection of framing user interface element 1202*c*.

At FIG. 12B, in response to detecting input 1250*a* corresponding to selection of framing user interface element 1202*e*, computer system 1200*a* adjusts field of view 1262*a* to field of view 1262*b* and frames representation 1202*f* of subject 1260*a* in representation 1202*a*. In some embodiments, adjusting field of view 1262*a* to field of view 1262*b* includes an optical zoom, a digital zoom, a physical camera pan, and/or a digital camera pan. Framing subject 1260*a* includes modifying magnification of representation 1202*a* and centering representation 1202*f* in representation 1202*a* based on the location of subject 1260*a* with respect to camera sensors 1200*c* at the time an input (e.g., 1250*a*, 1250*d*, 1250*g*, and/or 1250*h*) corresponding to a request for framing is detected. Representation 1202*f* is displayed in a centered location in representation 1202*a* and the magnification of 1202*a* is increased. User interface element 1202*c* is no longer displayed and reset user interface element 1202*g* is displayed in the location at which user interface element 1202*e* was displayed. Subject 1260*a* has not moved to a second position with respect to camera sensors 1200*c*.

At FIG. 12C, subject 1260*a* moves from the first position (as described with respect to FIGS. 12A-12B) to a second position relative to camera sensors 1200*c* (e.g., subject 1260*a* is at edge of field of view 1262*b*). In response to detecting subject 1260*a* moving from the first position to the second portion, computer system 1200*a* maintains the frame of representation 1202*a* (e.g., the magnification and/or camera angle does not change and/or attempt to center representation 1202*f*) and displays representation 1202*f* of subject 1260*a* on the right edge of representation 1202*a*.

At FIG. 12D, subject 1260*a* remains at the second position and user input 1250*b* is detected on magnification scrubber 1202*b* corresponding to a request increase the magnification of representation 1202*a*. In some embodiments, user input 1250*b* is an input on indicator 1202*c*, a mouse input, a keyboard input, and/or a pinch or de-pinch gesture. In response to detecting user input 1250*b*, computer system 1200*a* displays representation 1202*a* at an increased magnification as shown in indicator 1202*c* and narrows field of view 1262*b* to field of view 1262*c*. At FIG. 12E, subject 1260*a* remains at the second position and user input 1250*c* is detected on magnification 1202*b* corresponding to a request to decrease magnification to the default magnification (e.g., 1×). In response to detecting user input 1250*c*, computer system 1200*a* adjusts the magnification of representation 1202*a* to the default magnification and the framing of representation 1202*a* is removed (e.g., field of view 1262*c* returns to default field of view 1262*a*, the magnification returns to the default magnification and panning and/or cropping is removed).

At FIG. 12F, subject 1260*a* remains at the second position and user input 1250*d* is detected corresponding to a selection of a face of representation 1202*f* in representation 1202*a*. At FIG. 12G, in response to detecting user input 1250*d*, computer system 1200*a* adjusts field of view 1262*a* to field of view 1262*d* to frame representation 1202*f* in representation 1202*a* and displays representation 1202*f* in a centered position as described with respect to FIG. 12B.

At FIG. 12H, user input 1250*e* corresponding to a request to pan representation 1202*a* is detected. In response to detecting user input 1250*c*, computer system 1200*a* adjusts field of view 1262*d* to field of view 1262*e* (e.g., pans camera 1200*c* to field of view 1262*c*) and displays representation 1202*f* in an off-centered position in representation 1202*a* (e.g., without subject 1260*a* moving to a different location). At FIG. 12I, user input 1250*f* is detected corresponding to reset user interface element 1202*g* and a request to reset the frame of representation 1202*a*. In response to detecting user input 1250*f*, computer system 1200*a* adjusts field of view 1262*e* to field of view 1262*a* and the framing of representation 1202*a* is removed (e.g., field of view 1262*c* returns to default field of view 1262*a*, the magnification returns to the default magnification, and panning and/or cropping is removed).

At FIG. 12J, subjects 1260*a* and subject 1260*b* are detected in field of view 1262*a* of camera 1200*c*. Representation 1202*f* of subject 1260*a* and representation 1202*h* of subject 1260*b* are displayed within representation 1202*a* of field of view 1262*a*. Representation 1202*f* and representation 1202*h* are not framed within representation 1202*a* (e.g., representation 1202*f* and representation 1202*h* are not centered and/or magnified in representation 1202*a*). Computer system 1200*a* detects user input 1250*g* on framing user interface element 1202*e* corresponding to a quest to frame representation 1202*f* of subject 1260*a* and/or representation 1202*h* of subject 1260*b* in representation 1202*a*. At FIG. 12K, in response to detecting user input 1250*g*, computer system 1200*a* frames representation 1202*f* of subject 1260*a* in representation 1202*a* (e.g., adjusts field of view 1262*a* to field of view 1262*f* including modifying the magnification and/or panning the camera angle so that representation 1202*f* is centered in representation 1202*a*). In some embodiments, subject 1260*a* is selected for framing because subject 1260*a* is the subject closest to the center of field of view 1262*a*. In some embodiments, subject 1260*a* is selected for framing because subject 1260*a* is detected in field of view 1262*a* before subject 1260*b*. In some embodiments, subject 1260*a* is selected for framing because subject 1260*a* has been detected in field of view 1262*a* for a period of time longer than subject 1260*b* has been detected. In some embodiments, subject 1260*a* is selected for framing because computer system 1200*a* detects that subject 1260*a* has spoken the most recently. In some embodiments, subject 1260*a* is selected for framing because subject 1260*a* is currently moving (e.g., performing a gesture and/or moving from position to another with respect to camera 1200*c*). In some embodiments, subject 1260*a* is selected for framing because subject 1260*a* has moved the most recently.

At FIG. 12L, subjects 1260*a* and subject 1260*b* are detected in field of view 1262*a* of camera 1200*c*. Representation 1202*f* of subject 1260*a* and representation 1202*h* of subject 1260*b* are displayed within representation 1202*a* of field of view 1262*a*. Representation 1202*f* and representation 1202*h* are not framed within representation 1202*a*. Computer system 1200*a* detects user input 1250*h* corresponding to a selection of the face of representation 1202*h* of subject 1260*b*. At FIG. 12M, in response to detecting user input 1250*h*, computer system 1200*a* adjusts field of view 1262*a* to field of view 1262*g* and frames representation 1202*h* of subject 1260*b* in representation 1202*a* of field of view 1262*g*.

FIG. 13 is a flow diagram illustrating a method for framing a subject in a representation of a field of view of one or more camera sensors using a computer system (e.g., a smartphone, a desktop computer, a laptop, a tablet, a head-mounted device, a wearable device, and/or a smart watch) that is communication with a display generation component (e.g., a display controller, a touch-sensitive display system, a projector, a head-mounted display, and/or a holographic display) and one or more camera sensors in accordance with some embodiments. Method 1300 is performed at a computer system (e.g., 100, 300, 500, 600*a*, 600*b*, 800*a*, 800*b*, 1000*a*, 1000*b*, and/or 1200*a*) that is in communication with a display generation component (e.g., 1200*b*) and with one or more camera sensors (e.g., 1200*c*). Some operations in method 1300 are, optionally, combined, the orders of some operations are, optionally, changed, and some operations are, optionally, omitted.

As described below, method 1300 provides an intuitive way for framing a representation of a subject in a representation of a field of view of one or more camera sensors. The method reduces the cognitive burden on a user for framing a representation of a subject in a representation of a field of view of one or more camera sensors, thereby creating a more efficient human-machine interface. For battery-operated computing devices, enabling a user to frame a representation of a subject in a representation of a field of view of one or more camera sensors faster and more efficiently conserves power and increases the time between battery charges.

In method 1300, while displaying (1302), via the display generation component (e.g., 1200*b*), a representation (e.g., 1202*e*) of a field of view (e.g., 1262*a*) of the one or more camera sensors (e.g., 1200*c*): the computer system (e.g., 1200*a*) detects (1304) a subject (e.g., 1260*a*) (e.g., a person and/or the head and/or torso of a person) at a first position (e.g., a first position in the field of view of the one or more camera sensors). While the subject is at the first position, the computer system detects (1306) an input (e.g., 1250*a*, 1250*d*, 1250*g*, and/or 1250*h*) corresponding to a request to frame the subject within the representation of the field of view of the one or more camera sensors. In response to detecting the input, the computer system frames (1308) the subject in a representation of a first portion (e.g., 1262*b*) of the field of view of the one or more camera sensors. In some embodiments, framing the subject in the representation of the field of view of the one or more camera sensors includes centering the subject in the representation of the field of view of the one or more camera sensors by translating (e.g., digitally) the displayed field of view of the one or more camera sensors (e.g., displaying a different portion of the field of view of the one or more camera sensors) and/or changing the magnification level of the representation of the field of view of the one or more camera sensors. The computer system detects (1310) movement of the (e.g., after framing the subject in the representation of the field of view of the one or more camera sensors) the subject (e.g., a portion of the subject's body) from the first position (e.g., as described with respect to FIGS. 12A and 12B) to a second position (e.g., as described with respect to FIG. 12C) (e.g., a movement of the subject from a first position to a second position) (e.g., a different position within the field of view of the one or more camera sensors and/or a second set of positions) and in response to detecting the movement of the subject from the first position to the second position, the computer system maintains (1312) display of the representation of the first portion of the field of view of the one or more camera sensors (e.g., the computer system does not translate and/or change the magnification of the representation of the field of view of the one or more camera sensors when the subject moves; and/or the computer system does not track the subject within the representation of the field of view of the one or more camera sensors). Framing the subject in a representation of a first portion of the field of view of the one or more camera sensors in response to detecting the input corresponding to a request to frame the subject and maintain the display of the representation of the first portion of the field of view of the one or more camera sensors in response to detecting movement of the subject from the first position to a second position provides the user with a method of setting a desired frame based on a field of view of one or more camera sensors and provides the user visual feedback that the frame has been applied and without the need for additional inputs, thereby providing improved visual feedback and reducing the number of inputs needed to perform an operation.

In some embodiments, the representation of the field of view of the one or more camera sensors is displayed while the computer system is in communication with one or more computer systems via a real-time communication session. In some embodiments, the representation of the field of view of the one or more camera sensors is a user interface element of a user interface for a real-time communication session. In some embodiments, the representation of the field of view of the one or more camera sensors is a user interface element of an operating system user interface. In some embodiments, centering the subject in the representation of the field of view of the one or more camera sensors includes cropping (e.g., the image data from the one or more camera sensors used in) the representation of the field of view. In some embodiments, centering the subject in the representation of the field of view the one or more camera sensors includes panning the field of view of the one or more camera sensors. In some embodiments, changing the magnification level of the representation of the field of view of the one or more camera sensors includes a simulated zoom. In some embodiments, changing the magnification level of the representation of the field of view of the one or more camera sensors includes an optical zoom. In some embodiments, changing the magnification level of the representation of the field of view of the one or more camera sensors includes changing which camera sensor is (or camera sensors are) providing data used by the representation of the field of view. For example, switching from a camera of a first focal length to a camera of a second focal length. For example, switching from a camera sensor with a first detection mode (e.g., visible light), to a camera sensor with a second detection mode (e.g., infrared light and/or a camera providing depth information).

In some embodiments, detecting the subject (e.g., 1260*a*) includes detecting a face. In response to detecting the subject at the first position, the computer system displays a graphical object (e.g., 1202*d*) indicating that a face has been detected. Displaying the graphical object indicating that a face has been detected provides the user with feedback that a face has been detected and provides feedback that the framing will be centered on the detected face, thereby providing the user with improved visual feedback. In some embodiments, the graphical object is displayed at a location corresponding to the detected face. In some embodiments, the display location of the graphical object moves within the representation of the field of view of the one or more camera sensors as the detected face moves within the field of view of the one or more camera sensors. In some embodiments, the graphical object includes several objects and/or shapes that surround a portion of the detected face.

In some embodiments, the input corresponding to the request to frame the subject includes an input (e.g., 1250*d* and/or 1250*h*) at a location corresponding to a location of the subject (e.g., 1260*a* and/or 1260*b*) (e.g., a tap input, gesture input, a mouse input, and/or keyboard input corresponding to a location of the subject and/or the face of the subject in the representation of the field of view of the one or more camera sensors). Framing the subject in response to an input at a location corresponding to a location of the subject provides the user with a method to frame the representation around the subject without requiring the display with additional control interfaces, thereby providing additional control options without cluttering the UI with additional displayed controls.

In some embodiments, the input (e.g., 1250*a* and/or 1250*g*) corresponding to the request to frame the subject includes a selection of a framing user interface element (e.g., a tap input, gesture input, a mouse input, and/or keyboard input on the framing user interface element).

In some embodiments, framing the subject (e.g., 834) in the representation (e.g., 1202*a*) of the first portion (e.g., 1262*b*) of the field of view of the one or more camera sensors (e.g., 1200*c*) includes: in accordance with a determination that the face of the subject is at a first location, framing the subject in a representation of a second portion of the field of view of the one or more camera sensors; and in accordance with a determination that the face of the subject is at a second location that is different from the first location, framing the subject in a representation of a third portion of the field of view of the one or more camera sensors that is different from the second portion. Framing the subject in a representation of the second portion in accordance with a determination that the face of the subject is at a first location and framing the subject in a representation of a third portion in accordance with a determination that the face of the subject is at a second location provides the user with a method for framing the face of the subject based on the face's location without requiring additional inputs to frame the subject in the representation, thereby reducing the number of inputs needed to perform an operation.

In some embodiments, framing the subject (e.g., 1260*a* and/or 1260*b*) in the representation (e.g., 1202*a*) of the first portion (e.g., 1262*b*) of the field of view of the one or more camera sensors (e.g., 1200*c*) includes displaying the subject in a center of the representation of the first portion of the field of view of the one or more camera sensors (e.g., at least a portion of the subject is displayed at the center of the representation of the first portion of the field of view of the one or more camera sensors). Displaying the subject in a center of the representation of the first portion of the field of view of the one or more camera sensors provides the user with a method for framing the face of the subject based on the face's location without requiring additional inputs to center the subject in the representation, thereby reducing the number of inputs needed to perform an operation.

In some embodiments, framing the subject (e.g., 1260*a* and/or 1260*b*) in the representation (e.g., 1202*a*) of the first portion (e.g., 1262*b*) of the field of view of the one or more camera sensors (e.g., 1200*c*) includes changing (e.g., increasing or decreasing) a magnification level (e.g., 1202*c*) (e.g., via optical or digital zoom) of the representation of the first portion of the field of view of the one or more camera sensors to display a representation of a face of the subject at a predetermined size. Changing a magnification level of the representation to display a representation of a face of the subject at a predetermined size provides the user with an easily visible frame of the subject's face without requiring additional user input, thereby reducing the number of inputs needed to perform an operation. In some embodiments, in accordance with a determination that a representation of a face of the subject is a first size, the computer system changes the magnification of the representation of the field of view by a first amount to display the representation of the face of the subject at the predetermined size (e.g., relative to the representation of the field of view of the one or more camera sensors); and in accordance with a determination that the face of the subject is a second size, the computer system changes the magnification of the representation of the field of view by a second amount to display the representation of the face of the subject at the predetermined size.

In some embodiments, after framing the subject (e.g., 1260*a* and/or 1260*b*) in the representation (e.g., 1202*a*) of the first portion (e.g., 1262*b*) of the field of view of the one or more camera sensors (e.g., 1200*c*) (e.g., and while displaying the subject at the first predetermined size of the second predetermined size): the computer system (e.g., 1200*a*) detects an input (e.g., 1250*b* and/or 1250*c*) (e.g., an input on an affordance, an input on a zoom indicator, and/or a pinch or de-pinch gesture on the representation of the field of view of one or more camera sensors) corresponding to a request to change a magnification (e.g., 1202*c*) (e.g., the crop) of the representation of the field of view of the one or more camera sensors (e.g., zoom in or zoom out). In response to detecting the input corresponding to the request to change the magnification of the representation of the field of view of the one or more camera sensors, the computer system changes the magnification of the representation of the field of view of the one or more camera sensors (e.g., displaying the subject and/or background at a second size, different from the predetermined size) and frames the subject in a representation of a fourth portion (e.g., 1262*c*) (e.g., at a fourth magnification) of the field of view of the one or more camera sensors (e.g., changing the portion of the field of view that is displayed according to the change in magnification and to maintain the subject centered in the field of view). Changing the magnification of the representation and framing the subject in a representation of a fourth portion in response to detecting an input corresponding to a request to change a magnification provides the user with feedback that the change in magnification is in response to the user input, thereby providing the user with improved visual feedback.

In some embodiments, input (e.g., 1250*b*) corresponding to the request to change the magnification of the frame (e.g., 1202*a*) of the subject (e.g., 1260*a* and/or 1260*b*) corresponds to selection of a magnification user interface element (e.g., 1202*c* and/or 1202*b*) (e.g., a magnification scrubber and/or an affordance). In some embodiments, the magnification user interface element includes one or more indications of magnification levels. Changing the magnification of the representation and framing the subject in a representation of a fourth portion in response to detecting an input corresponding to the selection of magnification user interface element provides the user with feedback that the change in magnification is in response to the user input, thereby providing the user with improved visual feedback.

In some embodiments, changing the magnification (e.g., 1202*b*) of the representation (e.g., 1202*a*) of the field of view of the one or more camera sensors (e.g., 1200*c*) includes displaying a face of the subject (e.g., 1260*a* and/or 1260*b*) in a center of the representation of the field of view of the one or more camera sensors (e.g., the subject's face is centered as the magnification changes). Displaying a face of the subject in a center of the representation of the field of view of the one or more camera sensors occurs automatically with requiring the user to select the face of the subject, thereby performing an operation when a set of conditions has been met without requiring further user input. In some embodiments, the subject's face is moved toward a center of the field of view as the magnification changes (e.g., if the face was not fully centered in the previous and/or initial frame to maintain image quality). In some embodiments, the input corresponding to a request to change the magnification occurs at a location that does not correspond to the location of the subject's face in the representation of the field of view of the one or more camera sensors.

In some embodiments, the input (e.g., 1250*c*) corresponding to the request to change the magnification of the representation (e.g., 1202*a*) of the field of view (e.g., 1262*c*) of one or more camera sensors (e.g., 1200*c*) corresponds to a request to display the representation of the field of view of the one or more camera sensors at a default magnification (e.g., 1× magnification, a digitally unaltered magnification, and/or an magnification corresponding to an optical magnification level). In response to detecting the input corresponding to the request to change the magnification of the representation of the field of view of one or more inputs, the computer system (e.g., 1200*a*) displays the representation of the field of view (e.g., 1262*a*) of the one or more camera sensors without framing the subject (e.g., the computer system displays the representation of the field of view of the one or more camera sensors without magnification or panning applied; e.g., the computer system removes the zoom and/or panning that was initially applied). Displaying the representation of the field of view of the one or more sensors without framing the subject in response to a request to display the representation of the field of view of the one or more camera sensors at a default magnification provides visual feedback to the user that the frame of the representation has been reset and without requiring further user input to remove the applied frame, thereby providing the user with improved visual feedback and performing an operation when a set of conditions has been met without requiring further user input.

In some embodiments, in response to detecting the input (e.g., 1250*a*, 1250*d*, 1250*g*, and/or 1250*h*) corresponding to the request to frame the subject (e.g., 1260*a* and/or 1260*b*) within the representation (e.g., 1202*a*) of the field of view of the one or more camera sensors (e.g., 1200*c*), the computer system (e.g., 1200*a*) displays a reset user interface element (e.g., 1202*g*) (and, in some embodiments, ceases displaying the framing user interface element). The computer system detects an input (e.g., 1250*f*) corresponding to a selection of the reset user interface element and in response to detecting the input corresponding to the selection of the reset user interface element, the computer system displays the representation of the field of view of the one or more camera sensors without framing the subject (e.g., a representation of the field of view of the one or more camera sensors without magnification or panning applied; e.g., displaying the representation of the field of view of the one or more camera sensors at a default magnification). In some embodiments, the reset user interface element is displayed in the location that the framing user interface element is displayed. Displaying the representation of the field of view of the one or more camera sensors without framing the subject in response to detecting the input corresponding to the selection of the reset user interface element provides the user with feedback that the subject is no longer framed in response to the user input on the reset user interface element, thereby providing the user with improved visual feedback.

In some embodiments, after framing the subject (e.g., 1260*a* and/or 1260*b*) in the representation (e.g., 1202*a*) of the first portion (e.g., 1262*b*) of the field of view of the one or more camera sensors (e.g., 1200*c*): the computer system (e.g., 1200*a*) detects an input (e.g., 1250*c*) corresponding to a request to change (e.g., a request to pan the one or more camera sensors and/or modify a crop of the representation of the field of view of the one or more camera sensors) a camera angle (e.g., simulated camera angle and/or a crop) of the representation of the field of view of the one or more camera sensors. In response to detecting the input corresponding to a request to change the camera angle, the computer system changes the camera angle of the representation of the field of view (e.g., 1262*e*) of the one or more camera sensors (e.g., performing a simulated camera pan) and frames the subject in a representation of a second portion of the field of view of the one or more camera sensors (e.g., the subject is at a second location with the frame). Changing the camera angle of the representation of the field of view of the one or more camera sensors and framing the subject in a representation of a second portion of the field of view of the one more camera sensors in response to detecting the input corresponding to a request to change the camera angle provides the user with visual feedback that the camera angle has been changed in response to the user input, thereby providing the user with improved visual feedback.

In some embodiments, the input (e.g., 1250*a*, 1250*d*, 1250*g*, and/or 1250*h*) corresponding to the request to frame the subject (e.g., 1260*a* and/or 1260*b*) includes selection of an operating system user interface (e.g., 1202). In some embodiments, the user input corresponding to the request to frame the subject includes selection of an adjustment menu that is an operating system menu (e.g., not a menu of real-time communication application).

In some embodiments, the computer system (e.g., 1200*a*) displays, (e.g., concurrently with and/or within the representation of the field of view of the one or more camera sensors) via the display generation component (e.g., 1200*b*), in indication of a current magnification level (e.g., 1202*c*) (e.g., optical or digital zoom level).

In some embodiments, framing the subject (e.g., 1260*a* and/or 1260*b*) in the representation (e.g., 1202*a*) of the field of view of the one or more camera sensors (e.g., 1200*c*) includes maintaining a physical field of view (e.g., 1264) of the one or more camera sensors without moving the one or more camera sensors (e.g., the framing operation is an entirely digital operation).

In some embodiments, the subject (e.g., 1260*a*) is a first subject of a plurality of subjects (e.g., 1260*a* and/or 1260*b*) (e.g., faces) detected in the field of view of the one or more camera sensors (e.g., 1200*c*). In some embodiments, the first subject is detected in the field of view of the one or more camera sensors before other subjects of the plurality of subjects (e.g., the first subject is the subject that is detected first). In some embodiments, the computer system frames the first subject because the first subject was detected before any other subjects that are in the field of view of the one or more camera sensors at the time of the request to frame the subject. Determining the first subject of the plurality of subjects is performed automatically without the need for user input, thereby performing an operation when a set of conditions has been met without requiring further user input.

In some embodiments, the first subject (e.g., 1260*a*) is closest to a center of the field of view (e.g., 1264) of the one or more camera sensors (e.g., 1200*c*). In some embodiments, the computer system frames the first subject because the first subject was closer to a center of the field of view of the one or more camera sensors than any other subjects that are in the field of view of the one or more camera sensors at the time of the request to frame the subject. Determining the first subject of the plurality of subjects is performed automatically without the need for user input, thereby performing an operation when a set of conditions has been met without requiring further user input.

Note that details of the process described above with respect to method 1300 (e.g., FIG. 13) are also applicable in an analogous manner to the methods described above/below. For example, method 700 optionally includes one or more characteristics of the various methods described above with reference to method 1300. For example, method 700 optionally includes displaying graphical effects while framing a subject in a representation of the field of view of one or more camera sensors. As another example, method 750 optionally includes one or more characteristics of the various methods described above with reference to method 1300. For example, method 750 optionally forgoes displaying a graphical effect in accordance with a determination that a user has modified a magnification associated with a frame of the representation of the field of view of the one or more camera sensors. As another example, method 900 optionally includes one or more characteristics of the various methods described above with reference to method 1300. For example, method 900 optionally changes how shared content is displayed while a subject is framed in the representation of the field of view of the one or more camera sensors. As another example, method 1100 optionally includes one or more characteristics of the various methods described above with reference to method 1300. For example, method 1100 optionally changes how a frame of the subject is displayed in accordance with the value of a parameter.

FIGS. 14A-14N illustrate exemplary techniques for displaying a user interface menu, in accordance with some embodiments. The user interfaces in these figures are used to illustrate the processes described below, including the processes in FIG. 15.

FIG. 14A illustrates computer system 600*a* and 600*b* described above (e.g., in FIG. 6A). In FIG. 14A, computer system 600*a* displays user interface 1400 (e.g., a window) of a web browsing application (e.g., a web browser). User interface 1400 includes window controls 1402 (e.g., close button 1402*a*, hide button 1402*b*, and/or resize button 1402*c*). In FIG. 14A, computer system 600*a* detects an input of a first type corresponding to resize button 1402*c*. In some embodiments, the input of the first type corresponding to resize button 1402*c* includes: positioning a cursor over resize button 1402*c*, stopping movement of a cursor over resize button 1402*c*, maintaining a position of a cursor over resize button 1402*c* for a threshold amount of time, selection of resize button 1402*c*, selection of resize button 1402*c* while one or more predefined keyboard keys (e.g., an option key and/or a shift key) are pressed, a tap on resize button 1402*c*, and/or a mouse click input and/or button input while a cursor is over resize button 1402*c*.

Figure 14B:
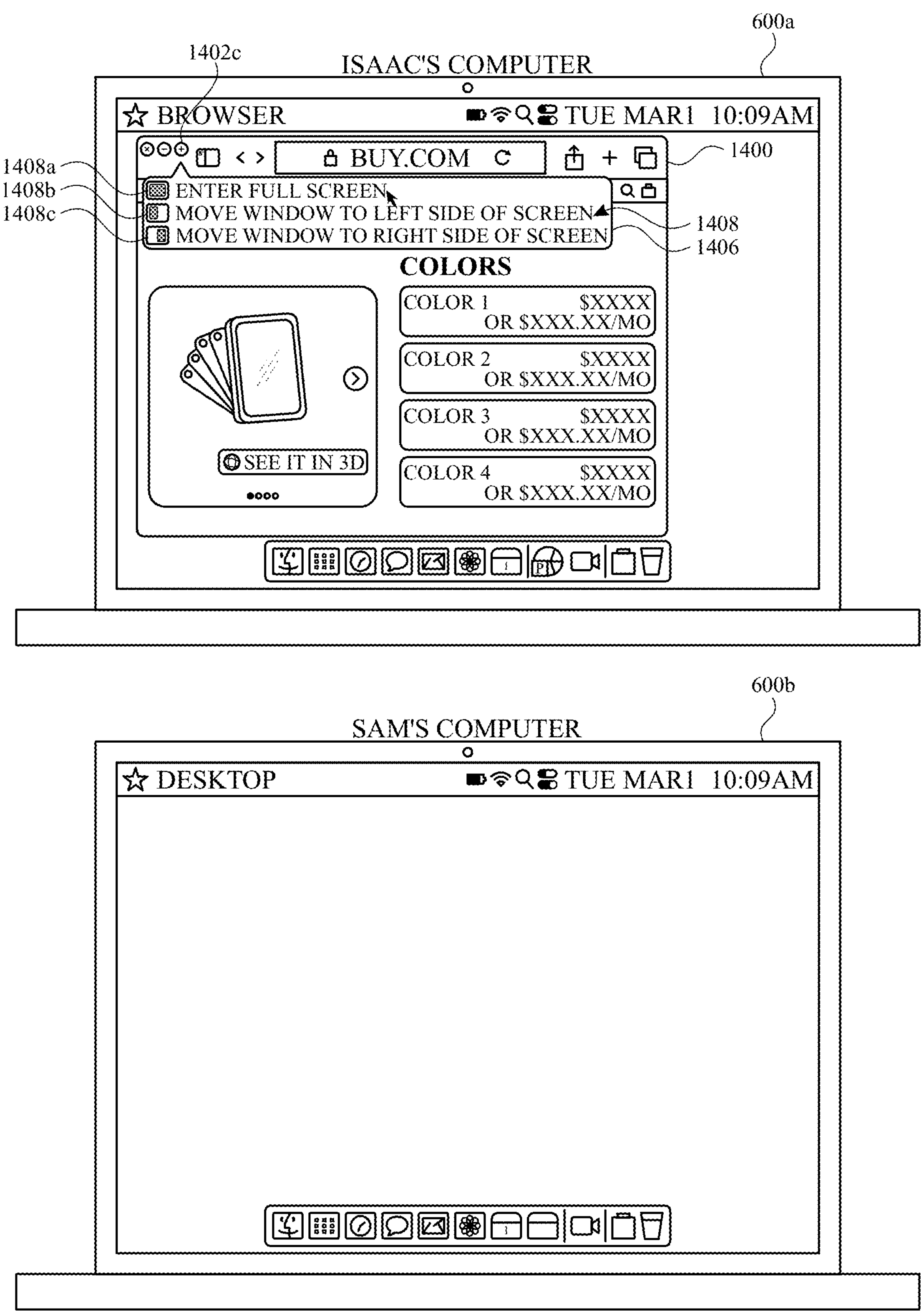

In response to detecting the input of the first type corresponding to resize button 1402*c*, computer system 600*a* displays menu 1406 as shown in FIG. 14B. In some embodiments, computer system 600*a* does not display menu 1406 in response to detecting an input (e.g., an input of the first type) corresponding to other controls in window controls 1402 (e.g., close button 1402*a* and/or hide button 1402*b*). Because computer system 600*a* is not in a real-time communication session when input corresponding to resize button 1402*c* is detected, computer system 600*a* displays first set 1408 of options in menu 1406. In FIG. 14B, first set 1408 of options includes options related to resize button 1402*c*, including expand option 1408*a*, move window left option 1408*b*, and move window right option 1408*c*.

Figure 14C:
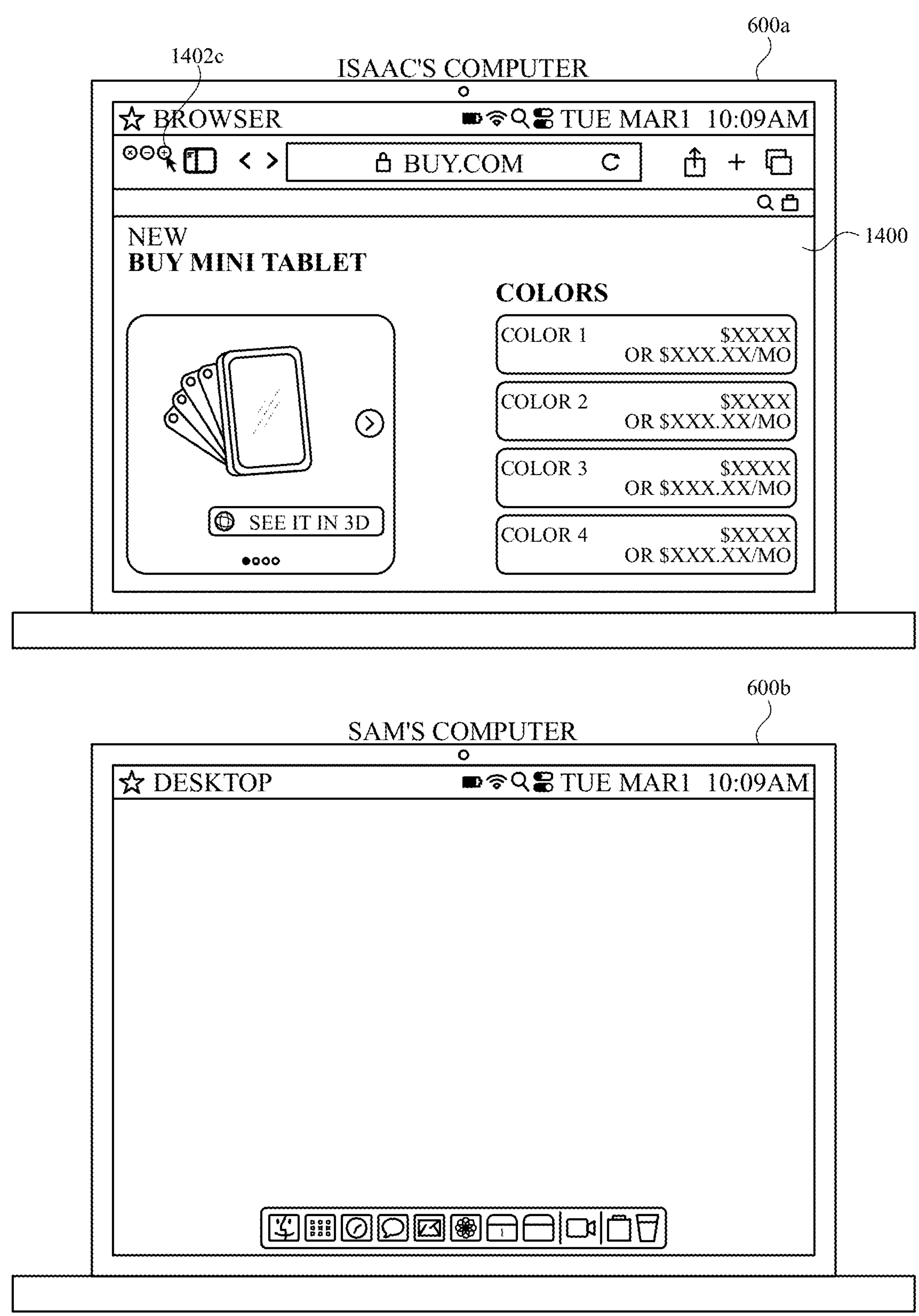

In some embodiments, in response to detecting an input of a second type (e.g., a tap or click) corresponding to resize button 1402*c*, where the input of the second type is different from the input of the first type, computer system 600*a* performs a function on user interface 1400 without displaying menu 1406 (e.g., computer system 600*a* enlarges user interface 1400 as shown in FIG. 14C without displaying menu 1406).

In FIG. 14B, computer system 600*a* detects an input (e.g., a mouse click, a tap, and/or other input) corresponding to selection of expand option 1408*a* (e.g., a mouse click while a cursor is over expand option 1408*a*). In response to detecting the input corresponding to selection of expand option 1408*a*, computer system 600*a* enlarges (e.g., expands and/or increases a size of) user interface 1400, as shown in FIG. 14C. In the embodiment illustrated in FIG. 14C, computer system 600*a* displays user interface 1400 in an expanded (e.g., full-screen) configuration.

In FIG. 14C, computer system 600 detecting an input corresponding to selection of resize button 1402*c* (e.g., a tap, click, or other input on resize button 1402*c*). In some embodiments, when user interface 1400 is in the expanded configuration, computer system 600*a* does not display menu 1406 in response to detecting an input of the first type corresponding to resize button 1402*c*.

Figure 14D:
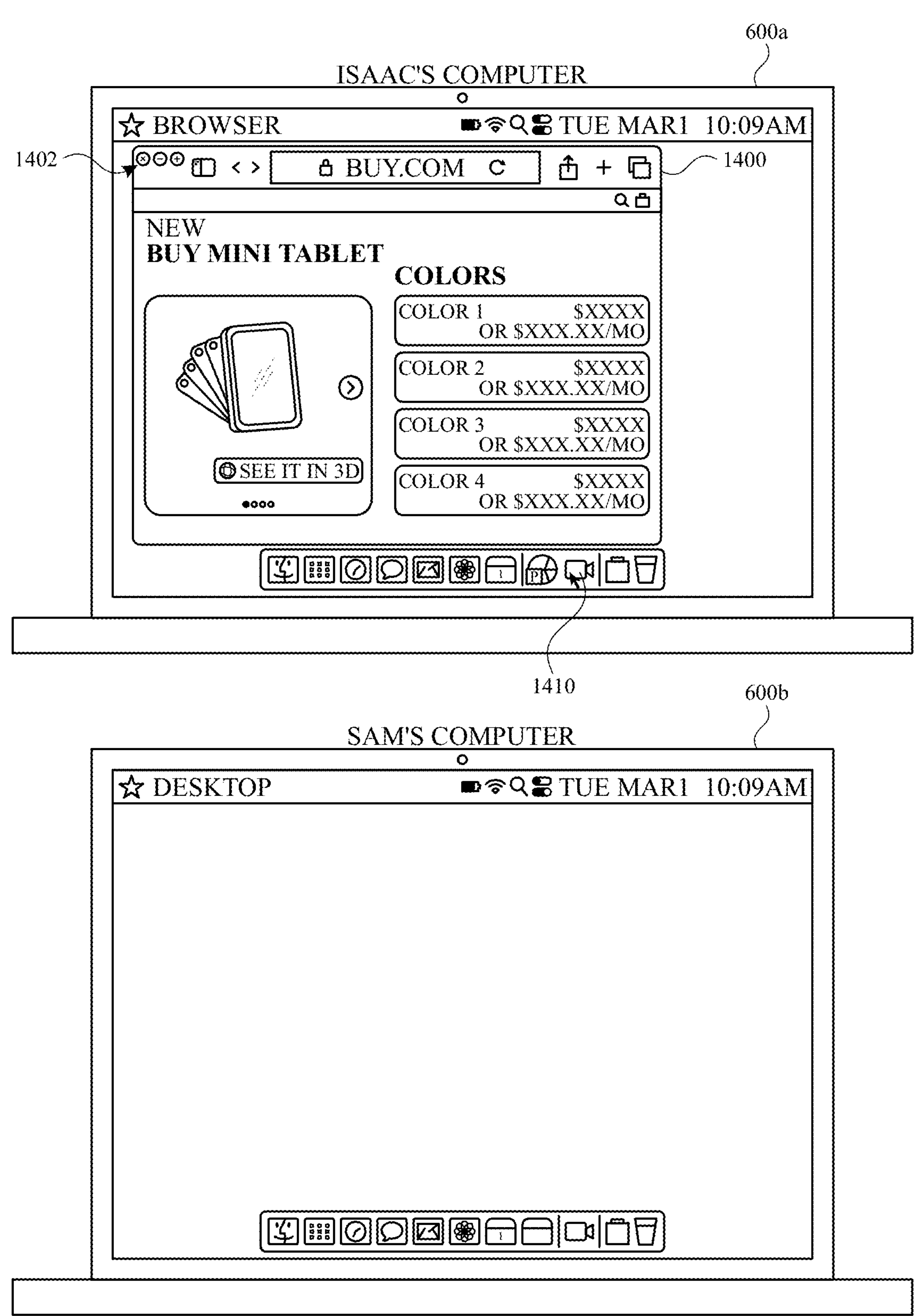

In response to detecting the input corresponding to selection of resize button 1402*c* while user interface 1400 is in the expanded configuration, computer system 600*a* reduces a size of (e.g., contracts and/or shrinks) user interface 1400, as shown in FIG. 14D. In some embodiments, in response to detecting the input corresponding to selection of resize button 1402*c* while user interface 1400 is in the expanded configuration, computer system 600*a* displays user interface 1400 in the same configuration (e.g., position and/or size) that user interface 1400 was in prior to entering the expanded configuration (e.g., when resize button 1402*c* and/or expand option 1408*a* was selected).

In FIG. 14D, computer system 600*a* detects a request to initiate a real-time communication session (e.g., a video conference, a video call, a content sharing session, and/or a phone call) with a user of computer system 600*b* (e.g., Sam). In FIG. 14D, the request to initiate the real-time communication session includes selection of application icon 1410 corresponding to a real-time communication application. In response to the request to initiate a real-time communication session with the user of computer system 600*b*, a real-time communication session is established between computer system 600*a* and computer system 600*b* as shown in FIG. 14E. In FIG. 14E, computer system 600*a* displays user interface 1412*a* of the real-time communication session and computer system 600*b* displays user interface 1412*b* of the real-time communication session. While the real-time communication session is active on computer system 600*a*, user interface 1400 (and/or the corresponding web browser application) is open on computer system 600*a*. In FIG. 14E, user interface 1412*a* is displayed in a background and/or behind user interface 1412*a* of the real-time communication session.

Figure 14F:
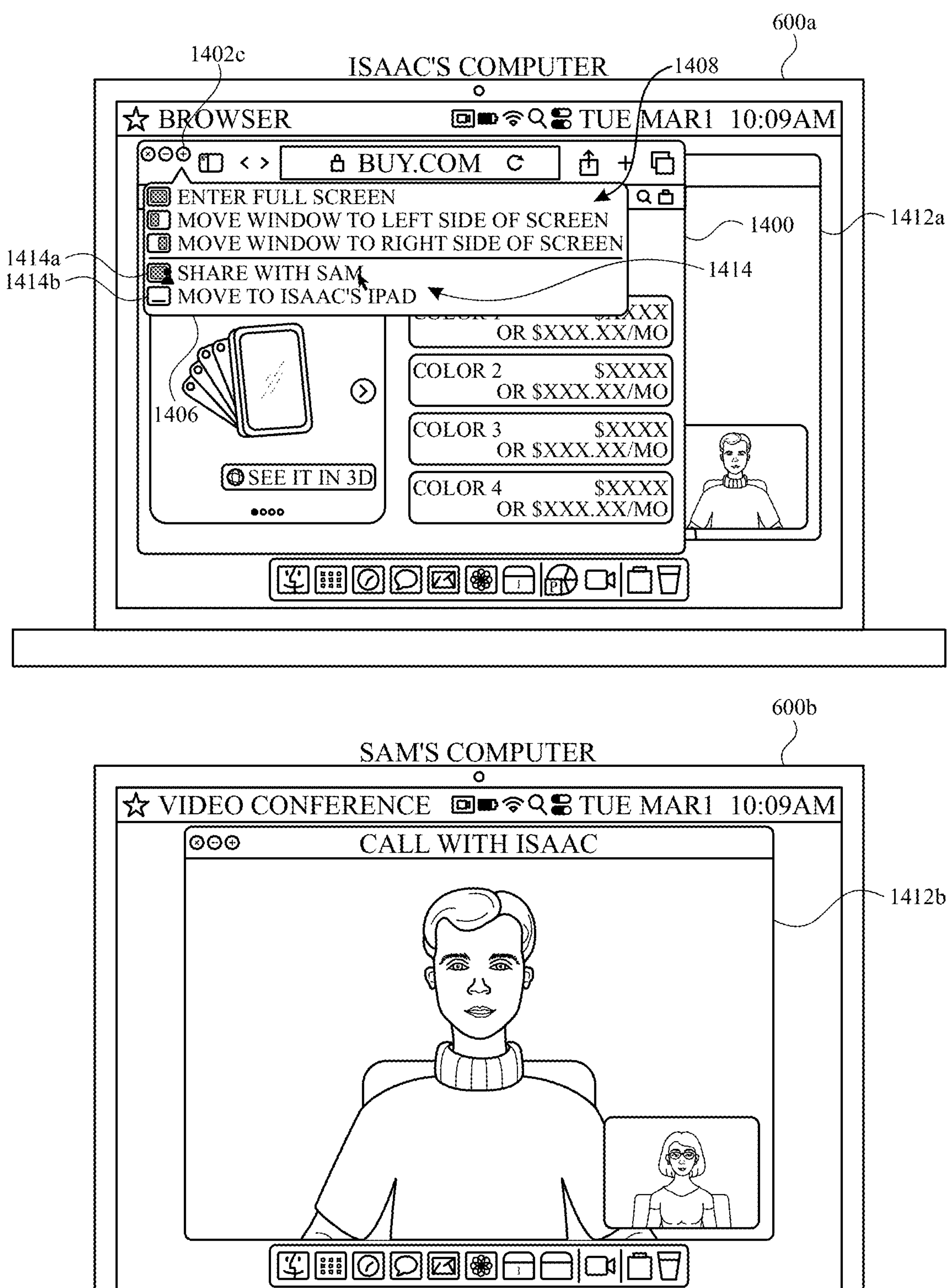

In FIG. 14E, computer system 600*a* detects an input of the first type corresponding to resize button 1402*c* in user interface 1400. In response to detecting the input of the first type corresponding to resize button 1402*c* while the real-time communication session is active on computer system 600*a* (e.g., because the real-time communication session is active on computer system 600*a*), computer system 600*a* displays menu 1406 with a second set of 1414 of options, as shown in FIG. 14F. Second set 1414 of options includes options for performing functions related to the real-time communication session, including share content option 1414*a* and move communication session option 1414*b*. In FIG. 14F, menu 1406 includes first set 1404 of options (e.g., as discussed above) and second set 1414 of options. In some embodiments, second set 1414 of options is not included in menu 1406 when computer system 600*a* detects an input of the first type corresponding to resize button 1402*c* while computer system 600*a* is not in an active real-time communication session.

In some embodiments, one or more of the options in second set 1414 of options are included in second set 1414 of options because content (e.g., an application, a window, and/or screenshare content) is not being shared in the real-time communication session. In some embodiments, one or more of the options (e.g., share content option 1414*a*) in second set 1414 of options are included in second set 1414 of options because user interface 1400 includes a type of content that can be shared in the real-time communication session. For example, in some embodiments, in accordance with a determination that user interface 1400 (or the content of user interface 1400) cannot be shared in the real-time communication session, menu 1406 and/or second set 1414 of options does not include share content option 1414*a*.

In some embodiments, in response to detecting selection of move communication session option 1414*b*, computer system 600*a* initiates a process for activating the real-time communication session on another computer system associated with the user of computer system 600*a*. In some embodiments, activating the real-time communication session on another computer system associated with the user of computer system 600*a* includes transferring and/or moving the real-time communication session to the other computer system associated with the user of computer system 600*a*.

Figure 14G:
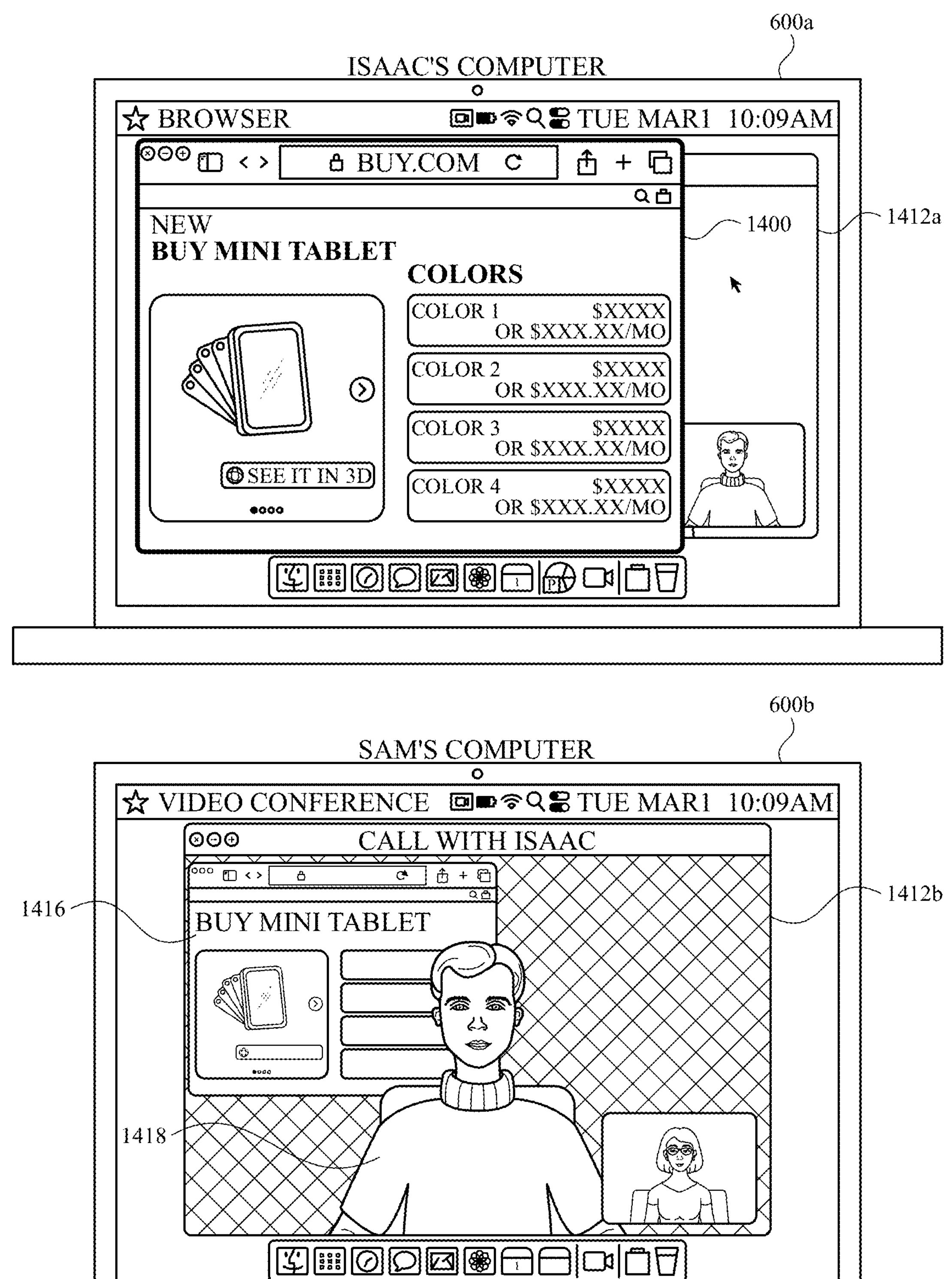

In the embodiment illustrated in FIG. 14F, computer system 600*a* detects an input corresponding to selection of share content option 1414*a*. In response to detecting the input corresponding to selection of share content option 1414*a*, computer system 600*a* shares user interface 1400 in the real-time communication session, as shown in FIG. 14G. In FIG. 14G, user interface 1400 is shared in the real-time communication session. Computer system 600*a* displays a visual indication (e.g., a bold outline, sharing controls, and/or highlighting) to indicate that user interface 1400 is being shared in the real-time communication session. Computer system 600*b* displays representation 1416 of user interface 1400 in user interface 1412*b* of the real-time communication session. In FIG. 14G, computer system 600*b* displays a composite of representation 1416 of user interface 1400 and representation 1418 of the participant of the real-time communication session (e.g., Sam and/or the user of computer system 600*a*) that is sharing the content represented by representation 1416.

Figure 14H:
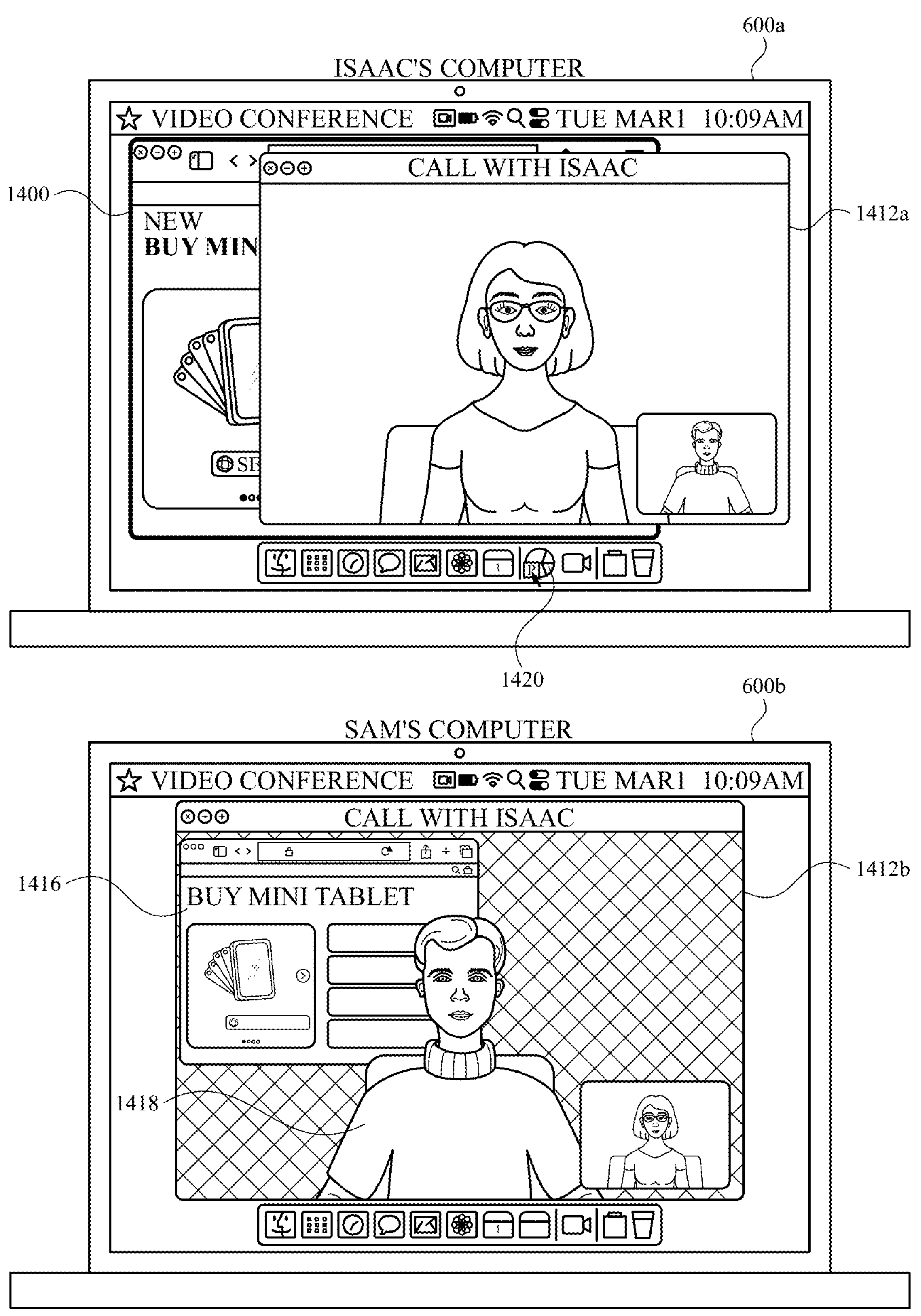

In FIG. 14G, user interface 1400 is displayed in a foreground on computer system 600*a*. While user interface 1400 is displayed in a foreground on computer system 600*a*, computer system 600*a* detects a selection of user interface 1412*a*. In response to detecting the selection of user interface 1412*a*, computer system 600*a* displays user interface 1412*a* in a foreground (e.g., as shown in FIG. 14H) and continues to share user interface 1400 in the real-time communication session (e.g., user interface 1400 remains in the real-time communication session). For example, in FIG. 14H, computer system 600*b* continues to display representation 1416 of the shared content in user interface 1412*b*.

Figure 14I:
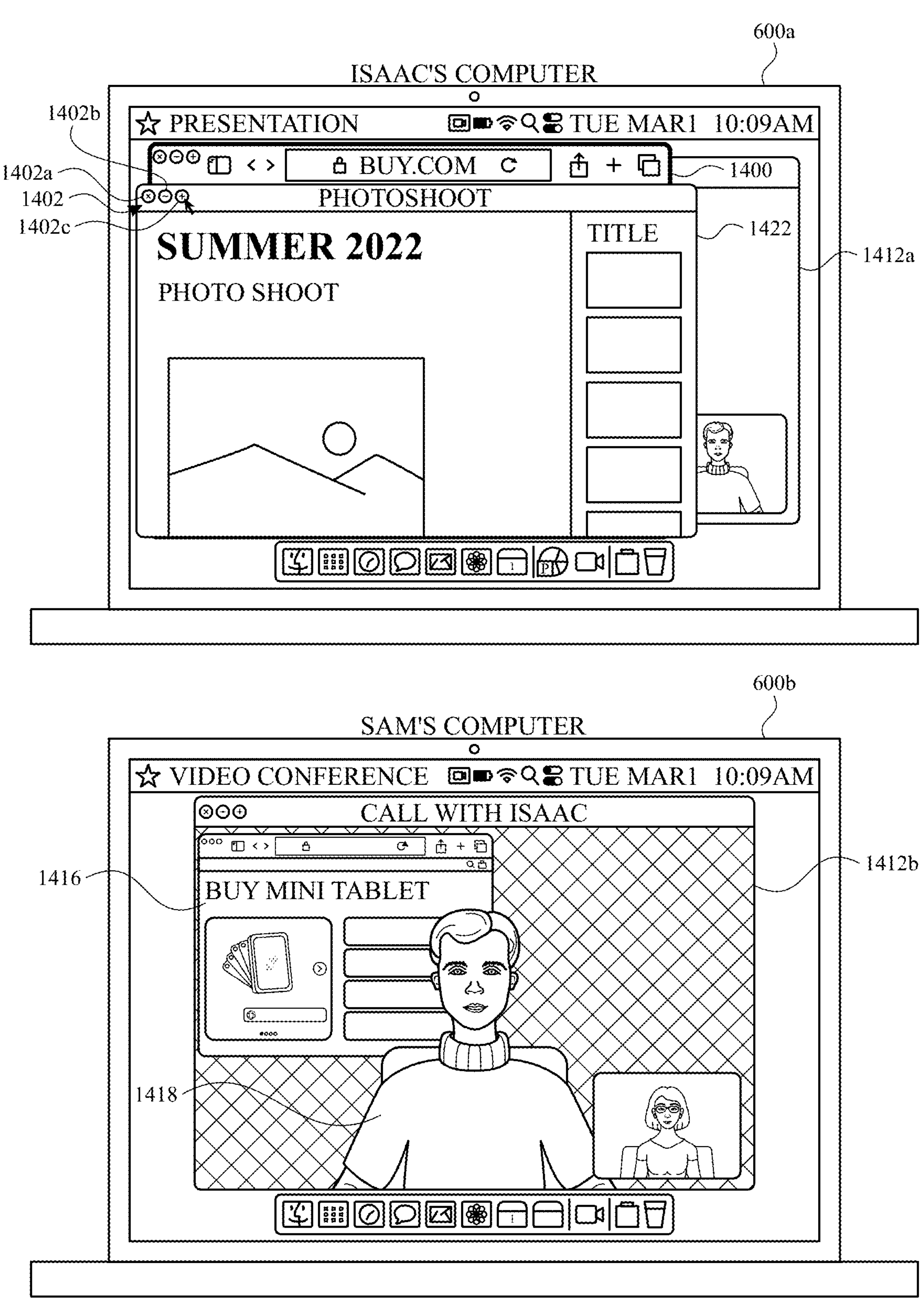

In FIG. 14H, computer system 600*a* detects a request to open (e.g., launch and/or display a user interface of) another application. In FIG. 14H, computer system 600*a* detects a request to open a presentation application corresponding to application icon 1420. In response to detecting the request to open the presentation application, computer system 600*a* displays (e.g., in a foreground) user interface 1422 (e.g., an application window) of the presentation application (e.g., without sharing user interface 1422 of the presentation application in the real-time communication session and/or while continuing to share user interface 1400 in the real-time communication session), as shown in FIG. 14I.

Figure 14J:
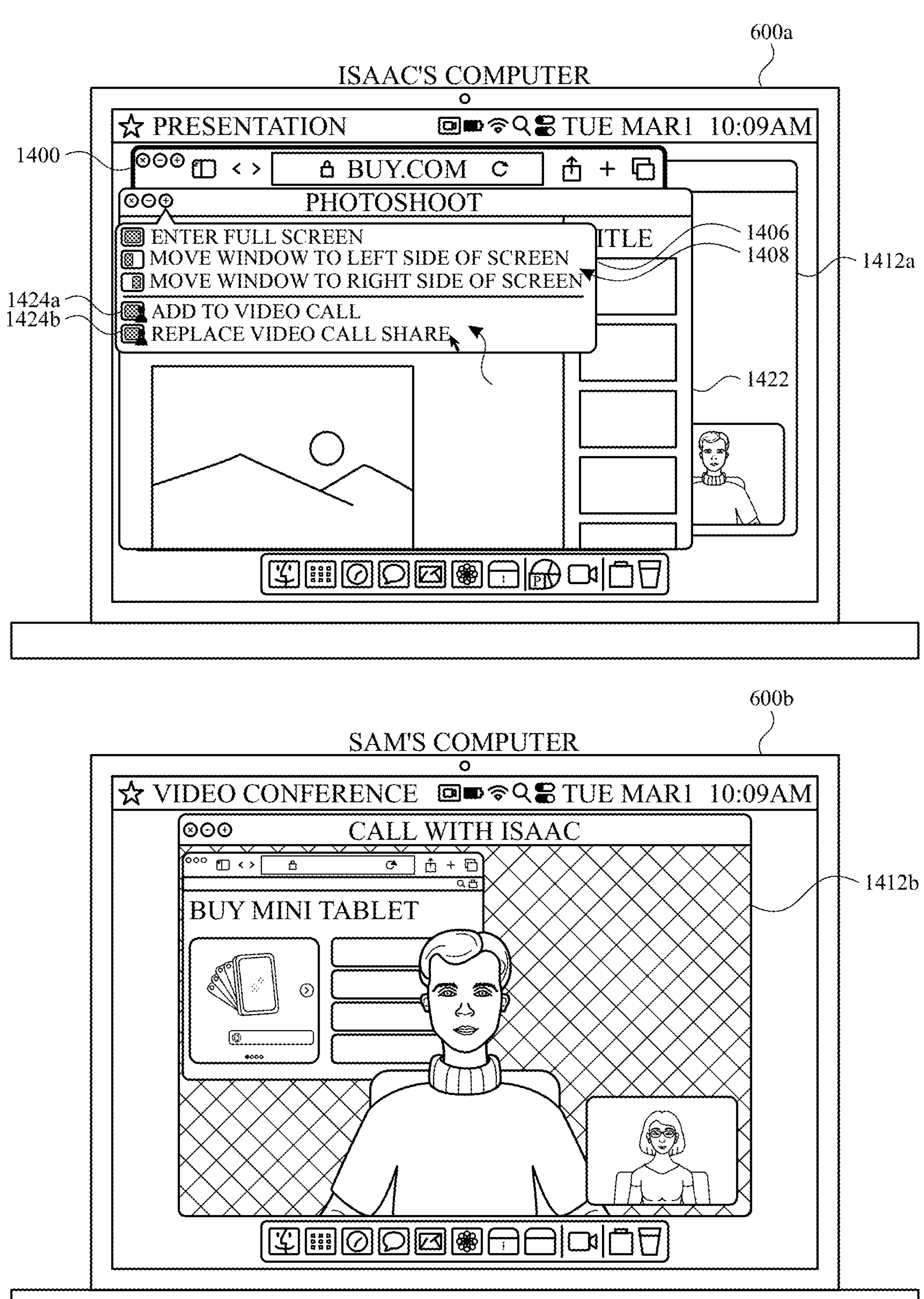
Figure 14K:
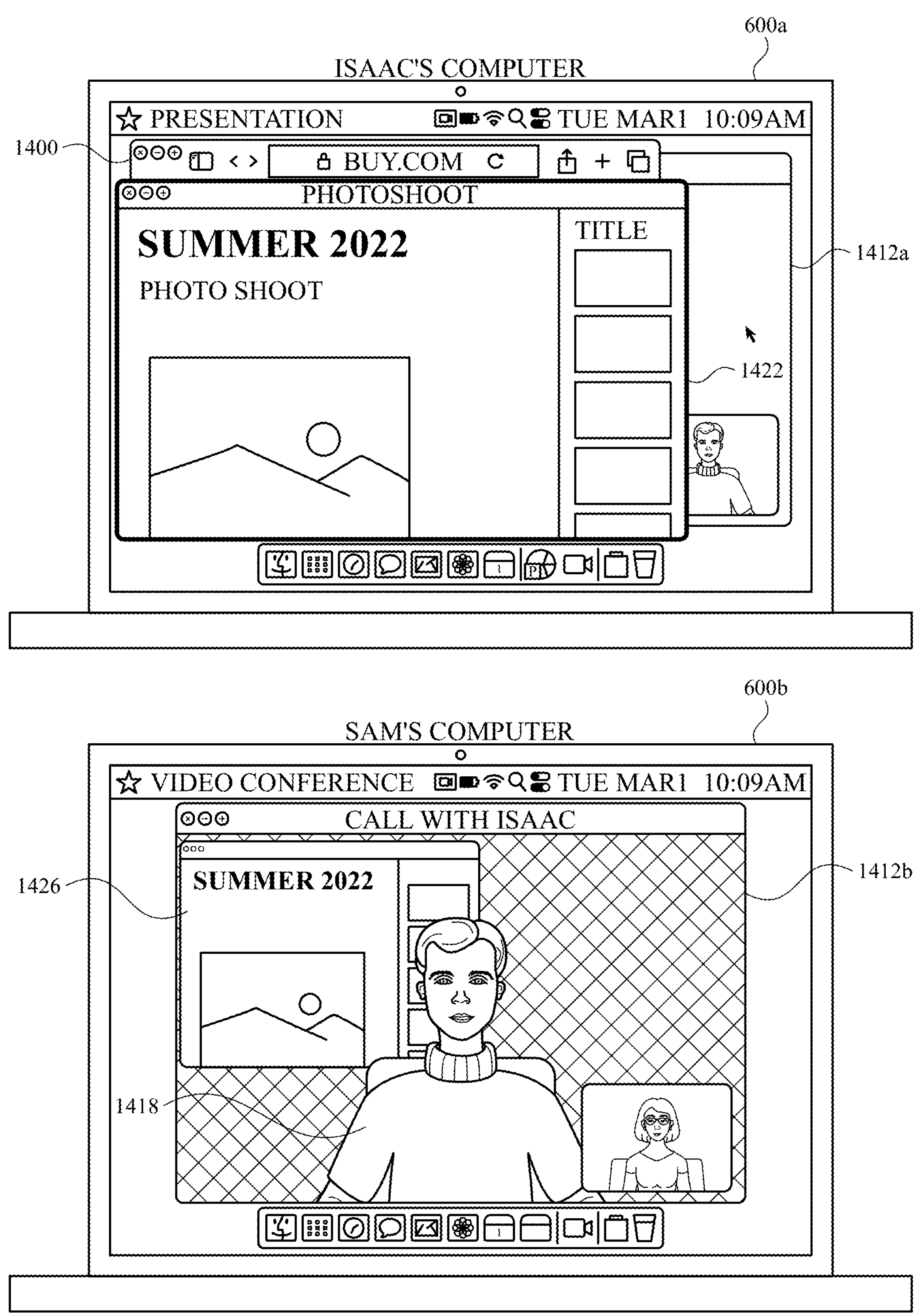

User interface 1422 of the presentation application includes window options 1402 (e.g., the same window options 1402 as user interface 1400). In FIG. 14I, computer system 600*a* detects an input of the first type corresponding to resize button 1402*c* in user interface 1422. In response to detecting the input of the first type corresponding to resize button 1402*c* in user interface 1422, computer system 600*a* displays menu 1406 for user interface 1422 as shown in FIG. 14J. In FIG. 14J, menu 1406 includes first set 1408 of options and third set 1424 of options. Menu 1406 includes third set 1424 of options (e.g., instead of second set 1414 of options) because content (e.g., user interface 1400) is being shared in the real-time communication session. Third set 1424 of options includes add content option 1424*a* and replace content option 1424*b*. In response to detecting selection of add content option 1424*a*, computer system 600*a* shares user interface 1422 (or content corresponding to user interface 1422) in the real-time communication session (e.g., without removing user interface 1400 from the real-time communication session). In response to detecting selection of replace content option 1424*b*, computer system 600*a* shares user interface 1422 (or content corresponding to user interface 1422) in the real-time communication session and stops sharing user interface 1400 in the real-time communication session (e.g., computer system 600*a* replaces user interface 1400 with user interface 1422 in the real-time communication session), as shown in FIG. 14K. For example, in FIG. 14K, user interface 1422 is visually distinguished with a bold border on computer system 600*a*, the bold border is removed from user interface 1400 on computer system 600*a*, and representation 1416 of user interface 1400 on computer system 600*b* is replaced with representation 1426 of user interface 1422.

Displaying second set 1414 of options and/or third set 1424 of options in response to an input directed to a user interface of content that a user desires to share enables a user to share content in a real-time communication session directly from the user interface of the content.

Turning to FIG. 14L, computer system 600*a* has stopped sharing content (e.g., user interface 1422 and user interface 1400) in the real-time communication session. In some embodiments, computer system 600*a* provides alternative techniques for sharing content in the real-time communication session. In FIG. 14L, computer system 600*a* detects selection of menu option 1428. In some embodiments, menu option 1428 corresponds to a system-level menu (e.g., a menu that includes options for controlling system-level functionality and/or parameters). In some embodiments, menu option 1428 corresponds to an application menu, such as a menu for the real-time communication application corresponding to user interface 1412*a*. In response to detecting selection of menu option 1428, computer system 600*a* displays menu 1430, including sharing options 1432. Sharing options 1432 include add content option 1432*a* and start sharing option 1432*b*. In some embodiments, in response to detecting selection of start sharing option 1432*b*, computer system 600*a* shares (or initiates a process for sharing) a screen of computer system 600*a*.

In FIG. 14M, computer system 600*a* detects selection of add content option 1432*a*. In response to detecting selection of add content option 1432*a*, computer system 600*a* displays user interface options 1434, including first user interface option 1434*a* (corresponding to user interface 1400) and second user interface option 1434*b* (corresponding to user interface 1422), as shown in FIG. 14N. In response to detecting selection of first user interface option 1434*a*, computer system 600*a* shares user interface 1400 in the real-time communication session (e.g., as shown and described in FIGS. 14F and 14G). In response to detecting selection of second user interface option 1434*b*, computer system 600*a* shares user interface 1422 in the real-time communication session (e.g., as shown and described in FIGS. 14J and 14K).

FIG. 15 is a flow diagram illustrating a method for displaying a user interface menu using a computer system in accordance with some embodiments. Method 1500 is performed at a computer system (e.g., 100, 300, 500, 600*a*, 600*b*, 800*a*, 800*b*, 800*c*, 1000*a*, 1000*b*, and/or 1200*a*) (e.g., a smartphone, a desktop computer, a laptop computer, a tablet computer, a head-mounted device, a wearable device, and/or a smart watch) that is in communication with (e.g., includes and/or is connected to) a display generation component (e.g., 601*a* and/or 601*b*) (e.g., a display controller, a touch-sensitive display system, a monitor, a projector, a head-mounted display, and/or a holographic display) and one or more input devices (e.g., a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device; a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial)). Some operations in method 1500 are, optionally, combined, the orders of some operations are, optionally, changed, and some operations are, optionally, omitted.

As described below, method 1500 provides an intuitive way for displaying a user interface menu. The method reduces the cognitive burden on a user for displaying user interface menu, thereby creating a more efficient human-machine interface. For battery-operated computing devices, enabling a user to display user interface menus faster and more efficiently conserves power and increases the time between battery charges.

In method 1500, the computer system detects (1502), via the one or more input devices, a request (e.g., as described on computer system 600*a* in FIG. 14A, FIG. 14E, and/or FIG. 14I) to display a user interface menu associated with first content (e.g., 1400 and/or 1422). In some embodiments, the first content is an application, a user interface, a window, a screen, and/or a display (e.g., a user interface of an application that is open on the computer system). In response to detecting the request to display the user interface menu, the computer system displays (1504), via the display generation component, the user interface menu (e.g., 1406), including: in accordance with a determination that a set of sharing options criteria is met (e.g., that a real-time communication session is active on the computer system and/or that the computer system is connected to a real-time communication session) and that content is being shared (e.g., that the computer system is sharing content and/or that a remote participant is sharing content) in a real-time communication session (e.g., a video conference, a video call, a video chat, a real-time sharing session, a screensharing session, and/or a synchronized media playback session) (e.g., the state of computer system 600*a* in FIG. 14I), the computer system displays (1506) (e.g., in the user interface menu) a first set (e.g., 1424) of one or more sharing user interface elements (e.g., 1424*a* and/or 1424*b*) that, when selected, cause the first content to be included (e.g., shared) in the real-time communication session (e.g., to add the first content to the real-time communication session and/or to replace content currently being shared in the real-time communication session); and in accordance with a determination that the set of sharing options criteria is met and that content is not being shared (e.g., that the computer system is not sharing content and/or that a remote participant is not sharing content) in a real-time communication session (e.g., the state of computer system 600*a* in FIG. 14E), the computer system displays (1508) (e.g., in the user interface menu) a second set (e.g., 1414) of one or more sharing user interface elements (e.g., 1414*a*) that, when selected, cause the first content to be included (e.g., shared) in the real-time communication session, wherein the first set of one or more sharing user interface elements is different from the second set of one or more sharing user interface elements (e.g., the computer system displays different sets of options for sharing the first content in a real-time communication session based on whether content is being shared in the real-time communication session). In some embodiments, the first set of one or more sharing user interface elements includes a first sharing user interface element and/or a second sharing user interface element; the computer system detects selection of the first sharing user interface element and/or the second sharing user interface element; in response to detecting selection of the first sharing user interface element, the first content is added to the real-time communication session (e.g., without removing content that is currently included in the real-time communication session); and in response to detecting selection of the second sharing user interface element, the first content is added to the real-time communication session and replaces content that is currently included in the real-time communication session. In some embodiments, the second set of one or more sharing user interface elements includes a third sharing user interface element; the computer system detects selection of the third sharing user interface element; and in response to detecting the selection of the third user interface element, the first content is added to a real-time communication session. Displaying different sets of sharing user interface elements based on whether content is being shared in a real-time communication session enables the computer system to display controls that are contextually relevant to the user and enables the user to quickly and efficiently share content in a real-time communication session, thereby providing improved visual feedback to the user, providing additional control options without cluttering the user interface with additional displayed controls, reducing the number of inputs needed to perform an operation, and/or performing an operation when a set of conditions has been met without requiring further user input.

In some embodiments, displaying the user interface menu includes displaying (e.g., in the user interface menu) a first sharing user interface element (e.g., in the first set of one or more sharing user interface elements or in the second set of one or more sharing user interface elements) (e.g., 1414*a*, 1424*a*, and/or 1424*b*), and while the computer system is in a real-time communication session (e.g., while a real-time communication session is active on the computer system): the computer system detects, via the one or more input devices, an input corresponding to selection of the first sharing user interface element (e.g., selection of 1414*a* in FIG. 14F and/or selection of 1424*a* in FIG. 14J); and in response to detecting the input corresponding to selection of the first sharing user interface element, the computer system shares the first content in the real-time communication session (e.g., adding the first content to the real-time communication session). Sharing the first content in the real-time communication session in response to detecting an input corresponding to selection of the first sharing user interface element enables the user to quickly and efficiently share content in the real-time communication session and avoid mistakes, thereby reducing the number of inputs needed to perform an operation.

In some embodiments, displaying the first set of one or more sharing user interface elements includes displaying a second sharing user interface element (e.g., 1424*b*), while the computer system is in a real-time communication session (e.g., while a real-time communication session is active on the computer system) and second content (e.g., 1400) is being shared in (e.g., included in) the real-time communication session, the computer system detects, via the one or more input devices, an input corresponding to selection of the second sharing user interface element; and in response to detecting the input corresponding to selection of the second sharing user interface element, the computer system shares the first content (e.g., 1422) in the real-time communication session and removing the second content from the real-time communication session (e.g., the computer system replaces the second content with the first content). Sharing the first content in the real-time communication session and removing the second content from the real-time communication session in response to detecting the input corresponding to selection of the second sharing user interface element enables the user to quickly and efficiently change and/or replace the content that is shared in the real-time communication session, thereby reducing the number of inputs needed to perform an operation.

In some embodiments, the set of sharing options criteria requires (e.g., is met only if) a real-time communication session is active on the computer system (e.g., the computer system is in an active real-time communication session) (e.g., computer system 600*a* displays 1414 in FIG. 14F and 1424 in FIG. 14J, but not in FIG. 14B). In some embodiments, in response to detecting the request to display the user interface menu and in accordance with a determination that the set of sharing options criteria is not met, the computer system displays the user interface menu without the first set of one or more sharing user interface elements and without the second set of one or more sharing user interface elements (e.g., without any options for sharing the first content). In some embodiments, in response to detecting the request to display the user interface menu, the computer system displays a set of menu options in the user interface menu regardless of whether the set of sharing options criteria is met. Requiring that a real-time communication session is active on the computer system to meet the set of sharing options criteria enables the computer system to display sharing user interface elements in the user interface menu when they are relevant to the user, thereby providing improved visual feedback to the user, providing additional control options without cluttering the user interface with additional displayed controls, and/or performing an operation when a set of conditions has been met without requiring further user input.

In some embodiments, detecting the request to display the user interface menu includes detecting selection of a first user interface element (e.g., 1402*c*) in a user interface (e.g., a window such as an application window) (e.g., 1400 and/or 1422) that includes the first content. Displaying the user interface menu in response to detecting selection of a user interface element in a user interface that includes the first content enables the user to quickly and efficiently share content in the real-time communication session, thereby reducing the number of inputs needed to perform an operation. In some embodiments, the request to display the user interface menu includes an input of a first type (e.g., a hover input and/or a press and hold input) corresponding to the first user interface element (e.g., 1402*c*), and while displaying the first user interface element, the computer system detects, via the one or more input devices, an input of a second type (e.g., a tap or click) corresponding to the first user interface element; and in response to detecting the input of the second type corresponding to the first user interface element, the computer system changes (e.g., enlarging, maximizing, increasing, decreasing, and/or reducing) a display size of the first content (e.g., displaying a window of the first content in an expanded or full screen format) (e.g., enlarging 1400 as shown in FIG. 14C and/or reducing the size of 1400 as shown in FIG. 14D). In some embodiments, the input of the first type includes a hover input without a click, tap, or other selection of the first user interface element, an input with a duration that exceeds a threshold duration (e.g., a tap and hold input, a press and hold input, and/or a click and hold input), and/or an input (e.g., a tap or click on the first user interface element) while a predetermined key (e.g., an option key) of a keyboard is selected. In some embodiments, the input of the second type includes a tap, click, or other input corresponding to the first user interface element that does not exceed a threshold duration. Changing a display size of the first content in response to detecting the input of the second type corresponding to the first user interface element enables the user to quickly and efficiently control the size of the first content, thereby providing improved visual feedback to the user and reducing the number of inputs needed to perform an operation. In some embodiments, displaying the menu user interface includes displaying (e.g., in the menu user interface) a set of display configuration user interface elements (e.g., 1408, 1408*a*, 1408*b*, and/or 1408*c*) that, when selected, cause the first content (e.g., 1400 and/or 1422) to be displayed in respective configurations (e.g., enlarged, full screen, displayed on a first side of a display or user interface, and/or displayed on a second side of a display or user interface). In some embodiments, the set of display configuration user interface elements includes a first display configuration user interface element that, when selected, causes the computer system to enlarge (e.g., maximize) display of the first content. In some embodiments E, the set of display configuration user interface elements includes a second display configuration user interface element that, when selected, causes the computer system to display the first content in a first portion of the display generation component (e.g., to move the first content to a right side of a display). In some embodiments, the set of display configuration user interface elements includes a third display configuration user interface element that, when selected, causes the computer system to display the first content in a second portion of the display generation component that is different from the first portion of the display generation component (e.g., to move the first content to a left side of the display). Displaying a set of display configuration user interface elements enables the user to quickly and efficiently control the configuration of the first content, thereby reducing the number of inputs needed to perform an operation.

In some embodiments, while the computer system is in a real-time communication session (e.g., while a real-time communication session is active on the computer system) (and, in some embodiments, while the first content is open on the computer system): the computer system detects, via the one or more input devices, a set of one or more inputs corresponding to a request to display a system-level menu (e.g., selection of a system-level user interface element that is not included in a user interface of the first content or a user interface of the real-time communication session, such as a system-level user interface element in a menu bar or a control center); and in response to detecting the set of one or more inputs corresponding to a request to display the system-level menu (e.g., selection of 1428), the computer system displays, via the display generation component: a set of one or more system-level control user interface elements (e.g., 1430) corresponding to respective system-level controls; and a third sharing user interface element (e.g., 1432, 1434*a*, and/or 1434*b*); the computer system detects, via the one or more input devices, an input corresponding to selection of the third sharing user interface element; and in response to detecting the input corresponding to selection of the fourth sharing user interface element, the computer system shares the first content in the real-time communication session (e.g., the first content can be selected for sharing in the real-time communication session from a system-level menu). Sharing the first content in the real-time communication session in response to detecting the input corresponding to selection of the fourth sharing user interface element enables the user to share the first content in the real-time communication session in different ways, depending on what is more efficient for the user, thereby reducing the number of inputs needed to perform an operation.

In some embodiments, while the computer system is in a real-time communication session (e.g., while a real-time communication session is active on the computer system) (and, ISE, while the first content is open on the computer system): the computer system displays, via the display generation component, a user interface (e.g., a window) of the real-time communication session (e.g., a user interface of a real-time communication application) (e.g., 1412*a* and/or 1412*b*); while displaying the user interface of the real-time communication session, the computer system detects, via the one or more input devices, a set of one or more inputs directed to the user interface of the real-time communication session (e.g., menu options and/or controls in the user interface of the real-time communication session) (e.g., selection of 1428, 1432*a*, 1434*a*, and/or 1434*b*); and in response to detecting the set of one or more inputs directed to the user interface of the real-time communication session, the computer system shares the first content (e.g., 1400 and/or 1422) in the real-time communication session (e.g., the first content can be selected for sharing in the real-time communication session from the user interface of the real-time communication session). Sharing the first content in the real-time communication session in response to detecting the set of one or more inputs directed to the user interface of the real-time communication session enables the user to share the first content in the real-time communication session in different ways, depending on what is more efficient for the user, thereby reducing the number of inputs needed to perform an operation.

In some embodiments, while the computer system is in a real-time communication session (e.g., while a real-time communication session is active on the computer system) and while second content is shared in the real-time communication session, the computer system detects, via the one or more input devices, selection of third content (e.g., a user interface other than a user interface of the real-time communication session) (e.g., selecting 1412*a* in FIG. 14G and/or selecting 1420 in FIG. 14H); and in response to detecting the selection of the third content, the computer system maintains sharing of the second content in the real-time communication session (and, ISE, displaying, via the display generation component, the third content in a foreground of a user interface) (e.g., maintain sharing of 1400 in FIG. 14H and/or maintaining sharing of 1400 in FIG. 14I). For example, ISE, the computer system does not change the content shared in the real-time communication session when different content (e.g., a different window) is selected, placed in focus, opened, and/or brought to a foreground. ISE, selection of the third content includes a request to display the third content in a foreground of a user interface and or to place focus on the third content. Maintaining sharing of the second content in the real-time communication session in response to detecting the selection of the third content enables the user to navigate the user interface (e.g., multitask) without interrupting and/or having to restart sharing of the second content in the real-time communication session, thereby providing improved visual feedback to the user and reducing the number of inputs needed to perform an operation.

Note that details of the process described above with respect to method 1500 (e.g., FIG. 15) are also applicable in an analogous manner to the methods described above. For example, method 700 optionally includes one or more characteristics of the various methods described above with reference to method 1500. For example, methods 700, 750, 900, 1100, and/or 1300 optionally include displaying a user interface menu as described in method 1500.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A computer system that is configured to communicate with a display generation component, the computer system comprising:
- at least a first camera sensor;
- one or more processors; and
- memory storing one or more programs configured to be executed by the one or more processors, the one or more programs including instructions for:
  - concurrently displaying, via the display generation component:
    - a representation of a field of view of the first camera sensor, wherein the representation of the field of view of the first camera sensor includes a first representation of a participant associated with the computer system; and
    - a second representation of a participant associated with an external computer system, wherein:
      - the participant associated with the computer system is different from the participant associated with the external computer system; and
      - the external computer system is different from the computer system;
  - while the representation of the field of view of the first camera sensor including the first representation is concurrently displayed with the second representation, a first gesture performed by a first portion of the participant associated with the computer system is detected within the field of view of the first camera sensor, wherein a representation of the first portion of the participant is included in the first representation; and
  - in response to detection of the first gesture performed by the first portion of the participant associated with the computer system:
    - in accordance with a determination that the first gesture is maintained for more than a predetermined duration and that the first gesture is detected at a first gesture location in the field of view of the first camera sensor, displaying, via the display generation component, a first graphical effect at a first effect location in the representation of the field of view of the first camera sensor;
    - in accordance with a determination that the first gesture is maintained for more than the predetermined duration and that the first gesture is at a second gesture location in the field of view of the first camera sensor that is different from the first gesture location, displaying, via the display generation component, the first graphical effect at a second effect location in the representation of the field of view of the first camera sensor that is different from the first effect location; and in accordance with a determination that the first gesture is maintained for less than the predetermined duration, forgoing displaying the first graphical effect while the representation of the first portion of the participant performing the first gesture is displayed.

2. The computer system of claim 1, the one or more programs further including instructions for:

while the representation of the field of view of the first camera sensor is displayed, a second gesture is detected within the field of view of the first camera sensor, wherein the second gesture is performed by the first portion of the participant associated with the computer system and a second portion of the participant associated with the computer system; and in response to detection of the second gesture performed by the first portion of the participant associated with the computer system and the second portion of the participant associated with the computer system, displaying, via the display generation component, a second graphical effect that is different from the first graphical effect.

3. The computer system of claim 1, wherein displaying the first graphical effect includes:

in accordance with a determination that the first gesture is performed by a first type of body portion, displaying, via the display generation component, the first graphical effect with a first characteristic; and in accordance with a determination that the first gesture is performed by a second type of body portion, displaying, via the display generation component, the first graphical effect with a second characteristic that is different from the first characteristic.

4. The computer system of claim 1, the one or more programs further including instructions for:

while the representation of the field of view of the first camera sensor is displayed, a second gesture performed by a second portion of the participant associated with the computer system is detected within the field of view of the first camera sensor; and in response to detection of the second gesture performed by the second portion of the participant associated with the computer system, displaying, via the display generation component, a second graphical effect that is different from the first graphical effect.

5. The computer system of claim 1, wherein displaying the first graphical effect includes:

in accordance with a determination that the first gesture is of a first gesture type, displaying, via the display generation component, the first graphical effect with a first visual appearance; and in accordance with a determination that the first gesture is of a second gesture type, displaying, via the display generation component, the first graphical effect with a second visual appearance that is different from the first visual appearance.

6. The computer system of claim 1, wherein displaying, via the display generation component, the first graphical effect includes displaying a sequence of effects, including a first sequence effect and a second sequence effect.

7. The computer system of claim 1, wherein displaying the first graphical effect includes displaying the first graphical effect such that a portion of the first graphical effect is obscured by at least a portion of a representation of the participant associated with the computer system in the representation of the field of view of the first camera sensor.

8. The computer system of claim 1, the one or more programs further including instructions for:

while displaying the first graphical effect, a second gesture performed by a third portion of the participant associated with the computer system is detected within the field of view of the first camera sensor; and in response to detecting the second gesture, changing a state of the first graphical effect.

9. The computer system of claim 1, the one or more programs further including instructions for:

in response to detection of the first gesture performed by the first portion of the participant associated with the computer system, in accordance with a determination that a set of criteria is met, displaying, via the display generation component, a cancel option that, when selected, disables displaying graphical effects in response to a detected gesture.

10. The computer system of claim 1, the one or more programs further including instructions for:

detecting an input corresponding to a request to display the first graphical effect; and in response to detecting the input corresponding to the request to display the first graphical effect:

displaying, via the display generation component, the first graphical effect; and displaying, via the display generation component, a graphical indication that indicates a manner in which the first graphical effect can be displayed in response to a gesture.

11. The computer system of claim 1, the one or more programs further including instructions for:

while displaying the first graphical effect, displaying, via the display generation component, a simulated lighting effect on a representation of the participant associated with the computer system.

12. The computer system of claim 1, the one or more programs further including instructions for:

while the representation of the field of view of the first camera sensor is displayed, a second gesture performed by a second portion of the participant associated with the computer system is detected within the field of view of the first camera sensor; and in response to detection of a second gesture performed by the second portion of the participant associated with the computer system:

in accordance with a determination that displaying a graphical effect in response to detection of a gesture is disabled:

displaying, via the display generation component, a prompt to enable display of graphical effects in response to a detected gesture; and forgoing display of a second graphical effect; and in accordance with a determination that displaying a graphical effect in response to detection of a gesture is enabled, displaying a second graphical effect corresponding to the second gesture.

13. The computer system of claim 1, wherein displaying the first graphical effect includes displaying the first graphical effect having a depth effect.

14. A non-transitory computer-readable storage medium storing one or more programs configured to be executed by one or more processors of a computer system with at least a first camera sensor in communication with a display generation component, the one or more programs including instructions for:

concurrently displaying, via the display generation component:

a representation of a field of view of the first camera sensor, wherein the representation of the field of view of the first camera sensor includes a first representation of a participant associated with the computer system; and a second representation of a participant associated with an external computer system, wherein:

the participant associated with the computer system is different from the participant associated with the external computer system; and the external computer system is different from the computer system;

while the representation of the field of view of the first camera sensor including the first representation is concurrently displayed with the second representation, a first gesture performed by a first portion of the participant associated with the computer system is detected within the field of view of the first camera sensor, wherein a representation of the first portion of the participant is included in the first representation; and in response to detection of the first gesture performed by the first portion of the participant associated with the computer system:

in accordance with a determination that the first gesture is maintained for more than a predetermined duration and that the first gesture is detected at a first gesture location in the field of view of the first camera sensor, displaying, via the display generation component, a first graphical effect at a first effect location in the representation of the field of view of the first camera sensor;

in accordance with a determination that the first gesture is maintained for more than the predetermined duration and that the first gesture is at a second gesture location in the field of view of the first camera sensor that is different from the first gesture location, displaying, via the display generation component, the first graphical effect at a second effect location in the representation of the field of view of the first camera sensor that is different from the first effect location; and in accordance with a determination that the first gesture is maintained for less than the predetermined duration, forgoing displaying the first graphical effect while the representation of the first portion of the participant performing the first gesture is displayed.

15. A method, comprising:

at a computer system with at least a first camera sensor that is in communication with a display generation component:

concurrently displaying, via the display generation component:

a representation of a field of view of the first camera sensor, wherein the representation of the field of view of the first camera sensor includes a first representation of a participant associated with the computer system; and a second representation of a participant associated with an external computer system, wherein:

the participant associated with the computer system is different from the participant associated with the external computer system; and the external computer system is different from the computer system;

while the representation of the field of view of the first camera sensor including the first representation is concurrently displayed with the second representation, a first gesture performed by a first portion of the participant associated with the computer system is detected within the field of view of the first camera sensor, wherein a representation of the first portion of the participant is included in the first representation; and in response to detection of the first gesture performed by the first portion of the participant associated with the computer system:

in accordance with a determination that the first gesture is maintained for more than a predetermined duration and that the first gesture is detected at a first gesture location in the field of view of the first camera sensor, displaying, via the display generation component, a first graphical effect at a first effect location in the representation of the field of view of the first camera sensor;

in accordance with a determination that the first gesture is maintained for more than the predetermined duration and that the first gesture is at a second gesture location in the field of view of the first camera sensor that is different from the first gesture location, displaying, via the display generation component, the first graphical effect at a second effect location in the representation of the field of view of the first camera sensor that is different from the first effect location; and in accordance with a determination that the first gesture is maintained for less than the predetermined duration, forgoing displaying the first graphical effect while the representation of the first portion of the participant performing the first gesture is displayed.

16. The computer system of claim 1, wherein:

displaying the first graphical effect at the first effect location includes moving the first graphical effect from the first effect location to a first respective location in the representation of the field of view that is different from the first effect location while the first gesture is maintained at the first gesture location; and displaying the first graphical effect at the second effect location includes moving the first graphical effect from the second effect location to a second respective location in the representation of the field of view that is different from the second effect location while the first gesture is maintained at the second gesture location.

17. The non-transitory computer-readable storage medium of claim 14, the one or more programs further including instructions for:

while the representation of the field of view of the first camera sensor is displayed, a second gesture is detected within the field of view of the first camera sensor, wherein the second gesture is performed by the first portion of the participant associated with the computer system and a second portion of the participant associated with the computer system; and in response to detection of the second gesture performed by the first portion of the participant associated with the computer system and the second portion of the participant associated with the computer system, displaying, via the display generation component, a second graphical effect that is different from the first graphical effect.

18. The non-transitory computer-readable storage medium of claim 14, wherein displaying the first graphical effect includes:

in accordance with a determination that the first gesture is performed by a first type of body portion, displaying, via the display generation component, the first graphical effect with a first characteristic; and in accordance with a determination that the first gesture is performed by a second type of body portion, displaying, via the display generation component, the first graphical effect with a second characteristic that is different from the first characteristic.

19. The non-transitory computer-readable storage medium of claim 14, the one or more programs further including instructions for:

while the representation of the field of view of the first camera sensor is displayed, a second gesture performed by a second portion of the participant associated with the computer system is detected within the field of view of the first camera sensor; and in response to detection of the second gesture performed by the second portion of the participant associated with the computer system, displaying, via the display generation component, a second graphical effect that is different from the first graphical effect.

20. The non-transitory computer-readable storage medium of claim 14, wherein displaying the first graphical effect includes:

in accordance with a determination that the first gesture is of a first gesture type, displaying, via the display generation component, the first graphical effect with a first visual appearance; and in accordance with a determination that the first gesture is of a second gesture type, displaying, via the display generation component, the first graphical effect with a second visual appearance that is different from the first visual appearance.

21. The non-transitory computer-readable storage medium of claim 14, wherein displaying, via the display generation component, the first graphical effect includes displaying a sequence of effects, including a first sequence effect and a second sequence effect.

22. The non-transitory computer-readable storage medium of claim 14, wherein displaying the first graphical effect includes displaying the first graphical effect such that a portion of the first graphical effect is obscured by at least a portion of a representation of the participant associated with the computer system in the representation of the field of view of the first camera sensor.

23. The non-transitory computer-readable storage medium of claim 14, the one or more programs further including instructions for:

while displaying the first graphical effect, a second gesture performed by a third portion of the participant associated with the computer system is detected within the field of view of the first camera sensor; and in response to detecting the second gesture, changing a state of the first graphical effect.

24. The non-transitory computer-readable storage medium of claim 14, the one or more programs further including instructions for:

in response to detection of the first gesture performed by the first portion of the participant associated with the computer system, in accordance with a determination that a set of criteria is met, displaying, via the display generation component, a cancel option that, when selected, disables displaying graphical effects in response to a detected gesture.

25. The non-transitory computer-readable storage medium of claim 14, the one or more programs further including instructions for:

detecting an input corresponding to a request to display the first graphical effect; and in response to detecting the input corresponding to the request to display the first graphical effect:

displaying, via the display generation component, the first graphical effect; and displaying, via the display generation component, a graphical indication that indicates a manner in which the first graphical effect can be displayed in response to a gesture.

26. The non-transitory computer-readable storage medium of claim 14, the one or more programs further including instructions for:

while displaying the first graphical effect, displaying, via the display generation component, a simulated lighting effect on a representation of the participant associated with the computer system.

27. The non-transitory computer-readable storage medium of claim 14, the one or more programs further including instructions for:

while the representation of the field of view of the first camera sensor is displayed, a second gesture performed by a second portion of the participant associated with the computer system is detected within the field of view of the first camera sensor; and in response to detection of a second gesture performed by the second portion of the participant associated with the computer system:

in accordance with a determination that displaying a graphical effect in response to detection of a gesture is disabled:

displaying, via the display generation component, a prompt to enable display of graphical effects in response to a detected gesture; and forgoing display of a second graphical effect; and in accordance with a determination that displaying a graphical effect in response to detection of a gesture is enabled, displaying a second graphical effect corresponding to the second gesture.

28. The non-transitory computer-readable storage medium of claim 14, wherein displaying the first graphical effect includes displaying the first graphical effect having a depth effect.

29. The non-transitory computer-readable storage medium of claim 14, wherein:

displaying the first graphical effect at the first effect location includes moving the first graphical effect from the first effect location to a first respective location in the representation of the field of view that is different from the first effect location while the first gesture is maintained at the first gesture location; and displaying the first graphical effect at the second effect location includes moving the first graphical effect from the second effect location to a second respective location in the representation of the field of view that is different from the second effect location while the first gesture is maintained at the second gesture location.

30. The method of claim 15, the method further comprising:

while the representation of the field of view of the first camera sensor is displayed, a second gesture is detected within the field of view of the first camera sensor, wherein the second gesture is performed by the first portion of the participant associated with the computer system and a second portion of the participant associated with the computer system; and in response to detection of the second gesture performed by the first portion of the participant associated with the computer system and the second portion of the participant associated with the computer system, displaying, via the display generation component, a second graphical effect that is different from the first graphical effect.

31. The method of claim 15, wherein displaying the first graphical effect includes:

in accordance with a determination that the first gesture is performed by a first type of body portion, displaying, via the display generation component, the first graphical effect with a first characteristic; and in accordance with a determination that the first gesture is performed by a second type of body portion, displaying, via the display generation component, the first graphical effect with a second characteristic that is different from the first characteristic.

32. The method of claim 15, the method further comprising:

while the representation of the field of view of the first camera sensor is displayed, a second gesture performed by a second portion of the participant associated with the computer system is detected within the field of view of the first camera sensor; and in response to detection of the second gesture performed by the second portion of the participant associated with the computer system, displaying, via the display generation component, a second graphical effect that is different from the first graphical effect.

33. The method of claim 15, wherein displaying the first graphical effect includes:

in accordance with a determination that the first gesture is of a first gesture type, displaying, via the display generation component, the first graphical effect with a first visual appearance; and in accordance with a determination that the first gesture is of a second gesture type, displaying, via the display generation component, the first graphical effect with a second visual appearance that is different from the first visual appearance.

34. The method of claim 15, wherein displaying, via the display generation component, the first graphical effect includes displaying a sequence of effects, including a first sequence effect and a second sequence effect.

35. The method of claim 15, wherein displaying the first graphical effect includes displaying the first graphical effect such that a portion of the first graphical effect is obscured by at least a portion of a representation of the participant associated with the computer system in the representation of the field of view of the first camera sensor.

36. The method of claim 15, the method further comprising:

while displaying the first graphical effect, a second gesture performed by a third portion of the participant associated with the computer system is detected within the field of view of the first camera sensor; and in response to detecting the second gesture, changing a state of the first graphical effect.

37. The method of claim 15, the method further comprising:

in response to detection of the first gesture performed by the first portion of the participant associated with the computer system, in accordance with a determination that a set of criteria is met, displaying, via the display generation component, a cancel option that, when selected, disables displaying graphical effects in response to a detected gesture.

38. The method of claim 15, the method further comprising:

detecting an input corresponding to a request to display the first graphical effect; and in response to detecting the input corresponding to the request to display the first graphical effect:

displaying, via the display generation component, the first graphical effect; and displaying, via the display generation component, a graphical indication that indicates a manner in which the first graphical effect can be displayed in response to a gesture.

39. The method of claim 15, the method further comprising:

while displaying the first graphical effect, displaying, via the display generation component, a simulated lighting effect on a representation of the participant associated with the computer system.

40. The method of claim 15, the method further comprising:

while the representation of the field of view of the first camera sensor is displayed, a second gesture performed by a second portion of the participant associated with the computer system is detected within the field of view of the first camera sensor; and in response to detection of a second gesture performed by the second portion of the participant associated with the computer system:

in accordance with a determination that displaying a graphical effect in response to detection of a gesture is disabled:

displaying, via the display generation component, a prompt to enable display of graphical effects in response to a detected gesture; and forgoing display of a second graphical effect; and in accordance with a determination that displaying a graphical effect in response to detection of a gesture is enabled, displaying a second graphical effect corresponding to the second gesture.

41. The method of claim 15, wherein displaying the first graphical effect includes displaying the first graphical effect having a depth effect.

42. The method of claim 15, wherein:

displaying the first graphical effect at the first effect location includes moving the first graphical effect from the first effect location to a first respective location in the representation of the field of view that is different from the first effect location while the first gesture is maintained at the first gesture location; and displaying the first graphical effect at the second effect location includes moving the first graphical effect from the second effect location to a second respective location in the representation of the field of view that is different from the second effect location while the first gesture is maintained at the second gesture location.

* * * * *